US012565962B2

(12) United States Patent
LeBlanc et al.

(10) Patent No.: US 12,565,962 B2
(45) Date of Patent: Mar. 3, 2026

(54) MODULAR UTILITY SYSTEM

(71) Applicant: ARCHI ENTERPRISES INC., Vancouver (CA)

(72) Inventors: Christian Alexander LeBlanc, Vancouver (CA); Michael Robert Foster, Vancouver (CA); Kenji Eu, Vancouver (CA)

(73) Assignee: Archi Enterprises Inc., North Vancouver (CA)

( * ) Notice: Subject to any disclaimer, the term of this patent is extended or adjusted under 35 U.S.C. 154(b) by 781 days.

(21) Appl. No.: 17/811,785

(22) Filed: Jul. 11, 2022

(65) Prior Publication Data

US 2023/0065062 A1     Mar. 2, 2023

Related U.S. Application Data

(63) Continuation-in-part of application No. 17/805,815, filed on Jun. 7, 2022, which is a continuation of
(Continued)

(51) Int. Cl.
*F16M 11/20* (2006.01)
*B66C 23/62* (2006.01)
(Continued)

(52) U.S. Cl.
CPC ........... *F16M 11/425* (2013.01); *B66C 23/62* (2013.01); *F16B 7/0446* (2013.01); *F16B 7/20* (2013.01);
(Continued)

(58) Field of Classification Search
CPC .. F16B 9/05; F16B 7/0446; F16B 7/20; B66C 23/62; F16M 11/04; F16M 11/10;
(Continued)

(56) References Cited

U.S. PATENT DOCUMENTS 7,481,692 B2   1/2009   Bruder
8,157,470 B2   4/2012   DeWilde
(Continued)

FOREIGN PATENT DOCUMENTS

CA        2806014 A1    2/2012
CA        2835679 A1    5/2015
(Continued)

OTHER PUBLICATIONS

International Search Report and Written Opinion dated Jul. 20, 2017 issued in related PCT App. No. PCT/CA2017/050376 (8 pages).
(Continued)

*Primary Examiner* — Daniel J Wiley
(74) *Attorney, Agent, or Firm* — Osha Bergman Watanabe & Burton LLP

(57) ABSTRACT

A kit of parts for use in demountably configuring a variety of structural assemblies. A kit may comprise a plurality of cylindrical structural components configured for engagement with various types of male connector components along the sides or at the ends of the cylindrical structural components, there provided for demountable engagement of a female-end socket component at the end of another cylindrical structural component. The kit may additionally comprise components for one or more of roller carriage assemblies and/or one or more of sliding carriage assemblies configured for rolling or sliding movement along rail assemblies comprising a plurality of cylindrical, square, rectangular, or octagonal track components. The rail assemblies may be supported by bases comprising the cylindrical structural components and other components such as weight components, as well as threaded foot components or threaded caster components on which the rail assemblies can be adjustably levelled.

45 Claims, 131 Drawing Sheets

Related U.S. Application Data application No. 16/138,422, filed as application No. PCT/CA2017/050376 on Mar. 24, 2017, now Pat. No. 11,384,898.

(60) Provisional application No. 62/312,617, filed on Mar. 24, 2016.

(51) Int. Cl.

| | |
|---|---|
| *F16B 7/04* | (2006.01) |
| *F16B 7/20* | (2006.01) |
| *F16B 9/00* | (2006.01) |
| *F16M 11/04* | (2006.01) |
| *F16M 11/10* | (2006.01) |
| *F16M 11/24* | (2006.01) |
| *F16M 11/42* | (2006.01) |
| *G03B 17/56* | (2021.01) |
| *H04N 5/222* | (2006.01) |
| *F16B 7/18* | (2006.01) |
| *G12B 5/00* | (2006.01) |

(52) U.S. Cl.

CPC .............. *F16B 9/05* (2018.08); *F16M 11/04* (2013.01); *F16M 11/10* (2013.01); *F16M 11/20* (2013.01); *F16M 11/2014* (2013.01); *F16M 11/2085* (2013.01); *F16M 11/2092* (2013.01); *F16M 11/24* (2013.01); *F16M 11/42* (2013.01); *G03B 17/561* (2013.01); *H04N 5/222* (2013.01); *F16B 7/185* (2013.01); *F16M 2200/024* (2013.01); *F16M 2200/041* (2013.01); *F16M 2200/044* (2013.01); *G12B 5/00* (2013.01)

(58) Field of Classification Search

CPC ............... F16M 11/20; F16M 11/2014; F16M 11/2085; F16M 11/2092; F16M 11/24; F16M 11/42; G03B 17/561; H04N 5/222

See application file for complete search history.

(56) References Cited

U.S. PATENT DOCUMENTS

| | | | | |
|---|---|---|---|---|
| 8,192,105 B2 * | 6/2012 | Keyvanloo | ........ | A47B 47/0016 |
| | | | | 403/348 |
| 8,801,491 B2 | 8/2014 | Bruder | | |
| 2019/0154194 A1 * | 5/2019 | Leblanc | ................. | F16M 11/42 |
| 2020/0216104 A1 * | 7/2020 | Leblanc | .................... | B62B 3/02 |
| 2021/0139063 A1 * | 5/2021 | Leblanc | ................. | B66C 23/18 |

FOREIGN PATENT DOCUMENTS

| | | | |
|---|---|---|---|
| CN | 2320830 | Y | 5/1999 |
| CN | 2638359 | Y | 9/2004 |
| CN | 101504100 | A | 8/2009 |
| CN | 202901653 | U | 4/2013 |
| CN | 203395524 | U | 1/2014 |
| CN | 203453665 | U | 2/2014 |
| CN | 103827408 | A | 5/2014 |
| CN | 104508210 | A | 4/2015 |
| CN | 105275932 | A | 1/2016 |
| EP | 0111439 | A1 | 6/1984 |
| EP | 1284172 | A1 | 2/2003 |
| FR | 1174089 | A | 3/1959 |
| FR | 2488057 | A1 | 2/1982 |
| GB | 1316861 | A | 5/1973 |
| JP | S52149021 | U | 11/1977 |
| JP | S60121046 | U | 8/1985 |
| JP | 2000065020 | A | 3/2000 |
| JP | 2002121891 | A | 4/2002 |
| JP | 2005131133 | A | 5/2005 |
| JP | 2012012799 | A | 1/2012 |
| JP | 2013540456 | A | 11/2013 |
| WO | 1996024002 | A1 | 8/1996 |
| WO | 2009072219 | A1 | 6/2009 |
| WO | 2016038325 | A1 | 3/2016 |
| WO | 2017161461 | A1 | 9/2017 |
| WO | 2017218326 | A1 | 12/2017 |
| WO | 2018047059 | A1 | 3/2018 |

OTHER PUBLICATIONS

Office Action issued in Japanese Application No. 2024-065996, mailed on Apr. 9, 2025 (9 pages).

* cited by examiner

281

Fig. 13A
Fig. 13B
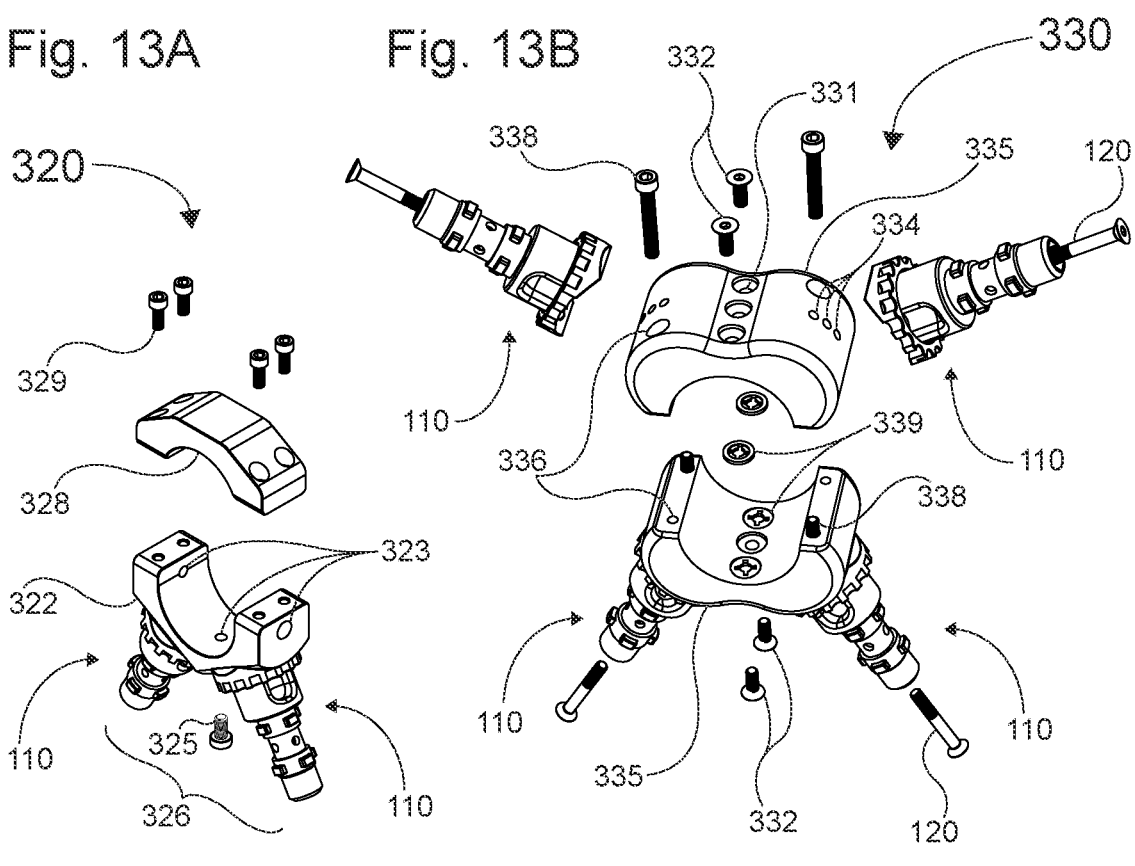
Fig. 13C
Fig. 13D
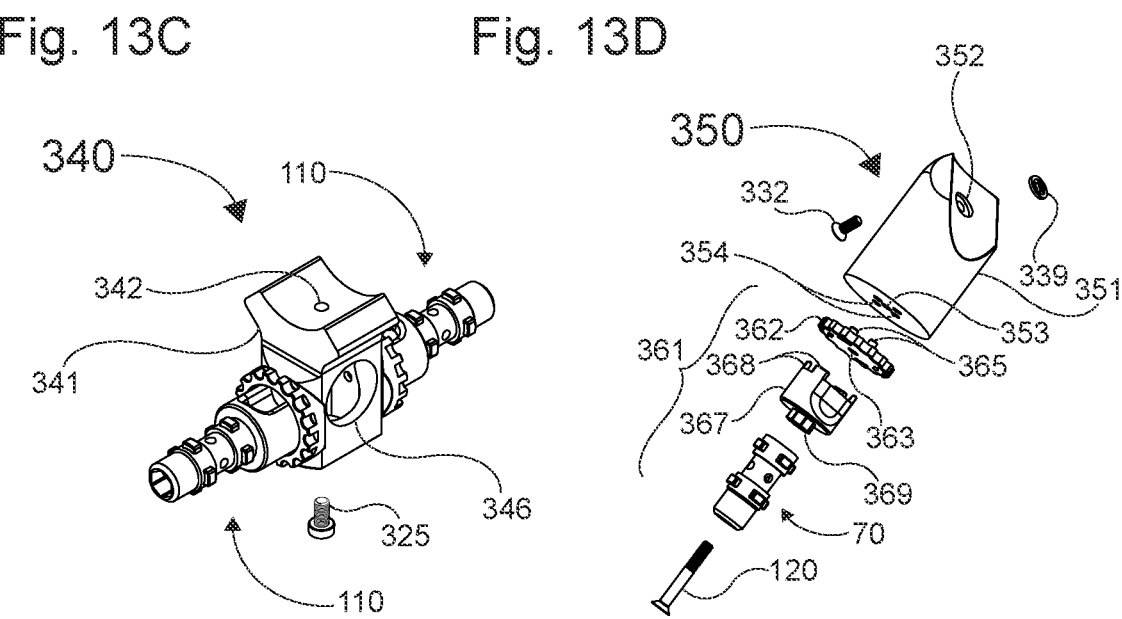

Fig. 24A
Fig. 24B
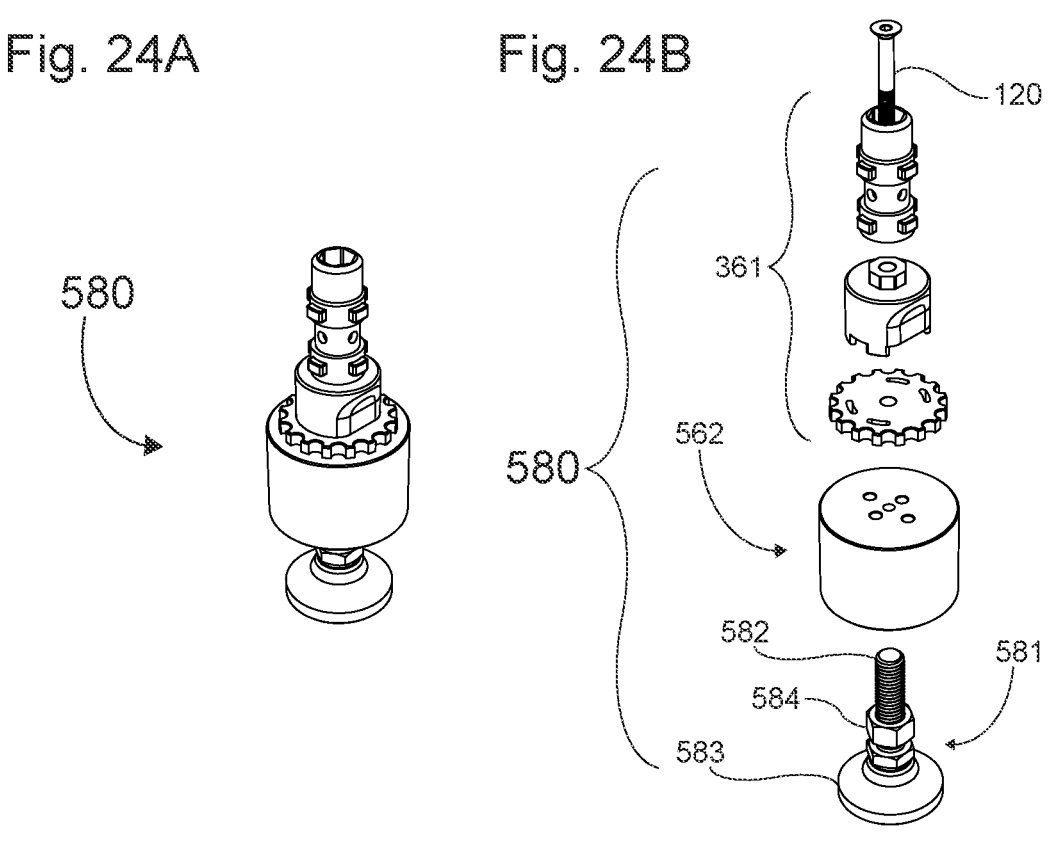
580
Fig. 24C
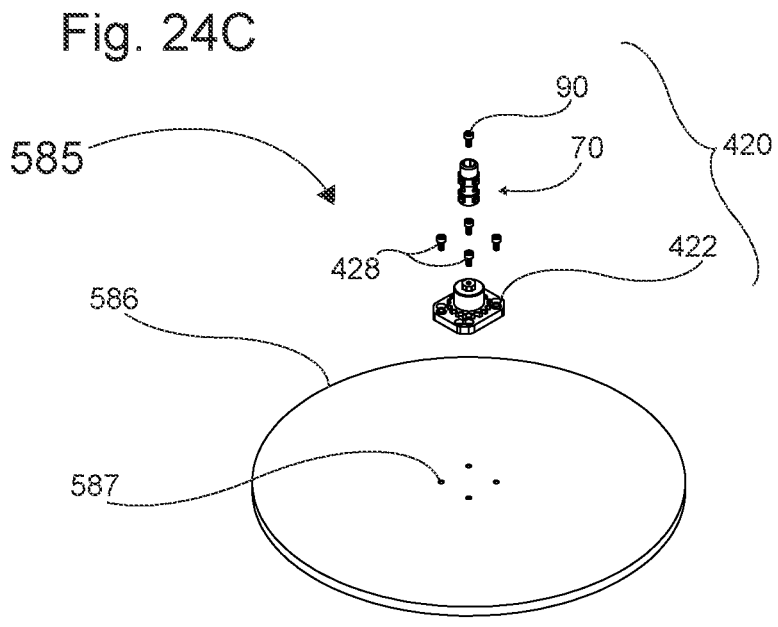

Fig. 25A
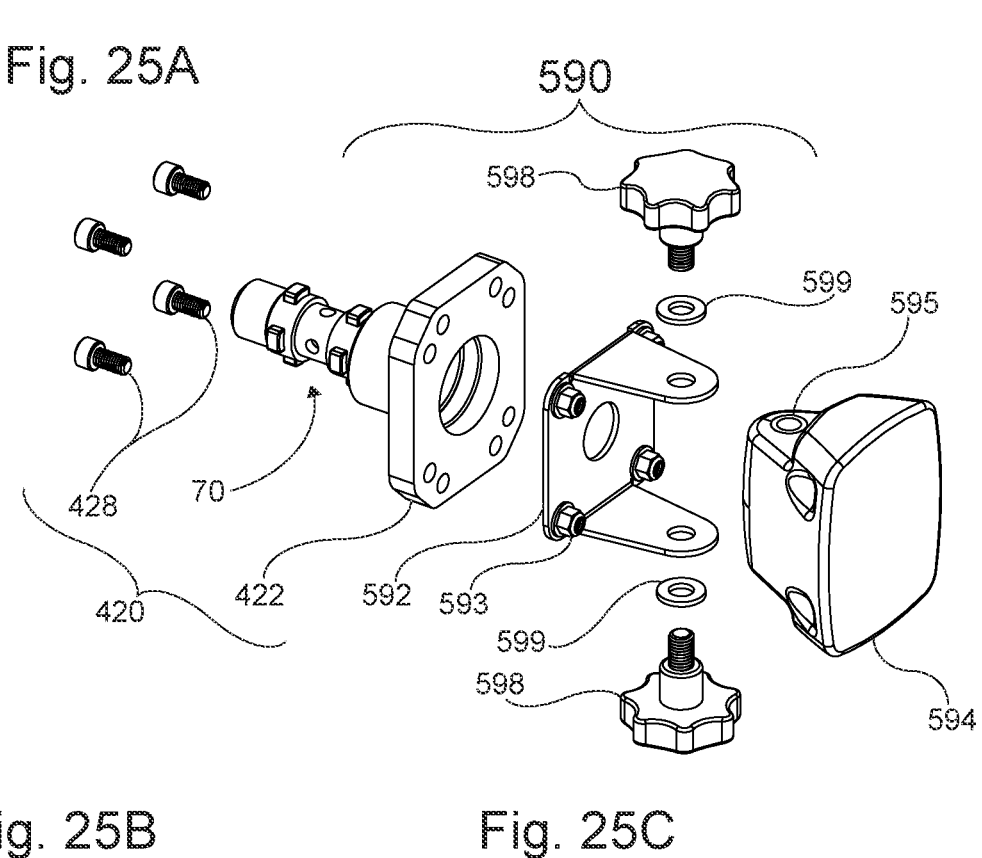
Fig. 25B
Fig. 25C
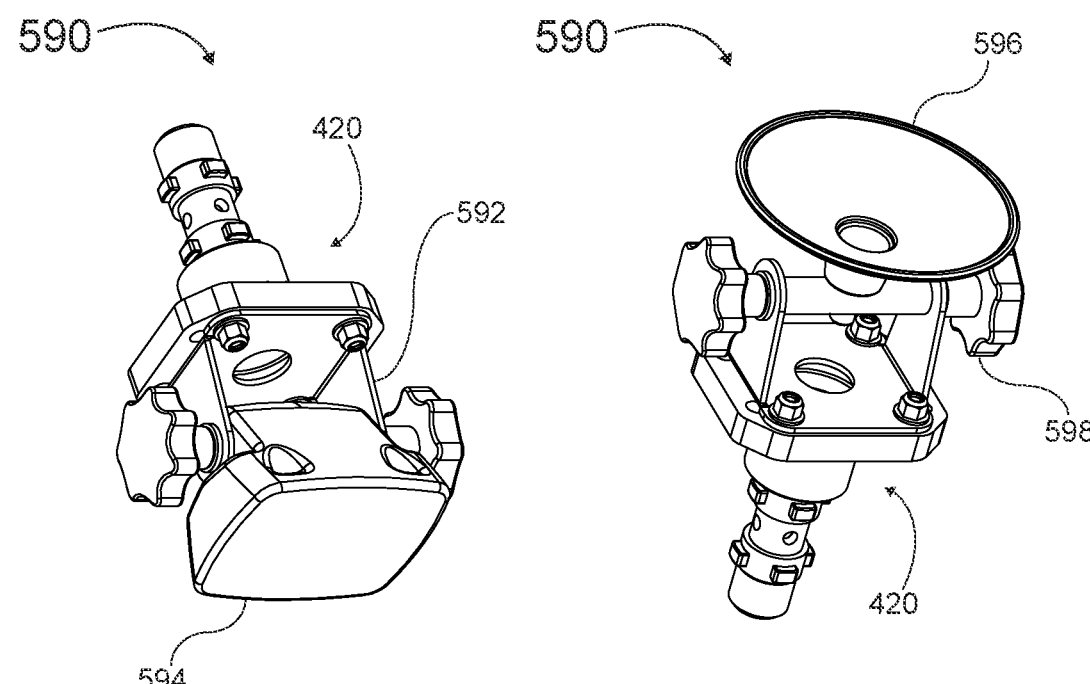

610

610

610

Fig. 28A     Fig. 28B
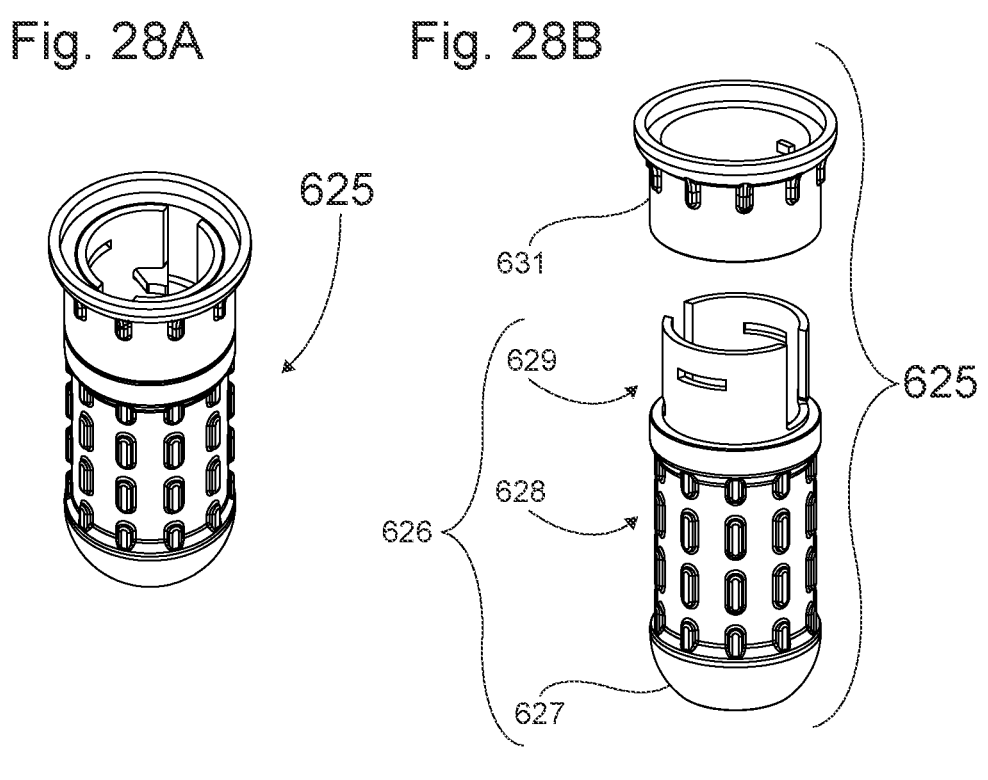
Fig. 28C     Fig. 28D
Fig. 28E
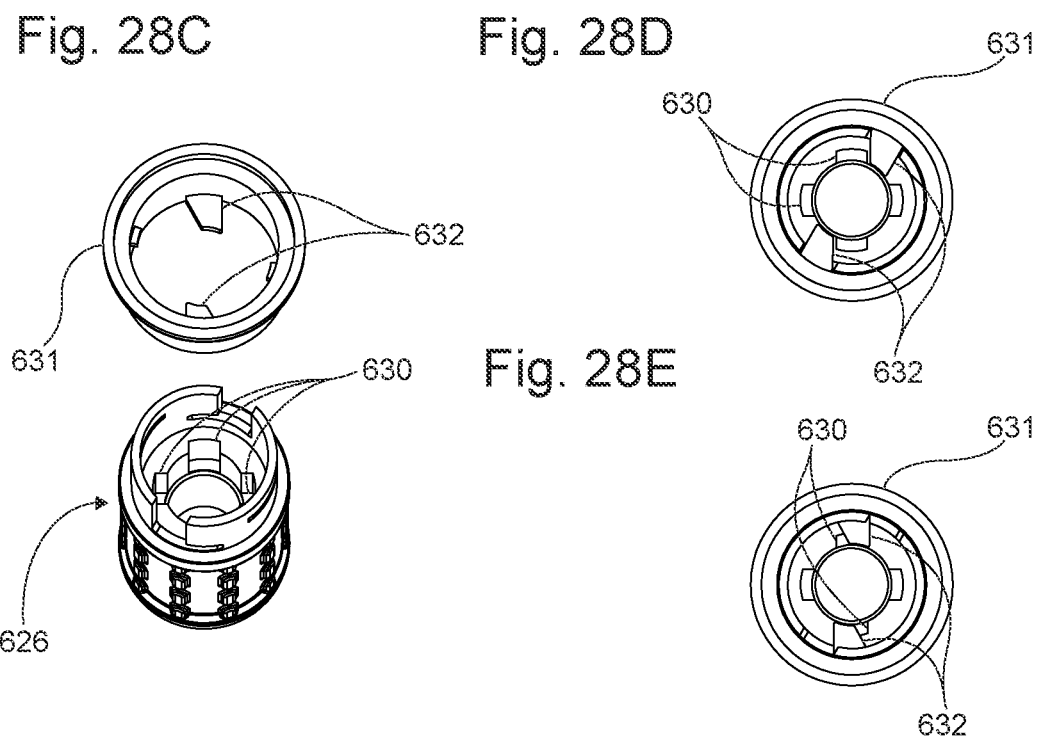

Fig. 63A
Fig. 63B
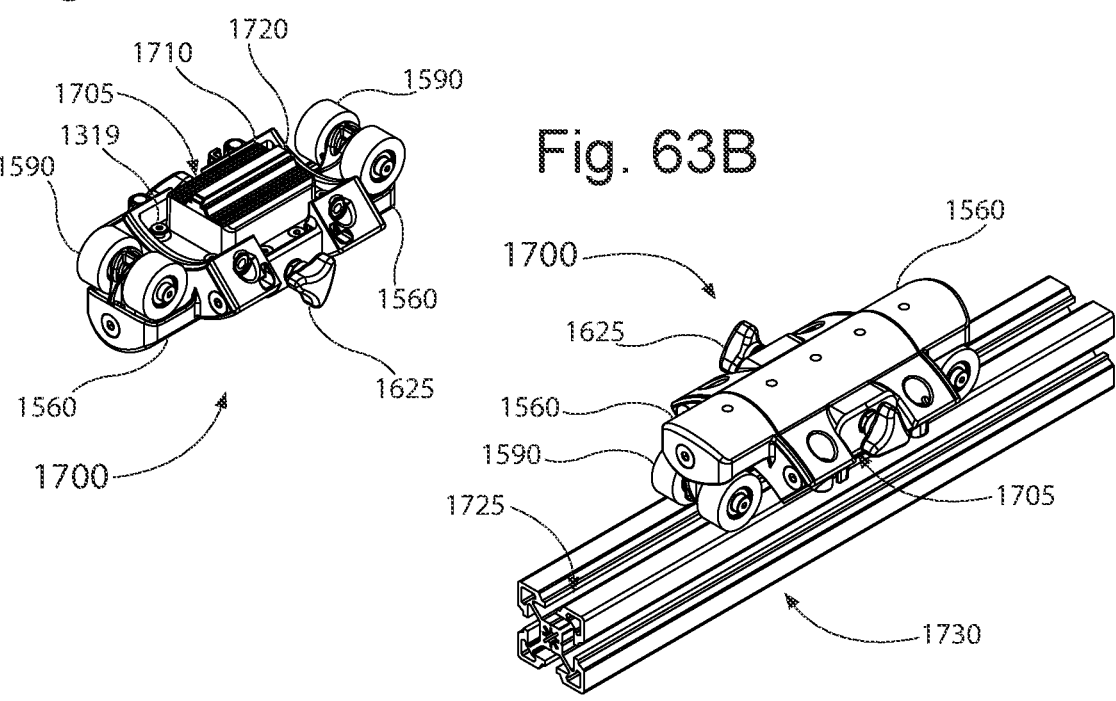
Fig. 63C
Fig. 63D
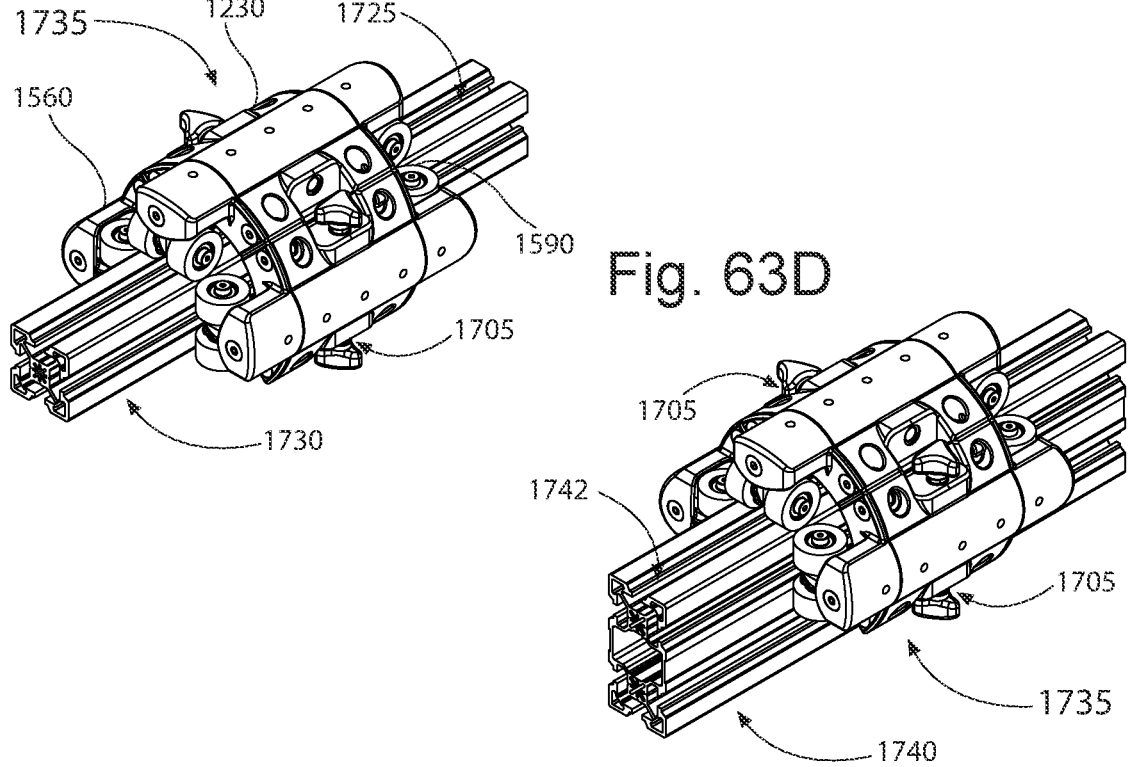

Fig. 96A
Fig. 96B
Fig. 96C
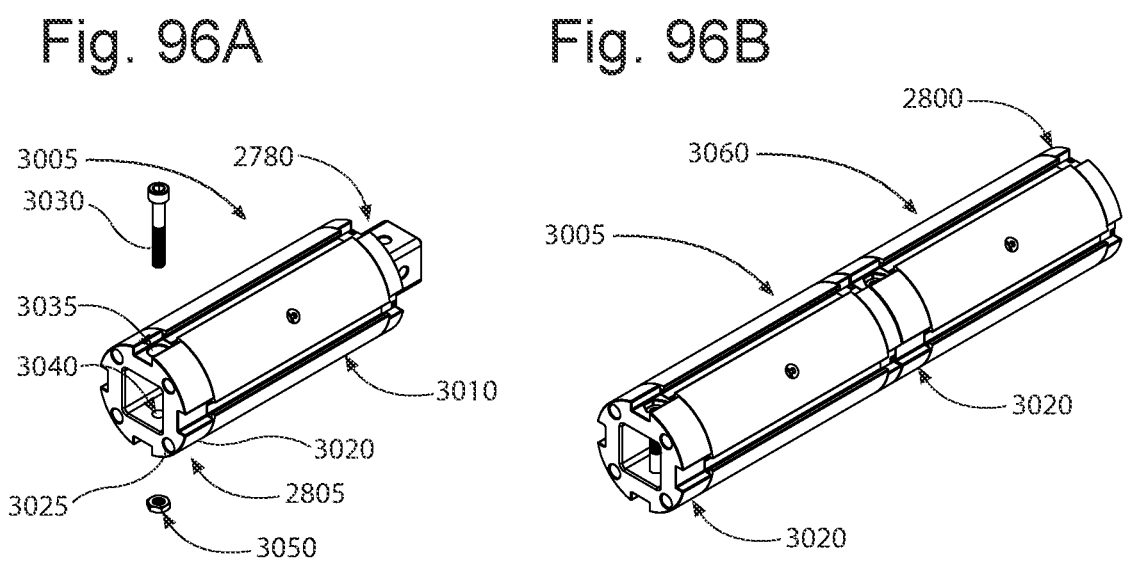
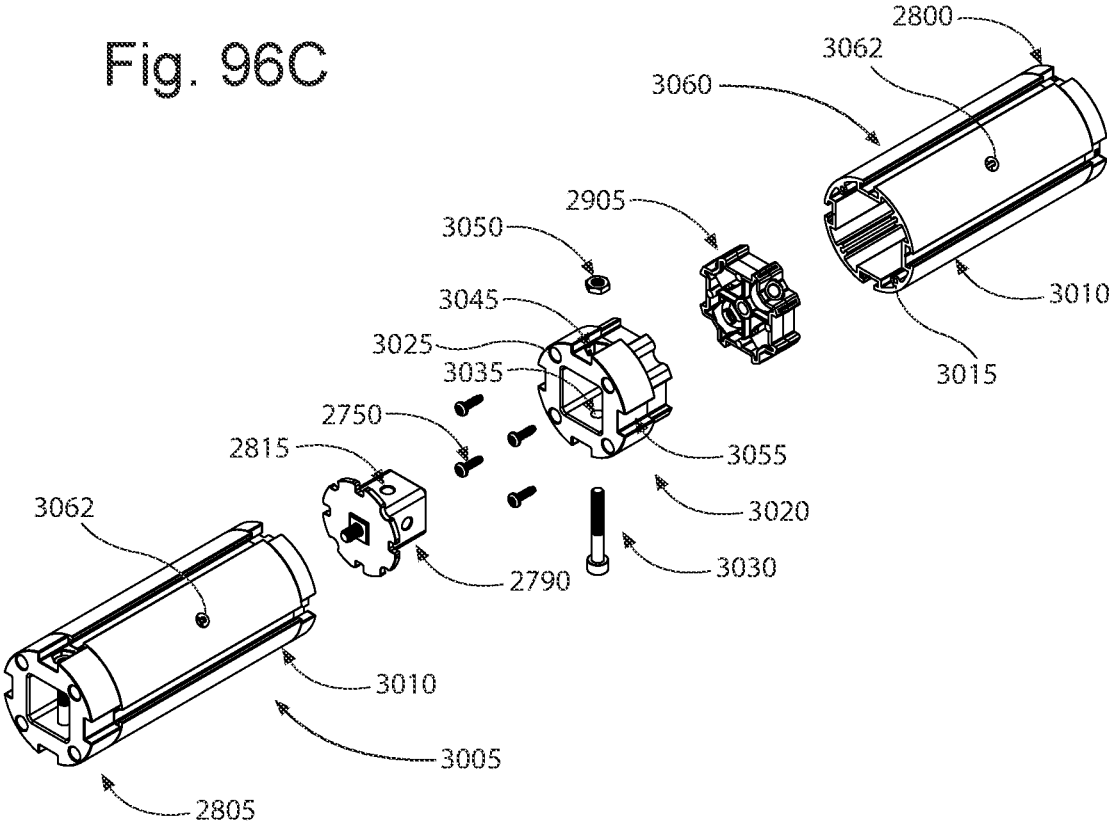

Fig. 119A
Fig. 119B
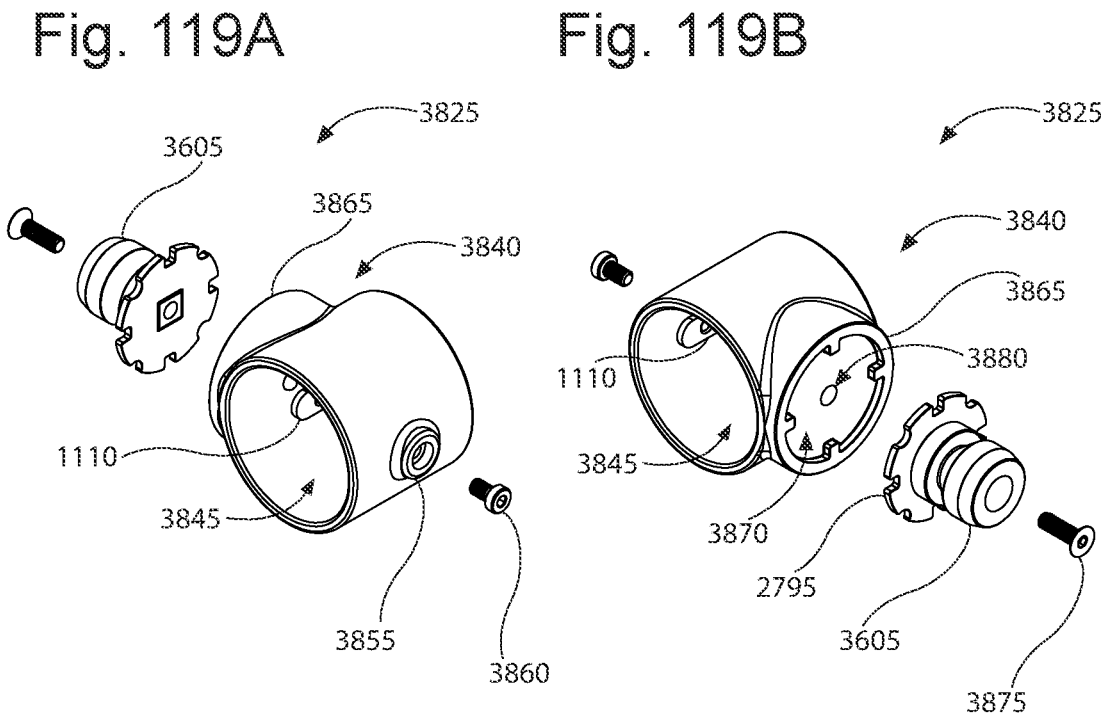
Fig. 119C
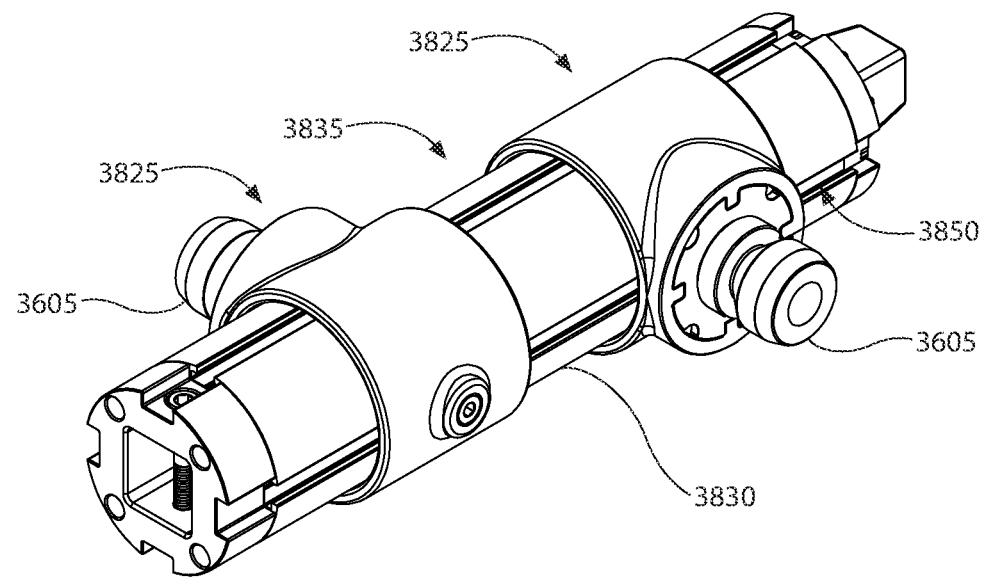

MODULAR UTILITY SYSTEM

CROSS-REFERENCE TO RELATED APPLICATIONS

This application is a continuation-in-part of U.S. patent application Ser. No. 17/805,815 filed Jun. 7, 2022, which is a continuation of U.S. patent application Ser. No. 16/138,422 filed Sep. 21, 2018, which is incorporated herein by reference in its entirety.

TECHNICAL FIELD

The present disclosure relates to the field of utility equipment and, in particular, to modular components for demountable engagement into various configurations of assemblies for use in engagement and/or support and/or operation and/or conveyance of equipment for multiple utility purposes.

BACKGROUND

Utility equipment of various forms is essential to every industry and can range vastly in both size and complexity in order to meet the particular needs of a selected industry. Irrespective of the industry, most utility equipment is designed to have a single function. Consequently, a variety of utility equipment is required to meet the various needs of a selected industry.

The filmmaking industry is one example of such an industry requiring various specialized utility equipment. Cinematic techniques in filmmaking, videography, and photography have increased in both scale and complexity. Such cinematic techniques depend on a wide range of utility equipment, in particular camera support equipment, that provide filmmakers with the technical means to create the camera shots needed for a scene or a cinematographic effect. Additionally, the necessary portability of film set equipment and properties of many kinds requires a large variety of carts, wheelbarrows, stands and the like to execute efficient movement around a working location.

Various types of camera and motion support equipment are available and are widely used by filmmakers and photographers. Some commonly used equipment include, for example, jibs or cranes to provide the ability to add vertical and sideways movement to a shot, and with the ability to achieve a high angle shot, depending on the size of the jib. Various types of dollies similarly range in size from the very large to compact systems to provide smooth rolling camera movement thereby enabling the addition of horizontal motion to a shot. Handheld and body-supported stabilizers and gimbals allow a smooth shot to be taken while the operator is walking, while maintaining the ability to control the pan and tilt movements of the camera. Sliders, for another example, are essentially a condensed, mountable version of a dolly on a supported track and provide smooth movement along a straight path.

Each type of camera support equipment is designed to allow certain camera angles or dynamic motion. In this way, each type of camera support equipment is designed to provide a particular function to achieve a particular type of shot, with consideration of the challenges presented by a particular filming location. The functionality and usability of each type of camera support equipment is therefore limited and often results in the need to employ multiple types of camera support equipment for a given project. The limited versatility of camera support equipment has meant that each type is typically used individually or can sometimes be used in various combinations in order to provide filmmakers with some options for achieving a scene or effect. These options, however, are difficult to orchestrate, often due to the limitations of the location and the typically large and bulky size of the equipment and the cumbersome nature of transporting and setting up of the equipment, requiring time, money, and effort.

Although current systems attempt to address challenges in portability and set-up/break-down of camera support equipment, there continues to be a need for systems that are easy to transport and to assemble, and further offer versatility and multi-functionality for supporting creative camera angles and motion without necessarily requiring a multitude of types of support equipment.

The limitations found with camera support equipment are common with utility equipment in other industries such as construction, staging and others.

SUMMARY

The present disclosure generally relates to modular utility system assemblies for engaging, supporting, manipulation of and operation of tools, equipment, instruments and other types of loads. More specifically, this disclosure pertains to sturdy and durable utility system assemblies for temporary use on a work site or location wherein the assemblies can be configured and quickly assembled by interconnecting and securely engaging a plurality of modular structural support components along with a selection modules designed for mounting, and optionally for operation, of tools or equipment or instruments, modules having rolling components such as wheels, castors and the like, end-capping modules, and other types of modules that may be useful in configuring such modular utility system assemblies. After the need for a modular utility system assembly has been satisfied and the assembly is no longer required on a work site or location, it can be quickly and easily dis-assembled into the individual modular elements that can be collected together for transport or storage.

One embodiment of the present disclosure relates to three types of elongate structural support components wherein the first type has a pair of opposed male ends, the second type has a male end and an opposed female end, and the third type has a pair of opposed female ends, wherein the male ends are configured for demountable engagement with the female ends. Each of the male ends comprises a cylindrical body with one or more linear set(s) of two spaced-apart prongs on the circumferential surface of the cylindrical body. Each of the female ends has a cylindrical receptacle with one or more linear channels for receiving therein the cylindrical body and the at least one linear set of prongs. The female ends are provided with locking assemblies for releasable engagement of the male ends.

According to one aspect, a cylindrical body of a male end may have two or more linear sets of two or more spaced-apart prongs wherein the linear sets are equidistantly spaced apart around the circumferential surface of the cylindrical body. According to another aspect, a cylindrical receptacle of a female end may have two or more equidistantly spaced-apart linear channels to receive therein the cylindrical body having two or more linear sets of prongs.

According to one aspect, the male ends of the first and/or second types of elongate structural support components may be rotatable within the female cylindrical receptacles of the second and/or third types of elongate structural support components. According to another aspect, the male ends of the first and/or second types of elongate structural support components may be fixed and securely engaged within the female cylindrical receptacles of the second and/or third types of elongate structural support components so that the male ends are not rotatable within the female receptacles.

According to another embodiment of the present disclosure, one or more of the three types of elongate structural support components may have an elongate structural element interposed the two opposing ends of the elongate structural support components. According to one aspect, the elongate structural element may be tubular or rod-like. According to another aspect, the elongate structural element may have a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

Another embodiment of the present disclosure relates to modules configured for demountable engagement of an imaging device and/or a sound recording device and/or a sound reproduction device and/or a lighting device and/or a light-directing device. Some modules may be provided with wheels or castors or rollers, and the like. Some modules may be provided with seats or caps or weight components. Some modules may be provided with hand grips or fixed foot pegs or adjustable foot pegs, end-caps, and the like. Some modules may have telescoping mechanisms whereby one of the ends may be controllably extended out of the modules and then controllably retracted into the modules. Some modules may comprise two mating components that can be used for clamping onto cylindrical components.

Another embodiment of the present disclosure pertains to mounting blocks to which may be engaged one or more male ends configured as disclosed herein. According to some aspects, the mounting blocks may be elbow-shaped, cubes, triangles, pyramids, hexagonal, octagonal, and the like.

Further embodiments of the present disclosure generally relate to kits of parts comprising various types of male connector components having concave bases configured for demountable engagement along the sides of cylindrical structural component or other component comprising a round surface, where provided for the demountable engagement of female end socket components at the end of another cylindrical structural components. The male connector components and compatible female-end socket components include generally square-shaped and octagonal-shaped male connector components, and generally square-shaped male connector components with tapered sides, configured for locked demountable engagement with generally square-shaped receptacles of female-end socket components. A kit of parts may additionally comprise generally cylindrical-shaped male connector components and generally square-shaped male connector components with rounded corners configured for rotational and/or locked demountable engagement with generally cylindrical-shaped female-end socket components. A kit of parts may additionally comprise one or more of a similarly configured male connector component having a flat base whereby it may be fastened to an end of a cylindrical structural component provided for demountable engagement with a compatible female-end socket component at the end of another cylindrical structural component.

Further embodiments of the present disclosure generally relate to roller carriage assemblies and sliding carriage assemblies and rail assemblies whereon the carriage assemblies are configured to be moved along and intermittently secured while demountably engaged with and supporting thereon one or more devices such as a camera, a light, a screen, a monitor, a microphone, a speaker, a sensor, a scanner, a tool, a power tool, and the like. The carriage assemblies enable an engaged device, tool, or other load to be moved horizontally, raised and lowered, and optionally fixedly retained on one or more track components of a rail assembly. Optionally, one or more clamping mechanisms may apply adjustable pressure of a friction pad against a track component to slow the movement or stop a carriage assembly along a rail assembly.

The various embodiments of roller carriage assembly or sliding carriage assembly are configured for engagement along a cylindrical rail assembly, or a square rail assembly, or a rectangular rail assembly, or an octagonal rail assembly wherein the rail assembly may comprise a single or parallel pair of elongate track components of a type, or a single series or two parallel series of elongate track components of a type assembled end to end where extended travelling distance on a rail assembly is required. A rail assembly may be supported by a base comprising a plurality of the cylindrical structural components and other components such as weight components as well as threaded foot components or threaded caster components on which the rail assembly can be adjustably levelled.

BRIEF DESCRIPTION OF THE DRAWINGS

These and other features of the disclosure will become more apparent in the following detailed description in which reference is made to the appended drawings, wherein:

FIG. 1 shows perspective views of an example of a male/receptacle closed-tube rotator module with one male component extending longitudinally from the closed-tube end, wherein

FIG. 3 shows a perspective view of an example of a 2-way closed-tube rotator hub assembly FIG. 3A, while

FIG. 4 is a side view of an example of a double-receptacle extension-tube rotator module (FIG. 4A)

FIG. 5 shows perspective views of the double-receptacle extension-tube rotator module shown in FIG. 4 configured into a 4-way hub assembly having two male member side-mount assemblies demountably engaged with the side walls of the extension-tube housing, wherein

FIG. 6 shows perspective views of closed-tube joiner hub assemblies wherein FIG. 6A shows a 3-way hub assembly having one joiner receptacle, a linearly aligned male component, and one male member side-mount assembly demountably engaged with the side wall of the joiner closed-tube housing, while FIG. 6B shows a 5-way hub assembly having one receptacle, a linearly aligned male component, and three male member side-mount assemblies;

FIG. 8 illustrates an example of a male/receptacle side-opening joiner module having one side-opening receptacle and a linearly aligned male member extension-tube end assembly, wherein

FIG. 9 illustrates an example of a double-male joiner module, wherein

FIG. 10 illustrates an example of a double-male extension-tube joiner module having at each end a male member extension-tube end assembly, wherein

FIG. 11 shows the double-male extension-tube joiner module from FIG. 10 reconfigured into a 6-way hub assembly, wherein

FIG. 12 illustrates an example of a double-male adapter joiner module, wherein

FIG. 13 illustrates examples of variants of side-mount bracket modules wherein FIG. 13A is an exploded perspective view of a 30° side-mount bracket module having a 30° angle male member mount bracket and an optional clamp bracket, FIG. 13B is an exploded perspective view of a multi-angle side-mount bracket module having two multi-angle male member mount brackets being demountably engaged with four bracket screws, FIG. 13C is a perspective view of an example of a 90° offset side-mount bracket module, and FIG. 13D is a perspective view of an example of a 45° offset side-mount bracket module;

FIG. 14 illustrates examples of variants of male member mounting block modules wherein

FIG. 15 shows an example of a 5° increment adjustable male member mount module wherein

FIG. 16 shows an example of a baseplate module in an assembly having two mounting brackets and three male member plate assemblies wherein

FIG. 17 shows another example of a baseplate assembly wherein

FIG. 18 shows perspective views of an example of a tray assembly, wherein FIG. 18A is a whole view, and FIG. 18B is a partial exploded view of the assembly, configured with four of a second example of double-receptacle extension-tube joiner modules;

FIG. 19 shows perspective views of an example of a desk assembly wherein

FIG. 20 shows perspective views of two examples of lighting mount modules wherein

FIG. 21 shows a perspective view of an example of a rail-rolling module FIG. 21A.

FIG. 23 shows perspective views of two examples of wheel modules wherein FIGS. 23A and 23B are a whole view and a partially exploded view, respectfully, of a wheel module assembly having a standard wheel attached by an axle bolt to a wheel-axle/receptacle side-opening joiner module, while FIGS. 23C and 23D are a whole view and an exploded view, respectfully, of a caster wheel module assembly;

FIG. 24 shows a whole perspective view and an exploded perspective view FIGS. 24A and 24B, respectively, of an example of a leveling foot module, while FIG. 24C is an exploded perspective view of an example of a foot plate module;

FIG. 25 shows a partially exploded perspective view and a whole perspective view FIGS. 25A and 25B respectively, of an example of a pivotable support module demountably engaged with a pad component, while FIG. 25C is a whole view of the pivotable support module demountably engaged with an example of a suction-cup component;

FIG. 26 shows perspective views of an example of a weight module assembly wherein

FIG. 27 illustrates an example of a telescoping extension module wherein

FIG. 28 illustrates an example of a grip end-cap module wherein FIG. 28A is a perspective view showing the outer sleeve of the module in a locked position, FIG. 28B is an exploded perspective view, FIG. 28C is an exploded perspective view showing the outer sleeve in the locked position, FIG. 28D is a top view showing the outer sleeve in an unlocked position, and FIG. 28E is a top view showing the outer sleeve in the locked position;

FIG. 29 shows perspective views of an example of a shell end-cap module mounted onto one of a first male/receptacle extension-tube rotator module wherein

FIG. 30 shows a whole perspective view and an exploded perspective view, FIGS. 30A and 30B, respectively of an example of a female dome pad end-cap module mounted onto the exemplary shell end-cap module shown in FIG. 29, while

FIG. 33 shows a whole perspective view and an exploded perspective view FIGS. 33A and 33B, respectively of a soft end-cap component.

FIG. 51C is a whole perspective view of the male end;

Figures 56A, 56B, 56C, 56D:
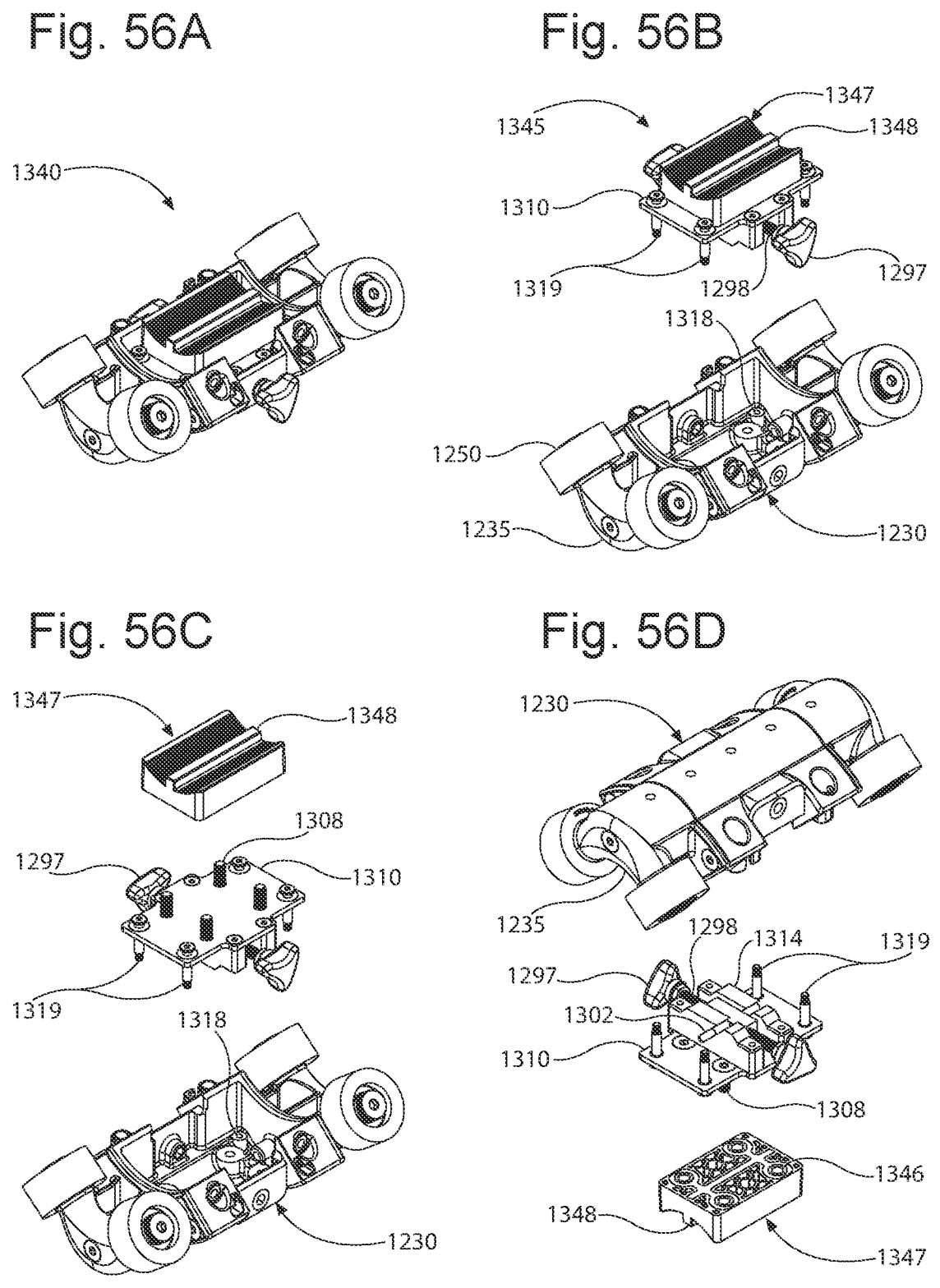

FIG. 56 shows a whole perspective view of a single-sided roller carriage assembly with a channel-guide adjustable clamping mechanism FIG. 56A, and FIGS. 56B, 56C and 56D are partially exploded perspective views of the single-sided roller carriage assembly and channel-guide adjustable clamping mechanism;

FIG. 60 shows a whole perspective view and an exploded perspective view FIGS. 60A and 60B, respectively, of a multidirectional component mount at a parallel setting.

FIG. 63 shows perspective views from the bottom and from the top, FIGS. 63A and 63B, respectively of a single-sided square track roller carriage assembly with a square track channel-guide adjustable clamping mechanism, and FIGS. 63C and 63D are whole perspective views of a three-sided square track roller carriage assembly with two square track channel-guide adjustable clamping mechanisms;

FIG. 77 is a whole perspective view of a height-adjustable dual rail track dolly assembly comprising two parallel rails whereon each is engaged a three-sided roller carriage assembly with two side mount brackets and a device mount plate spanning between;

FIG. 93 is a whole perspective view of a four-channel cylindrical structural component module FIG. 93A, while

FIG. 96 is a whole perspective view of a fixed square socket/straight square through-hole male end module FIG. 96A, while FIGS. 96B and 96C are a whole perspective view and a partially exploded perspective view, respectively, of the fixed square socket/straight square through-hole male end module shown in FIG. 96A demountably engaged by the straight square through-hole male end with a fixed square socket/end cap module;

FIG. 112 shows a whole perspective view and an exploded perspective view FIGS. 112A and 112B, respectively, of a cylindrical sloped neck indexing male side mount configured for demountable engagement with a sloped clamp socket component.

FIG. 119 shows exploded perspective views of a one-way male side mount collar FIGS. 119A and 119B, and FIG. 119C is a whole perspective view of two one-way male side mount collars demountably engaged with a fixed square socket/straight square through-hole male end module;

FIG. 120 shows a partially exploded perspective view of a four-way male side mount collar with a cylindrical sloped neck connector component FIG. 120A, and FIG. 120B is a whole perspective view of the four-way male side mount collar and four cylindrical sloped neck connector components demountably engaged with the fixed square socket/straight square through-hole male end module;

Figure 121A:
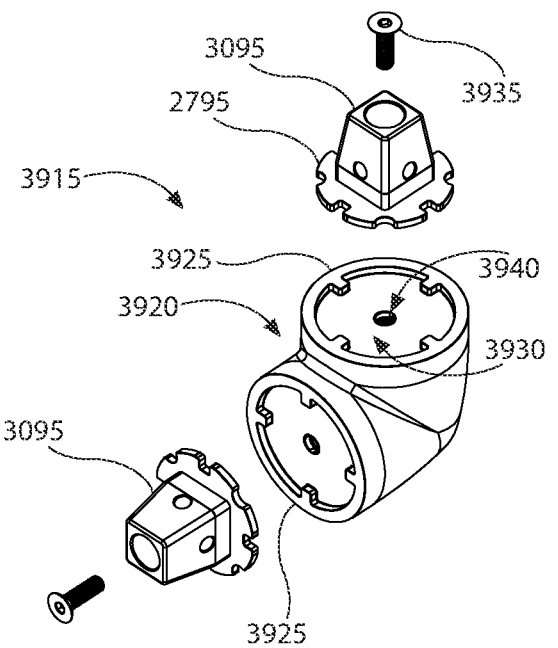
Figure 121B:
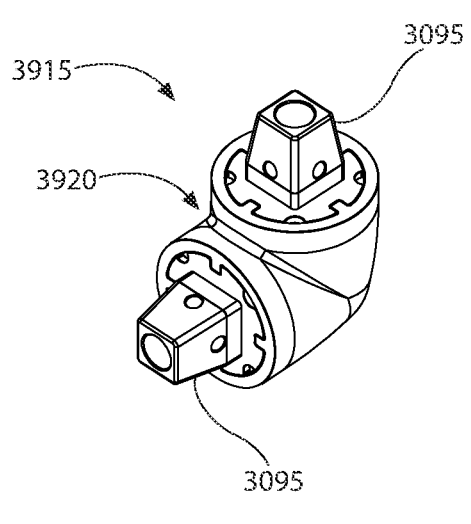
Figure 121C:
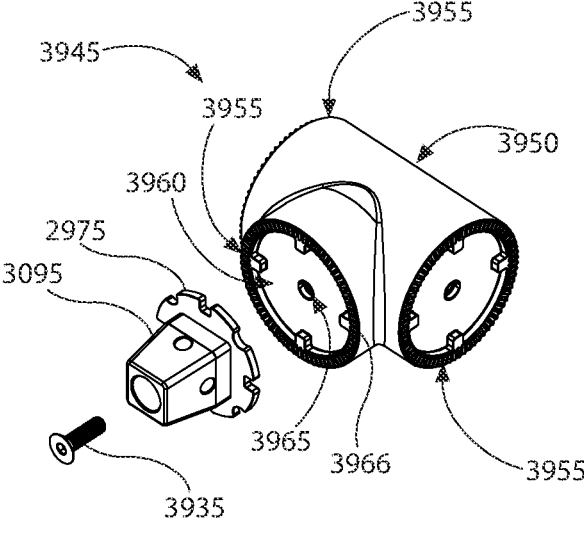
Figure 121D:
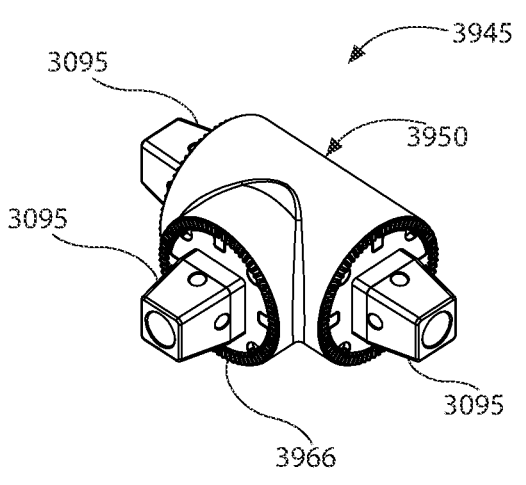
Figure 122A:
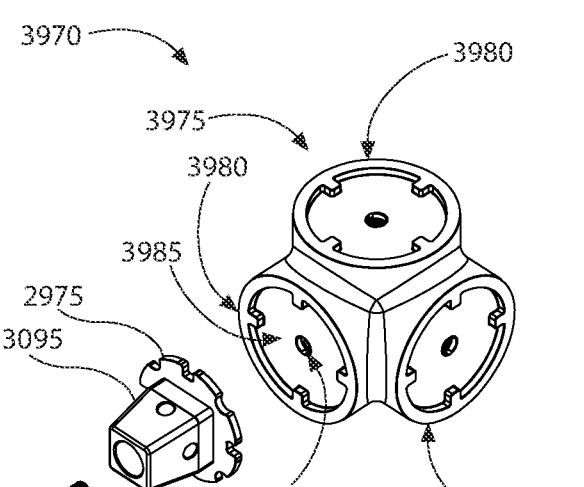
Figure 122B:
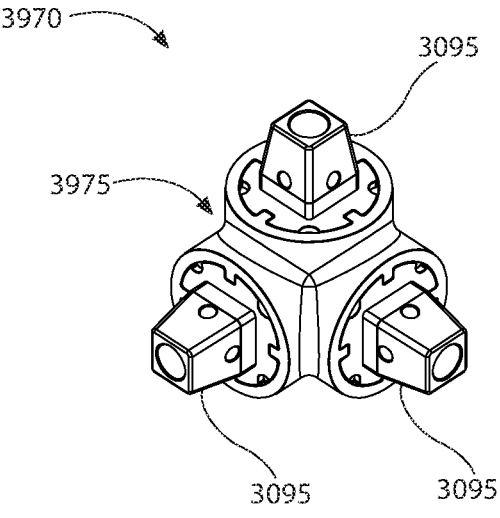
Figure 122C:
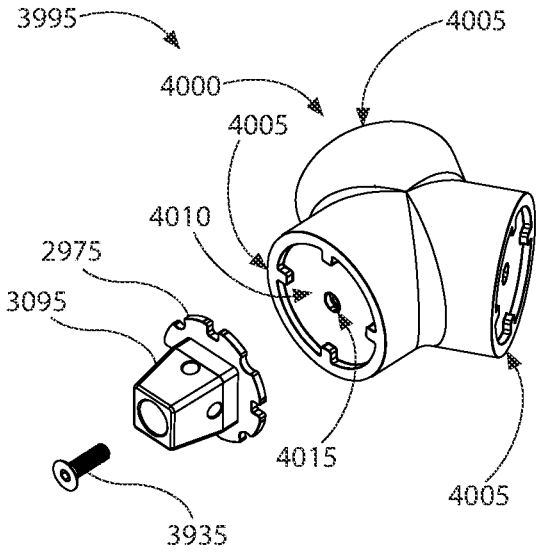
Figure 122D:
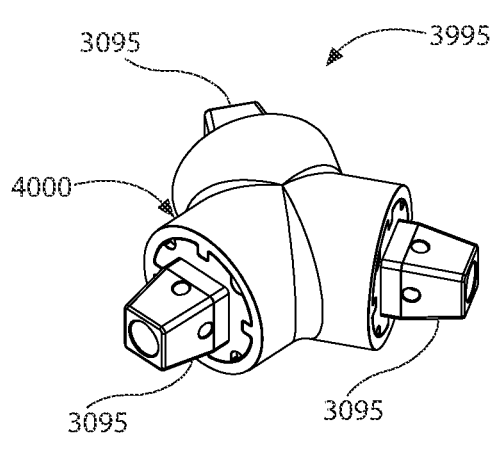
Figure 123A:
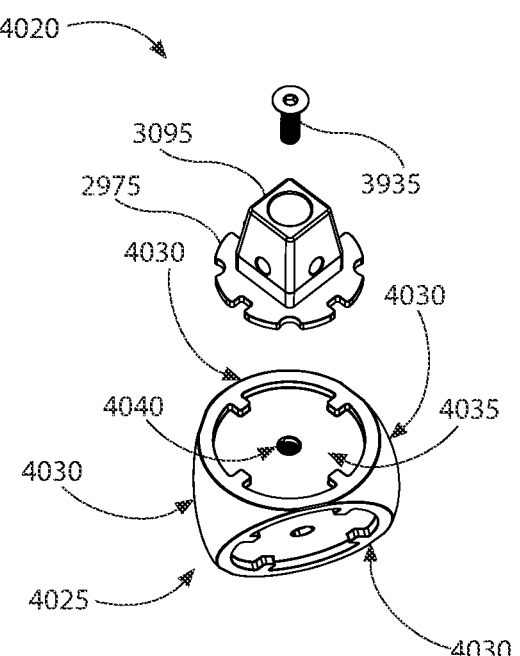
Figure 123B:
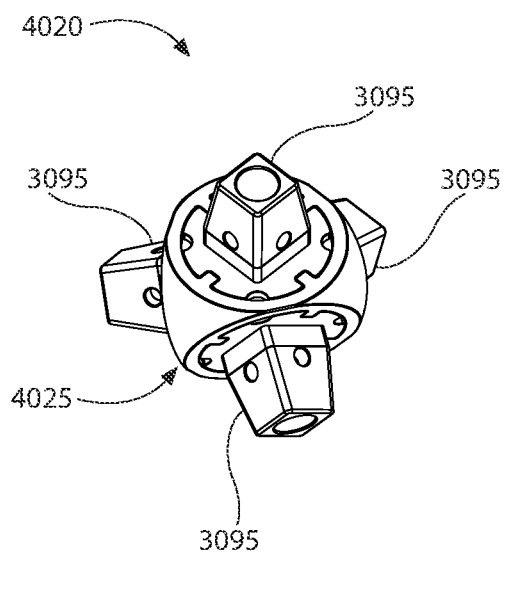
Figure 123C:
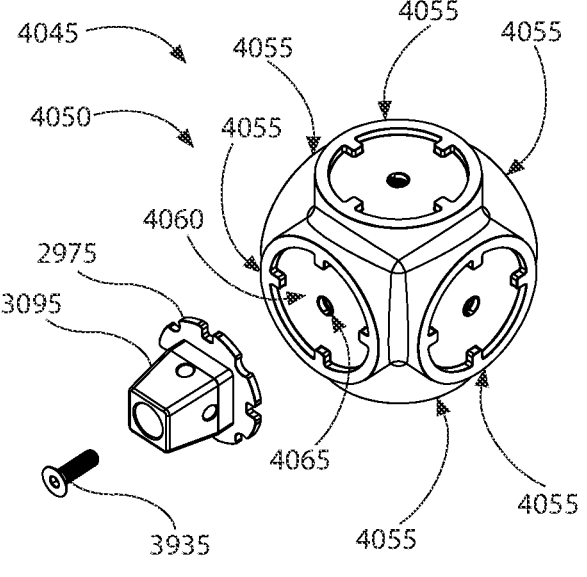
Figure 123D:
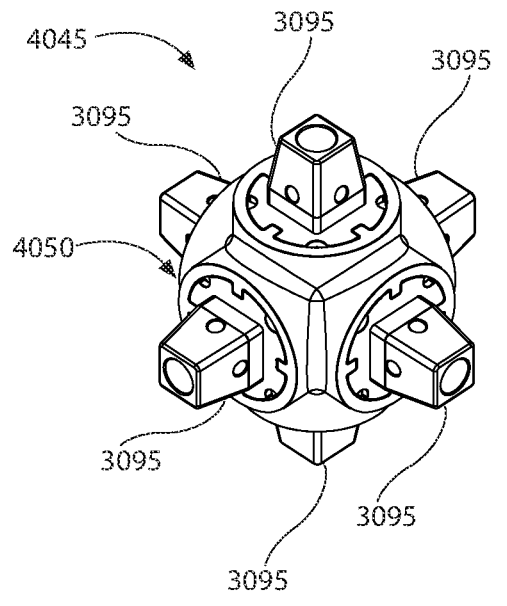
Figure 124A:
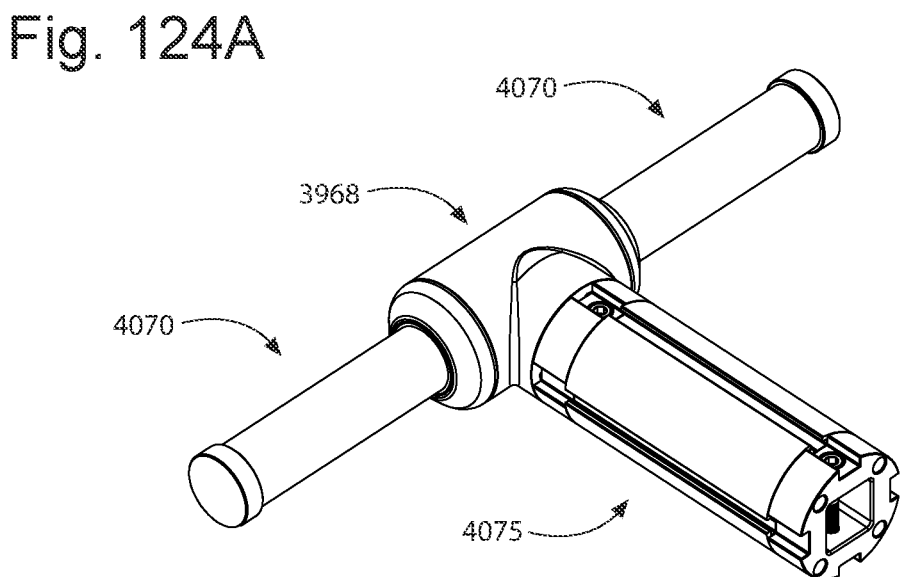
Figure 124B:
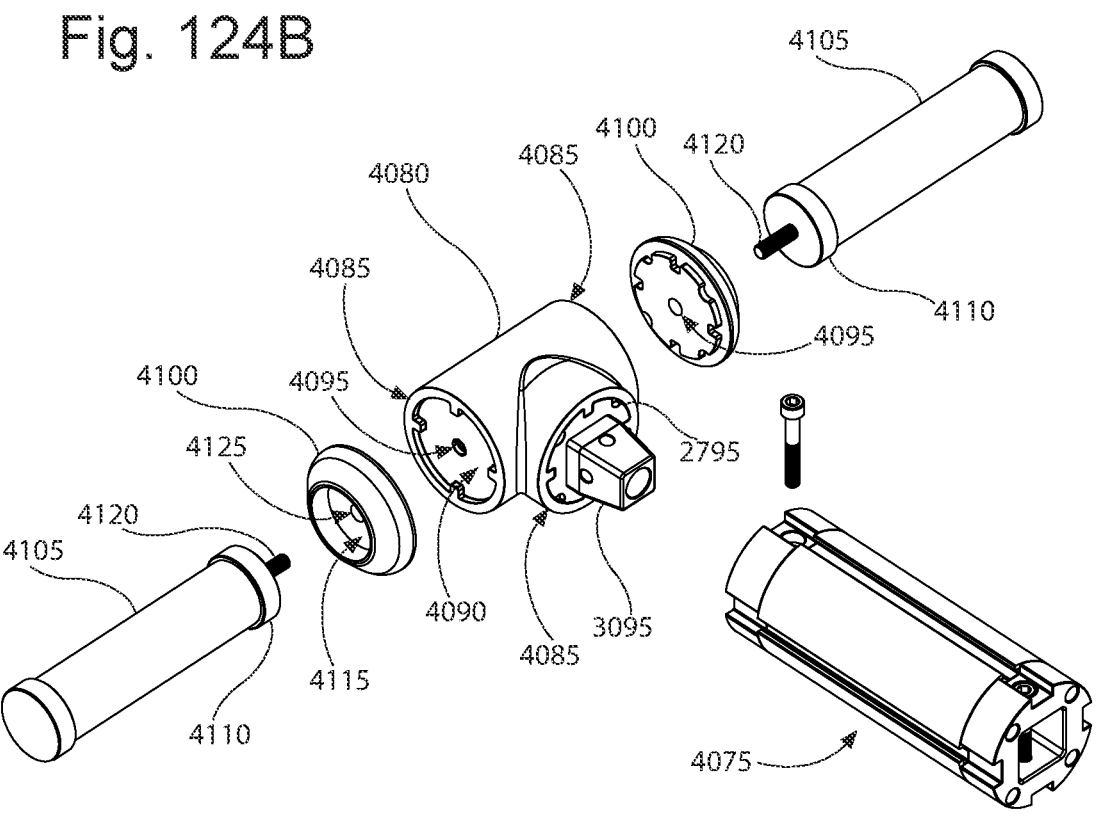
Figures 125A, 125B:
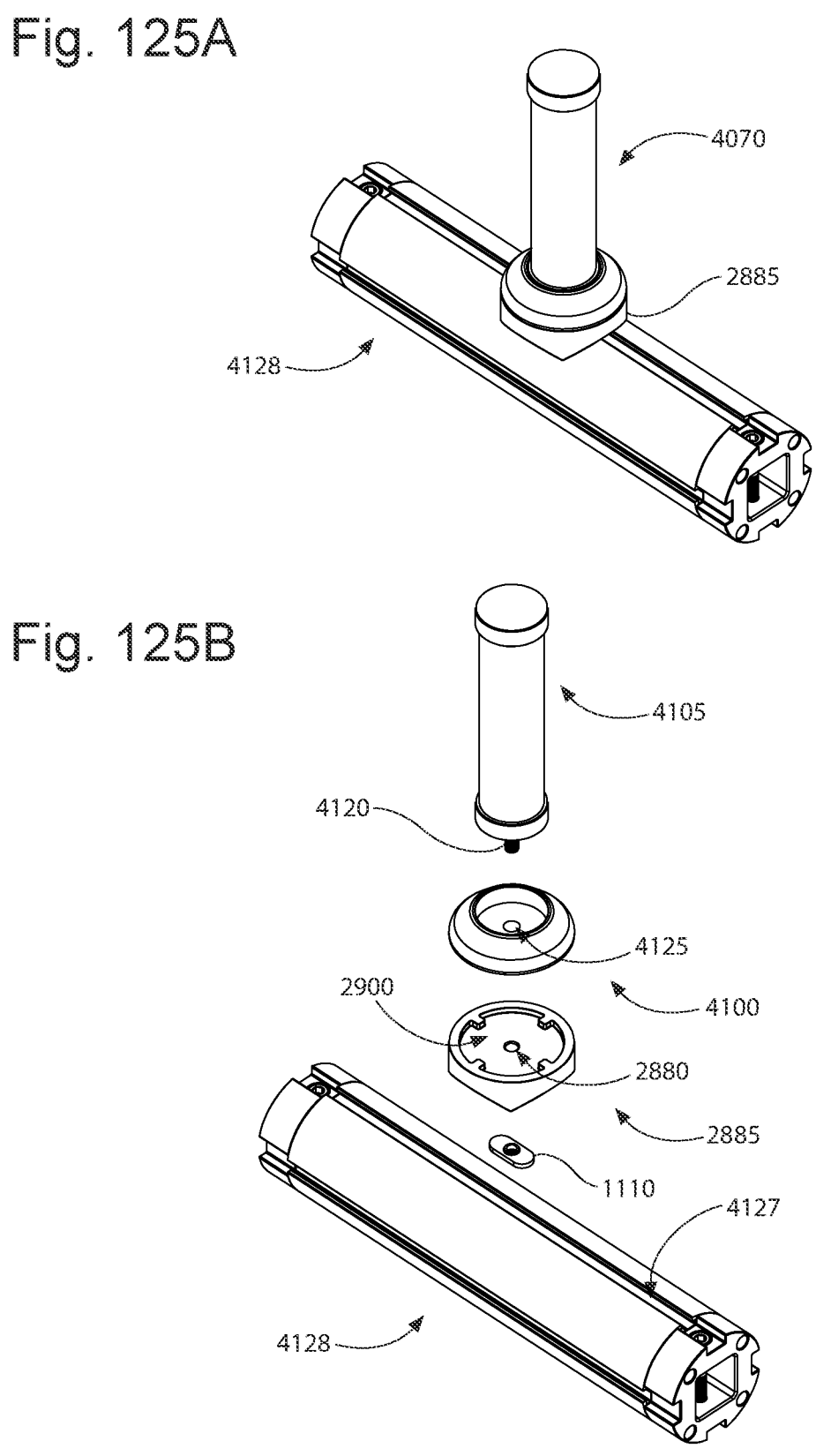
Figure 126:
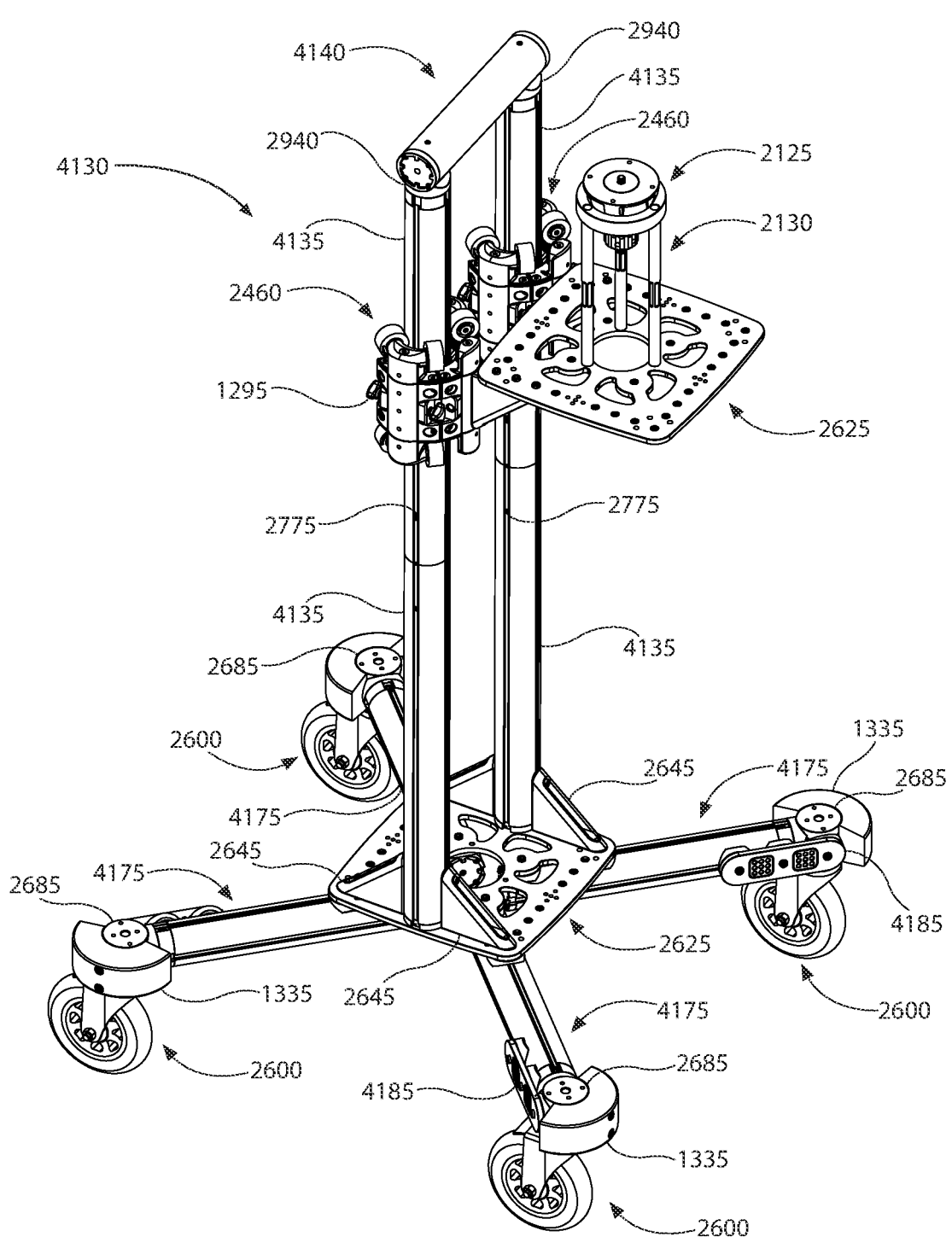
Figure 127:
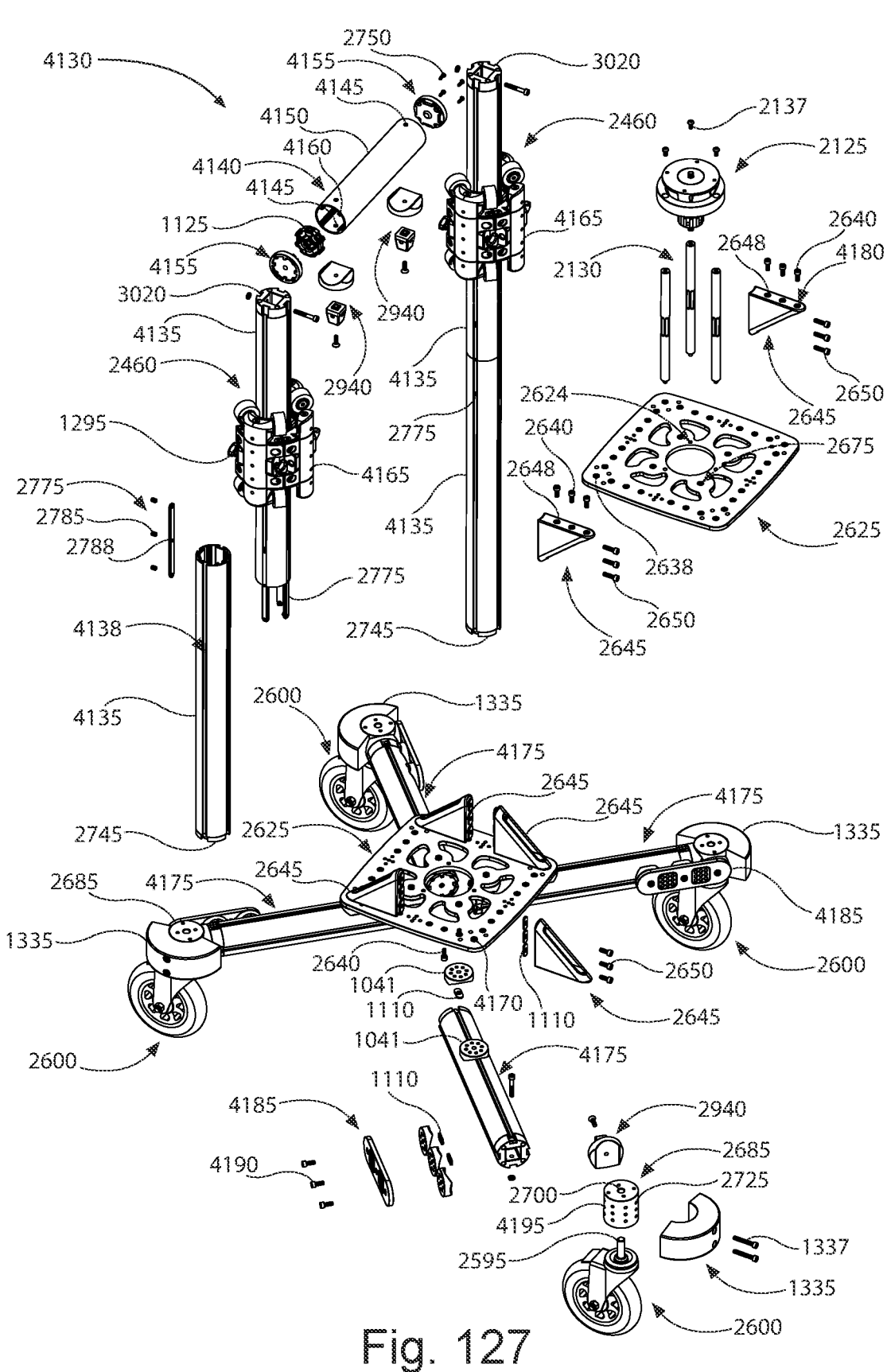
Figure 128A:
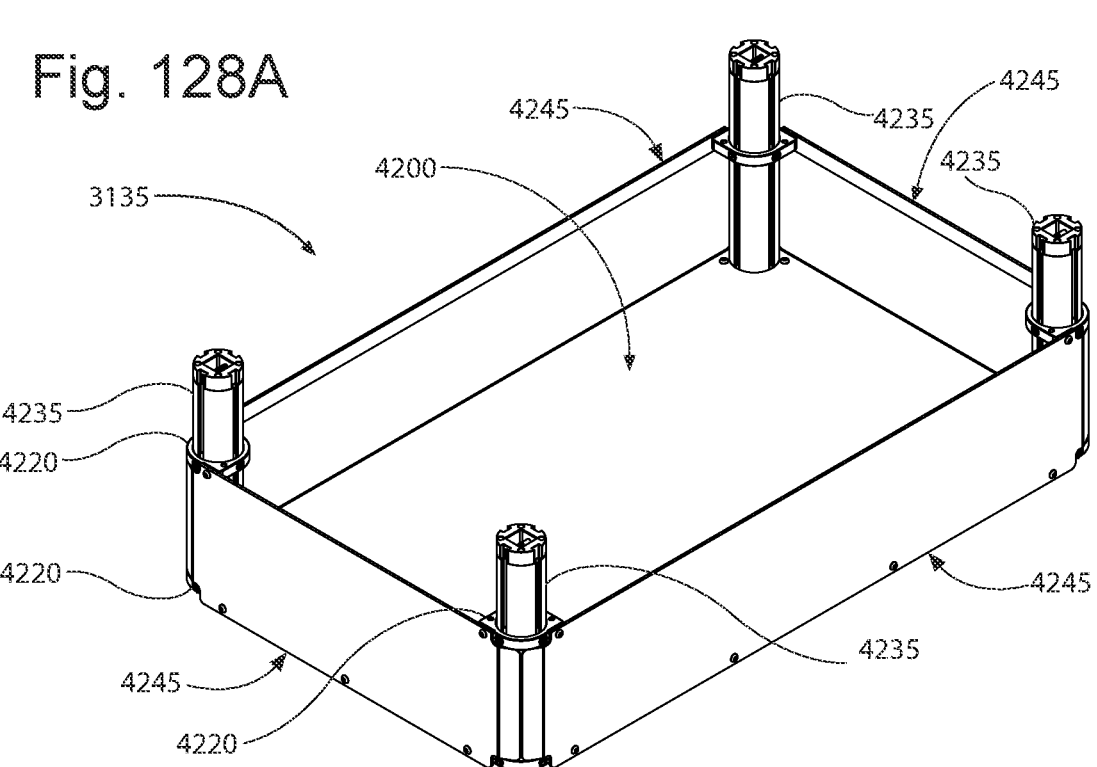
Figure 128B:
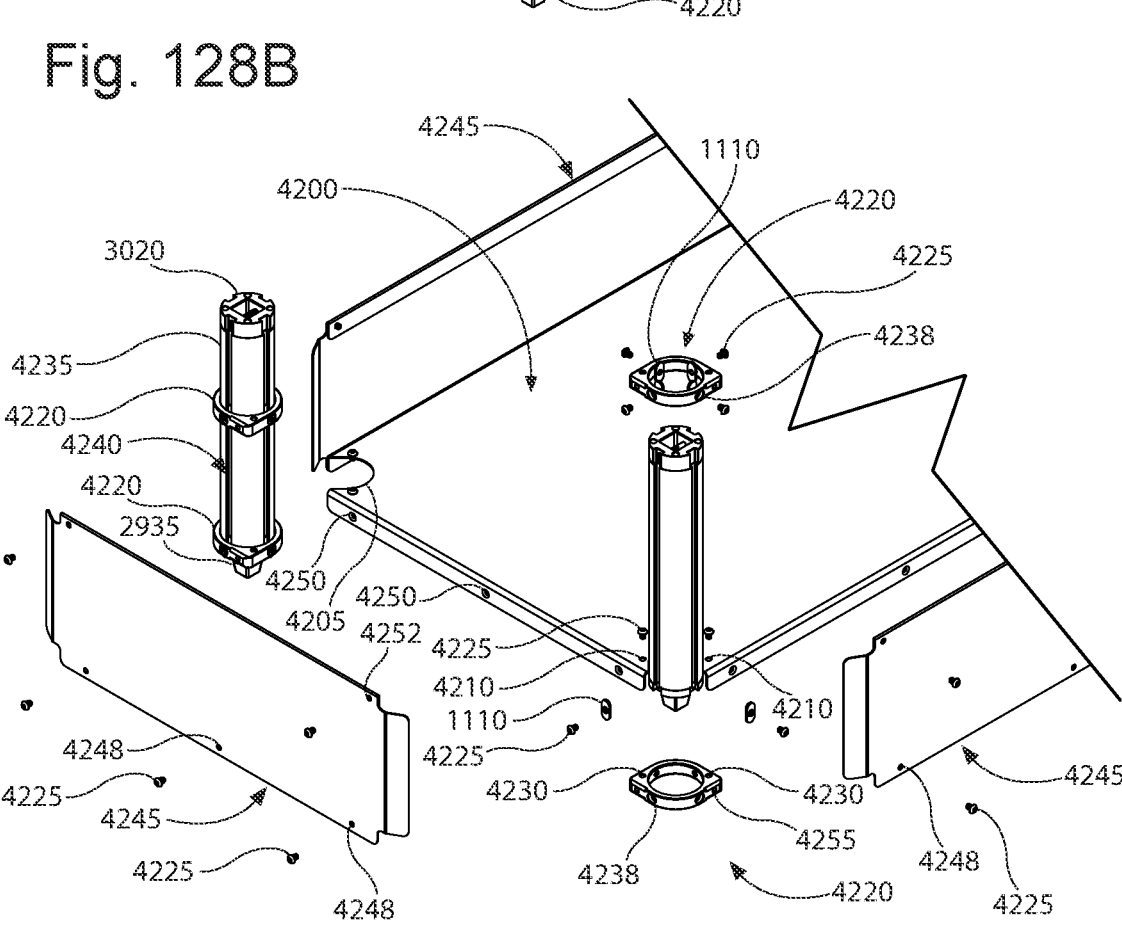
Figure 129:
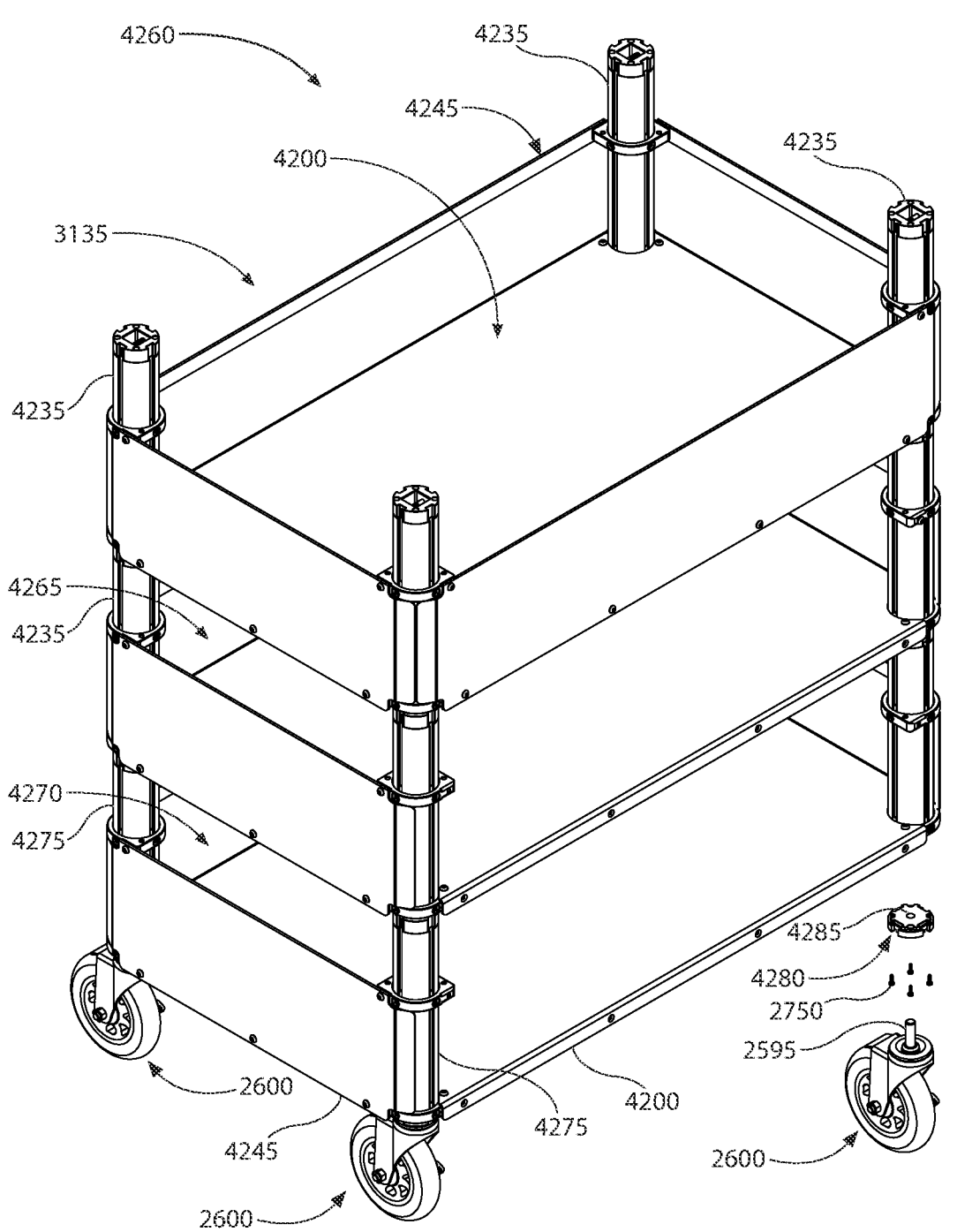
Figure 130:
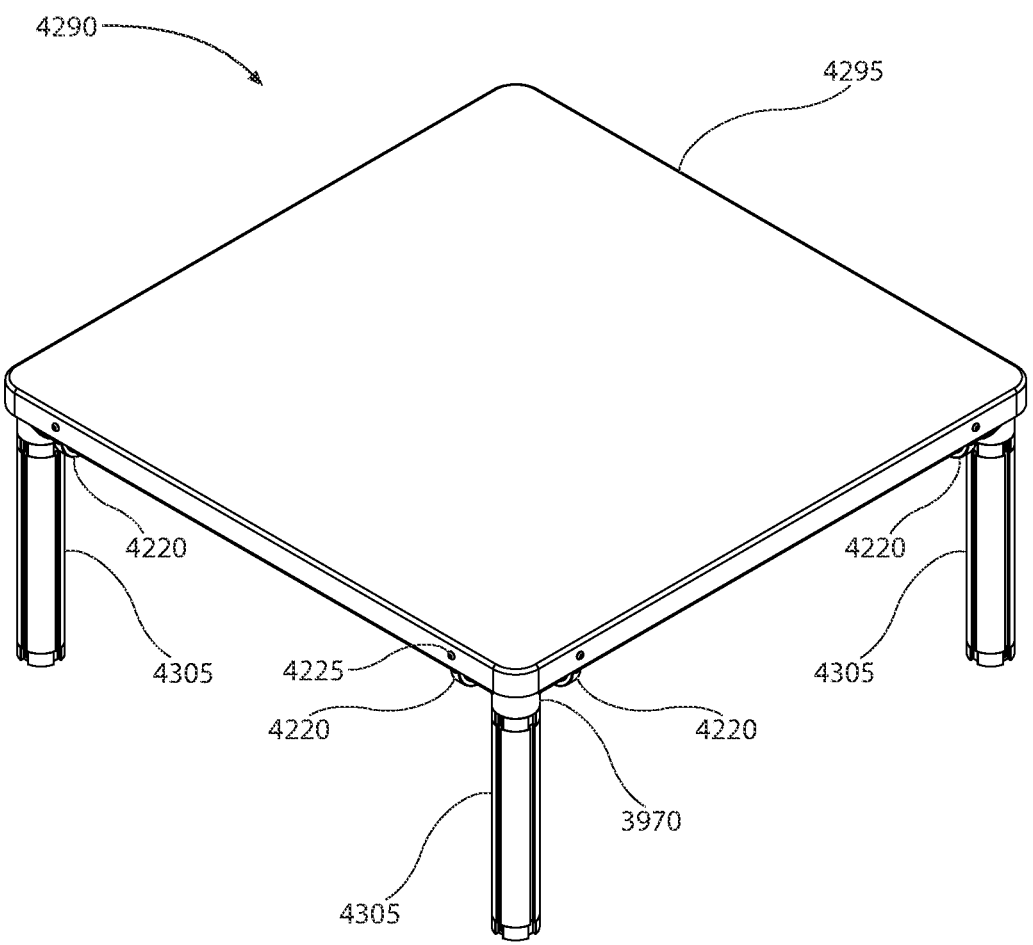
Figure 131:
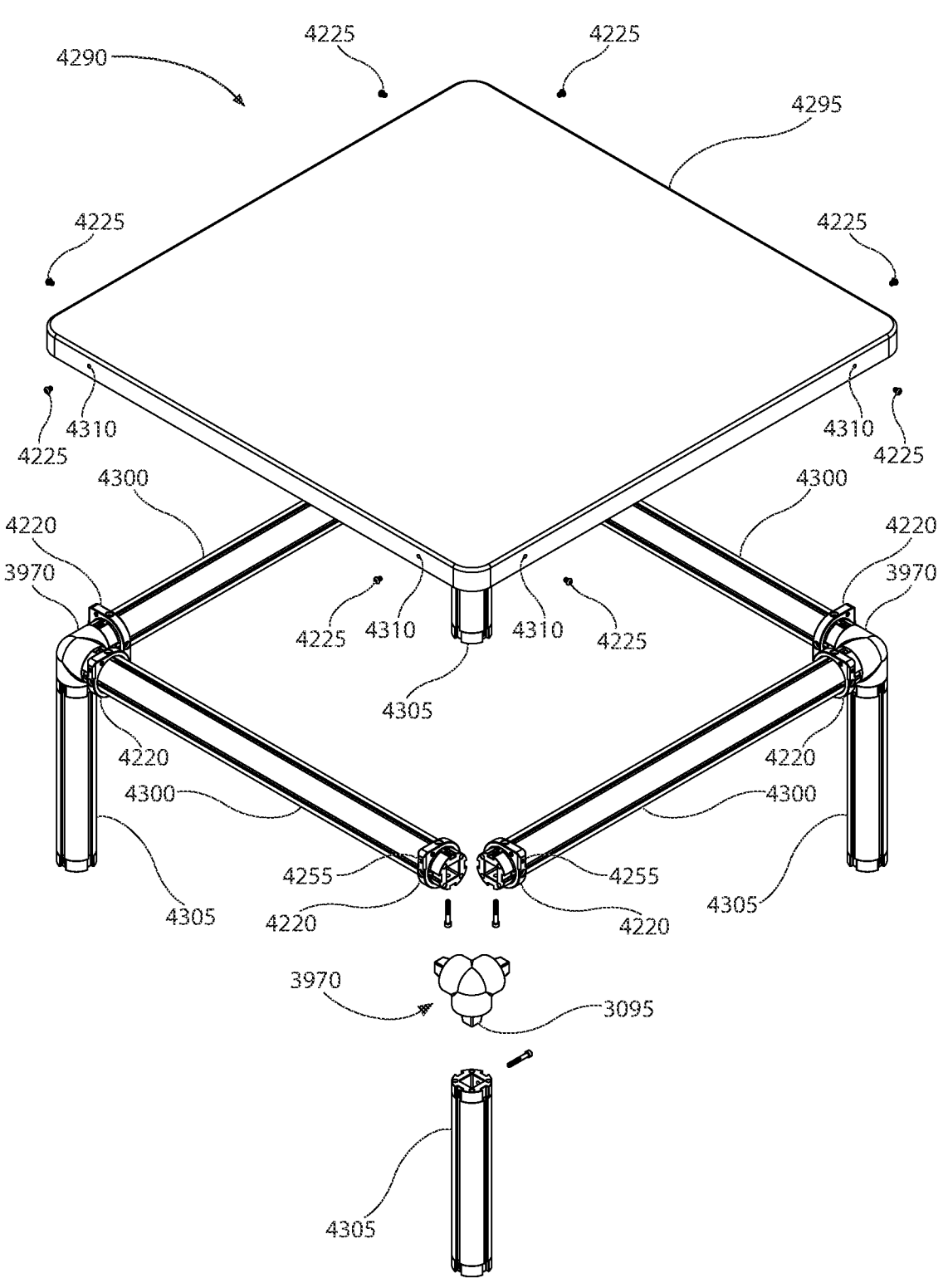

FIG. 121 shows an exploded perspective view and a whole perspective view FIGS. 121A and 121B, respectively, of a two-way male mount junction module with two tapered square through-hole connector components, and FIG. 121C is an exploded perspective view of a three-way male mount indexing T-junction module with one tapered square through-hole connector component, while FIG. 121D is a whole perspective view of the three-way male mount indexing T-junction module with three tapered square through-hole connector components;

FIG. 122 shows an exploded perspective view of a three-way male mount corner-junction module with one tapered square through-hole connector component FIG. 122A, while FIG. 122B is a whole perspective view of the three-way male mount corner-junction module with three tapered square through-hole connector components, and FIG. 122C is an exploded perspective view of a three-way male mount Y-junction module with one tapered square through-hole connector component, while FIG. 122D is a whole perspective view of the three-way male mount Y-junction module with three tapered square through-hole connector components;

FIG. 123 is an exploded perspective view of a four-way male mount pyramidal-junction module with one tapered square through-hole connector component FIG. 123A, while FIG. 123B is a whole perspective view of the four-way male mount pyramidal-junction module with four tapered square through-hole connector components, and FIG. 123C is an exploded perspective view of a six-way male mount cubic-junction module with one tapered square through-hole connector component, while FIG. 123D is a whole perspective view of the six-way male mount cubic-junction module with six tapered square through-hole connector components;

FIG. 124 shows a whole perspective view and a partially exploded perspective view FIGS. 124A and 124B, respectively, of a three-way male mount T-junction module demountably engaged with two handle modules and a socket module;

FIG. 125 shows a whole perspective view and a partially exploded perspective view FIGS. 125A and 125B, respectively, of a handle module demountably engaged by a male side mount to a cylindrical structural component of a socket module;

FIG. 126 is a whole perspective view of a second example of a dual vertical cylindrical rail dolly assembly comprising four-channel cylindrical structural component modules and a no-channel cylindrical structural component module and two component mount plates;

FIG. 127 is a partially exploded perspective view of the dual vertical cylindrical rail dolly assembly shown in FIG. 126;

FIG. 128 shows a whole perspective view and a partially exploded cutaway perspective view FIGS. 128A and 128B, respectively, of a stackable tray assembly;

FIG. 129 is a partially exploded perspective view of a utility cart assembly comprising three stackable tray assemblies on four casters;

FIG. 130 is a whole perspective view of a table assembly comprising a platform component demountably engaged by collars to four double fixed square socket modules;

FIG. 131 is a partially exploded perspective view of the table assembly shown in FIG. 130.

DETAILED DESCRIPTION

Definitions

Unless defined otherwise, all technical and scientific terms used herein have the same meaning as commonly understood by one of ordinary skill in the art to which this disclosure relates.

As used herein, the term "about" refers to an approximately +/−10% variation from a given value. It is to be understood that such a variation is always included in any given value provided herein, whether or not it is specifically referred to.

As used herein, the term "perspective view" refers to a three-dimensional view of a component or a module or an assembly disclosed herein that portrays height, width, and depth of the component or module or assembly for a more realistic image and representation.

As used herein, the term "top view" refers to an illustration of a component or a module or an assembly that looks directly down on the top surface of the component or module or assembly.

As used herein, the term "back view" refers to an illustration of a component or a module or an assembly that looks horizontally and directly at the rear of the component or module or assembly.

As used herein, the term "front view" refers to an illustration of a component or a module or an assembly that looks horizontally and directly at the front of the component or module or assembly.

As used herein, the term "side view" refers to an illustration of a component or a module or an assembly that looks horizontally and directly at a side of the component or module or assembly.

As used herein, the term "bottom view" refers to an illustration of a component or a module or an assembly that looks directly up on the bottom surface of the component or module or assembly.

As used herein, the terms "rotator module" or "rotator assembly" mean a component or assembly that is configured for demountable engagement with another module or assembly with a controlled rotational functionality whereby a structurally secure and stable connection is provided between the two modules or assemblies. A rotator module may comprise: (i) one rotator receptacle and an opposed male end; (ii) two opposed rotator receptacles; or (iii) one rotator receptacle and an opposed joiner receptacle, separated by a cylindrical tube or rod, or a square tube or rod, or a rectangular tube or rod, or a trapezoidal tube or rod, or a triangular tube or rod, or a hexagonal tube or rod, or an octagonal tube or rod, or a decagonal tube or rod, or an I-shaped tube or rod wherein the tube or rod may be of varying lengths to provide varying lengths of extension between the receptacles, or between the receptacles and male ends. Certain rotator modules defined as "hub module" or "hub assembly", may be configured to provide pivotable and lockable angular interconnection points for a plurality of modules within an assembly system.

As used herein, the terms "joiner module" or "joiner assembly" mean a component that is configured to provide a demountable structural connection and extension between selected modules. A joiner module may comprise: (i) one joiner receptacle and an opposed male end; (ii) two opposed joiner receptacles; or (iii) two male ends, which are separated by a cylindrical tube or rod, or a square tube or rod, or a rectangular tube or rod, or a trapezoidal tube or rod, or a triangular tube or rod, or a hexagonal tube or rod, or an octagonal tube or rod, or a decagonal tube or rod, or an I-shaped tube or rod wherein the tube or rod may be of varying lengths to provide varying lengths of extension between the joiner receptacles, or between the joiner receptacles and male ends, or between the male ends. Certain joiner modules defined as "hub module" or "hub assembly" may be configured to provide pivotable and lockable angular interconnection points for a plurality of modules within an assembly system.

As used herein, the terms "hub module" or "hub assembly" mean a component or assembly that is configured to provide a structural angular interconnection point between selected modules. A hub module or assembly may comprise multiple male members and/or receptacles in various numbers and orientations to provide a variety of structural configuration options. Hub modules and hub assemblies may be defined, according to some embodiments, to be of a group of modular components wherein each module or assembly is configured for a different structural requirement having a different number and orientations of male members and/or receptacles. According to some embodiments, hub modules and hub assemblies may be defined as a modular configuration comprising a demountable assembly of one or more male members with other modules such as, for example, a joiner module or a rotator module, to thereby provide a particular function to the hub modules or hub assemblies and whereby direct structural demountable connections can be made by the added male members.

As used herein, the term "male member mount modules" means a category of modules, which include male member side-mount bracket modules and male member mounting block modules, having a demountable engagement mechanism for fixed or pivotable incorporation into an assembly, allowing for special-function hub assemblies.

As used herein, the terms "tool support module" and "load support module" mean a category of modules having a demountable engagement mechanism for fixed or pivotable incorporation into an assembly wherein the tool support module or load support module directly interface with a selected tool or load. A tool support assembly and load support assembly may be configured by a user for pivotable or fixed attachment of a selected tool or load to the assembly.

As used herein, the terms "baseplate module" and "baseplate assembly" mean a module or assembly configured for stable and secure demountable engagement with a camera, a microphone, or other tool or supported load.

As used herein, the terms "tray module" or "tray assembly" refer to a component that is configured to provide a pivotable or fixed box-support function or tray-support function for transporting equipment, properties, materials, supplies, and the like around a worksite or other location. Alternatively, a tray module or tray assembly may be used as a shelving system, or a table, or a staging platform.

As used herein, the terms "table module" or "table assembly" or "desk module" or "desk assembly" or "shelf module" or "shelf assembly" refer to a component or modular assembly that provides a table or workstation or shelving configuration, or alternatively may be used as a staging platform.

As used herein, the term "lighting mount module" refers to a component or modular assembly that may be incorporated into an assembly to provide a lighting mount spigot or other attachment means for demountable engagement with standard lighting equipment or other similar loads.

As used herein, the term "base modules" means a category of modules having a demountable engagement mechanism for fixed or pivotable attachment into an assembly to provide roller modules, or wheel modules, or counterbalance/base weight modules, or foot modules, or extendable support modules for an assembly.

As used herein, the terms "rail-rolling module" means a modular assembly configured with two pairs of inline wheel assemblies to provide a rolling or sliding function on a rail track assembly.

As used herein, the terms "rail-surround rolling module" means a modular assembly configured with two opposed sets of two pairs of inline wheel assemblies configured to provide a rolling or sliding function on a rail track assembly.

As used herein, the term "rail track assembly" refers to a modular assembly configured to receive and support thereon a rail-rolling module or alternatively, a rail-surround rolling module to provide a desired pathway for transport therealong of a support assembly. Rail track assemblies may be straight or curved, and may optionally have flexible lengths to enable assembly of desired curves and curvilinear configurations.

As used herein, the term "wheel module" means a modular assembly having a fixed or alternatively a pivotable wheel, for demountable engagement into a support assembly to provide the support assembly with a rolling functionality. The wheels may be pneumatic, solid rubber, plastic, or foam.

As used herein, the terms "weight module" and "weight assembly" refer to a component or modular assembly that provides an operational counterweight, base weight, or weighted foot module functionality within a support assembly. Weight modules and weight assemblies can be configured in a variety of sizes, weights, and modules to provide a diverse range of support options.

As used herein, the term "telescoping extension module" means a component providing a two-way structural extension having a length-adjustment mechanism to enable extension and retraction of the linear length of the module.

As used herein, the term "leveling foot module" means a component for assemblies requiring a foot component with a height-adjustment mechanism to facilitate configurations of assemblies to be positioned on uneven surfaces or terrain.

As used herein, the term "end-cap modules" means a category of modules having a demountable engagement mechanism to provide a terminus and a grip function or a handle function or a foot function or a pad function or a bumper function or a cap function, that may be incorporated into a structural support assembly.

As used herein, the term "seat module" means a modular assembly with a seat component for incorporation into a structural support assembly where there is a requirement for an onboard operator such as in a ride-along dolly assembly, or alternatively, as a component of a stool, bench, or workstation assembly.

As used herein, the term "unit scale" refers to the scalable units of measure within which the relative proportions of the configurable modular components of a system may be universally constructed to allow cross-compatibility of the modules, and in any stated values used to inform cross-compatibility and not to be intended to limit the sizes or relative proportions of a system of the present disclosure. The units of measure may be in system format units-of-scale, metric format, or imperial format.

As used herein, the term "system format" means shared-design characteristics of scale and demountable engagement features of a group of modules disclosed herein, wherein each of the modules comprises similar or compatible mechanisms to facilitate demountable engagement with each of the other modules, and which may optionally share a system-wide unit scale.

The modular utility and support assemblies disclosed herein comprise a plurality of modules that may be demountably engaged into a wide assortment of combinations to thereby form assemblies that can be used in various stationary and mobile load-bearing equipment and materials support capacities. The modularity of the systems allows them to be disassembled into individual modular assemblies and/or components to facilitate ease of transport and storage. As well, the modularity of the systems disclosed herein enables multi-functionality in that the individual modules can be easily configured into one type of assembly, and then quickly and easily broken down for transport and/or storage, and then demountably engaged into new configurations of different types of assemblies with different types of functionalities.

The modular components disclosed herein generally comprise a demountable engagement mechanism that enable the modules to be quickly, easily, stably, and securely interconnected and locked into place. In this way, modules can be quickly and securely interconnected into a wide variety of useful utility assemblies for demountably engaging, supporting, and manipulating various types of tools, equipment, instruments, and the like. Alternatively, modules can be quickly and securely interconnected into a wide variety of useful utility assemblies for containing and transporting loads about a site, for example a work site or recreational site, and once a utility assembly has been completed on a site, it can then be quickly and easily dismantled by disengagement and disassembly of the individual modules for removal and transport to a storage facility or alternatively, to another site for use to configure other types of utility assemblies.

There is no limit on the types of utility systems that can be configured and assembled by demountable engagement of the modular components disclosed herein. Most utility assembly configurations will generally comprise a plurality of rotator modules, a plurality of joiner modules, a plurality of hub modules and/or hub assemblies, a plurality of male member mount modules, a plurality of tool/load support modules, a plurality of base modules, and a plurality of end-cap modules wherein the plurality of modules interconnect together in varying arrangements to form various utility or support systems.

One embodiment of the present disclosure relates to three types of portable modular components that can be used for demountable engagement with each other to configure a wide variety of structural assemblies. The first type of portable modular components comprises an elongate structural support component having a pair of opposed male ends. The second type of portable modular components comprises an elongate structural support component having a pair of opposed ends wherein a first end is a male end and a second end is a female end. The third type of portable modular components comprises an elongate structural support component having a pair of opposed female ends. The male ends of the first and second types of portable modular components are configured for demountable engagement with the female ends of the second and third types of portable modular components.

According to another embodiment of the present disclosure, the first type of elongate structural support component and/or the second type of elongate structural support component and/or the third type of elongate structural support component may have an elongate structural element interposed the pair of opposed ends. According to one aspect, the elongate structural element may be a tube. According to another aspect, the elongate structural element may be a rod.

According to one aspect, each of the male ends may comprise a cylindrical body with at least one linear set of prongs, or more than one set spaced apart, on the circumferential surface of the cylindrical body wherein each set of prongs has two or more spaced-apart prongs. According to some aspects, some of the male ends may have two linear sets of prongs spaced apart around the circumference of the cylindrical body, or alternatively, between three and twelve sets of prongs spaced apart around the circumference of the cylindrical body. According to some aspects, each set of prongs may have between one and eight spaced-apart prongs. According to some aspects, some of the male ends may have no prongs.

According to another aspect, each of the female ends may have a cylindrical receptacle for receiving therein a male cylindrical body disclosed herein. The female receptacle may have at least one linear channel for slidingly receiving therein the prongs of the male ends. According to some aspects, some of the female ends may have receptacles with two linear channels spaced apart around the circumference of the receptacle for receiving therein a male cylindrical body having two linear sets of prongs spaced apart around the circumference of the cylindrical body. Alternatively, some of the female ends may have receptacles with between three and twelve spaced-apart linear channels for slidingly receiving therein a male cylindrical body having between three and twelve linear sets of prongs spaced apart around the circumference of the cylindrical body. According to another aspect, each linear channel in the receptacle(s) of the female ends of the second type or third type of elongate structural support components or elements may have one or more side channels extending therefrom fully or partially around the cylindrical receptacle for rotational and demountable engagement with the spaced-apart prongs on a male cylindrical body. According to another aspect, a female end may have no linear channels where demountably engaging a male cylindrical body of a male end having no prongs. According to another aspect, some of the female ends may be provided with a locking assembly for releasable engagement therewith one of the male ends.

According to another embodiment of the present disclosure, one or more male ends of the first type or second type of elongate structural support components or elements may be rotatable around a longitudinal axis of the second type or third type of elongate structural support components or elements.

According to another embodiment of the present disclosure, one or more female ends of the second type or third type of elongate structural support components or elements may be rotatable around a longitudinal axis of the first type or second type of elongate structural support components or elements.

According to another embodiment of the present disclosure, one or more of the first type of elongate structural support components or elements, and/or the second type of elongate structural support components or elements, and/or the third type of elongate structural support components or elements may have one male end extending radially outward therefrom, wherein the male end comprises a cylindrical body with at least one linear set of prongs, or more than one set spaced apart, on the circumferential surface of the cylindrical body, wherein the male end is configured for rotational and demountable engagement with a female end. According to one aspect, there may be two or more male ends extending radially outward, in the same plane or a different plane, from the first type of elongate structural support components or elements, and/or the second type of elongate structural support components or elements, and/or the third type of elongate structural support components or elements, wherein each of said male ends comprises a cylindrical body with at least one linear set of prongs, or more than one set spaced apart, on the circumferential surface of the cylindrical body, wherein the male ends are configured for rotational and demountable engagement with female ends.

Another embodiment of the present disclosure pertains to end-cap modules having a male end component for demountable engagement with a female end of the second type of elongate structural support components or elements, or of the third type of elongate structural support components or elements. Another embodiment of the present disclosure pertains to end-cap modules having a female end component for demountable engagement with a male end of the first type of elongate structural support components or elements, or of the second type of elongate structural support components or elements.

The modularity of the components and assemblies disclosed herein enables and facilitates the customization of utility assemblies. According to some embodiments disclosed herein, there is provided a customizable kit comprising pluralities of various modular components that may be assembled into selected or certain types of desired utility assemblies and/or support assemblies. In this way, the modular components, assemblies, and systems of the present disclosure provide on-site versatility and ease-of-use. For the purposes of illustrating the versatility and ease-of-use and configuration of the present modules, the following non-limiting description will refer to examples of utility assemblies that are useful for demountable engagement with cameras, sound equipment, lighting equipment, props, and other types of equipment used in filmmaking, videography, and photography applications, as well as some general utility-cart applications, and as well as some general workstation applications.

Some examples of embodiments of the modular components and modular assemblies of the present disclosure described in reference to FIGS. 1-33 to illustrate various types of demountably engageable modules that may be securely and stably interconnected and assembled into many different configurations for engaging, supporting, and conveying various types of utility equipment and/or tools and/or devices and/or components, and/or parts and/or materials and/or supplies within and around a film set or a production studio or a photography studio or a performance venue or a sporting venue, or other locations commonly used for filming movies, videos, television programs, sports, news, documentaries, music videos, time-lapse photography, and still photography. Those skilled in these arts will understand how to securely and stably demountably engage the modules and modular assemblies disclosed herein for assemblies that will be useful in other types of sites such as construction, landscaping, agricultural, industrial, healthcare, retail, warehouses and the like, or alternatively, for use in some household and recreational applications. The numbers and types of modules that may be incorporated into a particular assembly will vary depending on the intended end-use of the utility or support system. However, an assembled system will generally comprise: one or more of a group of rotator modules exemplified in FIGS. 1 to 5; one or more of a group of joiner modules exemplified in FIGS. 6 to 12; one or more of a group of male member mount modules exemplified in FIGS. 13 to 15; one or more of a group of hub modules and hub assemblies exemplified in FIGS. 3, 5 to 7, 11, and 13 to 15; one or more of a group of tool/load support modules exemplified in FIGS. 16 to 20; one or more of a group of base modules exemplified in FIGS. 21 to 27, and one or more of a group of end-cap modules exemplified in FIGS. 28 to 33.

The modules can be used to assemble a variety of utility systems and support structures, for example, dollies, carts, tracks, stands, tables, workstations, seating, shelving, bedframes, railings, staging, partitions, and the like. FIGS. 34-48 illustrate examples of various types of utility and support assemblies that can be configured by combinations of the modular components and modular assemblies disclosed herein.

It should be noted that all the modules disclosed herein provide universal interconnectivity into a variety of utility system assemblies to provide a wide range of functional capabilities, or alternatively, a specialized functionality. After the need for the assemblies is concluded, they are easily dismantled into the individual modular components for transport and/or storage. For example, baseplate modules and assemblies such as those exemplified in FIGS. 16 and 17 are useful for securing thereto a camera, microphone, or such equipment or tool. According to other embodiments, one or more tray modules and one or more table/desk modules (FIGS. 18 and 19) can be configured for transporting equipment, materials, supplies, and the like around a location, and may be configured as a mobile or stationary workstation. One or more lighting mount modules (FIG. 20) can be incorporated into a utility system assembly for demountable engagement thereto of lighting or sound or other similar equipment. According to other embodiments, wheel modules (FIG. 23) can be configured to provide a rolling function to a system assembly, or foot modules (FIGS. 24 and 25) may be included for stationary setups. According to other embodiments, a system assembly may comprise one or more rail-rolling modules (FIGS. 21 and 22) upon which a system can travel on, or be passed through by, an extended length or series of rail track assemblies (FIGS. 34, 35, 36, 39 and 43). Additionally, weight modules (FIG. 26) can be included in a system for structural counterbalancing and base stability options when required. Additionally, a system assembly may include one or more telescoping extension modules (FIG. 27). One or more of a group of end-cap modules (FIGS. 28 to 33), including handle, foot, pad, seat, bumper, and cap components and modules may also be provided within a system for functions of various end-use requirements.

Demountable Engagement Mechanisms

A key feature of the embodiments of the present disclosure pertains to mechanisms enabling and facilitating quick, stable and secure demountable engagement of one module with another module so that the modules are securely and stably locked together. Some of the modules disclosed herein have one end or both ends configured to provide a functional pivot point that allows rotational movement in 360° at the one end or both ends.

FIGS. 1 to 33 depict a range of exemplary interconnecting modules which generally embody the structural components and framework of the exemplary utility systems and support structures disclosed herein. Each of these modules comprises all or part of a reversible joining mechanism, according to embodiments of the present disclosure, and are referred to for illustration purposes. It will be understood that all or part of the varying embodiments of the reversible joining mechanism can be made a component of any module to allow interconnection into a larger system according to embodiments described herein. A reversible joining mechanism may comprise a receptacle in one module, as illustrated in units 11, 211, 252, configured to receive and engage, on another module, a male member having a male component 70.

The male component 70 generally comprises a cylindrical body having a first collar 87a (i.e., the distal collar) with a chamfered leading edge 86 that functions as a retaining-lock chamfer, and a neck 88 separating the first collar 87a from a second collar 87b (i.e., the proximal collar). Four prongs 82 extend radially outward from each of the collars 87a, 87b. The prongs 82 are configured for sliding engagement, for example, with prong-retaining slots 223 provided therefor in a joiner receptacle 211 (FIG. 6), or with prong-retaining slots 262 provided therefor in a side-opening joiner receptacle 252, or with prong-retaining slots 630 provided therefor in a grip end-cap module 625 (FIG. 28). Alternatively, prongs 82 may be unobstructed within a rotator receptacle 11 (FIGS. 1, 3, and 5) to allow a full 360° rotation of a male component 70 within the receptacle 11. A male component may have two to eight spaced apart collars with each collar having two to twelve spaced-apart prongs 82 extending outwardly therefrom for slidable engagement with a receptacle configured to receive and engage the male component.

Figures 1A, 1B:
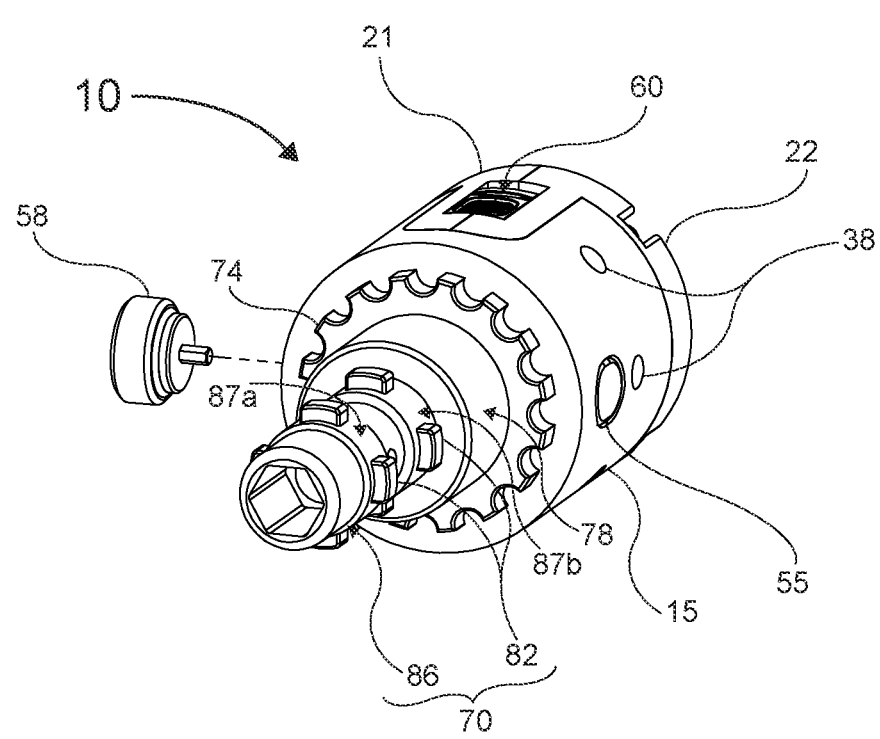
FIG. 1A is a perspective view with the male component extending forward with a tension-adjustment screw knob shown on the left.
FIG. 1B is a perspective view of the rear of the male/receptacle closed-tube rotator module with the tension-adjustment screw knob shown on the right.
Figure 2:
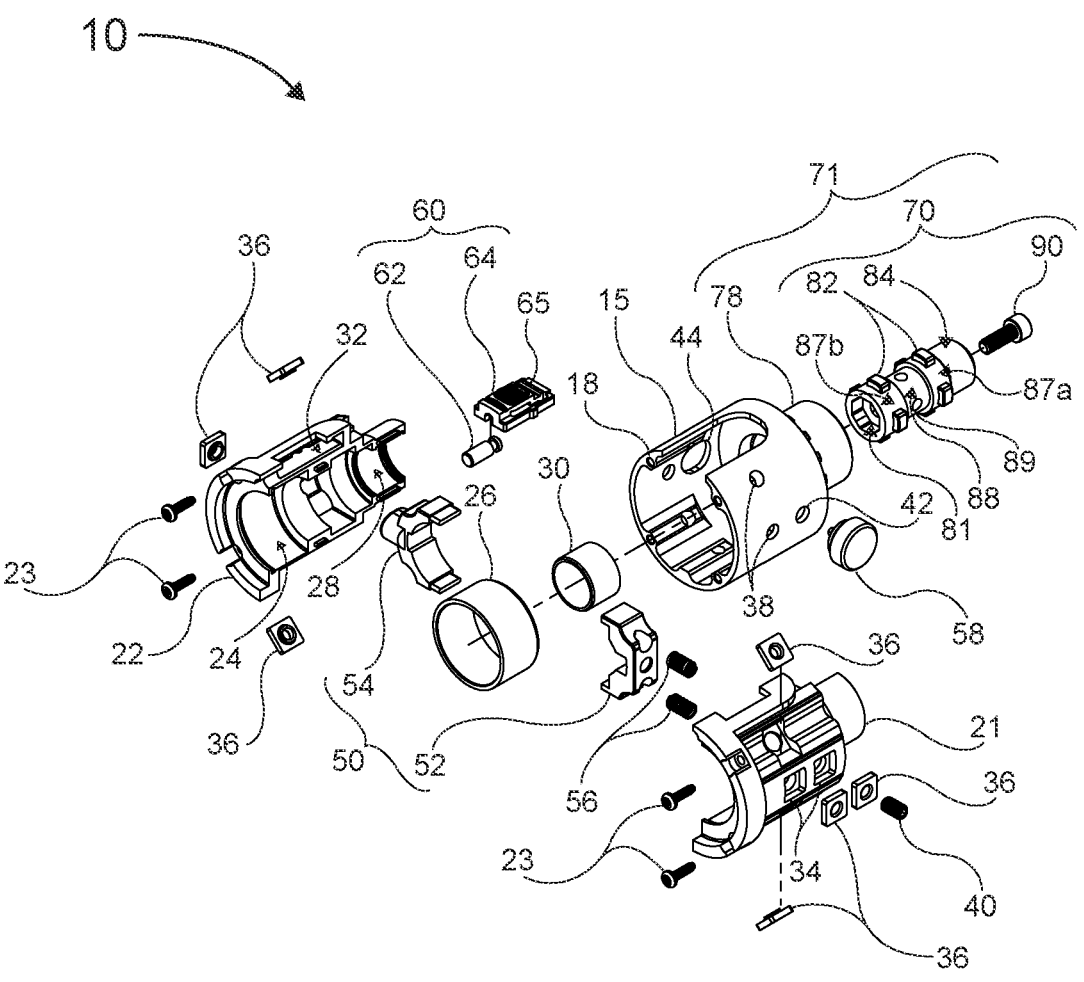
FIG. 2 is an exploded perspective view from the rear of the male/receptacle closed-tube rotator module shown in FIG. 1.

Some of the modules disclosed herein may have a receptacle 11 in a housing 15 provided with reversible joining mechanism that comprises a pivot lock 60 for releasable engagement with a male end of another module. According to an aspect, a module housing may have two or more spaced-apart pivot locks 60 situated around the circumference of the module housing. As shown in FIG. 2, some modules may have a pivot lock 60 with a pivot-lock indexing peg 62 which reversibly locks its module against a second module whereby the indexing peg 62 extends into a pivot-lock sprocket 74, 112, 216, 272, 284, 362, 396, 423, 506 (FIGS. 1, 3, 6, 9, 10, 13, 15, 16, 20, respectively). A pivot-lock sprocket may have around its outer edge, for example, sixteen slots that provide sixteen locking positions at 22.5° increments.

Rotator Modules

The exemplary rotator modules shown in FIGS. 1-5, 26, and 29 comprise a reversible joining mechanism as disclosed herein, thereby allowing the modules to be reversibly interconnected with other modules of the system. The rotator modules are configured to provide a rotation functionality for various pivotable connection points between selected modules throughout an assembly. According to some embodiments, a rotator module can provide a pan and/or tilt function for a tool support module or a load support module or tool support assembly or a load support assembly and device mounted thereon such as a camera or other load. Also, a rotator module can provide other functional pivot points within an assembly, for example, such as a wheel module's directional and/or drive rotation.

According to some embodiments, a tool support assembly or a load support assembly may comprise one or more of a group of closed-tube rotator modules having different lengths, which may be sized in reference to a system format-wide unit scale to help facilitate cross-compatibility of the modules of a system. For example, a closed-tube rotator module may have a 2-unit length and a 2-unit diameter, where a unit is 30 mm.

Figure 3A:
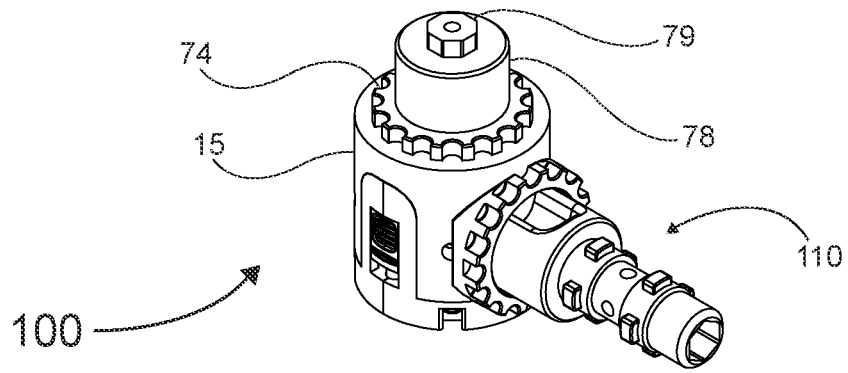
Figure 3B:
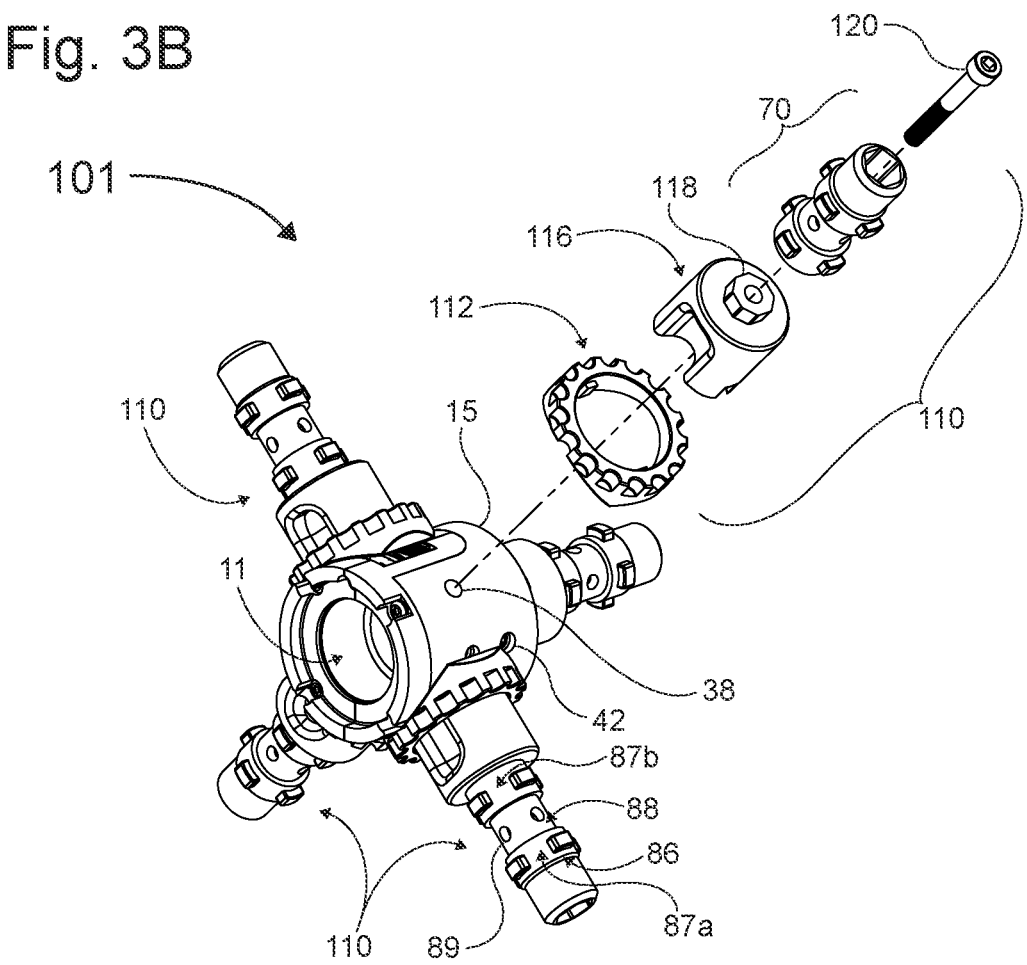
FIG. 3B illustrates the male/receptacle closed-tube rotator module from FIGS. 1 and 2 configured into a 6-way hub assembly with four male member side-mount assemblies demountably engaged with the side wall of the rotator closed-tube housing.

An example of a 2-unit length/2-unit diameter closed-tube rotator module 10 is shown in FIGS. 1 and 2, and is shown reconfigured in FIG. 3B as a 2-unit length/2-unit diameter 6-way closed-tube rotator hub assembly 101. These closed-tube rotator modules comprise a rotator receptacle 11 configured for secure demountable engagement with a second module wherein a male end of the second module may rotate 360° within receptacle 11. The closed-tube rotator modules 10, 100, 101 may comprise a closed-tube housing 15 that provides, in this example, a 2-unit modular length when a rotator receptacle assembly 20 (FIG. 5) is secured within the closed-tube housing 15 at four threaded tube-end screw slots 18 by four screws 23. The exemplary rotator receptacle assembly 20 comprises a lock-spring rotator half-socket 21 and a lock-release rotator half-socket 22 that together define: (i) an outer bushing channel 24 for an outer bushing 26; (ii) an inner bushing channel 28 for an inner bushing 30; (iii) a pivot-lock channel 32 for an exemplary pivot lock 60; and (iv) square-nut slots 34 for securing square nuts 36 within the closed-tube housing 15 for alignment with either a retaining lock 50 or a side-mount bore 38.

In these examples, a square-nut slot 34 is provided for receiving therein a square nut 36 that can threadably secure a retaining-lock set screw 40 coming in through the retaining-lock set screw bore 42 in the closed-tube housing 15 and passing through the nut 36 in to the rotator receptacle assembly 20 where, depending on the set screw's position, the retaining-lock set screw 40 engages a retaining lock 50. The retaining lock 50 comprises a retaining half-lock with spring receptacles 52 and a retaining half-lock with release button 54. Springs 56 are engaged within the half-lock with spring receptacles 52 and against the inside of the lock-spring rotator half-socket 21, thereby pressing the retaining half-lock with spring receptacles 52 towards the center of the receptacle and against the retaining half-lock with release button 54. Using a tension-adjustment screw knob 58 or other screw driver, the retaining-lock set screw 40 can be securely advanced against the retaining half-lock 52 thereby limiting how far it can move outward from the center of the receptacle against the springs 56. The retaining lock 50 can be moved by an operator by manually pressing the retaining lock-release button 55 on the retaining half-lock with release button 54 through a release button hole 44 in the closed-tube housing 15. When the set screw 40 is fully engaged, the retaining lock 50 can no longer be disengaged, therefor preventing the removal of a co-operating male component 70 until the retaining-lock set screw 40 is loosened, as described in further detail below.

Any one of a group of male components 70 situated on a co-operating module of the system may be demountably secured and pivotally engaged within a rotator receptacle 11 of the rotator modules 10, 151, 605, 640. Referring to FIGS. 1 and 2, the closed-tube rotator modules 10 may include a male component 70, a closed-tube housing 15, a pivot-lock sprocket 74, and a wide pivot segment 78 which is rotationally co-operative with the outer bushing 26 in a rotator receptacle 11 of another module.

The proximal end of the male component 70 has an octagonal recess 81 whereby it can be fixed to the larger assembly with an octagonal boss 79 (first seen in FIG. 3A) on the end-face of the wide pivot segment 78, or in the exemplary male member side-mount assembly 110 (first seen in FIGS. 3A, 3B) where the octagonal boss 118 is shown on a wide pivot component 116. The octagonal-shaped connection points allow for a male component 70 to be reversibly attached in two orientations relative to the supporting module.

Figure 8A:
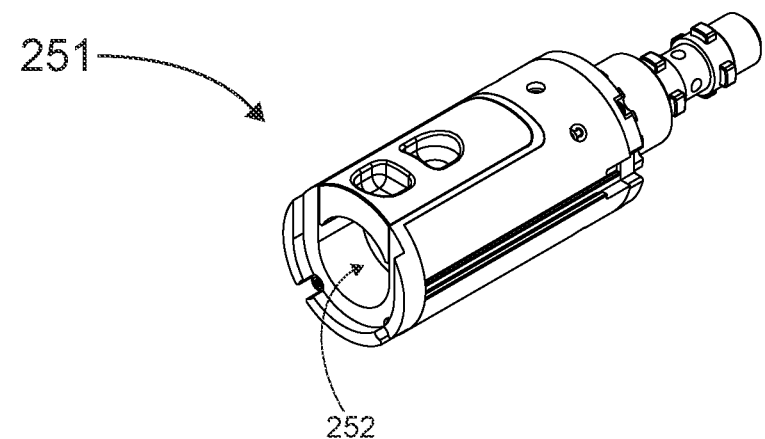
FIG. 8A is a whole perspective view and FIG. 8B is an exploded perspective view.

As shown in FIG. 2, a male component 70 may comprise eight prongs 82 in four linear sets of two prongs 82 wherein each set of prongs is spaced equidistantly at 90° intervals around the circumference of the male component 70 whereby the male component 70 may be demountably engaged with receptacles 11, 211, 252 (FIGS. 1, 6, 8A, respectively).

When demountably engaged with a rotator receptacle 11, the outer cylindrical section of the male component 70, i.e. the narrow pivot segment 84 (shown in FIG. 2), is rotationally co-operative with the inner bushing 30 of the receptacle 11. The male component 70 has two collars (distal 87a, proximal 87b) defining a neck 88 (FIG. 2). The leading edge 86 of the distal collar 87a is chamfered (86 is referred to hereinafter as a retaining-lock chamfer) and presses back the retaining half-lock with spring receptacles 52 to allow entry of the male component 70 into the receptacle 11 or alternatively into receptacle 211 (FIG. 6). The half-lock with spring receptacles 52 remains pressed back until the distal collar 87a and outer four prongs 82 on the male component 70 pass through it after which, the half-lock 52 is aligned with the neck 88 and engages within whereby the tension of the springs 56 co-operating with the half-lock 52 retains the male component 70 within the receptacle 11. An operator may manually disengage the retaining lock 50 by pressing the release button 55 through the release button hole 44 in the closed-tube housing 15 thereby moving the retaining half-lock with release button 54 inward, thereby pressing the retaining half-lock with spring receptacles 52 outward against the springs 56 thereby disengaging the retaining lock 50 from the neck 88 of the co-operating male component 70, thereby allowing separation of the co-operating modules.

A retaining-lock set screw 40 may be used to adjust the tension applied by the half-lock 52 with the springs 56 against a neck 88 of a male component 70. The position of the set screw 40 against the half-lock 52 can be adjusted and secured within a square nut 36 housed within a square nut slot 34 provided therefor in the lock-spring rotator half-socket 21, using a tension-adjustment screw knob 58 (shown in FIG. 1) or with another type of screwdriver through a retaining-lock set screw bore 42 provided therefor in the closed-tube housing 15. The retaining-lock set screw 40 may be adjusted between retracted and engaged positions to provide a range of friction in the pivotable contact between the neck 88 and the retaining lock-half 52, or alternatively, when fully engaged, to stop rotation of the male component 70 and also to prevent movement of the retaining lock 50 thereby preventing removal of the male component 70 until the set screw 40 is retracted and the half-lock 52 can again be pressed back against the springs 56 to enable removal of the male component 70 from the receptacle 11.

The neck 88 of the male component 70 may optionally comprise one or more spaced-apart threaded bores 89 to enable engagement of, for example, a side-connector screw 265 with a male/receptacle side-opening joiner module 251 as illustrated in FIG. 8. For use in the example shown in FIG. 8, the neck 88 has four equidistantly spaced apart threaded bores 89 thereby providing four positions in which a male component 70 can be fixed in place within a side-opening joiner receptacle 252.

According to one embodiment of the present disclosure, a male component 70 may be engaged with a closed-tube housing 15 by a connector screw 90 threadably engaged with a threaded bore at the center of a wide pivot segment 78 as shown in FIGS. 1 and 2. The assembly of a male component 70 engaged with wide pivot segment 78 is referred to hereinafter as a male member closed-tube end assembly 71. According to another embodiment of the present disclosure, a male component 70 may be engaged with a wide pivot component 116 and a pivot-lock sprocket 112 to form a male member side-mount assembly 110. As shown in FIG. 3, a male member side-mount assembly 110 may be demountably engaged with a closed-tube housing 15 with a bolt 120 passing through a side-mount bore 38 in the housing 15, or in other modules, to be threadably engaged with a square nut 36 secured within square-nut slot 34 in the rotator half-socket 21 or half-socket 22 at, in this example, up to four out of seven side-mount bore 38 positions (FIGS. 2 and 3).

According to another embodiment of the present disclosure, the narrow pivot segment 84 of the male component 70 may rotationally cooperate with the inner bushing 30 of a receiving rotator receptacle 11 (FIG. 2). Furthermore, the cylindrical surface of either a wide pivot segment 78 or wide pivot component 116 may rotationally cooperate with an outer bushing 26 fixed within the receptacle 11 (FIG. 2).

According to other embodiments of the present disclosure, for example as shown in FIGS. 1-5, 26, and 29, rotator modules 10, 151, 605, 640 may comprise a pivot lock 60 having a pivot-lock indexing peg 62 set within a pivot-lock button 64 for use to demountably engage a rotator module 10, 151, 605, 640 with another module. The pivot lock 60 can be engaged or disengaged by pressing down on the pivot-lock button 64 and lowering its lock-hold tab 65 into or out of a recess in the pivot-lock channel 32. Then once an operator has manually slid the pivot-lock button 64 to a lock or an unlock position and has released the downward flex applied manually to it, the lock-hold tab 65 returns upward where it holds the pivot lock 60 in place either within the lock's opening or alternatively, moved under into the recess in the pivot-lock channel 32. In this example, two side teeth on the base of the pivot-lock button 64 assist with holding the pivot lock 60 in place where they protrude into two pairs of corresponding indentations in the sides of the pivot-lock channel 32, and are flexed inwardly with the sliding force applied by the operator to allow the pivot-lock button 64 to move between the positions.

By engaging the pivot lock 60 in this manner, the indexing peg 62 may extend into, on another module with which its module is being engaged, a pivot-lock sprocket which has around its outer edge sixteen open-sided pivot-lock slots providing sixteen locking positions at 22.5° increments around the male components 70, wherein the indexing peg 62 reversibly locks the pivotable movement of a male component 70 of the other module within the receptacle 11 of the rotator module. The exemplary male member closed-tube end assembly 71 (FIG. 2), including features of the closed-tube housing 15, may comprise a pivot-lock sprocket 74 with pivot-lock slots around the base of the wide pivot segment 78 (FIG. 1A). Similarly, as shown in FIG. 3B, a male member side-mount assembly 110 may comprise a pivot-lock sprocket 112 with pivot-lock slots around its outer edge and two small teeth within its open inner circumference, wherewith the pivot-lock sprocket 112 is secured down against the cylindrical body of the module 101 by the wide pivot component 116 having in its concave bottom two retaining slots which correspond to the two teeth in the pivot-lock sprocket 112 which hold the components together as they are secured against the round side of module 101 by a bolt 120 threadably engaged with a square nut (not shown) within the closed-tube housing 15.

According to some embodiments, the rotator modules disclosed herein may comprise seven side-mount bores 38 positioned at 45° increments around the circumference of the modules except for locations wherein a pivot lock 60 is situated. The positioning of the side-mount bores 38 make it possible to configure assemblies, generically referred to herein as closed-tube rotator hub assemblies 100 with different varying angular orientations and degrees of separation for one or two or three or four attached male member side-mount assemblies 110 as illustrated in FIG. 3. As shown in FIG. 2, the side-mount bore 38, located opposite the pivot lock 60, that aligns with the seam of the two rotator socket-halves 21, 22 requires a threaded insert within the wall of the closed-tube housing 15 due to the recesses here in the socket-halves required to be open for where corresponding to a square nut channel 170 in embodiments where a rotator receptacle assembly 20 is contained within an extension-tube housing 155, as shown in FIG. 5.

Figures 4A, 4B:
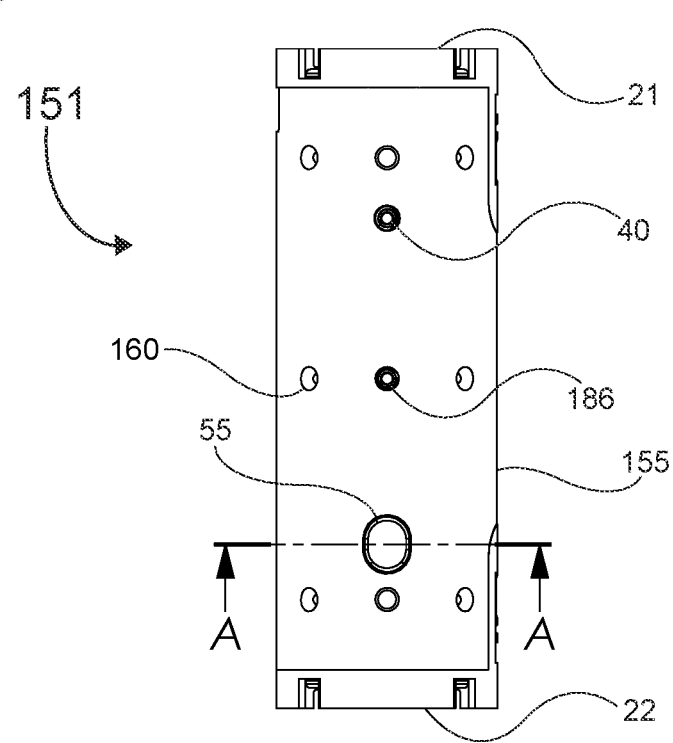
FIG. 4B is a cross-sectional end view thereof, showing an example of a retaining lock contained therein.
Figures 5A, 5B:
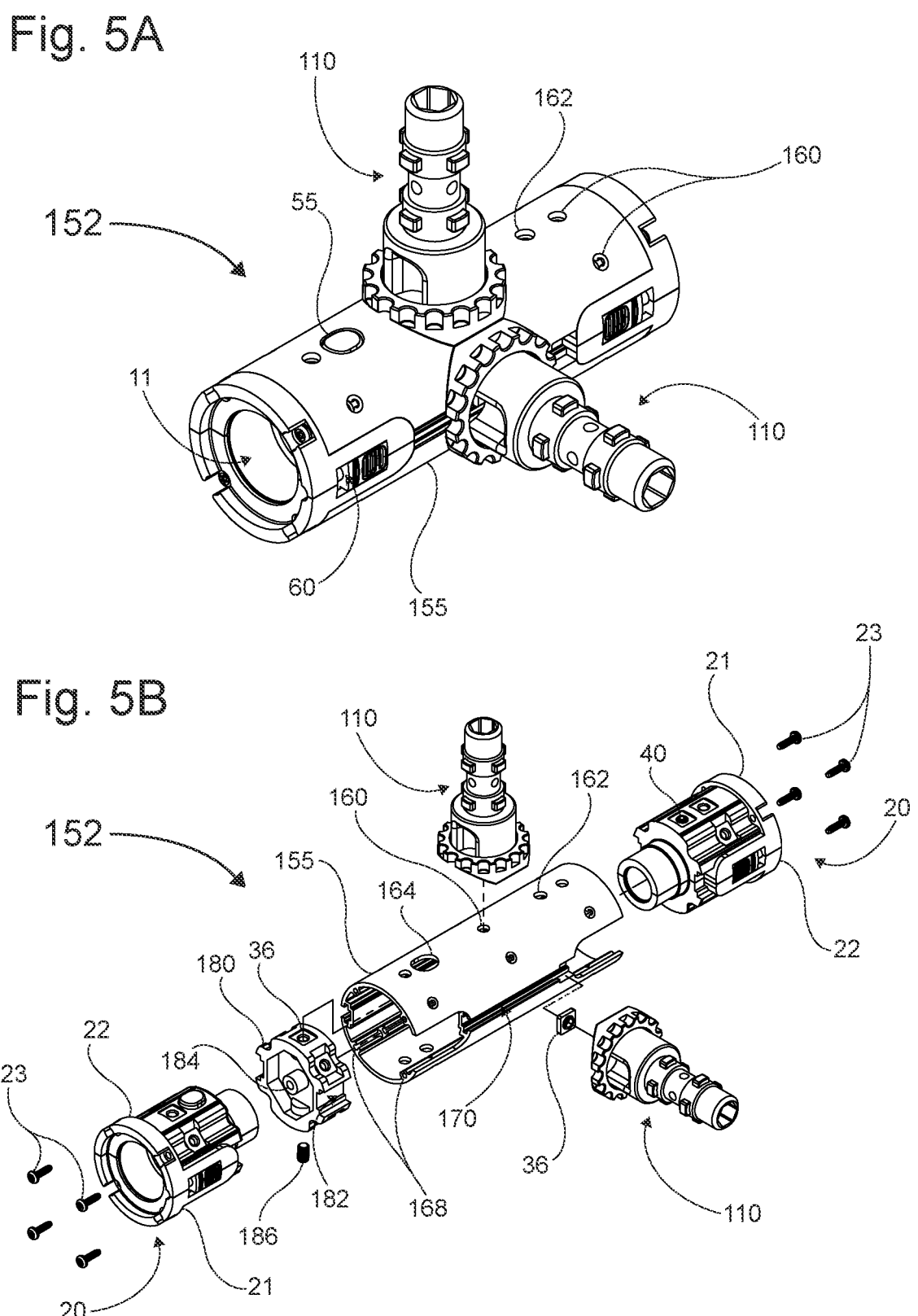
FIG. 5A is a whole view and FIG. 5B is a partially exploded view.

Some examples of double-receptacle extension-tube rotator modules 151, 152, 605 are illustrated in FIGS. 4, 5, and 26 wherein all three modules have a rotator receptacle 11 at each end. Modules 151, 605 are shown without any mounted male member side-mount assemblies 110 (FIG. 4). Module 152 is shown engaged with two male member side-mount assemblies 110 (FIG. 5) and is referred to herein as a 4-way double-receptacle extension-tube rotator hub assembly 152, which provides four points of interconnection with other modules of a system assembly.

The double-receptacle extension-tube rotator modules, according to the embodiments of the present disclosure, comprise a rotator receptacle 11 formed by a rotator receptacle assembly 20 having the same components and functionalities as previously described, securely fixed within each end of an extension-tube housing 155 by four screws 23 inserted into four threaded tube-end screw slots 168 within the inner wall of the extension-tube housing 155 (FIGS. 4, 5). According to some embodiments, matching the 2-unit diameter and several other features of the closed-tube housing 15 previously described, the extension-tube housing 155 may have two retaining-lock set-screw bores 162 for adjustment of each receptacle's retaining-lock set screw 40, two release button holes 164 for manual access to each retaining lock's release button 55, as well as the plurality of side-mount bores 160 (in the embodiment illustrated in FIGS. 4, 5: two sets of six bores), to match the number and positions of square nuts 36 contained by the housing 155 and receptacle assemblies 20 for reconfigurable attachment of up to four male member side-mount assemblies 110 around the extension-tube housing 155.

According to other embodiments disclosed herein, male member side-mount assemblies 110 can also be attached at middle points along an extension-tube housing through a plurality of side-mount bores corresponding with the same number of square nuts 36 securely held within the tube housing by a middle square-nut holder having a matching plurality of square-nut slots positioning each square nut in alignment with a side-mount bore. Referring to FIG. 5, middle square-nut holder 180 is positionable during construction, optionally by a threaded positioning-rod (not shown) temporarily engaged at threaded bore 184 to hold and move holder 180, within extension-tube housing 155 on the inward-facing edges of the housing's square nut channels 170 within the same number of tube rail channels 182 on the sides of the middle square-nut holder 180, until the holder 180 is aligned with an available set of six side-mount bores 160. In order to prevent unwanted movement of the middle square-nut holder 180 once it is in position, a short positioning set screw 186 may be inserted into an available side-mount bore 160, when not engaged by a side-mount assembly 110. A middle square-nut holder may also include crush ribs on its outer edges to prevent unwanted movement within an extension-tube housing.

In addition to providing engagement with tube rail channels 182, the square-nut channels 170 at their two positions around the circumference of the extension-tube housing 155 provide an opening within which one or more square nuts 36 can be inserted and are slidable within and along the channels 170, and thus, may be used for demountable engagement of an additional male member side-mount assembly 110 with a bolt 120 at various positions along the extension-tube housing 155 thereby allowing for a range of unique hub assemblies.

It is to be noted that the closed-tube housings of the closed-tube rotator modules disclosed herein may comprise elongate structural elements be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. An example of a suitable elongate structural element of the closed-tube housings disclosed herein may be a tube having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

It is to be noted that the extension-tube housings of the double-receptacle rotator modules disclosed herein can be selected from the range of 2 cm to 240 cm, for example 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. An example of a suitable elongate structural element of the extension-tube housings disclosed herein may be a tube having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section.

It is optional to provide closed-tube housings with lengths from the range of 4 cm to 240 cm with a plurality of equidistantly spaced-apart middle square-nut holders 180 aligned with additional side-mount holes 160 to enable additional options for configuring a variety of demountable engagement options with a plurality of pivot male member side-mount assemblies.

It is optional to provide extension-tube housings with lengths from the range of 4 cm to 240 cm with a plurality of equidistantly spaced-apart middle square-nut holders 180 aligned with additional side-mount holes 160 to enable additional options for configuring a variety of demountable engagement options with a plurality of pivot male member side-mount assemblies.

Joiner Modules

Joiner modules, as disclosed herein, are the components or the modular assemblies of a structural system, configured for demountable assembly with rotator modules or other modules, to assemble a variety of tool-bearing or load-bearing structures and the like, that may be fixed-in-place and stationary, or alternatively, that may be mobile through co-operation with rollers or wheels or castors. Joiner modules may demountably interconnect with one or more of a rotator module, and/or one or more of a tool support module, and/or one or more of a load-bearing module, and/or one or more of a base module, and/or one or more of an end-cap module, as disclosed herein.

Examples of some embodiments of the joiner modules of the present disclosure are shown in FIGS. 6-12. Some embodiments pertain to joiner modules that comprise a joiner receptacle and an opposing male end. Some embodiments pertain to joiner modules additionally comprising an elongate structural element interposed a joiner receptacle and a male end. Some embodiments pertain to joiner modules that comprise two opposing male ends. Some embodiments pertain to joiner modules additionally comprising an elongate structural element interposed the two opposing male ends. Some embodiments pertain to joiner modules that comprise two opposing joiner receptacles. Some embodiments pertain to joiner modules additionally comprising an elongate structural element interposed the two opposing joiner receptacles. A joiner module comprising an elongate structural element may optionally be referred to as an extension-tube joiner module.

It is to be noted that the elongate structural element of the joiner modules may be a tube or a rod having a circular cross-section or an elliptical cross-section or a square cross-section or a rectangular cross-section or a trapezoidal cross-section or a triangular cross-section or a hexagonal cross-section or an octagonal cross-section or a decagonal cross-section or an I-shaped cross-section. The length of a joiner module elongate structural element may be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween.

Some embodiments pertain to joiner modules that additionally comprise one or more male member assemblies demountably engaged with an elongate structural support component or element and extending radially therefrom. Such joiner modules may be referred to as a joiner hub module or a joiner hub assembly.

Figures 6A, 6B:
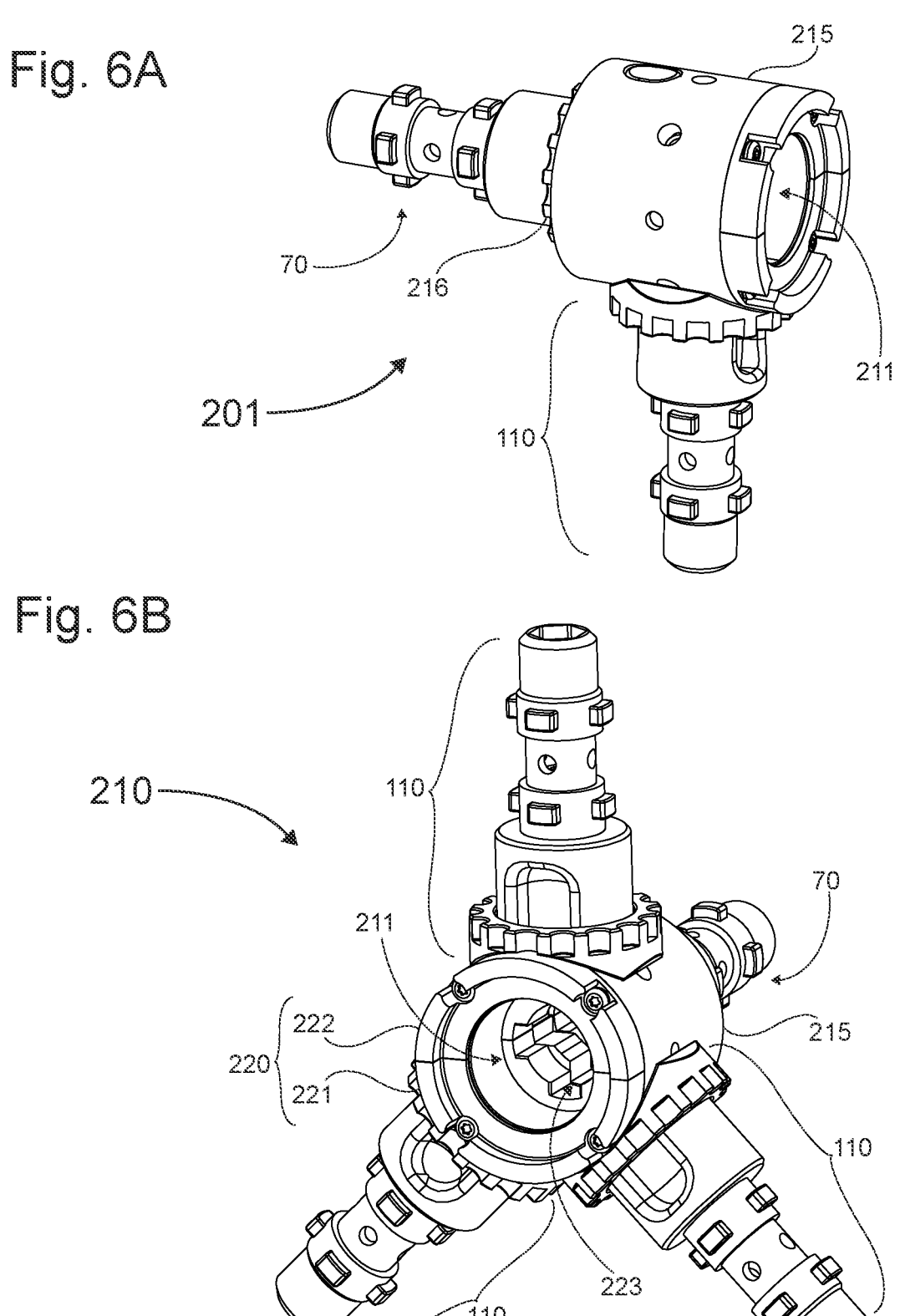

One example of a closed-tube joiner module, which as shown in FIG. 6A may also be referred to herein as a closed-tube joiner hub assembly 201, comprises a joiner receptacle 211 formed by a joiner receptacle assembly 220 housed within a joiner closed-tube housing 215 having a pivot-lock sprocket 216 and a male component 70 extending outward along the longitudinal axis of the joiner closed-tube housing 215. A male member side-mount assembly 110 is shown demountably engaged to the side of the joiner closed-tube housing 215 and extending radially therefrom. The joiner module 201 may provide a 90° elbow joint in a utility or structural support assembly, or alternatively, may provide a T-junction in a utility or structural support assembly.

Figure 7:
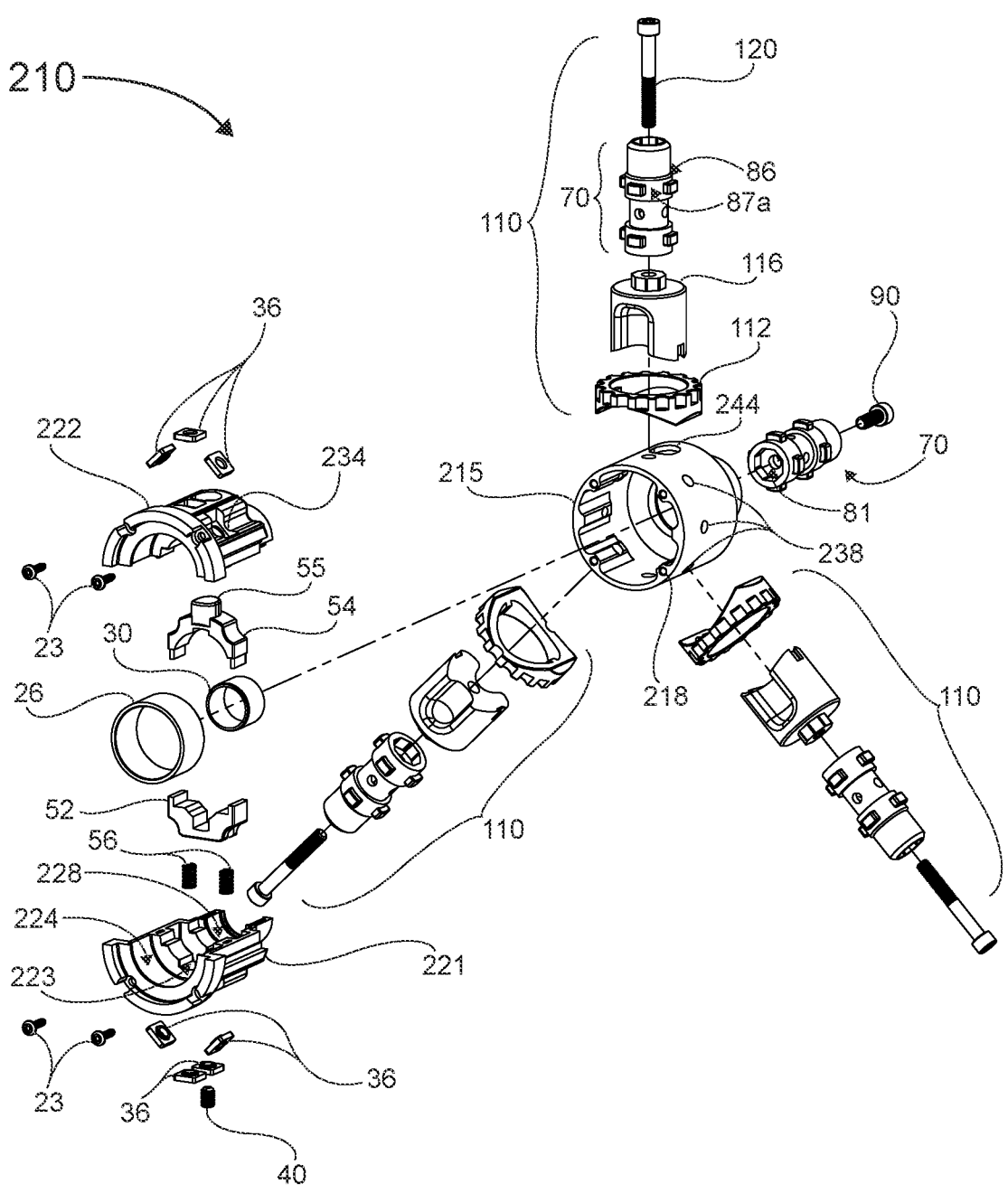
FIG. 7 is an exploded perspective view of the 5-way hub assembly shown in FIG. 6B.

An example of a 5-way closed-tube joiner hub assembly 210 is shown in FIGS. 6B and 7, and comprises a joiner closed-tube housing 215 with a joiner receptacle 211 at one end and a male component 70 at the other end, with three male member side-mount assemblies 110 extending outward radially from the joiner closed-tube housing 215. The joiner receptacle 211 comprises a joiner receptacle assembly 220 secured to four threaded tube-end screw slots 218 in the joiner closed-tube housing 215 with four screws 23. The joiner receptacle assembly 220 comprises a lock-spring joiner half-socket 221 and a lock-release joiner half-socket 222 that together define: (i) an outer bushing channel 224 for an outer bushing 26; (ii) an inner bushing channel 228 for an inner bushing 30; and (iii) square-nut slots 234 for securing square nuts 36 within the joiner closed-tube housing 215 for alignment with either a retaining lock 50 or a side-mount bore 238.

It should be noted that the 5-way closed-tube joiner hub assembly 210 shown in FIGS. 6B and 7 may have a 2-unit modular length matching a 2-unit diameter of 60 mm, which is the exemplary system format sizing of 30 mm units referred to herein as unit scale, which is described for demonstrative purposes only and not to be intended to limit the disclosure herein to these values or proportions.

As disclosed herein, a male component 70 of another module of a system assembly may be demountably engaged with a joiner receptacle 211 of the present joiner modules by way of operating the retaining lock-halves 52, 54 contained within the joiner receptacle assembly 220. When the male component 70 of another module (in this case, the second module) is inserted into the joiner receptacle 211 of a joiner module, the retaining-lock chamfer 86 on the distal collar 87a of the male component 70 presses back the retaining half-lock with spring receptacles 52 thereby allowing entry of the male component 70 into the joiner receptacle 211. The half-lock 52 remains pressed back until the distal collar 87a and outer four prongs 82 on the male component 70 is passed through to where the half-lock 52 is aligned with the neck 88 of the male component 70 and the tension of the springs 56 engages the half-lock 52 within the neck 88 and against the half-lock with release button 54. An operator may disengage the second module from the joiner module by pressing the release button 55 through the release button hole 244 in the joiner closed-tube housing 215 thereby moving the retaining half-lock with release button 54 inward resulting in an outward movement of the retaining half-lock with spring receptacles 52 against the springs 56 to where it is disengaged from the neck 88 of the second module allowing demounting of the second module from the joiner module.

A retaining-lock set screw 40 may be used to adjust the tension applied by the half-lock 52 with the springs 56 against a neck 88 of a male component 70. The position of the set screw 40 against the half-lock 52 can be adjusted and secured within a square nut 36 housed within a square nut slot 234 provided therefor in the lock-spring joiner half-socket 221, using a tension-adjustment screw knob 58 (shown in FIG. 1) or another type of screwdriver through a retaining-lock set screw bore (not visible in FIGS. 6 and 7) provided therefor in the joiner closed-tube housing 215. The retaining-lock set screw 40 may be adjusted between retracted and engaged positions to provide a range of pressure in the contact of the retaining lock-half 52 and the neck 88 of the second module. When fully engaged, the position of the set screw 40 prevents movement of the retaining lock 50 thereby preventing disengagement of the second module until the set screw 40 is retracted and the half-lock 52 can again be pressed back against the springs 56 to enable removal of the second module's male component 70 from the joiner receptacle 211.

Unlike the rotator receptacle 11 shown in FIGS. 1 and 2, which provides a secure engagement of a rotator module with a second module whereby a male member assembly of the second module is rotatable 360° within the rotator receptacle 11, the joiner receptacle 211 of a joiner module provides a securely fixed and un-rotatable engagement of a male member assembly of a second module mounted therein. The example of a joiner receptacle 211 shown in FIGS. 6 and 7 comprises a joiner receptacle assembly 220 having two half-sockets 221, 222 which form a total of four prong-retaining slots 223 within which the eight prongs 82 of a male component 70 of another module are aligned and fixedly secured upon insertion of the male component 70. The joiner receptacle assembly 220 additionally comprises an outer bushing 26 and an inner bushing 30, housed within bushing channels 224, 228 respectively, that cooperate with the prong-retaining slots 223 to securely engage the male member assembly by its wide pivot segment/component and its narrow pivot segment 84, respectively, upon insertion into the joiner receptacle 211.

Providing five points of demountable engagement with up to five other modular components, the 5-way closed-tube joiner hub assembly 210 includes a joiner receptacle 211 within a joiner closed-tube housing 215, a male component 70 in linear alignment with the joiner receptacle 211, and three male member side-mount assemblies 110 extending radially outward from the joiner closed-tube housing 215. The male component 70 in linear alignment with the receptacle is attached at its octagonal recess 81 to the joiner closed-tube housing 215 at the octagonal boss of the housing's wide pivot segment by a connector screw 90 (the octagonal boss and wide pivot segment are not visible in FIGS. 6B, 7). Each of the three male member side-mount assemblies 110 are engaged with the joiner closed-tube housing 215 with a bolt 120 passing through the center of the male component 70, the wide pivot component 116, and the pivot-lock sprocket 112, then through the side-mount bore 238 in the joiner closed-tube housing 215, and threadably engaged with a square nut 36 secured within one of the square-nut slots 234 around the outside of the joiner half-sockets 221, 222.

The joiner closed-tube housing 215 may comprise eight side-mount bores 238 positioned at 45° intervals around the circumference of the housing. These bores 238 make available varying angular orientations and degrees of separation for mounting thereon up to four male member side-mount assemblies 110 in various closed-tube joiner hub assemblies. Six of the eight side-mount bores 238 correspond with six square nuts 36 contained within square-nut slots 234. The remaining two side-mount bores 238 are located adjacent to the seam of the two joiner half-sockets 221, 222 where threaded inserts are required within the wall of the joiner closed-tube housing 215, due to the recesses here in the half-sockets for where in alignment with the square-nut channels of an extension-tube housing in the configuration of an extension-tube joiner module, for example, a double-receptacle extension-tube joiner module 460 or a male/receptacle extension-tube joiner module 465, shown in FIG. 17.

Some embodiments disclosed herein relate to one or more of a group of side-opening joiner modules for use in configuring a utility or structural support system assembly that may require an open-faced or closed side-ways connection from where a male member assembly of a second module can be demountably engaged from the side of the joiner module. An example of a male/receptacle side-opening joiner module 251 is illustrated in FIGS. 8A and 8B and has a side-opening receptacle 252 wherein a second module's male component 70/male member assembly may be securely or releasably engaged.

Male/receptacle side-opening joiner module 251 comprises an extension-tube housing 255 with a side-opening receptacle component 260 secured to one end with two screws 23 threadably engaged with tube-end screw slots 257, and a male member extension-tube end assembly 270 secured to the other end by four screws 23 passed through screw holes 278, provided therefor in a male member tube-end plate 271, and threadably engaged with four tube-end screw slots 257 in the extension-tube housing 255. Tube rail channels in both the side-opening receptacle component 260 and the inserted portion of the male member tube-end plate 271 allow each component to be secured in between the inward-facing edges of the opposing square-nut channels 256 of the extension-tube housing 255.

Figure 8B:
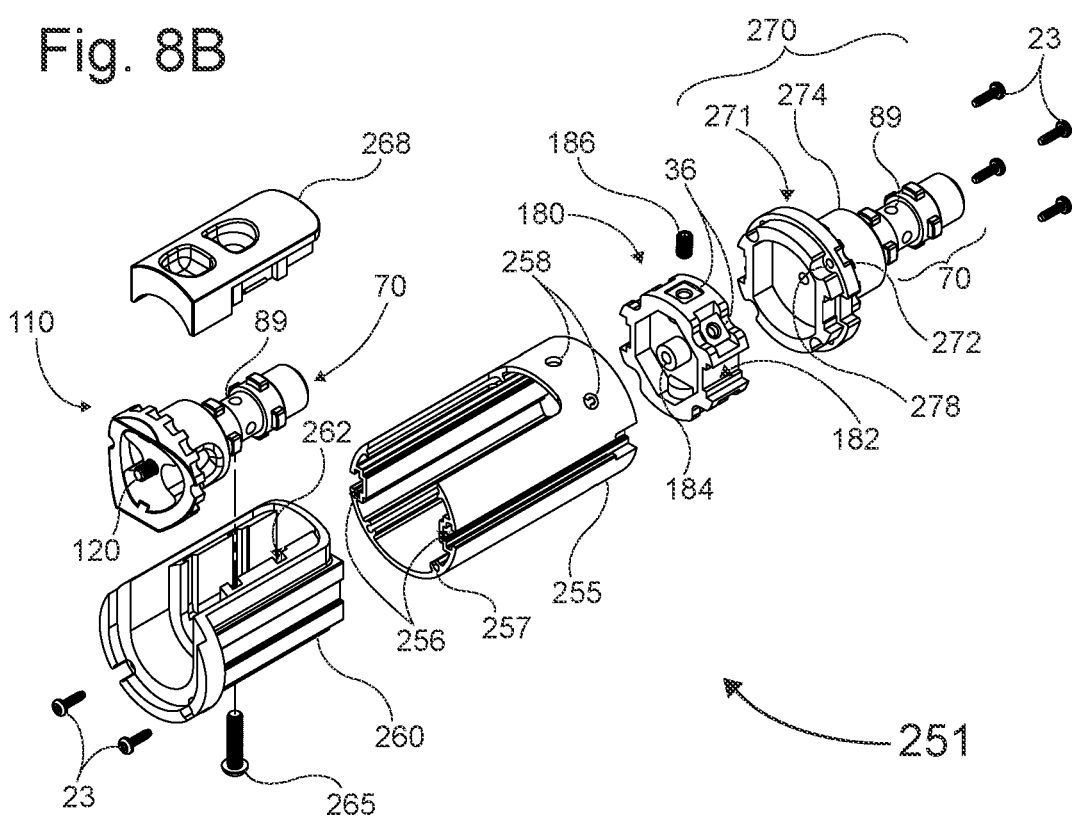

A male member side-mount assembly 110 for a second module is shown in FIG. 8B (the second module is not shown) in alignment for insertion into the side-opening receptacle 252 for secure engagement therein. Prong-retaining slots 262 are provided within the side-opening receptacle component 260 corresponding to the shape and alignment of prongs 82 on the male component 70 of an inserted male member assembly to facilitate insertion and removal of that male member assembly of the second module into and out of the side-opening receptacle component 260 and allow for secure engagement therein. For a secure engagement of the co-operating modules, a side connector screw 265 may be inserted through a bore provided therefor in both the extension-tube housing 255 and the side-opening receptacle component 260 (these bores are not visible in FIG. 8B) and then may be threadably engaged with one of the threaded bores 89 in the neck 88 of the male component 70. If so desired, a side-opening receptacle cover 268 may also be engaged with the receptacle component 260 to provide a protective closure of the engaged male member assembly. If separation of a side-opening joiner module and a second module is required during use and/or operation of the system assembly, the side connector screw 265 and side-opening receptacle cover 268 may be excluded from the assembly so that the male member assembly of the second module may temporarily remain seated until lifted out of the receptacle or the open receptacle is pointed downward.

The male member extension-tube end assembly 270 provided at the opposite end of the male/receptacle side-opening joiner module 251 in this example illustrated in FIGS. 8A and 8B comprises a male component 70 mounted to a male member tube-end plate 271 having a wide pivot segment 274 and a pivot-lock sprocket 272 for demountable engagement with other modules of a system assembly. The male member tube-end plate 271 is secured to the extension-tube housing 255 with four screws 23 through screw holes 278 threadably engaged with screw slots 257 provided therefor in the extension-tube housing 255.

The outward end-face of the male member tube-end plate 271 may comprise slots which align with the square-nut channels 256 of the extension-tube housing 255 whereby, in a completed module, square nuts 36 may be inserted through the end-face of the tube-end plate 271 into a square-nut channel for demountable engagement to a male member side-mount assembly 110.

In this example, up to four male member side-mount assemblies 110 may be attached radially from the extension-tube housing 255 by a bolt threadably engaged through one of the six side-mount bores 258 with a square nut 36 securely held within the tube housing by a middle square-nut holder 180 that has six square-nut slots that position each square nut 36 in alignment with a side-mount bore 258. The middle square-nut holder 180 is positioned during construction of the module inside extension-tube housing 255 upon the inward-facing rails of the housing's square-nut channels 256 within the tube rail channels 182 as shown in FIG. 8B. In addition to providing the inward-facing rails, the square-nut channels 256 provide channels within which one or more square nuts 36 are slidable and may provide a threadable engagement point for mounting of a male member side-mount assembly 110 with a bolt 120 at operator-selected positions along the extension-tube housing 255, thereby allowing for configuration of a wide range of unique hub assemblies.

According to some aspects, the length of the extension-tube housing 255 may be selected from the range of 2 cm to 240 cm, for example 2 cm, 4 cm, 5 cm, 6 cm, 8 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 210 cm, 220 cm, 230 cm, 240 cm, and therebetween. In constructions of side-opening joiner modules that have extension-tube housings with lengths of 4 cm or longer, it may be desirable to insert one or more middle square-nut holders 180 within the length of the extension-tube housing 255. It is optional, during construction of longer side-opening joiner modules, to temporarily engage a middle square-nut holder 180 with a threaded positioning-rod at threaded bore 184 to move and hold in place the middle square-nut holder 180 while it is aligned with and secured at a selected set of side-mount bores 258. In order to prevent unwanted movement of the middle square-nut holder 180 once it is in position, a short positioning set screw 186 may be inserted into an available side-mount bore 258, when not engaged by a side-mount assembly 110. A middle square-nut holder may also include crush ribs on its outer edges to prevent unwanted movement within an extension-tube housing.

Another embodiment of the present disclosure relates to double-male joiner modules having two male ends for demountable engagement with receptacles of the other modules of a utility or structural support system.

Figure 9A:
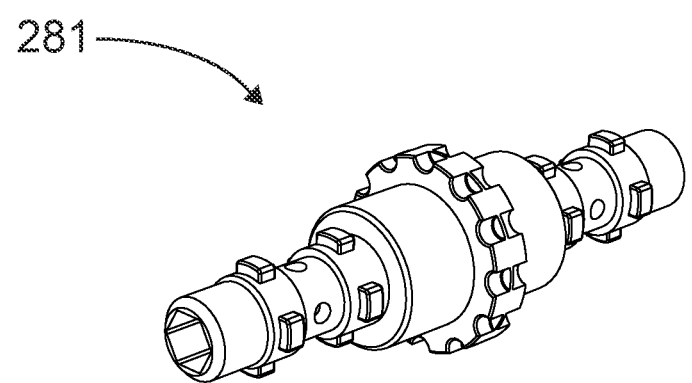
FIG. 9A is a whole perspective view and FIG. 9B is an exploded perspective view.
Figure 9B:
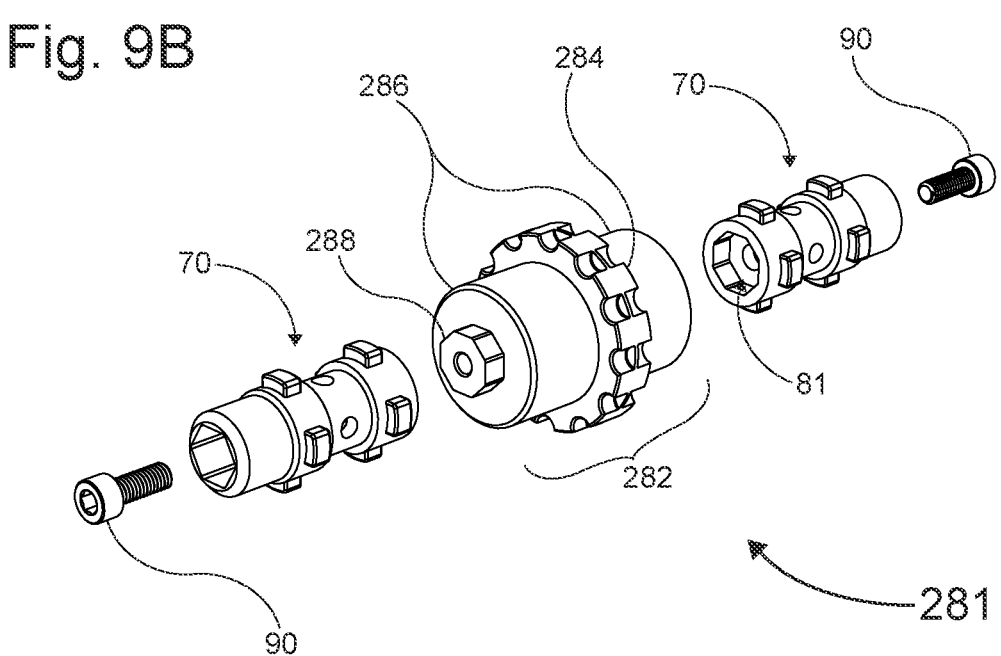

One example of a double-male joiner module 281 is shown in FIGS. 9A and 9B for use to demountably engage two adjacently positioned receptacles of two modules of a utility or structural support system, as may be required. The double-male joiner module 281 comprises a double-male component 282 with both sides having a pivot-lock sprocket 284 and a wide pivot segment 286 with an outward-facing octagonal boss 288 having a threaded bore therethrough. It is to be noted that the proximal ends of male components 70 have an octagonal recess 81 configured for sliding engagement with an octagonal boss 288. Each male component 70 is secured to the double-male component 282 by mounting onto an octagonal boss 288 and then inserting a connector screw 90 through the male component 70 to be threadably engaged with the threaded bore provided in the octagonal boss.

Figures 10A, 10B:
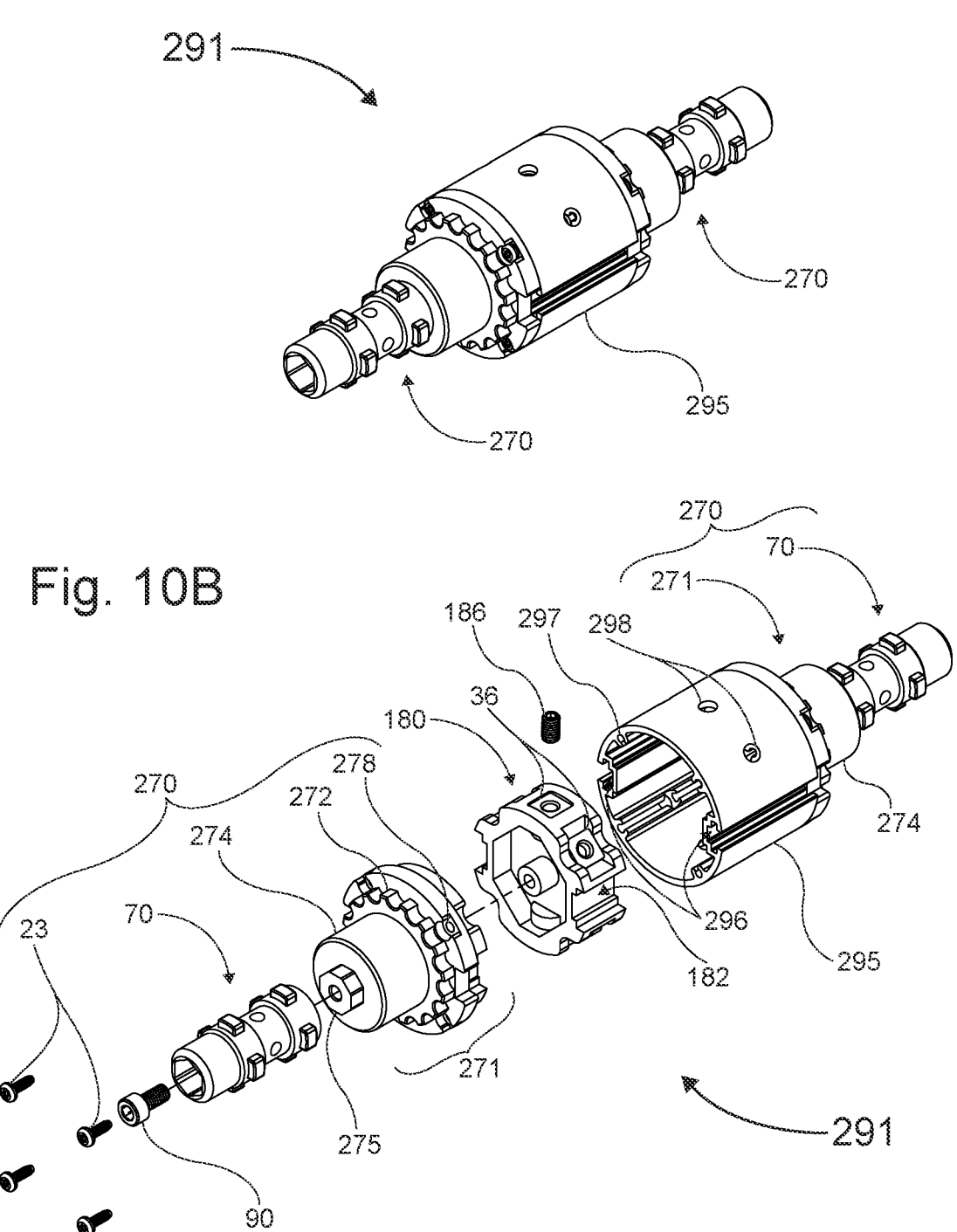
FIG. 10A is a whole perspective view and FIG. 10B is an exploded perspective view.

Another embodiment relates to a double-male joiner module having an extension-tube housing interposed two male end assemblies. An example of a double-male extension-tube joiner module 291 is shown in FIGS. 10A and 10B and comprises an extension-tube housing 295 engaged with a male member extension-tube end assembly 270 at each end.

The extension-tube housing 295 has a pair of opposing longitudinal square-nut channels 296 and four equidistantly spaced-apart longitudinal screw slots 297 extending between the ends of the extension-tube housing 295. One or more middle square-nut holders 180 may be inserted into the interior of the extension-tube housing 295 wherein the tube rail channels 182 of a middle square-nut holder 180 may slide along the inward-facing surfaces of the pair of longitudinal square-nut channels 296 of the extension-tube housing 295. In this example, up to six square nuts 36 may be inserted into the same number of slots in the middle square-nut holder 180 for demountable engagement with up to four male member side-mount assemblies 110 through the side-mount bores 298. A positioning set screw 186 can be used to maintain the positioning of the middle square-nut holder 180 when not engaged by a male member side-mount assembly 110. Also for this purpose, the middle square-nut holder 180 may comprise crush ribs around its outer edges to grip the inside surface of the extension-tube housing 295.

Male member side-mount assemblies 110 may also be mounted at various positions along the extension-tube housing 295 within the square-nut channels 296, thereby allowing for a range of unique hub assemblies.

The double-male extension-tube joiner module has a male member extension-tube end assembly 270 secured to each end of the extension-tube housing 295 with screws 23 extending through screw holes 278 in the male member tube-end plate 271 and threadably engaged with tube-end screw slots 297 within the inner wall of the extension-tube housing 295. The octagonal bosses 275 are slidably engaged with an octagonal recess at the proximal end of each male component 70 after which a connector screw 90 is inserted through the distal ends of the male components 70 and threadably engaged with a threaded bore provided therefor in the octagonal bosses 275.

Figures 11A, 11B:
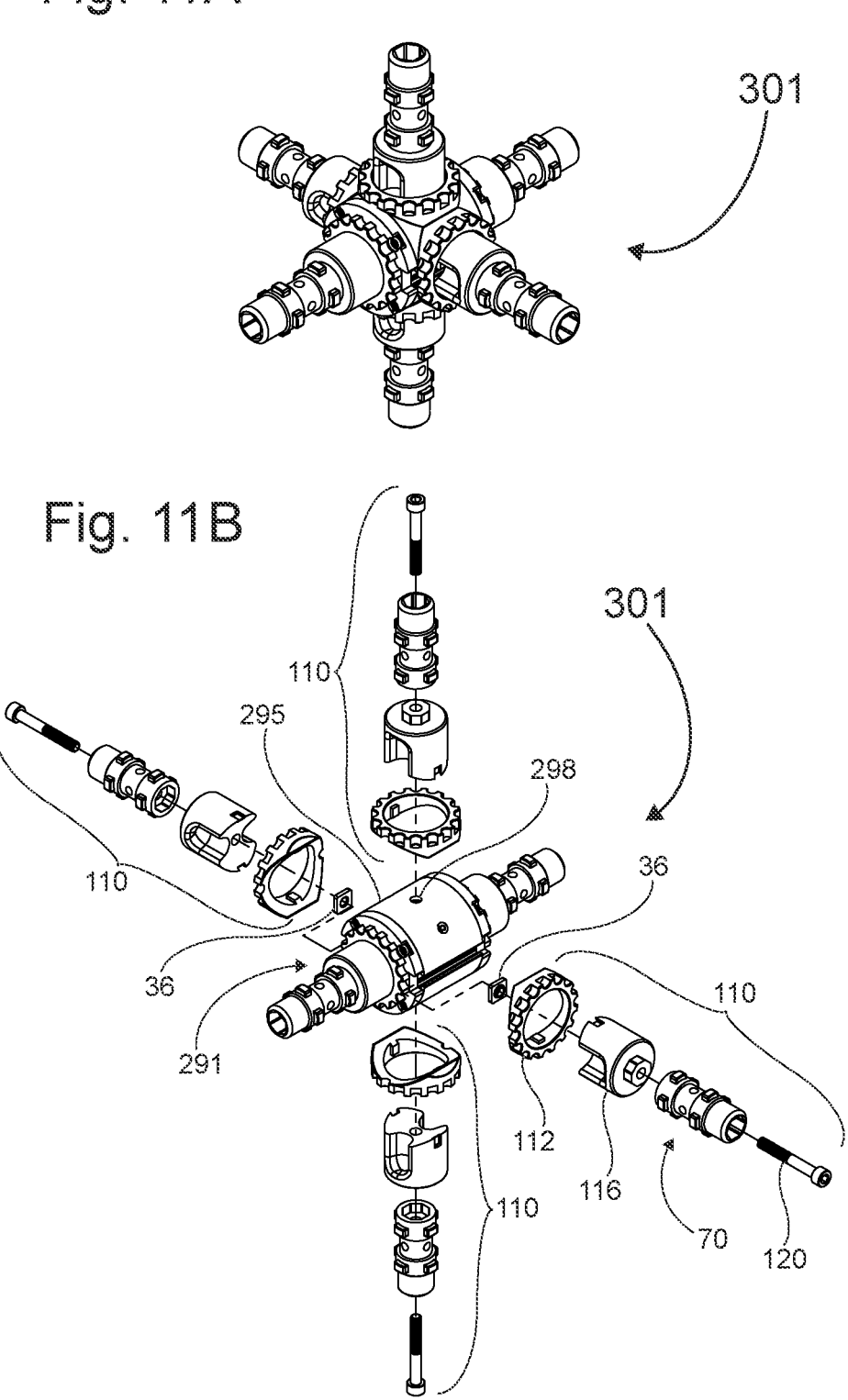
FIG. 11A is a whole perspective view and FIG. 11B is a partially exploded perspective view.

Another example of a multi-engagement point joiner hub assembly of the present disclosure is shown in FIGS. 11A, 11B. A 6-way extension-tube joiner hub assembly 301 may comprise the double-male extension-tube joiner module 291 shown in FIGS. 10A, 10B, to which is mounted four male member side-mount assemblies 110 extending outwardly from the extension-tube housing 295. Two opposing male member side-mount assemblies 110 are mounted to the extension-tube housing 295 by threadable engagement of bolts 120 inserted therethrough, with square nuts 36 that have been inserted into the square-nut channels 296. The other two opposing male member side-mount assemblies 110 are mounted to the extension-tube housing 295 by threadable engagement of bolts 120 inserted therethrough, and then through side-mount bores 298, into square nuts 36 housed by a middle square-nut holder 180 positioned inside the extension-tube housing 295 (not visible in FIGS. 11A, 11B).

Figure 12A:
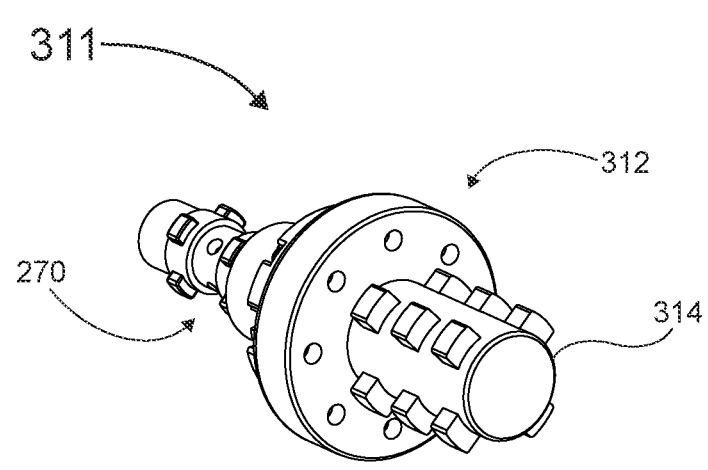
FIG. 12A is a whole perspective view and FIG. 12B is an exploded perspective view.
Figure 12B:
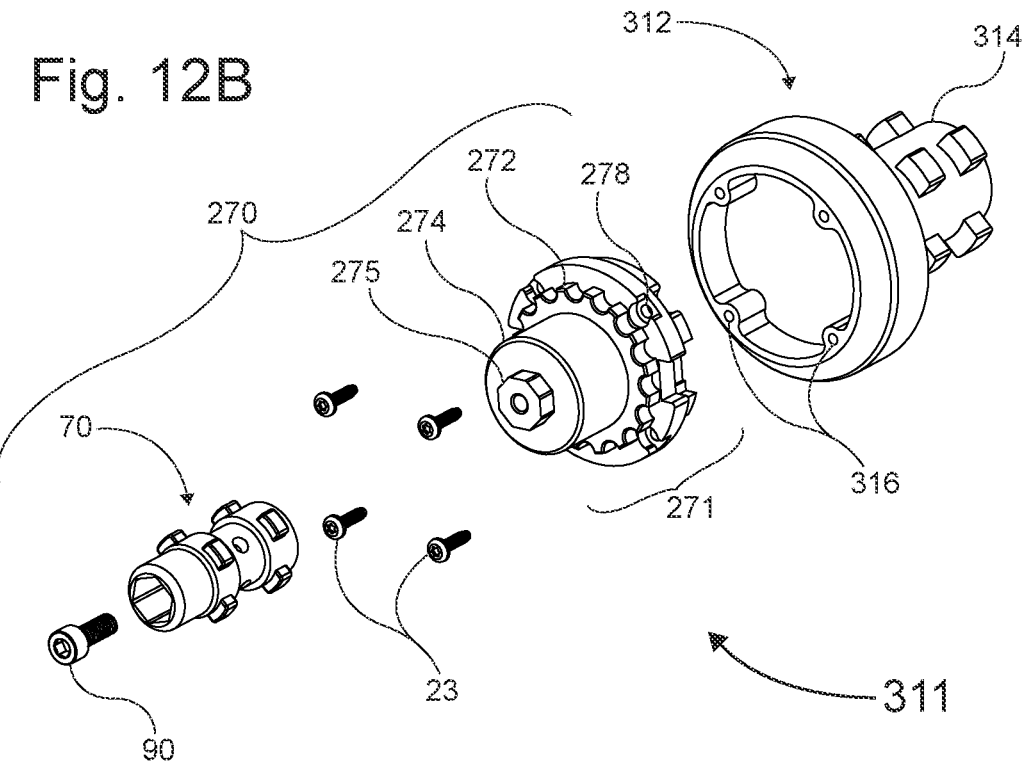

Another embodiment of the present disclosure relates to cross-format double-male adapter joiner modules that facilitate engagement of modules with male assemblies and receptacles with different dimensions, and optionally, system format characteristics such as the number of prongs on the male ends, into a single utility or structural support assembly. An example of a double-male adapter joiner module 311 is shown in FIGS. 12A and 12B.

Double-male adapter joiner module 311 comprises: (i) a male member tube-end plate 271 to which a male component 70 is mounted by a connector screw 90 inserted through the distal end of the male component 70 and threadably engaged with a threaded bore provided therefor in the octagonal boss 275 of the male member tube-end plate 271, (ii) an adapter joiner component 312, having a (iii) alternative male member component 314, which has a different diameter and length and number of prongs than male component 70, for demountable engagement into a receptacle of a different system format. The male member tube-end plate 271 is secured to the adapter joiner component 312 by insertion of screws 23 through screw holes 278 to be threadably engaged with screw slots 316 in the adapter joiner component 312.

Male Member Mount Modules

Further embodiments of the present disclosure relate to a variety of male member mount modules, which may include male member side-mount bracket modules and male member mounting block modules. Particularly, the male member side-mount bracket modules provide, among other functions, unique hub assemblies which may be included in a system assembly for demountably fixed or rotatable/slidable engagement of mounted male member assemblies, on an elongate tubular support element at special angular orientations, which can be rapidly repositioned without requiring removal of modules mounted thereon. Male member mounting block modules, for their part, provide for a variety of all-male hub assemblies.

An example of a 2-way 30° side-mount bracket module 320 is shown in FIG. 13A that is demountably engageable with an elongate tubular support element, such as an extension-tube housing. The 30° side-mount bracket module 320 comprises a 30° angle male member mount bracket 322 and a clamp bracket 328 that may be securely engaged to an elongate tubular support element (not shown) by placing the male member mount bracket 322 and clamp bracket 328 around the elongate tubular support element, inserting clamp bracket screws 329 through bores provided therefor in the clamp bracket 328, and threadably engaging the screws 329 with bores provided therefor in the 30° angle male member mount bracket 322. It is to be noted that the combination of the male member mount bracket 322 and clamp bracket 328 may be referred to as a "collar clamp". The 30° angle male member mount bracket 322 is provided with a pair of threaded bores (not visible in FIG. 13A) for engagement therewith of up to two male member side-mount assemblies 110 which extend outward each at a 30° angle from the module's center, or at a 60° angle (326) between a pair. The 30° angle male member mount bracket 322 may be provided with one or more mount screw holes 323 to enable threadable engagement of a 30° side-mount bracket module 320 to an elongate tubular support element with a mount screw 325 threadably engaged, for example, with a square nut contained in an extension-tube housing's square-nut channel or middle square-nut holder 180.

An example of a 4-way multi-angle side-mount bracket module 330 is shown in FIG. 13B and which comprises a pair of opposed multi-angle male member mount brackets 335 for encircling and clamping to an elongate tubular support element, such as an extension-tube housing, wherein each bracket 335 has a pair of opposed bracket screw bores 336 at each end of the bracket 335 for receiving therethrough and threadably engaging bracket screws 338 in the corresponding bores in the opposing bracket. At least one mount screw hole 331 is provided along the centre point of the longitudinal axis of each bracket 335 (three holes 331 are shown in FIG. 13B) for receiving therein a mount screw 332, and on the opposite side, a washer 339, for engagement of the bracket 335 on an elongate tubular support element. Each multi-angle male member mount bracket 335 has two opposed sets of three spaced-apart threaded bores 334 for threadable engagement with a bolt 120 to demountably secure thereto two outwardly extending male member side-mount assemblies 110. Each set of three spaced-apart threaded bores 334 allows for mounting of a male member side-mount assembly 110 at an angle of 30° or 45° or 60° from the module's center, or at an angle of 60° or 90° or 120° between a pair of male member side-mount assemblies 110 mounted to the bracket 335. In this example, the two 45° bores 334 provide their mounting position at a unit scale extension, of for example 30 mm, from the bracket's 335 inner mounting circumference.

A single multi-angle male member mount bracket 335 may be used in isolation, if mounted to an extension-tube housing using one or more mount screws 332, or when used as a stand-alone special-angle hub.

An example of a 2-way 90° offset side-mount bracket module 340 is shown in FIG. 13C and comprises a 90° angle offset male member mount bracket 341 having a mount screw hole 342 accessible by a mount screw 325 and a screwdriver (not shown) through a screw-access opening 346 to enable securing of the mount bracket 341 to an elongate tubular support element, such as an extension-tube housing (not shown), with a mount screw 325. This example of the 90° offset side-mount bracket module 340 has mounted two opposing male member side-mount assemblies 110 extending longitudinally that will be positioned in parallel to an elongate tubular support element to which the side-mount bracket module 340 may be demountably engaged. It is to be noted that the combination of any of the male member mount brackets 322, 341, 335, and the like with any of clamp brackets 328, 335, and the like, or with plate wedges 445 and the like, may be referred to as a "collar clamp".

An example of a 1-way 45° offset side-mount bracket module is shown in FIG. 13D and comprises a cylindrical 45° offset male member mount bracket 351 demountably engaged with an example of a male member flat-mount assembly, which may be provided in a system assembly, as disclosed herein, to allow for demountable engagement of a male member to a flat surface. Male member flat-mount assembly 361 comprises (linked by a bolt 120) a male component 70, as previously described, mounted on another example of a wide pivot component 367, which at its other end is engaged with another example of a pivot-lock sprocket 362 for reversible locking with a pivot lock 60, which interfaces with a flat surface, described in further detail below.

There is a flat surface provided at one end of the cylindrical mount bracket 351 that has four peg holes 354 for positioning of and engagement with pivot-lock sprocket 362 by its four pegs 365. The wide pivot component 367 having four connector teeth 368 extending from one end, is inserted into slots 366 provided therefor in the pivot-lock sprocket 362 (best seen in FIG. 14A). The other end of the wide pivot component 367 has an octagonal boss 369 for extending into the octagonal recess provided therefor in the male component 70. The male assembly 361 is secured to the cylindrical mount bracket 351 by a bolt 120 inserted through bores provided therefor in the male component 70, the wide pivot component 367, and the pivot-lock sprocket 362 (through central bore 363), and then threadably engaged with a central bore 353 provided therefor in the end-face of the cylindrical mount bracket 351. At the opposite end of the bracket 351 there is an angled concave surface that is configured to matingly engage the outer surface of an elongate tubular support element, such as an extension-tube housing, not shown. Through the opposite side and out of the concave surface there is a mount screw hole 352 provided therefor to receive therein on the inside a washer 339, and from the other side, a mount screw 332 for demountable engagement of the bracket with an elongate tubular support element, such as an extension-tube housing having a square nut within a channel or housed by a middle-square nut holder within. According to further embodiments, a cylindrical mount bracket may have a concave surface at an angle other than 45° relative to the flat-mount surface. According to further embodiments, a cylindrical mount bracket may have side-mount bores around its circumference provided for sideways mounting of male member side-mount assemblies.

Figures 14A, 14B, 14C, 14D, 14E, 14F:
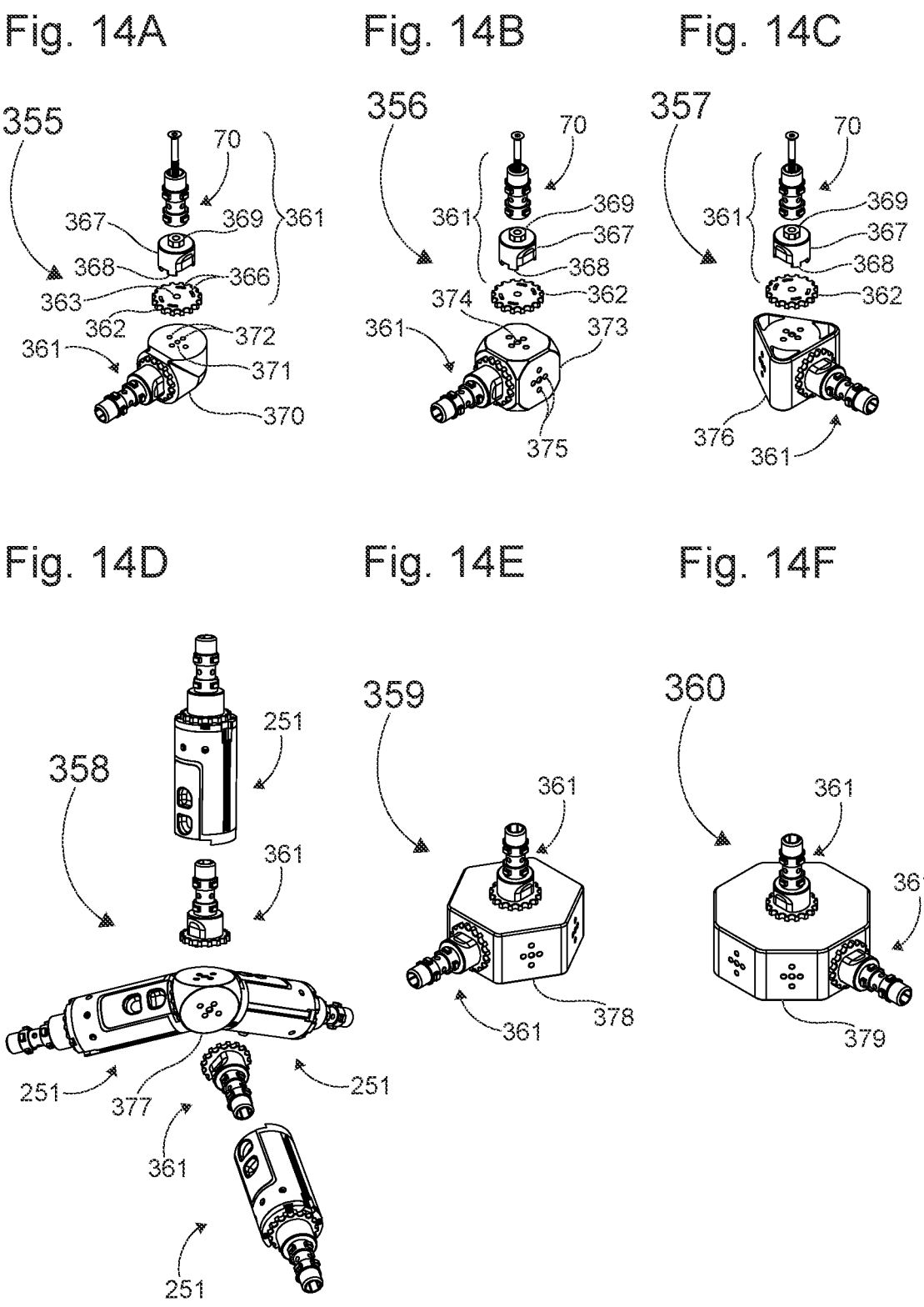
FIG. 14A shows a 90° elbow male member mounting block module.
FIG. 14B shows a cube male member mounting block module.
FIG. 14C shows a triangular male member mounting block module.
FIG. 14D shows a pyramidal male member mounting block module.
FIG. 14E shows a hexagonal male member mounting block module.
FIG. 14F shows an octagonal male member mounting block module.

An example of an elbow male member mounting block module 355 is shown in FIG. 14A and comprises a 2-way elbow male member mounting block 370 having two end surfaces, in this example at 90° from each other, and a male member flat-mount assembly 361 engaged with each end surface. Each end surface of the mounting block 370 has four peg holes 372 for positioning of and engagement with a pivot-lock sprocket 362 of a male member flat-mount assembly 361. A male member flat-mount assembly 361 is engaged with an end surface of the mounting block 370 with a bolt 120 inserted through the bores of the assembly 361 and threadably engaged with a central bore 371 provided therefor in the end surface of the mounting block 370. According to further embodiments, a 2-way elbow male member mounting block may have an angle other than 90° between the end surfaces.

An example of a cube male member mounting block module 356 is shown in FIG. 14B. The 6-way cube male member mounting block 373 has six symmetrical out-facing surfaces for engagement with up to six male member flat-mount assemblies 361 (two male member flat-mount assemblies 361 are shown in FIG. 14B). Each out-facing surface of the mounting block 373 has four peg holes 375 for receiving and engaging therein the pegs 365 of a pivot-lock sprocket 362, and a central threaded bore 374 for threadable engagement with a bolt 120 to securely mount thereto a male member flat-mount assembly 361.

An example of a triangular male member mounting block module 357 is shown in FIG. 14C with a 5-way triangular mounting block 376 having five faces for demountable engagement with up to five male member flat-mount assemblies 361 (two male member flat-mount assemblies are shown in FIG. 14C). Each face of the triangular mounting block 376 has four peg holes and central threaded bore for receiving therein and engagement therewith a male member flat-mount assembly 361.

An example of a pyramidal male member mounting block module 358 is shown in FIG. 14D and comprises a 4-way pyramidal mounting block 377 with four symmetrical out-facing surfaces, each configured for demountable engagement with a male member flat-mount assembly 361 as described for the cube male member mounting block module 356 shown in FIG. 14B. The pyramidal male member mounting block module 358 is shown in FIG. 14D demountably engaged with two male/receptacle side-opening joiner modules 251 (shown in FIG. 8), and with two additional male/receptacle side-opening joiner modules 251 with two corresponding male member flat-mount assemblies 361 shown exploded in their alignment for demountable engagement.

An example of a hexagonal male member mounting block module 359 is shown in FIG. 14E comprising an 8-way hexagonal mounting block 378 with six side faces configured for demountable engagement with up to six male member flat-mount assemblies 361, and a top-surface face and a bottom-surface face wherein each face is configured for demountable engagement with one male member flat-mount assemblies 361, with a bolt passing through the central bores of the assembly 361 and threadably engaged with a central bore in the mounting faces of the mounting block 378.

An example of an octagonal male member mounting block module 360 is shown in FIG. 14F comprising a 10-way octagonal mounting block 379 with eight side faces configured for demountable engagement with up to eight male member flat-mount assemblies 361, and a top-surface face and a bottom-surface face wherein each face is configured for demountable engagement with one male member flat-mount assembly 361.

Figure 15A:
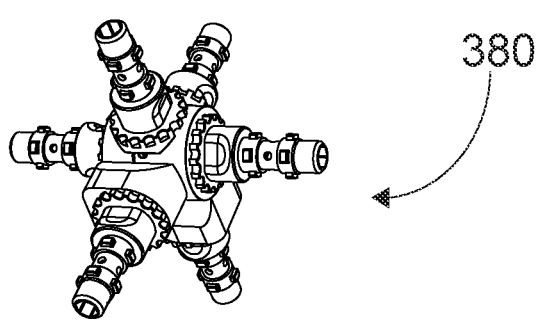
FIG. 15A is a whole perspective view of the module.
Figure 15B:
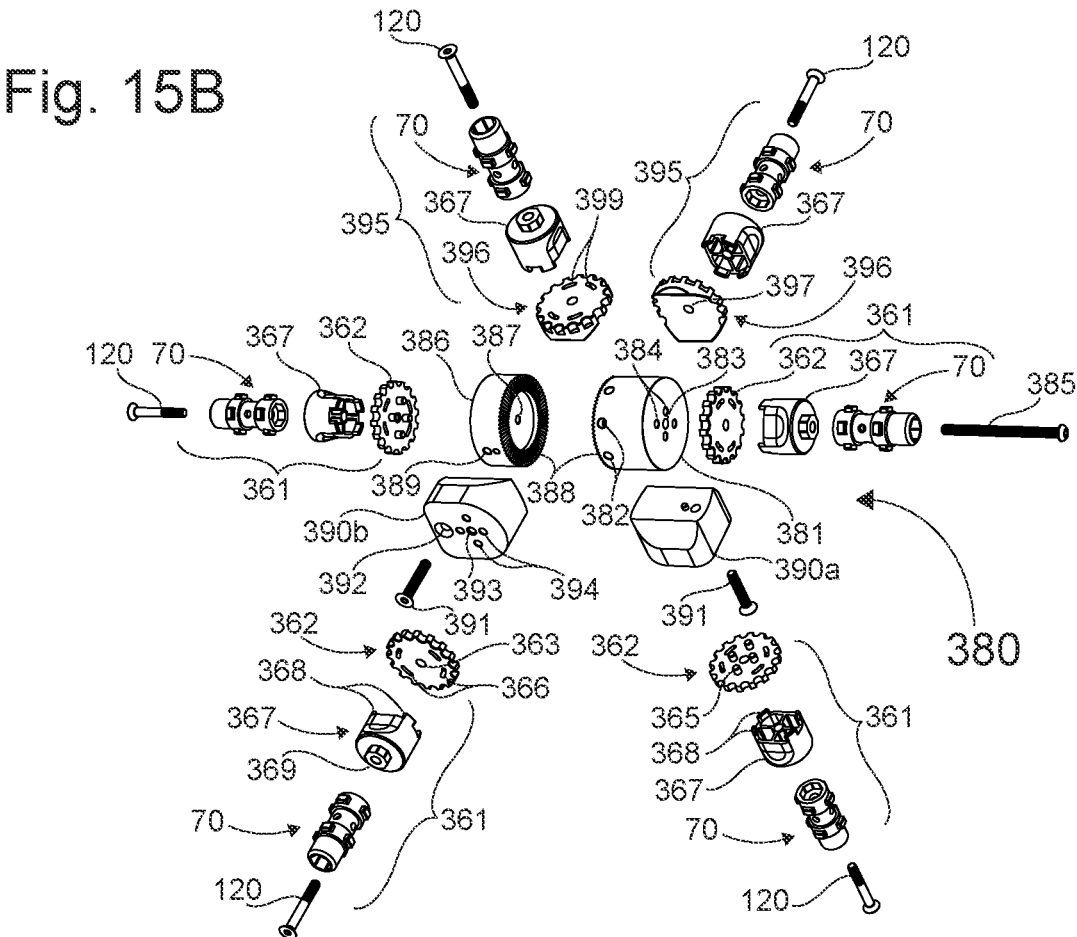
FIG. 15B is an exploded perspective view of the module.

An example of a 5° increment adjustable male member mount module 380 is shown in FIGS. 15A, 15B comprising a male-mount half housing 381 and a rotation-adjustment half housing 386 whereon male member assemblies are demountably engaged. The inward-facing end surfaces of the male-mount half housing 381 and rotation-adjustment half housing 386 are provided with intermeshing teeth 388 that enable repositionable engagement of the rotation-adjustment half housing 386 in 5° increments relative to the male-mount half housing 381, allowing for the adjustment and setting, in precise 5° increments, of the angular separation between the two lower male member flat-mount assemblies 361 which are shown in FIG. 15B exploded from the brackets 390*a*, 390*b*, to which they are mounted at peg holes 394 with a connector bolt 120, threadably engaged with the central bore 393. Prior to engagement with the flat-mount assemblies 361, brackets 390*a*, 390*b* are mounted to male-mount half housing 381 and rotation-adjustment half housing 386, respectively, by a screw 391 through their bores 392 to be threadably engaged with a mounting bore 389 (in FIG. 15B, visible only on the rotation-adjustment half housing 386). Each of their male member flat-mount assemblies 361 can then be mounted. An adjustment screw 385 is then passed through a through-hole 383 in the male-mount half housing 381 and threadably engaged with a threaded bore 387 on the inward-facing end of the rotation-adjustment half housing 386. It is optional that a flat-mount assembly 361 is additionally mounted to the outward face of the male-mount half housing 381 at peg holes 384 and through-hole 383, but therefore requiring a longer version of adjustment screw 385 than if not included in the assembly. At this stage, an adjustable hub assembly has been created, which by loosening the adjustment screw 385, the teeth 388 of the housings 381, 386 can be disengaged, allowing the relative positions of the housings to be rotated and then re-engaged at one of the 5° increments by re-tightening the adjustment screw 385. As described above, the angular separation between the two male assemblies 361 mounted on the brackets 390*a*, 390*b* can be set in 5° increments, from a maximum of 180°, to a minimum of 60° where the two brackets will come to meet.

As shown in FIG. 15, an optional male member flat-mount assembly 361 can be mounted to the outward face of the rotation-adjustment half housing 386 with a bolt 120 threadably engaged with the outer excess of center bore 387. In addition, optionally, two of another example of, as disclosed herein, a male member side-mount assembly are shown mounted to side-mount bores 382 on the circumference of male-mount half housing 381.

According to embodiments, male member side-mount assembly 395 comprises the previously described male component 70 mounted to the wide pivot component 367 mounted to another example of a pivot-lock sprocket 396 having wide pivot component slots 399 whereby component 367 may be engaged, at which time assembly 395 may be demountably engaged with a side-mount bore 382, or of another module, by a bolt 120 passing through the outer components 70, 367, and through central bore 397 in pivot-lock sprocket 396 to be threadably engaged with a side-mount bore. As mounted in FIG. 15, the side-mount assemblies 395 can provide for a variety of adjustable hub assemblies, however, it should be noted that in their use, they limit the extent to which the angular settings of the 5° increment adjustable male member mount module 380 may be adjusted, from where the bracket 390*b* on the rotation-adjustment half housing 386 meets bracket 390*a*, to where it comes to meet the nearest male member side-mount assembly 395 on the male-mount half housing 381.

Tool Support Modules and Load Support Modules:

Baseplate Modules

Some embodiments of the present disclosure relate to baseplate assemblies for incorporation into a utility support system to enable demountable engagement with a tool such as a camera or microphone or sound equipment and other types of tools into a utility support system. For example, the baseplate assemblies disclosed herein can be for mounting thereon camera-mount plates and camera accessories such as matte-box holders, focus-pull devices, and the like. The baseplate assemblies may comprise a screw mount or a clip or a dovetail plate or a box or a tray or a basket and the like for demountably engaging a variety of tools and loads.

Figure 16A:
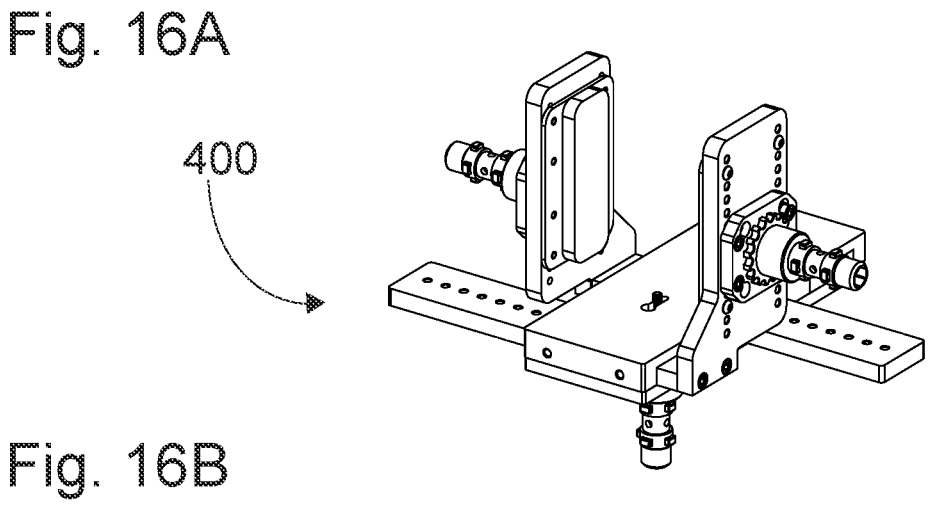
FIG. 16A is a whole perspective view of the module.
Figure 16B:
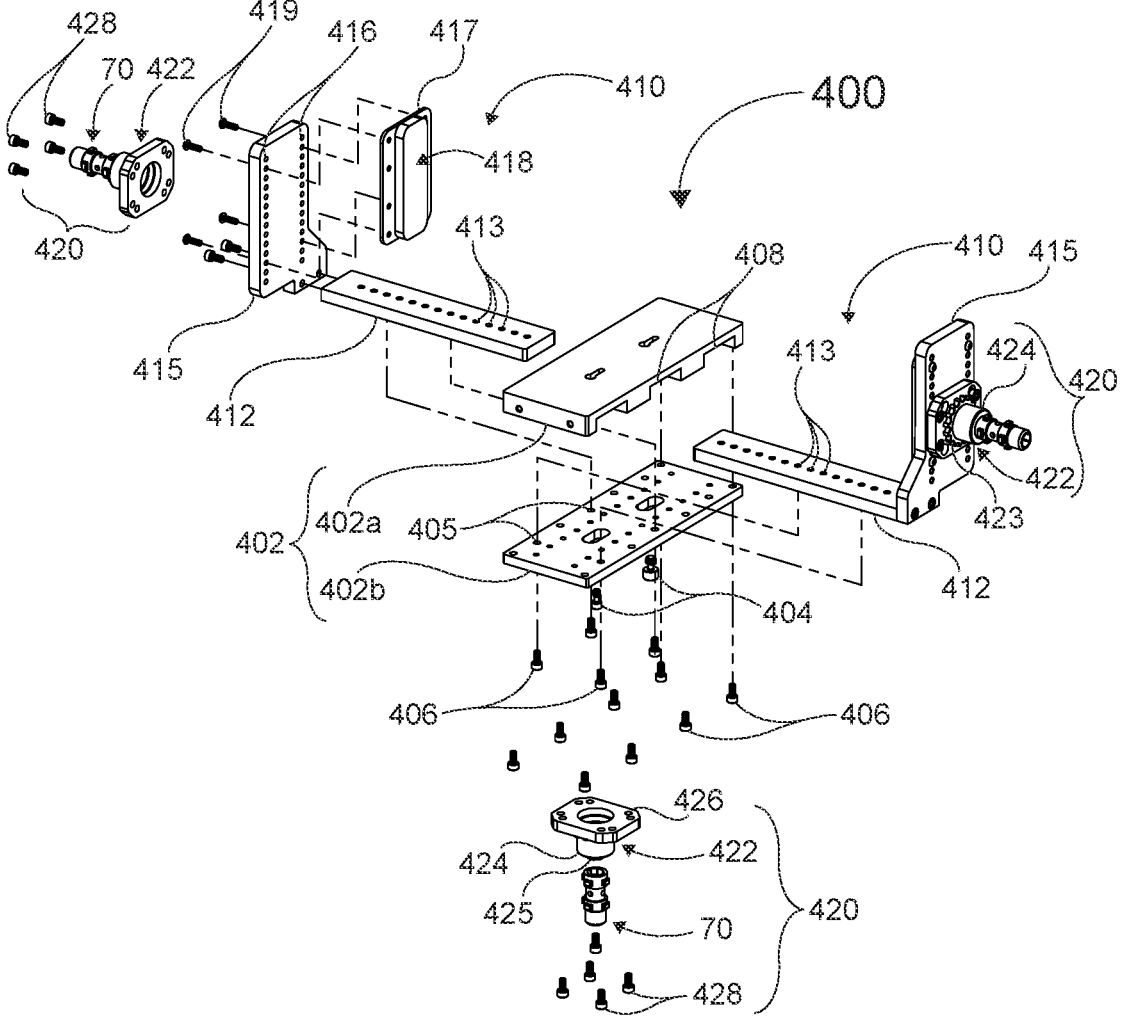
FIG. 16B is an exploded perspective view of the module.

An example of a baseplate assembly 400 suitable for demountable engagement with a film camera, high-definition video camera, DSLR, other device, or additional interfacing mount-plate or dovetail plate, is shown in FIGS. 16A, 16B (perspective view, exploded perspective view, respectively). This example of a baseplate module 400 comprises a baseplate body assembly 402 having a baseplate top plate 402a secured to a baseplate bottom plate 402b by baseplate screws 406. One or more mounting screws 404 (sized as necessary) is/are provided through slots in the baseplate body assembly 402, to threadably engage one or more mounting bores provided therefor in the base of the camera or other device or mounted component.

In this example, the baseplate top plate 402a and bottom plate 402b together define three mounting bracket slots 408 which allow for one to three offset cooperating mounting brackets 410 to be secured to the body assembly 402 in selected positions to engage and support therein varying sizes of cameras or other suitable load. Each mounting bracket 410 comprises: (i) a bracket arm 412 that is configured for sliding engagement with a mounting bracket slot 408 in the baseplate body assembly 402, (ii) a bracket side plate 415 engaged with the bracket arm 412 and extending upward therefrom, and (iii) a male member plate assembly 420 that is demountably engaged with the outward-facing surface of the bracket side plate 415.

The male member plate assembly 420 comprises a male component 70 engaged with a mounting plate 422 having an outward-facing wide pivot segment 424, octagonal boss 425, pivot lock sprocket 423, and a flat inward-facing plate surface that can be demountably engaged with the outward-facing surface of the bracket side plate 415 at selected positions with screws 428 inserted through screw holes 426 in the mounting plate 422 and threadably engaged with threaded bores 416 provided therefor in the bracket side plate 415.

An inward-facing support plate 417 with a support pad 418 secured thereon is mounted to the inward-facing surface of the bracket side plate 415 with screws 419. The support pads 418 may be positioned directly against a camera or other load, positionable as described in further detail below, to secure the camera or other load in supplementation of, or instead of, the mounting screws 404.

The bracket arm 412 has a plurality of equidistantly spaced-apart threaded bores 413 therethrough along the longitudinal axis of the arm 412. A selection of threaded bores 413 are aligned by the operator to correspond with bores 405 in the baseplate bottom plate 402b for threadable engagement with baseplate screws 406 inserted through the bores 405. The distance of the secure outward extension of the bracket arm 412 can be adjusted by selection of the spaced-apart threaded bores 413 for threadable engagement with baseplate screws 406 inserted through the bores 405, in this example to produce varying sized system format unit scale widths across the total width of the modular assembly 400 between opposed male member plate assemblies 420.

It should be noted that the male member plate assemblies 420 shown in this example are demountably engageable with a receptacle component of a rotator module or a rotator assembly disclosed herein, or with a receptacle component of a joiner module or a joiner assembly disclosed herein, or with other assemblies as disclosed herein having a receptacle component. It should be noted that, in this example, the offset of the centers of the bracket side plates 415 from the centers of the bracket arms 412 may align, when using adjacent mounting bracket slots 408, the two opposed side plates 415 and mounted male member plate assemblies 420 to provide a single axis between opposed male member plate assemblies 420. As shown, a baseplate assembly may also include a male member plate assembly 420 demountably engaged with the underside of the baseplate body assembly 402 to provide an additional axis for pivotable or fixed engagement of the baseplate assembly 400 within a system assembly.

Figure 17A:
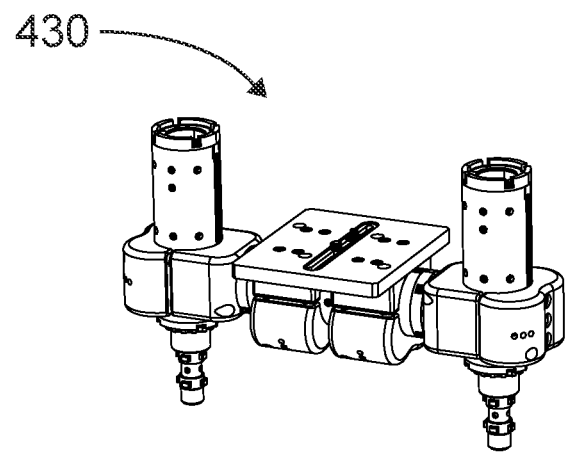
FIG. 17A is a whole perspective view of the assembly.
Figure 17B:
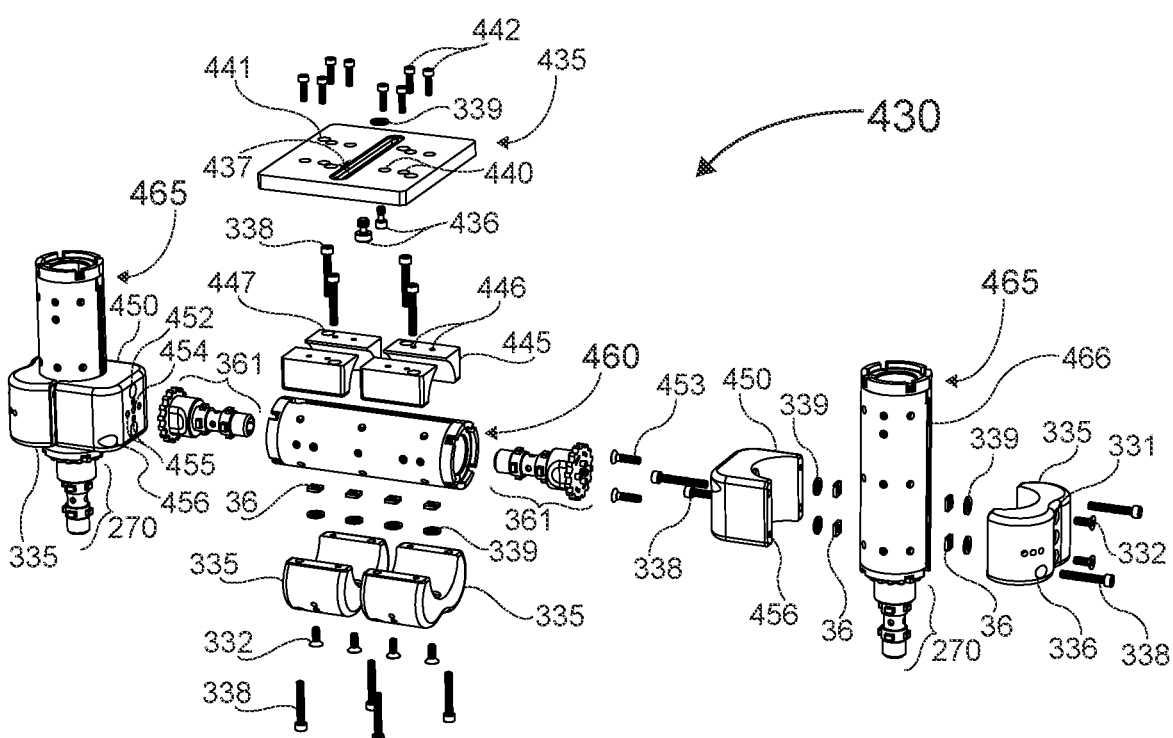
FIG. 17B is an exploded perspective view of the assembly, configured with one of a first example of a double-receptacle extension-tube joiner module and two of a first example of male/receptacle extension-tube joiner modules.

Another example of a baseplate module suitable for demountable engagement with, for example, a camera is shown in FIGS. 17A, 17B (perspective view, exploded perspective view, respectively). This example of a baseplate assembly 430 comprises a tool mount plate 435 engaged with a double-receptacle extension-tube joiner module 460 sandwiched between two male/receptacle extension-tube joiner modules 465. A pair of multi-angle male member mount brackets 335, as previously described in reference to FIG. 13B, are fitted side-by-side against the lower longitudinal section of the double-receptacle extension-tube joiner module 460 and engaged with two pairs of plate wedges 445 with four bracket screws 338 inserted through holes 447 in the plate wedges 445 and then, threadably engaged with bores provided therefor in the multi-angle brackets 335. In the opposite direction, four bracket screws 338 may be inserted through bores 336 and threadably engaged with bores in the undersides of plate wedges 445. When the bracket screws 338 are loosened, engagement with the joiner module 460 is slidable or pivotable on the given length of joiner module 460. For a secure hold, the bracket screws 338 can be tightened. Optionally, the multi-angle bracket(s) 335 can be engaged directly with a joiner module or rotator module with one or more mount screw(s) 332 threadably engaged with square nuts 36 slidably engaged within the corresponding module's square-nut channel.

The tool mount plate 435 is secured to the plate wedges 445 with screws 442 inserted through plate screw holes 440 and threadably engaged with threaded bores 446 in the plate wedges 445. A tool or other device, for example, a camera, or camera mount plate for supplementary interfacing with a camera or camera accessories, may be secured to the tool mount plate 435 with mounting screws 436 inserted into tool-mounting slot 437 and then threadably engaged with one or more mounting bores provided therefor in the base of the tool or device.

A male member flat-mount assembly 361 is engaged with a male mount slider component 450 which is then clamped to a male/receptacle extension-tube joiner module 465 by a multi-angle bracket 335 with bracket screws 338 inserted through bores 336 provided therefor in the multi-angle bracket 335 and then threadably engaged with bracket screw bores 456 in the male mount slider component 450, and through opposing bores 456 in the slider component 450 threadably engaged with a second pair of opposed bores 336 in the multi-angle bracket 335. The clamped-together slider component 450 and multi-angle bracket 335 may be repositioned on the joiner module 465 by loosening the bracket screws 338, selecting a new position, and then re-tightening the bracket screws 338.

The position of the clamped-together male mount slider component 450 and multi-angle bracket 335 along the male/receptacle extension-tube joiner module 465 may be additionally secured and adjusted as follows. A pair of square nuts 36 is inserted into each of the opposed longitudinal channels 466. Two mount screws 332 are inserted through mounting holes 331 provided therefor in the multi-angle bracket 335 and are threadably engaged with one of the pairs of square nuts 36 (a pair of washers 339 is interposed the inner face of the multi-angle bracket 335 and the extension-tube joiner module 465). Two mount screws 453 are inserted through mounting holes 452 provided therefor in the male mount slider component 450 and are threadably engaged with the other pair of square nuts 36 (a pair of washers 339 is interposed the inner face of the male mount slider component 450 and the extension-tube joiner module 465). The mount screws 453 and the mount screws 332 are loosened after which, the clamped-together male mount slider component 450 and multi-angle bracket 335 may be slid along the male/receptacle extension-tube joiner modules 465 to a selected position, after which, the screws 453 and 332 are re-tightened. Optionally, only one pair of screws 453, 332 may be used in conjunction with only one square-nut channel 466.

It should be noted that a baseplate assembly or other modular assembly may use a male mount slider component 450 in isolation, or clamped together in a pair in the same manner as described above in combination with a multi-angle bracket 335. It should also be noted that a male mount slider component 450 may by its width provide a unit scale extension, of for example 30 mm, of its central male member mounting bore 454 out from the circumference of the module to which it is mounted. In the example of baseplate assembly 430, this feature provides a unit scale width across the module.

Positioned with peg holes 455 and secured with a bolt threadably engaged with central bores 454, the male member flat-mount assemblies 361 extending toward the center of the baseplate assembly 430 from the male mount slider components 450, are demountably engaged with receptacles at the opposite ends of the double-receptacle extension-tube joiner module 460. In assemblies wherein screws 332 and square nuts 36 are not engaged with the longitudinal channel in the underside of joiner module 460, the supported tool mount plate 435 may be rotated about the double-receptacle extension-tube joiner module 460 to a desired position by slightly disengaging the bracket screws 338 with a tool inserted through access bores 441 provided therefor in the tool mount plate 435, and through bracket screw bores 336 provided therefor in the multi-angle brackets 335, and then rotating the tool mount plate 435 to a desired position and then reengaging the bracket screws 338. Alternatively, for an open and intermittently lockable 360° pivotable connection of the tool mount plate 435 to the outer assemblies, the joiner module 460 may be replaced with a double-receptacle rotator module such as the previously cited example rotator module 151 shown in FIG. 4.

The baseplate assembly 430 may be securely engaged within a larger utility or structural support assembly by one or both of the two joiner modules' 465 receptacles, or by one or both of the two joiner modules' 465 male member extension-tube end assemblies 270, or by the addition of male member side-mount assemblies 110, 395 (not shown) to one of the joiner modules 465 or multi-angle brackets 335.

Tray Modules

Figures 18A, 18B:
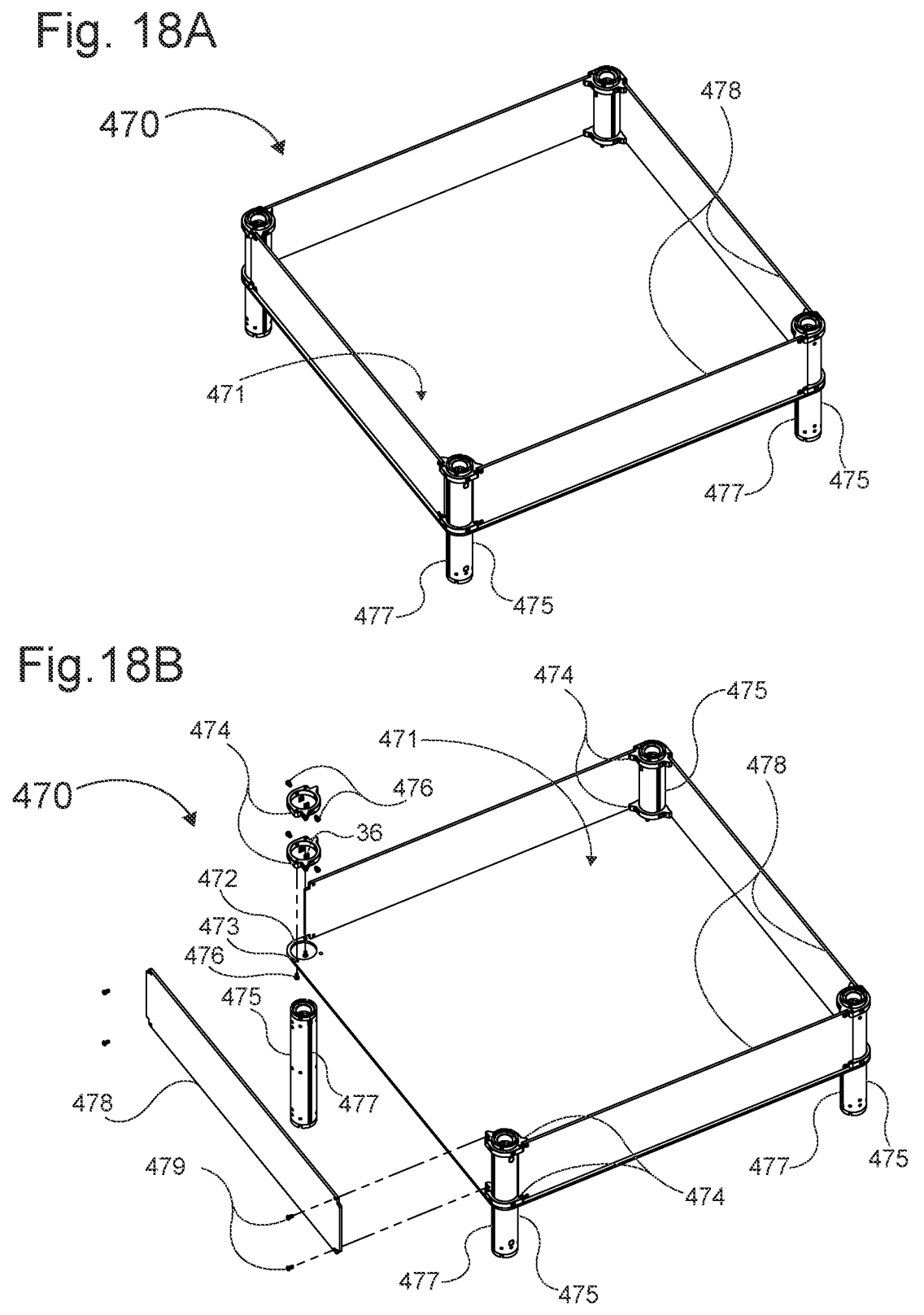

Some embodiments of the present disclosure relate to tray modules that can be incorporated into utility system assemblies. An example of a tray module assembly 470 is shown in FIGS. 18A, 18B (perspective view and partially exploded perspective view, respectively) comprising a tray bottom 471 which has an orifice 472 at each corner. It is to be noted that a tray bottom may be rectangular or square or trapezoidal or triangular or pentagonal or hexagonal or heptagonal or octagonal in shape. An example of a square-shaped tray bottom 471 is shown having four orifices 472 at each corner for insertion and reversible engagement of extension-tube joiner modules or extension-tube rotator modules of varying lengths, which may optionally act as a system assemblies' structural corner posts. Adjacent to each orifice 472, tray bottom 471 additionally comprises collar bores 473 whereby a collar 474 is demountably secured to the tray bottom 471 with collar screws 476 passed through the collar bores 473 into threaded bores in the collar 474.

In this example of a tray module 470, there is provided four of a second example of a double-receptacle extension-tube joiner module 475 (here longer than joiner module 460 shown previously in FIG. 17) passed through the combined four collars 474 and tray bottom 471. The extension-tube joiner modules 475 can be demountably secured therein within the center of each collar 474 by collar screws 476 passed through side-facing bores in the collar, and threadably engaged with square nuts 36 placed within the longitudinal square-nut channels 477, or alternatively, housed by a receptacle socket assembly or middle square-nut holder within a module's extension-tube housing. The collars 474 may additionally comprise side-facing threaded bores at which side panels 478 can be demountably secured with side panel screws 479 passed through bores in the side panels 478 to be threadably engaged with the collars 474. For added reinforcement, optionally the top ends of the extension-tube joiner modules 475 and side panels 478 are secured to four additional collars 474, as shown. Wherein an assembly in which the collars 474 are engaged along the square-nut channels 477 of the corner modules, a tray bottom 471 and side panels 478 assembly may be raised or lowered on its corner modules by loosening the collar screws 476, selecting a new position, and then retightening the collar screws. It is to be noted that tray bottoms and tray sides disclosed herein may also be referred to as "flat sheet stock".

Such tray modules can be incorporated into utility system assemblies for use to hold and transport equipment, tools, materials, supplies, and the like around a worksite or other location, or alternatively, for use in shelving systems or staging platforms. The tray modules may be pivotably engaged into a utility system assembly where mounted on rotator modules, thereby providing a load-dumping function, if so desired. The tray modules can also be incorporated into platform assemblies or table assemblies or workstation assemblies.

Table Modules

Figures 19A, 19B:
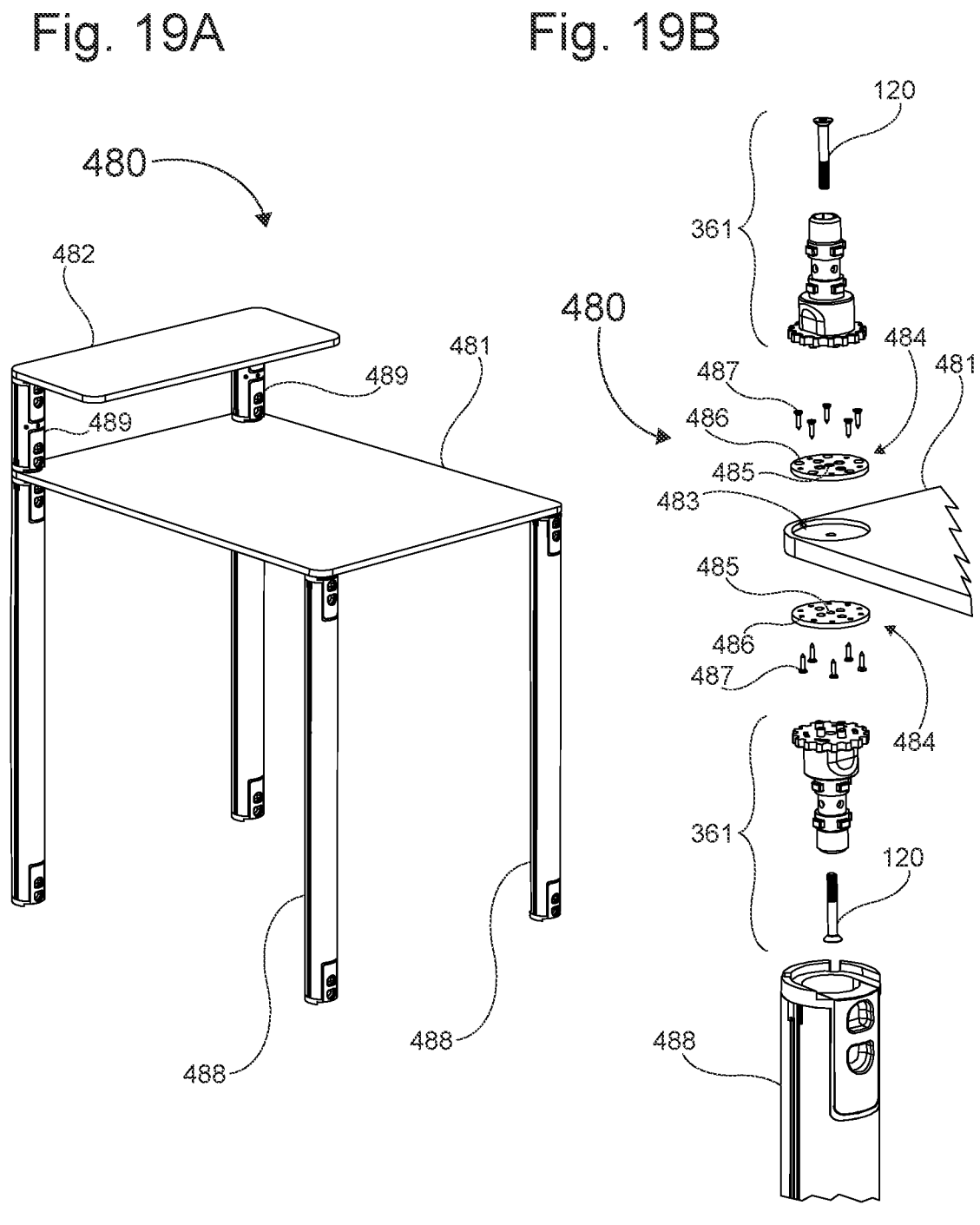
FIG. 19A is a whole view.
FIG. 19B is a partial exploded view showing some details of the assembly, configured with two of a first example of double-receptacle side-opening joiner modules and four of a second example of double-receptacle side-opening joiner modules.

Some embodiments of the present disclosure relate to table and desk and shelf module assemblies that can be assembled using some of the modules disclosed herein, and may also be used to assemble staging platforms. An example of a desk assembly 480 is shown in FIG. 19A and comprises a desk top 481 with an example of a double-receptacle side-opening joiner module 488 engaged at each corner. It is to be noted that a desk top or a table top may be rectangular or square or trapezoidal or triangular or pentagonal or hexagonal or heptagonal or octagonal or circular or oval in shape. If so desired, a shelf 482 may be provided engagement with, for example, a pair of a second example of double-receptacle side-opening joiner modules 489 mounted to the desk top 481. An example of how a double-receptacle side-opening joiner module 488 may be engaged with a desk top 481 is shown in FIG. 19B. A recess, not visible in FIG. 19B but identical to recess 483 on the top surface of the desk top 481, is provided on the bottom surface of the desk top 481 at each corner. A mounting plate 484 with a central threaded bore 485 is inserted into the recess and securely mounted to the desk top 481 with, for example, five screws 487 inserted through bores 486 provided therefor in the mounting plate 484. It should be noted that a mounting plate may be circular or oblong or triangular or square or rectangular or trapezoidal or hexagonal or octagonal in shape and providing varying numbers of screw bores 486.

A male member flat-mount assembly 361 is mounted to the plate 484 with a mounting bolt threadably engaged with the threaded bore 485. Then, the male member flat-mount assembly 361 is inserted into the receptacle in the end of a double-receptacle side-opening joiner module 488 and secured in place as described for side-opening joiner module 251 in reference to FIG. 8B. Alternatively, there may be provided for mounting one or more of a rotator module, or one or more of a joiner module as described, for example, double-receptacle extension-tube joiner module 460 in reference to FIG. 17B. If a shelf 482 is to be added, then a plate 484 is inserted into a recess 483 provided therefor in the desk top surface and secured in place with screws 487 inserted through bores 486. A male member flat-mount assembly 361 is mounted to the plate 484 with a mounting bolt threadably engaged with the threaded bore 485, after which, the male member flat-mount assembly 361 is inserted into a receptacle in the end of a double-receptacle side-opening joiner module 489, or alternatively, a receptacle of another double-receptacle module. A pair of plates 484 and male member flat-mount assemblies 361 are mounted to the bottom of the shelf 482 and secured into, as shown, receptacles in the other ends of double-receptacle side-opening joiner modules 489.

Lighting Mount Modules

Figures 20A, 20B, 20C, 20D:
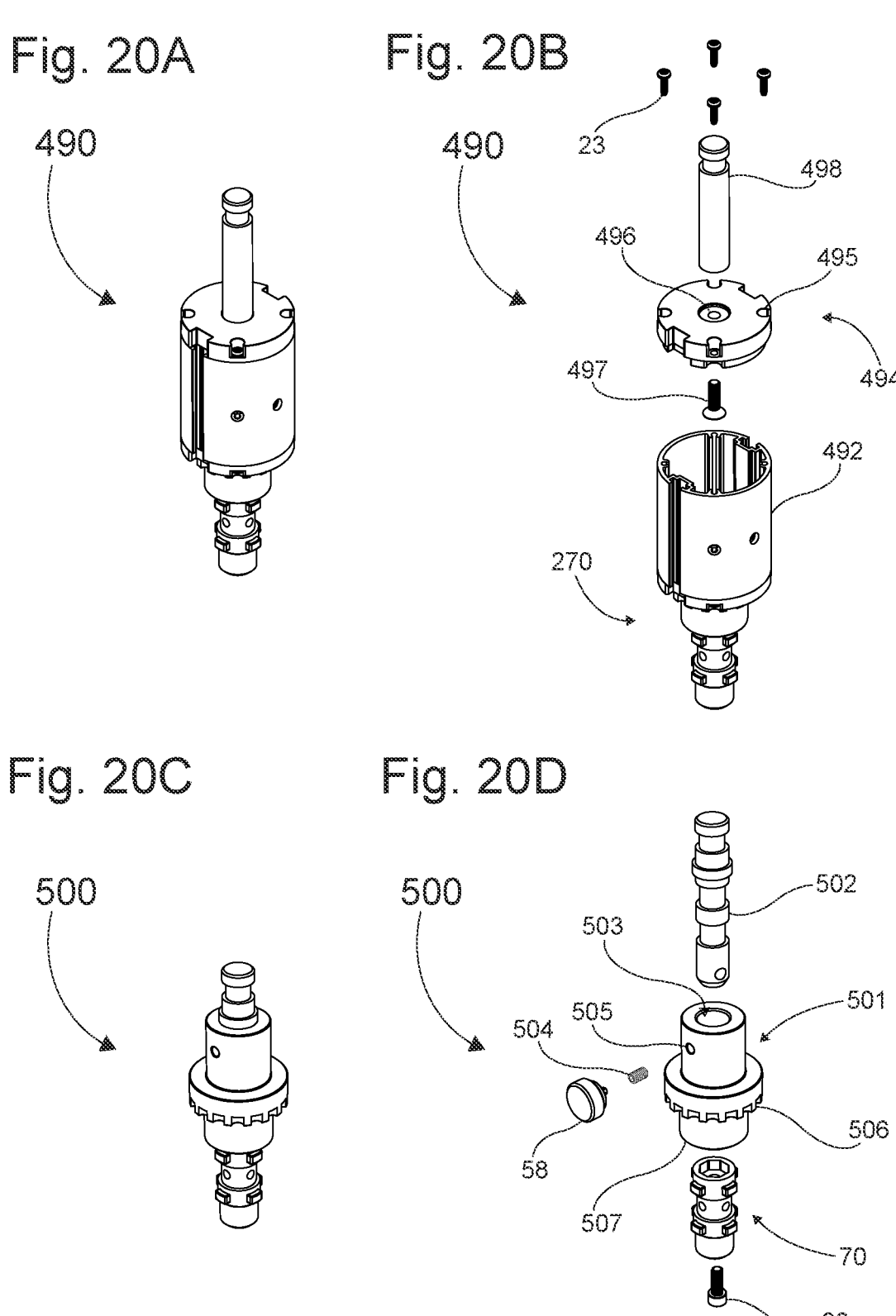
FIGS. 20A and 20B are a whole view and a partially exploded view, respectively, of a ⅝" spigot lighting mount module.
FIGS. 20C and 20D are a whole view and an exploded view, respectively, of a spigot-adapter lighting mount module.

Some embodiments of lighting mount modules that provide attachment means for demountable engagement of lighting equipment or other similar types of equipment into some utility system assemblies, are shown in FIGS. 20A to 20D. One example of a lighting mount module 490 is shown in FIGS. 20A, 20B and comprises an extension-tube housing 492 having a male member extension-tube end assembly 270 secured at one end. A spigot 498 is threadably engaged with a spigot mount plate 494 by a screw 497 inserted through a threaded bore 496 in the spigot mount plate 494. The spigot assembly is then mounted to the other end of the extension-tube housing 492 with screws threadably engaged with screw bores provided therefor in the extension-tube housing 492.

Another example of a lighting mount module 500 is shown in FIGS. 20C, 20D and comprises a spigot-adapter male member component 501 comprising a wide pivot segment 507 at one end to which is secured a male component 70 with a screw 90 threadably engaged with a bore in the octagonal boss of the wide pivot segment 507. The spigot-adapter male member component 501 has a pivot-lock sprocket 506 situated about its midpoint, and a spigot receptacle 503 at its other end. A spigot 502 is inserted into the spigot receptacle 503 and secured in place with a set screw 504 inserted through screw bore 505 and then tightened with a tension-adjustment screw knob 58 or other screwdriver.

Base Modules:

Rail-Rolling Modules

Figures 21A, 21B:
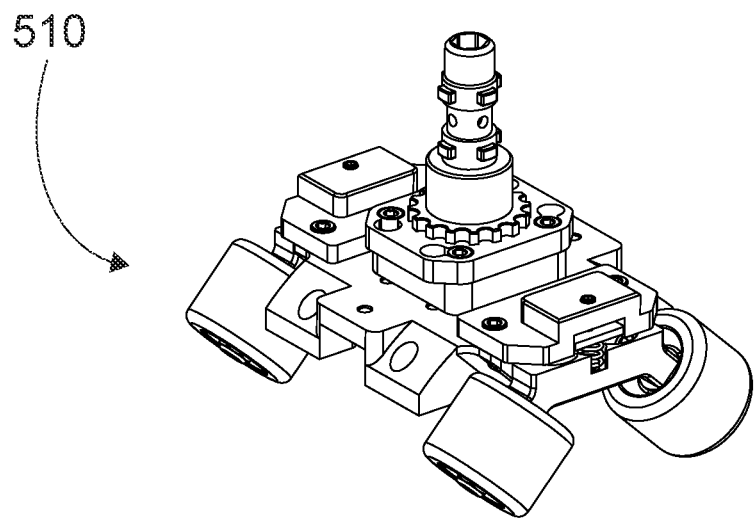
FIG. 21B is a perspective view of an example of a rail-surround rolling module.
Figure 22:
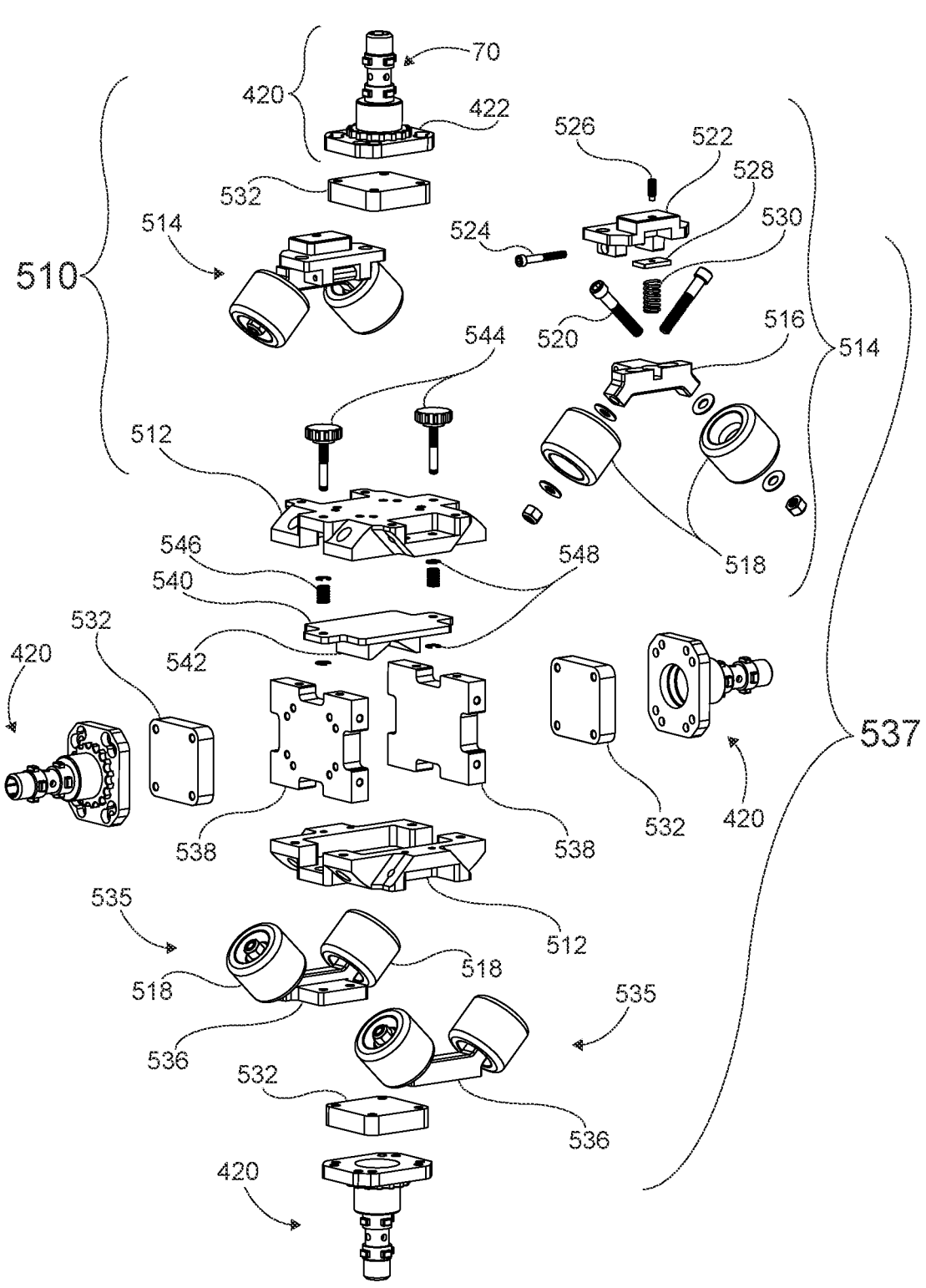
FIG. 22 is an exploded perspective view of the rail-rolling modules shown in FIG. 21.

Some embodiments of the present disclosure pertain to rail-rolling modules and assemblies that are configured for demountable engagement of, for example, a motion-picture camera that can be conveyed along a rail track system in filmmaking or videography. Similar assemblies may be used to convey along a rail track system other devices, tools, equipment, materials, properties, and the like around a worksite or other location. Some examples of rail-rolling modules and assemblies are shown in FIGS. 21A, 21B, and 22.

An example of a rail-rolling module 510 (FIG. 21A, 22) comprises two pairs of spring-suspension roller assemblies 514 engaged with a carriage plate 512 and has an upward-extending male member plate assembly 420. Each roller assembly 514 comprises an axle block 516 with downward-extending ends with bores therethrough for receiving axle bolts 520. A washer is placed onto each axle bolt 520, then a roller 518, another washer, and then a lock nut which rotationally secures the roller 518 to the axle block 516. One end of a spring block 522 is rotationally attached approximate one end of the axle block 516 with a suspension bolt 524. The other end of the spring block 522 has a recess for receiving therein a spring tension plate 528 and a spring 530 biased against the other end of the axle block 516. The tension of the spring can be adjusted by tightening or loosening a spring tension set-screw 526 provided therefor in the spring block 522. The pair of spring-suspension roller assemblies 514 are mounted to opposing ends of the carriage plate by screws (not shown) through bores in the spring block 522 into threaded bores provided therefor in the top of the carriage plate 512. Approximate the center of the carriage plate, a spacer plate 532 is optionally mounted by screws (not shown) whereon a male member plate assembly 420 comprising a male component 70 engaged with a mounting plate 422, is mounted to the top surface of the spacer plate 532, completing the rail-rolling module 510. It is optional to additionally attach to the rail-facing surface of the carriage plate 512, a friction-pad plate 540 with a rail-facing friction pad 542 to modulate the speed of motion of the rail-rolling module 510 along a rail track system, if so desired. The friction-pad plate 540 is attached to the carriage plate 512 with a pair of partially-threaded tension adjustment knobs 544 threadably engaged at their upper section with bores provided therefor in the carriage plate 512. Around each knob's 544 unthreaded lower section (which is passed partially through an unthreaded bore in the friction pad plate 540), there is provided, from top to bottom, an upper retaining ring 548 held within an upper neck (adjacent below the threaded section) in the knob shaft, and interposed that ring and the plate 540 a spring 546 which, when the knob 544 is extended downward by turning, the upper retaining ring 548 applies pressure on the spring against the plate 540, thereby increasing the tension of the friction pad 542 against a rail (not shown). The remaining section of the knob shaft passes through the plate 540 whereby a second lower retaining ring 548, held within a lower neck of the shaft, prevents separation of the plate 540 from the knobs 544.

A rail-rolling module may alternatively comprise, in place of the two spring-suspension roller assemblies 514, two fixed roller assemblies 535 (described in further detail below), when spring-loaded suspension of the module upon a rail is not desired.

An example of a rail-surround rolling module assembly 537 (FIG. 21B, 22) comprises a second carriage plate 512 (having engaged at each end a fixed roller assembly 535), mounted to a rail-rolling module 510 by at least one side plate 538, and optionally, using two side plates 538. The fixed roller assemblies 535 each comprise an axle block 536 to which is secured a pair of rollers 518 as described for the spring-suspension roller assemblies 514. The two axle blocks 536 are mounted with screws (not shown) onto the second carriage plate 512, which is then mounted with screws (not shown) to one end of the side plate(s) 538. A rail-rolling module 510 is engaged with the opposite end of the side plate(s) 538 thereby forming a rail-surround rolling module assembly 537. The rail-surround rolling module assembly 537 is particularly useful for safely and securely conveying camera equipment, or other device, tool, equipment or supported load, along rail track systems that are not horizontally flat, including vertical or inclined rails, and one or more curved rails. It is optional to modify a rail-surround rolling module assembly 537 by mounting a male member plate assembly 420 to a second spacer plate 532 and/or to the one or two side plates 538, for up to four outwardly extending male member assemblies provided for interconnection of the modular assembly within a structural support system. It is optional to exclude the from one to four spacer plates 532 and engage the male member plate assemblies 420 directly to the carriage plates 512 and side plates 538, if so desired, resulting in varying widths between opposed male member plate assemblies 420, allowing optionally for modular unit scale widths or other total widths.

Additional rail-surround rolling modules may alternatively comprise assemblies with four spring-suspension roller assemblies 514 or four fixed roller assemblies 535. Also, additional rail-surround rolling modules may alternatively comprise assemblies with one, two, or no friction pad plates 540 and friction pads 542. Additionally, a rail-surround rolling module may be assembled in a configuration of the inverse of assembly 537 wherein the carriage plates 512 and roller assemblies 514 or 535 are faced outward, connected centrally by one of a double-receptacle module demountably engaged with the now inward-facing male member plate assemblies 420, and engaged upon two opposed rails.

Wheel Modules

Other embodiments of the present disclosure relate to wheel modules which may provide a transporting or mobility feature within a utility system assembly. The various wheel modules and wheel module assemblies include steerable assemblies or open 360° pivotable caster assemblies or caster-style assemblies.

Figures 23A, 23B, 23C, 23D:
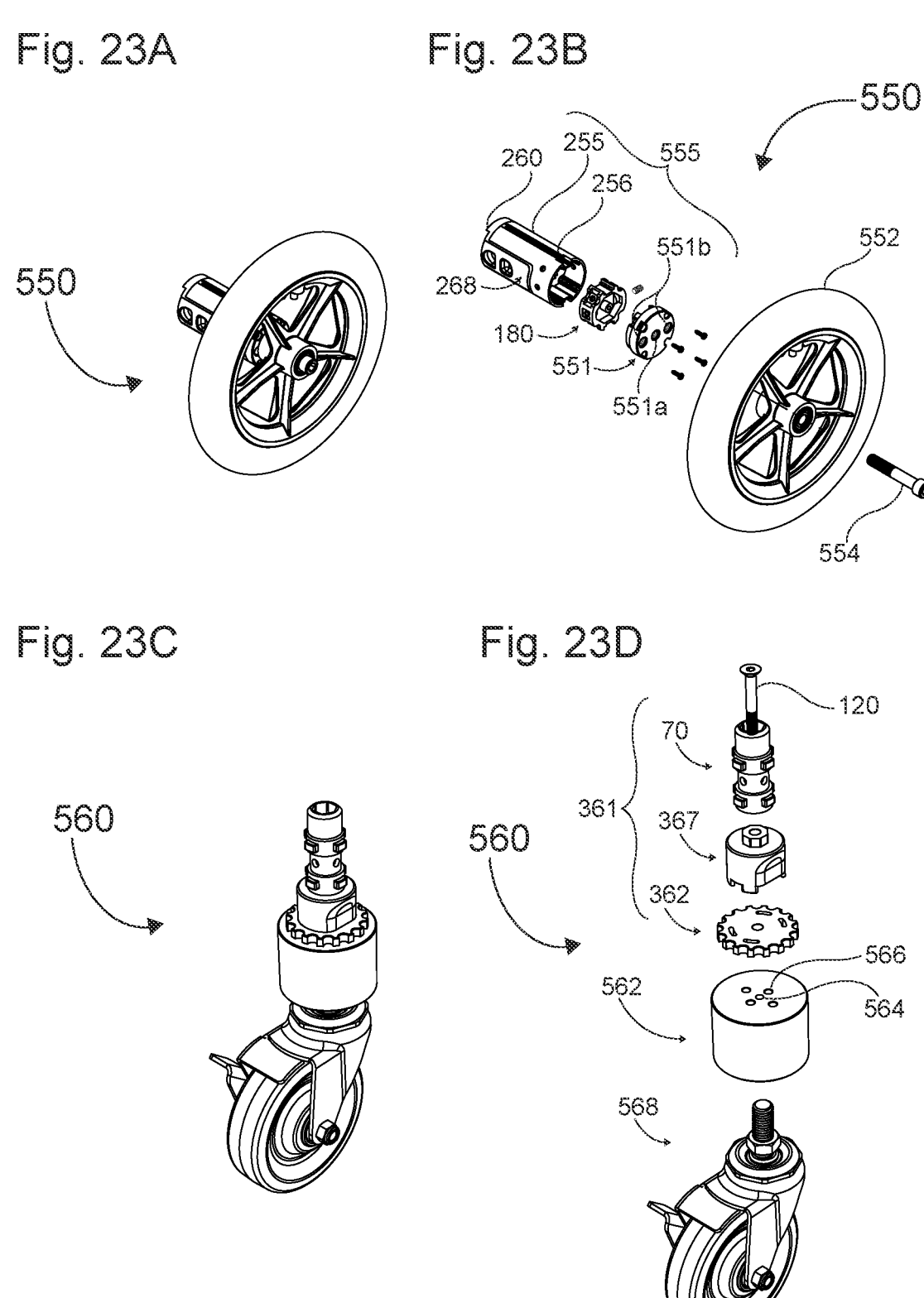

One example of a wheel module assembly 550 is shown in FIGS. 23A, 23B and comprises a wheel-axle/receptacle side-opening joiner module 555 to which a wheel 552 is rotationally engaged with an axle bolt 554. The side-opening joiner module 555 comprises an extension-tube housing 255 with opposed longitudinal square-nut channels 256 and a middle square-nut holder 180 housed therein, a side-opening receptacle component 260 with a side-opening receptacle cover 268, and a wheel-axle tube-end component 551 engaged with mounting screws. The wheel-axle tube-end component 551 has a central threaded bore 551*a* and two offset threaded bores 551*b*. The axle bolt 554 may be threadably engaged with the central threaded bore 551*a* or alternatively, one of the two offset threaded bores 551*b*, wherein the offset bores 551*b* allow for a wheel module assembly to act as a caster.

Another example of a wheel module according to the present disclosure is a caster wheel module assembly 560 illustrated in FIGS. 23C, 23D wherein a pivoting or fixed caster wheel 568 is threadably engaged with a bore provided therefor in a mount component 562. A male member flat-mount assembly 361 is engaged with the mount component 562 by its pivot-lock sprocket's 362 pegs within the peg holes 566 and the threaded engagement of a bolt 120 with threaded bore 564.

Foot Modules

An example of a leveling foot module 580 is illustrated in FIGS. 24A and 24B (perspective and exploded perspective views, respectively) and comprises a male member flat-mount assembly 361 engaged with a mount component 562 in the same manner as described for caster assembly 560 in reference to FIG. 23D. An adjustable foot component 581 has a foot end 583 from which extends a threaded leveling rod 582 with which a nut 584 is threadably engaged. The adjustable foot component 581 is threadably engaged with a bore provided therefor in the mount component 562 until the nut 584 abuts the base of the component and may be tightened. The distance that the foot end 583 stably extends from the mount component 562 is adjustable by threading nut 584 along the threaded leveling rod 582 toward or away from the foot end 583 prior to threadably engaging the threaded leveling rod 582 with the bore in the mount component 562.

An example of a foot plate module 585 is shown in FIG. 24C and comprises a foot plate 586 having threaded bores 587 about the centre of the foot plate 586 to which, a male member plate assembly 420 is mounted by threadable engagement of screws 428 inserted through bores in the mounting plate 422 into bores 587.

Pivotable Support Modules

An example of a pivotable support module 590 is shown in FIGS. 25A to 25C and comprises a male member plate assembly 420 secured to a pivot bracket 592 with mounting plate screws 428 inserted through bores provided therefor in the mounting plate 422 and the pivot bracket 592 and then threadably engaged with lock nuts 593. A pivotable pad component 594 with opposing threaded bores 595 is inserted into the pivot bracket 592, and secured in a desired position by threadable engagement of knobs 598 with the threaded bores 595 (FIGS. 25A, 25B). Washers 599 may be slipped over the threaded portions of knobs 598 before they are threadably engaged with threaded bores 595 to facilitate ease of loosening and tightening the knobs into and out of the pad component 594 when rotatable adjustment of the position of the pad component 594 is desired. The pivotable support module 590 is shown rotatably engaged with a suction-cup component 596 in FIG. 25C for demountable engagement with glass or another smooth surface.

Weight Modules

Figure 26A:
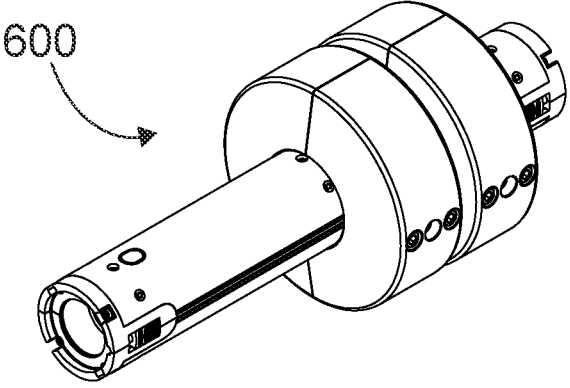
FIG. 26A is a whole view and FIG. 26B is a partially exploded view of the assembly configured with one of a second double-receptacle extension-tube rotator module.
Figure 26B:
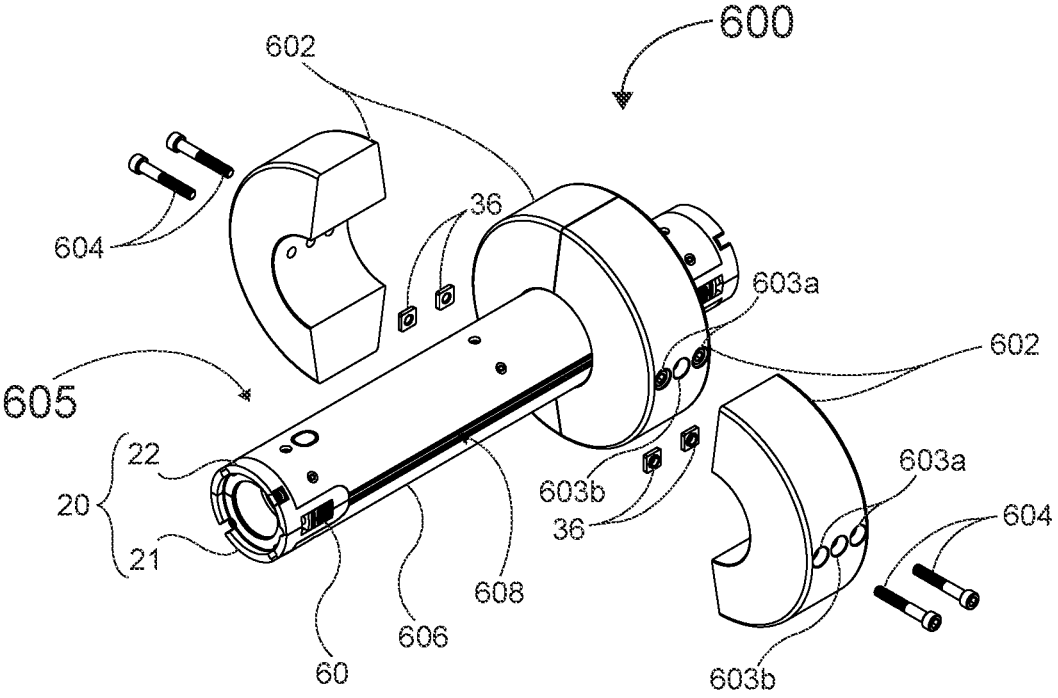

An example of a weight module assembly 600 is shown in FIGS. 26A, 26B and comprises weight components 602 demountably engaged with another example of a double-receptacle extension-tube rotator module 605 with an extension-tube housing 606 having a pair of opposing longitudinal square-nut channels 608 for slidable engagement therein of a plurality of square nuts 36, as described for double-receptacle extension-tube rotator modules 151 and 152 in reference to FIGS. 4 and 5. The inner surface of a first weight component 602 is abutted to the extension-tube housing 606 and a bolt 604 is inserted into an outer bore 603*a* provided therefor in the weight component 602 and then threadably engaged with a square nut 36 housed within the square-nut channel 608. A second bolt 604 is inserted into the other outer bore 603*a* provided therefor in the first weight component 602 and then threadably engaged with a second square nut 36 housed within the square-nut channel 608. A second weight component 602 is abutted to the extension-tube housing 606 opposite the first weight component 602 and threadably engaged with square nuts 36 housed in the opposite square-nut channel 608 with two bolts 604 inserted through bores 603a in the second weight component 602. Alternatively, one or a pair of weight components 602 may be mounted through center bore 603b with a bolt 604 passed through a side-mount bore of an extension-tube housing to be threadably engaged with a square nut held by that module's receptacle assembly or middle square-nut holder. It is optional to similarly threadably engage one or more additional weight components 602 to the extension-tube housing 606 if a heavier counterbalance or base weight is desired for the weight module assembly 600.

Telescoping Extension Modules

Figure 27A:
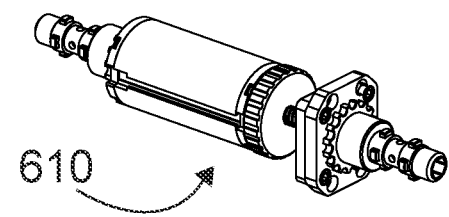
FIG. 27A is a whole perspective view.
Figure 27B:
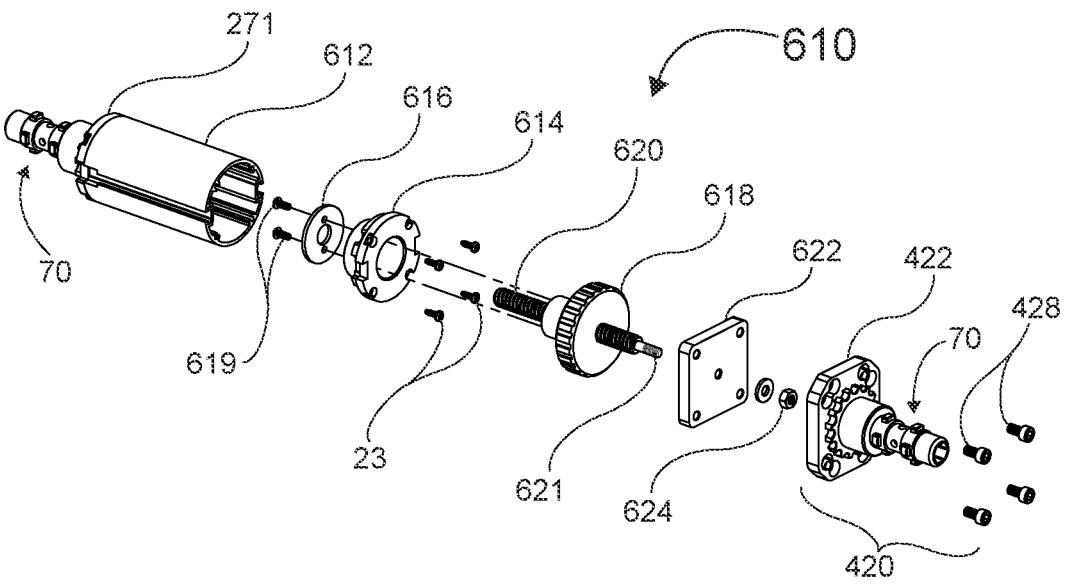
FIG. 27B is an exploded perspective view.
Figure 27C:
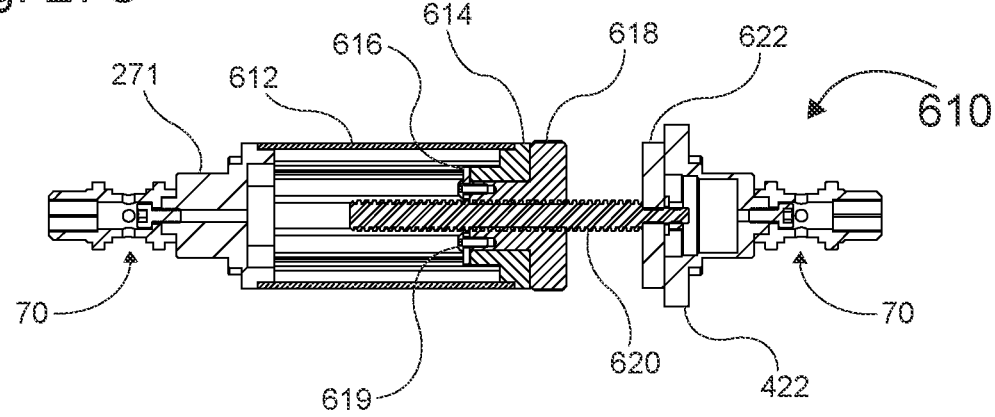
FIG. 27C is a cross-sectional view showing the threaded rod and retaining components contained therein.

An exemplary telescoping extension module 610 is illustrated in FIGS. 27A, 27B, and 27C (perspective, exploded perspective, and longitudinal cross-sectional view, respectively) and generally comprises an extension-tube housing 612 having a male member tube-end plate 271 to which is mounted a male component 70. The other end of the extension-tube housing 612 is fitted with a telescoping assembly comprising a rod-retaining component 614 which is mounted to the end of the extension-tube housing 612 with four screws 23. A rod-retaining plate 616, with a center bore for receiving therethrough a threaded rod 620, is mounted against the inner-facing surface of the rod-retaining component 614 and to, with screws 619, the inner-facing surface of an adjustment collar component 618, the inner section of which passes through the center of the rod-retaining component 614. The collar component 618 and plate 616 securely but rotationally sandwich the rod-retaining component 614 which secures the assembly within the extension-tube housing with the screws 23. The adjustment collar component 618 has a threaded bore therethrough which threadably engages the threaded rod 620. The distal end of the threaded rod 620 has a narrower diameter threaded portion 621 that is inserted through a bore provided therefor in a spacer plate 622 and secured thereto by threadable engagement with a washer and lock nut 624. A male member plate assembly 420 (See FIG. 16B and related description for reference) is mounted to the spacer plate 622 by screws 428 inserted through bores provided therefor in the mounting plate 422 and threadably engaged with threaded bores provided therefor in the spacer plate 622.

An operator may extend the male member plate assembly 420 away from the extension-tube housing 612 by rotating clockwise the adjustment collar component 618, which advances outwardly the threaded rod 620 and mounted male member plate assembly 420 until a desired outward extension of the male member plate assembly 420 is achieved. An operator may reversely retract the male member plate assembly 420 by rotating the adjustment collar component 618 in a counter-clockwise direction. When an approximate desired length of the rod extension is achieved, the male member plate assembly 420 and threaded rod 620 may be rotated a small amount in either direction to properly orient the mounted male component 70 and corresponding receptacle module (not shown) where required.

End-Cap Modules:

The following examples of end-cap modules, shown in FIGS. 28 to 33, provide a variety of structural end component functionalities for uses including as hand grips or feet or bumpers or landing pads or general protective closures of a system assembly's exposed male assemblies or receptacle assemblies.

An example of a grip end-cap module 625 that may be optionally used as a hand grip or a foot or a bumper is illustrated in FIGS. 28A to 28E, and comprises a handle grip component 626 and an outer sleeve 631 that rotationally cooperates with the handle grip component 626. The handle grip component 626 comprises at one end a semi-circular end-cap portion 627, a middle elongate hand grip portion 628, and at the other end an inner sleeve 629. In this example, four prong-retaining slots 630 are provided in the form of recesses within a cavity within the hand grip portion 628 that may receive and secure a corresponding number of linear sets of prongs of a co-operating module's male component 70 (not shown). When in an open position as shown in FIG. 28D, a co-operating module's male member assembly including male component 70 can be inserted into the grip end-cap module 625 after which, the outer sleeve 631 can be rotated into the closed position as shown in FIG. 28E, whereby its retainer tabs 632 overlap the prong-retaining slots 630 thereby securing the male component 70 by securing its prongs 82 (shown for example in FIGS. 1, 2) within the prong-retaining slots 630.

Figure 29A:
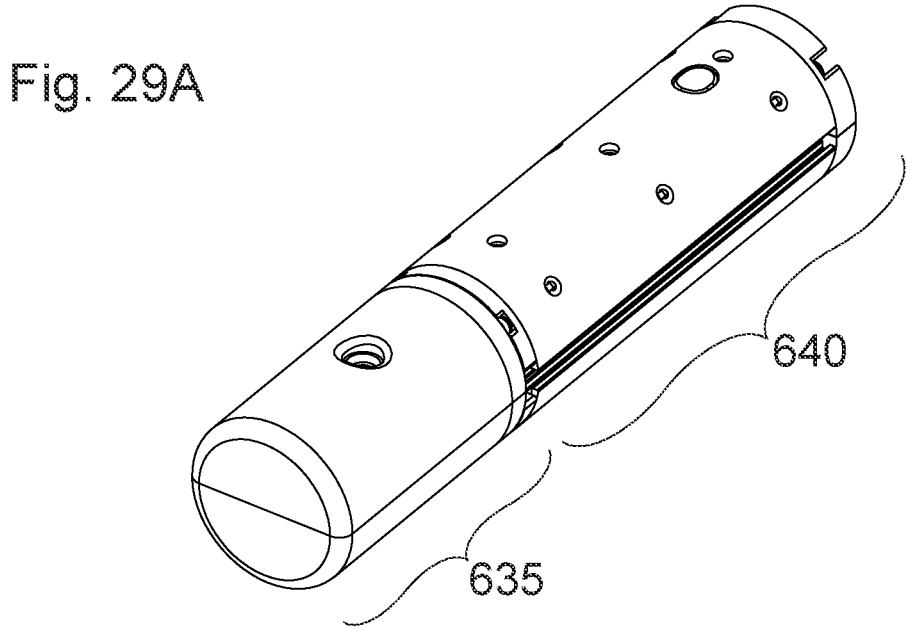
FIG. 29A is a whole view and FIG. 29B is a partially exploded view.
Figure 29B:
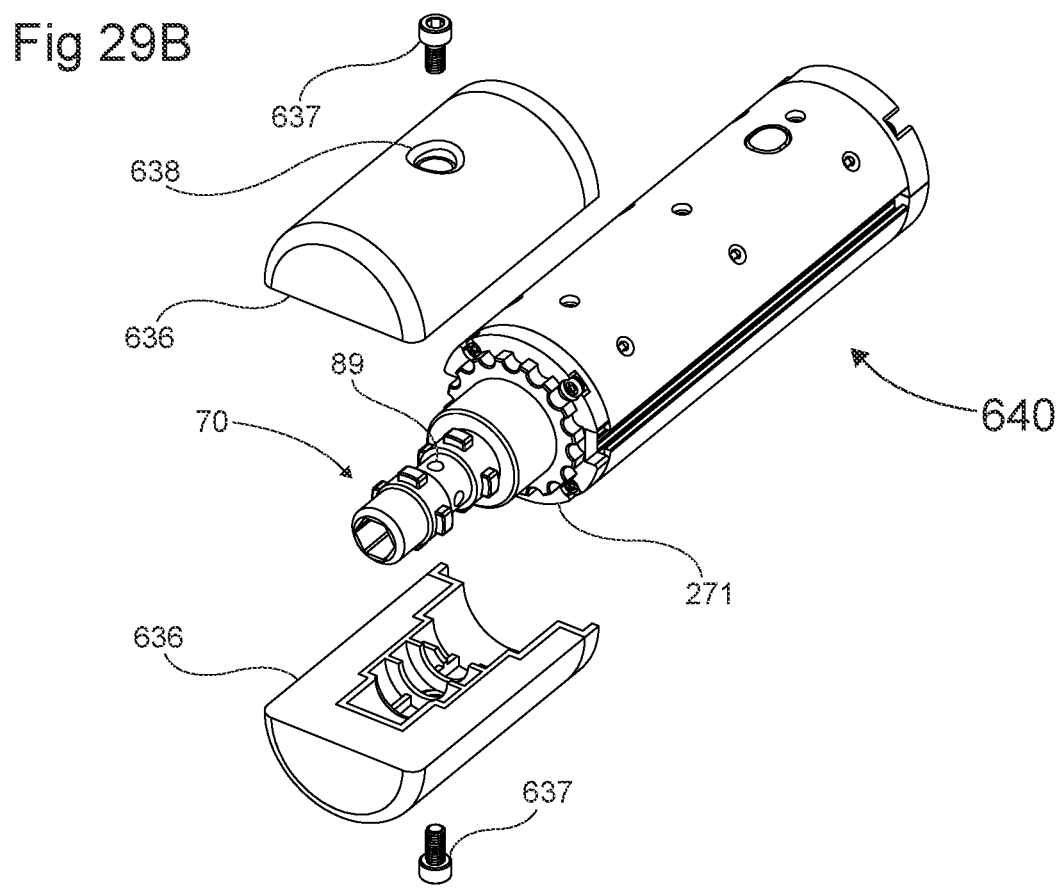

Another example of an end-cap module is a shell end-cap module 635 illustrated in FIGS. 29A, 29B that is mounted on a male/receptacle extension-tube rotator module 640. The shell end-cap module 635 comprises a pair of matching half-shell caps 636 that are demountably engaged with the male component 70 of the male/receptacle extension-tube rotator module 640 with screws 637 inserted through bores 638 provided therefor in the half-shell caps and threadably engaged with threaded bores 89 in the neck of male component 70.

Figures 30A, 30B, 30C, 30D:
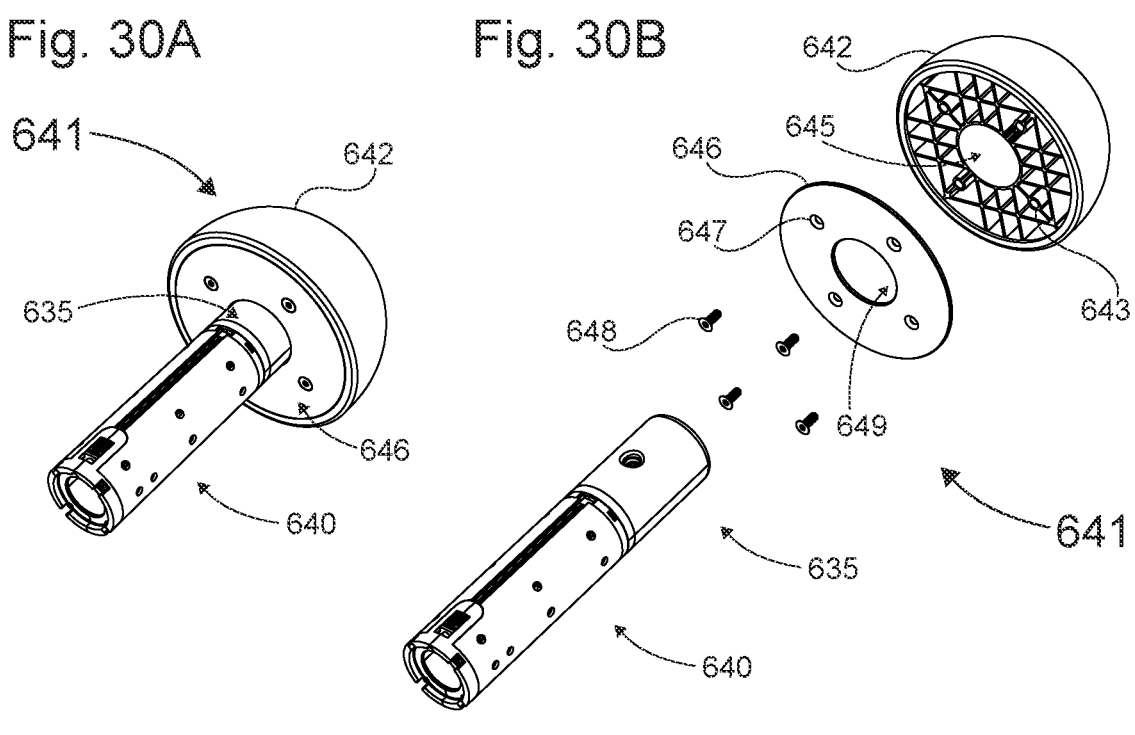
FIGS. 30C and 30D are a whole perspective view and an exploded perspective view of an example of a male dome pad end-cap module fitted with a male member flat-mount assembly.

An example of a female dome pad end-cap module 641 is illustrated in FIGS. 30A and 30B, and comprises a female dome pad 642 having a collapsible framework 643 with a central orifice 645. A female dome mounting plate 646 is mounted to the framework 643 with screws 648 inserted through bores 647 provided therefor in the mounting plate 646 and threadably engaged with threaded channels or threaded inserts provided therefor in the framework 643. The female dome mounting plate 646 has an orifice 649 that is aligned with the orifice 645 in the framework 643. The orifices 649, 645 are sized to slidingly but frictionally engage the shell end-cap module 635 that is engaged with male/receptacle extension-tube rotator module 640 (shown in FIG. 29) or another module.

An example of a male dome pad end-cap module 650 is shown in FIGS. 30C, 30D and comprises a male dome pad 652 having a collapsible framework 653. A male member flat-mount assembly 361 is mounted with a bolt to a male dome mounting plate 654 at a threaded bore 656 and peg holes 657. The male dome mounting plate 654 is mounted to the framework 653 with screws 648 inserted through bores 658 in the mounting plate 654, and then threadably engaged with threaded channels or threaded inserts provided therefor in the collapsible framework 653.

Figure 31A:
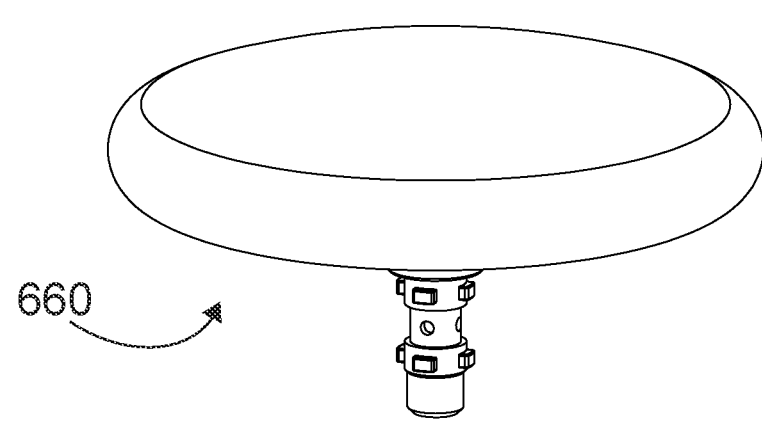
FIG. 31 shows a whole perspective view and an exploded perspective view FIGS. 31A and 31B, respectively of an example of a seat module fitted with a male member plate assembly.
Figure 31B:
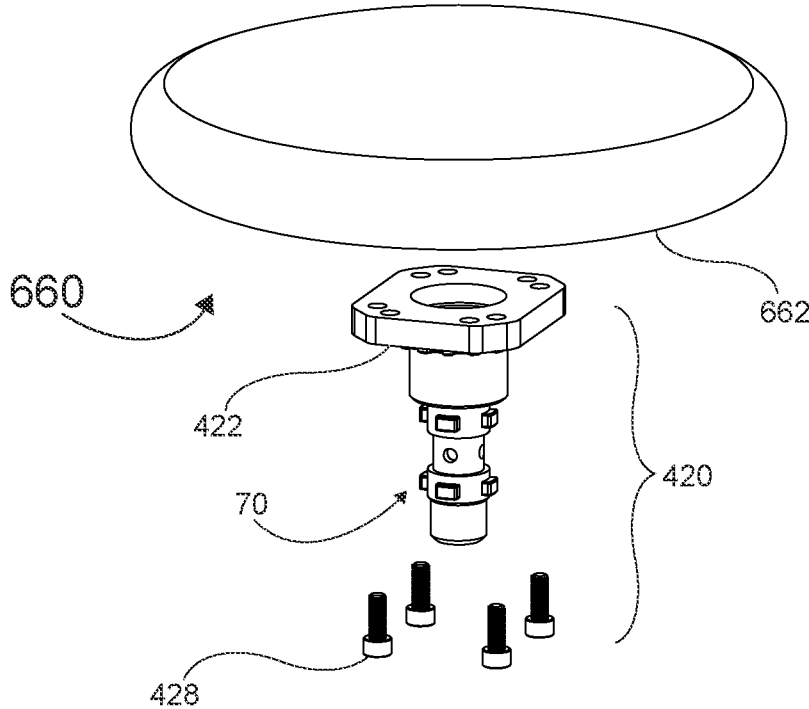

Some embodiments of the modules disclosed herein include seat end-cap modules that can be incorporated into a utility system apparatus configured for a ride-along dolly setup, or alternatively, in stool or bench assemblies. An example of a seat module 660 is shown in FIGS. 31A and 31B, and comprises a seat pad 662 to which a male member plate assembly 420 is mounted by screws 428 inserted through bores provided therefor in the mounting plate 422, and then threadably engaged with threaded bores (not visible in FIG. 31) provided therefor in the seat pad 662.

Figure 32A:
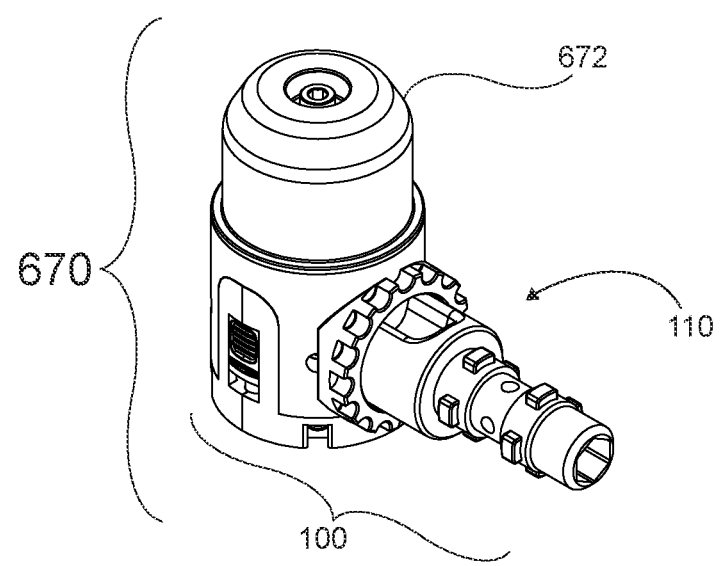
FIG. 32 shows a whole perspective view and an exploded perspective view FIGS. 32A and 32B, respectively of an example of a bumper end-cap module.
Figure 32B:
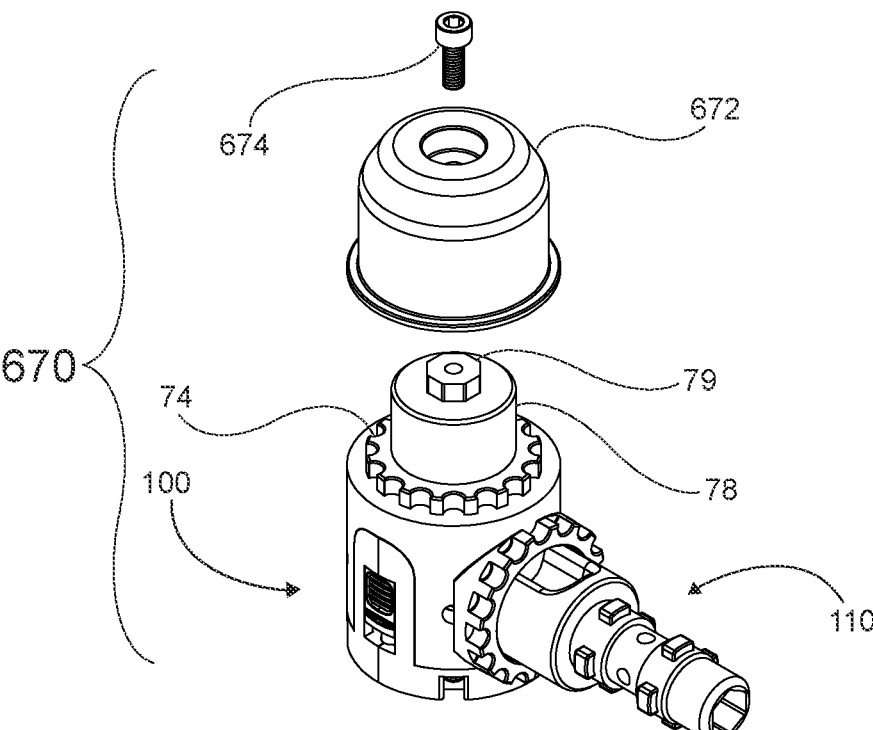

An example of a bumper end-cap module 670 is shown in FIGS. 32A, 32B mounted on a closed-tube rotator hub assembly 100 with a laterally extending male member side-mount assembly 110 (first seen in FIG. 3A). A bumper component 672 is slipped over the wide pivot segment 78 of the rotator hub assembly 100 and secured in place by a screw 674 inserted through an orifice provided therefor in the bumper component 672 and then threadably engaged with the threaded bore of the octagonal boss 79 extending upward from the wide pivot segment 78.

Figures 33A, 33B, 33C, 33D, 33E, 33F:
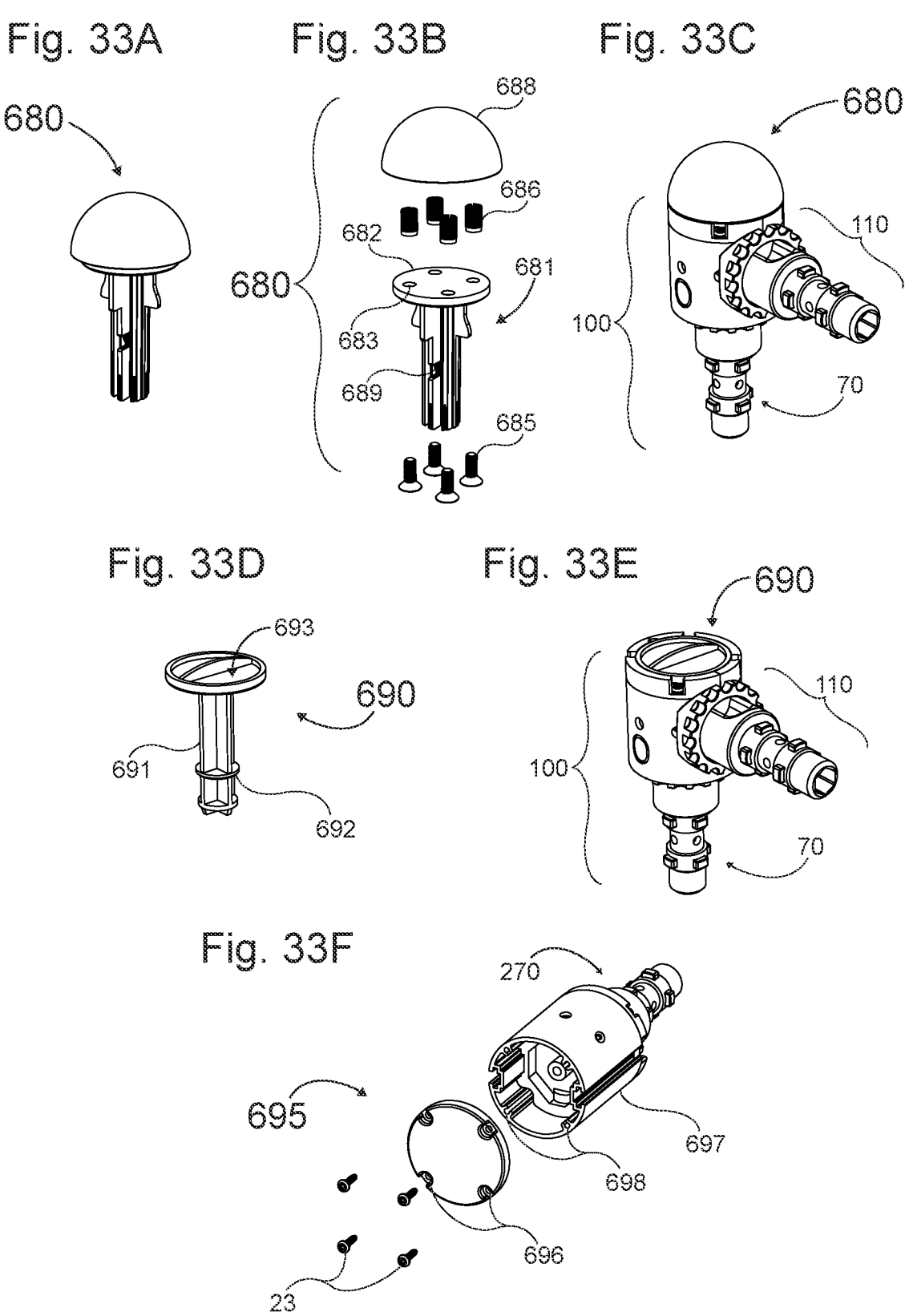
FIG. 33C is a perspective view of the soft end-cap component mounted into a closed-tube rotator hub assembly.
FIG. 33D is a perspective view of a hard end-cap component and FIG. 33E is a perspective view of the hard end-cap component mounted into a closed-tube rotator hub assembly.
FIG. 33F is an exploded perspective view of a flat end-cap component shown with an extension-tube housing.

A variety of additional end-cap components according to some embodiments of the present disclosure are illustrated in FIGS. 33A to 33F. One example of a soft end-cap component 680 is shown in FIGS. 33A to 33C and comprises a soft semi-spherical dome component 688 into which are engaged four inserts 686 with threaded bores. An elongate leg component 681 with an integral mount plate 682 having four bores 683 therethrough is mounted to the dome component 688 with four screws 685 inserted through the four bores 683 and then treadably engaged with the four inserts 686 within the dome component 688. The soft end-cap component 680 may be engaged, for example, with the receptacle component of a closed-tube rotator hub assembly 100, as shown in FIG. 33C. When in use in a side-opening receptacle, the component 680 may be securely engaged by a screw threadably engaged with threaded bore 689.

An example of a hard end-cap component 690 useful for covering and protecting any unused receptacle in a rotator module or joiner module incorporated into any utility system assembly according to the present disclosure, is shown in FIGS. 33D, 33E. This example of a hard end-cap component 690 has a flat outward-facing surface 693 with a pull-tab extending across the surface 693 and an elongate downward-extending leg component 691 with a radial retaining-lock chamfer 692 which, when the hard end-cap component 690 is inserted into a receptacle of a rotator receptacle assembly 20 or joiner receptacle assembly 220, presses back a co-operating retaining half-lock with spring receptacles 52 until passed through the half-lock whereby the hard end-cap component 690 is secured within the receptacle until the retaining lock 50 is released. FIG. 33E shows the hard end-cap component 690 engaged with the rotator receptacle assembly of a closed-tube rotator hub assembly 100.

A simple flat end-cap component 695 shown in FIG. 33F can be secured to an open end of any type of extension-tube housing disclosed herein. The flat end-cap component 695 has four bores 696 around its periphery through which screws 23 may be inserted and threadably engaged with threaded screw slots 698 provided at one end of an exemplary extension-tube housing 697 engaged with a male member extension-tube end assembly 270 at its other end.

Unit Scale

The exemplary modules disclosed herein may be configured with various materials over a range of sizes to facilitate assembly of the utility systems and support structures for use in a variety of applications. For ease-of-use and system-wide modular interconnectivity and cross-compatibility, a modular unit scale can be used across all modules of a system format. In the construction of various embodiments, the unit scale can have varying sizes depending on the intended use of the modular system. The sizing and proportions as stated and illustrated is for descriptive purposes only, informing the relative function and compatibility of the interconnecting modules between one another, and not to be intended to limit any modules of the present disclosure to these values or proportions.

According to some embodiments of the present disclosure, a suitable system format has tube modules with a unit scale standard of a 2-unit diameter, where a unit may equal, for example, 30 millimeters. Although receptacles 11, 211 and a complimentary male member assembly 71, 110, 270, 361, 395, 420 may be longer than 2 units, closed-tube modules 10/201 comprise the closed-tube housings 15/215 which provide for a 2-unit modular unit scale length facilitating hub assemblies having a 2 unit by 2 unit cubed modular unit scale, wherein the receptacle assemblies 20, 220 overlap within the hollow center of the wide pivot segments of the closed-tube housings 15/215. According to some embodiments, exemplary rail-rolling modules 510 and rail-surround rolling module assemblies 537 can provide up to a 2-way or a 4-way unit scale configuration, respectively, wherein male member plate assemblies 420 attached to co-operatively sized spacer plates 532 combine to give, for example, a 6-unit modular width between the male member plate assemblies 420 across the rail-rolling modules 510, 537 allowing for their parallel configurability with other modules of the same system format.

By use of a unit scale across the modules of a system format, calculating and configuring the parts needed to reach an end-use assembly is facilitated. Also in the instance of a series of extension-tube modules, for example, providing the length upon which a rail-rolling module 510, 537 may travel, the unit scale lengths may provide to the operator a visual guide of distance travelled, whether by the points of connection, or the modules' side-mount bores that may be included along the length of their extension-tubes, and which may also provide connection points for an end-cap module, for example, to be positioned as a stopper, for example, at a desired position along an extension-tube module rail track assembly.

Kits

According to some embodiments disclosed herein, a group of one or more of the various types of modules disclosed herein may be provided together in a kit for assembly into specified types of modular utility system assemblies or support structures for various functional requirements. Irrespective of the end-use system assembly or the type or number of modules, kits of the present disclosure may additionally comprise, or be packaged with, instruments or tools for assisting with the assembly of the system, and/or hard copy or software based instructions for assembling the same.

Customizable Assemblies

The modular units of the present disclosure can be interconnected into a wide variety of utility system assemblies and support structure assemblies that can be designed for a wide variety of applications. In this way, a utility system or support structure can be customized for a particular application using a selected combination of interconnected modules of a given system format, or, using an adapter joiner module 311 or other fastener, modules of multiple system formats. The broad range of configurability allows systems to be assembled in a wide range of sizes and functional design for a broad range of end-user requirements. For example, it is contemplated that the modules of the present disclosure can be interconnected to form utility systems or support structures that include, without limitation, carts, dollies, tracks, cranes, lifts, stands, racks, tables, workstations, seating, bed-frames, shelving, storage, staging, railings, partitions, toy systems, and the like. Optionally, a system assembly may be combined with third party tools, mechanisms, and systems for varying end-use requirements.

According to embodiments, the modules disclosed herein can be selected and interconnected to assemble a plurality of customized tool/load support assemblies which can be configured for use in, for example, filmmaking and/or videography and/or still photography applications, including but not limited to, camera, microphone, and lighting positioning and mobility support systems, and in other embodiments, as carts and stands for other equipment and properties, in variety of industries or household applications.

To gain a better understanding of the embodiments disclosed herein, the following examples of utility system assemblies and support structure assemblies are described.

EXAMPLES

Figure 44:
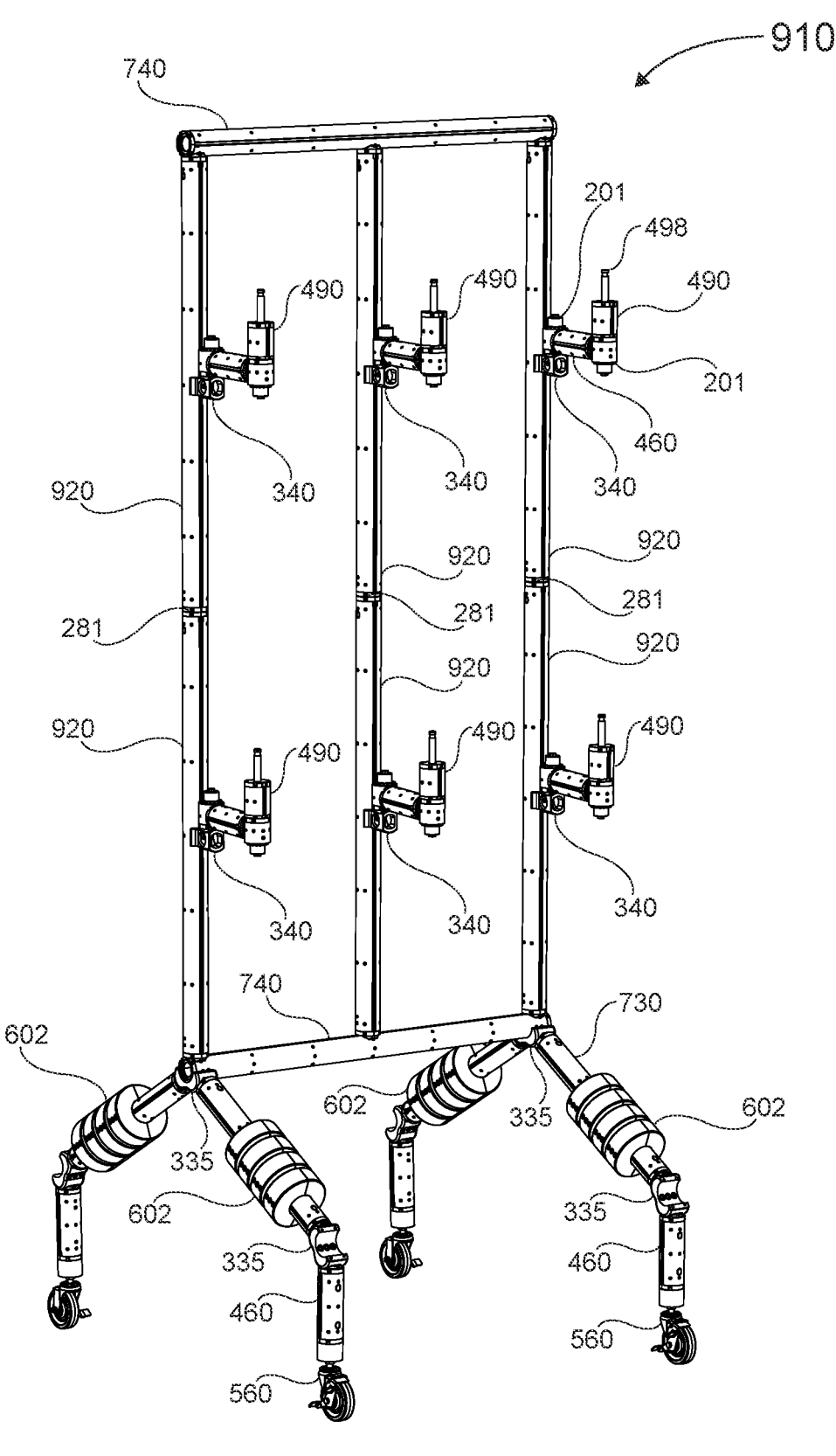
FIG. 44 is a perspective view of an example of a lighting support rack system assembled with some of the modular components disclosed herein.
Figure 45:
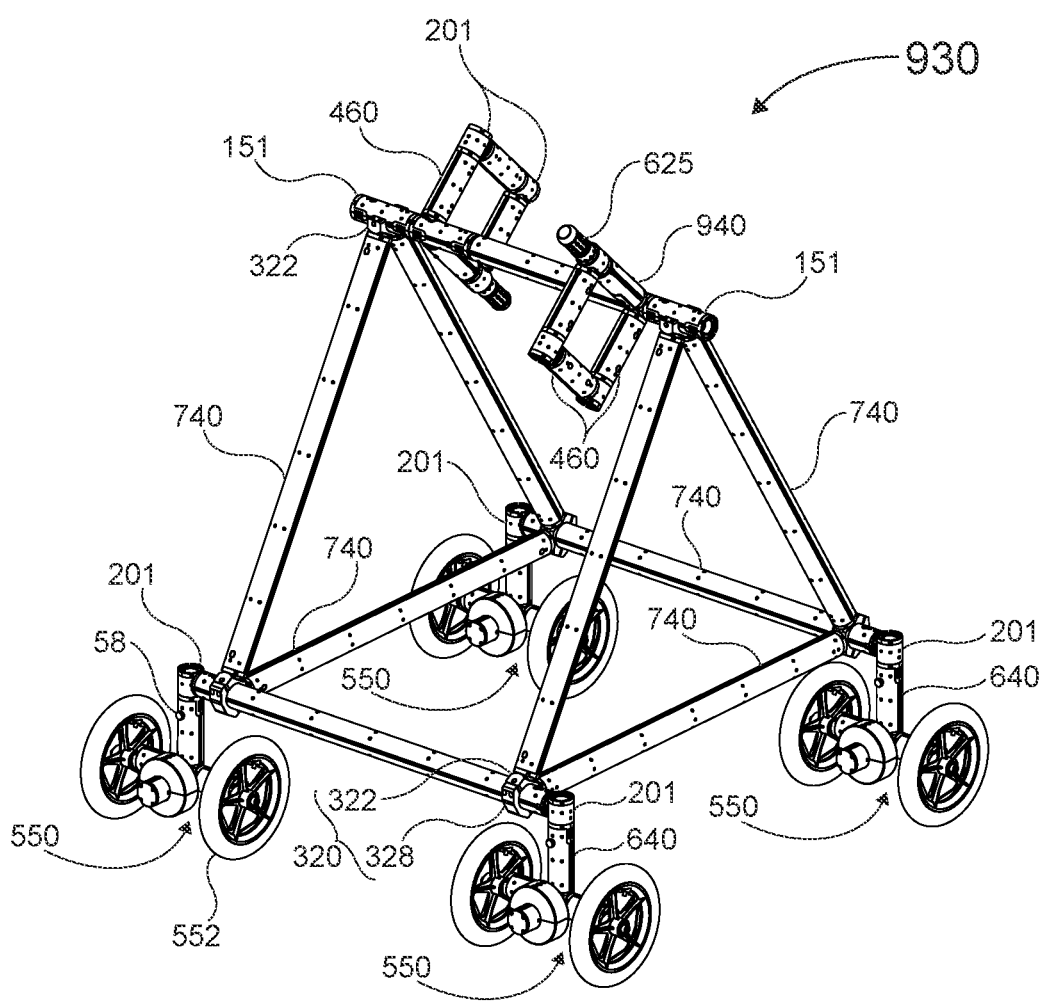
FIG. 45 is a perspective view of an example of an A-frame spooling cart system assembled with some of the modular components disclosed herein.
Figure 46:
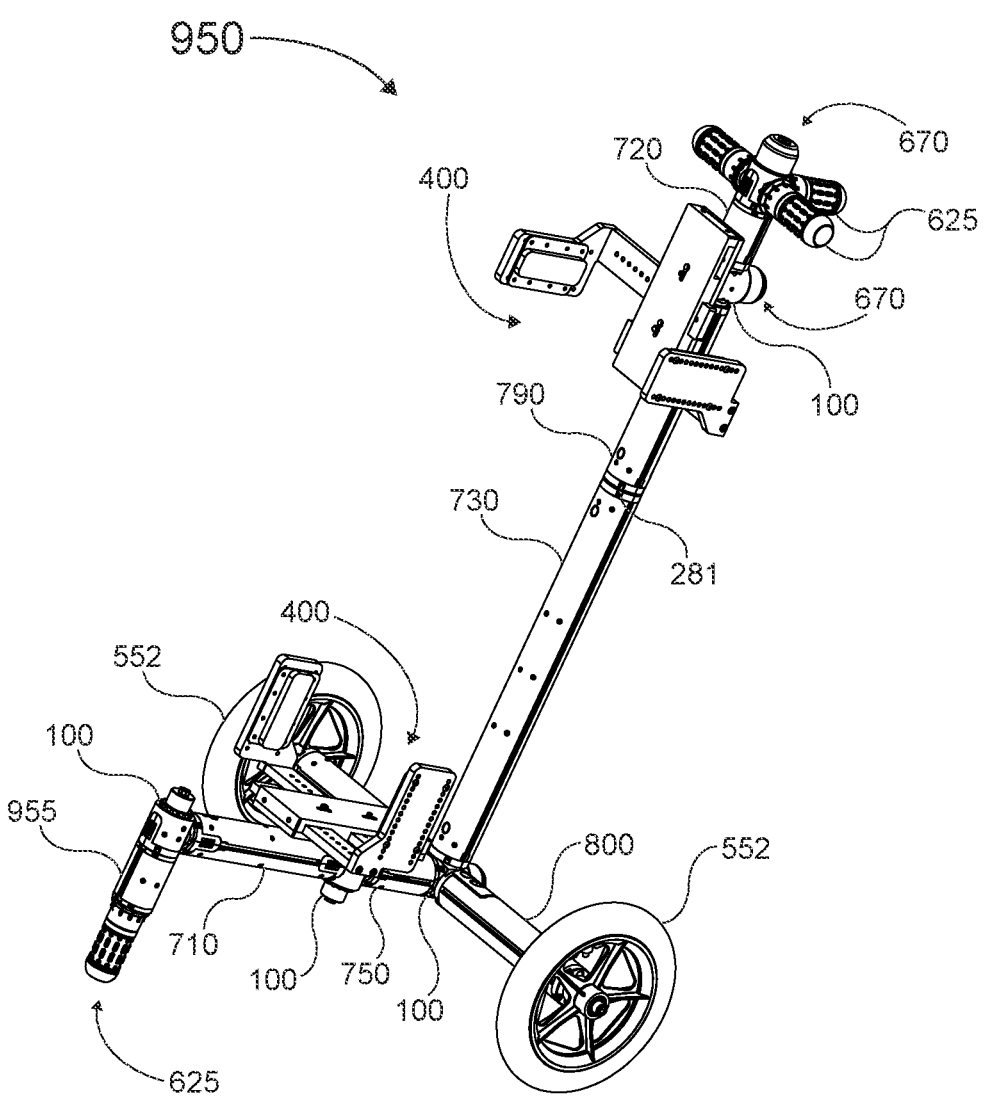
FIG. 46 is a perspective view of an example of a pull cart system assembled with some of the modular components disclosed herein.
Figure 47:
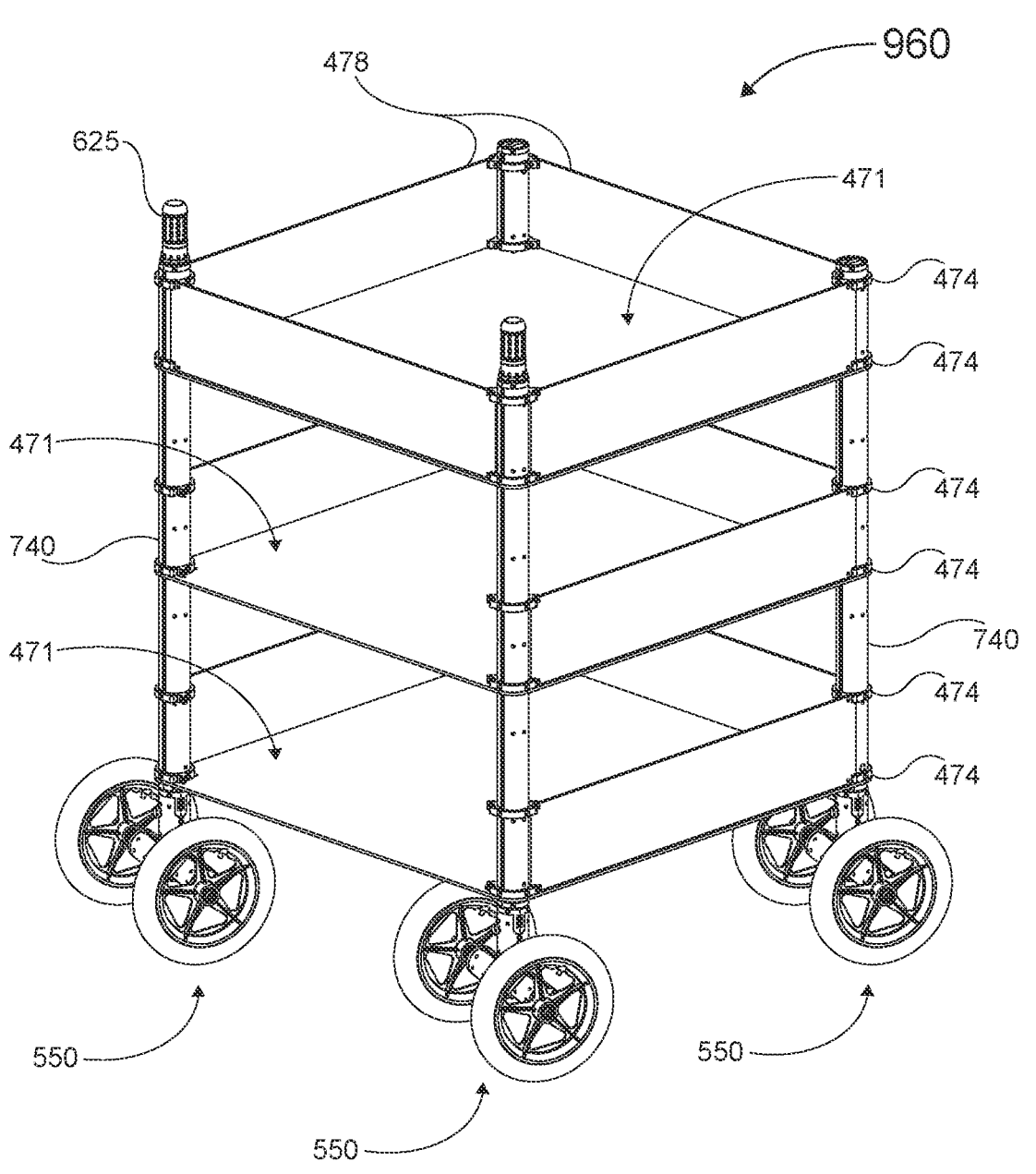
FIG. 47 is a perspective view of an example of a utility cart system assembled with some of the modular components disclosed herein.
Figure 48:
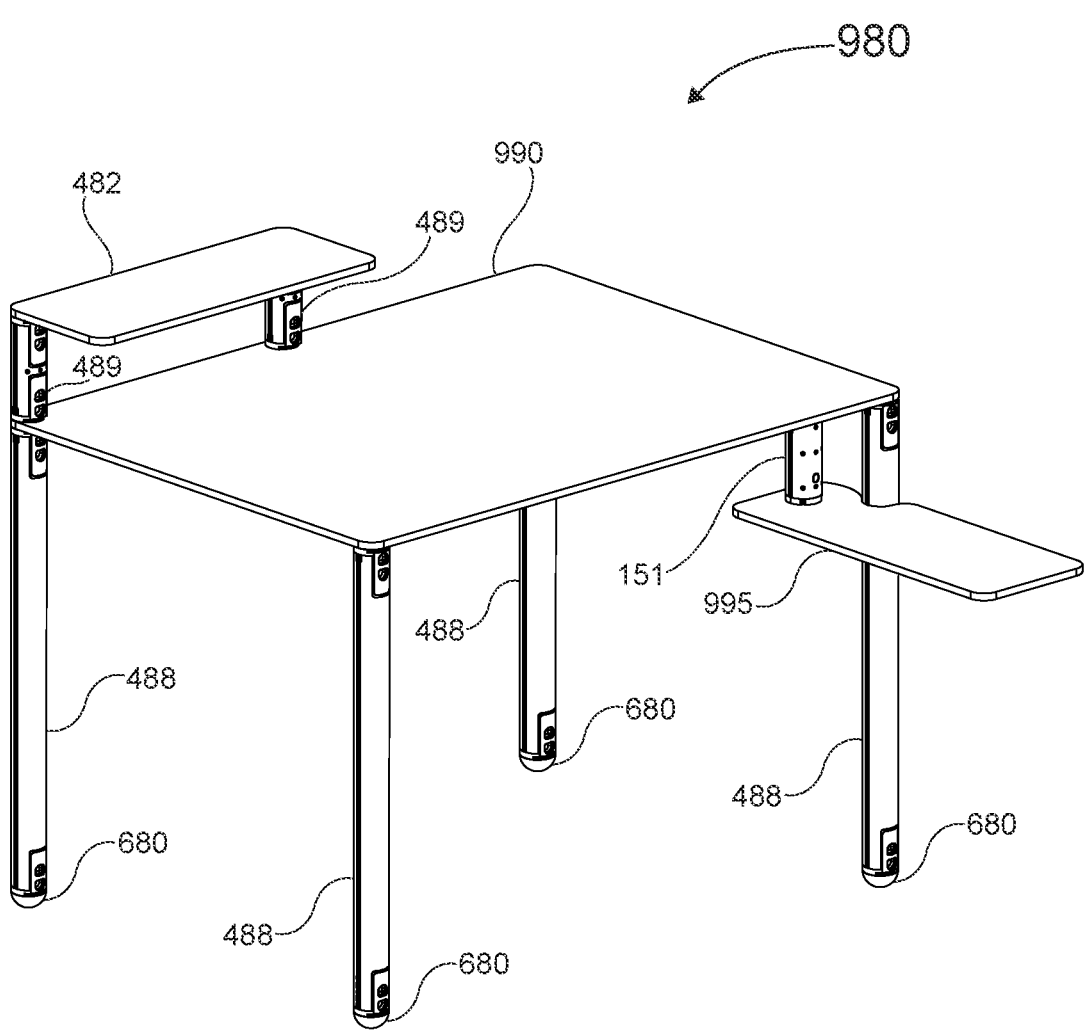
FIG. 48 is a perspective view of an example of a modular workstation assembled with some of the modular components disclosed herein.

To further illustrate the versatility of the modules in assembling a variety of utility system assemblies and support assemblies such as carts, dollies, tracks, cranes, lifts, stands, racks, tables, workstations, seating, bed-frames, shelving, storage, staging, railings, partitions, toy systems, and the like, examples of assemblies are provided to demonstrate the various multifunctional aspects of the modular components described herein. Examples 1 through 10 as illustrated in FIGS. 34 to 43, are configured for use with various types of cameras. However, the illustrated assemblies may be alternatively used for other types of devices such as microphones, lighting, telescopes, lasers, measuring and surveying tools, and the like. Example 11 shown in FIG. 44, is configured for use with industrial lighting. Examples 12 through 14 shown in FIGS. 45 to 47, are configured for use as various types of utility carts for transportation of various types of materials, supplies, equipment, and the like. The modules disclosed herein may also be configured into assemblies for use as furniture or for storage as shown in FIG. 48.

Example 1: Crab-Steering Dolly System

Figure 34:
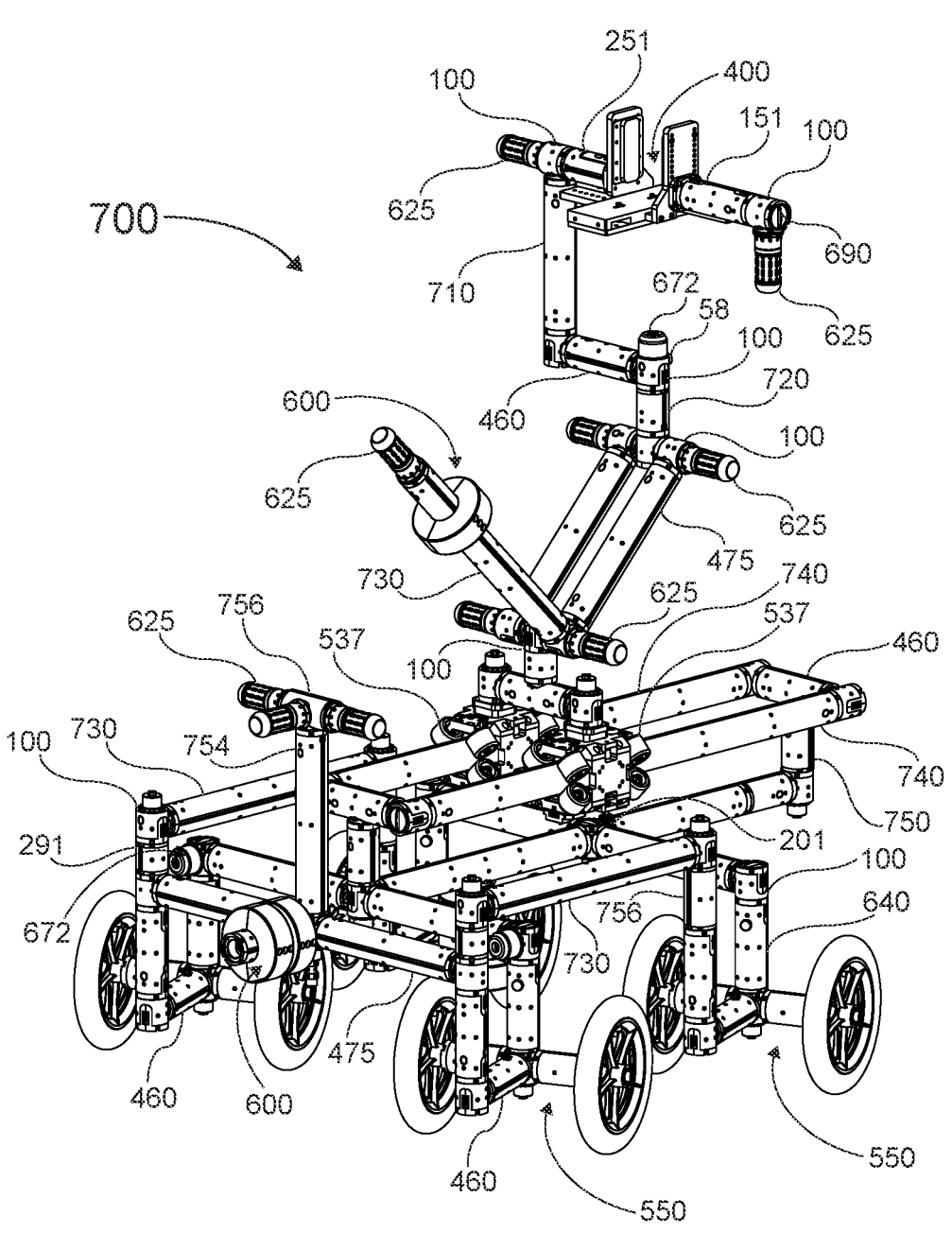
FIG. 34 is a perspective view of an example of a crab-steering dolly system assembled with some of the modular components disclosed herein.

FIG. 34 shows a perspective view of an example of a crab-steering dolly system 700 configured with some of the modules and assemblies disclosed herein, and is designed to provide a trackless operator-controlled crab-steering assembly for conveyance of a camera or other device about a film set or other location. It should be noted that, in this example, referring to the "back" or "rear" means the side of the assembly facing toward in the drawing view, where an operator steering the dolly system would stand, and "front" or "forward" means the side of the assembly facing away in the drawing view. The crab-steering dolly 700 comprises two sub-assemblies wherein the first sub-assembly is a pivotable and rotatable device support structure supported by a pair of rail-surround rolling module assemblies 537, and the second sub-assembly is a steerable dolly framework provided with: (i) an elongate rail assembly on which the rail-surround rolling modules 537 may travel, (ii) a pair of crab-steering wheel modules 550 at each corner, and (iii) a steering assembly for pivotable control of the wheel modules.

The device support sub-assembly comprises a baseplate assembly 400 to which a camera or other screw-mounted device can be mounted. To the right side of the baseplate assembly 400 is engaged a pan/tilt/jib operating handlebar assembly comprising a 6-unit length double-receptacle extension-tube rotator module 151 and a closed-tube rotator hub assembly 100 capped with a hard end-cap component 690 and with a downwardly extending grip end-cap module 625 to enable an operator's hand control of the baseplate's direction and position. Extending from the left side of the baseplate module 400 is a 4-unit length male/receptacle side-opening joiner module 251 which attaches to a closed-tube rotator hub assembly 100 to provide an intermittently lockable adjustable-tension 360° device-tilt pivot point controllable with the handlebar assembly to the right of the baseplate. A grip end-cap module 625 is engaged with the hub assembly's 100 left-facing male member for an additional handgrip. Downwardly extending from the rotator hub assembly 100 is a 10-unit double-receptacle extension-tube rotator module 710, which can be locked or provide an off-center 360° device-pan pivot point where met by another rotator hub assembly 100, to which is mounted a 6-unit length double-receptacle extension-tube joiner module 460 followed by another closed-tube rotator hub assembly 100, having a bumper component 672 engaged with its upward-facing wide pivot segment, and where met below by a 3-unit male/receptacle extension-tube joiner module 720, provides an intermittently lockable adjustable-tension 360° device-pan pivot point centered below the camera or other pointed device, with the ability to adjust the pivot tension using a tension-adjustment screw knob 58.

Under joiner module 720, a closed-tube rotator hub assembly 100 has engaged on both sides two additional of the same (each having mounted a grip end-cap module 625) where from two 12-unit length double-receptacle extension-tube joiner modules 475 extend down to each a rotator hub assembly 100 (there inwardly providing a jib-tilt pivot point for the assembly above) engaged centrally to a stack of two additional rotator hubs 100 (there providing a jib-pan pivot point for the assembly above). The jib-tilt and jib-pan may be controlled using the grip end-cap module 625 mounted to the end of an 18-unit double-receptacle extension-tube joiner module 730 by a zero-unit length double-male joiner module 281 (not visible). The joiner module 730 also has mounted a counterbalancing weight module assembly 600.

Below the two above cited stacked rotator hubs 100, the device support structure is mounted to the rail-surround rolling module assemblies 537 via a 6-unit length double-receptacle extension-tube joiner module where from each side a closed-tube rotator hub assembly is each mounted atop a rail-surround rolling module assembly 537, thereby allowing for small tracking movements relative to the lower dolly assembly, in this example, running along two parallel 36-unit double-receptacle extension-tube joiner modules 740 which are engaged centrally at each end via closed-tube rotator hub assemblies and a 6-unit double-receptacle extension-tube joiner module 460, where from downwardly a side-mounted 4-unit male/receptacle extension-tube joiner module 750 followed by a closed-tube rotator hub assembly engage the above device support structure and rail assembly to the steerable dolly sub-assembly.

The steerable dolly sub-assembly provides a chassis structure upon which the device support sub-assembly is supported and engaged by the rail-surround rolling module assemblies 537 with the rail assembly. The chassis assembly has at its center a 4-way closed-tube joiner hub assembly 201 from where extends in all four directions four extension-tube joiner modules, the longest being an 18-unit double-receptacle extension-tube joiner module 730 at the center to the back of the assembly, where here a 4-way closed-tube rotator hub assembly 100 attaches upwardly to the rail assembly and to each side a 12-unit double-receptacle extension-tube joiner module 475, leading to the two back corners of the chassis. Extending from the central 4-way closed-tube joiner hub assembly 201 toward the front is a 12-unit joiner module followed by a 4-unit joiner module which engages the rail assembly at the front. Extending from each of the sideward faces of the central joiner hub assembly 201 are two 12-unit joiner modules leading to the front two corners of the chassis assembly.

At each corner of the chassis assembly is engaged a closed-tube rotator hub assembly 100, where on each downwardly is engaged a 6-unit male/receptacle extension-tube rotator module 640 providing the corresponding wheel module assemblies 550 with a directional pivot point. Engaged below each of these rotators 640 is a 4-way closed-tube rotator hub assembly 100 at the center of the pairs of wheel modules 550. Extending off the back of each of these hub assemblies is a 6-unit double-receptacle extension-tube joiner module 460, met by another rotator hub assembly 100, wherefrom extends upwardly a 6-unit double-receptacle extension-tube rotator module 151, which provide pivot points of the steering assembly.

To each of the upward-extending back rotator modules 640 are attached in series, a rotator hub assembly 100, a 2-unit double-male joiner module 291, and another rotator hub assembly 100. To each of the upward-extending front rotator modules 640 are attached a 4-unit double-male extension-tube joiner module 756 and a rotator hub assembly 100. On the left and right side of the dolly, an 18-unit double-receptacle extension-tube joiner module 730 interconnects the steering assembly's top rotator hub assemblies for the forward and the rear rotator modules that are interconnected to the wheel modules 550. A pair of 12-unit double-receptacle extension-tube joiner modules 475 extend inward from the lower rotator hub assemblies 100 atop the rear upward-extending rotator modules 640 and are engaged with a another configuration of a 4-way closed-tube joiner hub assembly. Extending back from the joiner hub assembly is a weight module assembly 600 on a 6-unit double-receptacle joiner module. Extending upward from the joiner hub assembly is a 12-unit male/receptacle extension-tube joiner module 754 that is engaged with a 4-unit double-male extension-tube joiner module 756 that has three grip end-cap modules 625. The sub-assembly described in this paragraph comprises the steering assembly by which an operator can steer the crab-steering dolly 700 while pushing or pulling by the grip end-cap modules 625. In this example, there is enabled an approximate 140° turning radius of the wheels, by the force applied by an operator to the steering assembly, where pushing the assembly forward and to the left will point the wheel modules 550 toward the right, and vice versa, forward and to the right redirecting them to point towards the left.

Example 2: Vertical Rail-Tracking Dolly System

Figure 35:
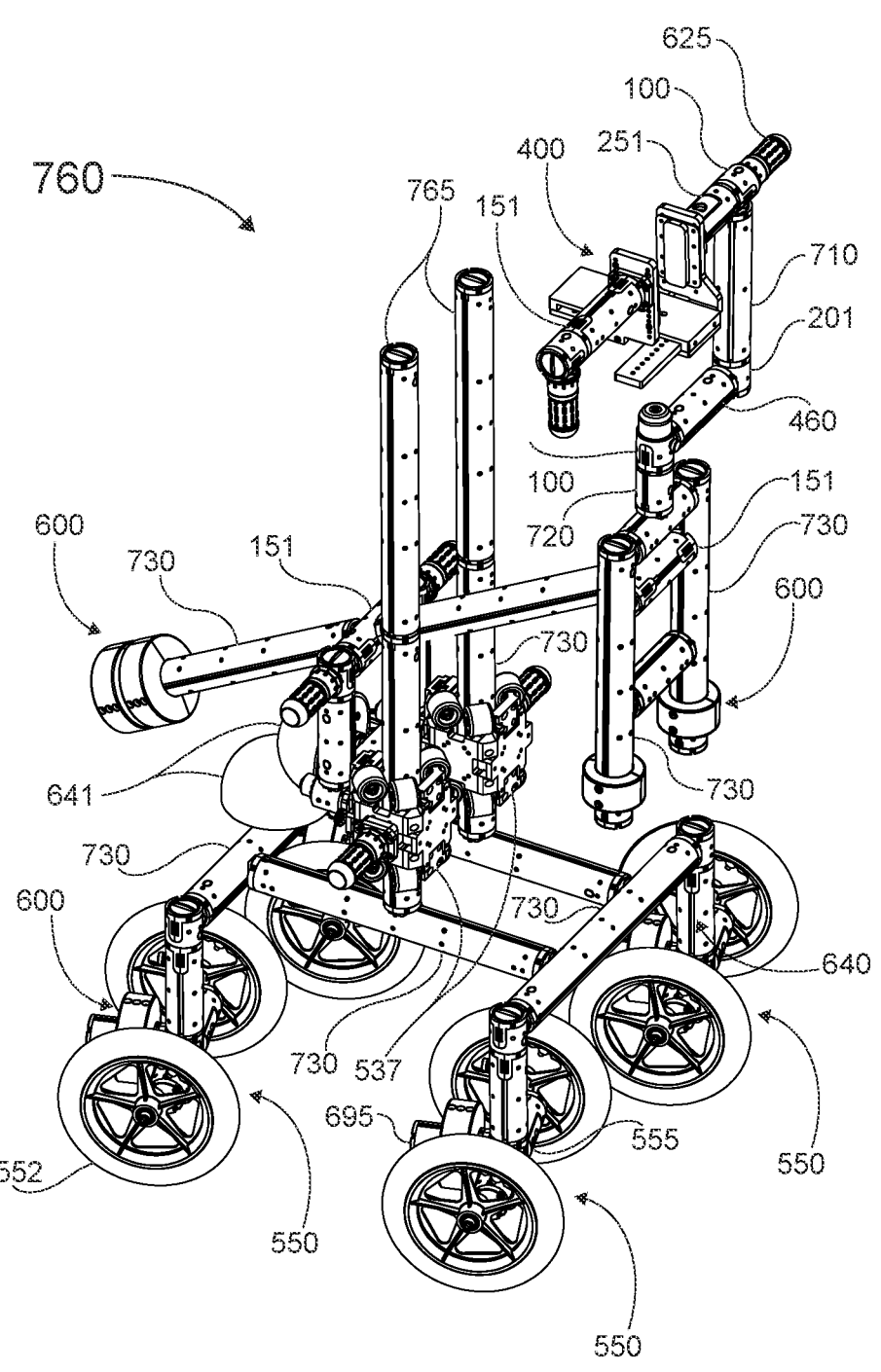
FIG. 35 is a perspective view of an example of a vertical rail-tracking dolly system assembled with some of the modular components disclosed herein.

An example of a vertical rail-tracking dolly system 760 is shown in FIG. 35, and may be used to provide a stable support for controllably moving a mounted device such as a still camera or a video camera or a film camera in vertically upward and downward motions during moving or still image captures. The wheel modules enable an operator to push or pull the vertical rail-tracking dolly system 760 as desired while operating the mounted device.

The vertical rail-tracking dolly system 760 comprises two sub-assemblies wherein the first sub-assembly is a dolly framework provided with a pair of wheel modules 550 at each corner and a vertical elongate rail structure on which rail-surround rolling module assemblies 537 may travel, and the second sub-assembly is a pivotable and rotatable camera support structure with a pair of rail-surround rolling module assemblies 537 for travelling up and down along the vertical elongate rail structure provided therefor on the dolly framework.

The dolly framework sub-assembly is configured with a first pair of spaced-apart 18-unit double-receptacle extension-tube joiner modules 730 that are side-mounted at their ends to a second pair of spaced-apart 18-unit double-receptacle extension-tube joiner modules 730 that are engaged at their ends with a closed-tube rotator hub assembly 100 fitted with a hard socket-cap component 690. Extending downward from each rotator hub assembly 100 is a 6-unit male/receptacle extension-tube rotator module 640, providing the directional pivot point of the dolly system's wheel modules 550 that are side-mounted on two sides of a rotator hub assembly 100 at the base of each extension-tube rotator module 640. In this example, the wheels 552 are bolted to the wheel module's 550 wheel-axle/receptacle side-opening joiner module 555 at corresponding axle offset threaded bores 551*b* (not visible), so that these wheel module assemblies will act as large casters and rotate naturally into directional alignment with the directional force exerted by the operator to the dolly assembly. As shown in FIG. 35, extending from a central third side of the rotator hub assembly, the wheel module assemblies include a weight module assembly 600 side-mounted to a joiner module having a flat end-cap component 695.

The vertical elongate rail structure comprises two rails wherein each rail consists of, at the lower end, an 18-unit double-receptacle extension-tube joiner module 730 engaged with an upper 18-unit male/receptacle extension-tube joiner module 765. The lower ends of the rail structure are side-mounted at the longitudinal square-nut channels of the first pair of joiner modules 730 provided horizontally. The upper ends of the rail structure have inserted hard socket-cap components 690 for protective enclosure of there the two receptacles.

The second sub-assembly, i.e., the pivotable and rotatable camera support structure, comprises a baseplate assembly 400 to which a camera or other screw-mounted device can be mounted. To the left side of the baseplate assembly 400 (in the view shown in FIG. 35) is engaged a pan/tilt/jib operating handlebar assembly comprising a first double-receptacle extension-tube rotator module 151 and a closed-tube rotator hub assembly 100 capped with a hard socket-cap component 690 and with a downwardly extending grip end-cap module 625 to enable an operator's hand control of the baseplate's direction and position. Extending from the right side of the baseplate assembly 400 is a male/receptacle side-opening joiner module 251 which is engaged with a closed-tube rotator hub assembly 100 to provide an intermittently lockable adjustable-tension 360° tilt-axis whereby the baseplate assembly 400 is controllable by the handlebar assembly to the left side of the baseplate assembly. A grip end-cap module 625 is mounted to the outward male member assembly of the rotator hub assembly 100 for a supplementary grip point. Extending downward from the rotator hub assembly 100 is a 10-unit double-receptacle extension-tube rotator module 710, which may provide an off-center pan-axis where met at its base by a closed-tube joiner hub assembly 201, from which is side-mounted a first double-receptacle extension-tube joiner module 460 which in turn is engaged with a closed-tube rotator hub assembly 100 having a bumper component 672 engaged with its upward-facing wide pivot segment, for protection of the camera or other device where it may inadvertently come to meet the hub assembly by rotation upon its 360° tilt-axis. The rotator hub assembly 100 provides the baseplate assembly's intermittently lockable adjustable-tension pan-axis where met by a 3-unit male/receptacle extension-tube joiner module 720 which extends downward from the rotator hub assembly and is side-mounted to a second double-receptacle extension-tube joiner module 460. A pair of 18-unit double-receptacle extension-tube joiner modules 730 is engaged with the opposite ends of the second joiner module 460, and rotationally engaged with the opposite ends of a second rotator module 151, and engaged with a third joiner module 460. A counterbalancing weight module assembly 600 is side-mounted near the bottom end of each of the pair of double-receptacle extension-tube joiner modules 730. One end of another 18-unit double-receptacle extension-tube joiner module 730 is side-mounted to the rotationally engaged second rotator module 151 and its other end is side-mounted to a third rotator module 151. Another extension-tube joiner module 730 is side-mounted to the opposite side of the third rotator module 151 by one end, and has a counterbalancing weight module assembly 600 mounted to its opposite end. A pair of rotator hub assemblies 100, with hard end-cap components 690 and outward grip end-cap modules 625, are engaged with receptacles in the opposite ends of the third rotator module 151, whereby the upper section of the support assembly may pivot up and down, and the extended vertical section of the assembly may remain vertical if so desired by rotation upon the second rotator module 151. Below the pair of rotator hub assemblies 100, a pair of double-receptacle extension-tube joiner modules 460 are engaged and then mounted upon a pair of joiner hub assemblies 201 interconnected by another double-receptacle extension-tube joiner module 460. The rail-facing receptacles of the pair of joiner hub assemblies 201 have mounted therein rail-surround rolling module assemblies 537.

The rail-surround rolling module assemblies 537 are slipped around the vertical elongate rail structure configured on the dolly framework sub-assembly, and can be moved upward and downward therealong by an operator using the grip end-cap modules 625 provided therefor mounted to the sides of the pair of rotator hub assemblies 100 engaged with the third rotator module 151, and mounted to the sides of the rolling module assemblies 537. A pair of female dome pad end-cap modules 641 may be side-mounted to the middle horizontal double-receptacle extension-tube joiner module 460 of the second sub-assembly and to the corresponding 18-unit extension-tube joiner module 730 of the first sub-assembly to cushion camera movement as the rail-surround rolling module assemblies 537 travel to the bottom of the vertical elongate rail structure.

Example 3: Lateral Mounted Rail-Tracking Dolly System

Figure 36:
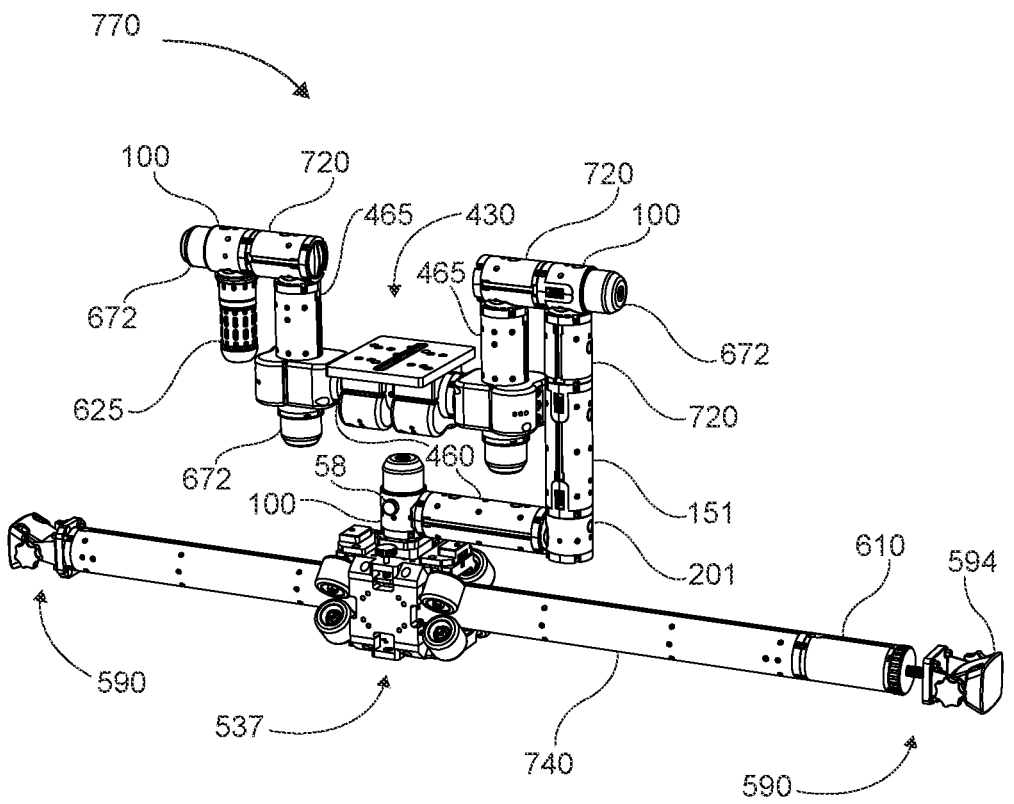
FIG. 36 is a perspective view of an example of a lateral mounted rail-tracking dolly system assembled with some of the modular components disclosed herein.

An example of a lateral mounted rail-tracking dolly system 770 is shown in FIG. 36. This type of assembly configuration can be used to provide a horizontal rail system that can be securely fixed in between two opposite stable vertical supports such as two walls or alternatively, for example, inside a vehicle between two of its doors or windows. A device support assembly engaged with one or more rail-surround rolling module assemblies 537 (or optionally, rail-rolling modules 510), can be controllably moved back and forth along the horizontal rail system by an operator.

In this example, the horizontal rail system comprises a 36-unit double-receptacle extension-tube joiner module 740 demountably engaged at one end with a pivotable support module 590 having mounted therein a pad component 594. The other end of the joiner module 740 is engaged with a telescoping extension module 610 that is mounted to a pivotable support module 590 having mounted therein a pad component 594. The horizontal rail system can be securely mounted in place between two vertical support surfaces with the extendable or retractable engagement by the telescoping extension module 610 with the two surfaces. A similar alternative assembly, not shown, may be engaged vertically between two horizontal support surfaces, where may be required.

In this example, the baseplate assembly 430 illustrated in FIG. 17 is side-mounted to a 3-unit male/receptacle extension-tube joiner module 720 at the upper end of each 6-unit male/receptacle extension-tube joiner module 465. The downward-facing wide pivot segment of each of the joiner module's 465 male member tube-end assembly 270 is engaged with a bumper component 672 (the male components 70 there shown in FIG. 17 are here excluded). The outer male ends of the 3-unit joiner module's 720 are each engaged with a closed-tube rotator hub assembly 100. A downward-extending grip end-cap module 625 and left-facing bumper component 672 is engaged with the rotator hub assembly 100 on the left side of the baseplate assembly 430 while the rotator hub assembly 100 on the right side of the baseplate assembly 430 is engaged with a right-facing bumper component 672 and with a downward-extending assembly of a 3-unit male/receptacle extension-tube joiner module 720 engaged with a 6-unit double-receptacle rotator module 151 which in turn is engaged with a closed-tube joiner hub assembly 201. The corresponding end of a 6-unit double-receptacle extension-tube joiner module 460 is engaged with a side-mounted male member assembly extending from the joiner hub assembly 201, while the other end of joiner module 460 is engaged with a rotator hub assembly 100 having a tension-adjustment screw knob 58 for adjusting the pivot-tension of the intermittently lockable 360° pan-axis there provided by the rotator hub assembly 100 rotationally engaged upon the male member plate assembly atop the rail-surround rolling module assembly 537. A bumper component 672 is engaged with the upward-facing wide pivot segment of the pan-axis rotator hub assembly 100 for protection of the camera or other device where it may inadvertently come to meet the hub assembly 100 by rotation of the baseplate assembly 430 upon its 360° tilt-axis provided where the right-side horizontal 3-unit male/receptacle joiner module 720 is rotationally engaged within the corresponding rotator receptacle 11 of the hub assembly 100.

Example 4: Rolling Jib System

Figure 37:
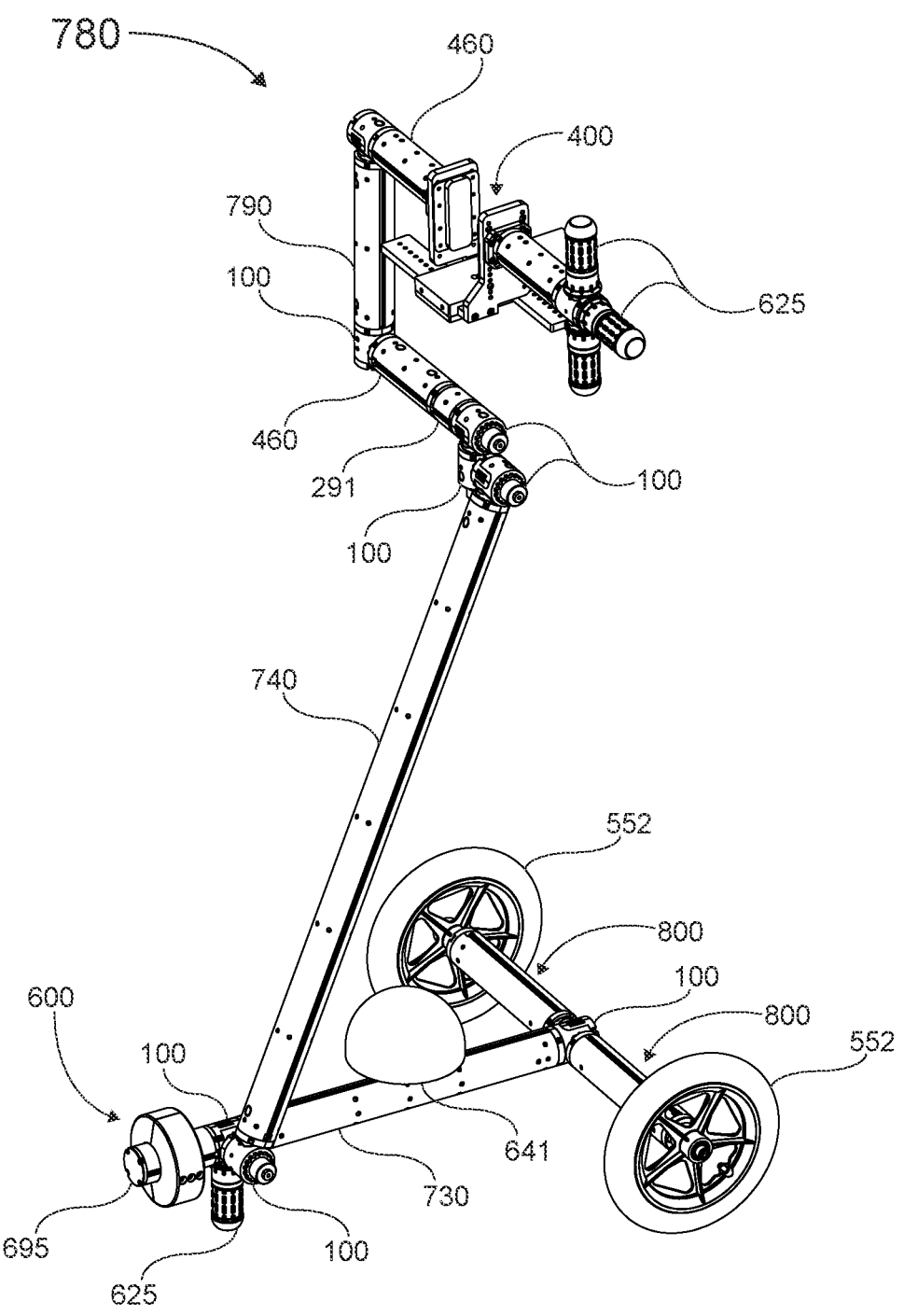
FIG. 37 is a perspective view of an example of a rolling jib system assembled with some of the modular components disclosed herein.

An example of a rolling jib system 780 is illustrated in FIG. 37, and is configured to provide a compact and light-weight rolling stand system for supporting a load or device such as a still camera or a video camera or a film camera. Such jib assemblies can be configured, for example, to outwardly extend a microphone or a lighting fixture and the like.

In this example, each of a pair of 10-unit wheel-axle/receptacle side-opening joiner modules 800 are side-mounted at one end to opposite sides of a first closed-tube rotator hub assembly 100. At the other end, a wheel 552 is rotationally engaged with the center bore of each wheel-axle tube-end component 551. One end of an 18-unit double-receptacle extension-tube joiner module 730 is engaged with the male member assembly extending outward from the first rotator hub assembly 100. The other end of the joiner module 730 is mounted with the male member assembly of a second closed-tube rotator hub assembly 100. The outward-extending receptacle of the second rotator hub assembly 100 is engaged with a weight module assembly 600 on a male joiner fitted with a flat end-cap component 695. A downward-extending grip end-cap module 625 is side-mounted to the second rotator hub assembly 100. A third rotator hub assembly 100 is side-mounted at a 90° spacing from the grip end-cap module 625. An upward-extending 36-unit double-receptacle extension-tube joiner module 740 is side-mounted to the third rotator hub assembly 100.

In this example, a baseplate assembly 400 is engaged with a first double-receptacle extension-tube joiner module 460 extending to the right (in the view shown in FIG. 37) to which is engaged a fourth rotator hub assembly 100 to which are mounted three grip end-cap modules 625 spaced apart at 90° intervals for handling of the baseplate assembly's tilt and pan operations. One end of a second double-receptacle extension-tube joiner module 460 is mounted to the left side of the baseplate assembly 400 while the other end is engaged with a fifth rotator hub assembly 100 which in turn, is engaged with a downward-extending 10-unit double-receptacle extension-tube joiner module 790. A sixth rotator hub assembly 100 is engaged with the other end of joiner module 790. One end of a third double-receptacle extension-tube joiner module 460 is side-mounted to the sixth rotator hub assembly 100. The other end of the third joiner module 460 is engaged with a double-male extension-tube joiner module 291 that is engaged at its other end with a seventh rotator hub assembly 100 whereby the above baseplate assembly 400 is provided its tilt-axis. Adjacent below, the upward-facing rotator receptacle 11 of an eighth rotator hub assembly 100 provides the above baseplate assembly 400 with a centered 360° pan-axis where it is rotationally engaged with the male member side-mount assembly 110 or 395 extending downward from the seventh rotator hub assembly 100. A ninth rotator hub assembly 100 is side-mounted to the eighth rotator hub assembly 100 where, on a high-tension setting or intermittently lockable rotation using the pivot lock 60, the pan-axis rotator hub assembly 100 and modules above can be re-leveled should the jib-arm joiner module 740 engaged with the ninth rotator hub assembly 100 be moved up or down, from where the third rotator hub assembly 100 engaged with the lower end of the jib-arm joiner module 740 is rotationally engaged with the second rotator hub assembly 100.

A female dome pad end-cap module 641 is side-mounted to the joiner module 730 to cushion the above jib-arm assembly in the event that it is desired to lower it to a position adjacent to the joiner module 730. The three grip end-cap modules 625 attached to the fourth rotator hub assembly 100 are provided for an operator's hand-control of the tilt and pan rotation of the support assembly. By holding this handgrip assembly, and optionally by also gripping the jib-arm (i.e., the joiner module 740), the rolling jib assembly 780 can be rolled by the operator by lifting the jib-arm to raise the downward-extending grip end-cap module 625 and then pushing or pulling the rolling jib assembly 780.

Example 5: Low-Angle Baseplate Support System

Figure 38:
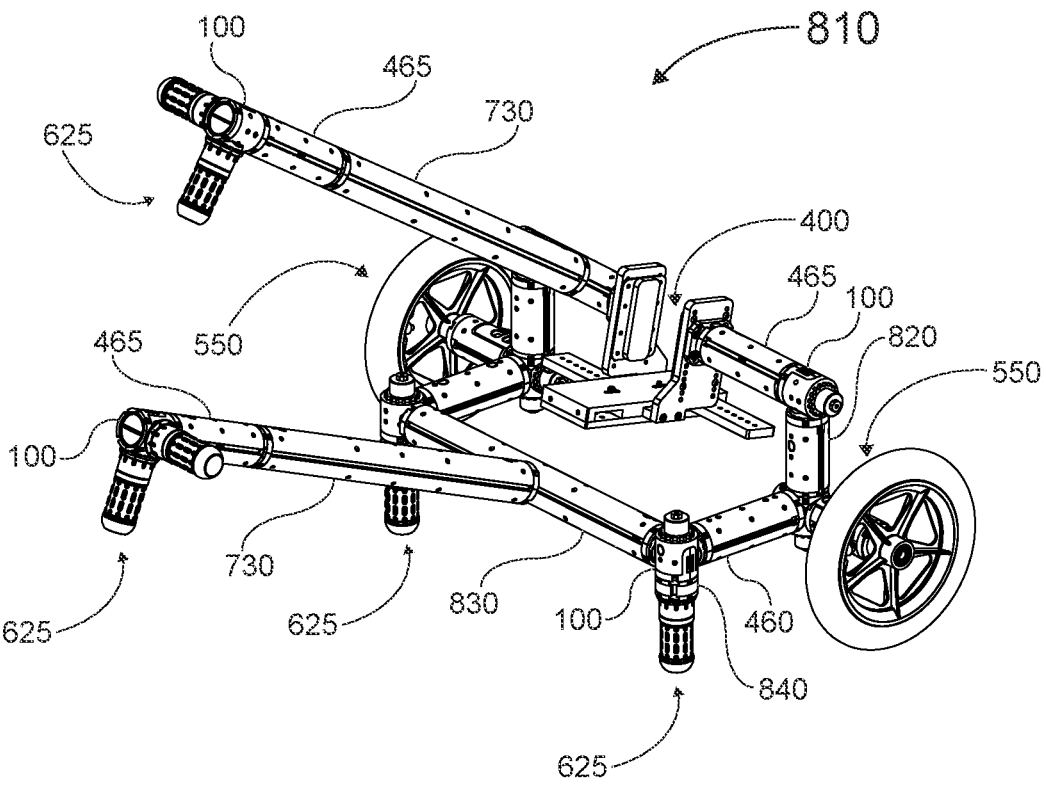
FIG. 38 is a perspective view of an example of a low-angle baseplate support system assembled with some of the modular components disclosed herein.

An example of a low-angle baseplate support system 810 is shown in FIG. 38, and is configured to provide a compact low-rolling baseplate system wherein drive and turning movements are performed with a push or pull by an operator gripping two handle attachments which extend upwardly from two sub-assemblies to within the reach of the operator while they are standing or walking. The assembly can be rolled by the operator when lifting a chassis steering bar assembly comprising a closed-tube rotator hub assembly

100 (with two side-mounted grip end-cap modules 625), met by a male/receptacle extension-tube joiner module 465, followed by an 18-unit double-receptacle extension-tube joiner module 730, which is side-mounted amid an 18-unit double-receptacle extension-tube rotator module 830, which forms the back of a chassis assembly which when lifted removes two back corner grip end-cap modules 625 from the ground allowing the system assembly to advance.

Below two rear corner rotator hub assemblies 100, the length of extension of the grip end-cap modules 625 is combined with at each a 1-unit double-male extension-tube joiner module 840, which align approximately the chassis assembly to rest horizontally relative to the radius of the two wheel modules 550. Extending forward from each of the two rear corner rotator hub assemblies 100 is a 6-unit double-receptacle extension-tube joiner module 460 met by two front rotator hub assemblies 100 where on each is attached outwardly a wheel module assembly 550. Extending upward from the front two rotator hub assemblies 100 are two 4-unit male/receptacle extension-tube rotator modules 820 with engaged atop two rotator hub assemblies 100 each with their rotator receptacles 11 facing inward thereby providing a baseplate assembly 400 its tilt-axis where engaged between two male/receptacle extension-tube joiner modules 465 which are rotationally engaged within the rotator hub assemblies on each side. Side-mounted from the left-side joiner module 465 is a tilt-axis steering bar assembly comprising the same modules as the lower chassis steering bar assembly, with the direction of the horizontal grip end-cap module 625 reversed, and here configured for the operation of the baseplate assembly's 400 tilt-motion as well as to grip for steering and rolling advancement of the system.

Example 6: Lateral Ground Rail-Tracking Dolly System

Figure 39:
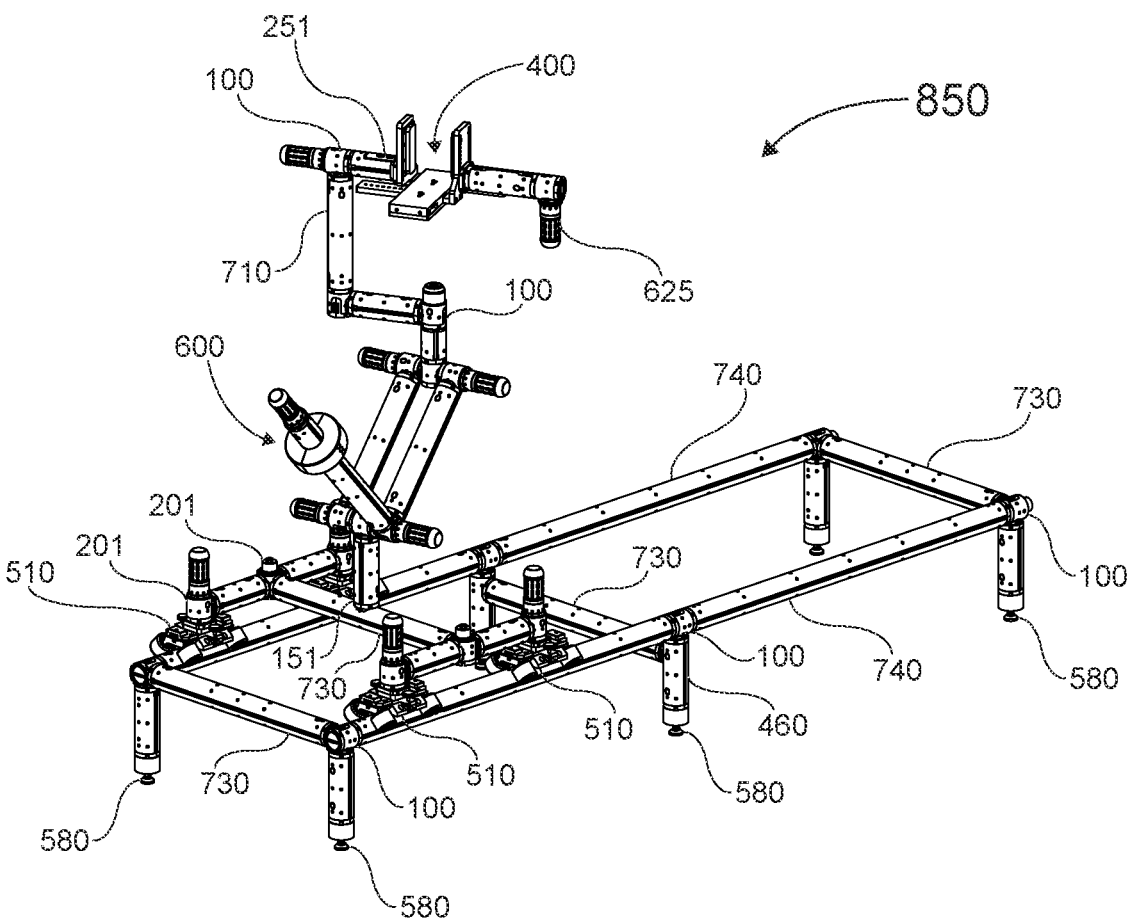
FIG. 39 is a perspective view of an example of a lateral ground rail-tracking dolly system assembled with some of the modular components disclosed herein.

An example of a lateral ground rail-tracking dolly system 850 is shown in FIG. 39, and is configured to provide a stationary rail track system for rolling a camera or other device therealong during filmmaking or other end-use requirements of a similar nature.

This example comprises three sub-assemblies wherein the first sub-assembly is a stationary rail track system, the second sub-assembly is a pivotable and rotatable camera support structure, and the third sub-assembly is a support framework for the second sub-assembly, comprising two pairs of rail-rolling modules 510.

The first sub-assembly comprises a pair of rail tracks wherein each rail track is configured with two 36-unit double-receptacle extension-tube joiner modules 740 interconnected with a rotator hub assembly 100 and having a rotator hub assembly 100 engaged with the outward-facing ends of the joiner modules 740. An 18-unit extension-tube joiner module 730 is side-mounted to the rotator hub assemblies 100 at each end of the rail tracks. Each of the six rotator hub assemblies in the first sub-assembly is side-mounted to one end of a downward-extending double-receptacle extension-tube joiner module 460 which is engaged at its other end with a leveling foot module 580. A joiner module 730 is side-mounted to the two middle downward-extending joiner modules 460 to provide structural support to the rail track sub-assembly.

The second sub-assembly comprises a baseplate assembly 400 to which a camera or other screw-mounted device can be mounted. To the right side of the baseplate assembly 400 is engaged a pan/tilt/jib operating handlebar assembly comprising a 6-unit length double-receptacle extension-tube rotator module 151 and a closed-tube rotator hub assembly 100 capped with a hard end-cap component 690 and with a downwardly extending grip end-cap module 625 to enable an operator's hand control of the baseplate's direction and position. Extending from the left side of the baseplate module 400 is a 4-unit length male/receptacle side-opening joiner module 251 which attaches to a closed-tube rotator hub assembly 100 to provide an intermittently lockable adjustable-tension 360° device-tilt pivot point controllable with the handlebar assembly to the right of the baseplate. A grip end-cap module 625 is engaged with the hub assembly's 100 left-facing male member for an additional handgrip. Downwardly extending from the rotator hub assembly 100 is a 10-unit double-receptacle extension-tube rotator module 710, which can be locked or provide an off-center 360° device-pan pivot point where met by another rotator hub assembly 100, to which is mounted a 6-unit length double-receptacle extension-tube joiner module 460 followed by another closed-tube rotator hub assembly 100, having a bumper component 672 engaged with its upward-facing wide pivot segment, and where met below by a 3-unit male/receptacle extension-tube joiner module 720, provides an intermittently lockable adjustable-tension 360° device-pan pivot point centered below the camera or other pointed device's center, with the ability to adjust the pivot tension using a tension-adjustment screw knob 58.

Under joiner module 720, a closed-tube rotator hub assembly 100 has engaged on both sides two additional of the same (each having mounted a grip end-cap module 625) where from two 12-unit length double-receptacle extension-tube joiner modules 475 extend down to each a rotator hub assembly 100 (there inwardly providing a jib-tilt pivot point for the assembly above) engaged centrally to a closed-tube joiner hub assembly 201 from which is side-mounted downwardly a double-receptacle rotator module 151 providing a jib-pan pivot point for the assembly above where it is rotationally engaged with the third sub-assembly. The jib-tilt and jib-pan may be controlled using the grip end-cap module 625 mounted to the end of an 18-unit double-receptacle extension-tube joiner module 730 by a zero-unit length double-male joiner module 281 (not visible). The joiner module 730 also has mounted a counterbalancing weight module assembly 600.

The third sub-assembly comprises a rolling framework that is configured with a joiner module 730 engaged with a closed-tube joiner hub assembly 201 at each end. Extending laterally from each joiner module 201 is a double-receptacle joiner module 460. To the outward-facing end of each joiner module 460 is engaged another closed-tube joiner hub assembly 201. The upward-facing male member plate assembly 420 of a rail-rolling module 510 is engaged with the receptacle of the closed-tube joiner hub assembly 201. The upward-facing male end of the closed-tube joiner hub assembly 201 is provided with a grip end-cap module 625. As mentioned in the paragraph above, one end of a double-receptacle extension-tube rotator module 151 is side mounted to the joiner module 730, and the other end is rotationally engaged with the closed-tube joiner hub assembly 201 that interconnects the lower pair of rotator hub assemblies 100 in the second sub-assembly.

Example 7: Double-Baseplate A-Frame Dolly System

Figure 40:
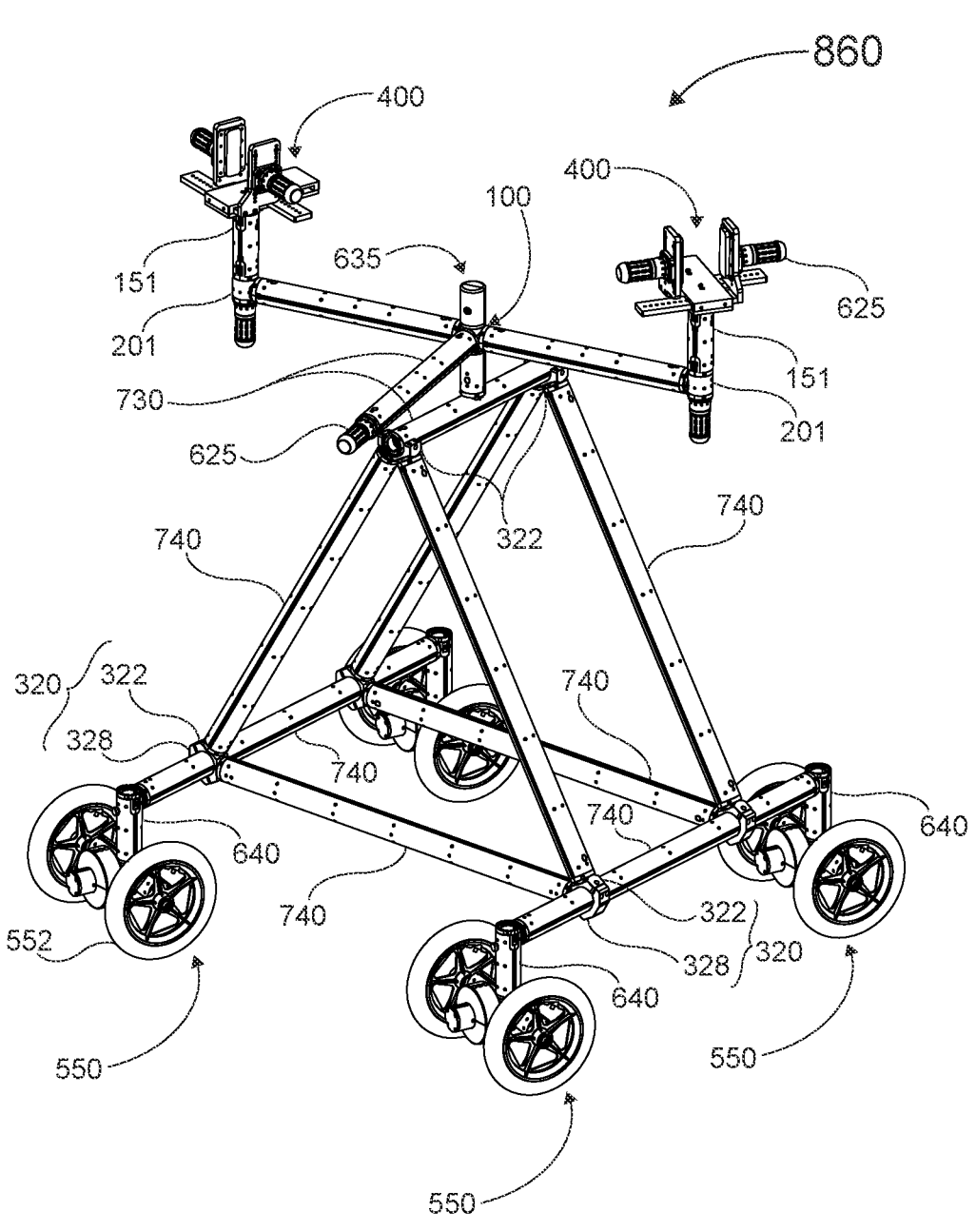
FIG. 40 is a perspective view of an example of a double-baseplate A-frame dolly system assembled with some of the modular components disclosed herein.

An example of a double-baseplate A-frame dolly system 860 is shown in FIG. 40, and is configured for use in applications such as filmmaking that may require a combined movement of two cameras or other such devices in tandem. This example comprises two sub-assemblies wherein the first sub-assembly is a rolling A-frame dolly structure, and the second sub-assembly is a rotational support structure for two cameras or other such devices.

The first sub-assembly has an A-framework configured with two A-frames each configured by interconnecting three 36-unit double-receptacle extension-tube joiner modules 740 with two 2-way 30° side-mount bracket modules 320 (refer to FIG. 13A) at the lower two joints and a 30° angle male member mount bracket 322 at the top joint. The two A-frames are interconnected: (i) at the bottom clamped slidably or securely to two 36-unit double-receptacle extension-tube joiner modules 740, and (ii) at the top with an 18-unit extension-tube joiner module 730 to which the mount bracket 322 is mounted with two mount screws 325 each threadably engaged with a square nut provided therefor in the opposing longitudinal channels of the joiner module 730. The first sub-assembly has four sets of wheel assemblies wherein each set comprises a pair of wheel modules 550 which are mounted to opposite sides of a rotator hub assembly 100. In this example, each wheel 552 is bolted to the corresponding wheel-axle/receptacle side-opening joiner module 555 at the corresponding axle offset threaded bore 551*b* (not visible), so that they act as large casters and rotate naturally into directional alignment with the directional force exerted by the operator to the dolly assembly. Extending from a central third side of the rotator hub assembly 100, the assemblies include a weight module assembly 600 side-mounted to a joiner module having a flat end-cap component 695. Rotatable 360° within the upward-facing rotator receptacle 11 of the rotator hub assembly 100, an upward-extending male/receptacle extension-tube rotator module 640 is rotationally engaged by its male end with the rotator hub assembly 100, while the other end of the rotator module 640 is securely engaged by a male member side-mount assembly 110 or 395 within the corresponding outward-facing joiner receptacle 211 of its corresponding 36-unit double-receptacle joiner module 740.

The second sub-assembly has two spaced-apart baseplate modules 400, each having an individual 360° pan-axis pivot point, and which also may be rotated 360° together at the central pan-axis pivot point. Each baseplate module 400 has a pair of grip end-cap modules 625 mounted to the male member plate assembly 420 on the left side and the right side of the module 400. One end of a double-receptacle extension-tube rotator module 151 is mounted to the downward extending male member plate assembly 420 of the module 400, and the other end of the rotator module 151 is interconnected with the male end of a closed-tube joiner hub assembly 201. A downward-extending grip end-cap module 625 is engaged with each joiner receptacle 211 by a zero-unit double-male joiner module 281 (not visible, refer to FIG. 9). A joiner module 730 engaged with a male member side-mount assembly extending inward from each joiner hub assembly 201 is interconnected with opposite sides of a rotator hub assembly 100 that provides the central 360° pan-axis point. A shell end-cap module 635 is engaged with the top of the rotator hub assembly 100, while the bottom female end of the rotator hub assembly 100 is rotationally engaged with the male end of a 4-unit male/receptacle joiner module 750. The female end of the joiner module 750 is side-mounted to the joiner module 730 that interconnects the two A-frames. Providing a central pan-operation handlebar, a joiner module 730 extends from a third side of the rotator hub assembly 100 and is engaged at its outer end with a grip end-cap module 625 mounted by a zero-unit double-male joiner module 281 (not visible).

Example 8: Four-Caster Baseplate Dolly System

Figure 41:
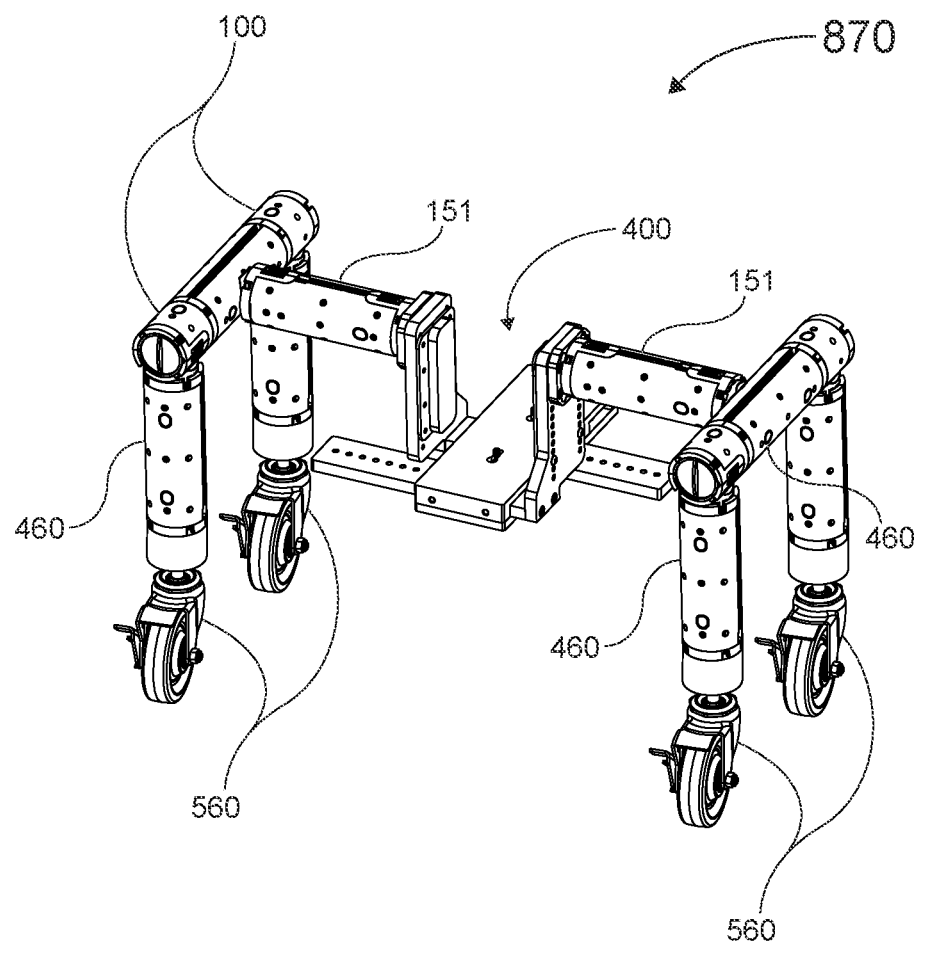
FIG. 41 is a perspective view of an example of a four-caster baseplate dolly system on casters, assembled with some of the modular components disclosed herein.

An example of a four-caster baseplate dolly system 870 is shown in FIG. 41, and is configured for use in applications such as filmmaking where it is desirable to have a camera or other such device mounted on a rolling framework as close as possible to the ground or a platform or a table and the like.

This example is configured with two pairs of castor wheel module assemblies 560, as described in reference to FIGS. 23C and 23D. Each pair comprises two 360° pivotable castor assemblies 560 wherein each assembly 560 is engaged with one end of a double-receptacle extension-tube joiner module 460, which in turn, is engaged with a closed-tube rotator hub assembly 100 at its other end. The two rotator hub assemblies 100 are interconnected with a joiner module 460. The male member plate assembly 420 on the right side of the baseplate assembly 400 is engaged with one end of a first double-receptacle rotator module 151. The other end of the first double-receptacle rotator module 151 is side-mounted to the right-side joiner module 460 that interconnects the corresponding pair of castor assemblies 560. The male member plate assembly 420 on the left side of the baseplate assembly 400 is engaged with one end of a second double-receptacle rotator module 151. The other end of the second rotator module 151 is side-mounted to the left-side joiner module 460 that interconnects the other pair of castor assemblies 560. The two rotator modules 151 in combination provide the tilt-axis point at which the baseplate assembly 400 may be rotated 360°, depending on the length of the mounted device, or may be intermittently locked by one or both of the pivot locks 60 engaged with the pivot-lock sprockets 423 (not visible) of the male member plate assemblies 420.

Example 9: Hand-Held Camera Stabilizer Assembly

Figure 42:
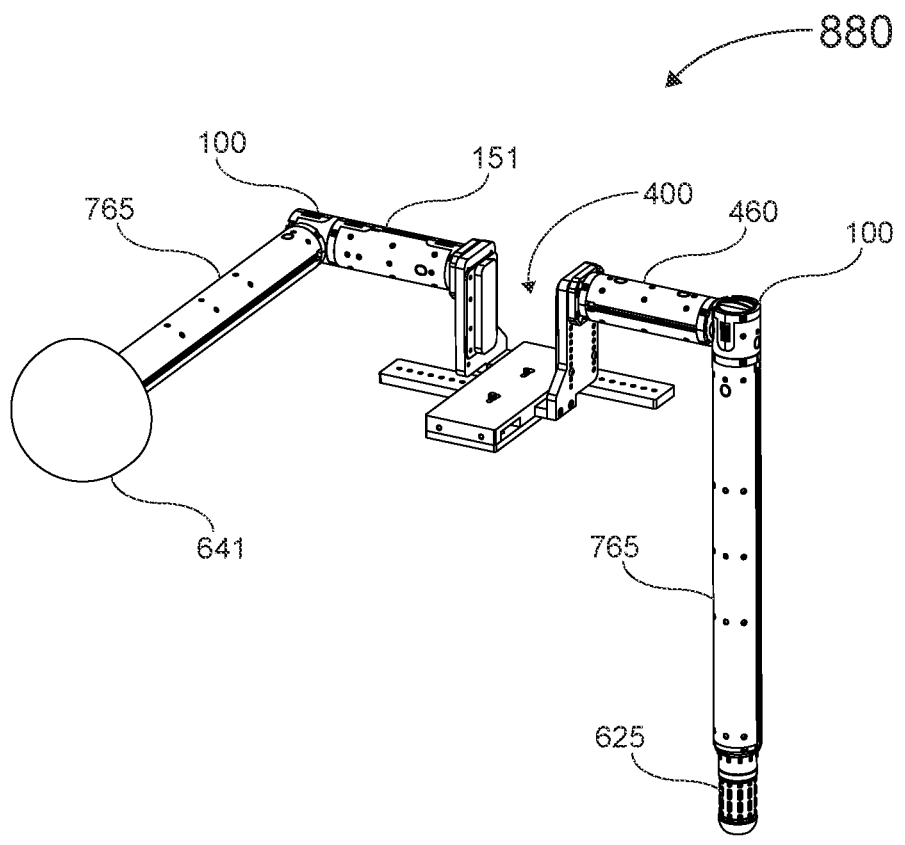
FIG. 42 is a perspective view of an example of a hand-held camera stabilizer assembly assembled with some of the modular components disclosed herein.

An example of a hand-held stabilizer assembly 880 for camera support is shown in FIG. 42, and is configured for use in applications where hand-held support is required for a tool or device such as a camera, that may be mounted into a baseplate assembly. In this example, the male member plate assembly 420 on the right side of a baseplate assembly 400 is engaged with one end of a double-receptacle joiner module 460 wherein the other end is engaged with a first closed-tube rotator hub assembly 100. The female end of a downward-extending 18-unit male/receptacle extension-tube joiner module 765 is engaged with the male end of the rotator hub assembly 100, while the male end of the joiner module 765 is provided with a grip end-cap module 625. The male member plate assembly 420 on the left side of the baseplate assembly 400 is engaged with one end of a double-receptacle rotator module 151. The other end of the rotator module 151 is engaged with a second rotator hub assembly 100. One end of a laterally extending 18-unit male/receptacle extension-tube joiner module 765 is engaged with the second rotator hub assembly 100, while the other end of the joiner module 765 is engaged with a female dome pad end-cap module 641.

An operator will be able to stably maneuver a camera mounted to the baseplate module 400 by resting the laterally extending joiner module 765 or female dome pad end-cap module 641 on their shoulder, or by holding the joiner module 765 in their left hand so that the female dome pad end-cap module 641 is pressed against their chest, and concurrently holding the downward-extending grip end-cap module 625 in their right hand, whereby they may tilt the camera angle up or down at the tilt-axis point provided by the double-receptacle rotator module 151.

Example 10: Vertical Rail-Tracking Stand Assembly

Figure 43:
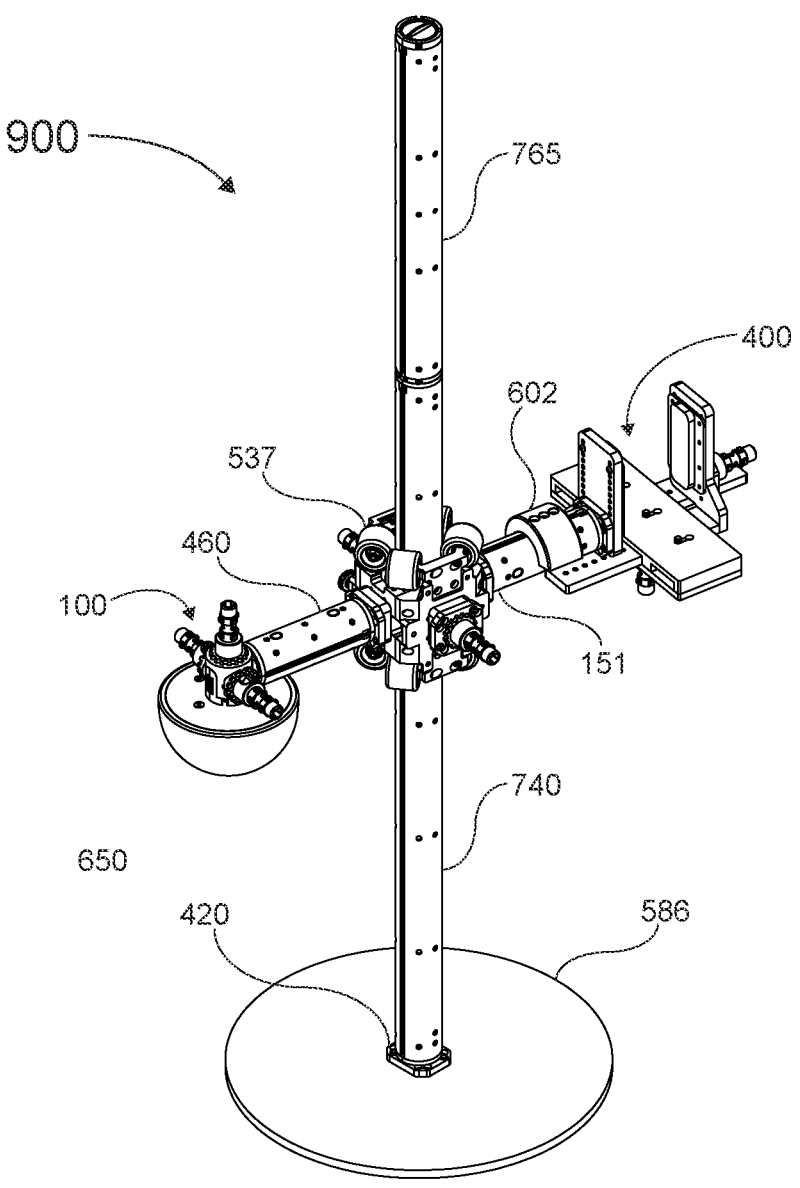
FIG. 43 is a perspective view of an example of a vertical rail-tracking stand assembly assembled with some of the modular components disclosed herein.

An example of a vertical rail-tracking stand assembly 900 is shown in FIG. 43, and is configured for use in applications where a tool or load such as a camera is required to be moved vertically up and down in a set standing position. This example comprises two sub-assemblies wherein the first is a vertical rail stand, and the second is a pivotable and rotatable rolling support for a camera or other type of device or tool.

The first sub-assembly is a vertical rail comprising an 18-unit male/receptacle extension-tube joiner module 765 interconnected with a 36-unit double-receptacle extension-tube joiner module 740 wherein the joiner module 740 is mounted to a male member plate assembly 420 atop a weighted foot plate 586 of a foot plate module 585.

The second sub-assembly comprises a pivotable and rotatable camera support structure mounted with a rail-surround rolling module assembly 537. One end of a double-receptacle rotator module 151 is engaged with a male member plate assembly 420 on the left side of a baseplate assembly 400 (as shown in FIG. 43) while the other end of the rotator module 151 is engaged with a male member plate assembly 420 extending outward from a rail-surround rolling module assembly 537, there providing an optional tilt-axis point for the baseplate assembly. A weight component 602 may be provided on the rotator module 151 interposed the baseplate module 400 and the rail-surround rolling module assembly 537. One end of a double-receptacle extension-tube joiner module 460 is engaged with the male member plate assembly 420 extending outward from the opposite side of the rail-surround rolling module assembly 537. The other end of the joiner module 460 is engaged with a rotator hub assembly 100. A male dome pad end-cap module 650 is mounted into the downward-facing receptacle of the rotator hub assembly 100.

The rail-surround rolling module assembly 537 of the second sub-assembly is slipped over the vertical rail of the first sub-assembly and may be moved upward and downward along the vertical rail as required by an operator. The male dome pad end-cap module 650 is provided to cushion a tool or device that may be mounted into the baseplate module 400 if the second sub-assembly reaches the bottom of the vertical rail of the first sub-assembly.

Example 11: Lighting Support Rack System

An example of a lighting support rack system 910 is shown in FIG. 44, and is configurable for use in applications such as in filmmaking where industrial lighting or grip equipment is used. These types of configurations may also be useful for supporting other types of loads such as audio equipment, video display equipment, and the like.

In this example, extending vertically from a weighted four-caster base assembly is a three-shaft lighting support rack assembly. The base assembly comprises four matching weighted caster-leg assemblies having each an 18-unit double-receptacle extension-tube joiner module 730 extending from the sides of the lighting support rack assembly's bottom horizontal 36-unit double-receptacle extension-tube joiner module 740 in pairs on two multi-angle male member mount brackets 335 where mounted to the 60° angled bores to form a 120° angle of separation between the two leg extensions. Connected to the outer ends of each of these is another mount bracket 335 connected at their 60° angled bores which aligns the second 60° angled bores to perpendicular to the ground whereon a vertically aligned 6-unit double-receptacle extension-tube joiner module 460 and caster module assembly 560 complete each leg assembly. Where counterbalancing of the upward lighting support rack assembly's load is required, a series of weight components 602 can be secured to the sides of the 18-unit double-receptacle extension-tube joiner modules 730, as shown in FIG. 44.

Extending upwardly from the lighting support rack assembly's bottom horizontal 36-unit double-receptacle extension-tube joiner module 740 are the three mounting shafts comprising each two 36-unit double-receptacle extension-tube rotator modules 920 connected by a zero-unit double-male joiner module 281. On each of the rotator modules 920 is a repositionable 90° offset side-mount bracket module 340 whereon each is an L-shaped mount arm assembly comprising a closed-tube joiner module hub assembly 201 followed by a 6-unit double-receptacle extension-tube joiner module 460 and additional closed-tube joiner module hub assembly 201 whereon are connected the vertically aligned ⅝" spigot lighting mount modules 490, having the spigots 498 on which a range of industrial lighting equipment may be supported. The vertical position of the mounted equipment can be adjusted by repositioning the 90° offset side-mount bracket module 340 on the corresponding square nuts within the square-nut channels along the 36-unit double-receptacle extension-tube rotator modules 920. If equipment size or spacing allows, the mounted equipment may also be pivoted 360° on the horizontal plane by rotating the 36-unit double-receptacle extension-tube rotator modules 920 where three of them are connected to the top of the horizontal 36-unit double-receptacle extension-tube joiner module 740, and three connected to the top of the first three. For the structural integrity of these types of lighting support rack assemblies, an additional horizontal 36-unit double-receptacle extension-tube joiner module 740 is connected to the ends of the upper three 36-unit double-receptacle extension-tube rotator modules 920, completing the rectangular frame of the lighting mount assembly.

Example 12: A-Frame Spooling Cart System

An example of an A-frame spooling cart system 930 is shown in FIG. 45, and is configured for use in applications where a mobile cart can be used for collecting, and moving around a location, various loads such as cable, wire, rope, hose, fabric, and the like.

In this example, across the width of the cart at the top of the A-frame is a spool bar assembly which can be rotated 360° by the operator on its 6-unit double-receptacle extension-tube rotator modules 151, by holding the assembly 930 at its grip end-cap modules 625 which extend outward from each side from a joiner-box sub-assembly. Each of the joiner-box sub-assemblies comprises three 6-unit double-receptacle extension-tube joiner modules 460, a 6-unit male/receptacle side-opening joiner module 940, and three closed-tube joiner hub assemblies 201 at three corners. The fourth corner of the joiner-box sub-assemblies are mounted to the spool assembly's cross bar by two male member side-mount assemblies 110.

The A-frame rolling chassis comprises two A-frames configured by interconnecting three 36-unit double-receptacle extension-tube joiner modules 740 with two 2-way 30° side-mount bracket modules 320 (refer to FIG. 13A) at the lower two joints and a 30° angle male member mount bracket 322 at the top joint. The two A-frames are interconnected: (i) at the bottom clamped to two 36-unit double-receptacle extension-tube joiner modules 740, and (ii) at the top with the two rotator modules 151 situated at the end of the spool bar assembly. At the four corners of the A-frame rolling chassis, mounted to the ends of two of the four base 36-unit double-receptacle extension-tube joiner modules 740, there are engaged four closed-tube joiner hub assemblies 201. Extending downward from each joiner hub assembly 201 is a 6-unit male/receptacle extension-tube rotator module 640, providing the directional pivot point of the cart system's wheel modules 550 that are side-mounted on two sides of a rotator hub assembly 100 at the base of each extension-tube rotator module 640. In this example, the wheels 552 are bolted to the wheel module's 550 wheel-axle/receptacle side-opening joiner module 555 at corresponding axle offset threaded bores 551b (not visible), so that these wheel module assemblies will act as large casters and rotate naturally into directional alignment with the directional force exerted by the operator to the dolly assembly. Extending from a central third side of the rotator hub assembly, the wheel module assemblies include a weight module assembly 600 side-mounted to a joiner module having a flat end-cap component 695.

Example 13: Pull Cart Assembly

An example of a pull cart assembly 950 suitable for a golf-bag is shown in FIG. 46. Such assemblies can be configured for transporting other types of tall vertical loads such as pressurized gas canisters. In this example, the pull cart assembly 950 comprises a vertical shaft sub-assembly with a first baseplate module 400, a horizontal wheel sub-assembly with a second baseplate module 400, and leg support sub-assembly.

The vertical shaft sub-assembly comprises an 18-unit double-receptacle extension-tube joiner module 730 interconnected with a 10-unit double-receptacle extension-tube joiner module 790 with a zero-unit double-male joiner module 281 linking the two receptacles. The open end of the joiner module 790 is engaged with one side of a first rotator hub assembly 100 while the other side of the first rotator hub assembly 100 is engaged with a 3-unit male/receptacle extension-tube joiner module 720. A second rotator hub assembly 100 is engaged with the other end of the joiner module 720. A bumper end-cap module 670 is mounted to the wide pivot segments of both of the rotator hub assemblies 100, and three grip end-cap modules 625 are side-mounted to the second rotator hub assembly 100 at 90° intervals.

The horizontal wheel sub-assembly comprises a third rotator hub assembly 100 to which a pair of 10-unit wheel-axle/receptacle side-opening joiner modules 800 are engaged at opposite sides of the hub assembly 100. A wheel 552 is bolted to the center bore of each wheel-axle module 800.

The leg support sub-assembly comprises a downward-extending 3-unit double-male extension-tube joiner module 955 to the bottom of which is engaged a grip end-cap module 625. A fourth rotator hub assembly 100 is engaged with the top of the joiner module 955. A laterally extending 10-unit double-receptacle extension-tube rotator module 710 is side-mounted to the fourth rotator hub assembly 100. A fifth rotator hub assembly 100 is side-mounted to the open end of the rotator module 710, while a 4-unit male/receptacle extension-tube joiner module 750 is side-mounted to the other side of the fifth rotator hub assembly 100. A second baseplate assembly 400 is mounted to the fifth rotator hub assembly 100. The open end of the joiner module 750 is mounted to the third rotator hub assembly 100 of the horizontal wheel sub-assembly.

A first baseplate module 400 mounted to the first rotator hub assembly 100 can be adjusted to firmly grip therein and then re-adjusted to release the side of a golf bag, for example. A second baseplate module 400 mounted to the fifth rotator hub assembly 100 can be adjusted to firmly grip therein and then re-adjusted to release the bottom of the golf bag.

Example 14: Utility Cart and Shelf Assemblies

FIG. 47 is a perspective view of an exemplary utility cart assembly 960 comprising some of the exemplary modules disclosed herein. The system assembly as shown provides both an open tray and box tray carriage function for transporting equipment, properties, materials, supplies, and the like around a worksite or other location. Optionally, in place of wheel modules, similar assemblies may be configured with foot modules 580, 585, or grip end-cap modules 625 at its base for standing shelf and storage assemblies.

In this example, the utility cart system 960 comprises four pairs of 360° pivotable caster-style wheel module assemblies 550 which are of a similar configuration as those described in Example 2, Example 7, and Example 12, using the off-center bores of their wheel-axle/receptacle side-opening joiner modules 555. Attached upwardly from each of these wheel assembly's corresponding rotator modules 640, there engaged by a zero-unit double-male joiner module 281, is a 36-unit double-receptacle extension-tube joiner module 740 providing the basis of the cart's frame. Secured from these corner post joiner modules 740 via tray collars 474 are the cart's three tray module assemblies having each the tray bottom 471 and three or four side panels 478 for containment of the load (see description in reference to FIG. 18). The grip end-cap modules 625 are provided atop two of the joiner modules 740, there each engaged by a zero-unit double-male joiner module 281, for pushing or pulling the utility cart in any direction on the 360° pivotable wheel module assemblies 550.

Example 15: Modular Workstation Assembly

An example of a modular workstation assembly 980 is shown in FIG. 48.

This example comprises a rectangular table top 990, a shelf 482 situated above the table top 990, and a rotatable under-shelf 995 mounted underneath the table top 990 adjacent the right side of the assembly.

The bottom surface of the table top 990 is provided with four circular recesses close to each of the corners of the table top 990 (refer to FIG. 19B). Each recess is configured to receive and house therein a mounting plate 484. The mounting plate 484 with a central threaded bore 485 is inserted into the recess and securely mounted to the table top 990 with, for example, five screws 487 inserted through bores 486 provided therefor in the mounting plate 484. A male member flat-mount assembly 361 is mounted to the mounting plate 484 with a mounting bolt threadably engaged with the threaded bore 485. Then, the male member flat-mount assembly 361 is inserted into the receptacle in the end of a 24-unit double-receptacle side-opening joiner module 488 and secured in place as described for joiner module 251 in reference to FIG. 8B. All four modules 488 are mounted in this manner to the four corners of the table top 990. At the base of the four joiner modules 488, there may be provided foot components such as shown four soft end-cap components 680.

In this example, a fifth recess is provided on the bottom surface of the table top 990 to receive and engage therein a fifth mounting plate 484 mounted to a male member flat-mount assembly 361. The top surface of the under-shelf 995 shown in this example is provided with a recess near the rear edge of the shelf 995 for receiving and mounting therein a sixth mounting plate 484 mounted to a male member flat-mount assembly 361. One end of a 6-unit double-receptacle extension-tube rotator module 151 is engaged with the downward-extending male member flat-mount assembly 361 from the fifth mounting plate 484, while the other end is engaged with the upward-extending male member flat-mount assembly 361 from the sixth mounting plate 484. It is to be noted that the right edge of the under-shelf 995 has been contoured to matingly engage the side of the corresponding module 488 when rotated out from under the table top 990 toward the front right. One or more additional shelves 995 may be similarly engaged to the bottom of the table top 990.

This example also shows a shelf 482 provided at the rear of the table top 990 adjacent to the left edge. Two appropriately spaced-apart recesses 483 are provided along the rear edge of the table top 990 into which are inserted and mounted with screws 487, mounting plates 484 mounted to male member flat-mount assemblies 361 (as illustrated in FIG. 19B). A pair of complimentary recesses are provided in the bottom surface of the shelf 482 into which, are inserted a pair of mounting plates 484 mounted to male member flat-mount assemblies 361. One end of a 6-unit double-receptacle side-opening joiner module 489 is engaged with the downward-extending male member flat-mount assembly 361 from a mounting plate 484 mounted in a recess in the bottom surface of the shelf 482, while the other end is engaged with the upward-extending male member flat-mount assembly 361 from the mounting plate 484 mounted into the top surface of the table top 990.

It is to be noted that the table tops may be square, rectangular, trapezoidal, triangular, pentagonal, hexagonal, heptagonal, octagonal, decagonal, circular, kidney-bean shaped, wave-shaped, and may have other forms of symmetrical and asymmetrical curvilinear shapes. Although it will be most common that the modular table assemblies disclosed herein are provided with four legs, it is optional to provide three legs for triangular table tops, and alternatively, to provide two legs at the front edge of a table top that may have been configured to fold down against a wall when not in use, and to fold out when use is desired. In such two-leg configurations, the legs may fold up against the bottom surface of the table top when the table top is folded down, and to fold down when the table top is unfolded for use. Additionally, it is optional to provide table configurations with one or two legs on broad foot assemblies such as an A-frame configuration or the foot plate module 585, described in reference to FIG. 24C.

Additional Embodiments

Further embodiments of the present disclosure generally relate to additional modular components which may be configured and sized to remain compatible with the modular system components as previously described in the present application as well as disclosed in U.S. patent application Ser. No. 16/824,319 incorporated herein by reference, and U.S. patent application Ser. No. 16/678,951 incorporated herein by reference, or may be used without inclusion of these earlier components, to configure modular support apparatuses of various types and utility.

Certain embodiments of the present disclosure relate to cylindrical structural components and to modules for demountable engagement of other elements thereto.

According to some embodiments, the modular components may be sized to make them suitable for handling and use by juveniles during play and learning activities.

Some embodiments as described in more detail below include various forms of cylindrical structural components, male connector and female socket components, dolly assemblies, cart assemblies, roller carriage assemblies and clamping roller carriage assemblies, track assemblies, and device mounting assemblies.

Figure 49:
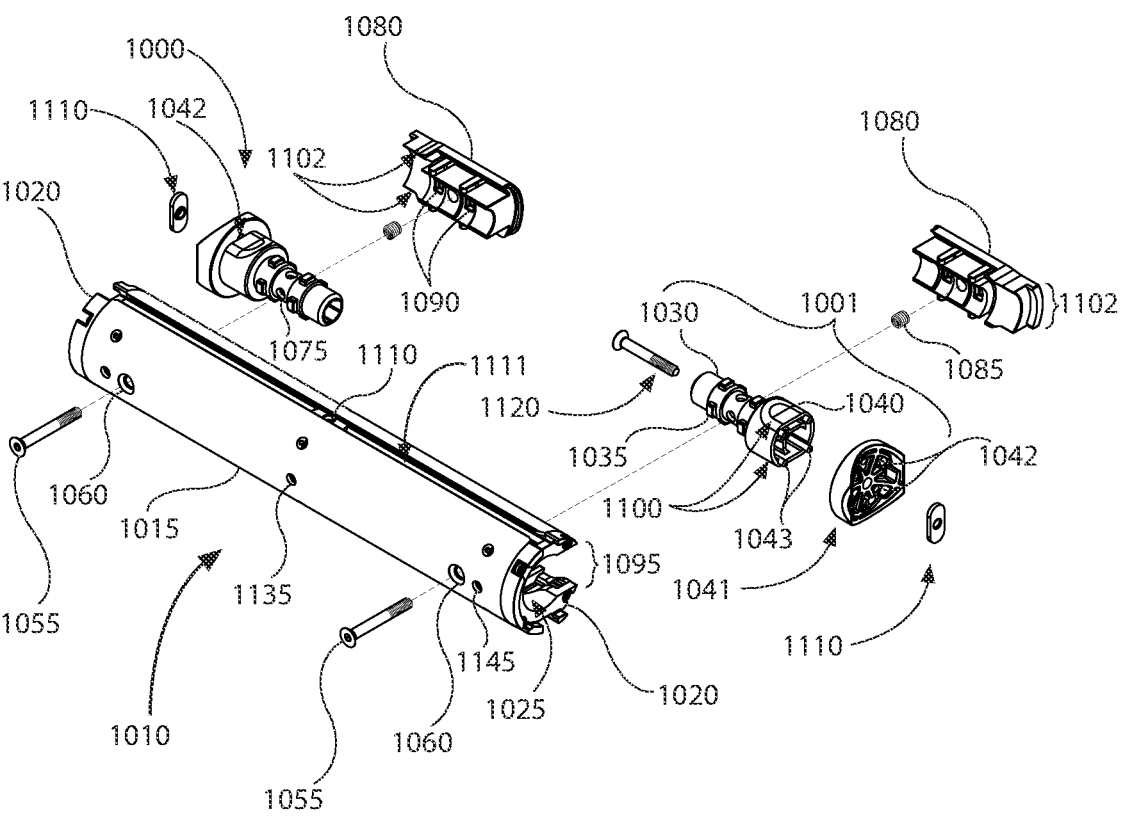
FIG. 49 is a whole perspective view of a double side-opening socket module shown with two concave base male assemblies in alignment for demountable engagement with the module.
Figure 50:
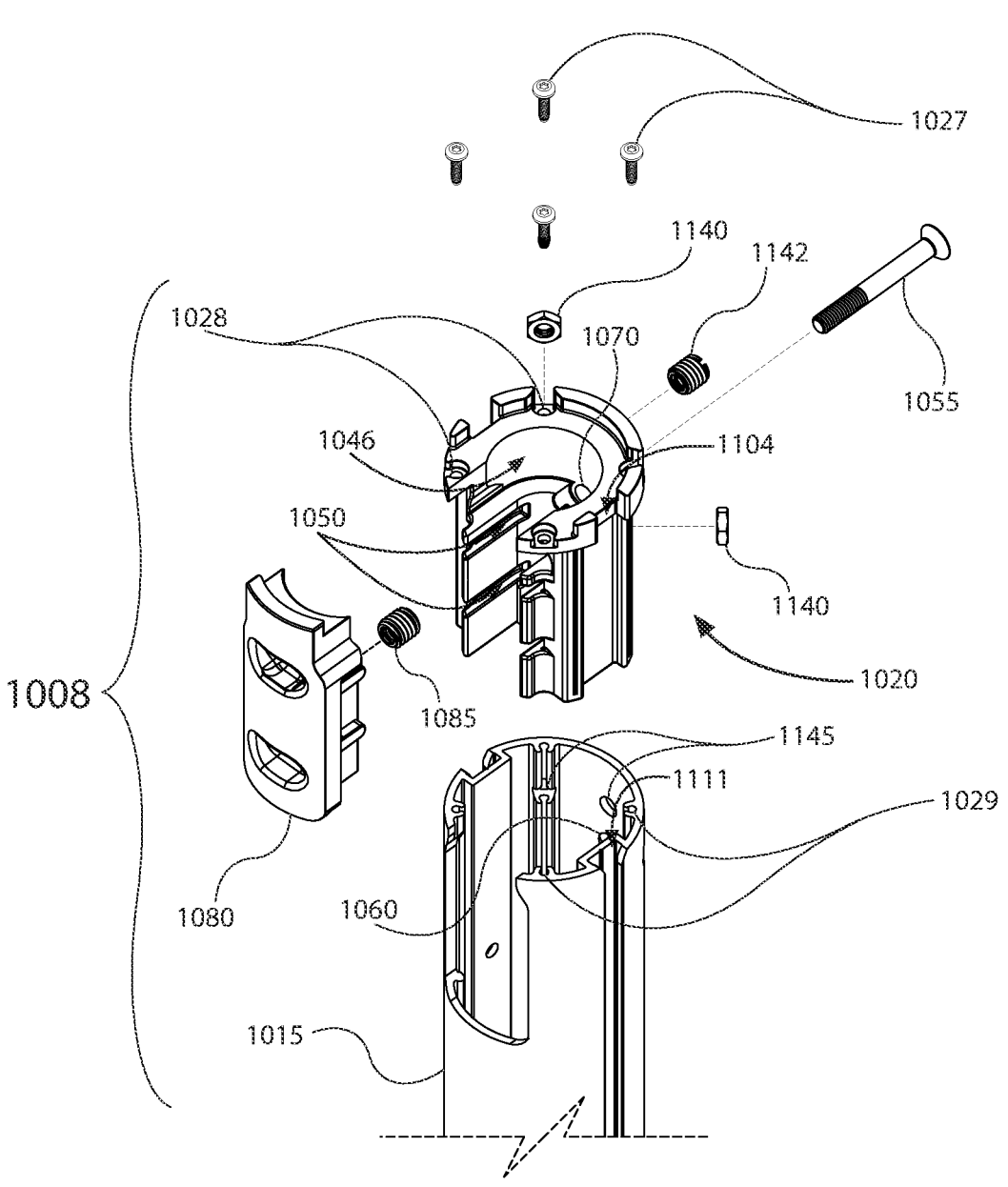
FIG. 50 is an exploded perspective view of a female end at the end of a cylindrical structural component.
Figure 51:
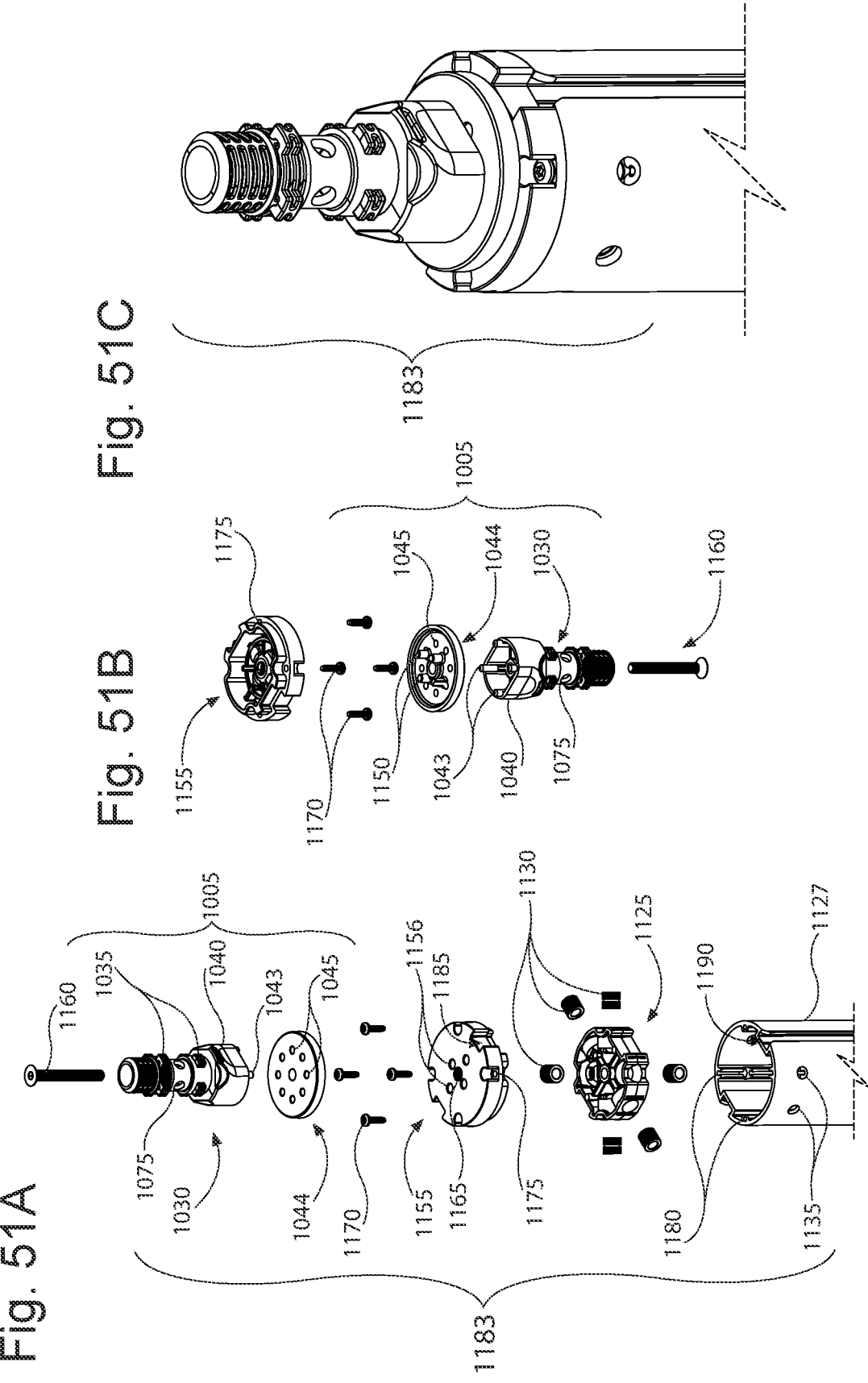
FIG. 51 shows exploded perspective views of a male end comprising a flat base male assembly FIGS. 51A and 51B.

According to certain embodiments, described herein reference to FIGS. 49 to 51, modules of the system may include male connector components for secure demountable engagement of cooperating modules and supported devices such as cameras or industrial lighting or audio/visual equipment or power tools or sensors and the like with other components of the system having cooperating female ends. Two examples of a male connector 1000 include the concave base male assembly 1001 shown in FIG. 49 and the flat base male assembly 1005 shown in FIG. 51, 51A, 51, both configured for demountable engagement with any module having a female end 1008 such as the double side-opening socket module 1010 illustrated in FIG. 49.

As illustrated in FIGS. 49 and 50, a side-opening socket module may comprise a cylindrical structural component 1015 of various lengths having a side-opening socket component 1020 secured at one or both ends, wherein the socket components comprise a receptacle 1025 within which a concave base male assembly 1001 or a flat base male assembly 1005 may be demountably engaged. A side-opening socket component 1020 may be secured at an end of a cylindrical structural component 1015 by screws 1027 of which the threaded portions are passed through holes 1028 in the socket component 1020 to be threadably engaged with screw channels 1029 on the inner contours of the cylindrical structural component 1015.

The concave base male assembly 1001 and the flat base male assembly 1005 both comprise a pronged connector component 1030 with multiple prongs 1035 disposed around the circumferential surface of the connector component, and an indented portion 1040 at its base. As illustrated in FIG. 49, a concave base male assembly 1001 may additionally comprise a concave base component 1041 having a plurality of locator holes 1042 whereby, with locator posts 1043 at the base of the pronged connector component 1030, the component is secured on the concave base component at multiple angular orientations to therefore change the orientation of the base of the male assembly 1001 and cooperating module relative to the socket component 1020 and cooperating module with which they are demountably engaged.

Similarly, as illustrated in FIG. 51, a flat base male assembly 1005 may comprise a flat base component 1044 having a plurality of locator holes 1045 whereby, with locator posts 1043 at the base of a pronged connector component 1030, the component is secured on the flat base component at multiple angular orientations to therefore change the orientation of the base of the male assembly 1005 and cooperating module relative to the socket component 1020 and cooperating module with which they are demountably engaged.

According to a preferred embodiment, a concave base component 1041 and/or a flat base component 1044 may comprise eight locator holes 1042/1045 wherein four locator posts 1043 disposed at the base of a pronged connector component 1030 may be secured at any one of eight angular orientations. This provides optionally two regular, two perpendicular, and four 45-degree orientations of the angle at which the cooperating modules may be engaged by the connector component and its prongs 1035 within the receptacle 1025 of the socket component 1020. A side-opening receptacle 1025 may include cooperatively-shaped male connector channels 1046 and prong-retaining slots 1050 (both illustrated in FIG. 50) which securely engage the outer contours of an inserted pronged connector component 1030 of a concave base male assembly 1001 or a flat base male assembly 1005.

Once inserted, the male assembly 1001/1005 is demountably engaged within the receptacle by a screw or bolt 1055 of which the threaded portion is passed through a hole 1060 in the side of a cylindrical structural component 1015, a through-hole 1070 in the socket component 1020, and a through-hole 1075 in the pronged connector component 1030, to be threadably engaged with a side-opening receptacle cover 1080 at a threaded hole or threaded insert 1085 located centrally in its proximal side, which locks together the cooperating modules until the screw/bolt 1055 is removed. The side-opening receptacle cover 1080 may also comprise prong-retaining slots 1090 (as illustrated in FIG. 49) for matingly engaging a cooperating linear set of prongs 1035 of a secured male assembly 1001/1005.

As illustrated in FIG. 49, a side-opening socket component 1020 and cooperating cylindrical structural component 1015 may comprise a narrow end 1095 for demountable engagement of a male assembly 1001/1005 in alignment with indentations 1100 on two sides of the indented portion 1040 of the pronged connector component 1030. The side-opening receptacle cover 1080 may also comprise indentations 1102 for mating engagement with the narrow ends 1095, which together therefore securely engages itself, an inserted male assembly 1001/1005, and the socket component 1020 within a cylindrical structural component where screws 1027 are optionally not installed as described above within the screw channels 1029 and the screw/bolt 1055 alone locks the components together, or when removed allows all three components to be demounted from the cylindrical structural component.

Once assembled, channel openings 1104 (as illustrated in FIG. 50) in the socket component 1020 allow for passage of a nut 1110 (as illustrated in FIG. 49) into a nut channel 1111 along the side of a cylindrical structural component whereby using a screw or bolt 1120, a concave base male assembly 1001, or other module of the system having a concave face and configured to receive a screw, may be demountably engaged. For this same purpose, a threaded core component 1125, as illustrated in FIG. 51, may be installed within a cylindrical structural component 1015/1127, comprising a plurality of threaded holes, nuts, or threaded inserts 1130 whereby one or more concave base male assemblies 1001 or other modular component may be demountably engaged by a screw or bolt passed through side mount holes 1135 and threadably engaged with the threaded core component 1125. A threaded core component 1125 may be securely fixed in place within a cylindrical structural component by use of a polymeric adhesive or brazing or an interference fit provided by crush ribs and the like.

According to a preferred embodiment, the outer contours of the side-opening socket component 1020, as illustrated in FIG. 50, may include one or more threaded holes, nuts 1140, or threaded inserts 1142 to be secured adjacently within a side mount holes 1145 whereby a screw or bolt may secure a male assembly 1001 or other component having a concave face and configured to receive a screw.

As previously noted, a side-opening socket component 1020 may optionally receive a flat base male assembly 1005 for demountable engagement of the socket component's module with another module of the system having a flat surface whereon the flat base male assembly 1005 is demountably engaged. As illustrated in FIG. 51, the pronged connector component 1030 of the flat base male assembly is secured against the flat base component 1044 by locator posts 1043 within locator holes 1045 at one of the eight available angular orientations. The opposite side of the flat base component 1044 may comprise locator posts 1150 by which the male assembly 1005 may be secured onto a flat end cap component 1155 at its locator holes 1156 when a screw or bolt 1160 inserted through the center of the male assembly is threadably engaged with a threaded hole or insert 1165 located centrally in the flat end cap component 1155. The flat end cap component is fastened to the end of a cylindrical structural component 1127 by screws 1170 of which the threaded portions are passed through holes 1175 in the flat end cap component and threadably engaged with screw channels 1180 on the inner contours of the cylindrical structural component, and whereby a male assembly 1005 may be demountably engaged with the flat end cap component 1155 to form one embodiment of a male end 1183.

Channel openings 1185 in the sides of the flat end cap component 1155 enable passage of nuts 1110 into the nut channels 1190 of the cylindrical structural component 1127, provided for secure attachment of additional concave base male assemblies 1001 or other components having a concave face and configured to receive a screw. For this same purpose, as previously described, a threaded core component 1125 may be installed within a cylindrical structural component 1127, comprising a plurality of threaded holes, nuts, or threaded inserts 1130 whereby one or more concave base male assemblies 1001 or other modular component may be demountably engaged by a screw or bolt passed through side mount holes 1135 and threadably engaged with the threaded core component 1125.

Figure 52:
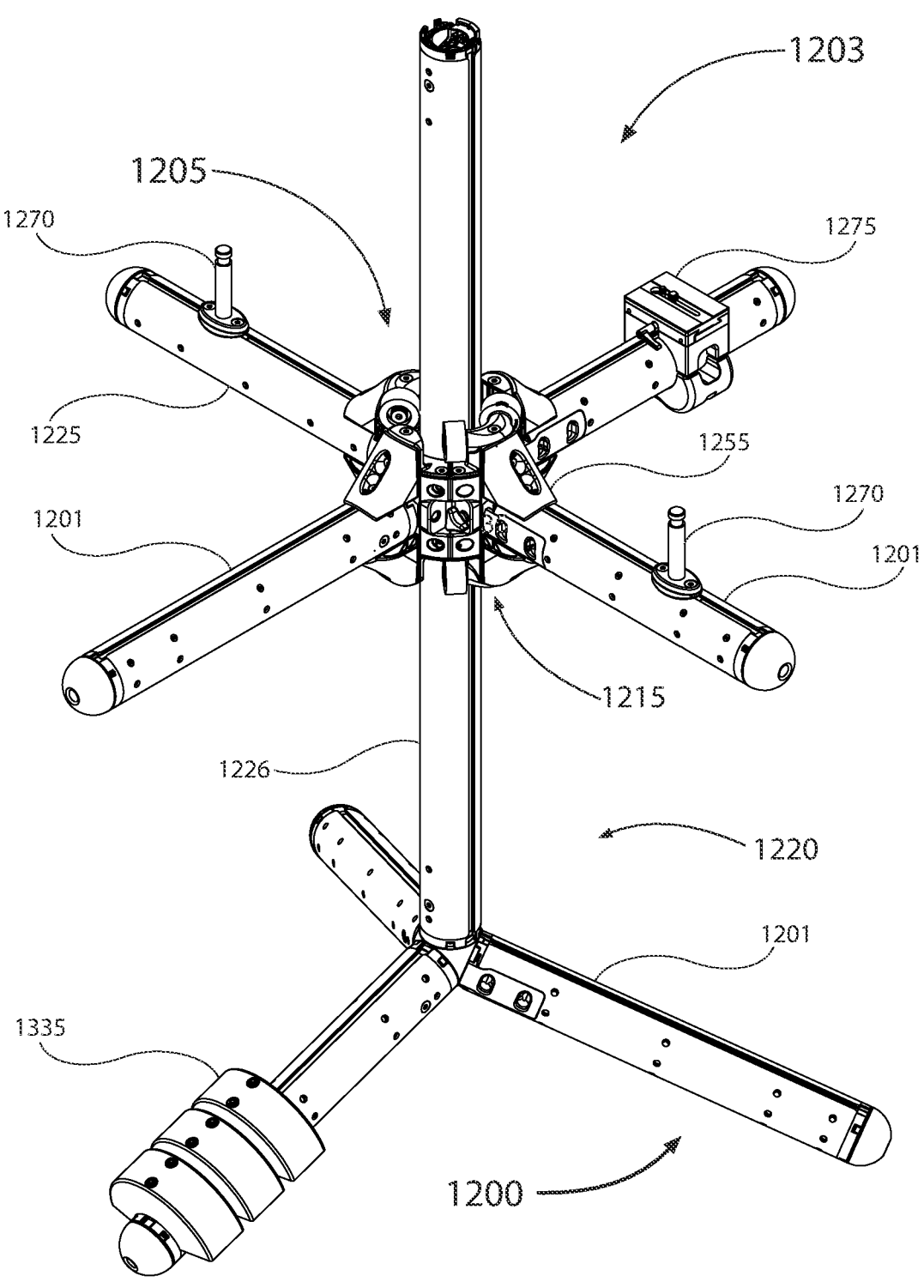
FIG. 52 is a whole perspective view of an example of a track assembly comprising a four-sided clamping roller carriage assembly configured for rolling movement on a vertical single track assembly.

A range of lengths of cylindrical structural component may be configured with varying combinations of one or two female ends 1008 and/or one or two male ends 1183 and/or one or two flat end cap components 1155 at the ends of the cylindrical structural component to form a variety of cylindrical structural component modules 1200, such as the side-opening socket/end cap module 1201 as illustrated in FIG. 52, and the double side-opening socket module 1010 as previously described. The various cylindrical structural component modules in conjunction with one another and the other structural and functional components of the system, such as device mount components, shelf and/or tray and/or table components, weight components, wheel and/or caster and/or foot components, rail-rolling modules and/or roller carriage assemblies, and/or track assemblies, may be assembled to form the further embodiments of structural support and utility apparatuses as described below.

A first embodiment of a track assembly 1203 and first embodiment of a roller carriage assembly 1205 are illus-trated in FIGS. 52 to 55. The roller carriage assembly is here configured as a four-sided clamping roller carriage assembly 1215 and is moveable upward and downward on a vertical single track assembly 1220 on which it has been stably engaged. Demountably engaged with the four-sided clamping roller carriage assembly 1215 are three side-opening socket/end cap modules 1201 and one end cap/end cap module 1225 on which various devices, tools, or other loads may be supported, and/or by which an operator may use one or more of the modules as a handle to control the rolling movement of the roller carriage assembly on a cylindrical track component 1226. Optionally, a bumper component 1227 may be demountably engaged with the outer ends of the modules 1201, 1225 by a screw 1228 threadably engaged with the threaded hole 1165 in the center of the cooperating flat end cap components 1155.

Figure 53:
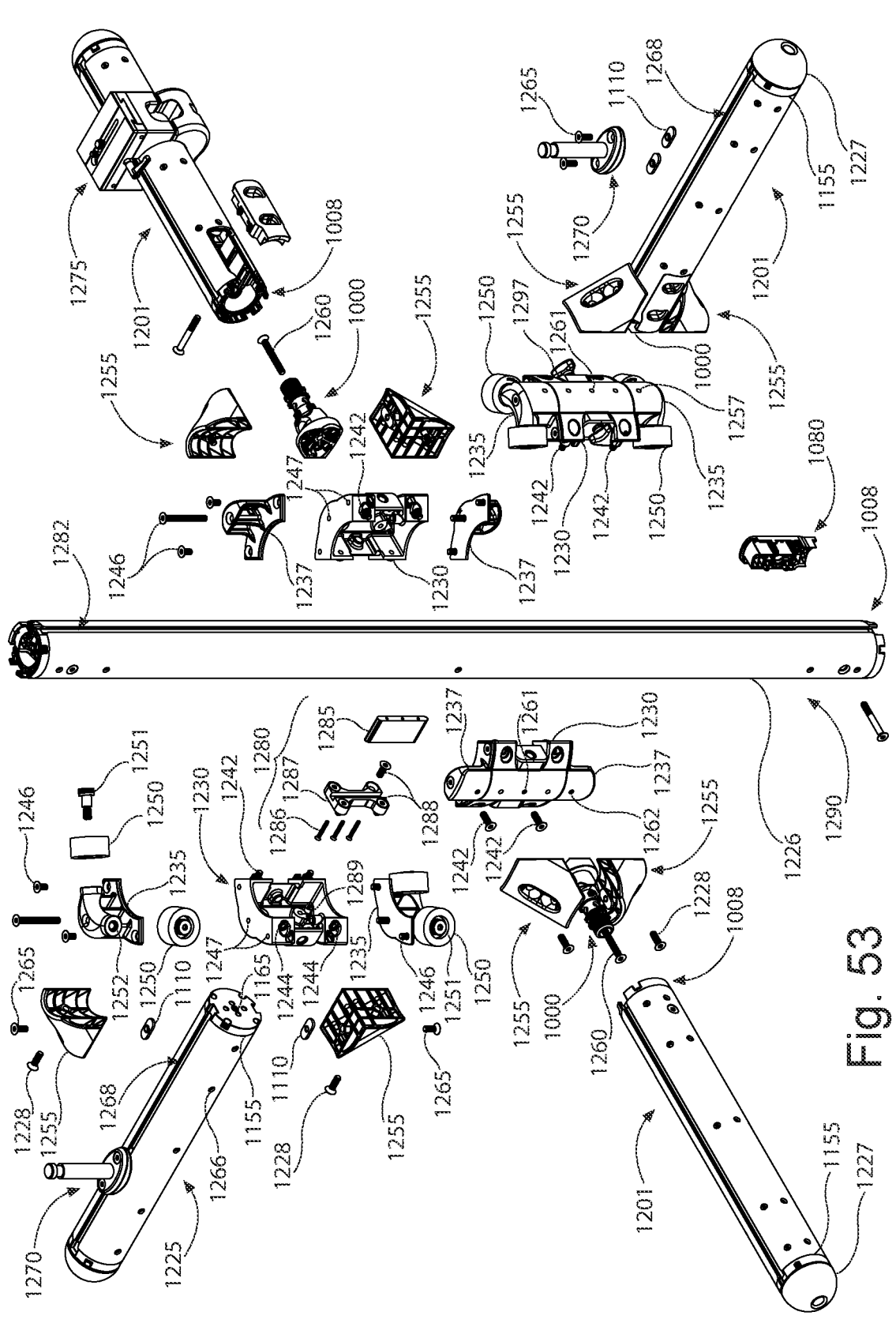
FIG. 53 is a partially exploded perspective view of the four-sided clamping roller carriage assembly shown in FIG. 52 comprising four carriage body components with roller mounts or corner brace mounts and four cooperating cylindrical structural component modules and a vertical cylindrical track component.

As illustrated in FIG. 53, the four-sided clamping roller carriage assembly 1215 comprises four carriage body components 1230. According to this and additional embodiments as described in further detail below, a roller carriage assembly 1205 may comprise between one and four carriage body components 1230, as well as a combination of roller mounts 1235 and/or corner brace mounts 1237, to form the supportive body of a roller carriage assembly. Where two, three, or four carriage body components 1230 are included in a roller carriage assembly 1205, each body component 1230 may be demountably engaged to a next adjacent body component 1230 by screws 1242 threadably engaged with threaded holes 1244.

Optionally, a roller mount 1235 or a corner brace mount 1237 is demountably engaged with an end of a carriage body component 1230 by one or more screws 1246 at one or more threaded holes 1247 in the end face of the body component 1230. Where a roller mount 1235 is provided, two rollers 1250 may be demountably engaged by shoulder screws 1251 threadably engaged with threaded holes 1252. The inclined axle ends provided by the roller mounts 1235 align the mounted rollers at an angle and separation for fitted contact and rolling engagement with the circumference of a cylindrical track component 1226. According to a further embodiment, the carriage body component and the roller mounts and/or the corner brace mounts may be combined into a single component comprising the same functional elements.

A corner brace 1255 may be secured by a screw 1228 threadably engaged with a threaded hole 1257 in the out-facing surface of the roller mount 1235. A corner brace 1255 is optionally provided therefor structural reinforcement of a cylindrical structural component module provided with a female end 1008 whereby it is mounted to a male connector 1000 which is demountably engaged by a screw or bolt 1260 threadably engaged with a threaded hole 1261 in the out-facing surface of the body component 1230. In place of a roller mount 1235, a corner brace mount 1237 may be provided in positions where a corner brace 1255 is required but rollers are not, and a corner brace may be demountably engaged by a screw 1228 at a threaded hole 1262 in the corner brace mount.

Whether used in conjunction with a roller mount 1235 or a corner brace mount 1237, according to some embodiments, an end cap/end cap module 1225 comprising a flat end cap component 1155 at the proximal end of the module may be demountably engaged with a roller carriage assembly by one or two corner braces 1255 only. Corner braces 1255 are demountably engaged with the sides of the cylindrical structural component modules by a screw 1265 threadably engaged with a threaded core component 1125 positioned within the cylindrical structural component at a side mount hole 1266, or a nut 1110 secured within a nut channel 1268 in a side of the cylindrical structural component. Optionally included in an assembly by either of the same means of attachment, a stud mount component 1270 or a dovetail plate mount assembly 1275 are shown demountably engaged with three of the cylindrical structural component modules, whereby a camera, a light, a screen, a monitor, a microphone, a sensor, a tool, a power tool, or other device may be securely engaged.

According to some embodiments, a roller carriage assembly 1205 may comprise a channel-guide component 1280, as illustrated in FIG. 53, which is secured to the track-facing side of a carriage body component 1230 and is aligned with and inserted into a side channel 1282 in the side of a cylindrical track component 1226, where when a straight-line movement is desired, it prevents the roller carriage assembly from deviating off-line when traveling along the track component. According to further embodiments where a cylindrical track component is oriented horizontally, a channel-guide component may be used to maintain the upright position of a roller carriage assembly, as described in further detail below. A channel-guide component 1280 may comprise a slidable guide element 1285 secured by screws 1286 to a guide mount element 1287 which is fastened by screws 1288 to threaded holes 1289 in the carriage body component 1230. According to one embodiment, the cylindrical track component 1226 is configured as a further example of a double side-opening socket module 1290.

According to certain embodiments, a roller carriage assembly may comprise one or more of an adjustable clamping mechanism which can be adjusted to apply varying degrees of clamping force on a track component for intermittent stoppage of the assembly's movement, or limitation of its speed with partial pressure of the mechanism applied. An adjustable clamping mechanism may also be adjusted to be fully disengaged so that the roller carriage assembly may travel along a track component optionally without resistance.

Figure 54:
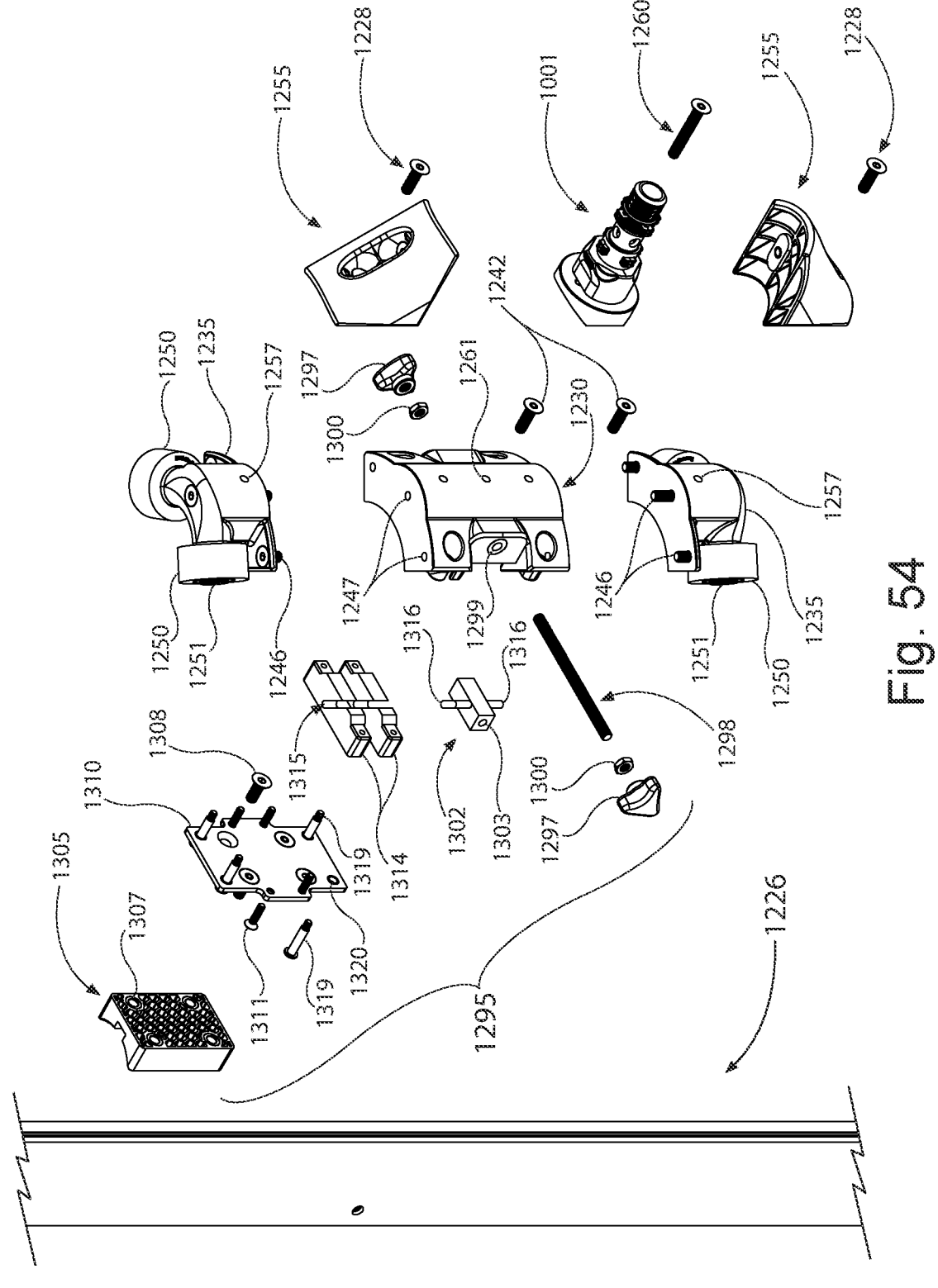
FIG. 54 is a partially exploded perspective view of a roller carriage assembly with an adjustable clamping mechanism in alignment for engagement with a cylindrical track component.

According to one embodiment, as illustrated in FIG. 54, an adjustable clamping mechanism 1295 is shown in alignment for application of clamping pressure against a cylindrical track component 1226. An adjustable clamping mechanism 1295 may comprise two threaded knobs 1297 which are threadably engaged at the ends of a threaded rod 1298 which passes through a hole 1299 in in both sides of the carriage body component 1230. The threaded knobs 1297 may be secured in place at the ends of the threaded rod 1298 by lock nuts 1300. Manual rotation of one or both knobs by the operator causes rotation of the threaded rod, which in turn causes axial translation of a threaded carrier 1302 comprising a threaded hole 1303 through its center. As the threaded carrier moves axially along the threaded rod, it converts this motion to movement of a concave friction pad 1305, perpendicular to the direction of the threaded carrier movement and toward or away from the track component.

The concave friction pad 1305 is mounted at its threaded holes or threaded inserts 1307 by screws 1308 to a friction pad mount plate 1310 to which on the opposite side is mounted, by screws 1311, two guide blocks 1314 comprising each an angled slot 1315 configured for sliding engagement each with an angled protrusion 1316 on the cooperating two sides of the threaded carrier 1302. The friction pad mount plate 1310 and supported components are secured to the inside of the carriage body component 1230 at threaded holes 1318 (as illustrated in FIG. 56, 56A, 56B, 56C, 56D), by shoulder screws 1319 in through-holes 1320 which allow the friction pad mount plate to slide toward and away from the carriage body component where the shoulder screws are free to slide within the through-holes in the friction pad mount plate.

As the threaded carrier moves axially along the threaded rod 1298, the angled protrusions 1316 slide within the angled slots 1315. As a result of the angle of the protrusions and the slots and that the guide blocks 1314 are attached to the friction pad mount plate 1310 which is captive inside the carriage body component 1230 in such a way as to constrain it against movement parallel to the movement of the threaded carrier 1302, the resulting movement of the guide blocks 1314 and cooperating friction pad mount plate 1310 is perpendicular to the axial translation of the threaded carrier. This perpendicular motion moves the concave friction pad 1305 towards a cylindrical track component 1226 to engage it and apply resistance to the movement of a roller carriage assembly 1205 or pulls the concave friction pad away from the cylindrical track component to reduce or remove resistance to the movement of the roller carriage assembly.

Figure 55:
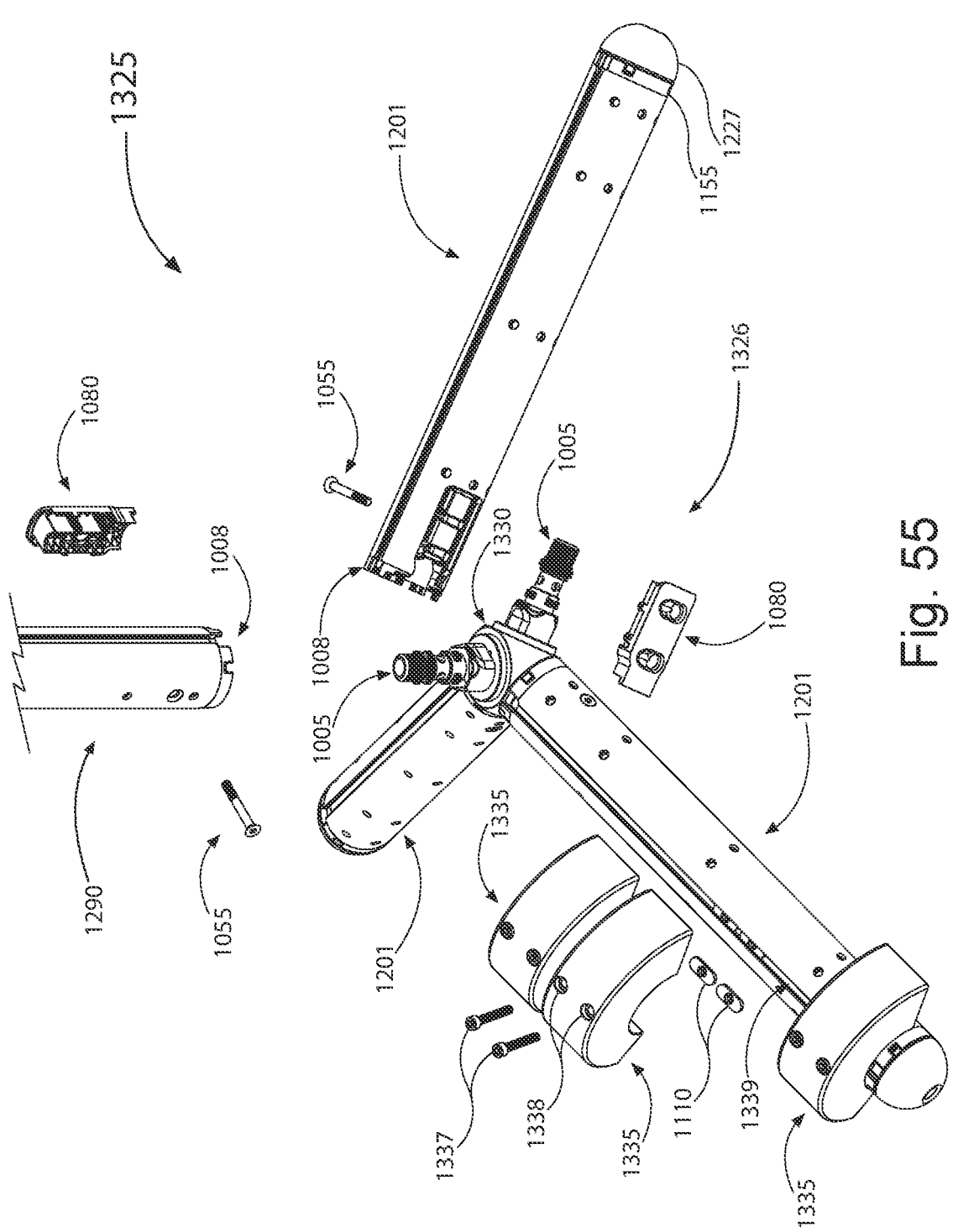
FIG. 55 is a partially exploded cutaway perspective view of a track base assembly configured as a vertical single track base assembly with weight components.

According to some embodiments, as illustrated in FIG. 55, a cylindrical track component 1226 of a track assembly 1203 may be stably supported on the ground by a track base assembly 1325. According to a preferred embodiment, a track base assembly may be configured as a vertical single track base assembly 1326. A four-sided pyramidal male connector mount 1330 is provided with four demountably engaged flat base male assemblies 1005, whereon three downwardly angled side-opening socket/end cap modules 1201 and the vertically-oriented track double side-opening socket module 1290 are demountably engaged at their female ends 1008 by screws or bolts 1055 threadably engaged with the receptacle covers 1080. For greater stability of the base assembly, one or more weight components 1335 may be demountably engaged with one or more of the modules 1201 by screws 1337 passed through holes 1338 in the weight components and threadably engaged with nuts 1110 securely retained within a nut channel 1339 of the modules 1201. Optionally, bumper components 1227 may be provided as foot components where demountably engaged with the outer ends of the base modules 1201 by a screw threadably engaged with the threaded hole in the center of the cooperating flat end cap components 1155.

According to further embodiments where an operation of a carriage assembly on a track assembly requires both intermittent stoppage of the carriage assembly's movement or limitation of its speed on a track component as well as maintaining the vertical or horizontal orientation of the carriage assembly relative to the track component, a carriage assembly may comprise a channel-guide adjustable clamping mechanism, as illustrated in FIG. 56. According to one embodiment, a single-sided roller carriage assembly 1340 may comprise a channel-guide adjustable clamping mechanism 1345 wherein a sub-assembly of two threaded knobs 1297, a threaded rod 1298, threaded carrier 1302, guide blocks 1314, and a friction pad mount plate 1310 is configured as in the adjustable clamping mechanism 1295 and is likewise moveably engaged on shoulder screws 1319 threadably engaged at threaded holes 1318 within a carriage body component 1230, but wherein on the friction pad mount plate 1310, in place of a concave friction pad 1305, is mounted, by screws 1308 at its threaded holes or threaded inserts 1346, a cylindrical track channel-guide friction pad 1347 comprising a pad protrusion 1348 along its center for slidable engagement with a nut channel of a cylindrical structural component or whereas more specifically defined in its use in a cylindrical track component 1226, a side channel 1282.

According to further embodiments, a modular apparatus of the system may comprise a sliding carriage assembly wherein roller mounts and rollers are excluded from the carriage assembly and the alignment and moveable position of the carriage assembly is maintained by two opposing channel-guide adjustable clamping mechanisms slidably engaged against the circumference of a cylindrical structural component and within its side channels.

Figure 57A:
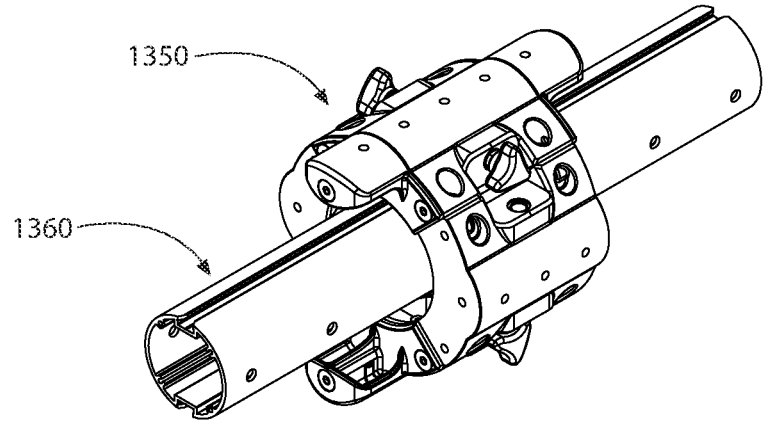
FIG. 57 shows a whole perspective view and a partially exploded perspective view FIGS. 57A and 57B, respectively, of a sliding carriage assembly slidingly engaged with a cylindrical structural component.
Figure 57B:
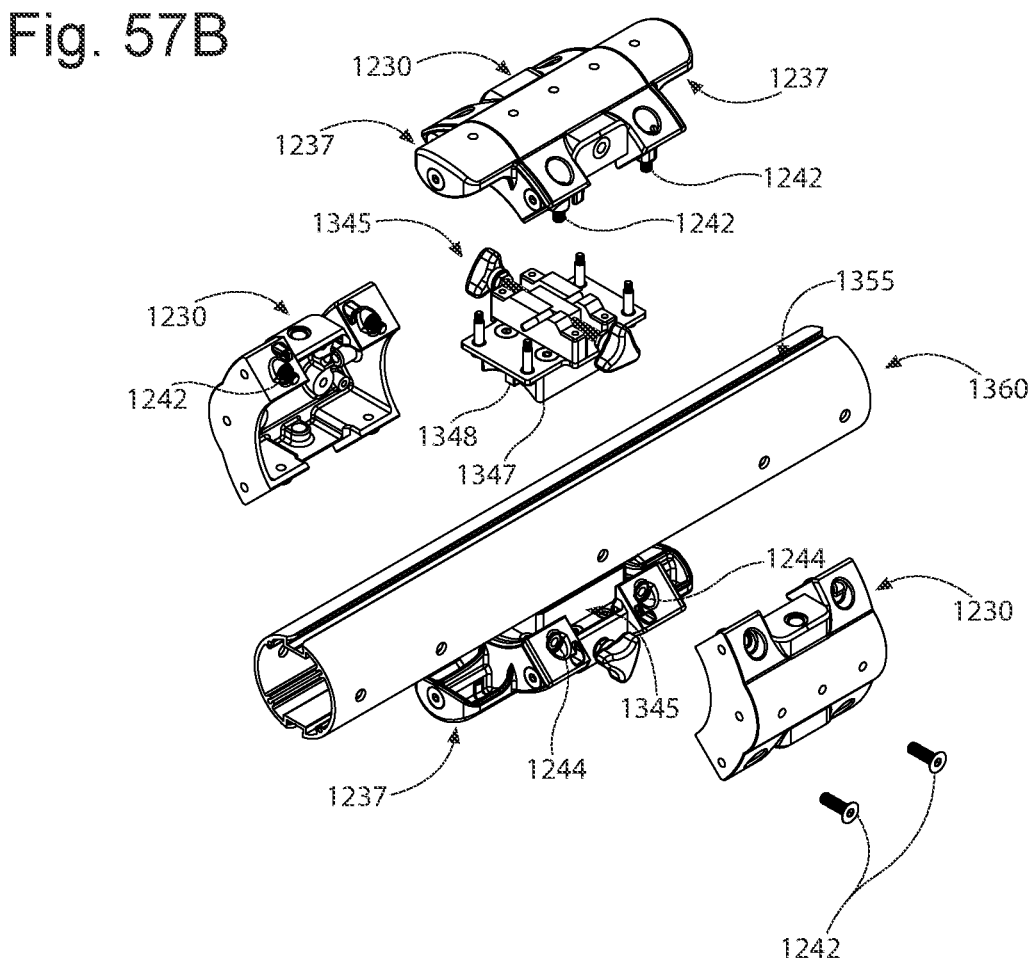

As illustrated in FIG. 57, 57A, 57B, a sliding carriage assembly 1350 comprises four carriage body components 1230 where each body component is demountably engaged to a next adjacent body component by screws 1242 threadably engaged with threaded holes 1244. Optionally, corner brace mounts 1237 may be included at one or both ends of one or more of the carriage body components 1230 where demountable engagement of a corner brace may be required. As described in reference to FIG. 56, a channel-guide adjustable clamping mechanism 1345 may be secured to the inside of the two opposing carriage body components 1230 which are in alignment with two side channels 1355 of a cylindrical structural component 1360. The sliding carriage assembly 1350 is retained and slidable along the cylindrical structural component where both of the clamping mechanisms 1345 are adjusted to maintain at least a minimum amount of pressure against the circumference of the cylindrical structural component and with the pad protrusions 1348 slidably engaged within the side channels 1355.

According to further embodiments, a track dolly assembly may comprise one or two pairs of roller carriage assemblies for rolling movement along a track assembly. According to one embodiment, the roller carriage assemblies may be attached via multidirectional component mounts to one or two cylindrical structural components which form the structure of a track dolly assembly configured for rolling movement along a standard steel-pipe track assembly or an adjustable-level track assembly.

Figure 58:
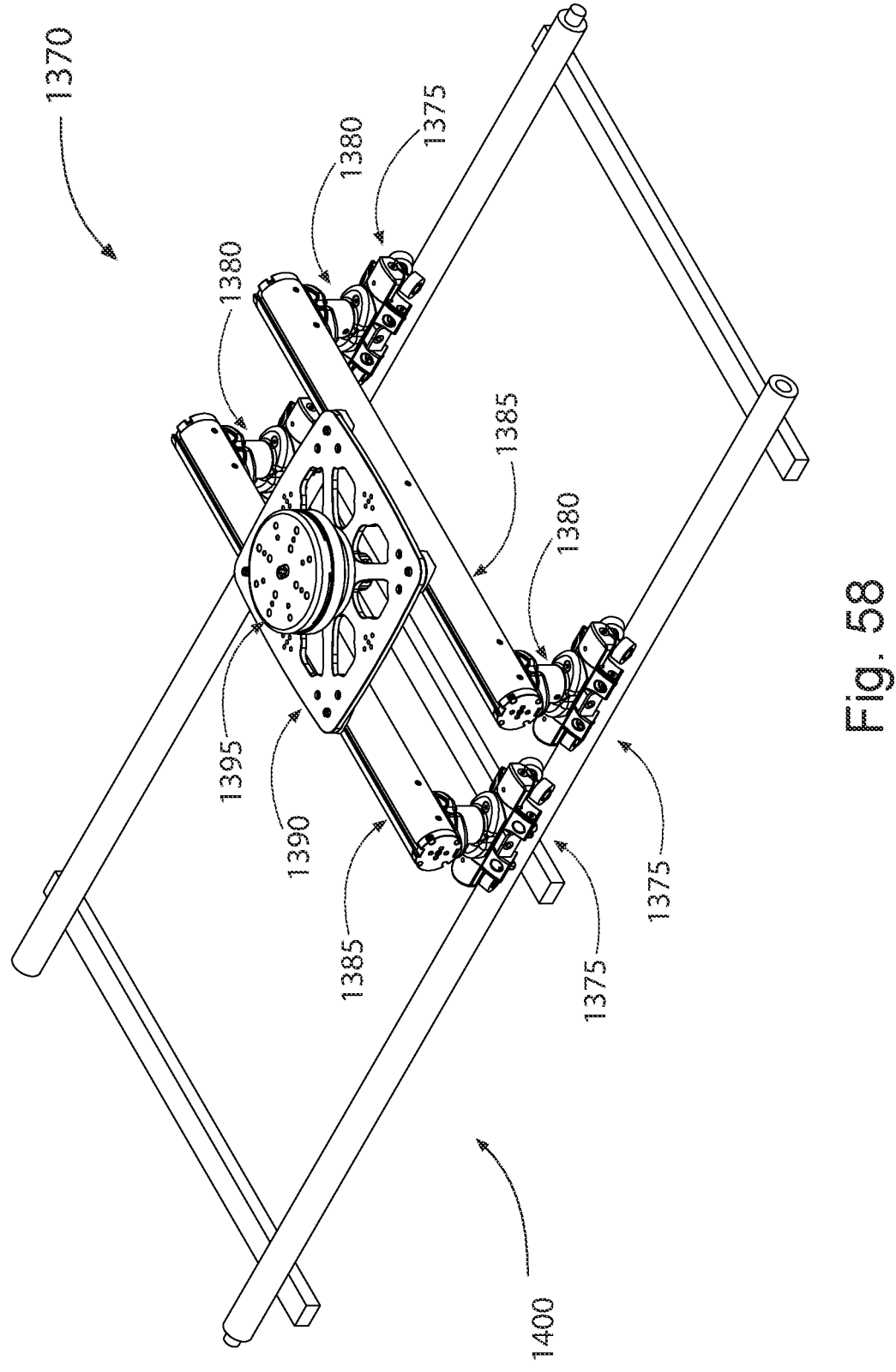
FIG. 58 is a whole perspective view of a track dolly assembly comprising four single-sided roller carriage assemblies mounted by four multidirectional component mounts to two cylindrical structural components with a device mount plate spanning between, said track dolly assembly rollable on a standard steel-pipe track assembly.
Figure 59:
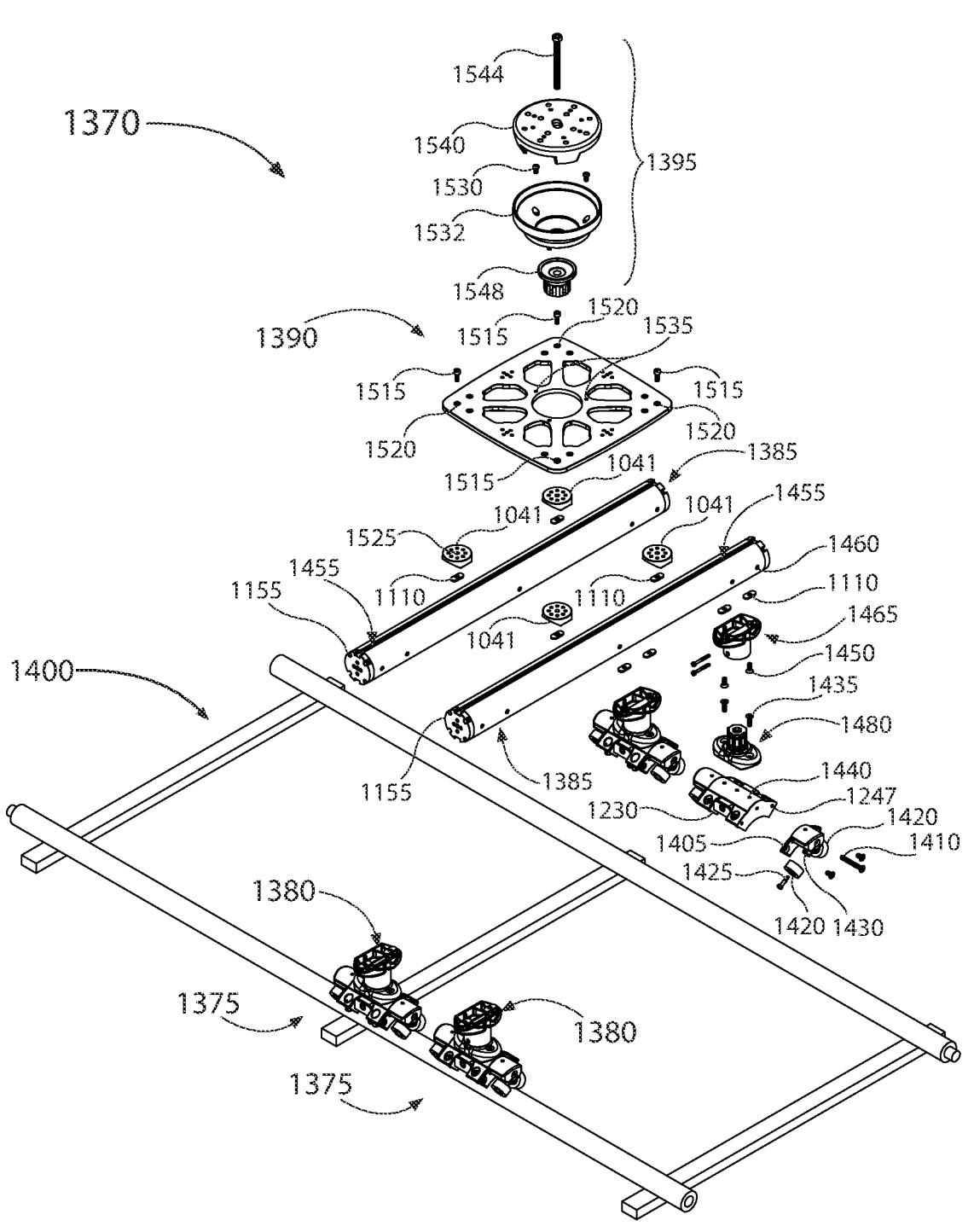
FIG. 59 is a partially exploded perspective view of the track dolly assembly shown in FIG. 58.

According to one embodiment, as illustrated in FIGS. 58 and 59, a track dolly assembly 1370 is shown comprising four single-sided roller carriage assemblies 1375 attached via four multidirectional component mounts 1380 to two cylindrical structural component modules 1385 with end cap components 1155 at each end. Between the modules 1385, a device mount plate 1390 is attached for mounting of one or more of a camera, a light, a screen, a monitor, a microphone, a sensor, a tool, a power tool, or other device on a bowl/ball mount assembly 1395, or other means of attachment such as a stud mount component 1270 or a dovetail plate mount assembly 1275, as previously described, mounted directly to one of the cylindrical structural component modules 1385, for rolling movement of the device(s) along a standard steel-pipe track assembly 1400.

Optionally where resistance against the track assembly is not desired, the single-sided roller carriage assemblies 1375 may exclude adjustable clamping mechanisms 1295. A single-sided roller carriage assembly 1375 may comprise a carriage body component 1230 having two roller mounts 1405 demountably engaged with both ends of the body component by one or more screws 1410 at one or more threaded holes 1247 in the end face of the carriage body component 1230. Two rollers 1420 may be fastened to each roller mount 1405 by shoulder screws 1425 threadably engaged at threaded holes 1430. The inclined axle ends provided on the roller mounts 1405 align the mounted rollers at an angle and separation for fitted contact and rolling engagement with the circumference of the rails of the standard steel pipe track assembly 1400. According to a further embodiment, the carriage body component and the roller mounts may be combined into a single component comprising the same functional elements.

Each pair of single-sided roller carriage assemblies 1375 may be demountably engaged with a cylindrical structural component module 1385 by two multidirectional component mounts 1380 fastened by screws 1435 threadably engaged at threaded holes 1440 in the out-facing surface of each carriage body component 1230. Each cylindrical structural component module 1385 is demountably engaged with the opposite end of the two multidirectional component mounts 1380 by screws 1450 threadably engaged with nuts 1110 secured within nut channels 1455 along the side of the cylindrical structural component module, or according to further embodiments where threadably engaged directly with threaded side mount holes 1460 provided along the length of a cylindrical structural component module.

According to some embodiments, as illustrated in FIG. 59 and FIGS. 60, 60A, 60B, 60C, and 60D, a multidirectional component mount 1380 comprises a female mating component 1465 comprising a female segment 1470 within which is a generally octagonal shaped receptacle 1475 configured for demountable engagement with a male mating component 1480 comprising a generally octagonal shaped male segment 1485. When assembled, a threaded portion of two screws or bolts 1490 are passed through holes 1495 in one side of the female segment 1470 and through one of four sets of through-holes 1500 in the male segment 1485 to be threadably engaged with threaded holes 1505 located on the opposite side of the male segment 1485.

Figures 60A, 60B, 60C, 60D:
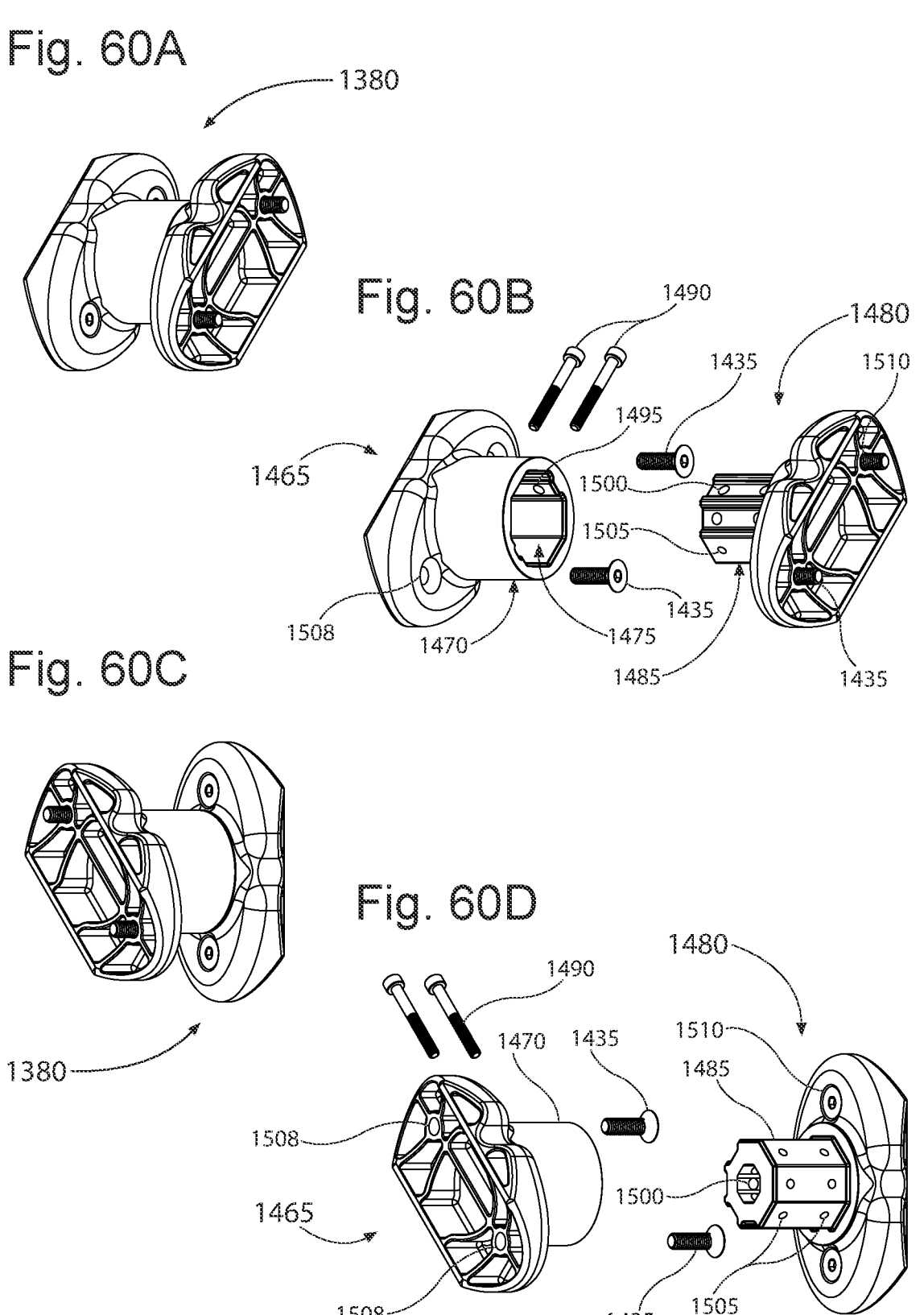
FIGS. 60C and 60D are a whole perspective view and an exploded perspective view, respectively, of a multidirectional component mount at a 45-degree setting.

The male segment 1485 is optionally demountably engaged within the female receptacle 1475 at four alignments wherein each of the four pairs of sides of the octagonal shape and the through-holes 1500 and threaded holes 1505 may be aligned with the octagonal shaped receptacle's interlocking profile and through-holes 1495. This allows for four alignments of the two mating components 1465, 1480 and of the any two components mounted to the out-faces of the mating components by screws 1435/1450 of which the threaded portions are passed through holes 1508 in the female mating component 1465 and holes 1510 in the male mating component 1480 to be threadably engaged with threaded holes or nuts 1110 in the side of the cooperating components. The four settings of the multidirectional component mounts 1380 provide a perpendicular alignment, as illustrated in FIGS. 58 and 59, or a parallel alignment, as illustrated in FIGS. 60A and 60B, or one of two diagonal alignments, of which one is illustrated in FIGS. 60C and 60D.

According to certain embodiments, as illustrated in FIGS. 58 and 59, the four corners of a device mount plate 1390 may be demountably engaged with the two upward faces of the two cylindrical structural component modules 1385 via four concave base components 1041. The threaded portion of screws 1515 are passed through holes 1520 in the corners of the device mount plate 1390, and through-holes 1525 in the concave base components 1041, to be threadably engaged with nuts 1110 securely retained within the upward-facing nut channels 1455 along the cylindrical structural component modules 1385, as illustrated, or according to further embodiments at threaded side mount holes 1460 provided along cylindrical structural component modules.

For interfacing with one or more of a camera or other device, a device mount plate 1390 may have a bowl/ball mount assembly 1395, as illustrated in FIG. 59A, demountably engaged thereon by screws 1530 through holes in a bowl mount 1532 to be threadably engaged with threaded holes 1535 in the device mount plate. A ball adapter 1540 is retained within the bowl mount 1532 by a screw or bolt 1544 through the center of the ball adapter, a hole in the bowl mount, and there threadably engaged with a locking handle 1548 which is fastened against the bottom of the bowl mount. According to further embodiments, a device mount plate may interface directly with a camera or other device by screws or other means of attachment.

Figure 61:
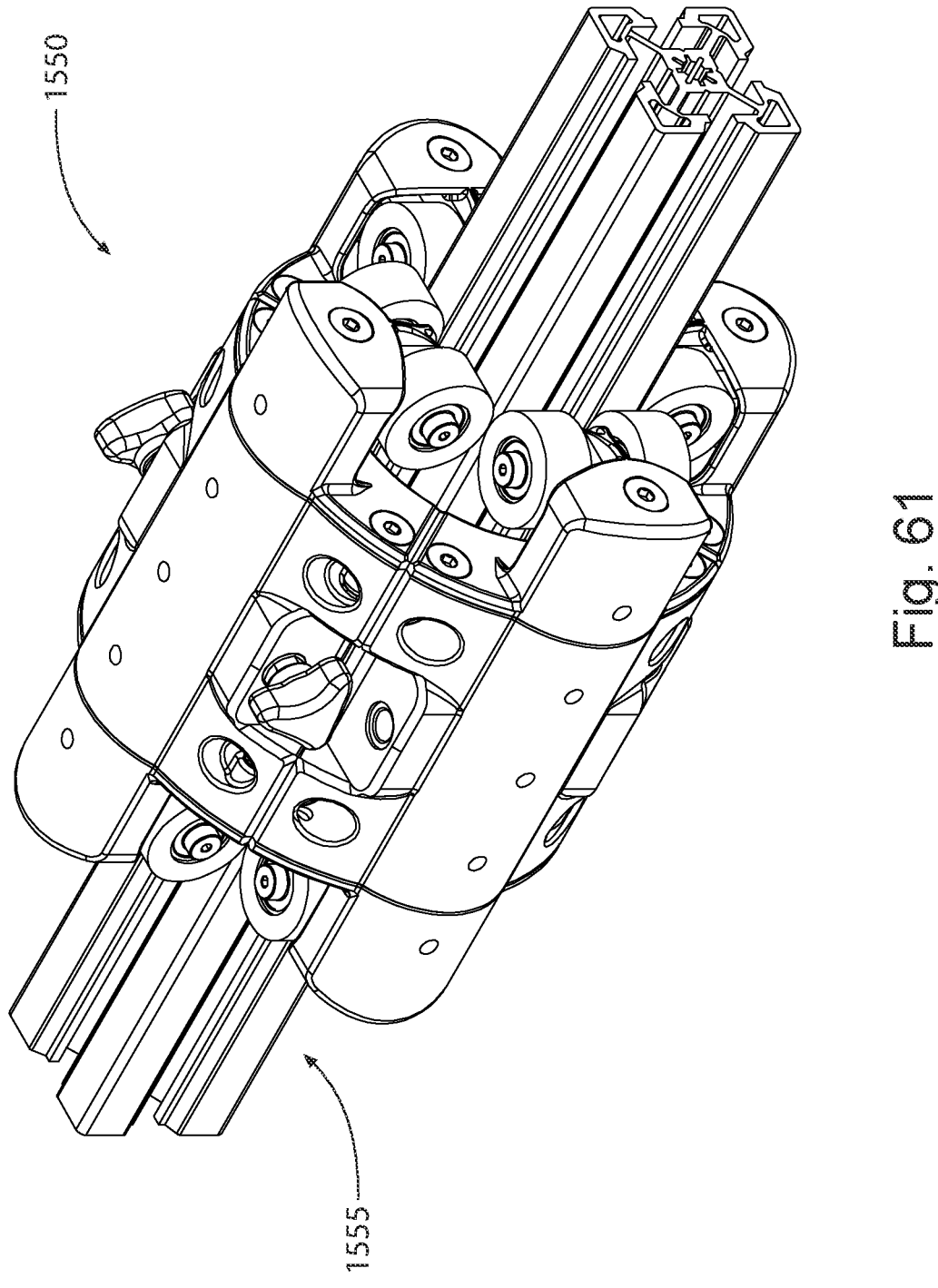
FIG. 61 is a whole perspective view of a four-sided clamping square track roller carriage assembly configured for rollable engagement with a square track component also shown.
Figure 62:
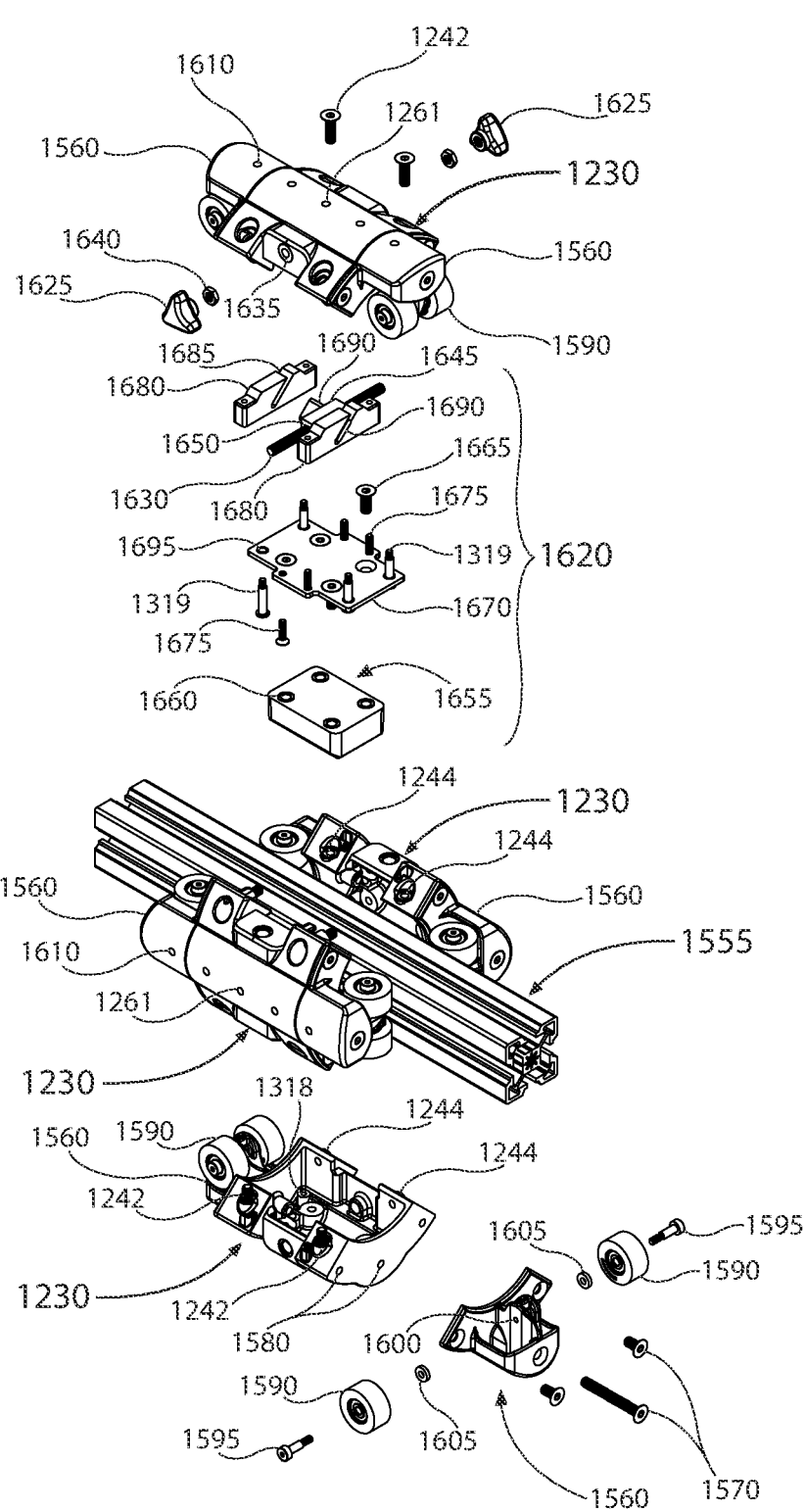
FIG. 62 is a partially exploded perspective view of the square track roller carriage assembly and square track component shown in FIG. 61.

According to additional embodiments, roller carriage assemblies and/or sliding carriage assemblies may be configured for secure engagement with and rolling movement along square track components. As illustrated in FIGS. 61 and 62, a four-sided clamping square track roller carriage assembly 1550 is shown configured for engagement with one or an assembled series of a square track component 1555. According to one embodiment, a four-sided clamping roller carriage assembly 1550 comprises four carriage body components 1230 where each is demountably engaged to a next adjacent body component by screws 1242 threadably engaged with threaded holes 1244. A square roller mount 1560 is demountably engaged with both ends of each carriage body component 1230 by screws 1570 threadably engaged with threaded holes 1580. Two rollers 1590 may demountably engaged by shoulder screws 1595 threadably engaged with threaded holes 1600.

According to a preferred embodiment, a washer 1605 may be inserted between the roller mounts 1560 and the bearings of the rollers 1590 to separate the rollers from the roller mounts to better align the rails away from the roller mount and cooperating with the surfaces of the square track component(s) 1555. Alternatively, a roller mount may be provided with a protruding segment on both sides wherein the threaded holes are provided for threadable engagement of the shoulder screws. According to a further embodiment, the carriage body component and the square roller mounts may be combined into a single component comprising the same functional elements.

Additionally, a corner brace 1255 may be secured by a screw threadably engaged with a threaded hole 1610 in the out-facing surface of a roller mount 1560. A corner brace 1255 may be optionally provided there for structural reinforcement of a cylindrical structural component module 1200 (not shown) provided with a female end 1008 whereby it is mounted to a male connector 1000 which may be demountably engaged by a screw threadably engaged with a threaded hole 1261 in the out-facing surface of a carriage body component 1230.

According to some embodiments, a square track roller carriage assembly may comprise one or more of an adjustable clamping mechanism which can be adjusted to apply varying degrees of resistance on one or an assembled series of square track components for intermittent stoppage of the assembly's movement, or limitation of its speed with partial pressure of the mechanism applied. As illustrated in FIGS. 61 and 62, the four-sided clamping square track roller carriage assembly 1550 comprises a square track adjustable clamping mechanism 1620.

According to one embodiment, as illustrated in FIG. 62, a square track adjustable clamping mechanism 1620 is shown in alignment for application of clamping pressure against a square track component 1555. The adjustable clamping mechanism 1620 may comprise two threaded knobs 1625 which are threadably engaged at the ends of a threaded rod 1630 which passes through a hole 1635 in in both sides of the carriage body component 1230. The threaded knobs 1625 may be secured in place at the ends of the threaded rod 1630 by lock nuts 1640. Manual rotation of one or both knobs by the operator causes rotation of the threaded rod, which in turn causes axial translation of a threaded carrier 1645 comprising a threaded hole 1650 through its center. As the threaded carrier moves axially along the threaded rod it converts this motion to movement of a flat friction pad 1655, perpendicular to the direction of the threaded carrier movement and toward or away from the square track component 1555.

The flat friction pad 1655 is mounted at its threaded holes or threaded inserts 1660 by screws 1665 to a friction pad mount plate 1670 to which on the opposite side is mounted, by screws 1675, two guide blocks 1680 comprising each an angled slot 1685 configured for sliding engagement each with an angled protrusion 1690 on the cooperating two sides of the threaded carrier 1645. The friction pad mount plate 1670 and supported components are secured to the inside of the carriage body component 1230 at threaded holes 1318, by shoulder screws 1319 in through-holes 1695 which allow the friction pad mount plate to slide toward and away from the carriage body component where the shoulder screws are free to slide within the through-holes in the friction pad mount plate.

As the threaded carrier 1645 moves axially along the threaded rod 1630, the angled protrusions 1690 slide within the angled slots 1685. As a result of the angle of the protrusions and the slots and that the guide blocks 1680 are attached to the friction pad mount plate 1670 which is captive inside the carriage body component 1230 in such a way as to constrain it against movement parallel to the movement of the threaded carrier 1645, the resulting movement of the guide blocks 1680 and cooperating friction pad mount plate 1670 is perpendicular to the axial translation of the threaded carrier. This perpendicular motion moves the flat friction pad 1655 towards a square track component 1555 to engage it and apply resistance to the movement of the square track roller carriage assembly or pulls the flat friction pad away from the square track component to reduce or remove resistance to the movement of the roller carriage assembly.

According to further embodiments where an operation of a carriage assembly on a square track assembly requires both intermittent stoppage of the carriage assembly's movement or limitation of its speed on a square track component as well as maintaining the vertical or horizontal alignment of the carriage assembly relative to the track component, a square track carriage assembly may comprise a square track channel-guide adjustable clamping mechanism.

According to one embodiment, as illustrated in FIGS. 63A and 63B, a single-sided square track roller carriage assembly 1700 may comprise two square roller mounts 1560 with rollers 1590 fastened to the ends of a carriage body component 1230 wherein a square track channel-guide adjustable clamping mechanism 1705 is secured within the body component 1230 at threaded holes 1318, as illustrated in FIG. 62, by shoulder screws 1319. According to a further embodiment, the carriage body component and the square roller mounts of a roller carriage assembly 1700 may be combined into a single component comprising the same functional elements.

Figure 64A:
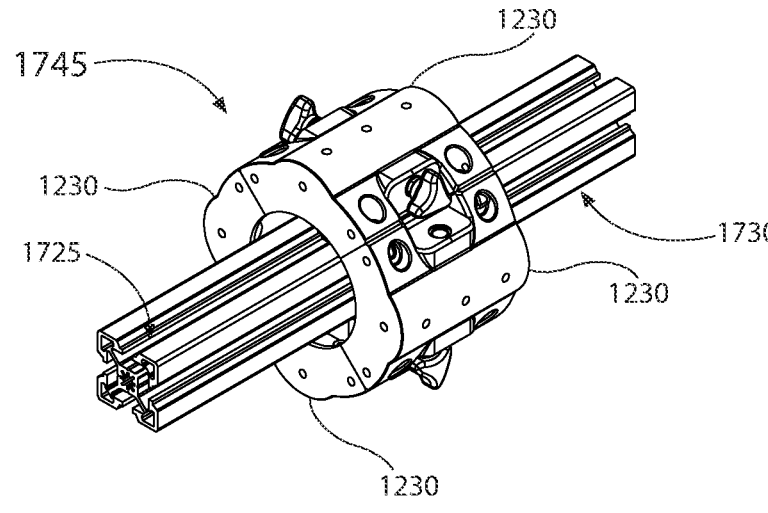
FIG. 64 shows a whole perspective view and a partially exploded perspective view FIGS. 64A and 64B, respectively, of a four-sided sliding carriage assembly with two square track channel-guide adjustable clamping mechanisms.
Figure 64B:
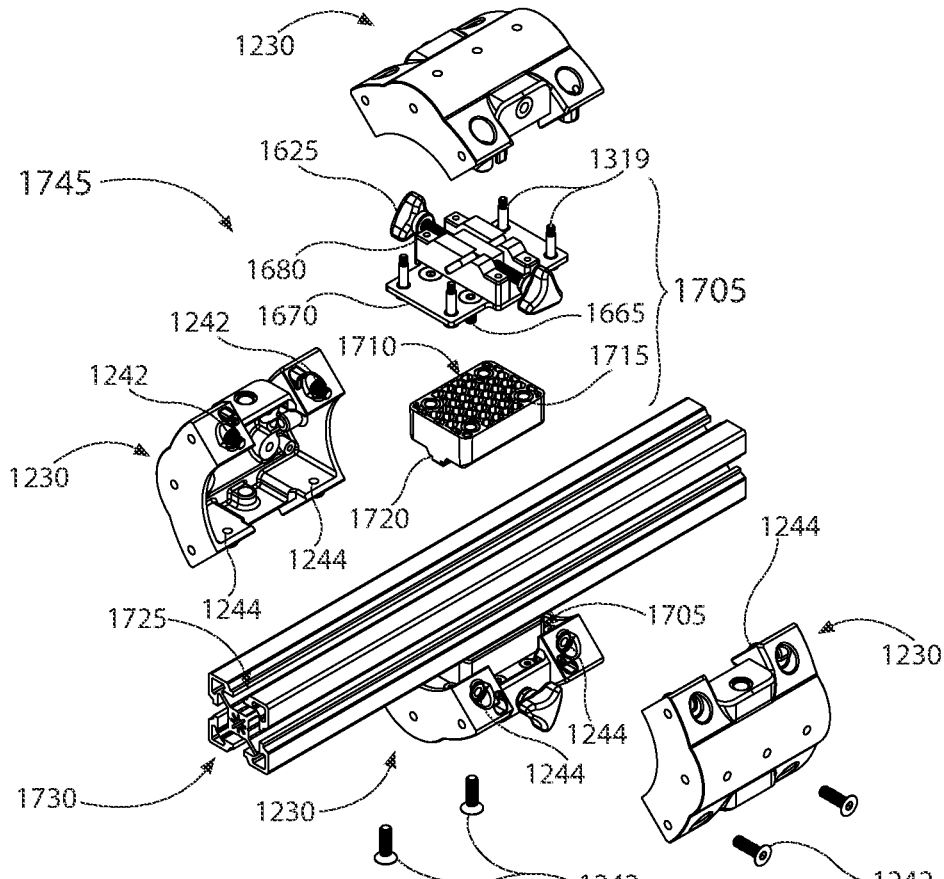

A sub-assembly of two threaded knobs 1625, a threaded rod 1630, threaded carrier 1645, guide blocks 1680, and a friction pad mount plate 1670 is configured as in the adjustable clamping mechanism 1620 and is likewise moveably engaged on shoulder screws 1319, but where here on the friction pad mount plate 1670 in place of a flat friction pad 1655 is mounted a square track channel-guide friction pad 1710 by screws 1665 at its threaded holes or threaded inserts 1715 (as illustrated in FIG. 64B). The square track channel-guide friction pad 1710 comprises a pad protrusion 1720 along its center for slidable engagement with a nut channel or side channel 1725 of a square track component 1730 comprising one or more side channels running therealong for slidingly engaging the adjustable clamping mechanism 1705 as well as one or more nuts for demountable engagement of other structural or functional components. When the adjustable clamping mechanism 1705 is engaged, one single-sided square track roller carriage assembly 1700 or multiple assembled together in a track dolly assembly will maintain directional alignment atop one or an assembled series of square track components.

According to further embodiments as illustrated in FIGS. 63C and 63D, a three-sided square track roller carriage assembly 1735 may comprise three pairs of square roller mounts 1560 with rollers 1590 fastened to the ends of three carriage body components 1230 and wherein a square track channel-guide adjustable clamping mechanism 1705 is secured within both outer body components 1230 at threaded holes 1318 by shoulder screws 1319. According to a further embodiment, the carriage body components and the square roller mounts of a roller carriage assembly 1735 may be combined into a single component comprising the same functional elements.

When the adjustable clamping mechanisms 1705 are engaged against the two sides of the one or an assembled series of square track components 1730 and the two pad protrusions 1720 slidably engaged within the side channels 1725 along the cooperating two sides of the square track components, one or an assembly of roller carriage assemblies 1735 will maintain directional alignment and be slidably retained or stopped on the square track component(s) 1730 both in a horizontal or vertical orientation. Similarly, one or an assembly of roller carriage assemblies 1735, as illustrated in FIG. 63D, is compatible with and may be slidably retained or stopped on one or an assembled series of rectangular track components 1740 within two of the side channels 1742 along the sides of the track components wherein the pad protrusions 1720 may cooperate and additional structural and functional components may be demountably engaged.

According to further embodiments, a modular apparatus of the system may comprise a sliding carriage assembly wherein roller mounts and rollers are excluded from a carriage assembly and the alignment and moveable position of the carriage assembly is maintained by two opposing channel-guide adjustable clamping mechanisms slidably engaged against the sides of a square or rectangular track component and within its side channels.

As illustrated in FIG. 64, a four-sided sliding carriage assembly 1745 may comprise four carriage body components 1230 where each body component is demountably engaged to a next adjacent body component by screws 1242 threadably engaged with threaded holes 1244. Optionally, corner brace mounts 1237 may be included at one or both ends of one or more of the carriage body components 1230 where demountable engagement of a corner brace may be required, not shown. A channel-guide adjustable clamping mechanism 1705 is secured to the inside of two opposing carriage body components 1230 for retaining and slidably engaging and/or stopping the carriage assembly 1745 along one or an assembled series of square track components 1730 when both of the clamping mechanisms 1705 may be adjusted to maintain at least a minimum amount of pressure against the sides of the square track component(s) and with the pad protrusions 1720 slidably engaged within the side channels 1725.

Figure 65A:
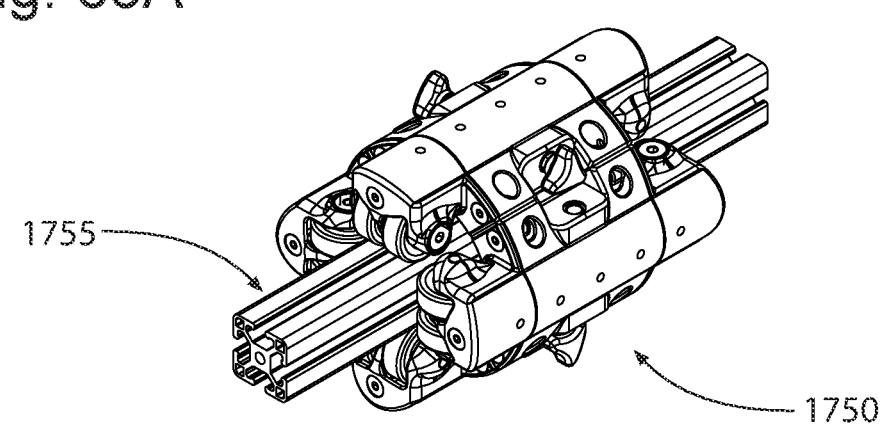
FIG. 65 shows a whole perspective view and a partially exploded perspective view FIGS. 65A and 65B, respectively, of a second four-sided square track roller carriage assembly with a second configuration of roller mount.
Figure 65B:
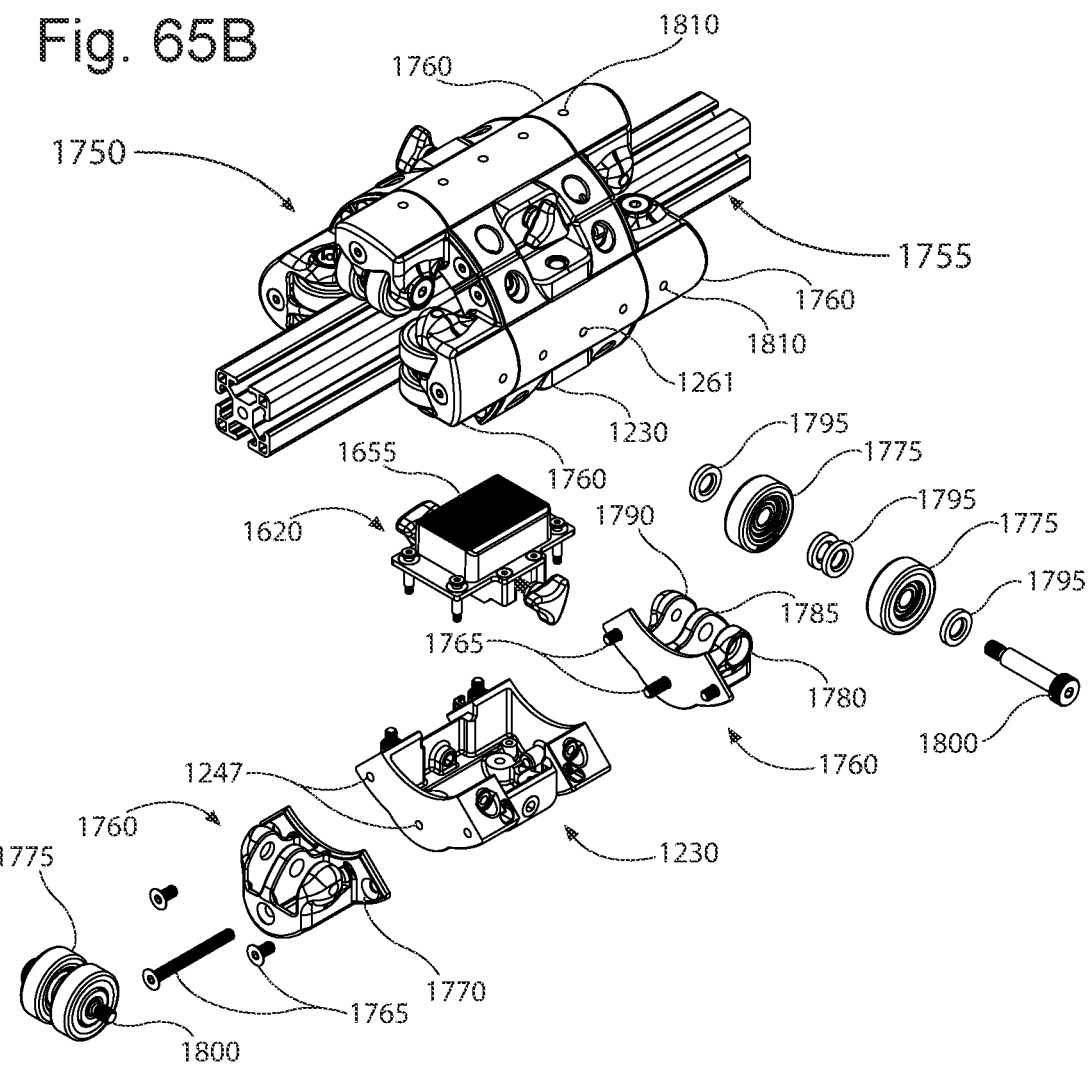

According to further embodiments, where varying profile or size of a square track component may be a factor, a square track roller carriage assembly may comprise a second embodiment of square roller mount in place of the square roller mounts 1560 as previously described. As illustrated in FIG. 65, a four-sided square track roller carriage assembly 1750 is shown configured for engagement with one or an assembled series of a square track component 1755. Pairs of a square roller mount 1760 may be demountably engagement with the ends of four carriage body components 1230 by one or more screws 1765 of which the threaded portions are passed through holes 1770 in the roller mounts 1760 to be threadably engaged with threaded holes 1247 in the ends of the body components 1230.

Two rollers 1775 fit within two openings between three sections of the roller mount comprising one shoulder screw head retaining section 1780, one central through-hole section 1785, and one threaded hole section 1790. Each roller 1775 is sandwiched between two washers 1795 and the threaded and shoulder portion of a shoulder screw 1800 is passed through section 1780 and section 1785 and the threaded portion threadably engaged with the threaded hole section 1790.

Additionally, a corner brace 1255 may be secured by a screw threadably engaged with a threaded hole 1810 in the out-facing surface of a roller mount 1760 optionally provided there for structural reinforcement of a cylindrical structural component module 1200 provided with a female end 1008 whereby it is mounted to a male connector 1000 which may be demountably engaged by a screw threadably engaged with a threaded hole 1261 in the out-facing surface of a carriage body component 1230. According to a further embodiment, the carriage body component(s) and the features and functional elements of square roller mounts 1760 may be combined into a single component. A four-sided square track roller carriage assembly 1750 may optionally comprise one or more adjustable clamping mechanisms 1620 with a flat friction pad 1655 provided for slowing movement or stopping the carriage assembly along one or an assembled series of square track components 1755.

Figure 66:
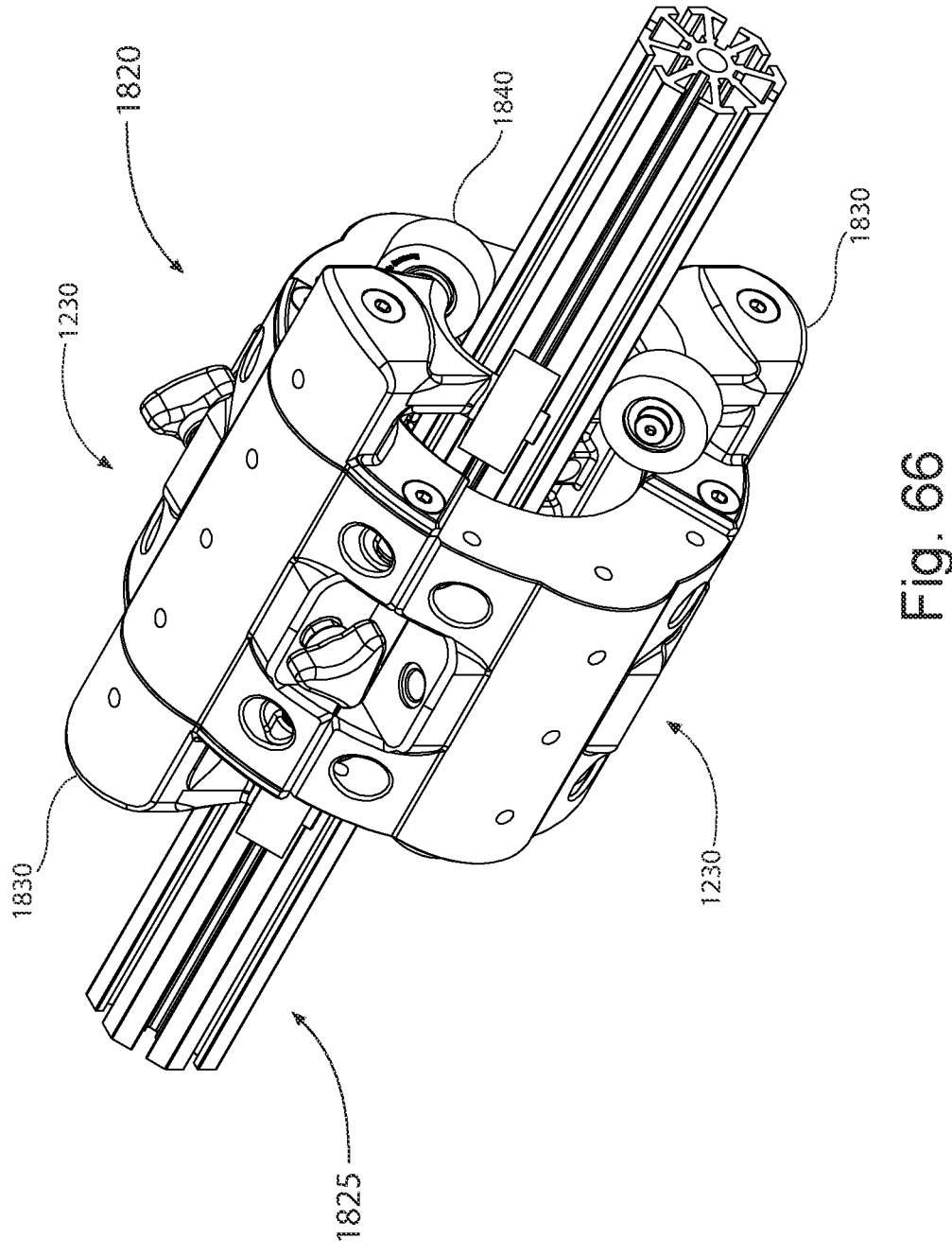
FIG. 66 is a whole perspective view of a four-sided octagonal track clamping roller carriage assembly configured for rollable engagement with an octagonal track component.
Figure 67:
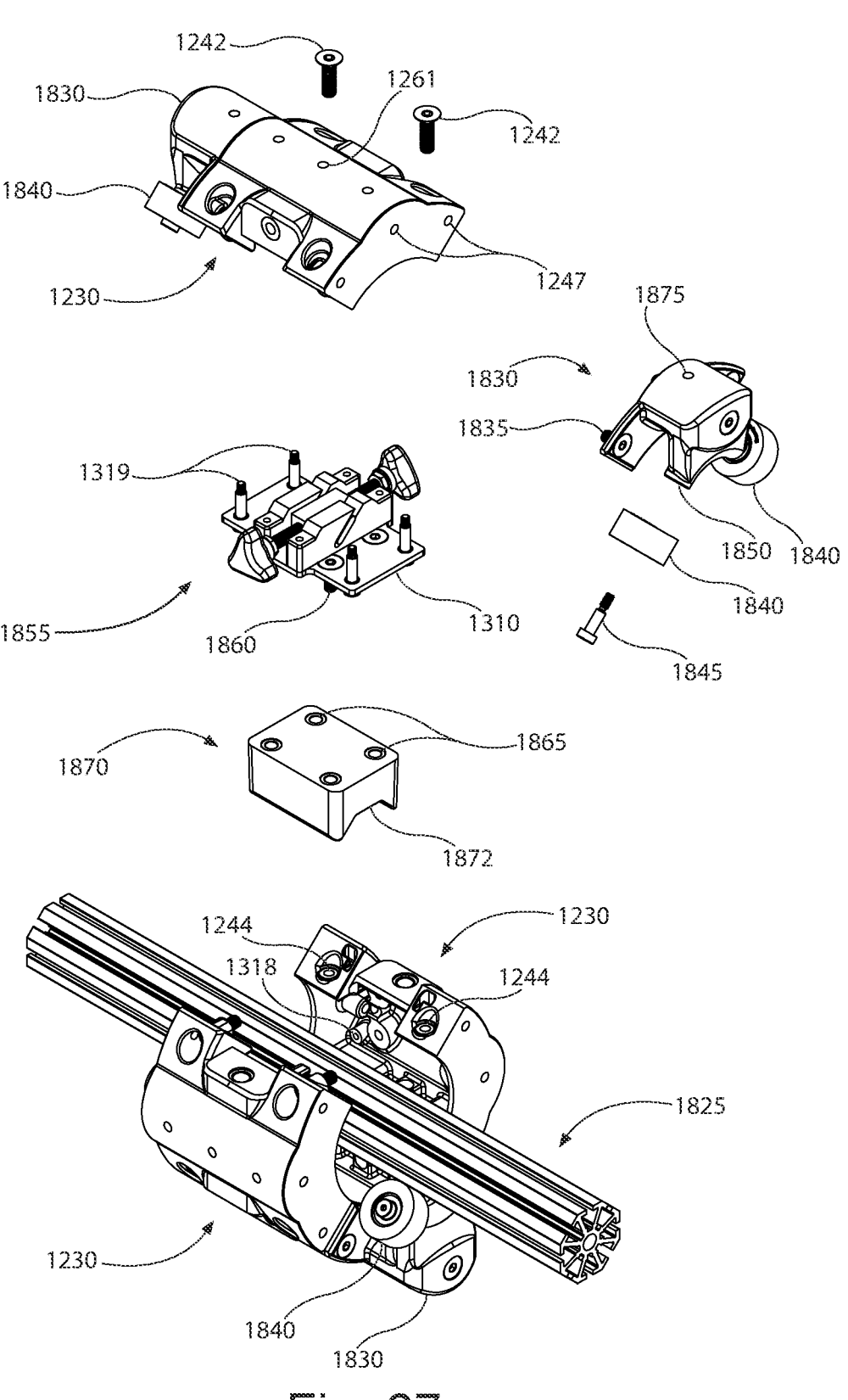
FIG. 67 is a partially exploded perspective view of the octagonal track roller carriage assembly shown in FIG. 66.

According to further embodiments, a roller carriage assembly may be configured for rolling engagement on one or an assembled series of octagonal track components. As illustrated in FIGS. 66 and 67, a four-sided octagonal track clamping roller carriage assembly 1820 is configured for rolling movement on one or an assembled series of an octagonal track component 1825. According to one embodiment, an octagonal track roller carriage assembly 1820 may comprise four carriage body components 1230 demountably engaged to a next adjacent body component by screws 1242 threadably engaged with threaded holes 1244, and wherein two octagonal roller mounts 1830 are demountably engaged to the ends of two of the carriage body components 1230 by screws 1835 threadably engaged with threaded holes 1247 in the ends of the body components 1230. Two rollers 1840 are secured by shoulder screws 1845 threadably engaged with threaded holes 1850 in the inclined axle ends of the roller mounts.

As illustrated in FIG. 67, an octagonal track roller carriage assembly may comprise an octagonal track adjustable clamping mechanism 1855 wherein a sub-assembly of two threaded knobs 1297, a threaded rod 1298, threaded carrier 1302, guide blocks 1314, and a friction pad mount plate 1310 is configured as in the adjustable clamping mechanism 1295 and is likewise moveably engaged on shoulder screws 1319 threadably engaged at threaded holes 1318 within one or more of the carriage body components 1230, but wherein on the friction pad mount plate 1310, in place of a concave friction pad 1305 is mounted, by screws 1860 at threaded holes or threaded inserts 1865, an octagonal track friction pad 1870 comprising three octagon contact faces 1872 which may be adjustably engaged with the cooperating outer profile of octagonal track components 1825.

Additionally, a corner brace 1255 may be secured by a screw threadably engaged with a threaded hole 1875 in the outward-facing surface of an octagonal roller mount 1830 optionally provided there for structural reinforcement of a cylindrical structural component module 1200 provided with a female end 1008 whereby it is mounted to a male connector 1000 which may be demountably engaged by a screw threadably engaged with a threaded hole 1261 in the out-facing surface of the cooperating carriage body component 1230. According to a further embodiment, a carriage body component and the pair of octagonal roller mounts may be combined into a single component providing the same functional elements.

Figure 68:
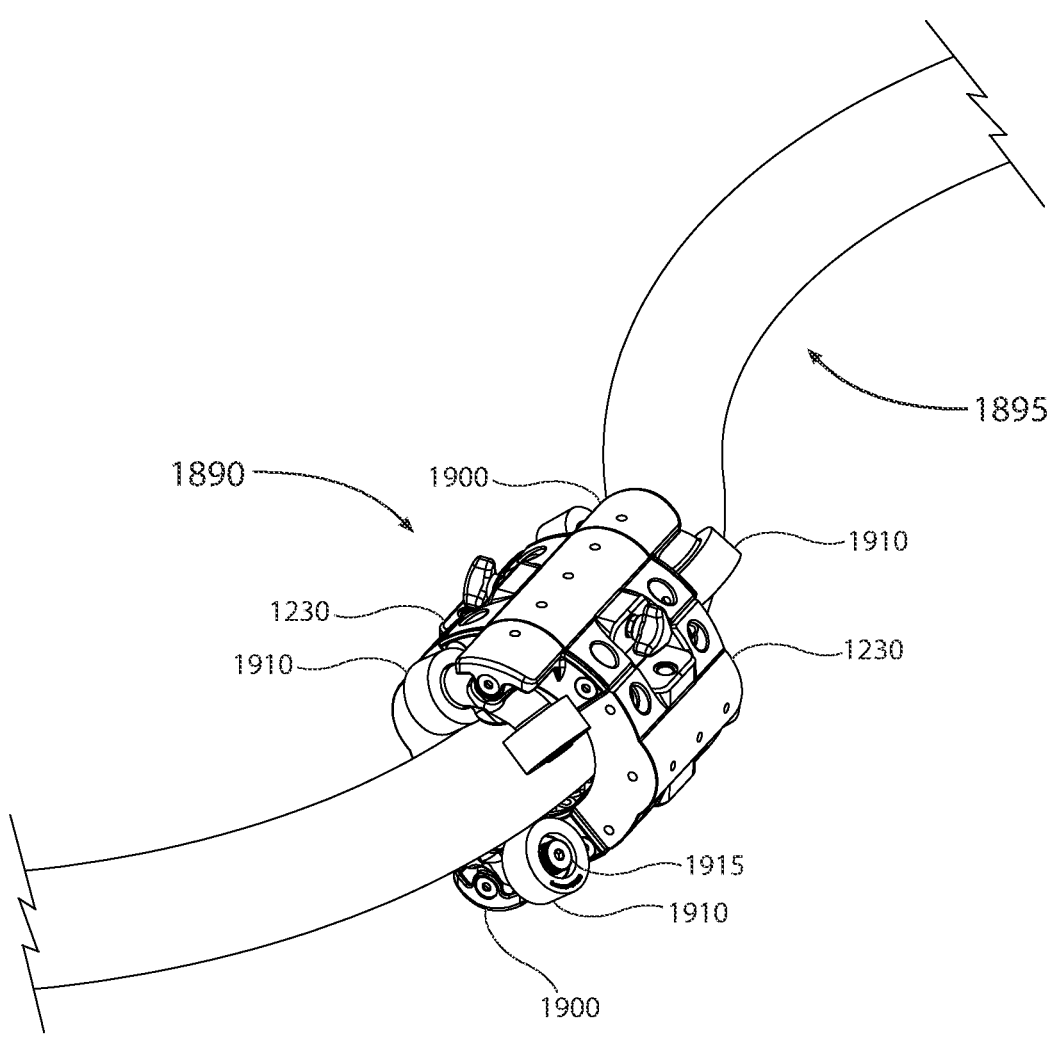
FIG. 68 is a whole perspective view of a four-sided pivoting roller carriage assembly configured for rollable engagement with a curvilinear track component.
Figure 69:
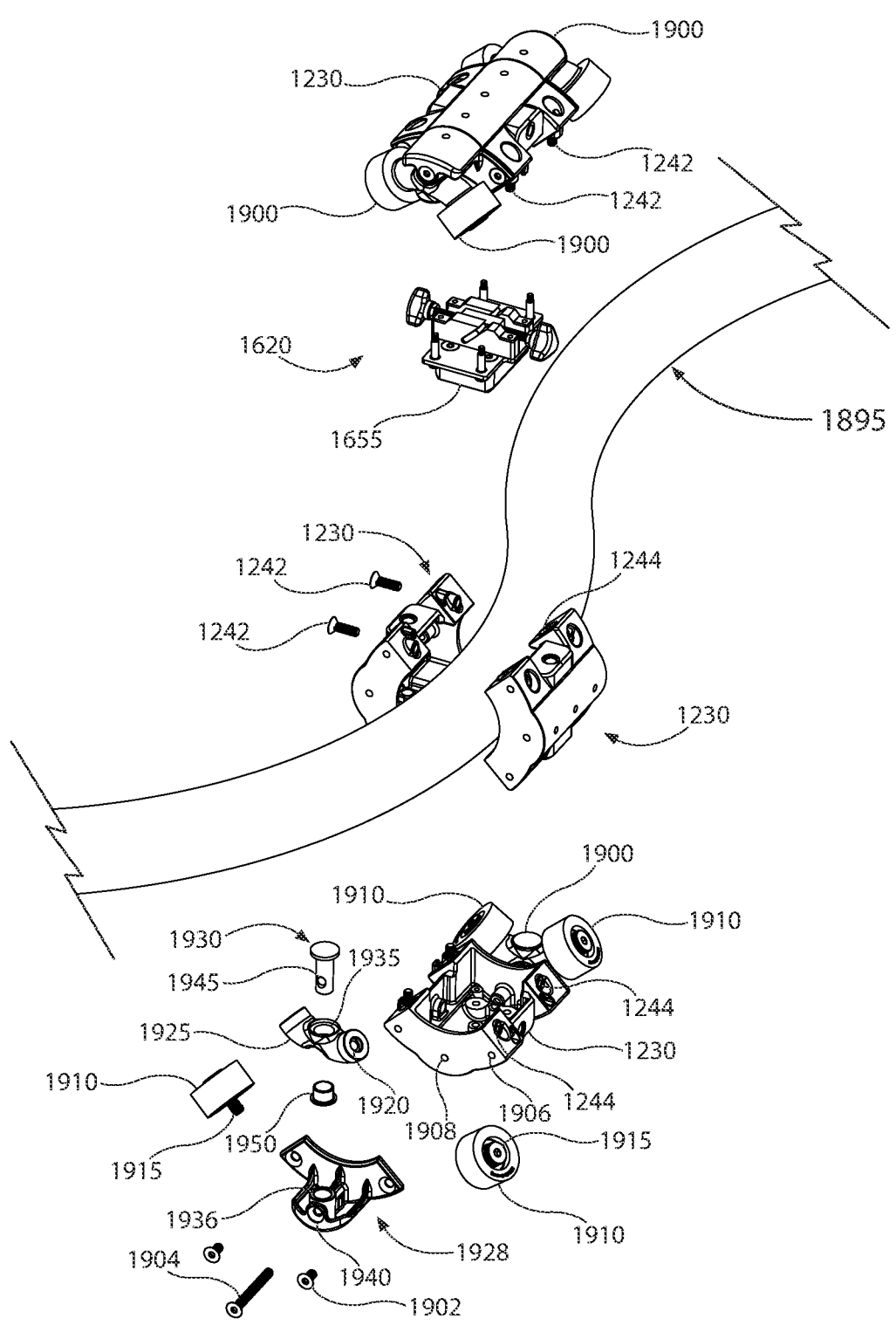
FIG. 69 is a partially exploded perspective view of the four-sided pivoting roller carriage assembly and curvilinear track component shown in FIG. 68.

According to further embodiments, a roller carriage assembly may be configured for rolling engagement on one or on an assembled series of circular or curvilinear track components. As illustrated in FIGS. 68 and 69, a pivoting roller carriage assembly 1890 is configured for rolling movement on a curvilinear track 1895. According to one embodiment, a four-sided pivoting roller carriage assembly 1890 may comprise four carriage body components 1230 demountably engaged to a next adjacent body component by screws 1242 threadably engaged with threaded holes 1244, and wherein two pivoting roller mounts 1900 are demountably engaged to the ends of two of the carriage body components 1230 by two outer screws 1902 and a central screw 1904 threadably engaged with two outer threaded holes 1906 and a central threaded hole 1908 in the ends of the carriage body components 1230.

A pair of rollers 1910 are rotationally engaged by shoulder screws 1915 threadably engaged with a threaded hole 1920 in the inclined ends of a pivoting axle component 1925 which is pivotably engaged with an axle mount 1928 by a pivot pin 1930 which is retained within an axle pin hole 1935 in the pivoting axle component 1925 and extends through into a mount pin hole 1936 in the roller mount 1900 where it is locked in place by the central screw 1904 of which the threaded portion is passed through a central through-hole 1940 and a pin through-hole 1945 in the pivot pin 1930 to be threadably engaged with the central threaded hole 1908 in the end of the carriage body component 1230. According to a preferred embodiment, a bushing 1950 is fitted within the axle pin hole 1935 to stably retain the pivot pin 1930 in the pivoting axle component 1925 and reduce friction at the interface of the axle component and the axle mount 1928 to allow for smooth pivoting movement of the pivoting roller mounts 1900 and passage of the pivoting roller carriage assembly 1890 along a curvilinear track 1895. According to some embodiments, a pivoting roller carriage assembly 1890 may comprise an adjustable clamping mechanism 1620 with a flat friction pad 1655 which may be adjusted to apply pressure against the curvilinear track to slow or stop the movement of the carriage assembly.

Figure 70:
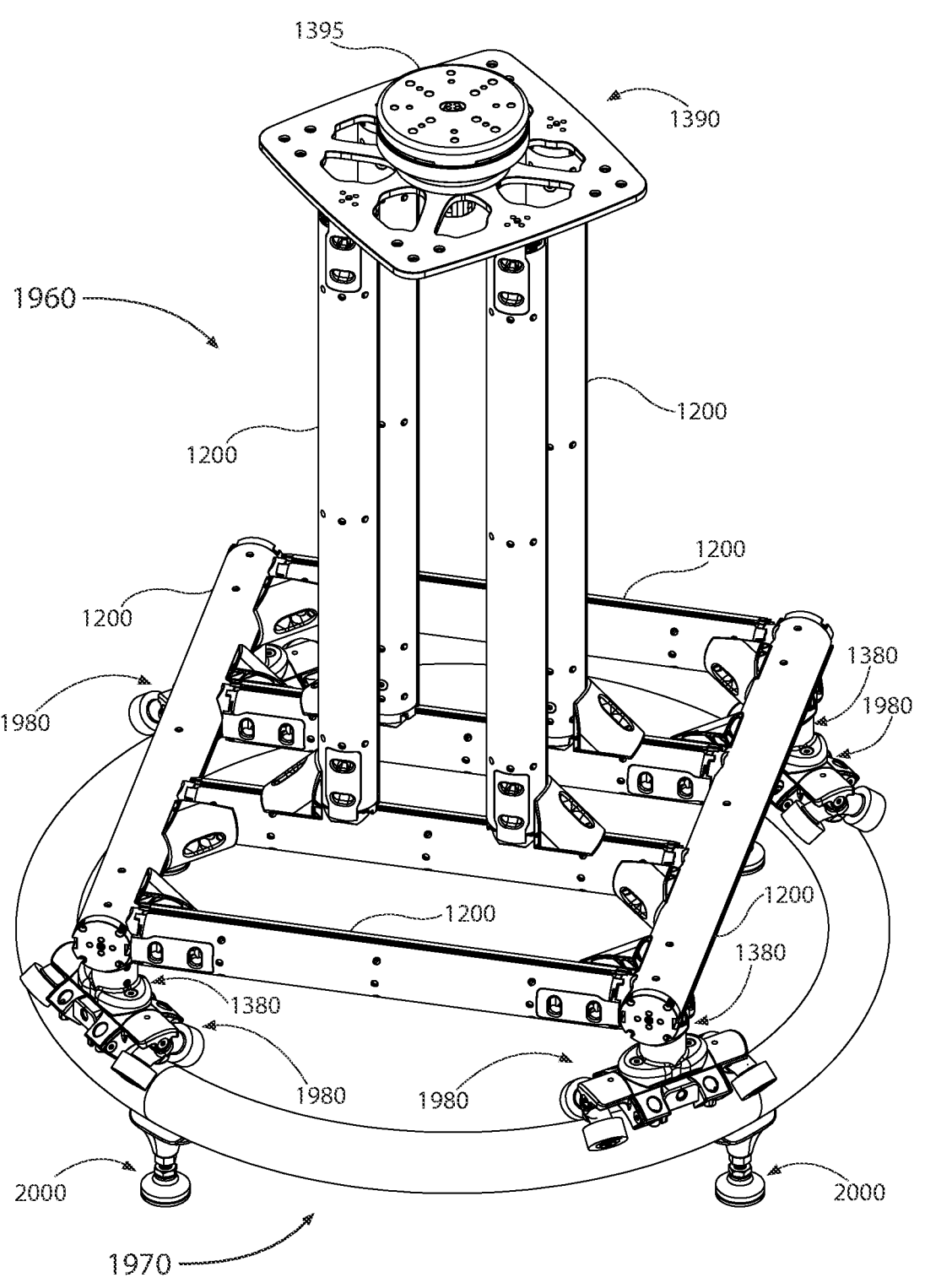
FIG. 70 is a whole perspective view of a 360-degree panning dolly assembly comprising four single-sided pivoting roller carriage assemblies mounted by four multidirectional component mounts and configured for rollable movement on a circular track assembly.
Figure 71:
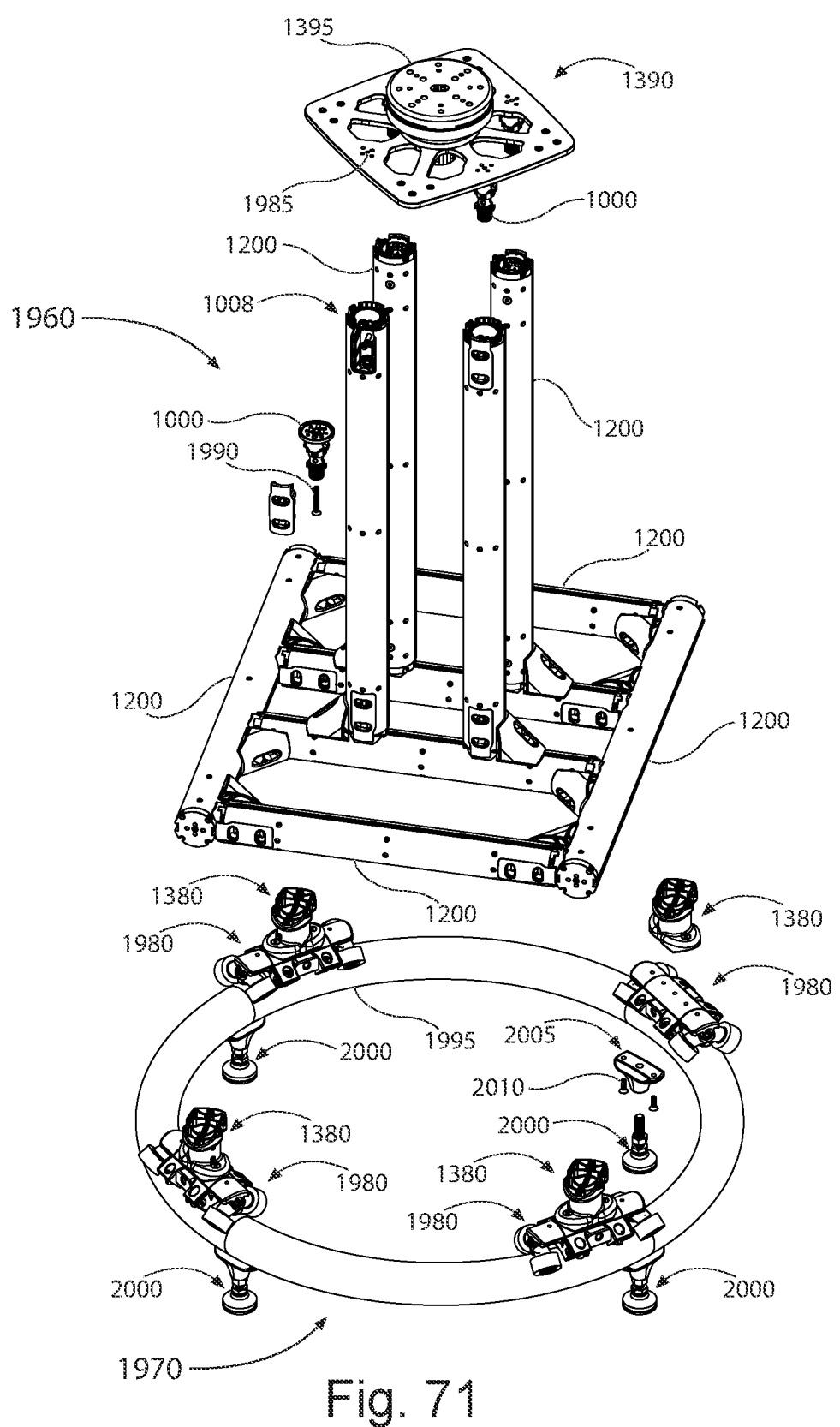
FIG. 71 is a partially exploded perspective view of the 360-degree panning dolly assembly and circular track assembly shown in FIG. 70.

According to further embodiments, as illustrated in FIGS. 70 and 71, a track dolly assembly may be configured as a 360-degree panning dolly assembly 1960 configured for open rotation of the dolly assembly on a circular track assembly 1970. Four single-sided pivoting roller carriage assemblies 1980 are secured to four cylindrical structural component modules 1200 by four multidirectional component mounts 1380 at 45-degree alignments, forming the outer frame of the base of the dolly assembly 1960. Extending upward from the base of the dolly assembly is four cylindrical structural component modules 1200 on which a device mount plate 1390 and bowl/ball mount assembly 1395 is demountably engaged by male connectors 1000 fastened to the bottom of the plate 1390 at threaded holes 1985 by screws or bolts 1990 and demountably engaged within the female ends 1008 of the cylindrical structural component modules 1200. According to a preferred embodiment, the circular track assembly 1970 comprises a ring component 1995 which is supported by, and can be levelled on, foot components 2000 threadably engaged with curved foot mounts 2005 which are demountably engaged by screws 2010 threadably engaged with threaded holes in the underside of the ring component 1995.

Figure 72:
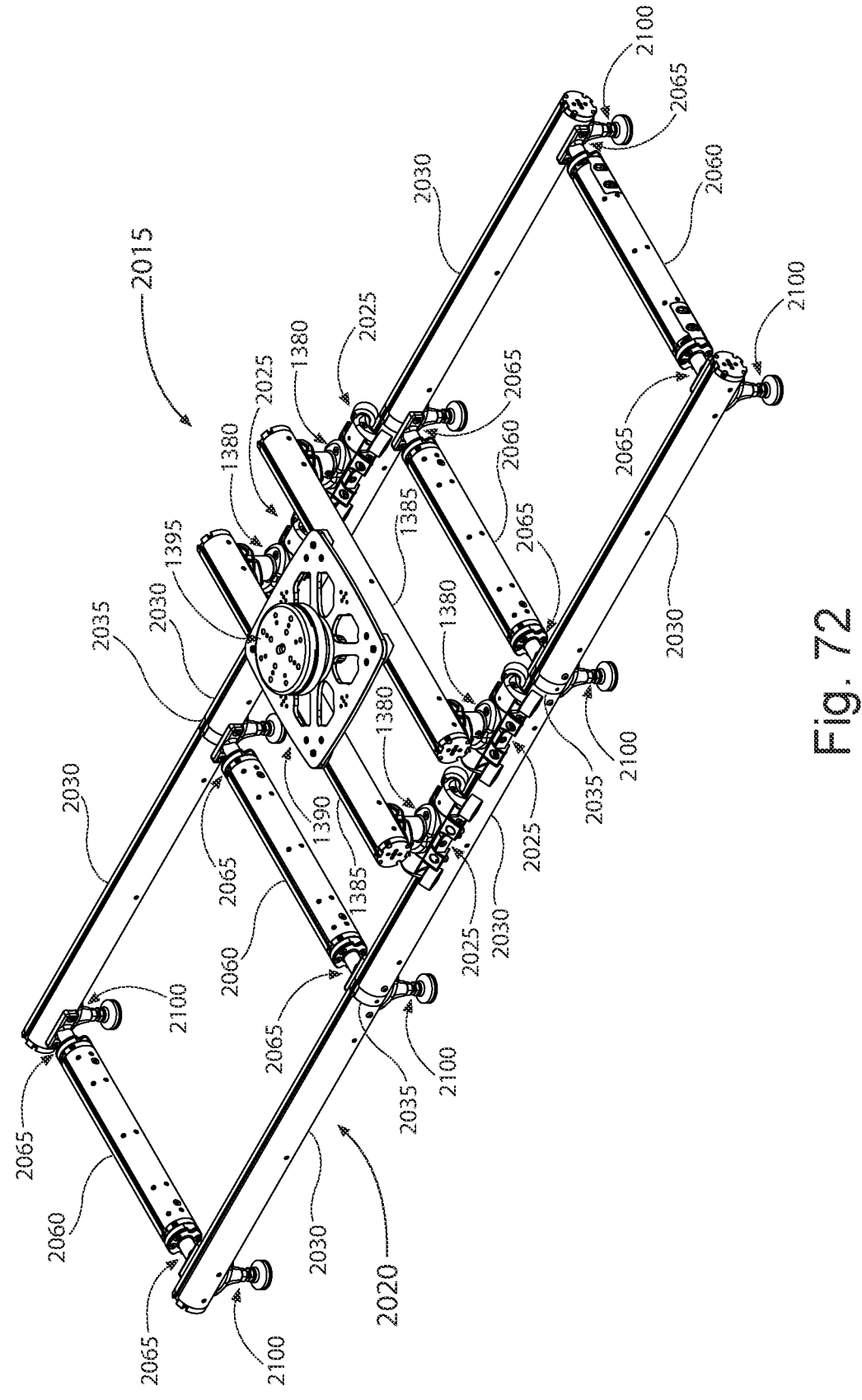
FIG. 72 is a whole perspective view of a track dolly assembly comprising four single-sided roller carriage assemblies mounted by four multidirectional component mounts to two cylindrical structural components with a device mount plate spanning between, said dolly assembly rollable on an adjustable-level track assembly.
Figure 73:
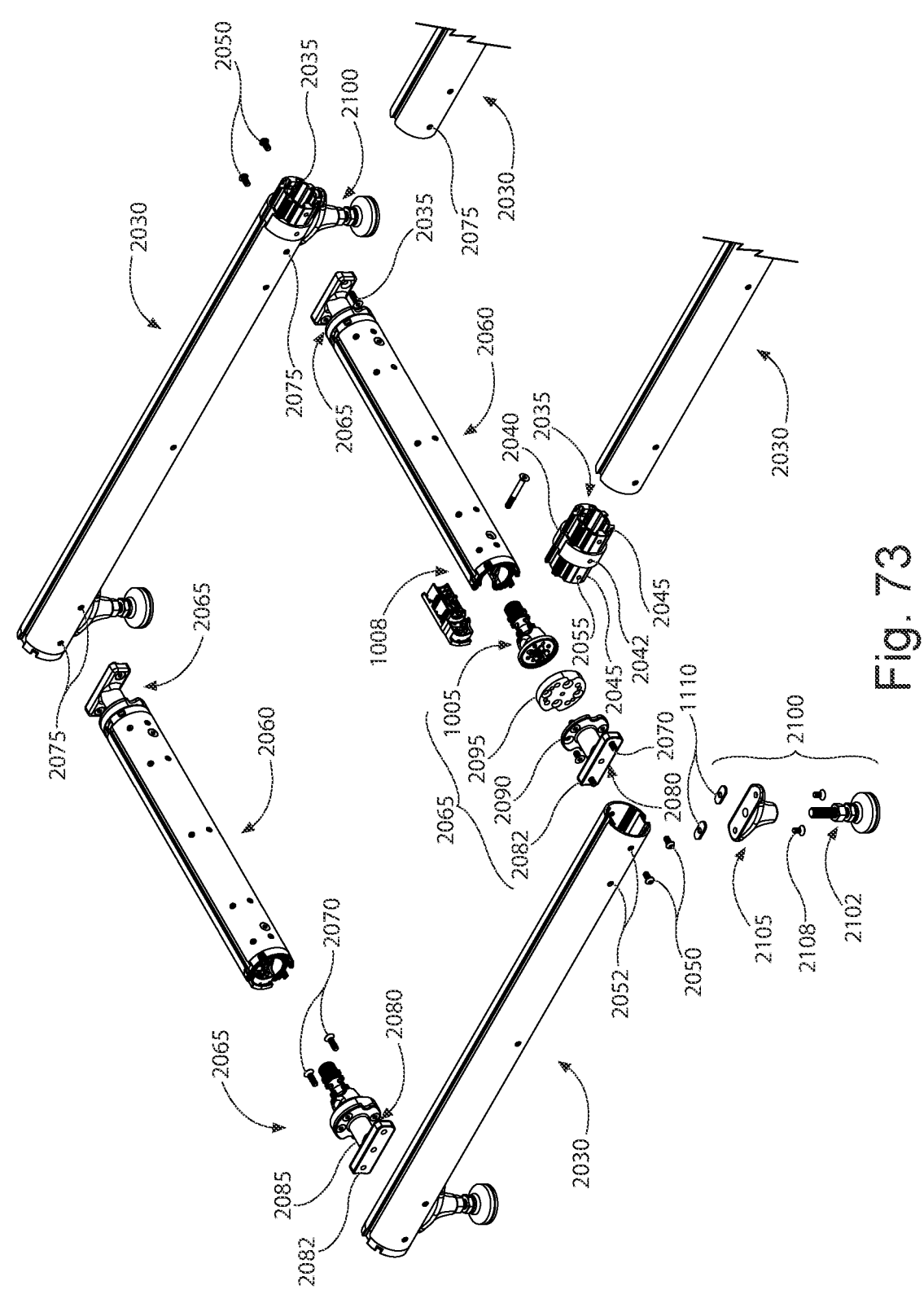
FIG. 73 is a partially exploded cutaway perspective view of a section of the adjustable-level track support assembly shown in FIG. 72.

According to further embodiments, as illustrated in FIGS. 72 and 73, a track dolly assembly 2015 may be configured for rolling along an adjustable-level track assembly 2020. A track dolly assembly 2015 is shown comprising four single-sided roller carriage assemblies 2025 attached via four multidirectional component mounts 1380 to two cylindrical structural component modules 1385 with end cap components 1155 at each end. Between the modules 1385, a device mount plate 1390 is attached for mounting of one or more of a camera, a light, a screen, a monitor, a microphone, a sensor, a tool, a power tool, or other device on a bowl/ball mount assembly 1395, or other means of attachment such as a stud mount component 1270 or a dovetail plate mount assembly 1275 mounted directly to one of the cylindrical structural component modules 1200, for rolling movement of the device(s) along an adjustable-level track assembly 2020.

According to one embodiment, an adjustable-level track assembly 2020 comprises a series of cylindrical structural components 2030 assembled by rail joiner components 2035 to form two horizontal rails on which the track dolly assembly 2015 traverses. The rail joiner components 2035 may comprise a midsection 2040 which is the same diameter as the cylindrical structural components 2030 where between the cylindrical structural components the track dolly assembly 2015 passes smoothly over. The midsection may comprise a threaded hole 2042 whereby a concave base male assembly 1001 or other structural or functional component of the system may be demountably engaged. Each end of the joiner component comprises a fitted section 2045 for fitting within and matingly engaging the open ends of two cylindrical structural components 2030. Screws 2050 through holes 2052 are threadably engaged with a threaded hole 2055 in the outer side of each of the inserted fitted sections 2045 to secure the rail joiner component within the two cooperating cylindrical structural components. For greater stability, the outer contours of the rail joiner components may comprise crush ribs to provide a more secure interference fit.

The two rail assemblies may be attached via a plurality of a further embodiment of a double side-opening socket module 2060 demountably engaged with the inner sides of the cylindrical structural components 2030 by gooseneck assemblies 2065 secured by screws 2070 threadably engaged through side mount holes 2075 with threaded core components 1125 within the cylindrical structural components 2030, or the cooperating inward-facing threaded holes 2055 in the side of each of the inserted fitted sections 2045 of the rail joiner components, or according to a further embodiment, nuts 1110 within the side-nut channels of a cylindrical structural component. A gooseneck assembly 2065 comprises a gooseneck mount component 2080 with a narrow concave section 2082 whereby the screws 2070 hold the component against the cylindrical rails and a narrow neck section 2085 whereby the connections remain passable by the roller carriage assemblies 2025. Beyond the narrow neck section is a plate mount face 2090 by which a gooseneck mount plate 2095 is secured by screws and whereon is demountably engaged a flat base male assembly 1005 which is demountably engaged with a female end 1008 of the cooperating double side-opening socket module 2060.

The frame of the adjustable-level track assembly 2020 as described may be supported and leveled on threaded foot components 2100 comprising a threaded foot 2102 which is threadably engaged with a concave mount 2105 which is demountably engaged by screws 2108 and nuts 1110 with the side-nut channels of the cooperating cylindrical structural component 2030, or according to a further embodiment, with a threaded core component 1125 fitted within a cylindrical structural component.

Figure 74:
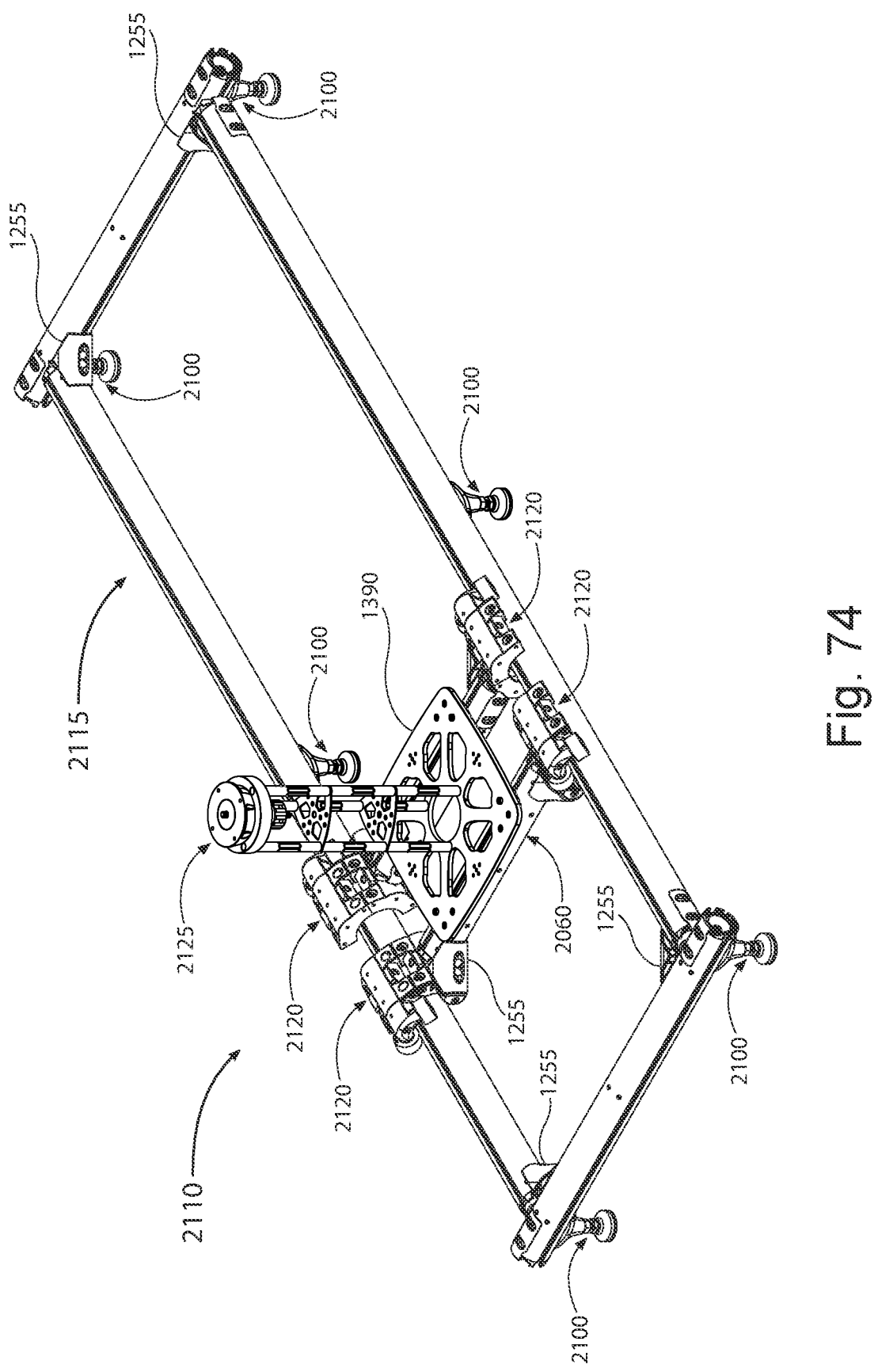
FIG. 74 is a whole perspective view of a low-angle track dolly assembly comprising four two-sided roller carriage assemblies mounted in pairs to two cylindrical structural components with a device mount plate spanning between, said low-angle track dolly assembly rollable on an adjustable-level track assembly.
Figure 75:
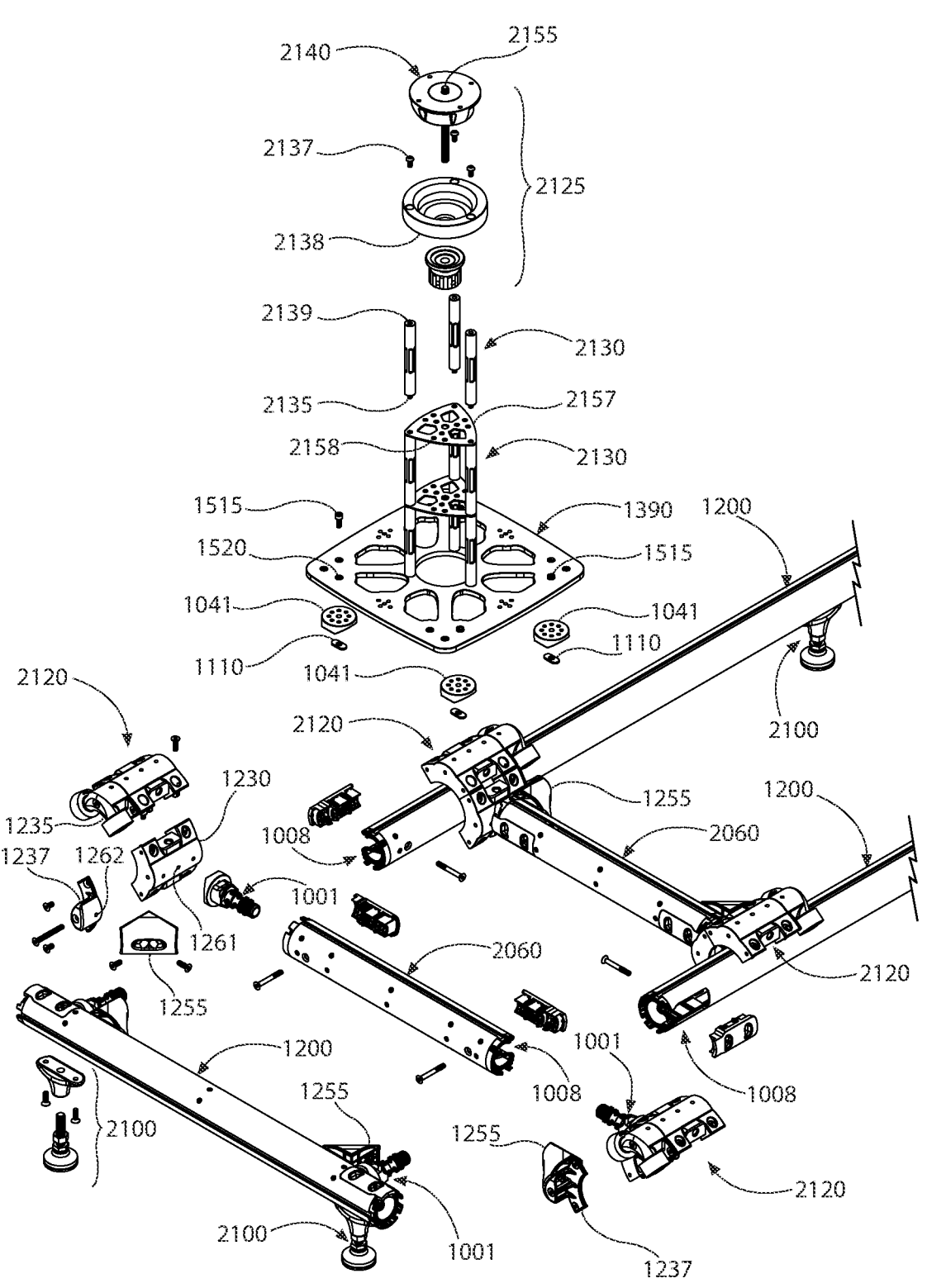
FIG. 75 is a partially exploded perspective view of the low-angle track dolly assembly and cutaway section of the adjustable-level track support assembly shown in FIG. 74.
Figure 76:
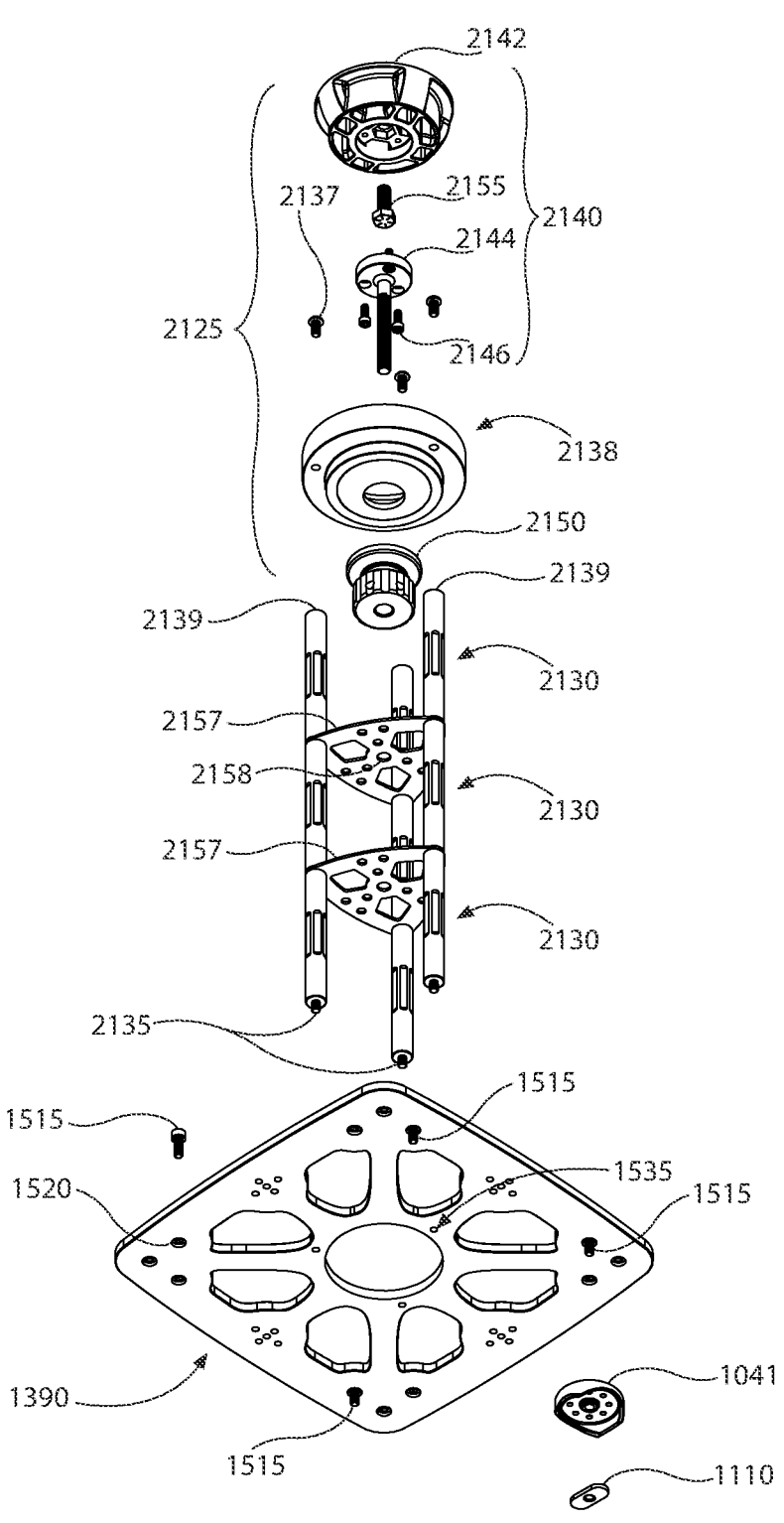
FIG. 76 is a partially exploded perspective view of a device mount plate, threaded extension rods, and bowl/ball mount assembly of the low-angle track dolly assembly shown in FIGS. 74 and 75.

According to further embodiments, a low-angle track dolly assembly 2110 is illustrated in FIGS. 74, 75, and 76 configured to be rollable along an adjustable-level closed track assembly 2115. The low-angle track dolly assembly 2110 may comprise two pairs of two-sided roller carriage assemblies 2120 attached by double side-opening socket modules 2060 and a device mount plate 1390. The ends of the socket modules 2060 are demountably engaged at their female ends 1008 with concave base male assemblies 1001 at threaded holes 1261 in the lower carriage body components 1230 and each connection is reinforced by a corner brace 1255 demountably engaged by a screw at threaded holes 1262 in the corner brace mounts 1237. To narrow the width of the dolly assembly and therefore maximize its travelling distance on a closed track assembly, two-sided roller carriage assemblies 2120 may comprise a single roller mount 1235 and pairs of rollers. An adjustable-level closed track assembly 2115 may comprise four cylindrical structural component modules 1200 demountably engaged to one another by concave base male assemblies 1001 and corner braces 1255 at female ends 1008 and may be supported and leveled on threaded foot components 2100.

The two sets of roller carriage assemblies 2120 and double side-opening socket modules 2060 are attached by a device mount plate 1390 demountably engaged at its four corners on concave base components 1041, as previously described in reference to FIG. 59, wherein the threaded portion of screws 1515 are passed through holes 1520 in the corners of the device mount plate 1390, and through concave base components 1041, to be threadably engaged with nuts 1110 securely retained within the upward-facing nut channels of modules 2060. According to one embodiment, the device mount plate may have a bowl/ball mount assembly 2125/1395 mounted directly, or as illustrated in FIGS. 74, 75, and 76, vertically supported by one or more sets of threaded extension rods 2130. The threaded screw ends 2135 of three extension rods may be threadably engaged with threaded holes 1535 in the device mount plate, as illustrated in FIG. 76. Provided for interfacing with one or more of a camera or other device, the bowl/ball mount assembly 2125 may thereon be fastened by screws 2137 of which the threaded portion are passed through holes in a bowl mount component 2138 and threadably engaged with threaded hole ends 2139 of the rods. Optionally, two or more sets of rods 2130 may be threadably engaged to one another by their threaded screw ends 2135 with the threaded hole ends 2139 of the next set. The bowl/ball mount assembly 2125 may comprise a ball adapter 2140, comprising a half-ball component 2142 with a threaded post component 2144 secured to the underside by screws 2146, is retained on the bowl mount component 2138 by a locking handle 2150 which is threadably engaged with the threaded post component 2144 of which the threaded portion is passed through a central hole in the bowl mount component whereby the locking handle 2150 is secured against the bottom. A device mount screw 2155 of varying types and sizes may be provided in the center of the half-ball component 2142 where it is captured by the threaded post component 2144 fastened underneath it. For structural reinforcement of multiple sets of threaded extension rods 2130, a rod plate 2157 may be sandwiched between sets of rods, or according to a further embodiment, be provided at the end of the set(s) of extension rods 2130, fastened there by screws 2137, and whereon a device may be fastened directly to the rod plate at one or more holes 2158.

Figure 77:
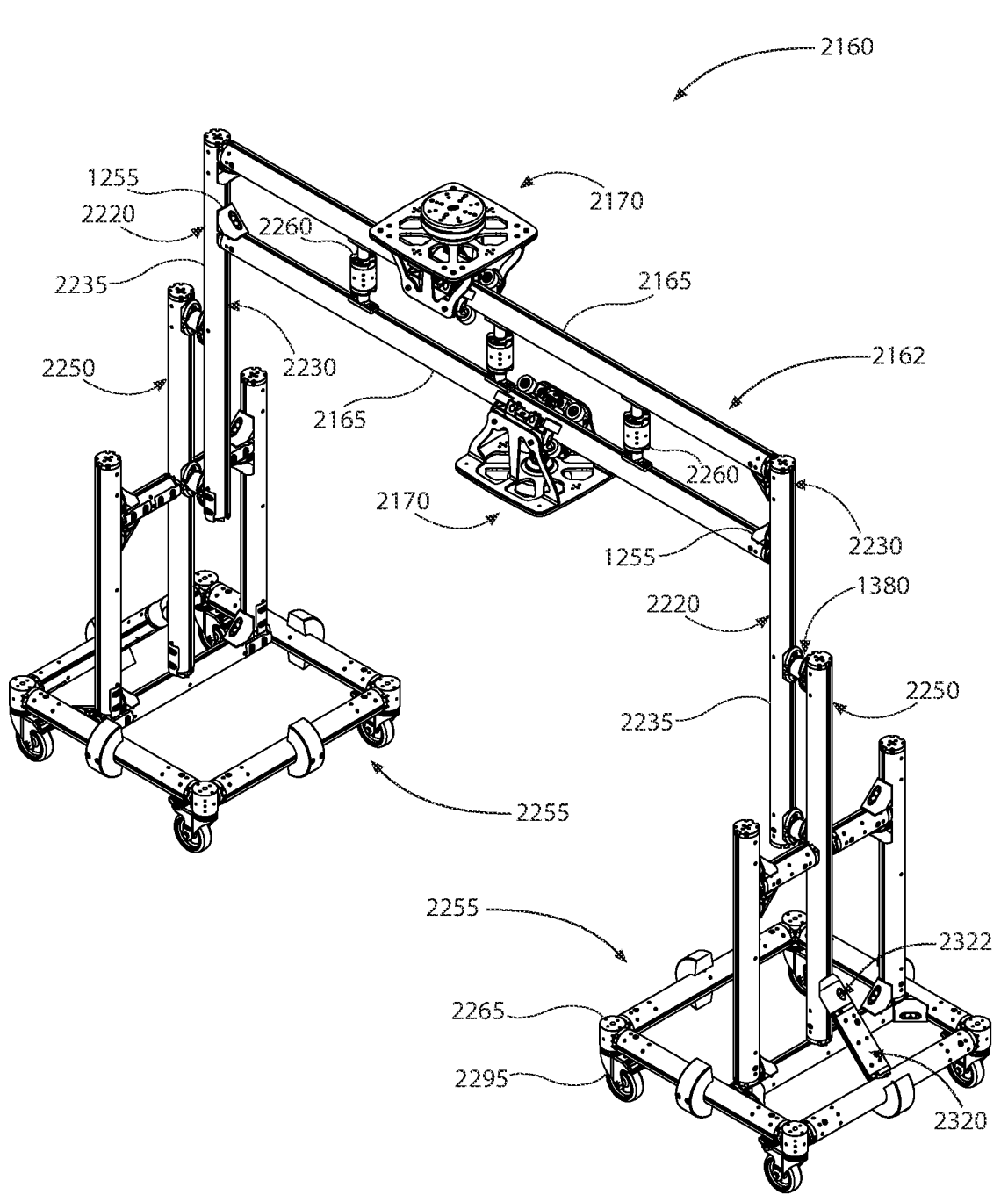
Figure 78:
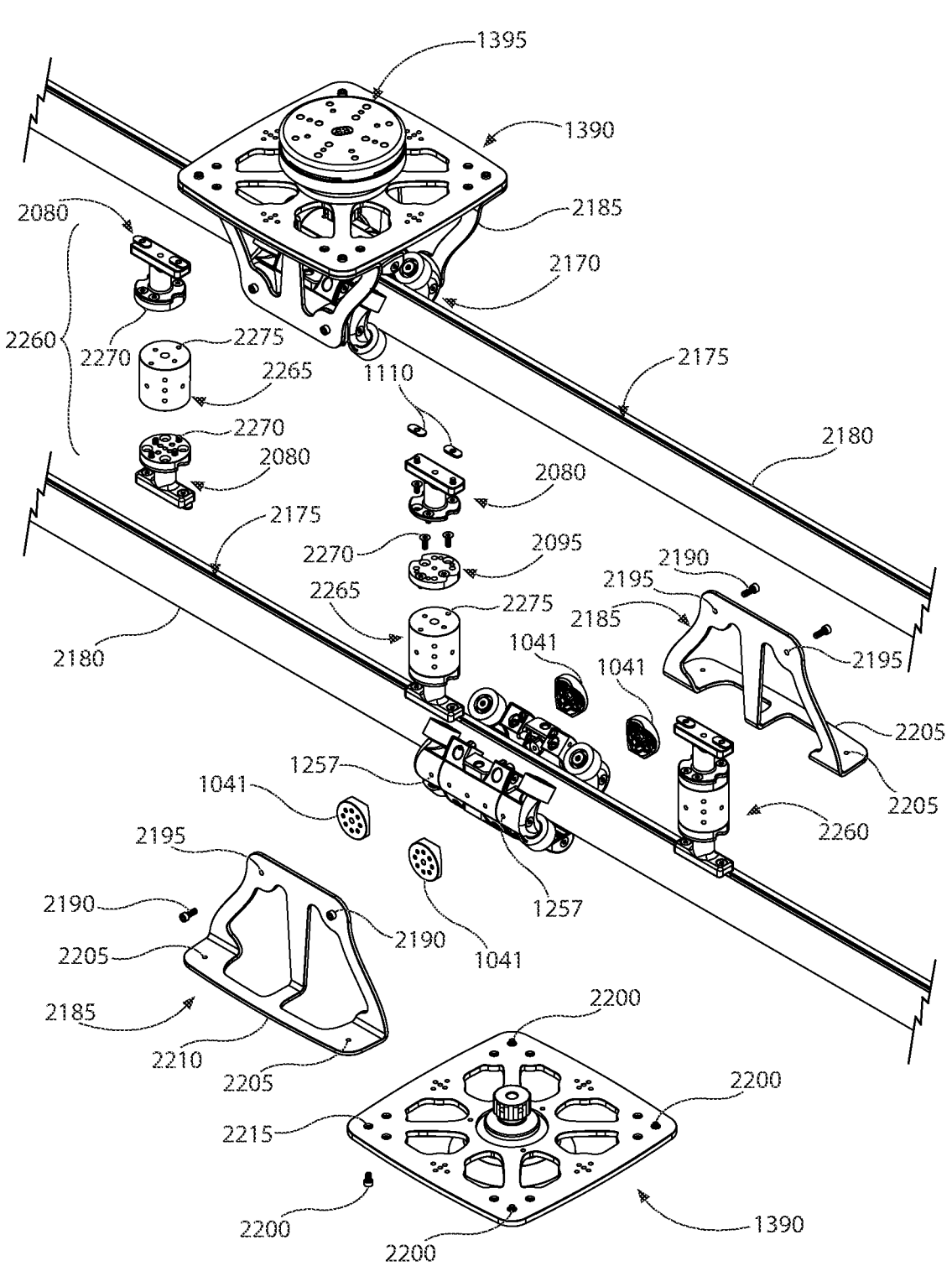
FIG. 78 is a partially exploded perspective view of the two three-sided roller carriage assemblies and cutaway section of the two parallel rails shown in FIG. 77.
Figure 79:
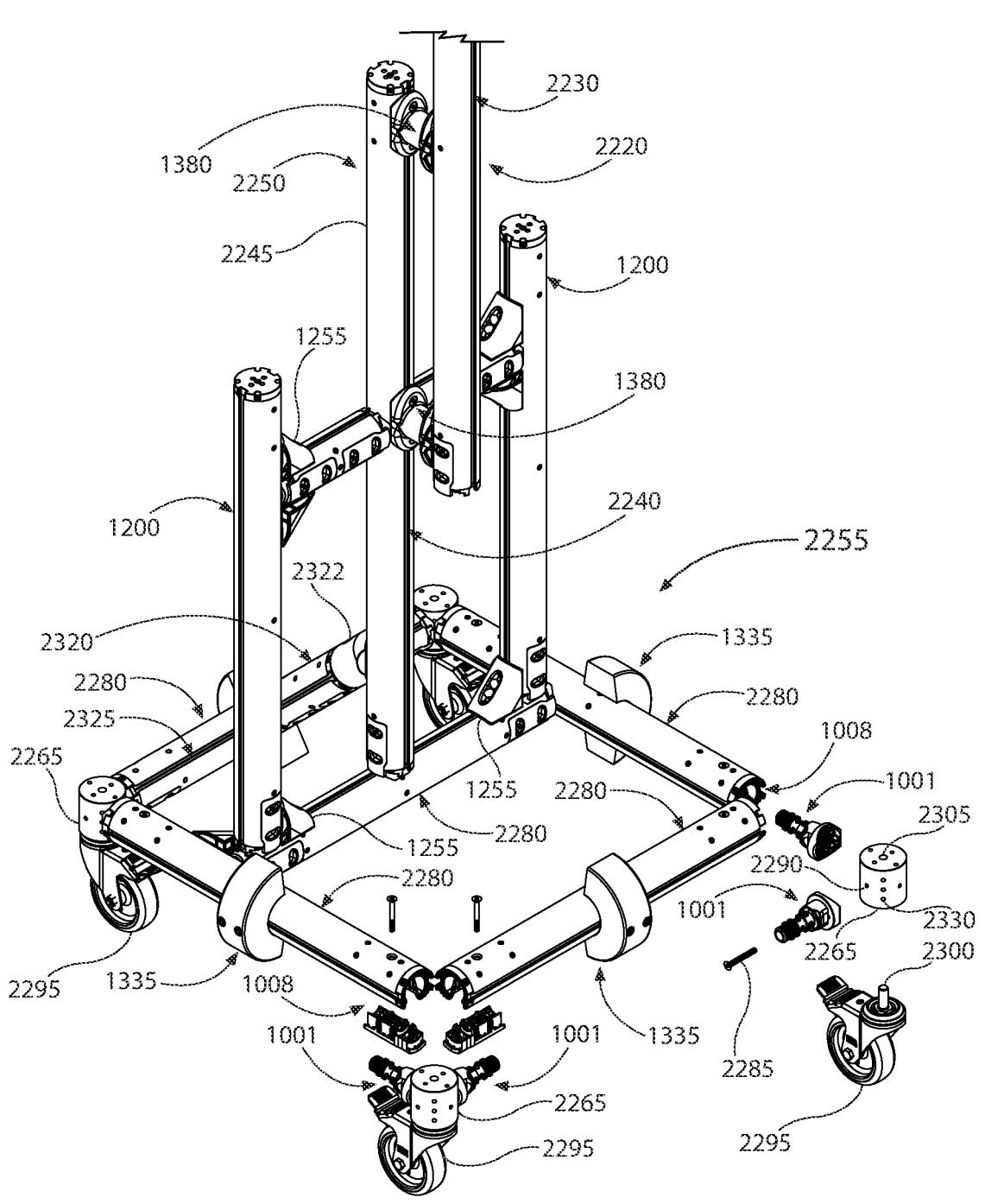
FIG. 79 is a partially exploded cutaway perspective view of one of two dolly base assemblies of the height-adjustable dual rail track dolly assembly shown in FIG. 77.

According to further embodiments, a track dolly assembly may be configured as a dual rail track dolly assembly whereon two or more devices may be supported on two or more roller carriage assemblies for rolling movement along two parallel rails supported by one or more dolly base assemblies. According to one embodiment, as illustrated in FIGS. 77, 78, and 79, a height-adjustable dual rail track dolly assembly 2160 may comprise a dual rail assembly 2162 with two parallel rails 2165 whereon each may be supported a three-sided roller carriage assembly 2170 provided for rolling movement of a device along a rail. According to one embodiment, a three-sided roller carriage assembly 2170 may comprise three carriage body components 1230 where each is demountably engaged to a next adjacent body component by screws 1242 threadably engaged with threaded holes 1244, as previously described. A roller mount 1235 and rollers are demountably engaged with the ends of the two opposing side carriage body components by screws threadably engaged with threaded holes in the ends of the carriage body component. According to a further embodiment, the assembly of carriage body components and roller mounts may be combined into a single component comprising the same functional elements.

According to one embodiment, a channel-guide component 1280, as described previously in reference to FIG. 53, is secured to the track-facing side of each of the middle-carriage body components and is aligned with and slidingly engaged in a side channel 2175 along the side of the cylindrical structural components 2180 of the dual rail assembly 2162 where the channel-guide component maintains the upright and downward orientations of the two roller carriage assemblies 2170. According to another embodiment, a channel-guide adjustable clamping mechanism 1345, as described previously in reference to FIG. 56, is secured within the middle-carriage body component and wherein a cylindrical track channel-guide friction pad 1347 comprising a pad protrusion 1348 along its center is slidingly engaged with the side channels 2175 to maintain the upright and downward orientations of the two roller carriage assemblies 2170.

Figures 82A, 82B:
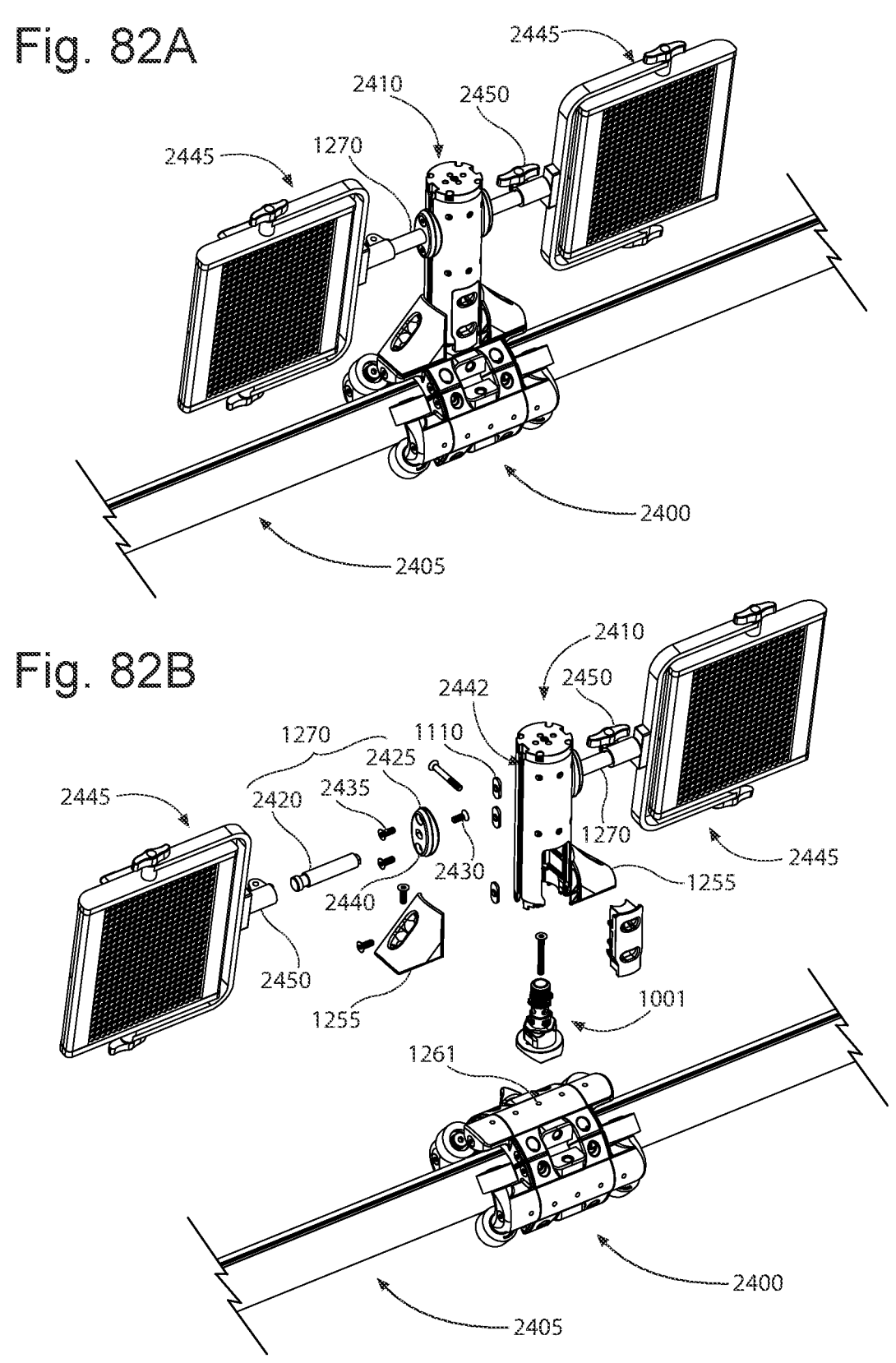
FIG. 82 shows a whole perspective view and a partially exploded perspective view FIGS. 82A and 82B, respectively, of a roller carriage assembly with two stud mount components for demountable engagement of a lighting device.

Each of the roller carriage assemblies 2170 may additionally comprise a device mount plate 1390 provided for mounting of one or more of a camera, a light, a screen, a monitor, a microphone, a sensor, a tool, a power tool, or other device on a bowl/ball mount assembly 1395/2125, or other means of attachment such as a stud mount component 1270 demountably engaged directly or via a cylindrical structural component module 1200 with the threaded holes in the carriage body components 1230, roller mounts 1235, and/or corner brace mounts 1237 of one or both of the roller carriage assemblies 2170, as described in further detail below in reference to FIG. 82. Where a device mount plate 1390 is supported, a roller carriage assembly 2170 may additionally comprise one or two side mount brackets 2185 which are demountably engaged with the side of the carriage assembly by screws 2190 threadably engaged with threaded holes 1257 in the roller mounts 1237, where the threaded portion is passed through holes 2195 in the bracket and through a concave base component 1041 secured between the bracket 2185 and roller mounts. A device mount plate 1390 may then be supported on the one or two brackets 2185 where screws 2200 are threadably engaged with threaded holes 2205 in a perpendicular face 2210 of the bracket through holes 2215 in the corners of the device mount plate.

According to one embodiment, a dual rail assembly 2162 is demountably engaged at both ends with a rail support vertical post module 2220 by concave base male assemblies 1001 and concave corner braces 1255 demountably engaged with a side-nut channel 2230 of the cylindrical structural component 2235 of the vertical post modules. The nut channels 2230 on the opposite sides of the vertical post modules may be demountably engaged with one or two multidirectional component mounts 1380 which on their opposite side are demountably engaged with nut channels 2240 along the cylindrical structural component 2245 of a vertical center post module 2250 in the center of dolly base assemblies 2255 (indicated in FIG. 79). On either side of the multidirectional component mounts 1380, the screws which are engaging the channels 2230/2240 may be disengaged from the nuts 1110 and then reengaged to adjust the vertical position of the rail support vertical post modules 2220 and supported rails 2165 to meet the operational requirement of the supported device(s).

According to one embodiment, the length of the two rails 2165 of a dual rail assembly 2162 may be reinforced by one or more vertical cross-support assemblies which may be demountably engaged with nuts 1110 in the inward-facing side channels 2175 of the rails 2165, or according to a further embodiment with threaded core components 1125 through side mount holes, as previously described. For a wider separation of the two rails, a vertical cross-support assembly may comprise two gooseneck assemblies 2065, as described previously in reference to FIG. 73, separated by a double side-opening receptacle module such as module 2060 shown in FIG. 73. As illustrated in FIGS. 77 and 78, a vertical cross-support assembly 2260 comprises two gooseneck mount components 2080 with gooseneck mount plates 2095 connected by a cylindrical mount component 2265. The cylindrical mount component is demountably engaged with the gooseneck mount plates where the threaded portion of screws 2270 pass through holes in the gooseneck mount plates and are threadably engaged with threaded holes 2275 in the mount component. The gooseneck components 2080 provided there allow the passage of the three-sided roller carriage assemblies 2170 by the vertical cross-support assemblies 2260.

Figure 83:
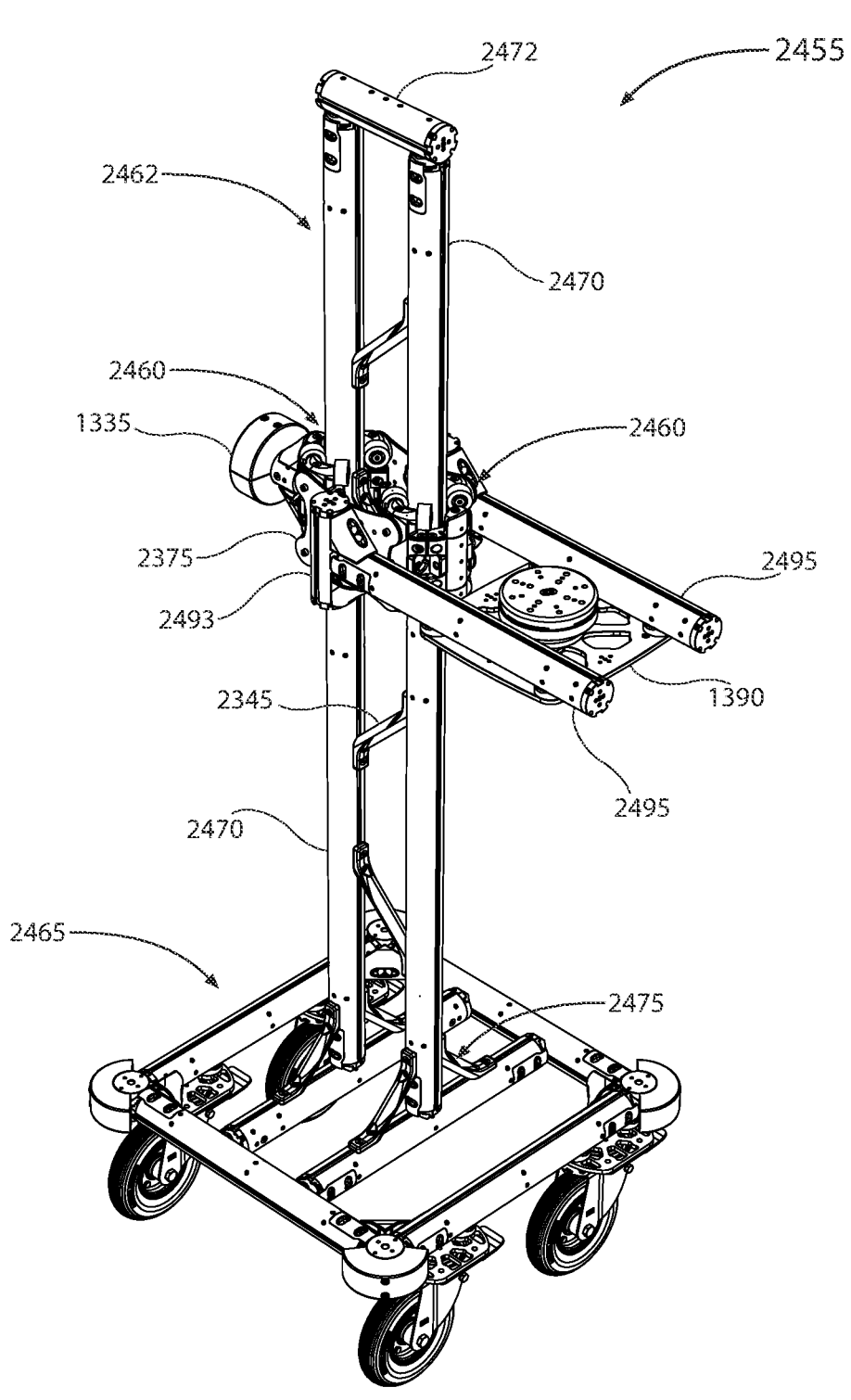
FIG. 83 is a whole perspective view of a dual vertical cylindrical rail dolly assembly comprising two three-sided roller carriage assemblies and a device mount plate assembly vertically rollable on two rail modules supported by a dolly base assembly.
Figure 84:
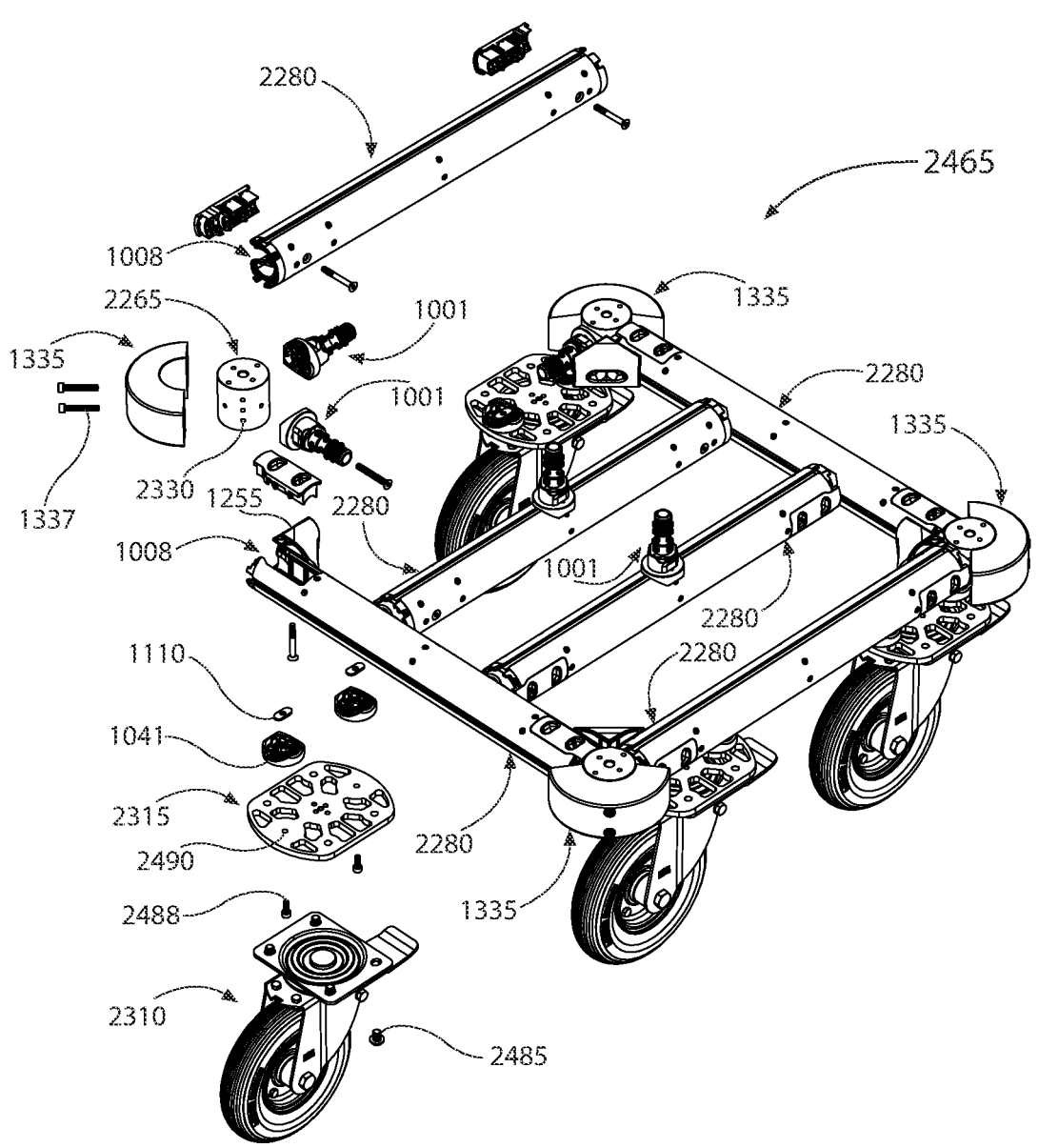
FIG. 84 is a partially exploded perspective view of the dolly base assembly of the dual vertical cylindrical rail dolly assembly shown in FIG. 83.

As described, the dual rail assembly 2162 is supported by the vertical center post modules 2250 in the center of the dolly base assemblies. According to one embodiment, a dolly base assembly 2255 may further comprise a base frame assembled of five of a further embodiment of double side-opening socket module 2280 where four outer modules 2280 are demountably engaged at each end by their female ends 1008 to concave base male assemblies 1001 demountably engaged by screws 2285 threadably engaged with threaded holes 2290 on the circumferential surface of four cylindrical mount components 2265 at each corner of the base frame whereon are mounted a caster 2295 with a threaded post 2300 threadably engaged to a central threaded hole 2305 in the cylindrical mount components, to allow for rolling movement of the dolly assembly 2160 on the ground and to be adjustably levelled on the threaded posts 2300 within the threaded mount components 2265. Alternatively, four of a second type of caster 2310 may be mounted to the underside of the outer modules 2280 by a caster mount plate 2315 and concave base components 1041, as illustrated in FIGS. 83 and 84 and described in further detail below. According to a further embodiment where the assembly is not required to travel on the ground, a threaded foot 2102 may be engaged with the cylindrical mount components 2265, as described below in reference to FIGS. 86 and 87.

A fifth double side-opening socket module 2280 is demountably engaged by concave base male assemblies 1001 and corner braces 1255 across the center of the dolly base assembly 2255 whereon is demountably engaged the vertical center post module 2250 which may be reinforced on one or both sides by additional cylindrical structural component modules 1200 and corner braces 1255 including a short double side-opening socket module 2320 which at one end is demountably engaged with a flat base male assembly 1005 on a 45-degree mount component 2322 fastened to the outer nut channel 2240 of the vertical center post module 2250, and at the opposite end demountably engaged with a concave base male assembly 1001 on a nut in the nut channel 2325 of the cooperating outer module 2280 which is demountably engaged at a 45-degree orientation on its concave base male assemblies 1001 wherein the pronged connector components 1030 are aligned on the concave base components 1041 at the 45-degree locator holes 1042, as described previously in reference to FIG. 49. Additionally, a dolly base assembly 2255 may comprise weight components 1335 demountably engaged with nut channels or threaded core components 1125 within the base modules 2280 or at additional threaded holes 2330 in the circumferential surface of the cylindrical mount components 2265, as illustrated in FIG. 84 and described in further detail below.

Figure 80:
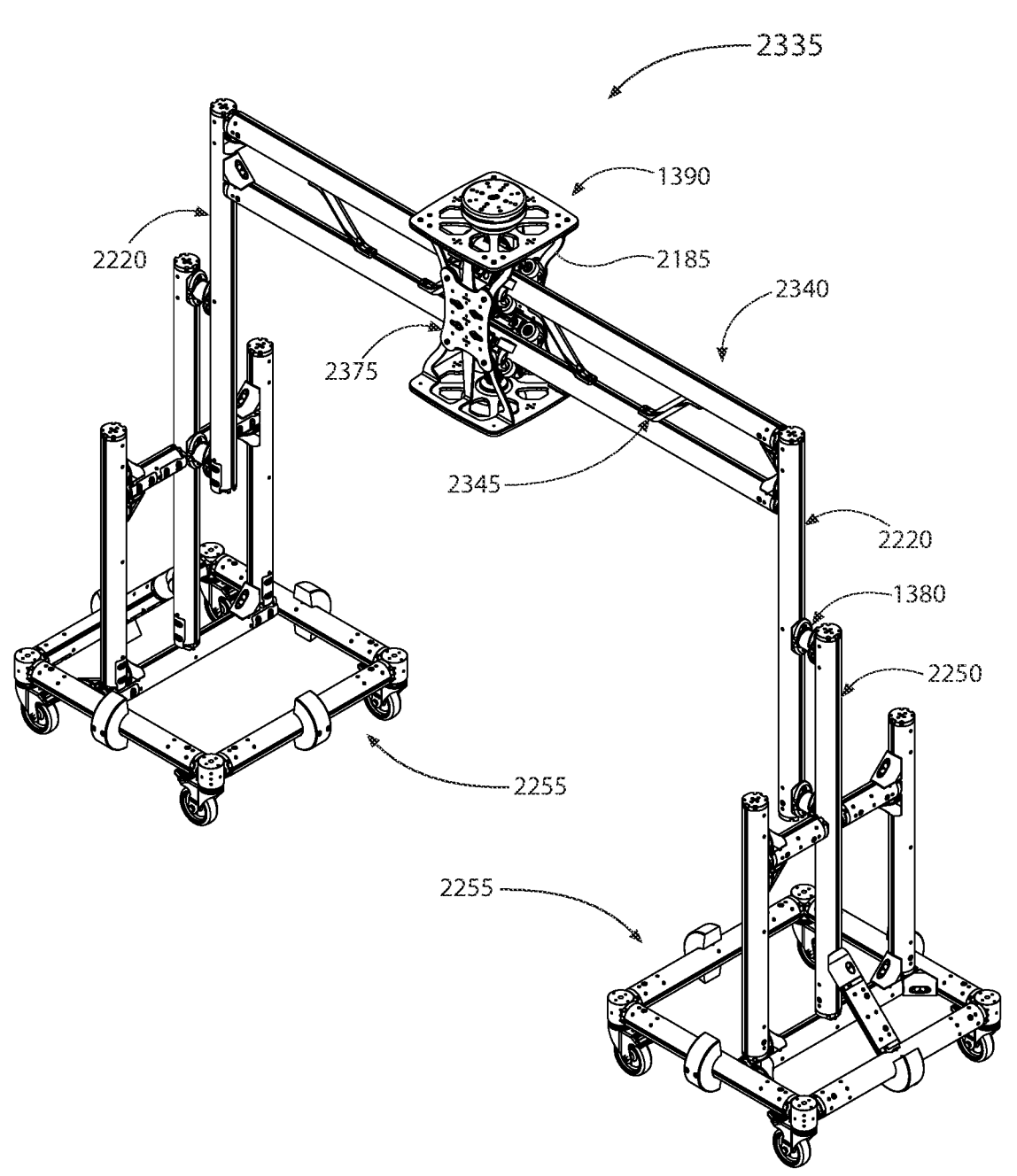
FIG. 80 is a whole perspective view of a second height-adjustable dual rail track dolly assembly with two three-sided roller carriage assemblies tandemly rollable on two rails, said three-sided roller carriage assemblies attached by two bridge plates fastened each to two side mount brackets.
Figure 81:
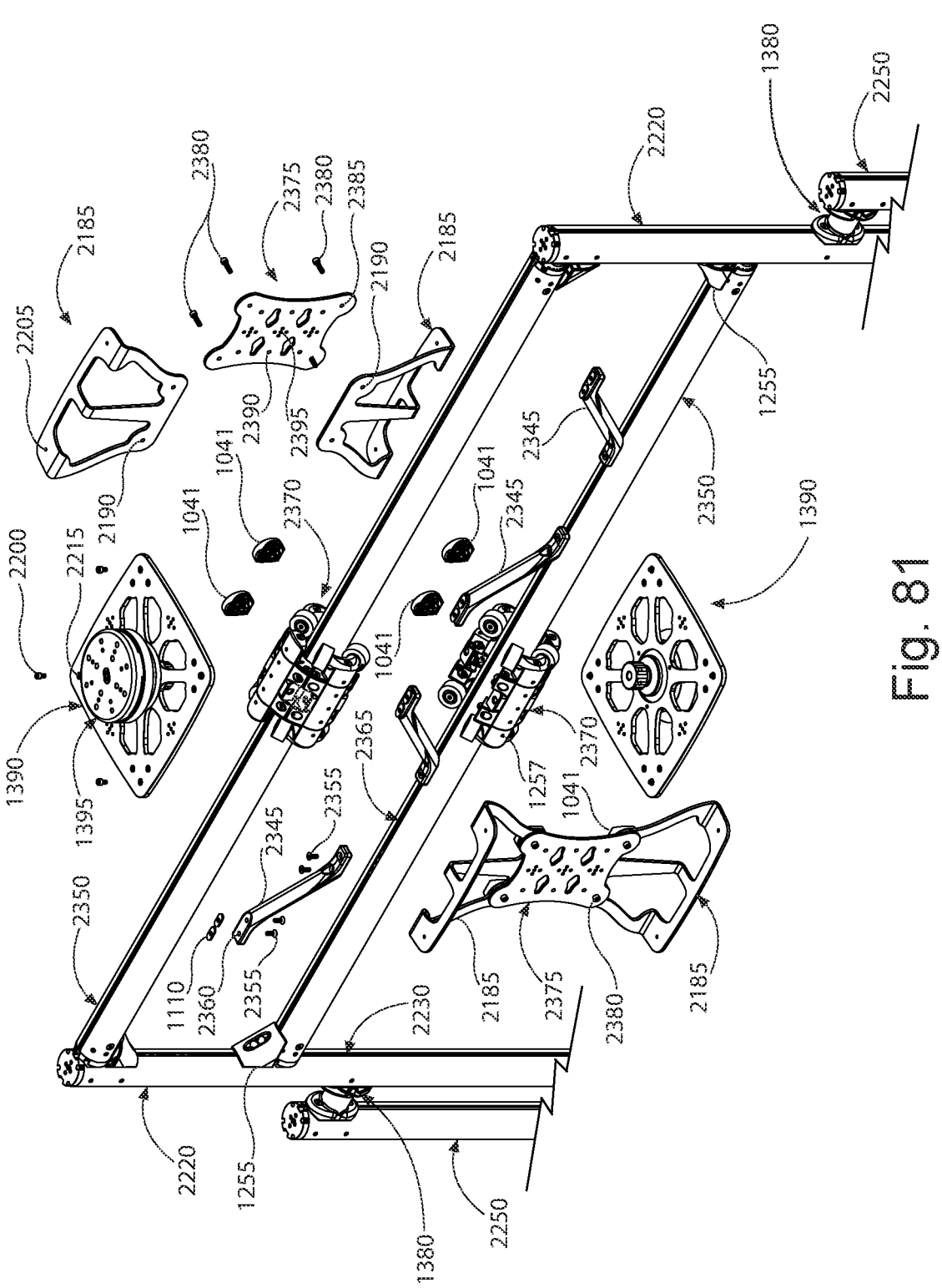
FIG. 81 is a partially exploded cutaway perspective view of the rails and roller carriage assemblies of the height-adjustable dual rail track dolly assembly shown in FIG. 80.

According to further embodiments, a track dolly assembly may be configured as a dual rail track dolly assembly whereon two or more devices may be supported on two roller carriage assemblies joined together by plate components for rolling movement of the two roller carriage assemblies in tandem along two parallel rails. According to one embodiment, as illustrated in FIGS. 80 and 81, a second example of a height-adjustable dual rail track dolly assembly 2335 may comprise a dual rail assembly 2340 supported as in track dolly assembly 2160 on two rail support vertical post modules 2220 of which the vertical position can be adjusted on the multidirectional component mounts 1380 along two vertical center post modules 2250 of two dolly base assemblies 2255, but wherein, instead of vertical cross support assemblies 2260, the dual rail assembly 2340 is reinforced across the middle by one or more of a parallel brace 2345.

According to one embodiment, a dual rail assembly 2340 comprises two rail modules 2350 reinforced by the one or more parallel braces 2345 and demountably engaged at both ends with the rail support vertical post modules 2220 by concave base male assemblies 1001 and concave corner braces 1255 demountably engaged with the side-nut channels 2230 of the cylindrical structural components 2235 of the vertical post modules. The parallel brace 2345 is demountably engaged by screws 2355 through holes 2360 threadably engaged with nuts 1110 in the inward-facing side-nut channels 2365 of the rail modules 2350, or according to a further embodiment with threaded core components 1125 through side mount holes, as previously described. The narrow shape of the parallel braces allow passage of two three-sided roller carriage assemblies 2370 along the rail modules 2350.

According to one embodiment, the three-sided roller carriage assemblies 2370 comprise the same components as a three-sided roller carriage assembly 2170, as described in reference to FIGS. 77 and 78, but not requiring a channel-guide component 1280 or a channel-guide adjustable clamping mechanism 1345, as here one or two of a bridge plate 2375 is secured to one or both sides of the two three-sided roller carriage assemblies 2370 which therefore retains the alignment of the total assembly on both rail modules 2350. According to one embodiment, a bridge plate 2375 is secured against the sides of the two cooperating side mount brackets 2185 by screws 2380 through holes 2385 and holes 2190 in the side mount brackets 2185 and the cooperating concave base components 1041 against the sides of the roller carriage assemblies 2370 where the screws 2380 are threadably engaged with threaded holes 1257 to secure the roller carriage assemblies together on the rails 2350. The bridge plate may additionally comprise through-holes 2390 whereby additional cylindrical structural component modules 1200 may be demountably engaged outwardly on concave base components 1041, as illustrated in FIGS. 83, 85, 86 and 87 and described in further detail below, or threaded holes 2395 whereby additional cylindrical structural component modules 1200 engaged with flat base male assemblies 1005, or another component comprising a flat base and configured to receive a screw, may be demountably engaged. According to one embodiment, as illustrated in FIGS. 80 and 81, two device mount plates 1390 are demountably engaged with the two sets of brackets 2185 where screws 2200 are threadably engaged with threaded holes 2205 in the brackets through holes 2215 in the corners of the device mount plate, whereon a bowl/ball mount assembly 1395/2125 may be demountably engaged.

According to further embodiments, any suitable configuration of a roller carriage assembly 1205 may additionally be used for support of a light, a microphone, a speaker, a monitor, a sensor, a power tool, or other device comprising a receiver for demountable engagement with a stud mount component 1270 which may be demountably engaged with the roller carriage assembly directly or via a cylindrical structural component module 1200 at the threaded holes in the carriage body components, roller mounts, and/or corner brace mounts.

According to one embodiment, as illustrated in FIG. 82, a three-sided clamping roller carriage assembly 2400 provided for rolling movement along a cylindrical structural component 2405 has at its threaded hole 1261 demountably engaged by a concave base male assembly 1001, a side-opening socket/end cap module 2410. One or more stud mount components 1270 is demountably engaged with the side-opening socket/end cap module 2410. The stud mount component may comprise a stud 2420 which at its proximal end has a protrusion which fits into a recess in a stud brace 2425 through which a screw 2430 threadably engages a threaded hole in the end of the stud. Screws 2435 through holes 2440 in the stud brace 2425 may be threadably engaged with nuts 1110 within the nut channels 2442 of the side-opening socket/end cap module 2410, or according to a further embodiment, with a threaded core component 1125 through a side mount hole in the module. A device, such as a light 2445, comprising a receiver 2450, with a screw which tightens against the stud, may be demountably engaged thereby. For structural reinforcement, corner braces 1255 may additionally be engaged with the roller carriage assembly and the sides of the side-opening socket/end cap module.

Figure 85:
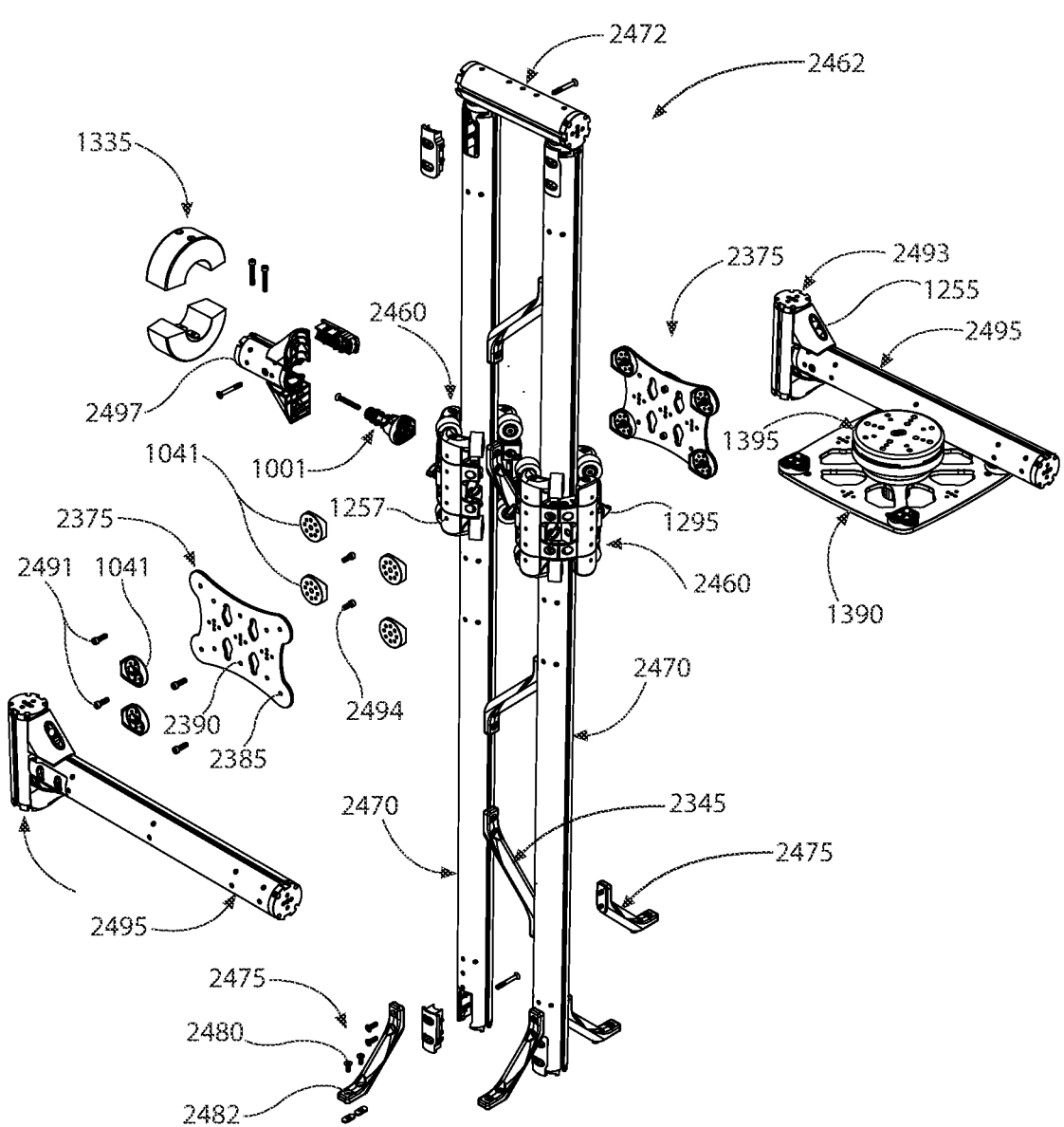
FIG. 85 is a partially exploded perspective view of the rails and roller carriage assemblies of the dual vertical cylindrical rail dolly assembly shown in FIG. 83.

According to further embodiments, a track dolly assembly may comprise a dual rail assembly oriented vertically whereon two roller carriage assemblies and one or more supported devices may be raised and lowered on the rail assembly which may be rolled along the ground on a dolly base assembly. As illustrated in FIGS. 83, 84, and 85, a dual vertical cylindrical rail dolly assembly 2455 may comprise two three-sided clamping roller carriage assemblies 2460 rollable on a dual rail assembly 2462 supported by a dolly base assembly 2465. As previously described regarding the dual rail assembly 2340, the dual rail assembly 2462 comprises two rail modules 2470 reinforced by one or more parallel braces 2345 and an end cap/end cap module 2472 at the top demountably engaged by male connectors 1000 to the female ends 1008 of the rail modules.

The dual rail assembly 2462 may be demountably engaged at its lower end to two double side-opening socket modules 2280 across the dolly base assembly 2465 additionally comprising four outer double side-opening socket modules 2280 connected to one another by cylindrical mount components 2265 at each corner, as previously described regarding the dolly base assembly 2255. For structural reinforcement, narrow corner braces 2475 may be demountably engaged with the rails 2470 and the intersecting base modules 2280 by screws 2480 through holes 2482 threadably engaged with nuts 1110 and threaded core components 1125. The narrow shape of the narrow corner braces 2475 allows, according to further embodiments, an appropriately configured roller carriage assembly 1205 to roll to the end of a rail when supported by a narrow corner brace. To provide additional stabilization of the base, weight components 1335 may be demountably engaged by screws 1337 at threaded holes 2330 in the circumferential surface of the cylindrical mount components 2265. The dolly base assembly 2465 may be rolled on four casters 2310 mounted to the caster mount plate 2315 by screws 2485 and to the underside of the base frame modules 2280 by screws 2488 through holes 2490 in the caster mount plate 2315 and through concave base components 1041 where threadably engaged with nuts 1110 in the nut channels of the base modules 2280.

A dual vertical cylindrical rail dolly assembly 2455 may comprise two three-sided clamping roller carriage assemblies 2460 retained to one another and on the rails 2470 by one or two bridge plates 2375 secured against the sides of the two roller carriage assemblies by screws 2491 through holes 2385 and the cooperating concave base components 1041 against the sides of the roller carriage assemblies to be threadably engaged with threaded holes 1257. The bridge plate(s) 2375 additionally comprise through-holes 2390 whereby an end cap/end cap module 2493 is engaged by screws 2494 on concave base components 1041 and whereon a side-opening socket/end cap module 2495 is demountably engaged outwardly and supporting a device mount plate 1390 for positioning of one or more devices on the rail dolly assembly 2455 through a bowl/ball mount assembly 1395/2125 or other means of attachment. To counterbalance the extended device mount plate and supported device, one or more weight components 1335 mounted to a side-opening socket/end cap module 2497 may be demountably engaged opposite the device mount plate on the cooperating roller carriage assembly.

One or both roller carriage assemblies 2460 may comprise adjustable clamping mechanisms 1295 or channel-guide adjustable clamping mechanisms 1345 for slowing descent or stopping the assemblies along the rails 2470. According to a further embodiment, by exclusion of the one or two bridge plates 2375, the roller carriage assemblies may remain separate and roll independently where one or more devices may be supported on each rail, and each assembly may include a channel-guide component 1280 or a channel-guide adjustable clamping mechanism 1345 to maintain the assemblies' alignment along the rails.

Figure 86:
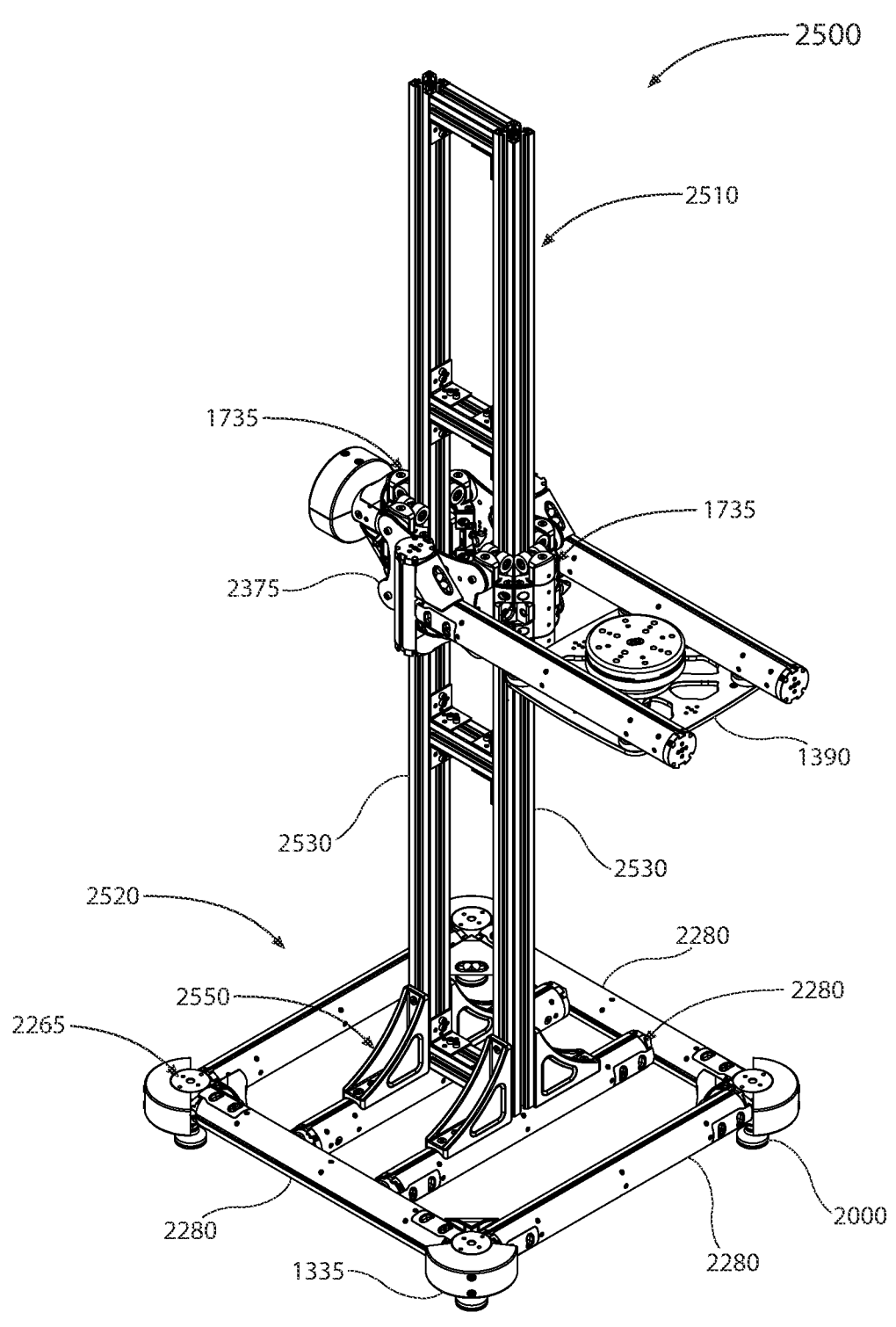
FIG. 86 is a whole perspective view of a dual vertical square rail dolly assembly comprising two three-sided square track roller carriage assemblies engaged on a dual square rail assembly supported by a dolly base assembly.
Figure 87:
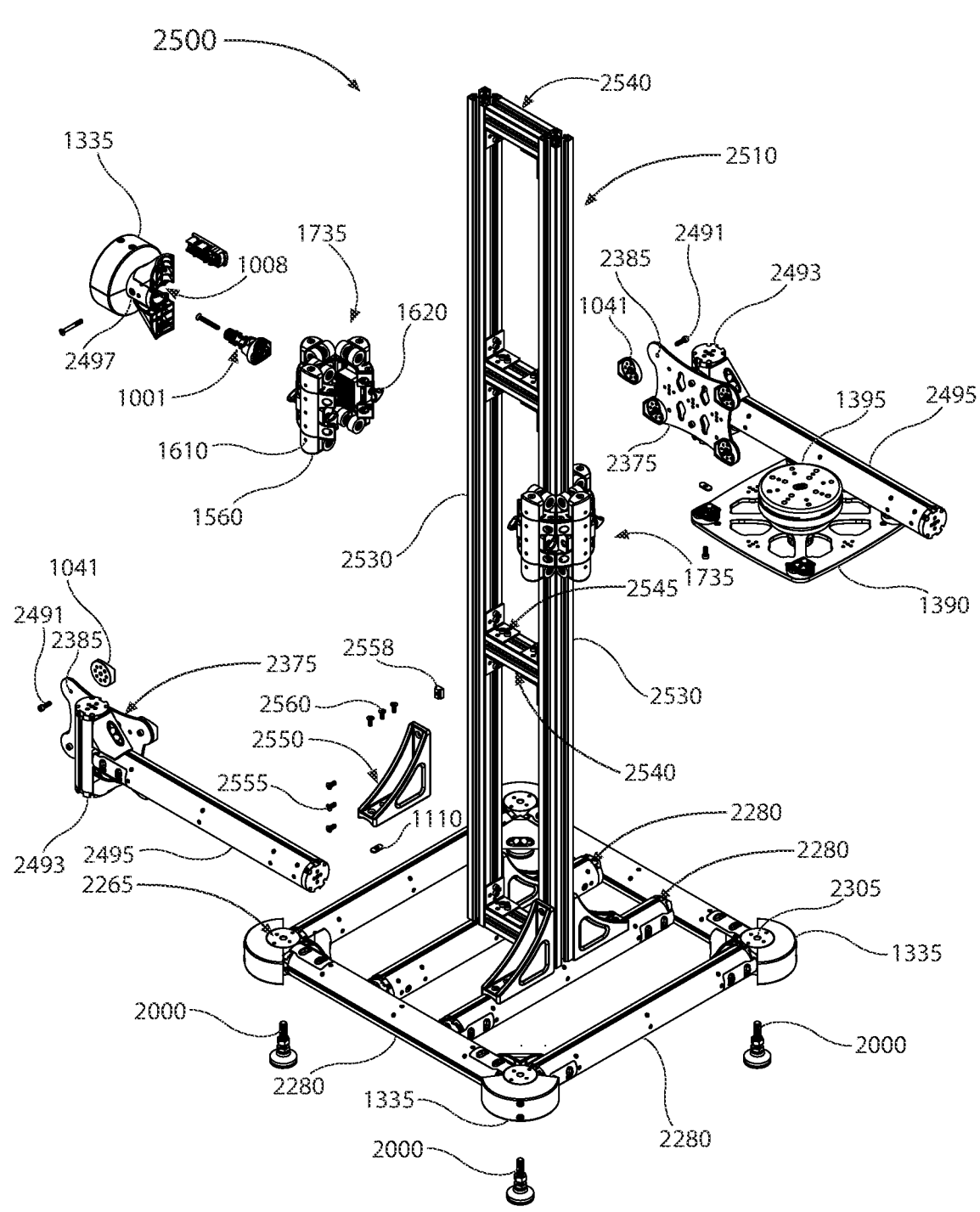
FIG. 87 is a partially exploded perspective view of the dual vertical square rail dolly assembly shown in FIG. 86.

According to further embodiments, a track dolly assembly may comprise a dual square rail assembly oriented vertically whereon two square track roller carriage assemblies and one or more supported devices may be raised and lowered on the rail assembly which can be rolled along the ground on a dolly base assembly, or as illustrated in FIGS. 86 and 87, situated and levelled on threaded foot components. A dual vertical square rail dolly assembly 2500 may comprise two three-sided square track roller carriage assemblies 1735, as previously described in reference to FIGS. 63C and 63D, which may be rolled or retained on a dual square rail assembly 2510 supported by a dolly base assembly 2520. According to an embodiment, a dual square rail assembly 2510 may comprise two square rail components 2530 reinforced by one or more square structural components 2540 and brackets 2545 demountably engaged by screws with nuts in the components' nut channels.

The dual square rail assembly 2510 may be demountably engaged at its lower end to two double side-opening socket modules 2280 across the dolly base assembly 2520 additionally comprising four outer double side-opening socket modules 2280 connected to one another by cylindrical mount components 2265 at each corner, as previously described in dolly base assembly 2255 and 2465. For structural reinforcement, square-to-round corner braces 2550 may be demountably engaged by screws 2555 with nuts 2558 in the nut channels of the square rails 2530 and screws 2560 with nuts 1110 in the intersecting base cylindrical modules 2280. To provide additional stabilization of the base, weight components 1335 may be demountably engaged by screws at threaded holes in the circumferential surface of the cylindrical mount components 2265, as previously described. According to an embodiment wherein the assembly is not required to travel on the ground, for example as illustrated in FIGS. 86 and 87, threaded feet 2000 may be threadably engaged with the central threaded holes 2305 of the cylindrical mount components 2265 which allow the assembly to be adjustably levelled. According to further embodiments, a dolly assembly 2500 may comprise four casters 2310 mounted to caster mount plates 2315 as previously described in reference to FIG. 84, to allow for rolling movement on the ground, or casters 2295 mounted to the cylindrical mount components 2265 as previously described in reference to FIG. 79 to allow for rolling movement and to be adjustably levelled on the casters' threaded posts.

A dual vertical cylindrical rail dolly assembly 2500 may comprise two three-sided square track roller carriage assemblies 1735 retained to one another and on the rails 2530 by one or two bridge plates 2375 secured against the sides of the two roller carriage assemblies by screws 2491 through holes 2385 and the cooperating concave base components 1041 against the sides of the roller carriage assemblies to be threadably engaged with threaded holes 1610 in the outfacing surface of the square roller mounts 1560. The bridge plate(s) 2375 additionally comprise through-holes whereby an end cap/end cap module 2493 is engaged on concave base components and whereon a side-opening socket/end cap module 2495 is demountably engaged outwardly and supporting a device mount plate 1390 for positioning of one or more devices on the dolly assembly 2500 through a bowl/ball mount assembly 1395/2125 or other means of attachment. To counterbalance the extended device mount plate and supported device, one or more weight components 1335 mounted to a side-opening socket/end cap module 2497, may be demountably engaged opposite the device mount plate on the cooperating roller carriage assembly 1735.

One or both roller carriage assemblies 1735 may comprise adjustable clamping mechanisms 1620 or square track channel-guide adjustable clamping mechanisms 1705, as previously described, for slowing descent or stopping the assemblies along the rails 2530. According to a further embodiment, by exclusion of the one or two bridge plates 2375, the roller carriage assemblies may remain separate and roll independently whereby one or more devices may be supported on each, and each assembly may optionally include a square track channel-guide adjustable clamping mechanism 1705 to maintain the assemblies' alignment along the rails.

Figure 88:
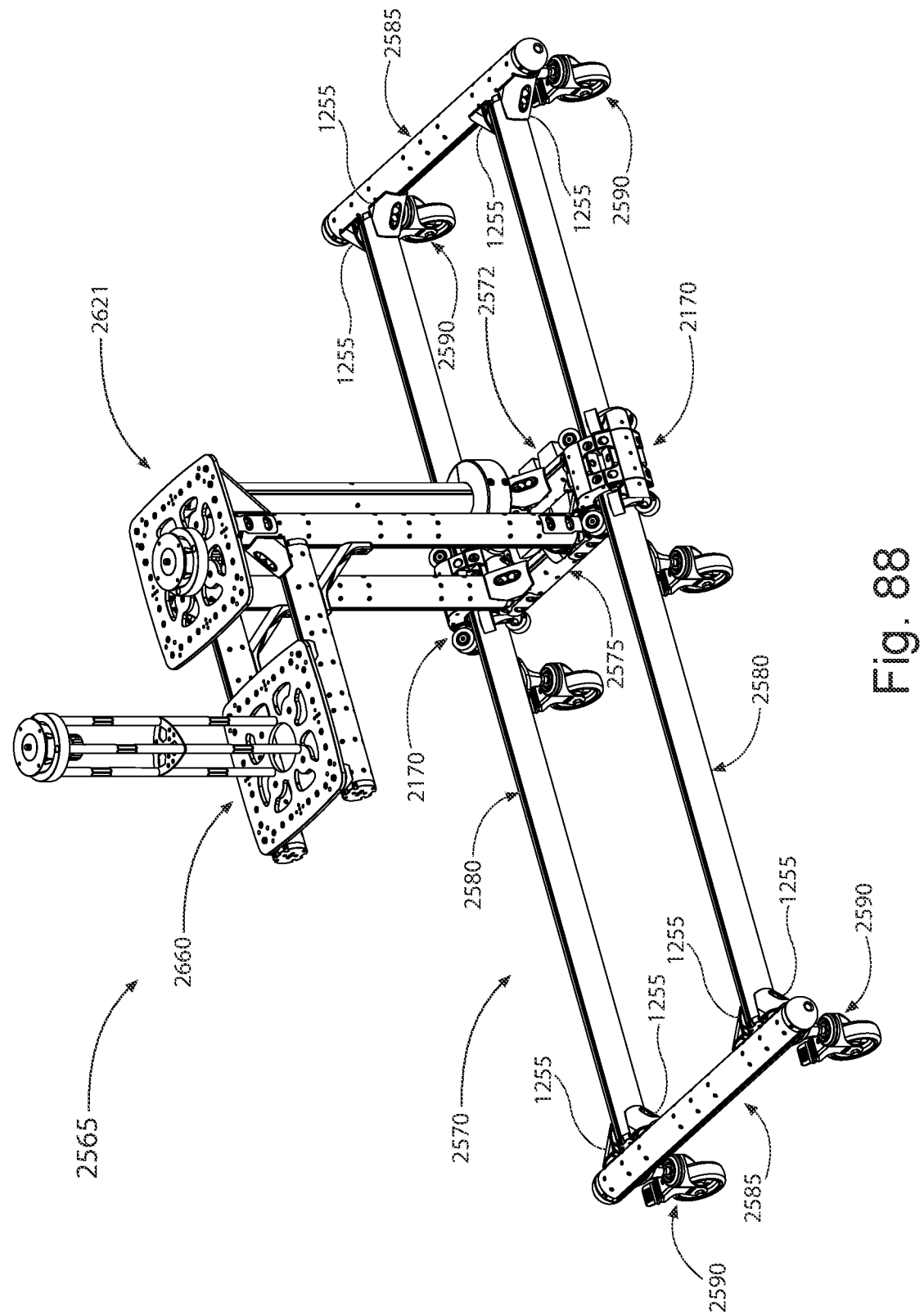
FIG. 88 is a whole perspective view of a dual plate track dolly assembly with two component mount plate and bowl/ball mount assemblies, said dolly assembly rollable on an adjustable-level track assembly.
Figure 89:
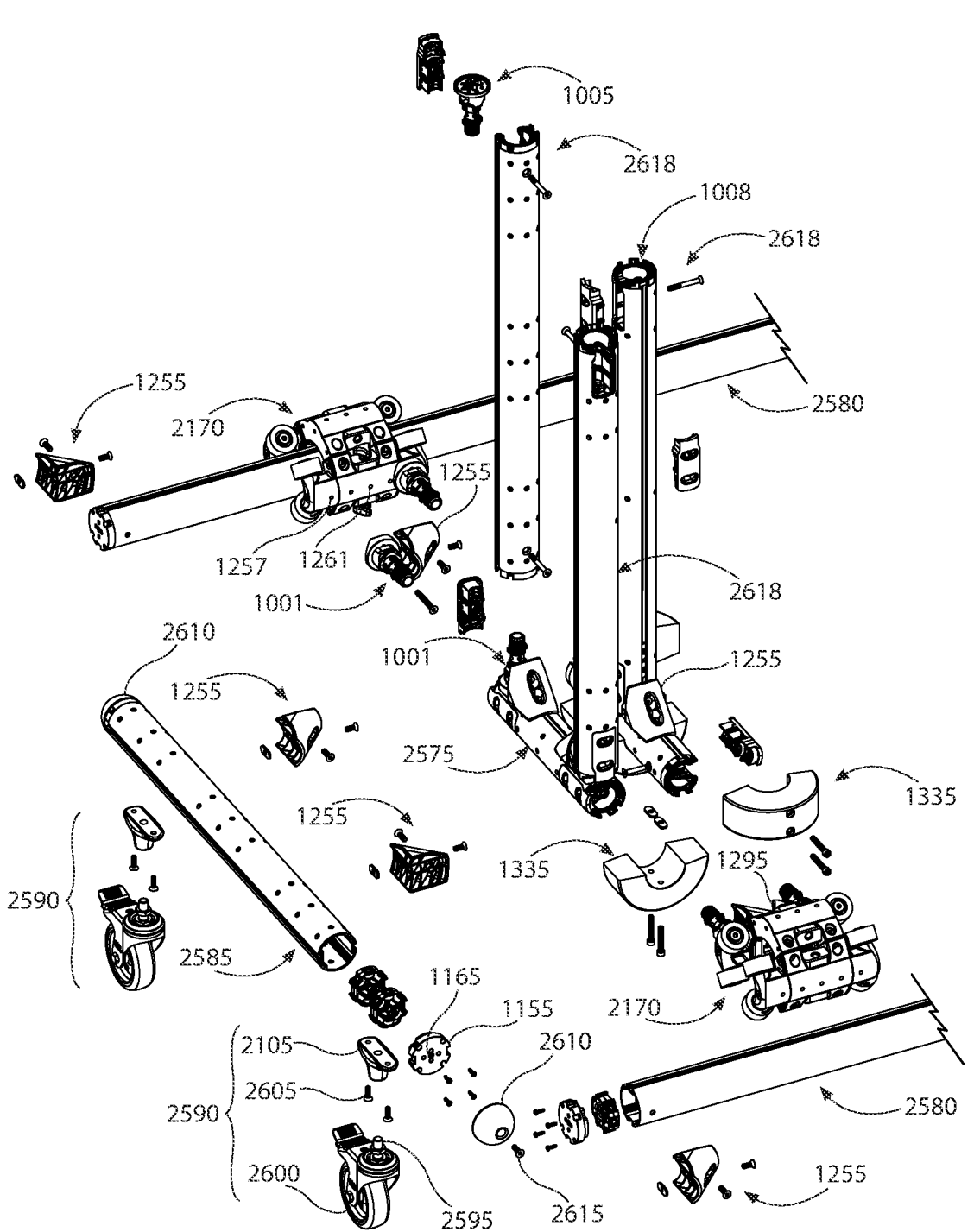
FIG. 89 is a partially exploded cutaway perspective view of the dual plate track dolly assembly and adjustable-level track assembly shown in FIG. 88.
Figure 90:
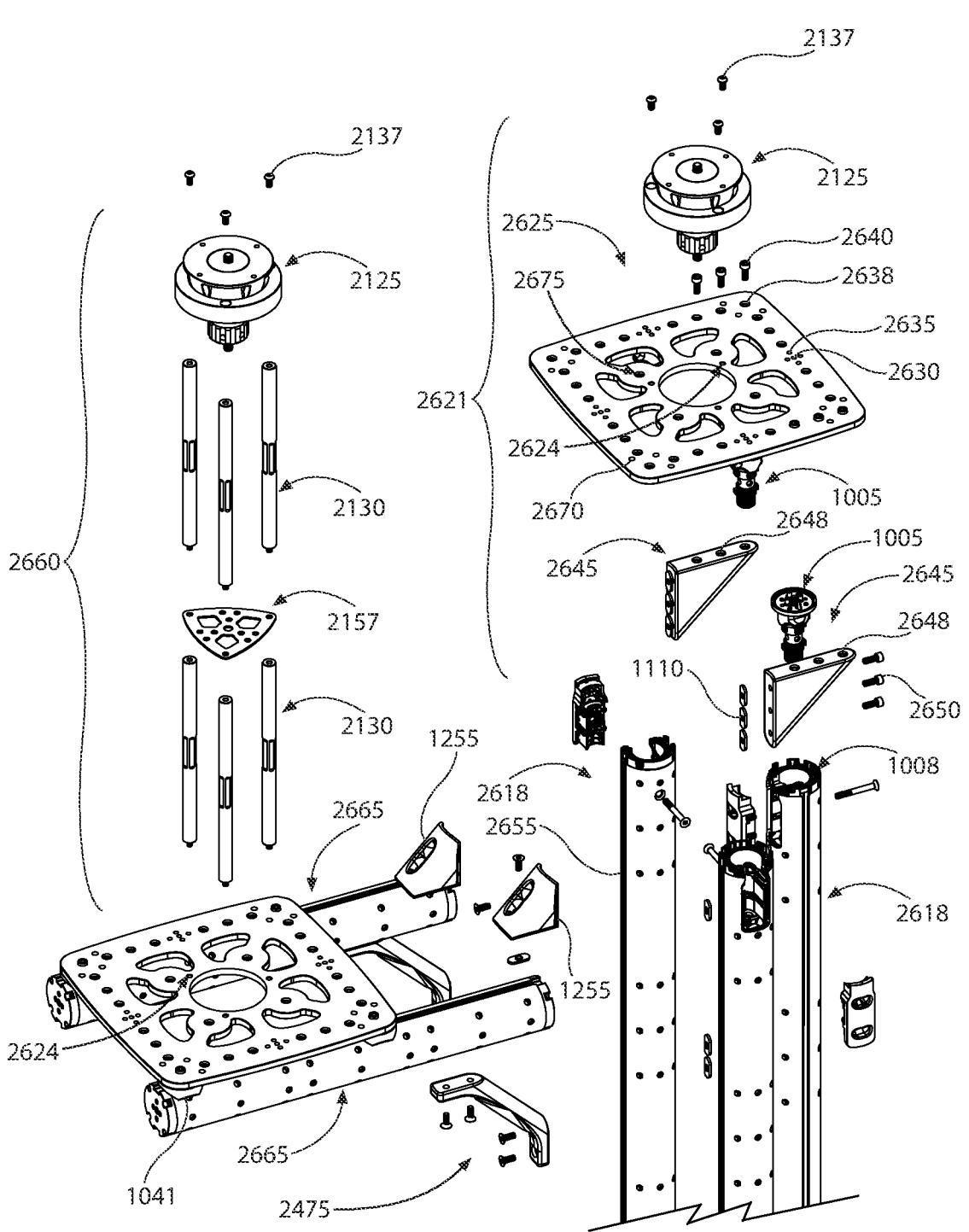
FIG. 90 is a partially exploded cutaway perspective view of the component mount plate and bowl/ball mount assemblies of the dual plate track dolly assembly shown in FIG. 88.

According to further embodiments, a dual plate track dolly assembly 2565 is illustrated in FIGS. 88, 89, and 90 as configured for rolling movement along an adjustable-level track assembly 2570. The dual plate track dolly assembly 2565 may comprise a dolly base assembly 2572 of two three-sided roller carriage assemblies 2170, as described previously in reference to FIGS. 77 and 78, here conjoined by two double side-opening socket modules 2575 demountably engaged by two concave base male assemblies 1001 secured by a screw or bolt threadably engaged with threaded holes 1257 on each roller carriage assembly. One of the socket modules 2575 may be reinforced inwardly at each end by a corner brace 1255 demountably engaged by a screw at the central threaded hole 1261 in the inward-facing carriage body components 1230. To counter the levered weight of the upper assembly, weight components 1335 may be demountably engaged with the dolly base assembly 2572. For this same purpose, the roller carriage assemblies may comprise an adjustable clamping mechanism 1295, or according to a further embodiment wherein the nut channels of the cylindrical track components are side facing, a channel-guide adjustable clamping mechanism 1345, which when engaged with the sides of the track components, help stabilize the base.

According to one embodiment, an adjustable-level track assembly 2570 may comprise two elongate rail end cap/end cap modules 2580 demountably engaged at their ends by two corner braces 1255 to two perpendicular terminal end cap/end cap modules 2585. An adjustable-level track assembly 2570 may be supported and levelled on threaded foot components 2100, as previously described in reference to FIG. 73, or on threaded caster components 2590, as illustrated in FIGS. 88 to 90, wherein a threaded post 2595 of a caster 2600 is threadably engaged with the concave mount 2105 which is demountably engaged by screws 2605 with the underside of a rail module 2580 or terminal module 2585. A bumper component 2610 may be demountably engaged with the ends of the terminal modules by a screw 2615 threadably engaged with the threaded hole 1165 in the center of the flat end cap component 1155. According to further embodiments, the length of an adjustable-level track assembly may be extended by two or by a series of additional end cap/end cap modules 2580 wherein, in place of flat end cap components 1155, the butted ends of the modules are conjoined by rail joiner components 2035, as described previously in reference to FIG. 73, or other means of attachment such as channel braces, as described below in reference to FIGS. 94, 126, and 127. According to a further embodiment, an adjustable-level track assembly may comprise two or a series of square track components 1555 instead of cylindrical track components, and the dolly base assembly comprising square track roller carriage assemblies 1550.

According to one embodiment of the track dolly assembly 2565, three double side-opening socket modules 2618, demountably engaged by concave base male assemblies 1001 and corner braces 1255, may extend upwardly from the two horizontal socket modules 2575 of the dolly base assembly 2572 whereby a first component mount plate assembly 2621 is demountably engaged by flat base male assemblies 1005 in the upward female ends 1008. According to one embodiment, a first component mount plate assembly 2621 may comprise a bowl/ball mount assembly 2125 or alternatively, bowl/ball mount assembly 1395 engaged by screws 2137 with threaded holes 2624 in a component mount plate 2625 which may additionally comprise threaded holes 2630 and locator holes 2635 wherein a flat base male assembly 1005 may be demountably engaged by a screw or bolt. A component mount plate 2625 may additionally comprise a row of holes 2638 whereby screws 2640 are threadably engaged with a plate corner brace 2645 comprising threaded holes 2648 along a flat edge for demountable engagement with the component plate and a concave edge whereby screws 2650 may be demountably engaged with a cooperating cylindrical structural component 2655 by nuts 1110 or a threaded core component 1125, or as described in further detail below in reference to FIGS. 126 and 127, the round side of a roller carriage assembly 1205. A second component mount plate assembly 2660 may be demountably engaged by screws 2640 through holes 2638 and concave base components 1041 for threadably engagement with nuts in the nut channels of two end cap/end cap modules 2665 which are demountably engaged by corner braces 1255, 2475 on two of the vertical socket modules 2618 whereby the vertical position of the second component mount plate assembly 2660 may be adjusted. The second component mount plate assembly may comprise an assembly of threaded extension rods 2130 supporting a second bowl/ball mount assembly 2125/1395, as previously described in reference to FIGS. 74 to 76, at threaded holes 2624. A component mount plate 2625 may additionally comprise a plurality of cylindrical mount component holes 2670 and additional cylindrical structural component mount holes 2675, as described in further detail below in reference to FIGS. 91, 92, 126, and 127.

Figures 91A, 91B:
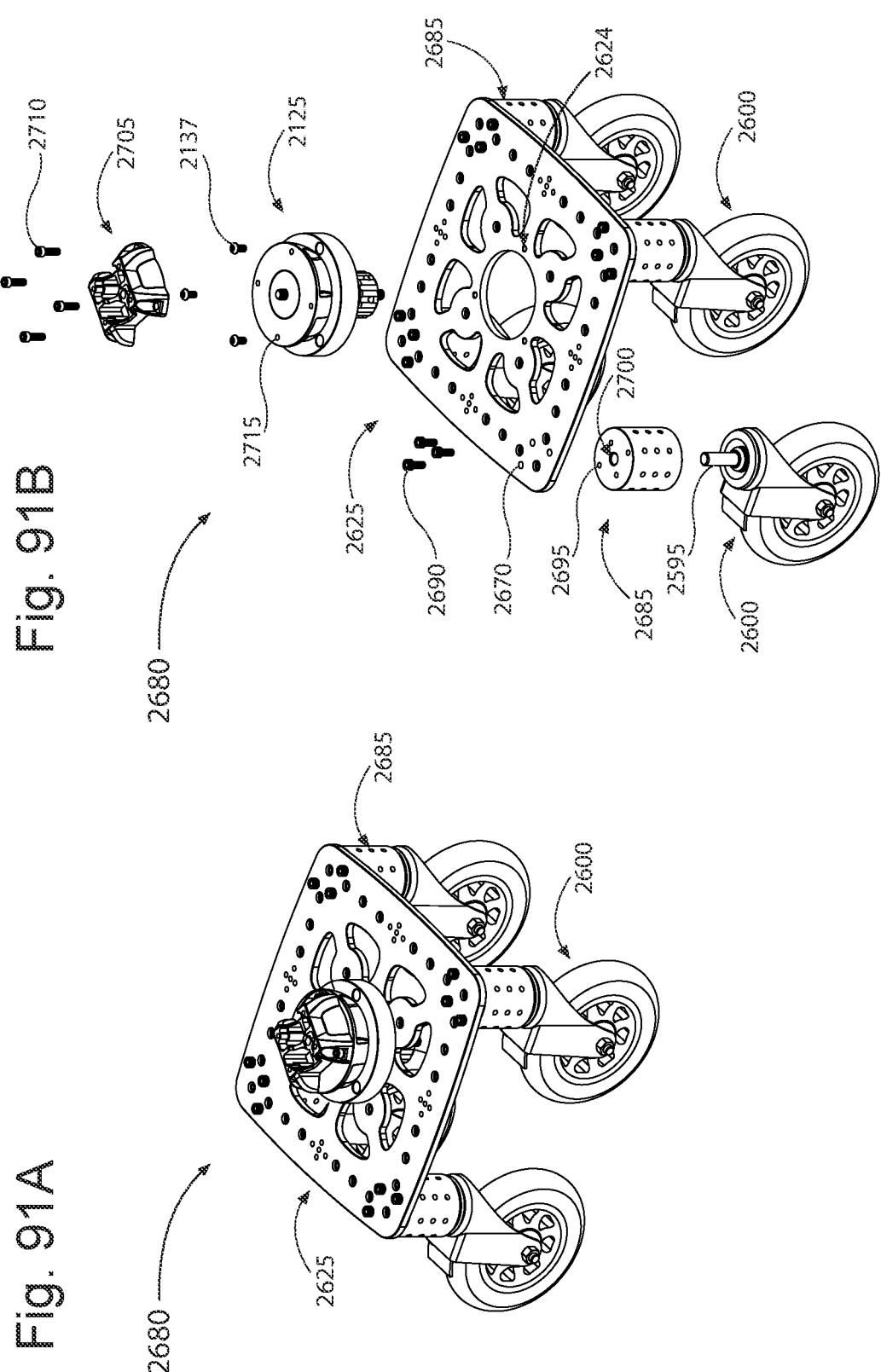
FIG. 91 shows a whole perspective view and a partially exploded perspective view FIGS. 91A and 91B, respectively, of a component mount plate dolly assembly on four casters with a bowl/ball mount assembly, said dolly assembly on four casters.

According to further embodiments, a component mount plate assembly comprising a component mount plate 2625 which forms the structural body on which additional components such as casters 2600, foot components 2000, weight components 1335, stud mount components 1270, bowl/ball mount assemblies 2125/1395, threaded extension rods 2130 and the like, may be configured as a dolly or stand on which one or more devices may supported. A component mount plate dolly assembly 2680 is illustrated in FIGS. 91A and 91B comprising a component mount plate 2625 with four of a second example of a cylindrical mount component 2685 demountably engaged by screws 2690 through holes 2670 threadably engaged with threaded holes 2695 in the flat end of the cylindrical mount components 2685 whereon are mounted a caster 2600 with a threaded post 2595 threadably engaged to a central threaded hole 2700 in the cylindrical mount components, to allow for rolling movement of the dolly assembly 2680 on the ground, and to be adjustably levelled on the threaded posts 2595 within the threaded cylindrical mount components 2685. According to further embodiments where rolling movement is not required, threaded foot components 2000 may be demountably engaged with the cylindrical mount components allowing a stand assembly to be levelled on the threaded feet.

According to one embodiment, the dolly assembly 2680 may comprise a bowl/ball mount assembly 2125 demountably engaged directly with the component mount plate 2625 by screws 2137 threadably engaged with threaded holes 2624. According to further embodiments, a custom device mount component may be demountably engaged directly with the component mount plate 2625 or via a bowl/ball mount assembly 2125/1395 whereby a particular device or equipment may be secured to an assembly. As illustrated in FIG. 91, a custom device mount component 2705 may be secured to the bowl/ball mount assembly 2125 by screws 2710 threadably engaged with threaded holes 2715 in the top of the bowl/ball mount assembly 2125, and is configured for demountable engagement of a robotic gimbal with the dolly assembly 2680 or another modular assembly of the system according to other embodiments described herein comprising one or more of a device mount plate 1390, component mount plate 2625, and/or bowl/ball mount assembly 2125/1390.

Figures 92A, 92B:
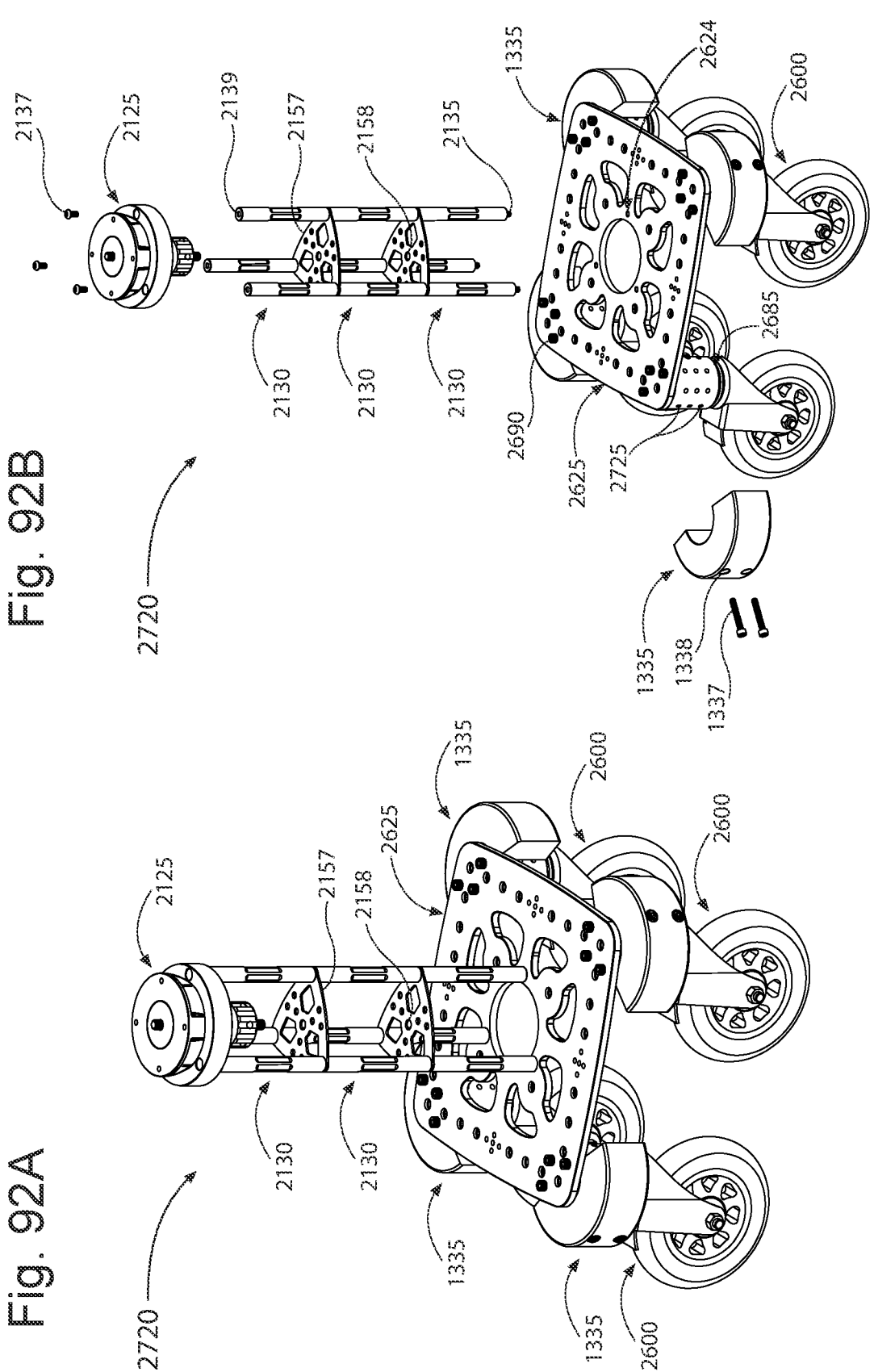
FIG. 92 shows a whole perspective view and a partially exploded perspective view FIGS. 92A and 92B, respectively, of a second component mount plate dolly assembly with weight components on four casters with a threaded extension rods and bowl/ball mount assembly.

According to further embodiments, for added stability, a second example of a component mount plate dolly 2720 additionally comprises weight components 1335 demountably engaged by screws 1337 passed through holes 1338 in the weight components and threadably engaged with one of eight sets of threaded holes 2725 on the circumferential surface of each of the four cylindrical mount components 2685 (FIG. 92). A component mount plate dolly 2720 may additionally comprise, as described previously in reference to FIGS. 74, 75, and 76, one or more sets of threaded extension rods 2130 and optionally one or more rod plates 2157, wherein the threaded screw ends 2135 of the extension rods may be threadably engaged with threaded holes 2624 in the component mount plate 2625. A bowl/ball mount assembly 2125/1390 may be fastened by screws 2137 to the threaded hole ends 2139 of the rods, or according to a further embodiment, replaced by a rod plate 2157 whereon a device may be fastened directly at one or more holes 2158.

Figures 93A, 93B, 93C:
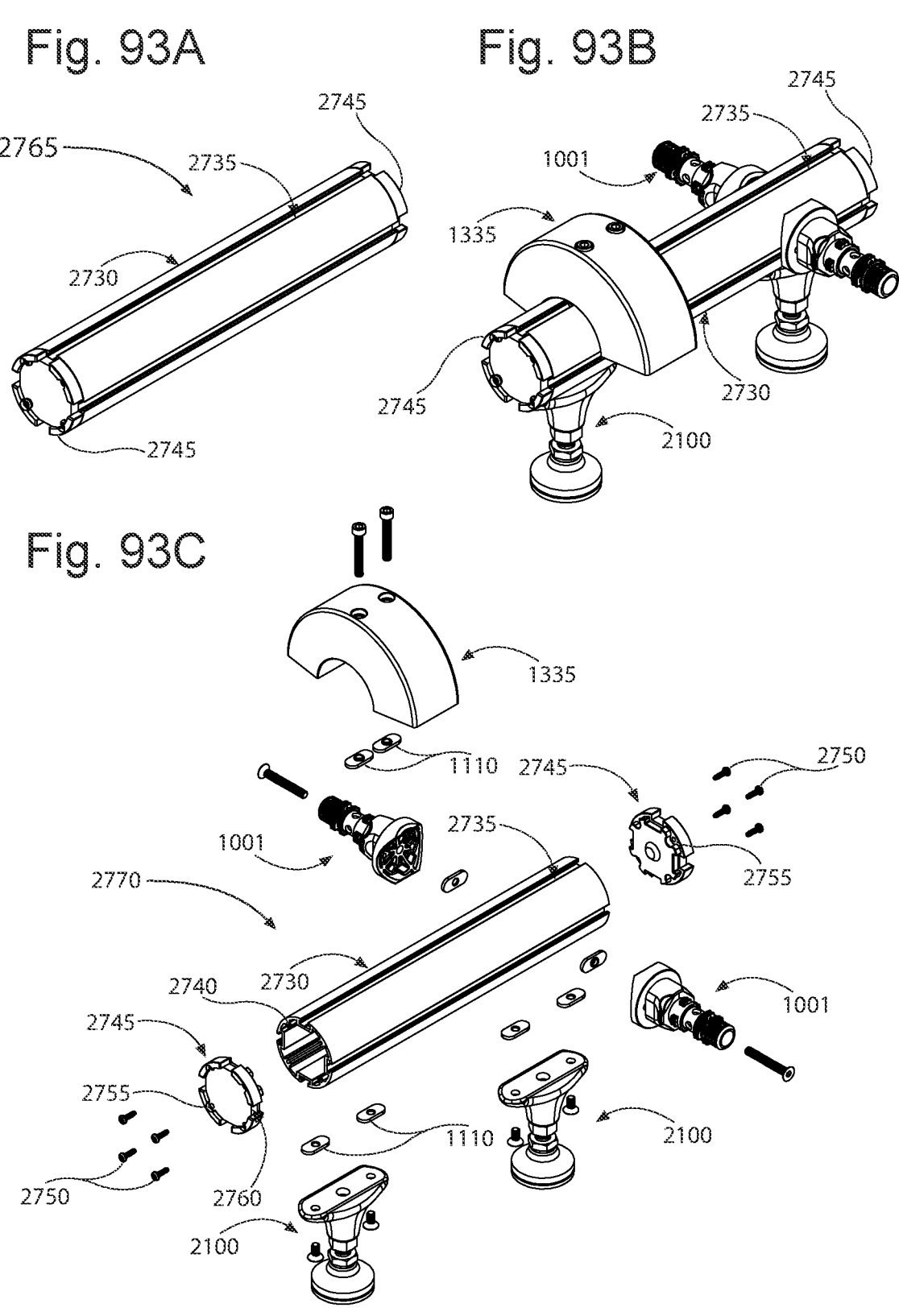
FIGS. 93B and 93C are a whole perspective view and a partially exploded perspective view, respectively, of the four-channel cylindrical structural component module with compatible components demountably engaged with the nut channels of the four-channel cylindrical structural component.

According to further embodiments, optionally a modular assembly may additionally comprise one or more of a cylindrical structural component with four nut channels around its circumference wherein one or more components may be demountably engaged by screws or bolts threadably engaged with nuts securely retained within the nut channels. A four-channel cylindrical structural component 2730 is illustrated in FIGS. 93A, 93B, and 93C comprising four nut channels 2735 whereby one or more concave base male assemblies 1001, threaded foot components 2100, weight components 1335, and other components of the system comprising a concave face and configured to receive one or more screws or bolts, as previously described and as described below, may be demountably engaged by the screws or bolts threadably engaged with one or more nuts 1110 within a nut channel 2735.

A four-channel cylindrical structural component may additionally comprise one or more screw channels 2740 along the inner contours of the component whereby another component may be fastened, such as illustrated in FIG. 93 wherein a terminal end cap component 2745 is there retained by four screws 2750 of which the threaded portions are passed through holes 2755 in the terminal end cap components 2745 and threadably engaged with the four screw channels 2740 in the four-channel cylindrical structural component 2730. A terminal end cap component 2745 may comprise channel openings 2760 around its circumference to allow for passage of nuts 1110 into the nut channels 2735, or according to a further embodiment without channel openings wherein nuts may be pre-installed into the nut channels, for demountable engagement of another component.

In modules additionally comprising further embodiments of male end, female end, and end cap elements as described below, a range of lengths of four-channel cylindrical structural component 2730 may be configured with varying combinations of one or two female ends and/or one or two male ends and/or one or two end cap components at the ends of the cylindrical structural component to form a variety of four-channel cylindrical structural component modules 2765, such as an end cap/end cap module 2770 as illustrated in FIG. 93, which may be used in conjunction with one another and the other structural and functional components of the system such as device mount plates, component mount plates, shelf and/or tray and/or table components, weight components, wheel and/or caster and/or foot components, and/or rail-rolling modules or roller carriage assemblies to form similar embodiments of structural support and utility apparatuses as have been described herein and additional apparatuses as described below. According to further embodiments, one or more four-channel cylindrical structural components 2730 may be used with one or both ends having no end cap, male end, or female end, such as in assembling a series of the components to form a rail by joining two or more of the components directly end to end using two or more of a channel brace 2775, as described below in reference to FIGS. 94, 126, and 127.

Figure 94A:
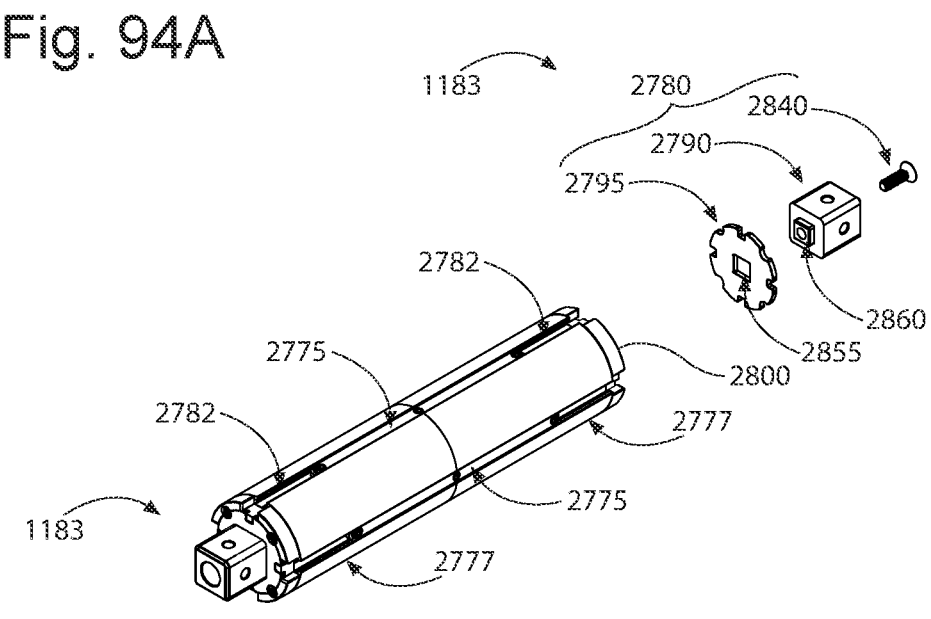
FIG. 94 shows a whole perspective view and a partially exploded perspective view FIGS. 94A and 94B, respectively, of two cylindrical structural components with a straight square through-hole male end at one end and the other ends conjoined by four channel braces.
Figure 94B:
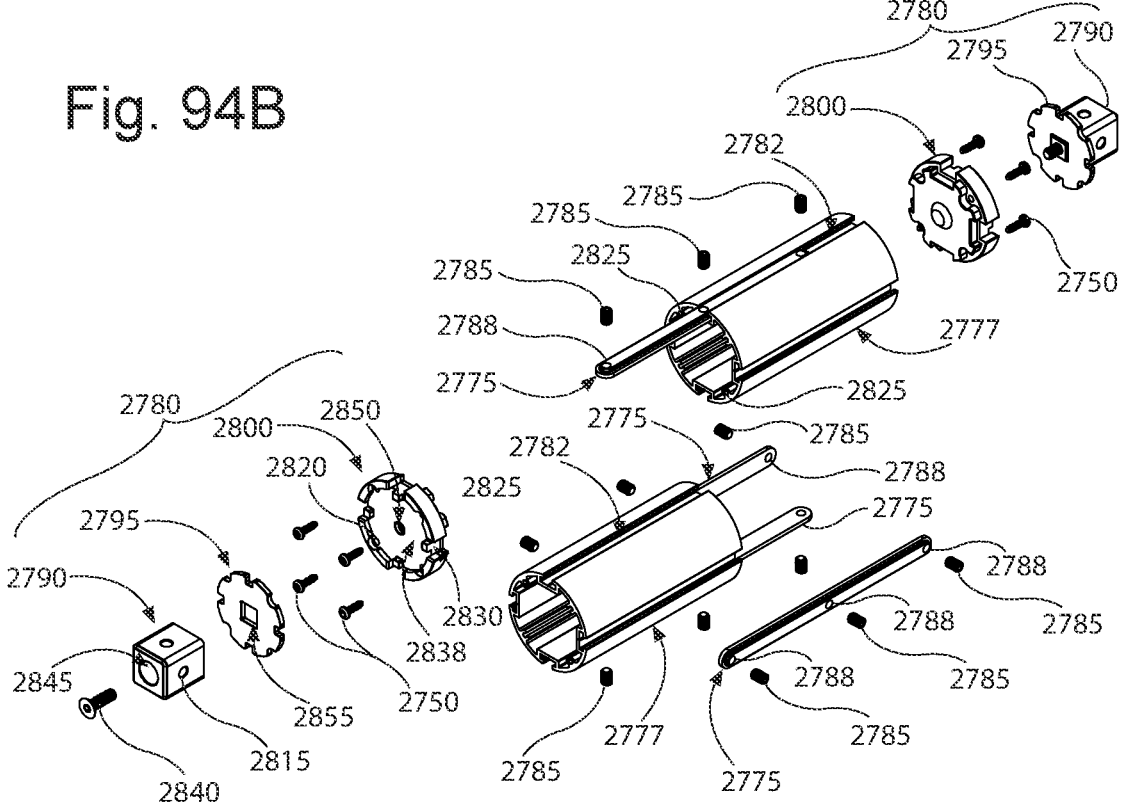

According to further embodiments, a four-channel cylindrical structural component module 2765 may comprise a male end 1183 at one or both ends of a cylindrical structural component provided for demountable engagement with a female end 1008 of another modular component. According to one embodiment, two of another length of four-channel cylindrical structural component 2777 are shown in FIG. 94 having a straight square through-hole male end 2780 at one end and no end component at the opposite end where instead, the two components 2777 are demountably engaged by four channel braces 2775. The channel braces 2775 comprise an elongate plate element having an outer profile shaped for fitting and sliding within the nut channels 2782 of two cylindrical structural components wherein it may brace the two components together by threadably engaging two or more set screws 2785 in two or more threaded holes 2788 in the channel brace. The set screws 2785 extend through the channel brace 2775 to press against the bottom of the nut channels 2782 which drives the brace outward to press against the inward top faces of the nut channels thereby securely engaging the two cylindrical structural components 2777 together. As illustrated in FIG. 94, the two cylindrical structural components are engaged by four channel braces 2775 in each of the nut channels 2782 with three set screws 2785 in three threaded holes 2788. According to further embodiments, two or three channel braces 2775 may optionally be used.

According to the embodiment shown in FIG. 94, the opposite ends of the cylindrical structural components 2777 each have a straight square through-hole male end 2780 which may comprise an assembly of a straight square through-hole connector component 2790, a locator plate 2795, and a male mount end cap component 2800 which when together, are configured for demountable engagement with a fixed square socket female end 2805 by a screw or bolt 2810 of which the threaded portion is passed through two of four through-holes 2815 in the connector component 2790 to secure the component within the female end, as described in further detail below in reference to FIG. 96.

According to one embodiment, a male mount end cap component 2800 may comprise four through-holes 2820 whereby it is retained against the end of a four-channel cylindrical structural component by four screws 2750 of which the threaded portions are passed through holes 2820 for threadably engagement with four screw channels 2825 in the cylindrical structural component. A male mount end cap component 2800 may additionally comprise channel openings 2830 around its circumference to allow for passage of nuts 1110 into the nut channels 2782 of a four-channel cylindrical structural component, or according to a further embodiment without channel openings wherein nuts may be pre-installed into the nut channels, for demountable engagement of another component.

According to some embodiments, a straight square through-hole male end 2780 may comprise the locator plate 2795 of which the outer profile fits within a cooperatively shaped recess 2838 in the male mount end cap component 2800, and wherein together a straight square through-hole connector component 2790 may be demountably engaged with the male mount end cap component 2800 by a screw 2840 of which the threaded portion is passed through a hole 2845 in the connector component 2790 and threadably engaged with a threaded hole or insert 2850 in the center of the male mount end cap component 2800. According to one embodiment, a locator plate 2795 comprises a locator slot 2855 wherein a locator boss 2860 at the mating end of a straight square through-hole connector component 2790 aligns the connector component against the locator plate and male mount end cap component 2800 where it may therefore be stably engaged by the screw. As illustrated in FIG. 94, the locator slot 2855 and the locator boss 2860 may have a square shape. According to a further embodiment, a locator slot and locator boss may have an octagonal shape. According to further embodiments, a straight square through-hole male end 2780 may comprise, instead of the assembly of the connector component 2790, locator plate 2795, and male mount end cap component 2800, a single component equally configured for demountable engagement with a fixed square socket female end 2805 retained at the end of a cylindrical structural component by screws 2750.

Figure 95A:
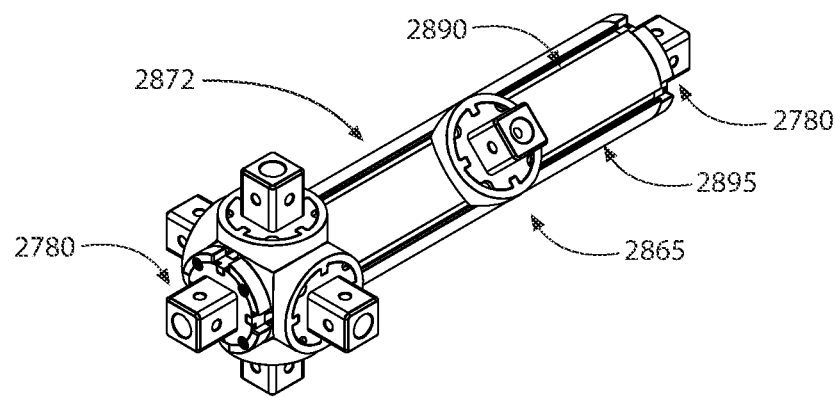
FIG. 95 shows a whole perspective view and a partially exploded perspective view FIGS. 95A and 95B, respectively, of a straight square through-hole male end/male end module with five male side mounts demountably engaged on the circumference of the four-channel cylindrical structural component.
Figure 95B:
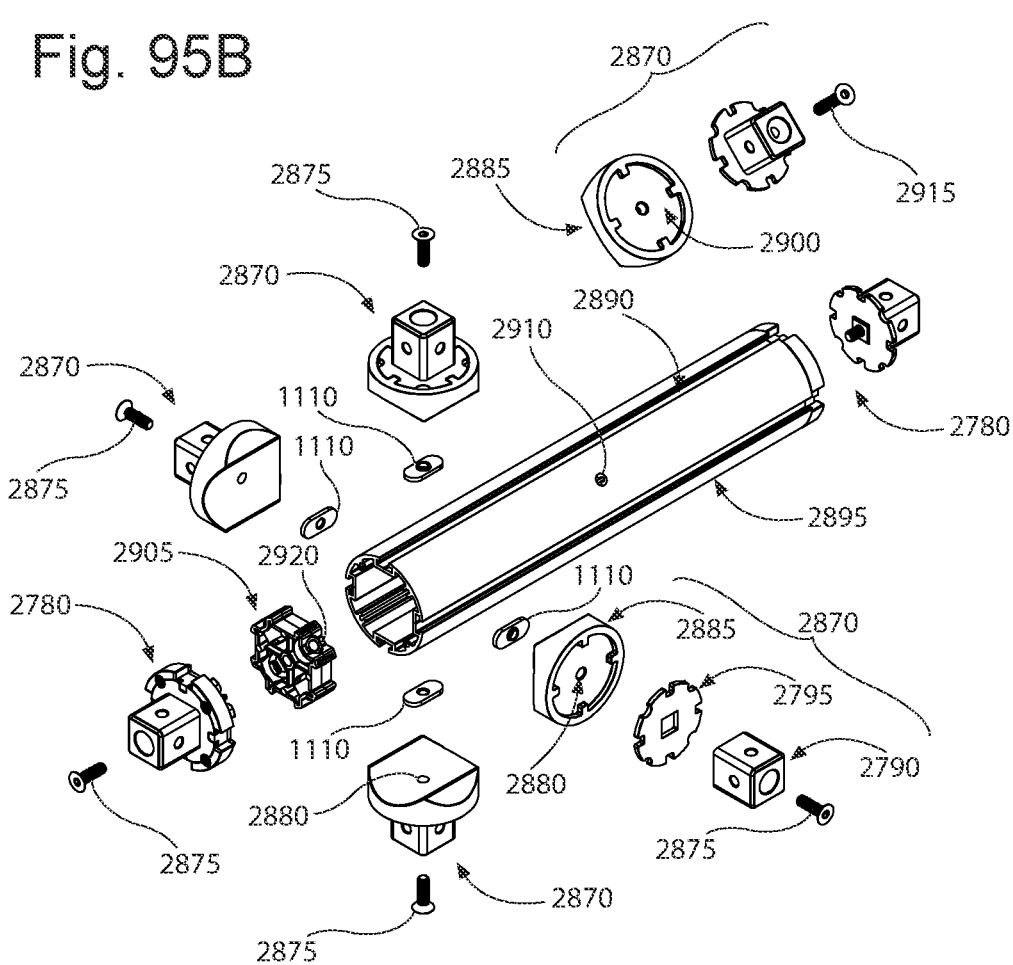

According to further embodiments, up to four of a male side mount 2865 configured for demountable engagement with a fixed square socket female end 2805 and comprising a concave base may be demountably engaged radially at any one alignment around the circumference of a cylindrical structural component retained there by a screw threadably engaged with a nut secured within the nut channels or with a threaded core component through side mount holes, as described in further detail below. A male side mount 2865 may also be demountably engaged with other components of the system comprising a round surface and threaded hole, such as a carriage body component 1230. As illustrated in FIG. 95, four of a straight square through-hole male side mount 2870 are demountably engaged with a straight square through-hole male end/male end module 2872 each by a screw 2875 through the straight square through-hole connector component 2790 and locator plate 2795 and a through-hole 2880 in the center of a concave base side mount component 2885 where threadably engaged with a nut 1110 in a nut channel 2890 along a four-channel cylindrical structural component 2895 of the module 2872. According to one embodiment, the connector component 2790 and locator plate 2795 are configured the same as in the assembly of the male end 2780 and wherein the outer profile of the locator plate 2795 fits securely within a cooperatively shaped recess 2900 in the concave base side mount component 2885. According to further embodiments, a straight square through-hole male side mount 2870 may comprise, instead of the assembly of the connector component 2790, locator plate 2795, and concave base side mount component 2885, a single component equally configured for demountable engagement with a fixed square socket female end 2805, demountably engaged by a screw to the side of a cylindrical structural component or another component comprising a round surface and threaded hole.

Any of a four-channel cylindrical structural component module 2765 may additionally comprise a threaded core component secured within its cylindrical structural component whereby up to four of a concave base male assembly 1001 or male side mount 2865, or one or more of another component comprising a concave base, may be demountably engaged by a screw or bolt. As illustrated in FIG. 95, the straight square male end/male end module 2872 may additionally comprise a threaded core component 2905 in alignment with four side mount holes 2910 in the cylindrical structural component 2895, where at one of the side mount holes 2910 a fifth male side mount 2870 is shown demountably engaged by a screw 2915 of which the threaded portion is passed through the cooperating side mount hole and threadably engaged with a threaded hole, nut, or insert 2920 in the threaded core component 2905. A threaded core component 2905 may be securely fixed in place within a cylindrical structural component by use of a polymeric adhesive or brazing or an interference fit provided by crush ribs and the like.

Figure 99A:
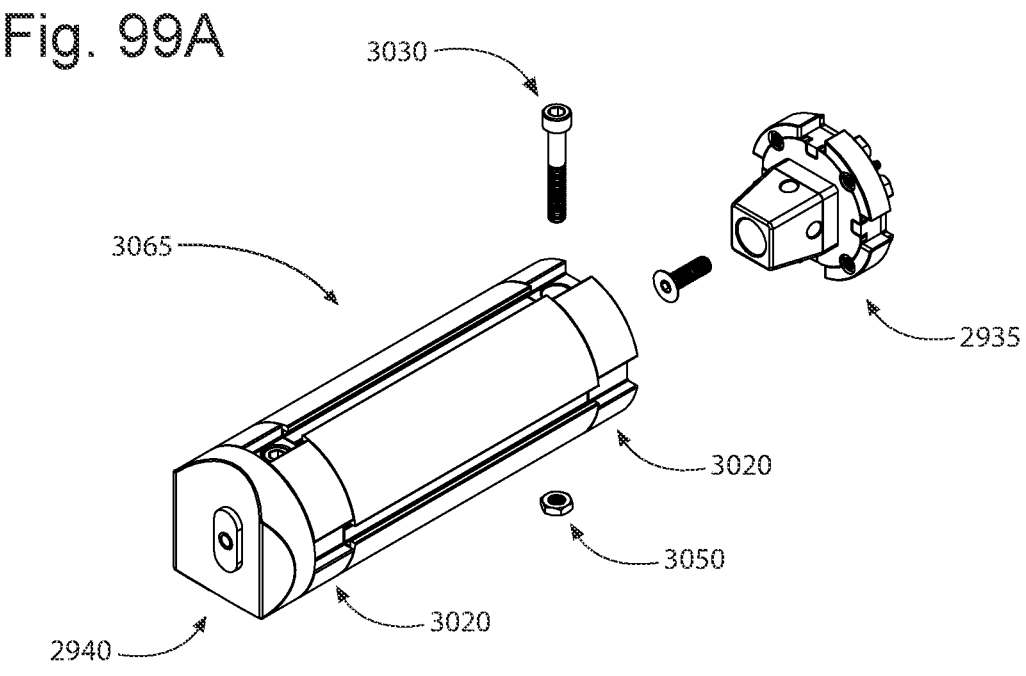
FIG. 99 shows a whole perspective view and a partially exploded perspective view FIGS. 99A and 99B, respectively, of a tapered square through-hole male end and a tapered square through-hole male side mount cooperating with the double fixed square socket module.
Figure 99B:
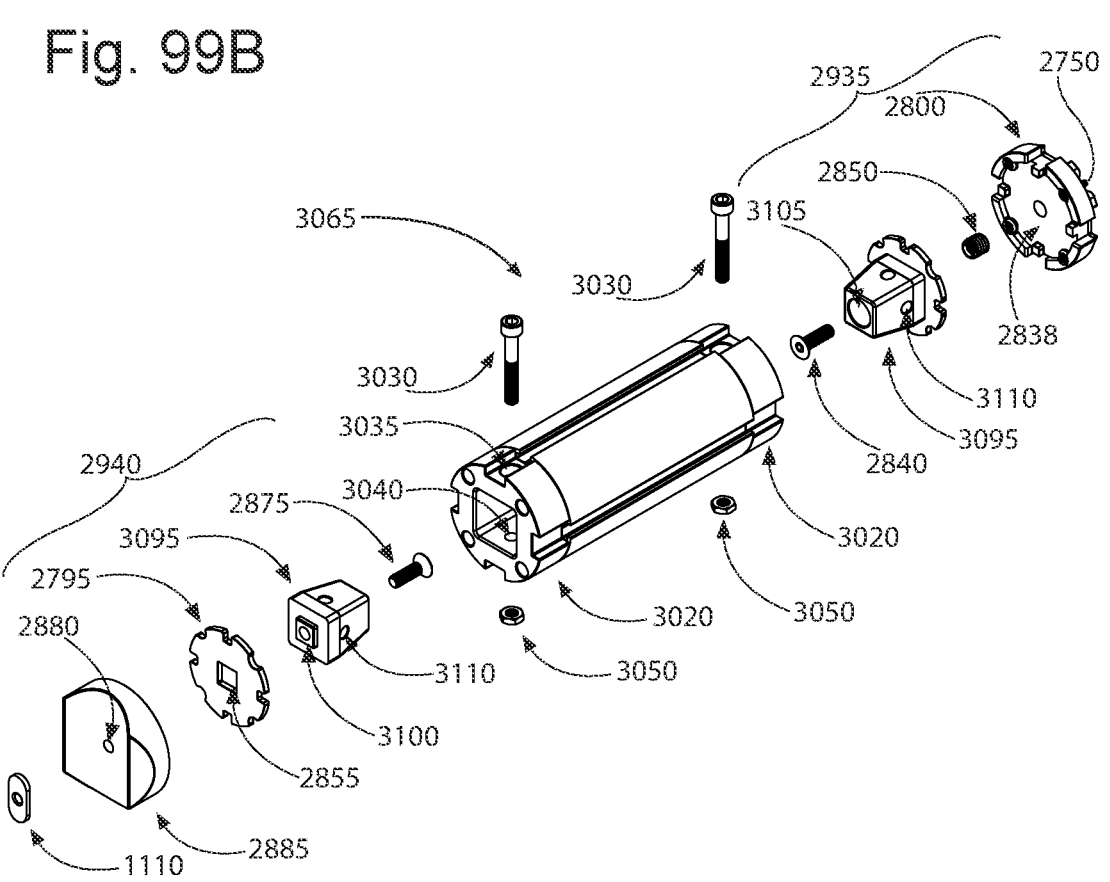
Figure 100A:
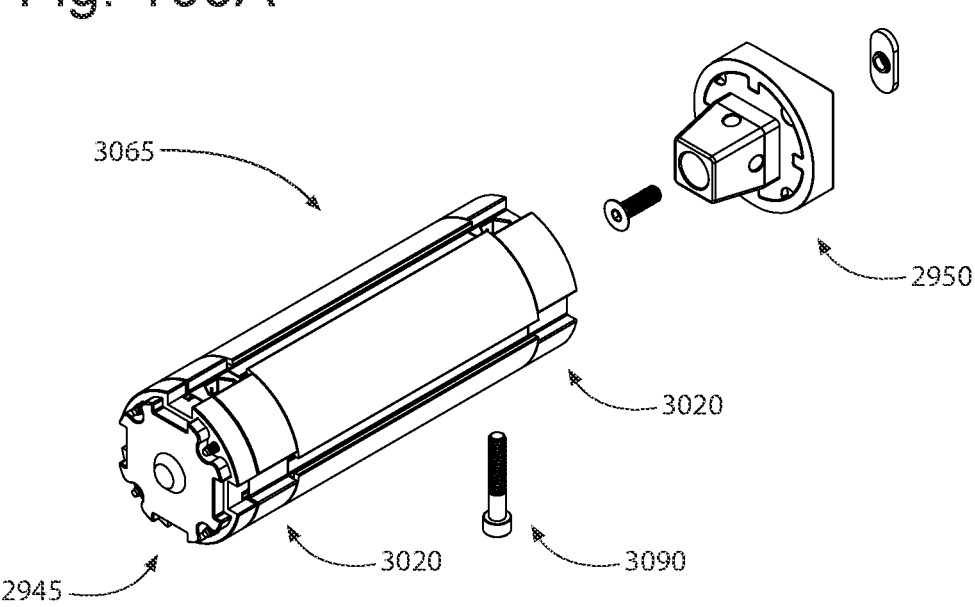
FIG. 100 shows a whole perspective view and a partially exploded perspective view FIGS. 100A and 100B, respectively, of a tapered square threaded-hole male end and a tapered square threaded-hole male side mount cooperating with the double fixed square socket module.
Figure 100B:
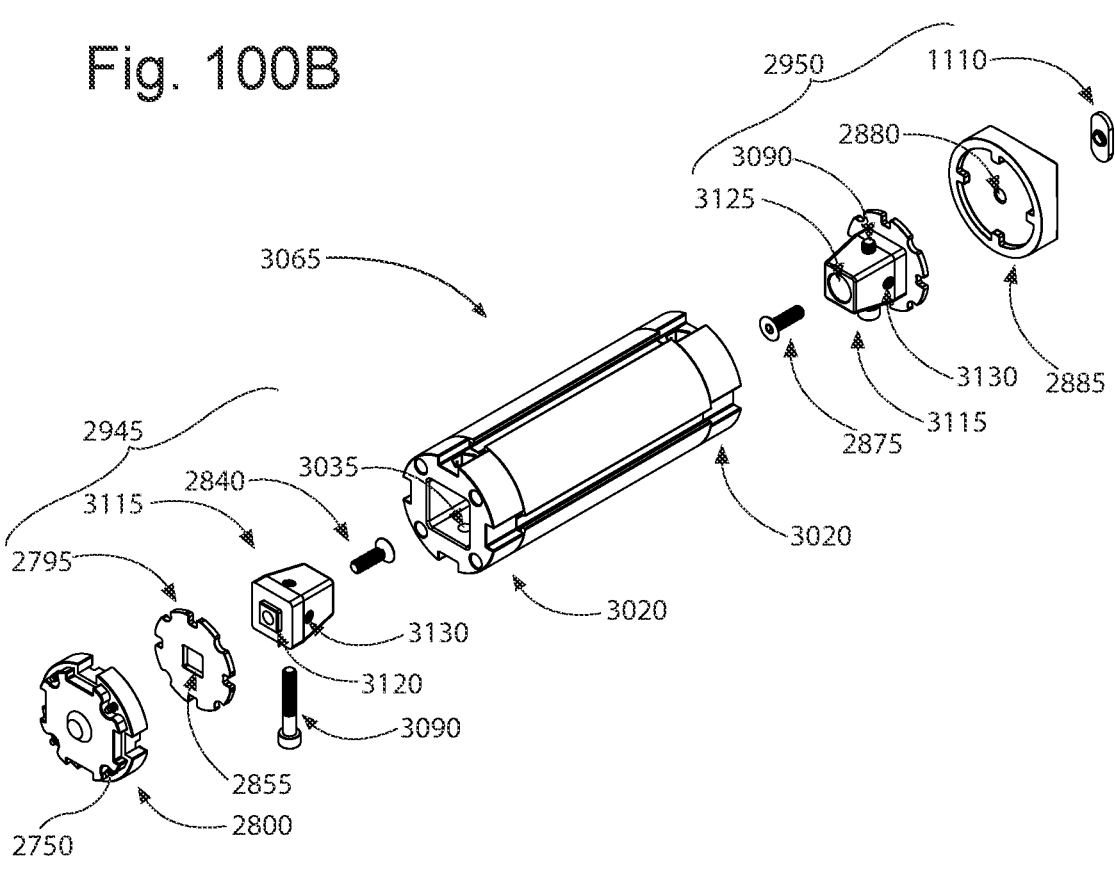
Figure 101A:
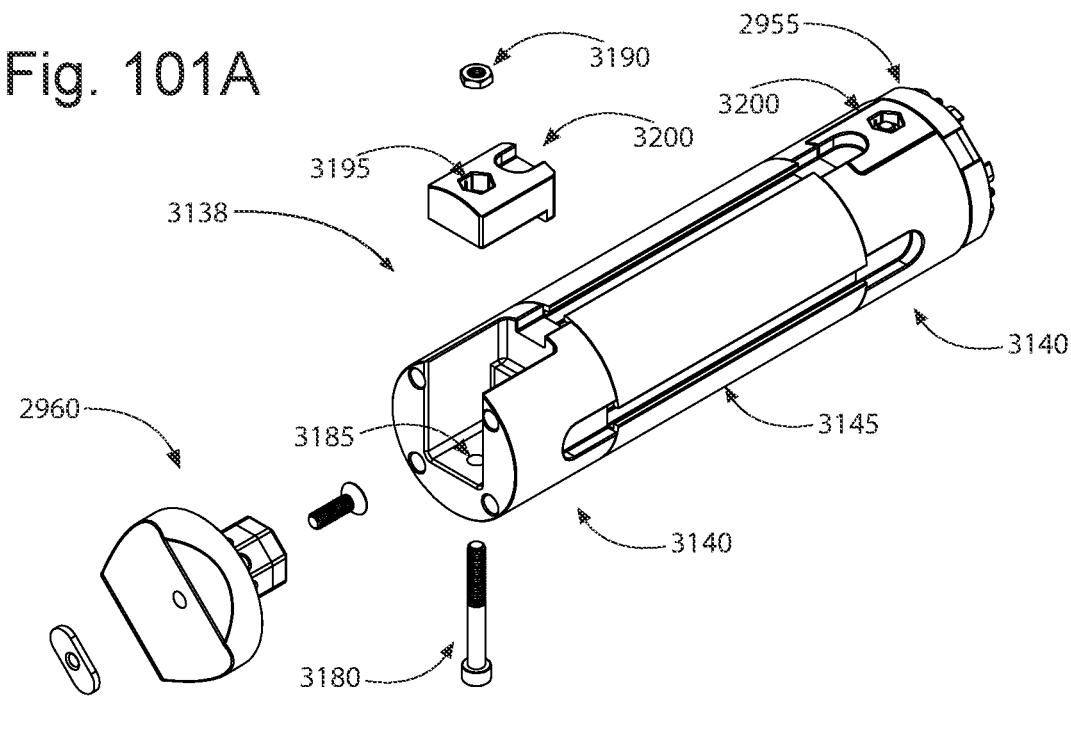
FIG. 101 shows a whole perspective view and a partially exploded perspective view FIGS. 101A and 101B, respectively, of an octagonal through-hole male end and an octagonal through-hole male side mount cooperating with a double square side-opening socket module comprising a square side-opening socket component at both ends of a cylindrical structural component.
Figure 101B:
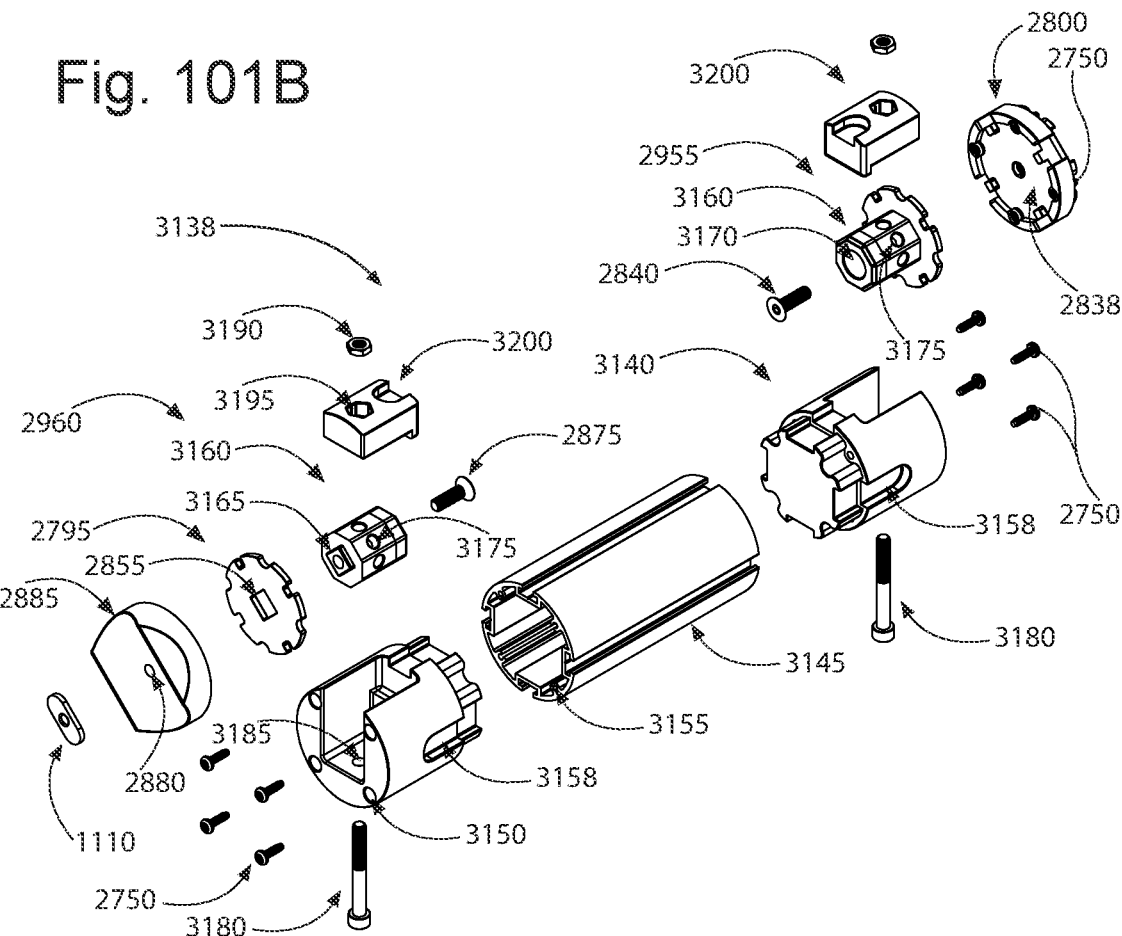
Figure 102A:
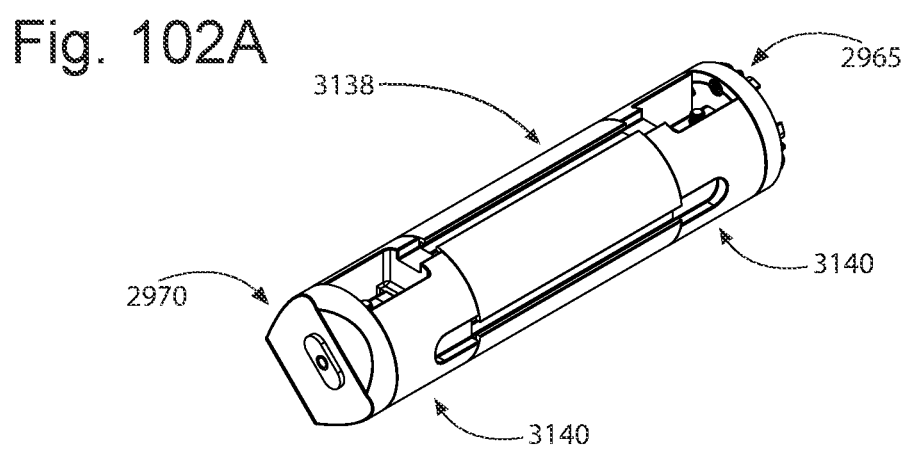
FIG. 102 shows a whole perspective view FIG. 102A and exploded perspective views FIGS. 102B and 102C of an octagonal threaded-hole male end and an octagonal threaded-hole male side mount cooperating with the double square side-opening socket module shown in FIG. 101.
Figure 102B:
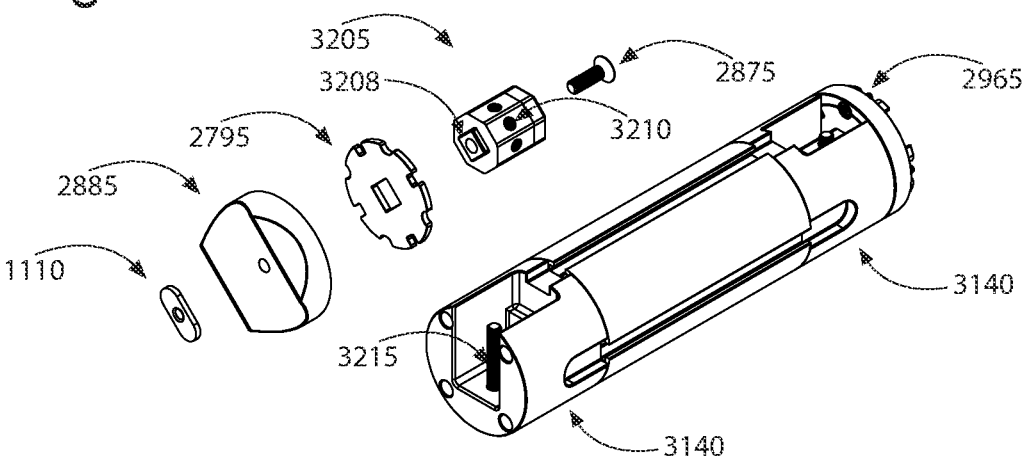
Figure 102C:
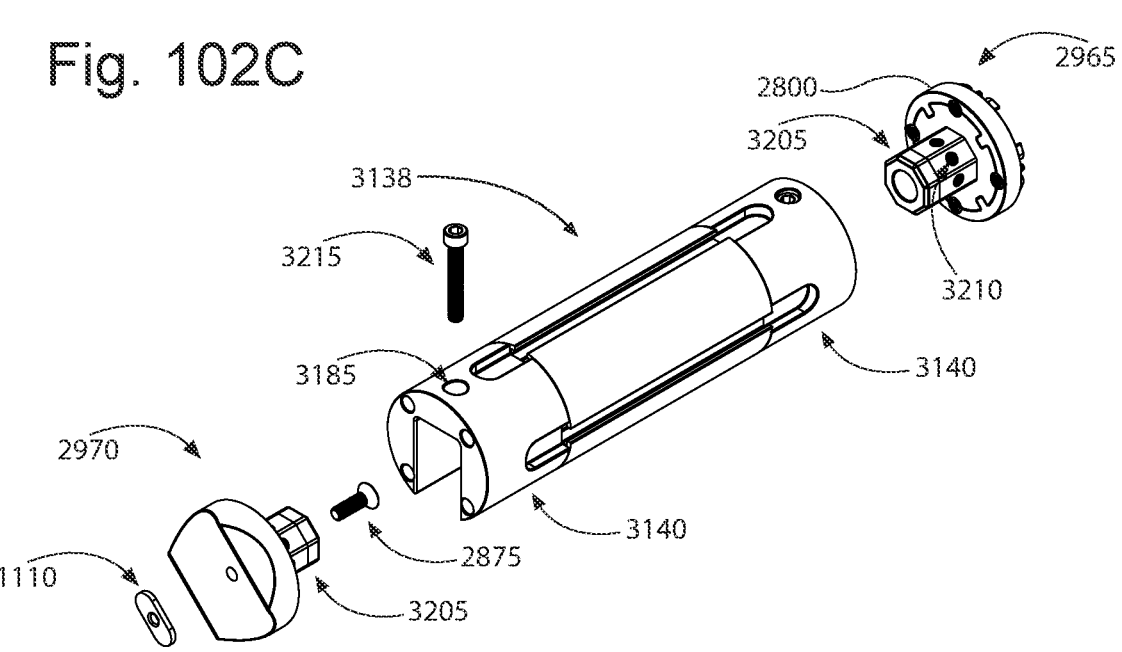
Figure 106A:
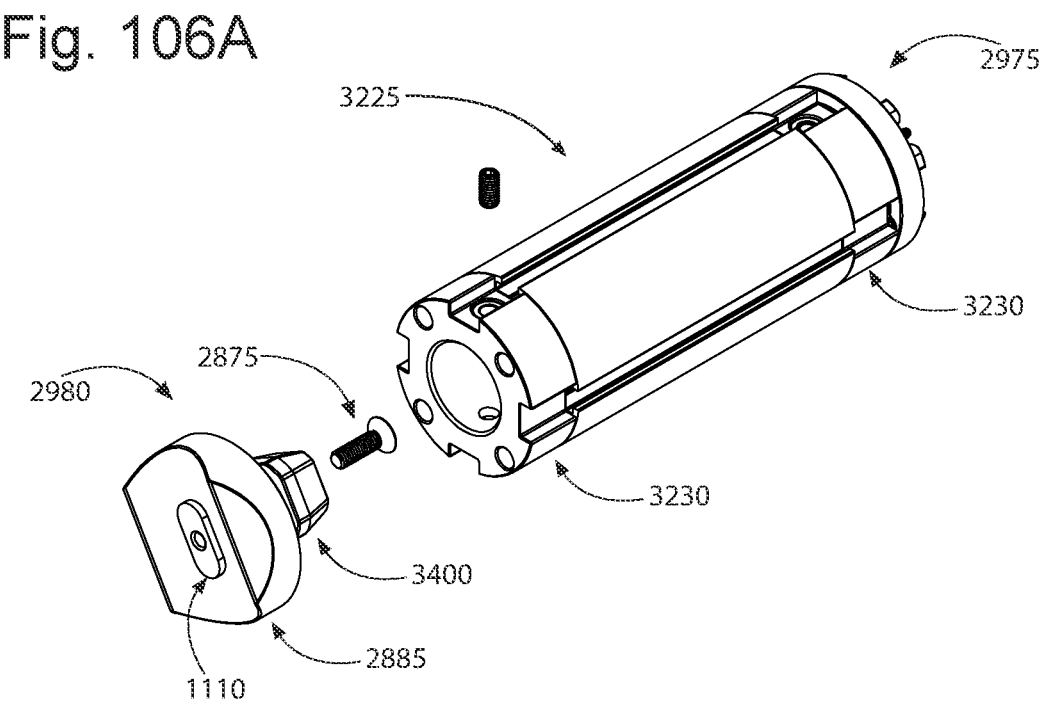
FIG. 106 shows a whole perspective view and a partially exploded perspective view FIGS. 106A and 106B, respectively, of a rounded square through-hole male end and a rounded square through-hole male side mount cooperating with the double rotatable cylindrical socket module shown in FIG. 103.
Figure 106B:
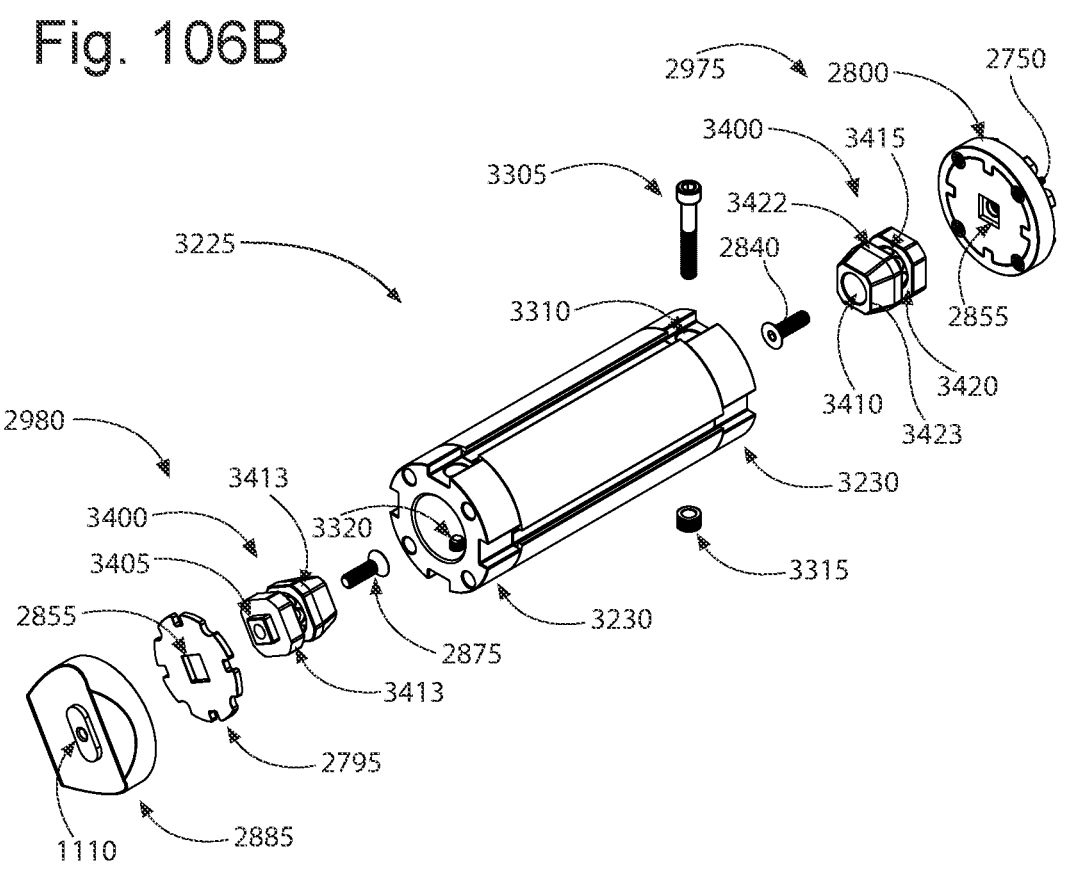
Figure 107A:
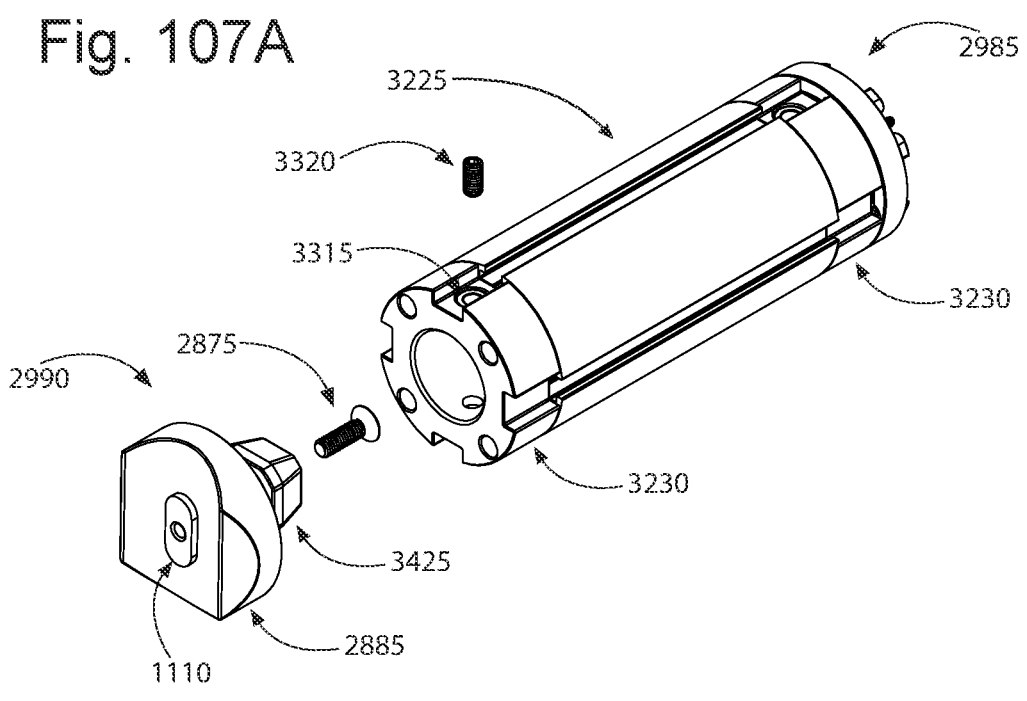
FIG. 107 shows a whole perspective view and a partially exploded perspective view FIGS. 107A and 107B, respectively, of a rounded square threaded-hole male end and a rounded square threaded-hole male side mount cooperating with the double rotatable cylindrical socket module.
Figure 107B:
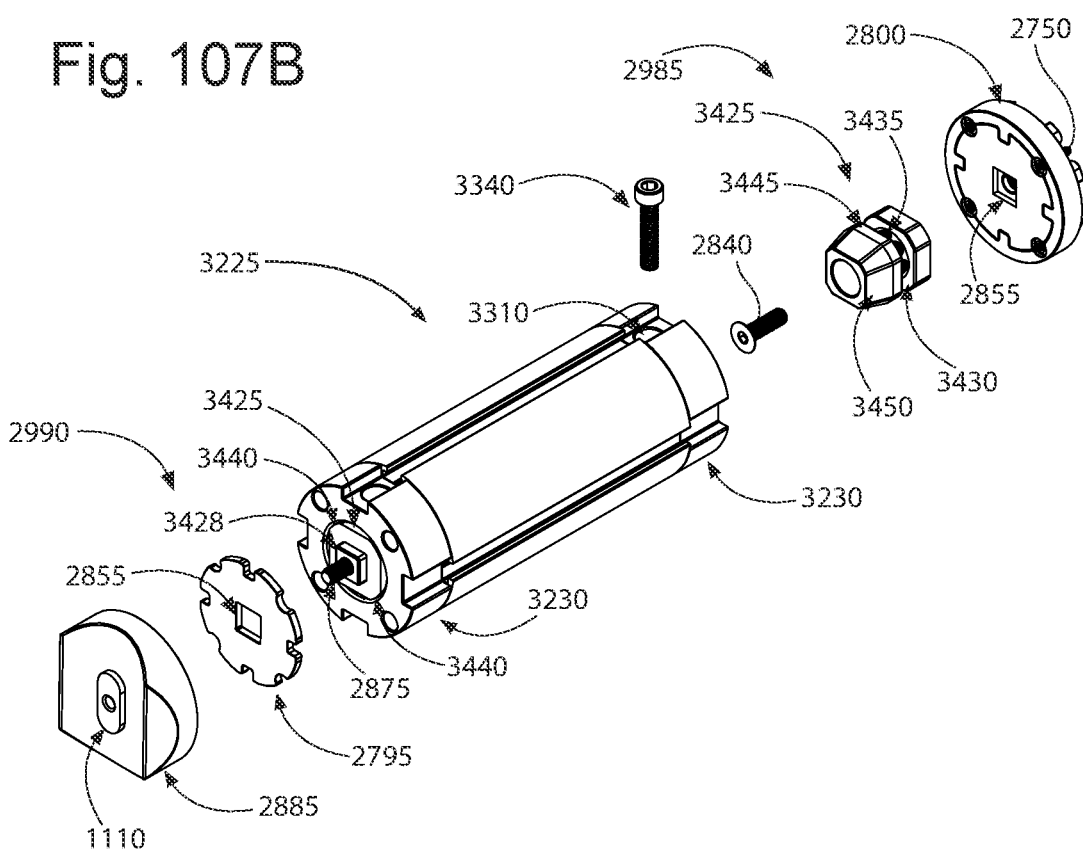
Figures 109A, 109B:
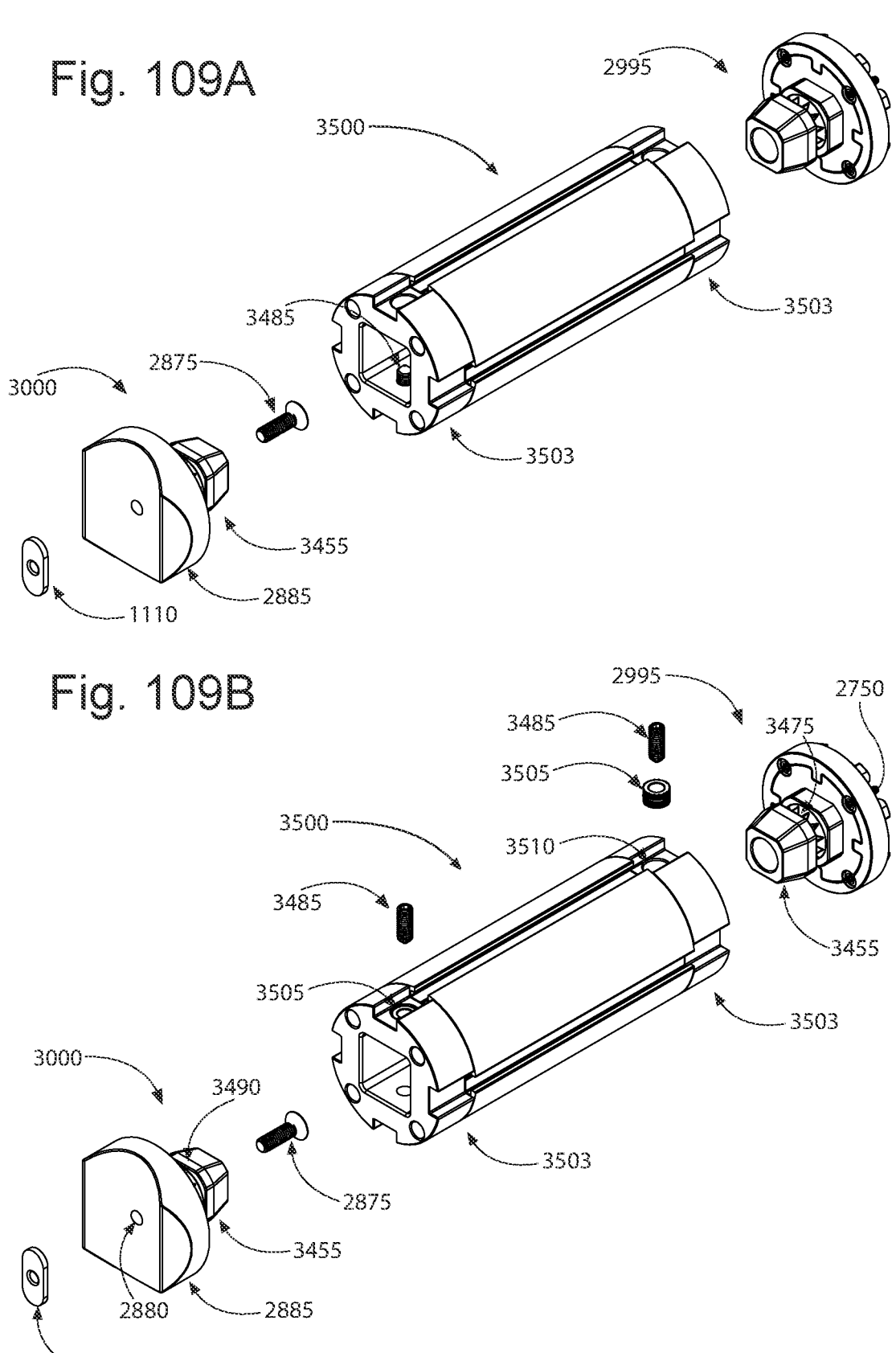
FIG. 109 shows a whole perspective view and a partially exploded perspective view FIGS. 109A and 109B, respectively, of a rounded square indexing male end and a rounded square indexing male side mount cooperating with a second example of a double fixed square socket module.

As noted above, both the straight square through-hole male ends 2780 and the straight square through-hole male side mounts 2870 are configured for demountable engagement with any four-channel cylindrical structural component module comprising a fixed square socket female end 2805. The fixed square socket female ends 2805 are additionally compatible with demountable engagement of a straight square threaded-hole male end 2925 and a straight square threaded-hole male side mount 2930 as illustrated in FIG. 98, as well as with a tapered square through-hole male end 2935 and a tapered square through-hole male side mount 2940 as illustrated in FIG. 99, as well as with a tapered square threaded-hole male end 2945 and a tapered square threaded-hole male side mount 2950 as illustrated in FIG. 100, as well as with an octagonal through-hole male end 2955 and an octagonal through-hole male side mount 2960 as illustrated in FIG. 101, as well as with an octagonal threaded-hole male end 2965 and an octagonal threaded-hole male side mount 2970 as illustrated in FIG. 102, as well as with a rounded square through-hole male end 2975 and a rounded square through-hole male side mount 2980 as illustrated in FIG. 106, as well as with a rounded square threaded-hole male end 2985 and a rounded square threaded-hole male side mount 2990 as illustrated in FIG. 107, as well as with a rounded square indexing male end 2995 and a rounded square indexing male side mount 3000 as illustrated in FIG. 109, and described in further detail below.

According to one embodiment, as illustrated in FIG. 96, a fixed square socket/straight square through-hole male end module 3005 may comprise a straight square through-hole male end 2780, as previously described, retained at one end of a cylindrical structural component 3010 by screws 2750 threadably engaged with screw channels 3015 in the component 3010 wherein at the opposite end is a fixed square socket female end 2805 comprising a fixed square socket component 3020 retained by screws 2750 of which the threaded portion are passed through holes 3025 in the socket component to be threadably engaged with the screw channels 3015. A square or octagonal male end or male side mount of another module or component may be demountably engaged within a fixed square socket component 3020 by a screw or bolt 3030 of which the threaded portion is passed through a screw-head hole 3035 in one side of the socket component, and through a set of two of the four through-holes 2815 in the male connector component 2790, and through a nut-insert through-hole 3040 in the opposite side of the socket component where secured within a nut-insert recess 3045 is a threaded nut 3050 or threaded insert with which the screw or bolt 3030 is threadably engaged and therefore the male end or male side mount is securely retained within the square receptacle of the socket component 3020. A fixed square socket component 3020 may additionally comprise channel openings 3055 around its circumference to allow for passage of nuts 1110 into the nut channels of the four-channel cylindrical structural component with which it is combined, or according to a further embodiment without channel openings where nuts may be pre-installed into the nut channels, for demountable engagement of another component.

Figures 97A, 97B:
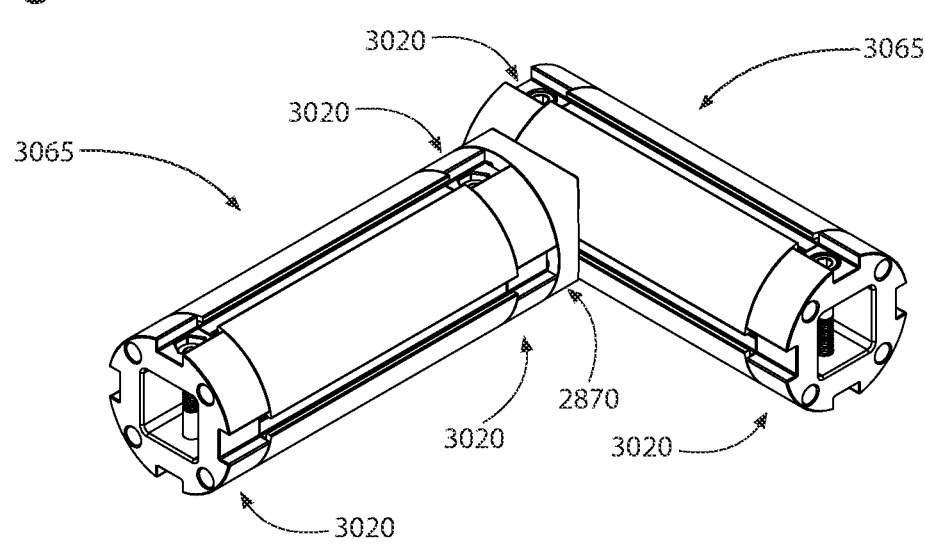
FIG. 97 shows a whole perspective view and a partially exploded perspective view FIGS. 97A and 97B, respectively, of two double fixed square socket modules demountably engaged by a straight square through-hole male side mount.

The male end 2780 of the socket/male end module 3005 is illustrated in FIGS. 96B and 96C as demountably engaged with the fixed square socket component 3020 of a fixed square socket/end cap module 3060. One or both modules 3005 and 3060 may additionally comprise a threaded core component 2905 within its cylindrical structural component at side mount holes 3062 whereby another module or component may be demountably engaged along with at the nut channels. According to a further embodiment as illustrated in FIG. 97 are two double fixed square socket modules 3065 wherein one module is demountably engaged with the other by a straight square through-hole male side mount 2870 secured by the screw 2875 threadably engaged with the nut 1110 in the cooperating nut channel 3068. According to further embodiments, a perpendicular demountable engagement of any two four-channel cylindrical structural component modules 2765, such as shown in FIG. 97 the double fixed square socket modules 3065, may be further reinforced by corner braces 1255/2475 as previously described. Any length of double fixed square socket module may additionally comprise a threaded core component 2905 within its cylindrical structural component at side mount holes whereby another module or component may be demountably engaged along with at the nut channels. It should be noted than any four-channel cylindrical structural component and any four-channel cylindrical structural component module, as described, may include a threaded core component 2905 and side mount holes provided for demountable engagement of another component by a screw or bolt.

Figure 98A:
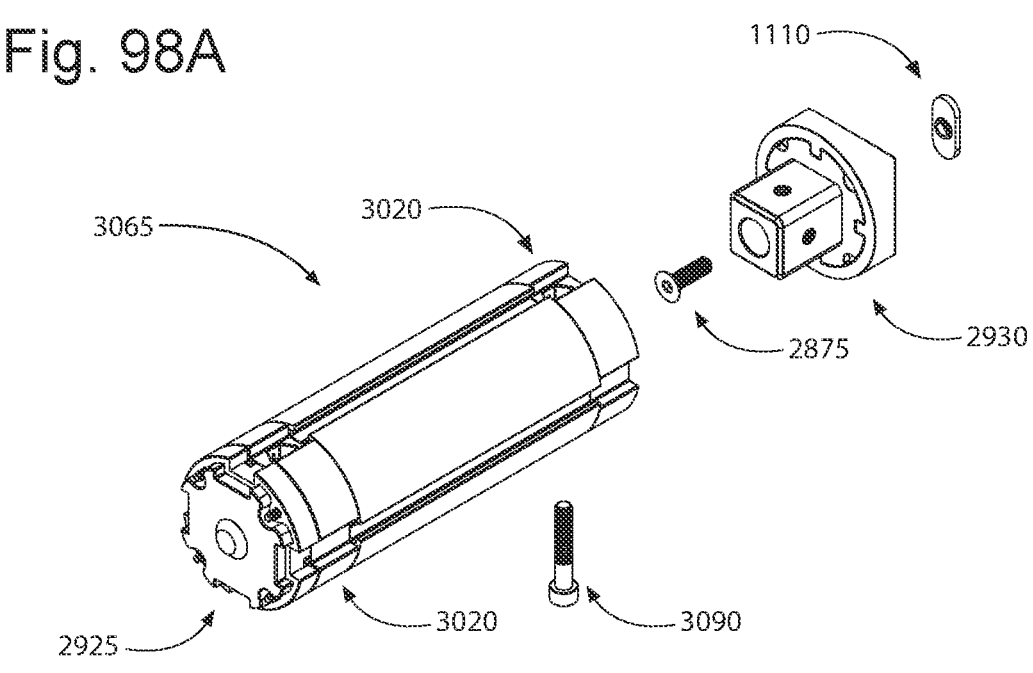
FIG. 98 shows a whole perspective view and a partially exploded perspective view FIGS. 98A and 98B, respectively, of a straight square threaded-hole male end and a straight square threaded-hole male side mount cooperating with the double fixed square socket module shown in FIG. 97.
Figure 98B:
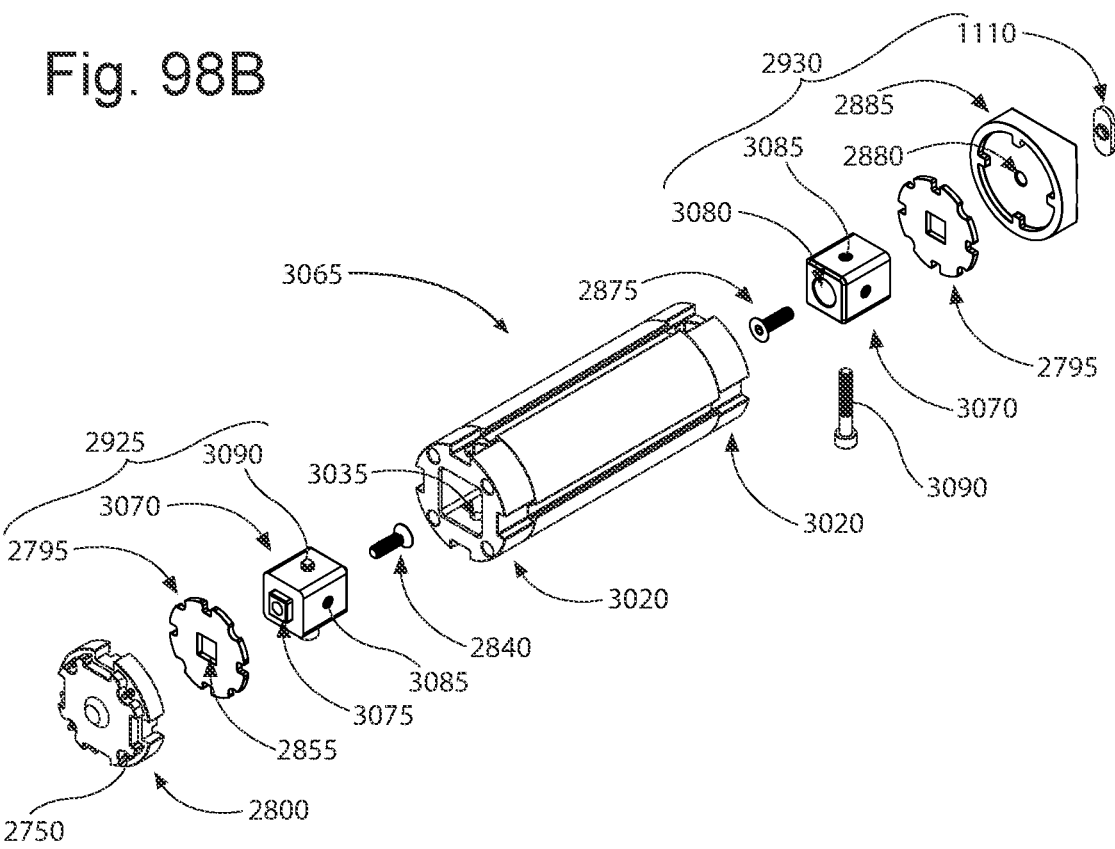

As previously noted, a four-channel cylindrical structural component module comprising one or two fixed square socket female ends 2805 are additionally compatible with demountable engagement of a straight square threaded-hole male end 2925 and a straight square threaded-hole male side mount 2930, as illustrated in FIG. 98. According to some embodiments, a straight square threaded-hole male end 2925 may comprise the locator plate 2795 which fits within the recess 2838 in the male mount end cap component 2800, and wherein a straight square threaded-hole connector component 3070 may be demountably engaged against the male mount end cap component 2800 and locator plate 2795 wherein a square boss 3075 or octagonal boss at the end of the connector component 3070 is securely retained within the locator slot 2855 and wherein a screw 2840, of which the threaded portion is passed through a hole 3080 in the threaded-hole connector component 3070, is threadably engaged with the threaded hole or insert 2850 in the center of the male mount end cap component 2800 which is secured by screws 2750 to a cylindrical structural component of another module, as previously shown. The connector component 3070 further comprises four threaded holes 3085 in the sides of the component wherein a screw 3090 of which the threaded portion is passed through the screw-head hole 3035 in a cooperating fixed square socket component 3020 and is threadably engaged with either set of two of the four of the threaded holes 3085 and whereby the straight square threaded-hole male end 2925 is demountably engaged with the female end. According to further embodiments, a straight square threaded-hole male end 2925 may comprise, instead of the assembly of the connector component 3070, locator plate 2795, and male mount end cap component 2800, a single component suitably configured for demountable engagement with a fixed square socket female end 2805, retained at the end of a cylindrical structural component by screws 2750.

A modular assembly may additionally comprise one or more of a male side mount 2865 comprising the straight square threaded-hole connector component 3070. A straight square threaded-hole male side mount 2930 is illustrated in FIG. 98 wherein a screw 2875 through hole 3080 in the straight square threaded-hole connector component 3070 is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. As in the straight square threaded-hole male end 2925, a screw 3090 inserted through a cooperating socket component 3020 may be threadably engaged with either set of two of the four threaded holes 3085 of the connector component 3070 to secure the straight square threaded-hole male side mount 2930 within a cooperating female end. According to further embodiments, a straight square threaded-hole male side mount 2930 may comprise, instead of the assembly of the connector component 3070, locator plate 2795, and concave base side mount component 2885, a single component equally configured for demountable engagement with a fixed square socket female end 2805, where demountably engaged by a screw to the side of a cylindrical structural component or another component comprising a round surface and threaded hole.

As previously noted, a four-channel cylindrical structural component module comprising one or two fixed square socket female ends 2805 is additionally compatible for demountable engagement of a tapered square through-hole male end 2935 and a tapered square through-hole male side mount 2940, as illustrated in FIG. 99. According to some embodiments, a tapered square through-hole male end 2935 may comprise the locator plate 2795 which fits within the recess 2838 in the male mount end cap component 2800, and wherein a tapered square through-hole connector component 3095 may be demountably engaged against the male mount end cap component 2800 and locator plate 2795 wherein a square boss 3100 or octagonal boss at the end of the connector component 3095 is securely retained within the locator slot 2855 and where a screw 2840, of which the threaded portion is passed through a hole 3105 in the connector component 3095, is threadably engaged with the threaded hole or insert 2850 in the center of the male mount end cap component 2800 which is secured by screws 2750 to a cylindrical structural component of another module, as previously shown. The connector component 3095 further comprises four through-holes 3110 in the sides of the component wherein a screw or bolt 3030 of which the threaded portion is passed through a screw-head hole 3035 in one side of the cooperating socket component 3020, and through two of four of the through-holes 3110 in the connector component 3095, and through a nut-insert through-hole 3040 in the opposite side of the socket component where secured within a nut-insert recess is a threaded nut 3050 or threaded insert with which the screw or bolt 3030 is threadably engaged and therefore the male end 2935 demountably engaged. According to further embodiments, a tapered square through-hole male end 2935 may comprise, instead of the assembly of the connector component 3095, locator plate 2795, and male mount end cap component 2800, a single component equally configured for demountable engagement with a fixed square socket female end 2805, where retained at the end of a cylindrical structural component by screws 2750.

A modular assembly may additionally comprise one or more of a male side mount 2865 comprising the tapered square through-hole connector component 3095. A tapered square through-hole male side mount 2940 is illustrated in FIG. 99 wherein a screw 2875 through hole 3105 in the tapered square through-hole connector component 3095 is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. As in the tapered square through-hole male end 2935, a screw or bolt 3030 inserted through the cooperating socket component 3020 and two of the four through-holes 3110 and threadably engaged with the socket's threaded nut 3050 or threaded insert demountably engages the male side mount 2940 within the socket component. According to further embodiments, a tapered square through-hole male side mount 2940 may comprise, instead of the assembly of the connector component 3095, locator plate 2795, and concave base side mount component 2885, a single component equally configured for demountable engagement with a fixed square socket female end 2805, where demountably engaged by a screw to the side of a cylindrical structural component or another component comprising a round surface and threaded hole.

As previously noted, a four-channel cylindrical structural component module comprising one or two fixed square socket female ends 2805 are additionally compatible with demountable engagement of a tapered square threaded-hole male end 2945 and a tapered square threaded-hole male side mount 2950 as illustrated in FIG. 100. According to some embodiments, a tapered square threaded-hole male end 2945 may comprise the locator plate 2795 which fits within the recess 2838 in the male mount end cap component 2800, and wherein a tapered square threaded-hole connector component 3115 may be demountably engaged against the male mount end cap component 2800 and locator plate 2795 wherein a square boss 3120 or octagonal boss at the end of the connector component 3115 is securely retained within the locator slot 2855 and where a screw 2840, of which the threaded portion is passed through a hole 3125 in the threaded-hole connector component 3115, is threadably engaged with the threaded hole or insert 2850 in the center of the male mount end cap component 2800 which is secured by screws 2750 to a cylindrical structural component of another module, as previously shown. The connector component 3115 further comprises four threaded holes 3130 in the sides of the component wherein a screw 3090 of which the threaded portion is passed through the screw-head hole 3035 in a cooperating fixed square socket component 3020 and is threadably engaged with either set of two of the four of the threaded holes 3130 and whereby the tapered square threaded-hole male end 2945 is demountably engaged with the female end 2805. According to further embodiments, a tapered square threaded-hole male end 2945 may comprise, instead of the assembly of the connector component 3115, locator plate 2795, and male mount end cap component 2800, a single component equally configured for demountable engagement with a fixed square socket female end 2805, where retained at the end of a cylindrical structural component by screws 2750.

A modular assembly may additionally comprise one or more of a male side mount 2865 comprising the tapered square threaded-hole connector component 3115. A tapered square threaded-hole male side mount 2950 is illustrated in FIG. 100 wherein a screw 2875 inserted through hole 3125 in the tapered square threaded-hole connector component 3115 is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. As in the male end 2945, a screw 3090 inserted through a cooperating socket component 3020 may be threadably engaged with either set of two of the four threaded holes 3130 of the connector component 3115 to secure the tapered square threaded-hole male side mount 2950 within a cooperating female end 2805. According to further embodiments, a tapered square threaded-hole male side mount 2950 may comprise, instead of the assembly of the connector component 3115, locator plate 2795, and concave base side mount component 2885, a single component equally configured for demountable engagement with a fixed square socket female end 2805, where demountably engaged by a screw to the side of a cylindrical structural component or another component comprising a round surface and threaded hole.

The tapered sides of the tapered square through-hole connector component 3095 and the tapered square threaded-hole connector component 3115 are configured for usage of the male ends 2935, 2945 and the male side mounts 2940, 2950 where easy engagement of the components is desired, whereby the tapered sides allow for a less precise alignment of the connector components 3095, 3115 to be received into the opening of the fixed square socket female ends 2805. One such example is demonstrated in a stackable tray assembly 3135 as illustrated in FIGS. 128 and 129 and described in further detail below.

According to embodiments of a modular assembly wherein a sideway engagement of one or two male ends with one or two female ends of a four-channel cylindrical structural component module is preferred, a four-channel cylindrical structural component may have at each end a four-channel square side-opening socket component wherein various of the male ends 2780, 2925, 2935, 2945, 2955, 2965, 2975, 2985 and male side mounts 2870, 2930, 2940, 2950, 2960, 2970, 2980, 2990, as previously described and described in further detail below, may be demountably engaged. As illustrated in FIG. 101, an octagonal through-hole male end 2955 and an octagonal through-hole male side mount 2960 are shown cooperating with the two ends of a double square side-opening socket module 3138 comprising a square side-opening socket component 3140 secured at both ends of a cylindrical structural component 3145 by screws 2750 of which the threaded portions are passed through holes 3150 in the socket component 3140 and threadably engaged with the screw channels 3155 in the cylindrical structural component. The socket components 3140 may additionally comprise channel openings 3158 around its circumference to allow for passage of nuts 1110 into the nut channels of the cylindrical structural component, or according to a further embodiment without channel openings where nuts may be pre-installed into the nut channels, for demountable engagement of another component.

An octagonal through-hole male end 2955 may comprise the locator plate 2795 which fits within the recess 2838 in the male mount end cap component 2800, and wherein an octagonal through-hole connector component 3160 may be demountably engaged against the male mount end cap component 2800 and locator plate 2795 wherein a square boss 3165 or octagonal boss at the end of the connector component 3160 is securely retained within the locator slot 2855 and where a screw 2840, of which the threaded portion is passed through a hole 3170 in the connector component 3160, is threadably engaged with the threaded hole or insert in the center of the male mount end cap component 2800 which is secured by screws 2750 to a cylindrical structural component of another module, as previously shown. According to further embodiments, an octagonal through-hole male end 2955 may comprise, instead of the assembly of the connector component 3160, locator plate 2795, and male mount end cap component 2800, a single component equally configured for demountable engagement with a fixed square socket female end 2805 or a square side-opening socket component 3140.

An octagonal through-hole male side mount 2960 may comprise the octagonal through-hole connector component 3160 wherein a screw 2875 inserted through hole 3170 in the connector component 3160 is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. According to further embodiments, an octagonal through-hole male side mount 2960 may comprise, instead of the assembly of the connector component 3160, locator plate 2795, and concave base side mount component 2885, a single component equally configured for demountable engagement with a fixed square socket female end 2805 or a square side-opening socket component 3140.

Where in use allowing for eight angles of interconnection between two demountably engaged modules, the octagonal through-hole connector component 3160 further may comprise eight through-holes 3175 whereby the male end 2955 or male side mount 2960 may be retained within a fixed square socket female end 2805 as previously described in reference to the square connector components 2790, 3070, or within the four-channel square side-opening socket component 3140 by a screw or bolt 3180. The threaded portion of the screw or bolt 3180 is passed through a screw-head hole 3185 into one side of the socket component 3140, and through two of eight of the through-holes 3175 in the connector component 3160, and threadably engaged with a threaded nut or insert 3190 retained within a nut-insert recess 3195 in a square side-opening socket cap 3200, and the male end 2955 or male side mount 2960 thereby retained. By the same means, male ends 2780, 2935, 2975 and male side mounts 2870, 2940, 2980 may be demountably engaged by a screw or bolt inserted through the through-holes in their respective connector components.

As previously noted, a four-channel cylindrical structural component module comprising one or two fixed square socket female ends 2805 or one or two square side-opening socket components 3140 are additionally compatible with demountable engagement of an octagonal threaded-hole male end 2965 and an octagonal threaded-hole male side mount 2970 which are configured the same as the through-hole male end 2955 and the through-hole male side mount 2960 but wherein the through-hole connector component 3160 is replaced by an octagonal threaded-hole connector component 3205 comprising once again, a square boss 3208 or octagonal boss for fitted engagement with a locator plate 2795 but comprising eight threaded holes 3210. As illustrated in FIG. 102, a male end 2965 and male side mount 2970 are shown in cooperation with the double square side-opening socket module 3138 as in FIG. 101 except not including the square side-opening socket caps 3200. The threaded portion of a screw or bolt 3215 is passed through the screw-head hole 3185 in the side of the socket component 3140 and threadably engaged with a set of two of the eight threaded holes 3210 thereby retaining the male end 2965 or the male side mount 2970 without the use of the square side-opening socket cap 3200. By the same means, the threaded-hole male ends 2925, 2945, 2985 and the threaded-hole male side mounts 2930, 2950, 2990 may be demountably engaged by a screw or bolt 3215 threadably engaged with the threaded-holes in their respective connector components.

According to further embodiments, an octagonal threaded-hole male end 2965 may comprise, instead of the assembly of the connector component 3205, locator plate 2795, and male mount end cap component 2800, a single component equally configured for demountable engagement with a fixed square socket female end 2805 or a square side-opening socket component 3140. According to further embodiments, an octagonal threaded-hole male side mount 2970 may comprise, instead of the assembly of the connector component 3205, locator plate 2795, and concave base side mount component 2885, a single component equally configured for demountable engagement with a fixed square socket female end 2805 or a square side-opening socket component 3140.

Figure 103A:
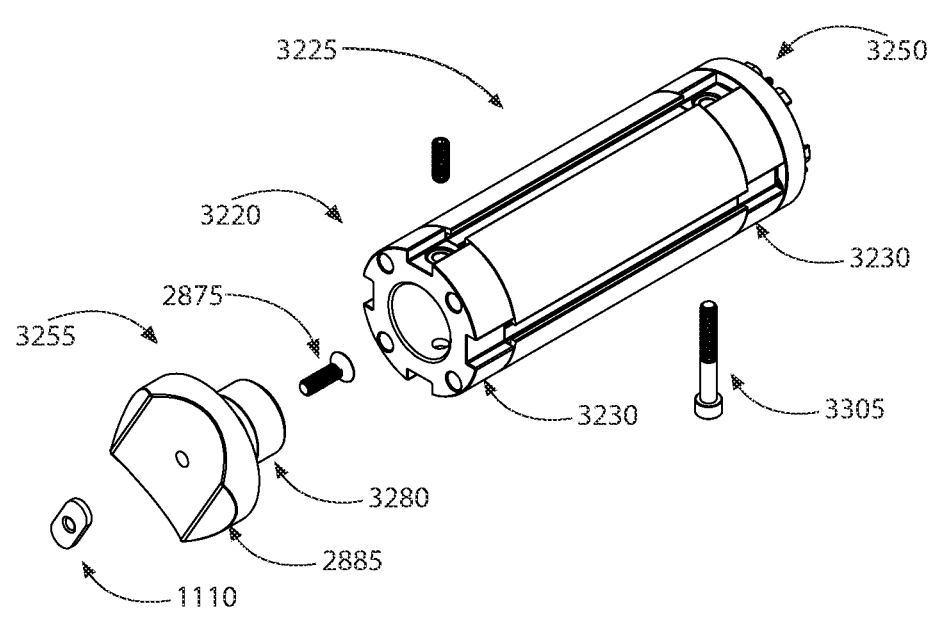
FIG. 103 shows a whole perspective view and a partially exploded perspective view FIGS. 103A and 103B, respectively, of a double rotatable cylindrical socket module comprising a rotatable cylindrical socket component at the ends cooperating with a cylindrical through-hole male end and a cylindrical through-hole male side mount.
Figure 103B:
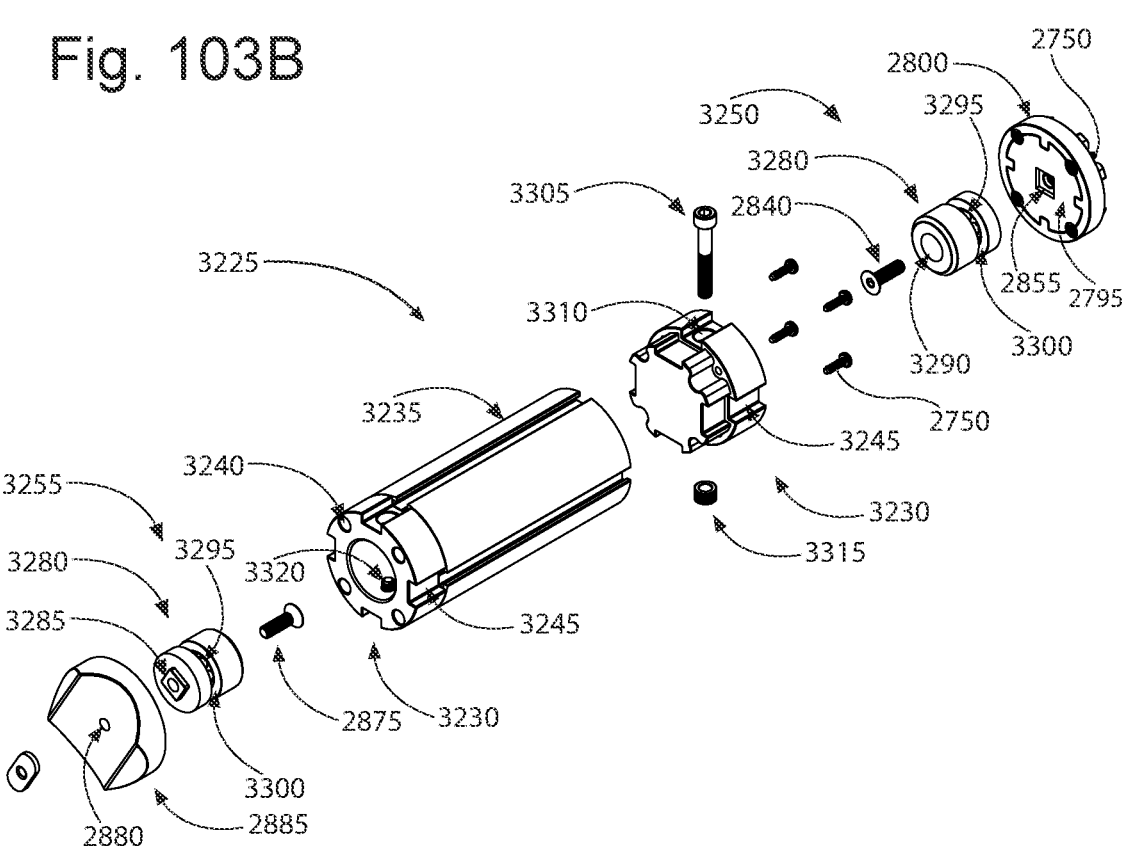

According to further embodiments, a modular assembly may additionally comprise one or more of a four-channel cylindrical structural component module 2765 comprising one or two of a rotatable female end 3220 wherein a generally cylindrical receptacle allows for one of various cylindrical or rounded male ends to be rotationally or fixedly demountably engaged with one or both ends of the module. As illustrated in FIG. 103, a double rotatable cylindrical socket module 3225 is shown comprising a rotatable cylindrical socket component 3230 secured at each end of a four-channel cylindrical structural component 3235 by screws 2750 of which the threaded portion are passed through holes 3240 in the socket component and threadably engaged with the screw channels in the cylindrical structural component. A rotatable cylindrical socket component 3230 may further comprise channel openings 3245 around its circumference to allow for passage of nuts 1110 into the nut channels of the cylindrical structural component, or according to a further embodiment without channel openings where nuts may be pre-installed into the nut channels, for demountable engagement of another component.

Figure 104A:
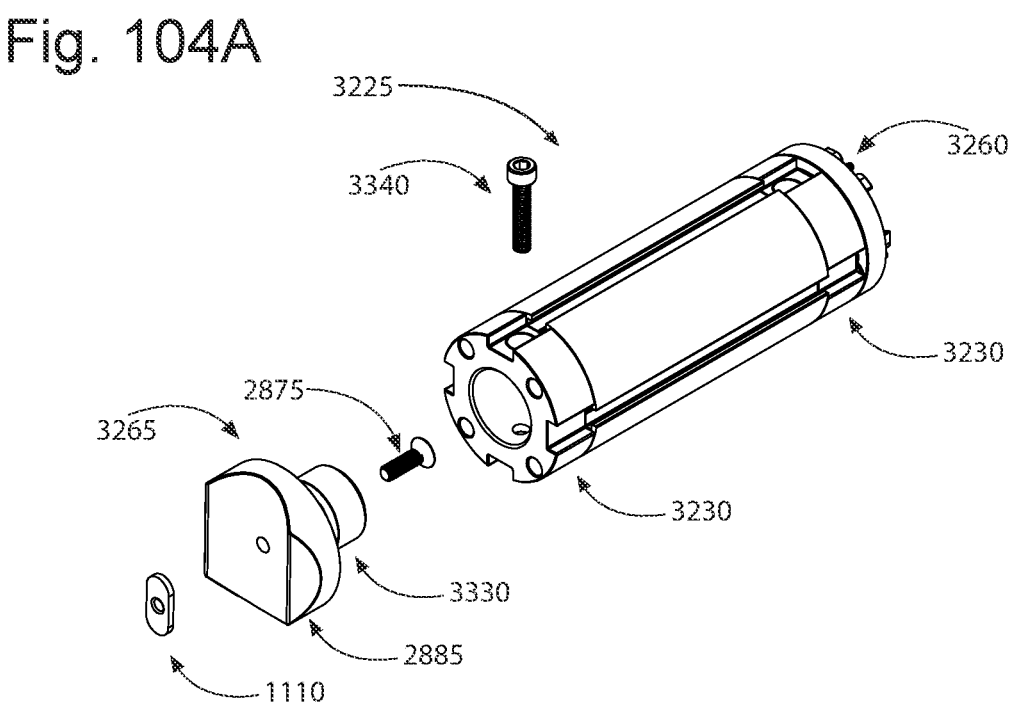
FIG. 104 shows a whole perspective view and a partially exploded perspective view FIGS. 104A and 104B, respectively, of a cylindrical threaded-hole male end and a cylindrical threaded-hole male side mount cooperating with the double rotatable cylindrical socket module shown in FIG. 103.
Figure 104B:
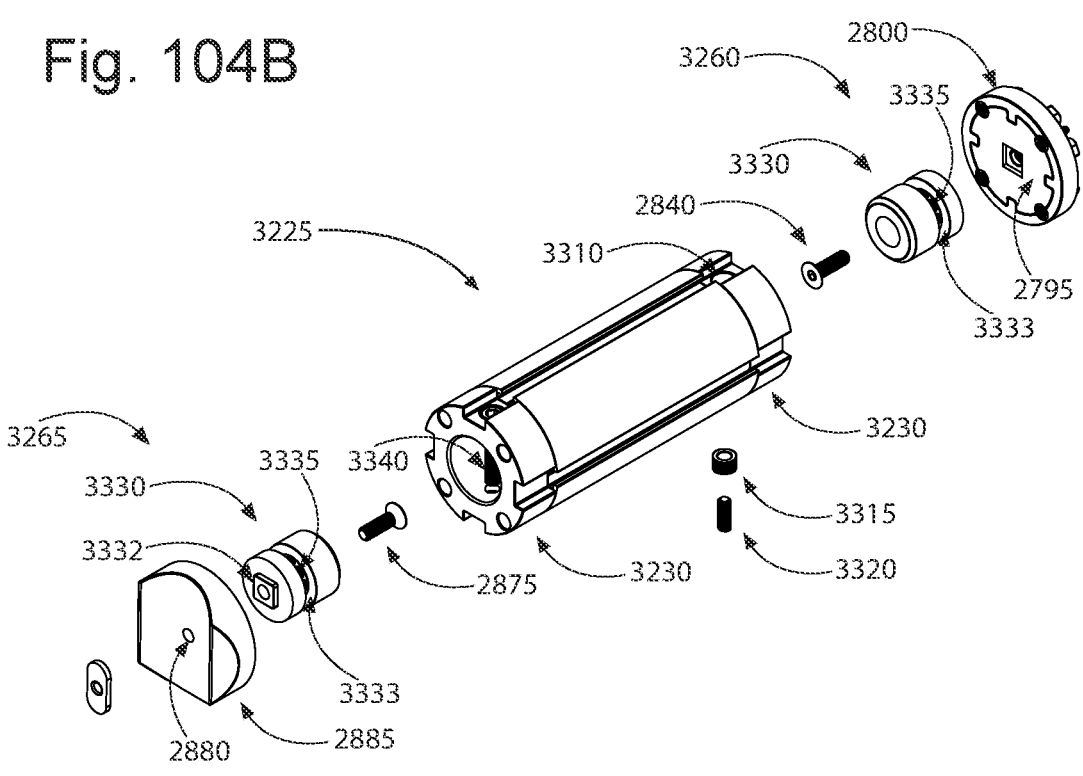
Figures 108A, 108B:
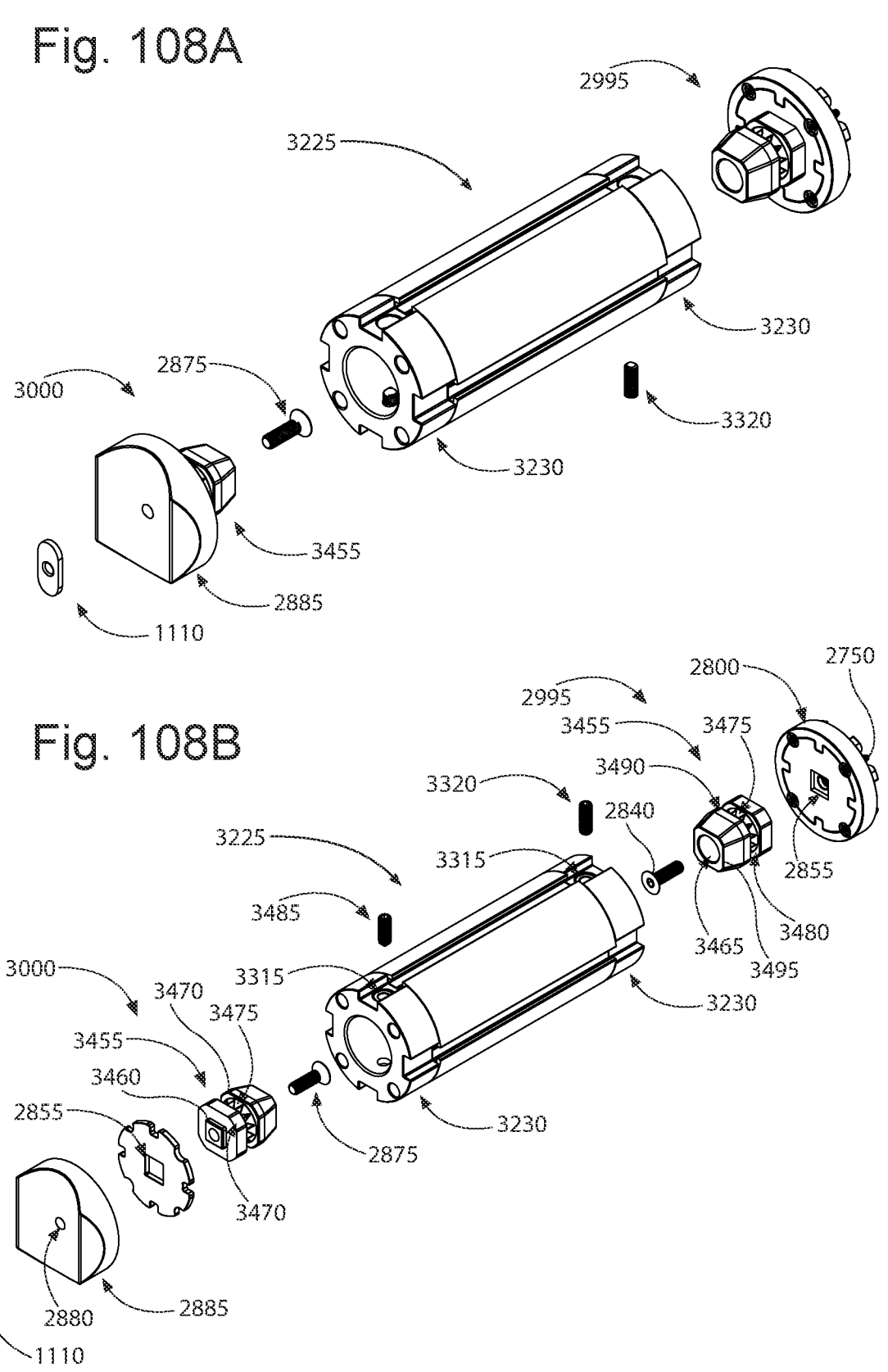
FIG. 108 shows a whole perspective view and a partially exploded perspective view FIGS. 108A and 108B, respectively, of a rounded square indexing male end and a rounded square indexing male side mount cooperating with the double rotatable cylindrical socket module.
Figures 116A, 116B:
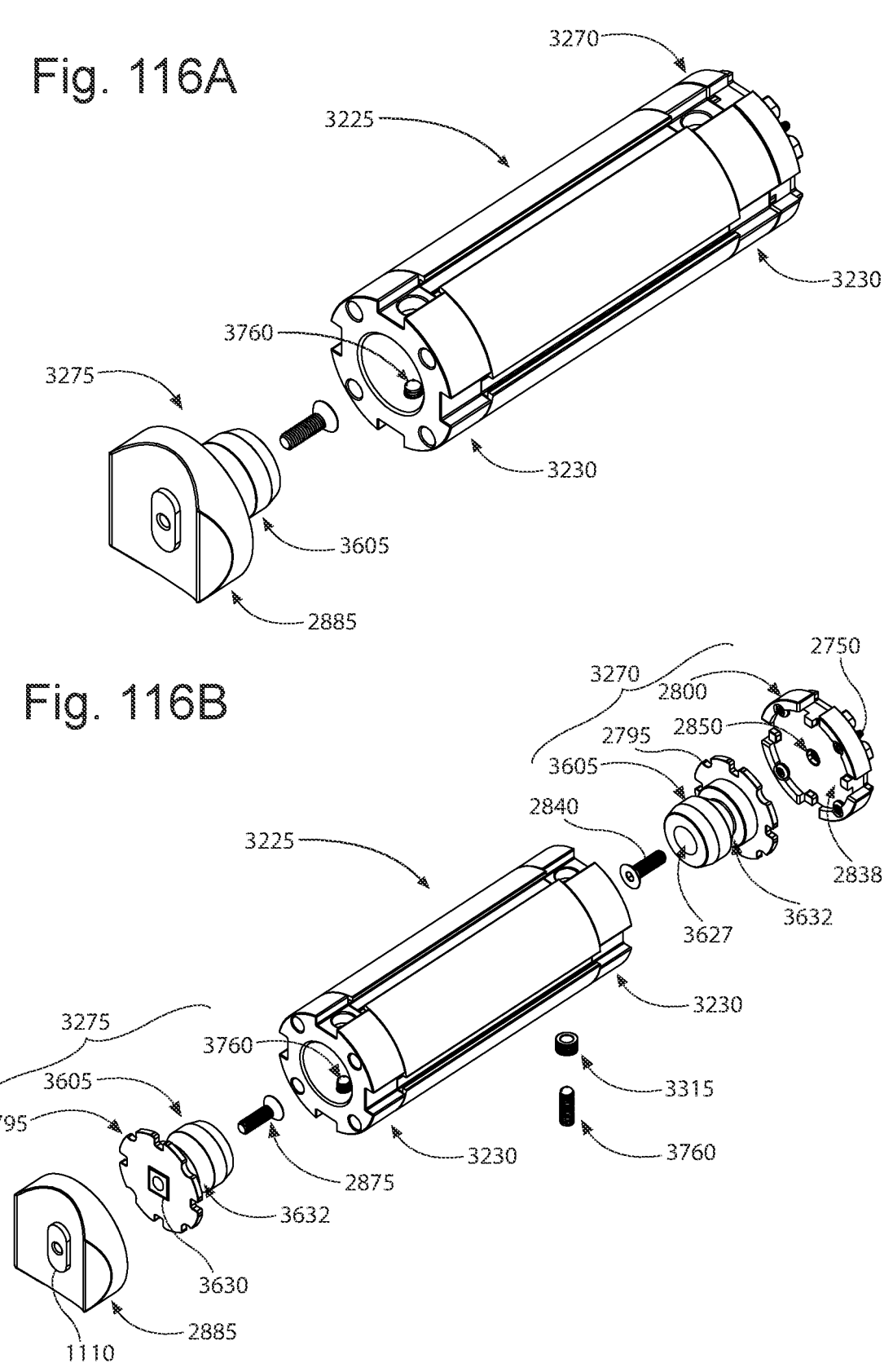
FIG. 116 shows a whole perspective view and a partially exploded perspective view FIGS. 116A and 116B, respectively, of a cylindrical sloped neck rotating male end and a cylindrical sloped neck rotating male side mount cooperating with the double rotatable cylindrical socket module.

According to some embodiments, as illustrated in FIG. 103, a cylindrical through-hole male end 3250 and a cylindrical through-hole male side mount 3255 secured to another module of the system may be rotationally or fixedly demountably engaged within a rotatable cylindrical socket component 3230. According to further embodiments, the rotatable cylindrical socket component 3230 is additionally compatible with a cylindrical threaded-hole male end 3260 and a cylindrical threaded-hole male side mount 3265 as illustrated in FIG. 104, as well as the rounded square through-hole male end 2975 and the rounded square through-hole male side mount 2980 as illustrated in FIG. 106, as well as the rounded square threaded-hole male end 2985 and the rounded square threaded-hole male side mount 2990 as illustrated in FIG. 107, as well as the rounded square indexing male end 2995 and the rounded square indexing male side mount 3000 as illustrated in FIG. 108, as well as a cylindrical sloped neck rotating male end 3270 and a cylindrical sloped neck rotating male side mount 3275 as illustrated in FIG. 116, as described in further detail below.

A cylindrical through-hole male end 3250 may comprise the locator plate 2795 which fits within the recess 2838 in the male mount end cap component 2800, and wherein a cylindrical through-hole connector component 3280 may be demountably engaged against the male mount end cap component 2800 and locator plate 2795 wherein a square boss 3285 or octagonal boss at the end of the connector component 3280 is securely retained within the locator slot 2855 and where a screw 2840, of which the threaded portion is passed through a hole 3290 in the connector component 3280, is threadably engaged with the threaded hole or insert in the center of the male mount end cap component 2800 which is secured by screws 2750 to a cylindrical structural component of another module, as previously shown. According to further embodiments, a cylindrical through-hole male end 3250 may comprise, instead of the assembly of the connector component 3280, locator plate 2795, and male mount end cap component 2800, a single component equally configured for demountable engagement with a rotatable cylindrical socket component 3230.

A cylindrical through-hole male side mount 3255 may comprise the cylindrical through-hole connector component 3280 where a screw 2875 through hole 3290 in the connector component 3280, is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. According to further embodiments, a cylindrical through-hole male side mount 3255 may comprise, instead of the assembly of the connector component 3280, locator plate 2795, and concave base side mount component 2885, a single component equally configured for demountable engagement with a rotatable cylindrical socket component 3230.

According to some embodiments, where in use for fixed demountable engagement, eight through-holes 3295 through a cylindrical retainment neck 3300 in the connector component 3280 allow for eight angles of interconnection between the two cooperating modules, as illustrated with the cylindrical through-hole male end 3250, whereby the threaded portion of a screw or bolt 3305 is passed through a screw-head hole 3310 in one side of the socket component 3230, and through two of eight of the through-holes 3295 in the connector component 3280, and threadably engaged with a threaded insert 3315 retained in a recess in the opposite side of the socket component 3230, and the male end 3250 or alternatively the male side mount 3255 thereby retained. By the same means, the rounded square through-hole male end 2975 and the rounded square through-hole male side mount 2980 may be demountably engaged by a screw or bolt through the through-holes in their respective connector component, as described below in reference to FIG. 106.

Alternatively, where rotational engagement of the two cooperating modules is required as illustrated with the cylindrical through-hole male side mount 3255 or alternatively may be done with the male end 3250, a set screw 3320 may be threadably engaged with the threaded insert 3315 to where protruding into the cylindrical retainment neck 3300 in the connector component 3280 and thereby retaining the connector component within the socket component while still allowing continuous rotation until the set screw 3320 may be further advanced into one of the eight through-holes therefore stopping rotation until the screw is retracted.

As previously noted and illustrated in FIG. 104, the rotatable cylindrical socket component 3230 is additionally compatible with a cylindrical threaded-hole male end 3260 and a cylindrical threaded-hole male side mount 3265 which are configured similarly as the through-hole male end 3250 and the through-hole male side mount 3255 but wherein the cylindrical through-hole connector component 3280 is replaced by a cylindrical threaded-hole connector component 3330 comprising once again a square boss 3332 or octagonal boss for fitted engagement with a locator plate 2795 but with a cylindrical retainment neck 3333 with eight threaded holes 3335. The threaded portion of a screw 3340 is passed through the screw-head hole 3310 in the side of the socket component 3230 and threadably engaged with a set of two of the eight threaded holes 3335 thereby retaining the male end 3260 or the male side mount 3265. Alternatively, a set screw 3320 may be threadably engaged with the threaded insert 3315 in the socket component 3230 to where protruding into the cylindrical retainment neck 3332 in the threaded-hole connector component 3330 thereby retaining the connector component within the socket component while still allowing continuous rotation until the set screw 3320 may be further advanced into one of the eight threaded-holes 3335 therefore stopping rotation until the set screw is retracted. By the same means, the rounded square threaded-hole male end 2985 and the rounded square threaded-hole male side mount 2990 may be fixedly or rotationally demountably engaged by a set screw in the retainment neck or threaded holes in their respective connector component, as described below in reference to FIG. 107.

According to further embodiments, a cylindrical threaded-hole male end 3260 may comprise instead of the assembly of the connector component 3330, locator plate 2795, and male mount end cap component 2800, a single component equally configured for demountable engagement with a rotatable cylindrical socket component 3230. According to further embodiments, a cylindrical threaded-hole male side mount 3265 may comprise instead of the assembly of the connector component 3330, locator plate 2795, and concave base side mount component 2885, a single component similarly configured for demountable engagement with a rotatable cylindrical socket component 3230.

According to embodiments of a modular assembly wherein a fixed sideway engagement of one or two cylindrical or rounded male ends with one or two cylindrical socket female ends of a four-channel cylindrical structural component module is preferred, a four-channel cylindrical structural component may have at each end a rounded side-opening socket component that may be demountably engaged at any one of eight angular orientations, a cylindrical through-hole male end 3250 or a cylindrical through-hole male side mount 3255 or a cylindrical threaded-hole male end 3260 or a cylindrical threaded-hole male side mount 3265, as well as a rounded square through-hole male end 2975 or a rounded square through-hole male side mount 2980 or a rounded square threaded-hole male end 2985 or a rounded square threaded-hole male side mount 2990 as described in further detail below.

Figures 105A, 105B:
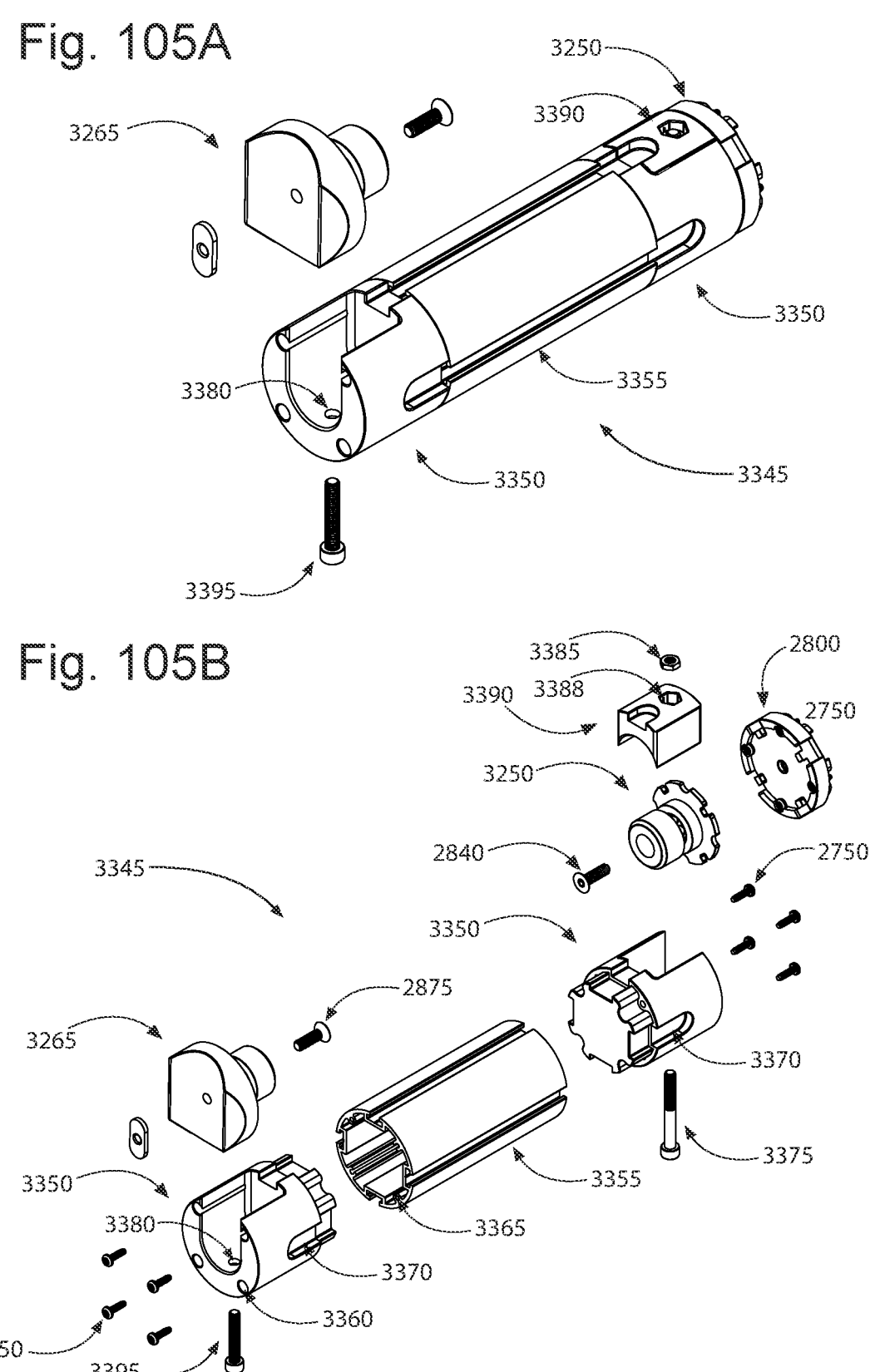
FIG. 105 shows a whole perspective view and a partially exploded perspective view FIGS. 105A and 105B, respectively, of a double rounded side-opening socket module comprising a rounded side-opening socket component at both ends where one end is cooperating with a cylindrical threaded-hole male side mount and the other end with a cylindrical through-hole male end.

As illustrated in FIG. 105, a cylindrical threaded-hole male side mount 3265 and a cylindrical through-hole male end 3250 are shown in cooperation with the ends of a double rounded side-opening socket module 3345 comprising a rounded side-opening socket component 3350 secured at both ends of a cylindrical structural component 3355 by screws 2750 of which the threaded portions are passed through holes 3360 in the socket components and threadably engaged with the screw channels 3365 in the cylindrical structural component. A rounded side-opening socket component 3350 may additionally comprise channel openings 3370 around its circumference to allow for passage of nuts 1110 into the nut channels of the cylindrical structural component, or according to a further embodiment without channel openings where nuts may be pre-installed into the nut channels, for demountable engagement of another component. A cylindrical through-hole male end 3250 or side mount 3255 or a rounded square through-hole male end 2975 or side mount 2980 may there be demountably engaged by a screw or bolt 3375 of which the threaded portion is passed through a screw-head hole 3380 in one side of the socket component 3350, a set of two of eight through-holes in their connector components, and threadably engaged with a threaded nut or insert 3385 retained within a nut/insert recess 3388 in a rounded side-opening socket cap 3390 which is therefore retained by the screw/bolt 3375 and thereby securely engaging the male end or male side mount. Alternatively, a cylindrical threaded-hole male end 3260 or side mount 3265 or a rounded square threaded-hole male end 2985 or side mount 2990 may be demountably engaged within a rounded side-opening socket component 3350 by a screw 3395 of which the threaded portion is passed through the screw-head hole 3380 and threadably engaged with a set of two of eight threaded-holes in their connector components, thereby retaining the male end or side mount without the use of the rounded side-opening socket cap 3390.

As previously noted, a four-channel cylindrical structural component module comprising one or two rotatable cylindrical socket components 3230 such as the double rotatable cylindrical socket module 3225, are additionally compatible with demountable engagement of a rounded square through-hole male end 2975 and a rounded square through-hole male side mount 2980, as illustrated in FIG. 106. A rounded square through-hole male end 2975 may comprise the locator plate 2795 which fits within the recess 2838 in the male mount end cap component 2800, and wherein a rounded square through-hole connector component 3400 may be demountably engaged against the male mount end cap component 2800 and locator plate 2795 wherein a square boss 3405 or octagonal boss at the end of the connector component 3400 is securely retained within the locator slot 2855 and where a screw 2840, of which the threaded portion is passed through a hole 3410 in the connector component 3400, is threadably engaged with the threaded hole or insert in the center of the male mount end cap component 2800 which is secured by screws 2750 to a cylindrical structural component of another module, as previously shown. The rounded square through-hole connector component 3400 additionally comprises four rounded corners 3413 which are sized and shaped for fitted and rotational engagement within the cylindrical socket component 3230. According to further embodiments, a rounded square through-hole male end 2975 may comprise, instead of the assembly of the connector component 3400, locator plate 2795, and male mount end cap component 2800, a single component equally configured for demountable engagement with a rotatable cylindrical socket component 3230.

A rounded square through-hole male side mount 2980 may comprise the rounded square through-hole connector component 3400 wherein a screw 2875 inserted through hole 3410 in the connector component 3400 is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. According to further embodiments, a rounded square through-hole male side mount 2980 may comprise, instead of the assembly of the connector component 3400, locator plate 2795, and concave base side mount component 2885, a single component equally configured for demountable engagement with a rotatable cylindrical socket component 3230.

According to some embodiments, where in use for fixed demountable engagement within a cylindrical socket component 3230, eight through-holes 3415 through a cylindrical retainment neck 3420 in the rounded square through-hole connector component 3400 allow for eight angles of interconnection between the two cooperating modules, whereby the threaded portion of a screw or bolt 3305 is passed through the screw-head hole 3310 in the socket component 3230, and through two of eight of the through-holes 3415 in the connector component 3400, and threadably engaged with a threaded insert 3315 retained in a recess in the opposite side of the socket component 3230, and the male end 2975 or male side mount 2980 thereby retained.

Alternatively where rotational engagement of the two cooperating modules is required, a set screw 3320 may be threadably engaged with the threaded insert 3315 to where protruding into the cylindrical retainment neck 3420 in the rounded square through-hole connector component 3400 and thereby retaining the connector component within the rotatable cylindrical socket component 3230 while still allowing continuous rotation until the set screw 3320 may be further advanced into one of the eight through-holes therefore stopping rotation until the screw is retracted.

According to further embodiments, as previously noted, the rounded square through-hole male end 2975 and the rounded square through-hole male side mount 2980 are additionally compatible with demountable engagement within the fixed square socket component 3020. The rounded square through-hole connector component 3400 may additionally comprise four square sides 3422 which are sized and shaped for fitted engagement within the square socket component 3020. The connector component 3400 may additionally comprise a tapered end 3423 which allows for a less precise alignment of the connector components to be received into the opening of a cooperating socket component 3020, 3230 where easy engagement may be desired. As previously described in reference to FIG. 96, the screw or bolt 3030 may be passed through the fixed square socket component 3020 and a set of two of the eight through-holes 3415 in the rounded square through-hole connector component 3400 of the male end 2975 or the male side mount 2980 to be threadably engaged with the threaded nut 3050 or threaded insert thereby retaining the male end 2975 or the male side mount 2980 within the fixed square socket component 3020.

As previously noted, the rotatable cylindrical socket component 3230 is additionally compatible with a rounded square threaded-hole male end 2985 and a rounded square threaded-hole male side mount 2990 which are configured the same as the through-hole male end 2975 and the through-hole male side mount 2980 but where, as illustrated in FIG. 107, the rounded square through-hole connector component 3400 is replaced by a rounded square threaded-hole connector component 3425 comprising once again a square boss 3428 or octagonal boss for fitted engagement with a locator plate 2795 but with a cylindrical retainment neck 3430 with eight threaded holes 3435. The rounded square threaded-hole connector component 3425 additionally comprises four rounded corners 3440 which are sized and shaped for fitted and rotational engagement within the cylindrical socket component 3230. Where fixed engagement is required, the threaded portion of a screw 3340 is passed through the screw-head hole 3310 in the side of the socket component 3230 and threadably engaged with a set of two of the eight threaded holes 3435 thereby retaining the male end 2985 or the male side mount 2990 at any one of the optional eight angular orientations. Alternatively, a set screw 3320 may be threadably engaged with the threaded insert 3315 in the socket component 3230 to where protruding into the cylindrical retainment neck 3430 in the rounded square threaded-hole connector component 3425 thereby retaining the connector component within the socket component while still allowing continuous rotation until the set screw 3320 may be further advanced into one of the eight threaded-holes 3435 therefore stopping rotation until the set screw is retracted.

According to further embodiments, as previously noted, the rounded square threaded-hole male end 2985 and the rounded square threaded-hole male side mount 2990 are additionally compatible with demountable engagement within the fixed square socket component 3020. The rounded square threaded-hole connector component 3425 may additionally comprise four square sides 3445 which are sized and shaped for fitted engagement within the square socket component 3020. The connector component 3425 may additionally comprise a tapered end 3450 which allows for a less precise alignment of the connector components to be received into the opening of a cooperating socket component 3020, 3230 where easy engagement may be desired. As previously described in reference to FIG. 98, the screw 3090 may be passed through the screw-head hole 3035 of the fixed square socket component 3020 to be threadably engaged with a set of two of the eight threaded holes 3435 in the rounded square threaded-hole connector component 3425 of the male end 2985 or the male side mount 2990 to be threadably engaged with the threaded nut 3050 or threaded insert thereby retaining the male end 2985 or the male side mount 2990 within the fixed square socket component 3020.

According to further embodiments, a rounded square threaded-hole male end 2985 may comprise, instead of the assembly of the connector component 3425, locator plate 2795, and male mount end cap component 2800, a single component equally configured for demountable engagement with a rotatable cylindrical socket component 3230.

According to further embodiments, a cylindrical threaded-hole male side mount 2990 may comprise, instead of the assembly of the connector component 3425, locator plate 2795, and concave base side mount component 2885, a single component equally configured for demountable engagement with a rotatable cylindrical socket component 3230.

As previously noted, a four-channel cylindrical structural component module comprising one or two rotatable cylindrical socket components 3230, such as the double rotatable cylindrical socket module 3225, are additionally compatible with demountable engagement of a rounded square indexing male end 2995 and a rounded square indexing male side mount 3000, as are illustrated in FIG. 108. A rounded square indexing male end 2995 may comprise the locator plate 2795 which fits within the recess 2838 in the male mount end cap component 2800, and wherein a rounded square indexing connector component 3455 may be demountably engaged against the male mount end cap component 2800 and locator plate 2795 wherein a square boss 3460 or octagonal boss at the end of the connector component 3455 is securely retained within the locator slot 2855 and where a screw 2840, of which the threaded portion is passed through a hole 3465 in the connector component 3455, is threadably engaged with the threaded hole or insert in the center of the male mount end cap component 2800 which is secured by screws 2750 to a cylindrical structural component of another module, as previously shown. The rounded square indexing connector component 3455 additionally comprises four rounded corners 3470 which are sized and shaped for fitted and rotational engagement within the cylindrical socket component 3230. According to further embodiments, a rounded square indexing male end 2995 may comprise, instead of the assembly of the connector component 3455, locator plate 2795, and male mount end cap component 2800, a single component equally configured for demountable engagement with a rotatable cylindrical socket component 3230.

A rounded square indexing male side mount 3000 may comprise the rounded square indexing connector component 3455 where a screw 2875 through hole 3465 in the connector component is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. According to further embodiments, a rounded square indexing male side mount 3000 may comprise, instead of the assembly of the connector component 3455, locator plate 2795, and concave base side mount component 2885, a single component equally configured for demountable engagement with a rotatable cylindrical socket component 3230.

According to some embodiments, where in use for fixed demountable engagement within a cylindrical socket component 3230, twelve indentations 3475 within an indented retainment neck 3480 in the rounded square indexing connector component 3455 allow for twelve angles of interconnection between two cooperating modules at thirty degree increments, whereby a set screw 3485 with a pointed tip, as shown with the rounded square indexing male side mount 3000, may be threadably engaged with the threaded insert 3315 of the socket component and into one of the twelve indentations 3475 where its pressure applied against the connector component 3455 securely retains the rounded square indexing male side mount 3000 or alternatively the male end 2995. According to further embodiments, an indexing connector component 3455 may comprise anywhere between eight and thirty-two indentations 3475. According to further embodiments, an indexing connector component may comprise a cylindrical shape with an indented retainment neck 3480 and indentations 3475.

Alternatively, where rotational engagement of the two cooperating modules is required, a set screw 3320 with a flat tip, as shown with the rounded square indexing male end 2995, may be threadably engaged with the threaded insert 3315 to where protruding within the rotatable cylindrical socket component 3230 toward the indexing connector component 3455 remaining clear of the indentations 3475 but into the indented retainment neck 3480 thereby retaining the connector component within the socket component while still allowing continuous rotation.

According to further embodiments, as previously noted, the rounded square indexing male end 2995 and the rounded square indexing male side mount 3000 are additionally compatible with demountable engagement within a fixed square socket component. The rounded square indexing connector component 3455 may additionally comprise four square sides 3490 which are sized and shaped for fitted engagement within a square socket component. The rounded square indexing connector component 3455 may additionally comprise a tapered end 3495 which allows for a less precise alignment of the connector components to be received into the opening of a cooperating socket component 3020, 3230 where easy engagement may be desired. As illustrated in FIG. 109, a rounded square indexing male end 2995 and a rounded square indexing male side mount 3000 may be demountably engaged at one or both ends of a second embodiment of a double fixed square socket module 3500 comprising at each end a second embodiment of a fixed square socket component 3503 which is configured the same as the first fixed square socket component 3020, as previously described in reference to FIG. 96, but where the threaded nut 3050 is replaced by a threaded insert 3505 secured within a threaded insert recess 3510. The pointed-tip set screw 3485 may be threadably engaged with the threaded insert 3505 and into one of the indentations 3475 where its pressure applied against the connector component 3455 securely retains the male end 2995 or the male side mount 3000 within the fixed square socket component 3503.

Figure 110A:
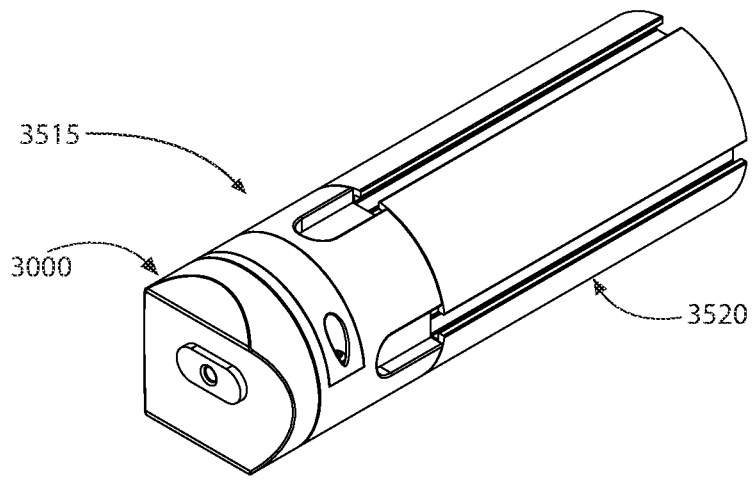
FIG. 110 shows a whole perspective view and a partially exploded perspective view FIGS. 110A and 110B, respectively, of a rounded square indexing male side mount cooperating with an indexing clamp socket component at an end of a cylindrical structural component.
Figure 110B:
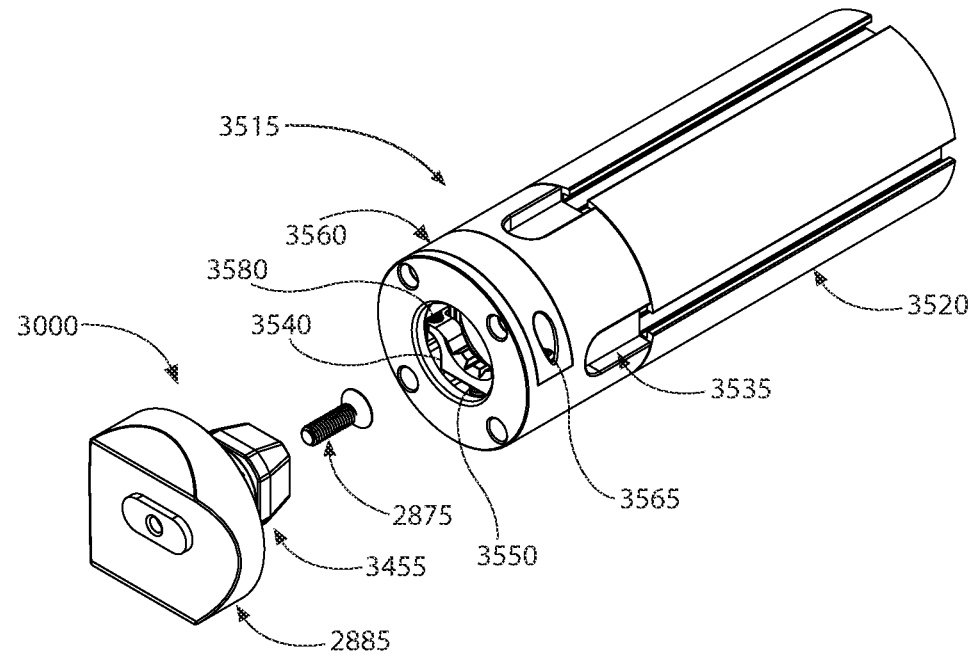
Figure 111A:
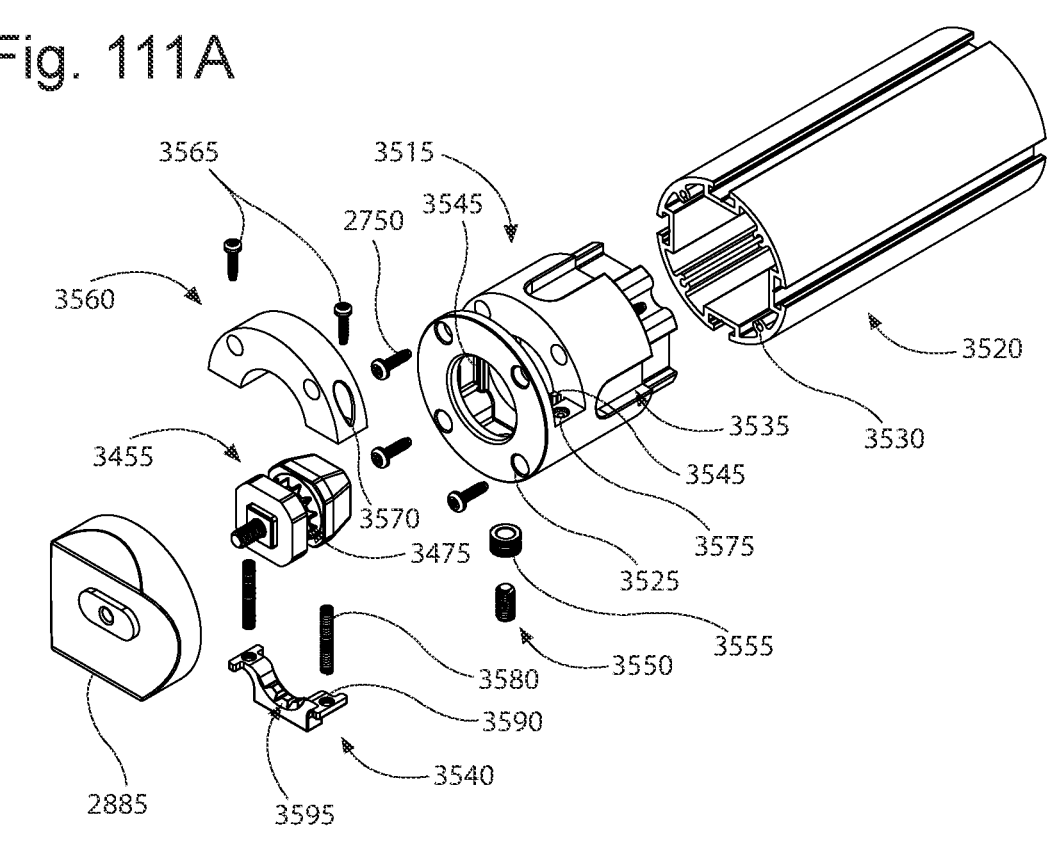
FIG. 111 shows additional further exploded views FIGS. 111A and 111B of the indexing clamp socket component and rounded square indexing male side mount shown in FIG. 110.
Figure 111B:
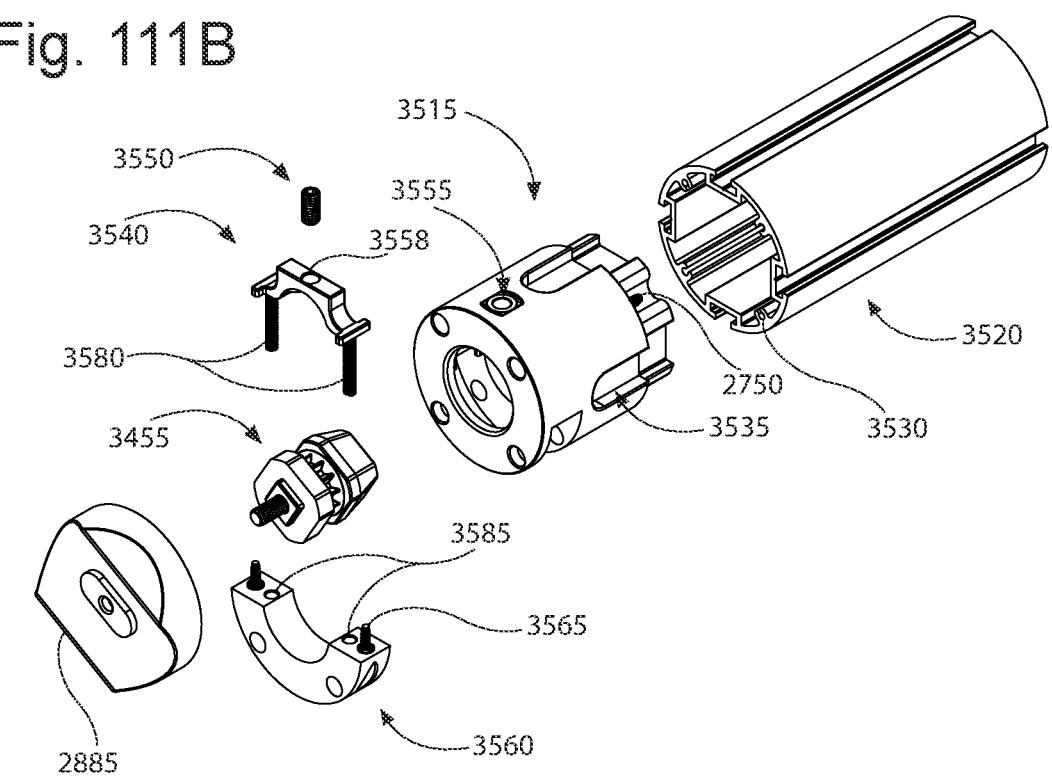

According to further embodiments, optionally a modular assembly may additionally comprise one or more four-channel cylindrical structural component modules 2765 wherein one or two female ends 1008 are configured as an indexing clamp socket component wherein a male end or male side mount comprising an indexing connector component may be demountably engaged. As illustrated in FIGS. 110 and 111, the rounded square indexing male side mount 3000 is shown cooperating with an indexing clamp socket component 3515 secured at the end of a cylindrical structural component 3520 by screws 2750 of which the threaded portion is passed through holes 3525 in the socket component 3515, as illustrated in FIG. 111A, to be threadably engaged with the screw channels 3530 in the cylindrical structural component. The indexing clamp socket component 3515 may additionally comprise channel openings 3535 around its circumference to allow for passage of nuts 1110 into the nut channels of the cylindrical structural component, or according to a further embodiment without channel openings where nuts may be pre-installed into the nut channels, for demountable engagement of another component.

According to one embodiment, an indexing clamp 3540 within the receptacle of the indexing clamp socket component 3515, where sliding on clamp guides 3545 on the inner walls of the socket component, may be advanced or retracted by a set screw 3550 threadably engaged with a threaded insert 3555 in one side of the socket component and therein pressing at varying positions against a shallow recess 3558 in the cooperating side of the indexing clamp. An indexing clamp socket cap 3560, which is secured by screws 3565 of which the threaded portion is passed through holes 3570 and threadably engaged with threaded holes 3575 in the main body of the socket component, retains the ends of two springs 3580 in two spring holes 3585. The opposite ends of the springs 3580 press within two recesses 3590 in the indexing clamp 3540, whereby when the set screw 3550 is disengaged from the indexing clamp the pressure of the springs pushes the indexing clamp away from the center of the receptacle. The indexing clamp 3540 may additionally comprise clamping teeth 3595, as illustrated in FIG. 111A, in number and shape to align with the indentations 3475 of an indexing connector component 3455 as previously described in reference to FIGS. 108 and 109. When the set screw 3550 is retracted and the indexing clamp 3540 disengaged, an indexing male end 2995 or an indexing male side mount 3000 may be inserted. As illustrated in FIGS. 110 and 111, the rounded square indexing connector component 3455 of an indexing male side mount 3000 is inserted into the socket component 3515 and therein demountably engaged by advancing the set screw 3550 against the indexing clamp and pressing the clamping teeth 3595 into the cooperating indentations 3475 of the connector component until the set screw is retracted.

According to one embodiment, the indexing clamp 3540 comprises three clamping teeth 3595 which align with three out of twelve indentations 3475 at thirty-degree increments. According to further embodiments, for varying increments of angular orientation between the two cooperating components, an indexing clamp 3540 may comprise anywhere between two and sixteen clamping teeth 3595, and an indexing connector component 3455 may comprise anywhere between eight and thirty-two indentations 3475. According to further embodiments, an indexing connector component 3455 may comprise a cylindrical shape with an indented retainment neck 3480 and indentations 3475 of a cooperating shape and number configured for demountable engagement with an indexing clamp socket component 3515.

Figures 112A, 112B, 112C, 112D:
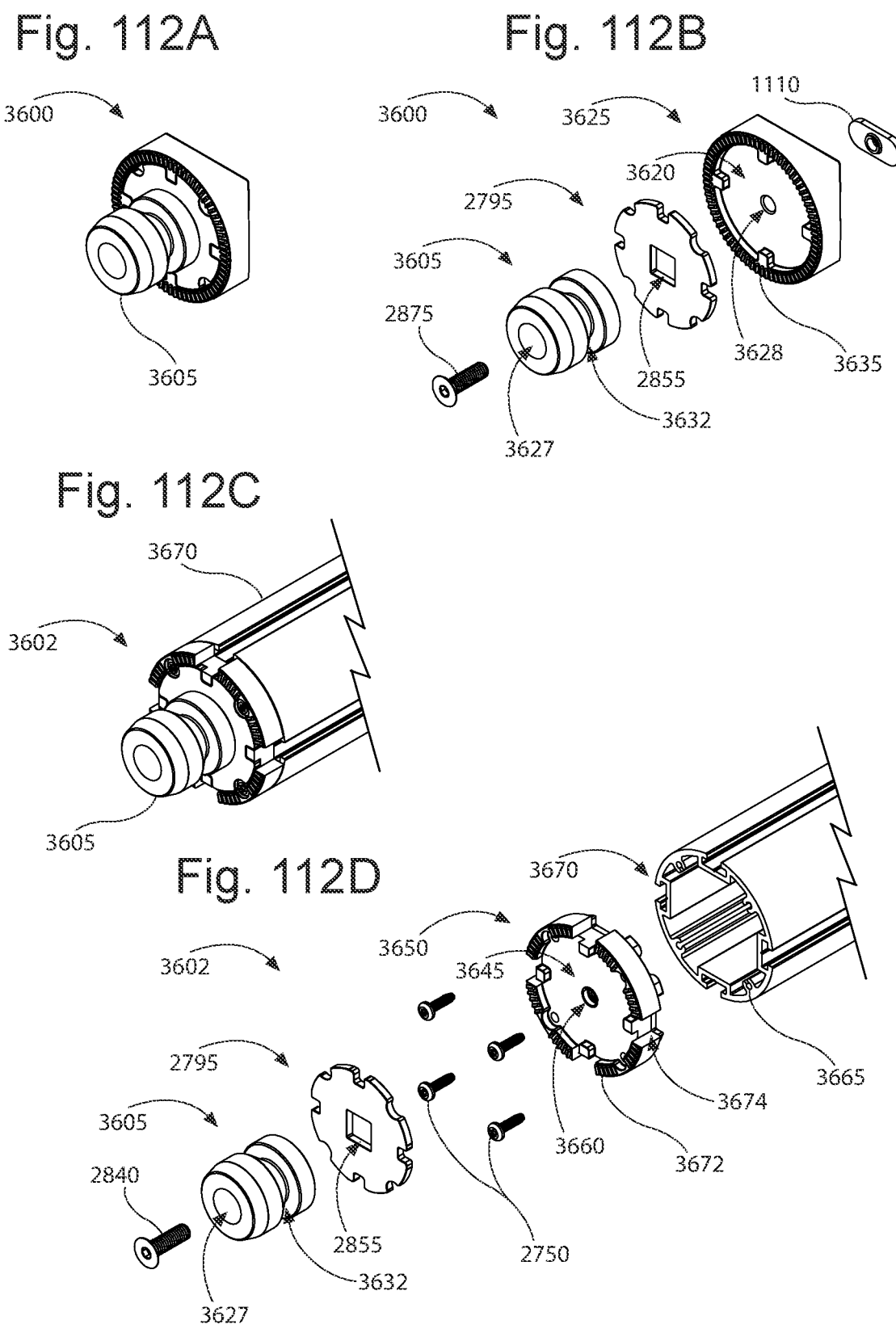
FIGS. 112C and 112D are a whole perspective view and an exploded perspective view, respectively, of a cylindrical sloped neck indexing male end configured for demountable engagement with a sloped clamp socket component.
Figures 113A, 113B:
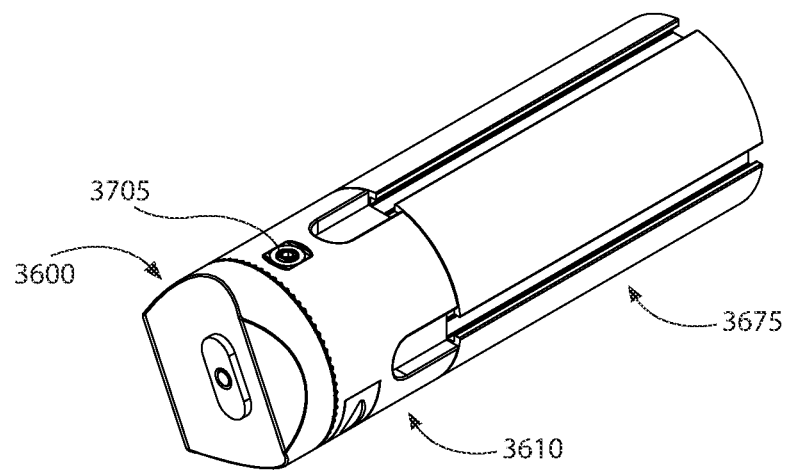
FIG. 113 shows a whole perspective view and a partially exploded perspective view FIGS. 113A and 113B, respectively, of a cylindrical sloped neck indexing male side mount cooperating with a sloped clamp socket component at an end of a cylindrical structural component.
Figure 114:
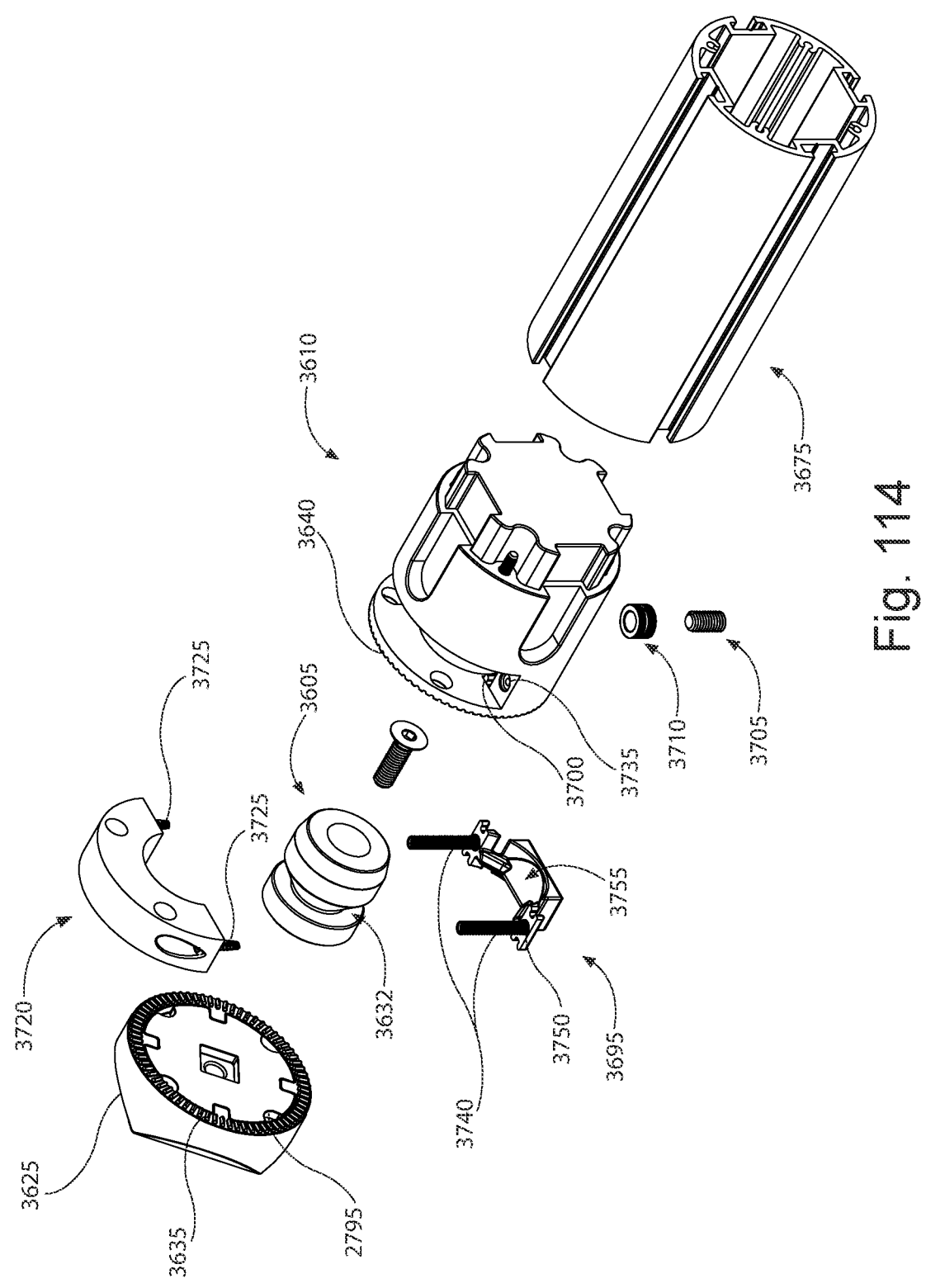
FIG. 114 is a further exploded top view of the sloped clamp socket component and cylindrical sloped neck indexing male side mount shown in FIG. 113.
Figure 115:
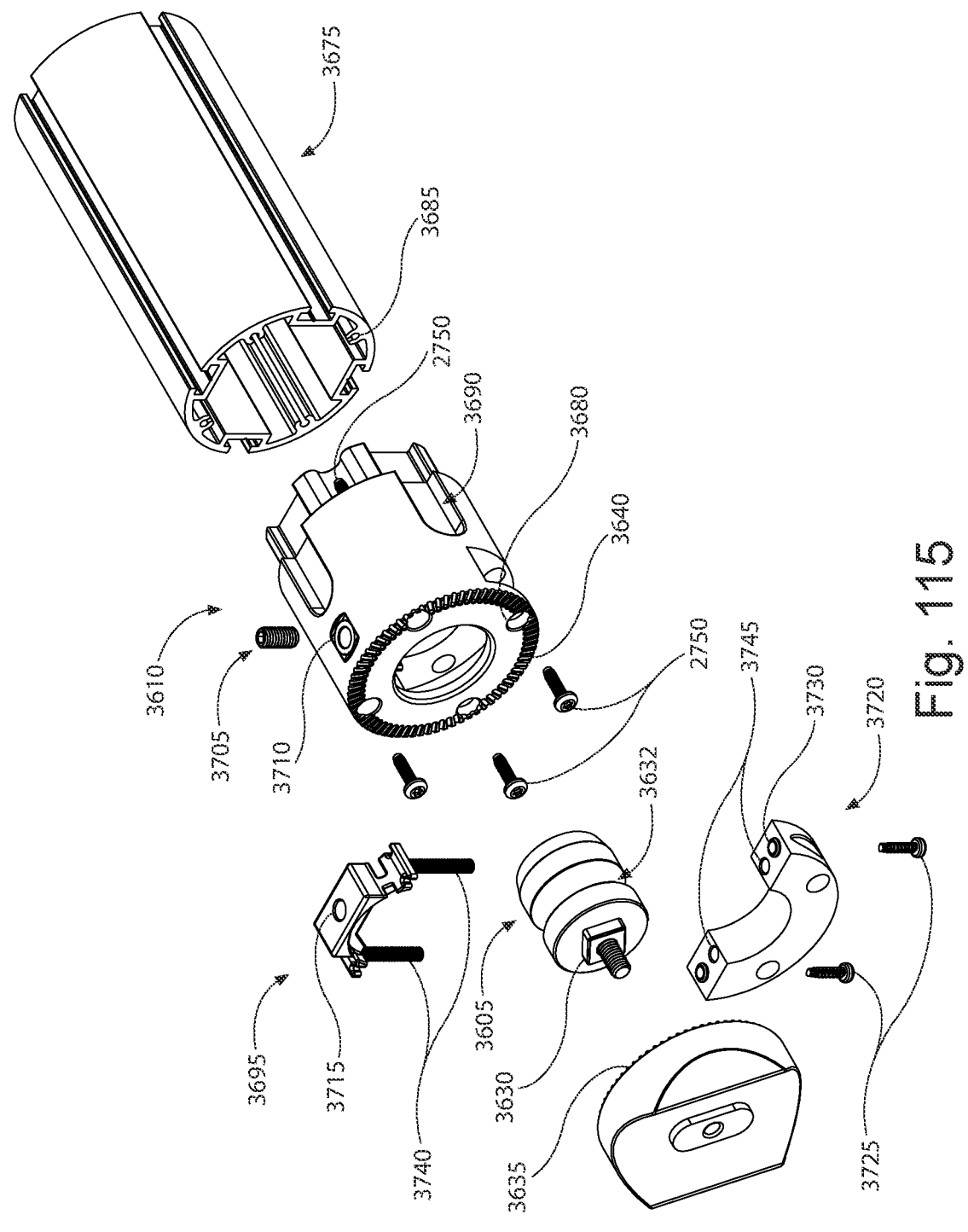
FIG. 115 is a further exploded bottom view of the sloped clamp socket component and cylindrical sloped neck indexing male side mount shown in FIGS. 113 and 114.

According to further embodiments, optionally a modular assembly may additionally comprise one or more four-channel cylindrical structural component modules 2765 wherein one or two female ends 1008 are configured as a sloped clamp socket female end wherein a cylindrical sloped neck indexing male side mount 3600 or a cylindrical sloped neck indexing male end 3602 may be demountably engaged. As illustrated in FIGS. 112A and 112B, a cylindrical sloped neck indexing male side mount 3600 may comprise a cylindrical sloped neck connector component 3605 configured for demountable engagement with a sloped clamp socket component 3610, as illustrated in FIGS. 113 to 115, or a rotatable cylindrical socket component 3230, as illustrated in FIG. 116. A cylindrical sloped neck indexing male side mount 3600 may comprise a cylindrical sloped neck connector component 3605 engaged on a locator plate 2795 which fits in a recess 3620 in a concave base indexing side mount component 3625. The threaded portion of a screw 2875 is passed through a hole 3627 in the connector component 3605 and through the locator plate and a through-hole 3628 in the center of the side mount component 3625 where it may be threadably engaged with a nut 1110 in a nut channel along a cylindrical structural component or with a threaded core component through a side mount hole, or with another component comprising a round surface and threaded hole such as a carriage body component 1230. The cylindrical sloped neck connector component 3605 may additionally comprise a square boss 3630 or octagonal boss, as illustrated in FIG. 115, whereby the connector component may be securely retained against the locator plate 2795 and within the plate's locator slot 2855, as well as a sloped retainment neck 3632 whereby the component is engaged within the sloped clamp socket component, as described in further detail below. The concave base indexing side mount component 3625 may additionally comprise a plurality of indexing teeth 3635 on the front face which encircles the locator plate 2795 and meets the end face of the sloped clamp socket component 3610 which may comprise a same number of indexing grooves 3640 which engage with the indexing teeth 3635 when the indexing male side mount 3600 is demountably engaged with the sloped clamp socket component 3610. According to further embodiments, a cylindrical sloped neck indexing male side mount 3600 may comprise, instead of the assembly of the connector component 3605, locator plate 2795, and concave base indexing side mount component 3625, a single component equally configured for demountable engagement with a sloped clamp socket component 3610 or a rotatable cylindrical socket component 3230.

As illustrated in FIGS. 112C and 112D, the cylindrical sloped neck indexing male end 3602 may comprise the locator plate 2795 which fits within a recess 3645 in an indexing male mount end cap component 3650, and wherein the cylindrical sloped neck connector component 3605 is secured against the two components where the square boss 3630 or octagonal boss at the end of the connector component 3605 is retained within the locator slot 2855 by a screw 2840 of which the threaded portion is passed through hole 3627 in the connector component and threadably engaged with a threaded hole 3660 or threaded insert in the center of the indexing male mount end cap component 3650 which may be secured by screws 2750 threadably engaged with the screw channels 3665 of a cylindrical structural component 3670. The indexing male mount end cap component 3650 may additionally comprise a plurality of indexing teeth 3672 on the front face which encircles the locator plate 2795 and meets the end face of the sloped clamp socket component 3610 comprising the indexing grooves 3640 which cooperate with the indexing teeth 3672 when an indexing male end 3602 is demountably engaged, as described in further detail below. The indexing male mount end cap component 3650 may additionally comprise channel openings 3674 around its circumference to allow for passage of nuts 1110 into the nut channels of a cooperating cylindrical structural component. According to further embodiments, a cylindrical sloped neck indexing male end 3602 may comprise, instead of the assembly of the connector component 3605, locator plate 2795, and indexing male mount end cap component 3650, a single component equally configured for demountable engagement with a sloped clamp socket component 3610 or a rotatable cylindrical socket component 3230.

As illustrated in FIGS. 113 to 115, a cylindrical sloped neck indexing male side mount 3600 is shown cooperating with a sloped clamp socket component 3610 which is secured at the end of a cylindrical structural component 3675 by screws 2750 of which the threaded portion is passed through holes 3680 in the socket component to be threadably engaged with the screw channels 3685 in the cylindrical structural component. The sloped clamp socket component 3610 may additionally comprise channel openings 3690 around its circumference to allow for passage of nuts 1110 into the nut channels of the cylindrical structural component, or according to a further embodiment without channel openings where nuts may be pre-installed into the nut channels, for demountable engagement of another component. According to one embodiment, a sloped clamp 3695 within the receptacle of the sloped clamp socket component 3610, where sliding on clamp guides 3700 on the inner walls of the socket component, may be advanced or retracted by a set screw 3705 threadably engaged with a threaded insert 3710 in one side of the socket component and therein pressing at varying positions against a shallow recess 3715 in the cooperating side of the sloped clamp 3695. A sloped clamp socket cap 3720, which is secured by screws 3725 of which the threaded portion is passed through holes 3730 and threadably engaged with threaded holes 3735 in the main body of the socket component, retains the ends of two springs 3740 in two spring holes 3745. The opposite ends of the springs 3740 press within two recesses 3750 in the sloped clamp 3695, whereby when the set screw 3705 is disengaged from the sloped clamp, the pressure of the springs pushes the sloped clamp away from the center of the receptacle. The sloped clamp 3695 may additionally comprise a sloped wedge midsection 3755 of which the shape is configured for engagement within the sloped retainment neck 3632 of the connector component 3605. When the set screw 3705 is retracted and the sloped clamp disengaged, a sloped neck indexing male side mount 3600 or a sloped neck indexing male end 3602 may be inserted or removed.

As illustrated in FIGS. 113 to 115, the cylindrical sloped neck connector component 3605 of the indexing male side mount 3600 is inserted into the socket component 3610 and therein demountably engaged whereby the set screw 3705 is advanced against the sloped clamp 3695 and pressing the sloped wedge midsection 3755 into the cooperating sloped retainment neck 3632 of the connector component 3605. In doing so, the indexing teeth 3635 of the concave base indexing side mount component 3625, or alternatively the indexing teeth 3672 of the indexing male mount end cap component 3650 where an indexing male end 3602 is in use, are aligned with and inserted into the indexing grooves 3640 of the socket component at a desired angular relation between the cooperating components and thereby preventing rotation of the components relative to one another until the set screw 3705 and sloped clamp 3695 are retracted and the components disengaged or the angular relation of the components allowed to be realigned and the set screw and sloped clamp there reengaged.

According to one embodiment, the sloped clamp socket component 3610 comprises 72 indexing grooves 3640 and the concave base indexing side mount component 3625 comprises 72 indexing teeth 3635 whereby the cooperative engagement of the components allows for 72 locking positions at 5-degree increments. According to a further embodiment, the sloped clamp socket component 3610 comprises 144 indexing grooves 3640 and the concave base indexing side mount component 3625 comprises 144 indexing teeth 3635 whereby the cooperative engagement of the components allows for 144 locking positions at 2.5-degree increments. According to a further embodiment, the sloped clamp socket component 3610 comprises 360 indexing grooves 3640 and the concave base indexing side mount component 3625 comprises 360 indexing teeth 3635 whereby the cooperative engagement of the components allows for 360 locking positions at 1-degree increments. According to further embodiments, the sloped clamp socket component 3610 may comprise anywhere between 8 and 360 indexing grooves 3640 and the concave base indexing side mount component 3625 comprise the same number of indexing teeth 3635 whereby the cooperative engagement of the components allows for the same number of locking positions. For all the said embodiments, a compatible indexing male mount end cap component 3650 comprises indexing teeth 3672 of the same size and alignment as the side mount component 3625 but which may be of a lesser number due to the areas occupied by the screw through-holes and the channel openings 3674.

According to further embodiments, a male end and a male side mount may be configured as a cylindrical sloped neck rotating male end 3270 and a cylindrical sloped neck rotating male side mount 3275 secured to another module of the system to be fixedly or rotationally demountably engaged at one or both ends of a cylindrical structural module 2765 wherein one or two female ends are configured as the rotatable cylindrical socket component 3230, such as the double rotatable cylindrical socket module 3225 as previously described in reference to FIG. 103. As illustrated in FIG. 116, a cylindrical sloped neck rotating male end 3270 and a cylindrical sloped neck rotating male side mount 3275 are shown cooperating with the two ends of the double rotatable cylindrical socket module 3225.

A cylindrical sloped neck rotating male end 3270 may comprise the locator plate 2795 which fits within the recess 2838 in the male mount end cap component 2800, and wherein the cylindrical sloped neck connector component 3605 may be demountably engaged against the male mount end cap component 2800 and locator plate 2795 wherein the square boss 3630 or octagonal boss at the end of the connector component 3605 is securely retained within the locator slot 2855 and where a screw 2840, of which the threaded portion is passed through a hole 3627 in the connector component 3605, is threadably engaged with the threaded hole 2850 or threaded insert in the center of the male mount end cap component 2800 which is secured by screws 2750 to a cylindrical structural component of another module, as previously shown. According to further embodiments, a cylindrical sloped neck rotating male end 3270 may comprise, instead of the assembly of the connector component 3605, locator plate 2795, and male mount end cap component 2800, a single component equally configured for demountable engagement with a rotatable cylindrical socket component 3230.

A cylindrical sloped neck rotating male side mount 3275 may comprise the cylindrical sloped neck connector component 3605 where a screw 2875 through the hole 3627 in the connector component is passed through a locator plate 2795 and the through-hole 2880 in the center of a concave base side mount component 2885 where it may be threadably engaged with a nut 1110 in a nut channel along a cylindrical structural component or with a threaded core component through a side mount hole, or with another component comprising a round surface and threaded hole such as a carriage body component 1230. According to further embodiments, the cylindrical sloped neck rotating male side mount 3275 may comprise, instead of the assembly of the connector component 3605, locator plate 2795, and concave base side mount component 2885, a single component equally configured for demountable engagement with a rotatable cylindrical socket component 3230.

The male end 3270 or the male side mount 3275 may be rotationally engaged with a rotatable cylindrical socket component 3230 whereby a set screw 3760 with a pointed tip may be threadably engaged with the threaded insert 3315 in the socket component to where protruding into the sloped retainment neck 3632 in the sloped neck connector component 3605 and thereby retaining the connector component within the socket component while still allowing continuous rotation until the set screw 3760 is advanced to press into the sloped retainment neck 3632 to provide a locking resistance against rotation or it may be retracted to allow for disengagement of the male end 3270 or male side mount 3275 from the socket component 3230.

According to further embodiments, a sloped neck connector component 3605 may comprise the shape and features of the rounded square connector components 3400, 3425, 3455 except wherein the retainment neck is configured as a sloped retainment neck 3632 with which, when together with the square sides and rounded corners as previously described, a male end or male side mount comprising the rounded square sloped neck connector component is compatible with adjustable demountable engagement with the sloped clamp socket component 3610 or fixed or rotational demountable engagement with the cylindrical socket component 3230 or fixed demountable engagement with the fixed square socket component 3500 where configured with the threaded insert 3505 and the pointed-tip set screw 3485 as previously described in reference to FIG. 109.

Figure 117A:
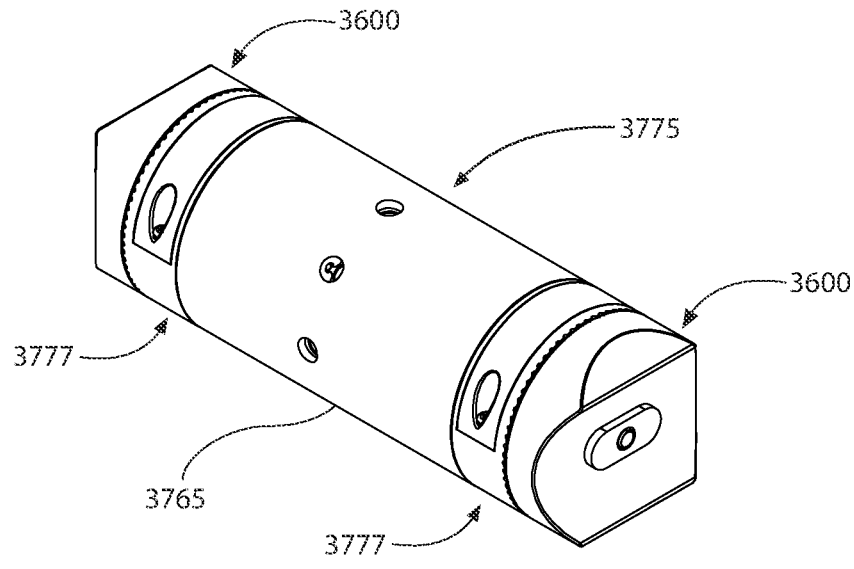
FIG. 117 shows a whole perspective view and a partially exploded perspective view FIGS. 117A and 117B, respectively, of a no-channel cylindrical structural component module comprising a no-channel cylindrical structural component with a second example of a sloped clamp socket component at both ends cooperating each with a cylindrical sloped neck indexing male side mount.
Figure 117B:
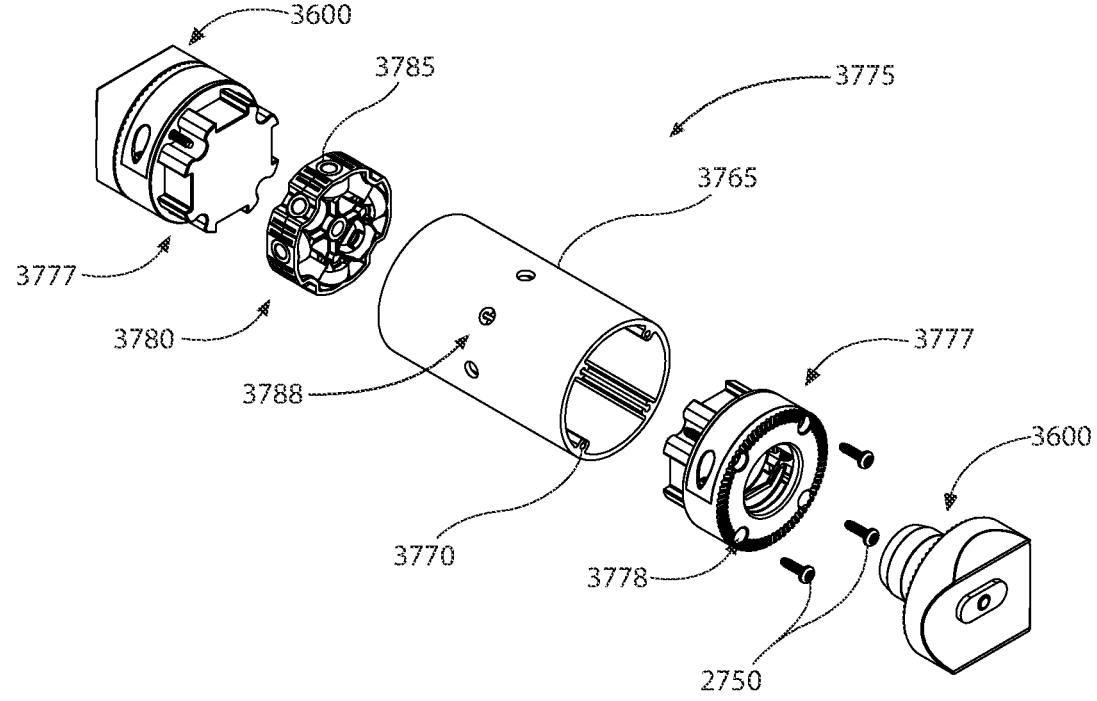

According to further embodiments, optionally a modular assembly may additionally comprise one or more no-channel cylindrical structural components 3765 which may be configured similarly to a two-channel cylindrical structural component 1015 or a four-channel cylindrical structural component 2730 but wherein no nut channels are provided along the circumferential surface of the component. Any of the four-channel end cap components, male ends, or female ends as previously described may be secured at one or both ends of a no-channel cylindrical structural component 3765 by screws 2750 threadably engaged with screw channels 3770 in the inner contours of the no-channel cylindrical structural component to be configured as a no-channel cylindrical structural component module 3775. As illustrated in FIG. 117, a no-channel cylindrical structural component 3765 is shown with at both ends a second embodiment of a sloped clamp socket component 3777 which is configured the same as the first sloped clamp socket component 3610 but excluding the channel openings which are not required in conjunction with a no-channel cylindrical structural component. The socket components 3777 are secured at the ends of the cylindrical structural component 3765 by screws 2750 of which the threaded portion is passed through holes 3778 in the socket components whereby the compatible male ends and male side mounts as previously described may be demountably engaged, such as the cylindrical sloped neck indexing male side mounts 3600 shown.

Any of a no-channel cylindrical structural component module 3775 may additionally comprise the six-way threaded core component 1125 or the four-way threaded core component 2905 as previously described or an eight-way threaded core component 3780 secured within its cylindrical structural component whereby up to four of a concave base male assembly or male side mount or one or more of another component comprising a concave base as previously described may be demountably engaged by a screw or bolt. As illustrated in FIG. 117, an eight-way threaded core component 3780 comprising eight threaded holes, threaded nuts, or threaded inserts 3785 is secured within the cylindrical structural component 3765 in alignment with eight side mount holes 3788 whereby a component with a concave base and configured to receive a screw or bolt may be demountably engaged by the screw or bolt threadably engaged with the threaded inserts 3785. The threaded core components 3780 may be securely fixed in place within the cooperating cylindrical structural component by use of a polymeric adhesive or brazing or an interference fit provided by crush ribs and the like.

Figure 118A:
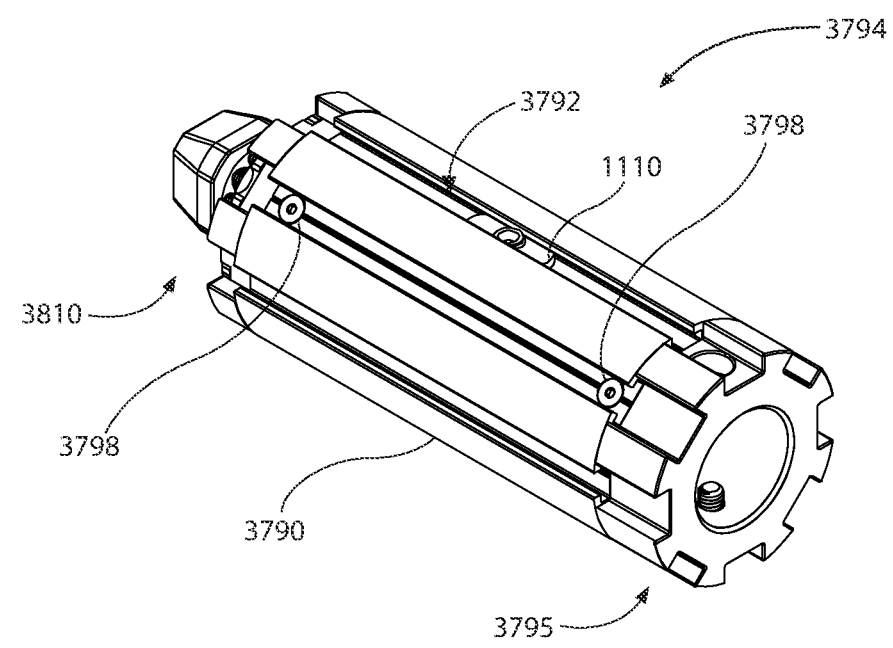
FIG. 118 shows a whole perspective view and a partially exploded perspective view FIGS. 118A and 118B, respectively, of an eight-channel cylindrical structural component module comprising an eight-channel cylindrical structural component with an eight-channel rotatable cylindrical socket component at one end and an eight-channel rounded square threaded-hole male end at the opposite end.
Figure 118B:
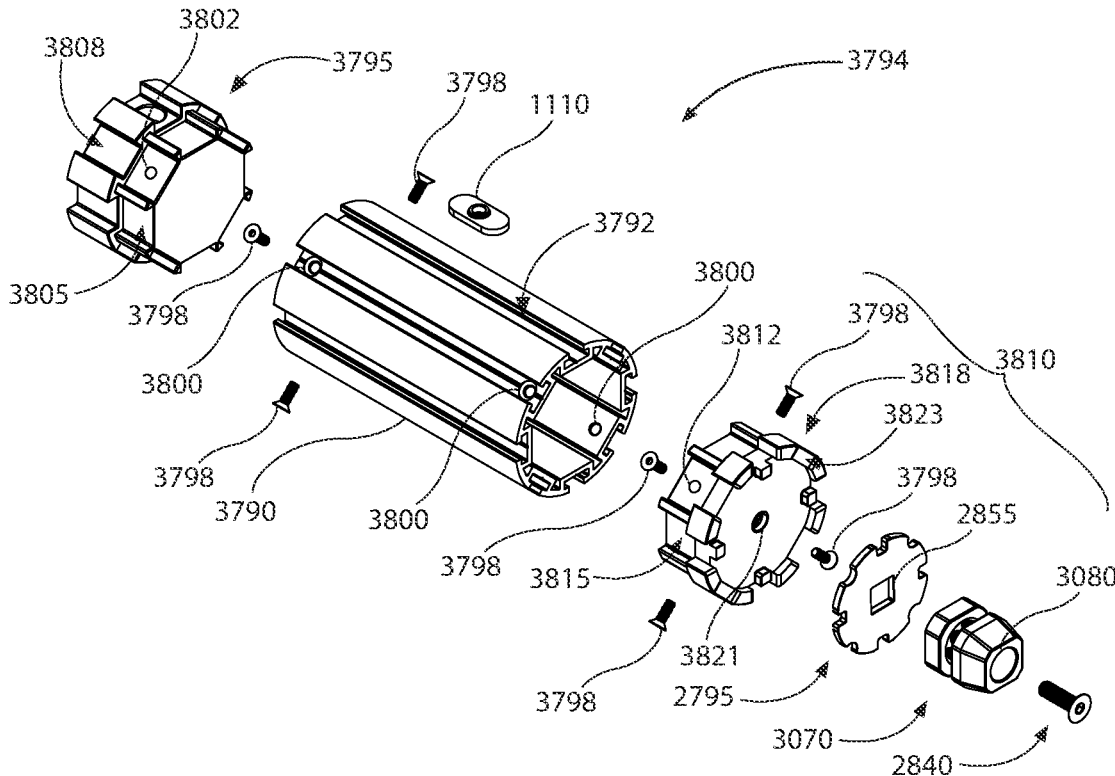

According to further embodiments, optionally a modular assembly may additionally comprise one or more eight-channel cylindrical structural components 3790, as illustrated in FIG. 118, which may be configured similarly to a two-channel cylindrical structural component 1015 or a four-channel cylindrical structural component 2730 but wherein eight nut channels 3792 are provided along the circumferential surface of the component whereby up to four of a concave base male assembly or male side mount or one or more of another component comprising a concave base as previously described may be demountably engaged by a screw or bolt threadably engaged with a nut 1110 retained within one of the eight nut channels. Optionally, an eight-channel cylindrical structural component 3790 may be demountably engaged with another eight-channel cylindrical structural components or another component of the system by one or more corner braces 1255, 2475, 2550, 2645, parallel braces 2345, or channel braces 2775, as well as further embodiments of end cap components, male ends, or female ends which are configured to be received and secured at one or both ends of an eight-channel cylindrical structural component 3790.

Without the presence of screw channels in an eight-channel cylindrical structural component 3790, the further embodiments of end cap components, male ends, and female ends may comprise a plurality of threaded holes in the inserted segment of the components whereby screws may be threadably engaged through holes located in the middle of the cooperating nut channels. As illustrated in FIG. 118, an eight-channel cylindrical structural component module 3794 may comprise an eight-channel rotatable cylindrical socket component 3795 retained at one or both ends of the eight-channel cylindrical structural component by four screws 3798 of which the threaded portion is passed through holes 3800 in the center of four of the nut channels 3792 to be threadably engaged with four threaded holes 3802 in the inserted segment 3805 of the socket component 3795. According to further embodiments, an eight-channel female end may be configured as like a fixed square socket component 3020, a square side-opening socket component 3140, a rounded side-opening socket component 3350, an indexing clamp socket component 3515, or a sloped clamp socket component 3610 comprising the socket shapes and elements of those components in combination with the shape and features of the inserted segment 3805 of the example socket component 3975 with threaded holes 3802. Any of an eight-channel end component such as the socket components 3795 may additionally comprise channel openings 3808 around its circumference to allow for passage of nuts 1110 into the nut channels of the cylindrical structural component, or according to a further embodiment without channel openings where nuts may be pre-installed into the nut channels, for demountable engagement of another component.

An example of an eight-channel male end is shown secured to the opposite end of an eight-channel cylindrical structural component. An eight-channel rounded square threaded-hole male end 3810 may be retained at one or both ends of an eight-channel cylindrical structural component 3790 by four screws 3798 of which the threaded portion is passed through holes 3800 in the center of four of the nut channels 3792 to be threadably engaged with four threaded holes 3812 in the inserted segment 3815 of an eight-channel male mount end cap component 3818 of the male end. An eight-channel male end 3810 may additionally comprise the locator plate 2795 which fits within the recess 3820 in the male mount end cap component 3818, and wherein a connector component 3070 may be demountably engaged against the male mount end cap component and locator plate 2795 wherein the square boss 3075 or octagonal boss at the end of the connector component 3070 is securely retained within the locator slot 2855 and where a screw 2840, of which the threaded portion is passed through a hole 3080 in the connector component 3070, is threadably engaged with a threaded hole 3821 or threaded insert in the center of the male mount end cap component 3818 which is secured by the screws 3798 to the end of the cylindrical structural component 3790. The eight-channel male mount end cap component 3818 may additionally comprise channel openings 3823 around its circumference to allow for passage of nuts 1110 into the nut channels of the cylindrical structural component, or according to a further embodiment without channel openings where nuts may be pre-installed into the nut channels, for demountable engagement of another component. According to further embodiments, an eight-channel male end may comprise, instead of the straight square threaded-hole connector component 3070, a straight square through-hole connector component 2790 or a tapered square through-hole connector component 3095 or a tapered square threaded-hole connector component 3115 or an octagonal through-hole connector component 3160 or an octagonal threaded-hole connector component 3205 or a cylindrical through-hole connector component 3280 or a cylindrical threaded-hole connector component 3330 or a rounded square through-hole connector component 3400 or a rounded square threaded-hole connector component 3425 or a rounded square indexing connector component 3455 or a cylindrical sloped neck connector component 3605. According to further embodiments, an eight-channel male end may comprise, instead of the assembly of a connector component, locator plate 2795, and male mount end cap component 3818, a single component equally configured for engagement with an eight-channel cylindrical structural component 3790.

According to further embodiments, optionally a modular assembly may additionally comprise one or more male side mount collars which may be demountably engaged with the various types of cylindrical structural component as previously described by screws threadably engaged with nuts 1110 in the nut channels or with a threaded core component in a cylindrical structural component. As illustrated in FIG. 119, two one-way male side mount collars 3825 are shown demountably engaged with the cylindrical structural component 3830 of a fixed square socket/tapered square through-hole male end module 3835. The one-way male side mount collar 3825 may comprise a one-way collar component 3840 of which the inner contours of a hollow center 3845 are the same diameter as the cooperating cylindrical structural component 3830 on which it is slidably or demountably engaged by two screws threadably engaged with nuts 1110 retained within two of the nut channels 3850, or according to further embodiments, a threaded core component 1125, 2905, 3780 in the cylindrical structural component. The one-way collar component 3840 may comprise on one side a raised through-hole 3855 through which the threaded portion of a screw 3860 is passed to be threadably engaged with one of the nuts 1110. The opposite side of the one-way collar component 3840 may comprise a male side mount segment 3865 with a recess 3870 wherein a locator plate 2795 and one of the various compatible male connector components 2790, 3070, 3095, 3115, 3160, 3205, 3280, 3330, 3400, 3425, 3455, 3605, such as the sloped neck connector component 3605 shown, may be engaged by a screw 3875 of which the threaded portion is passed through the connector component and locator plate and a hole 3880 through the center of the male side mount segment 3865 to be threadably engaged with the nut 1110 or threaded core component. According to further embodiments, the male side mount segment 3865 may additionally comprise a plurality of indexing teeth on the front face which encircles the locator plate 2795, as like the indexing teeth 3635 on the concave base indexing side mount component 3625 previously described in reference to FIGS. 112 to 115, where provided for demountable engagement of the side mount collar 3825 with the sloped clamp socket component 3610. According to further embodiments, a one-way male side mount collar 3825 may comprise, instead of the assembly of the connector component, locator plate 2795, and one-way collar component 3840, a single component equally configured for demountable engagement with a female end of another component.

Figure 120A:
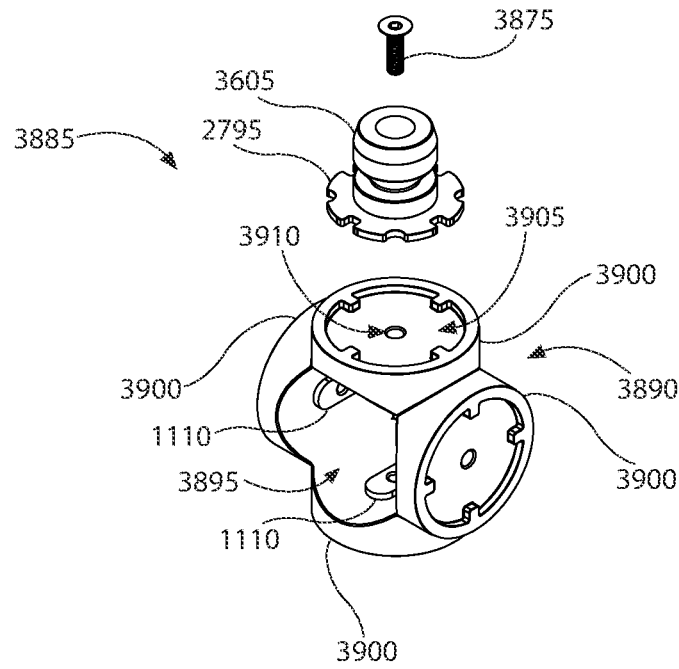
Figure 120B:
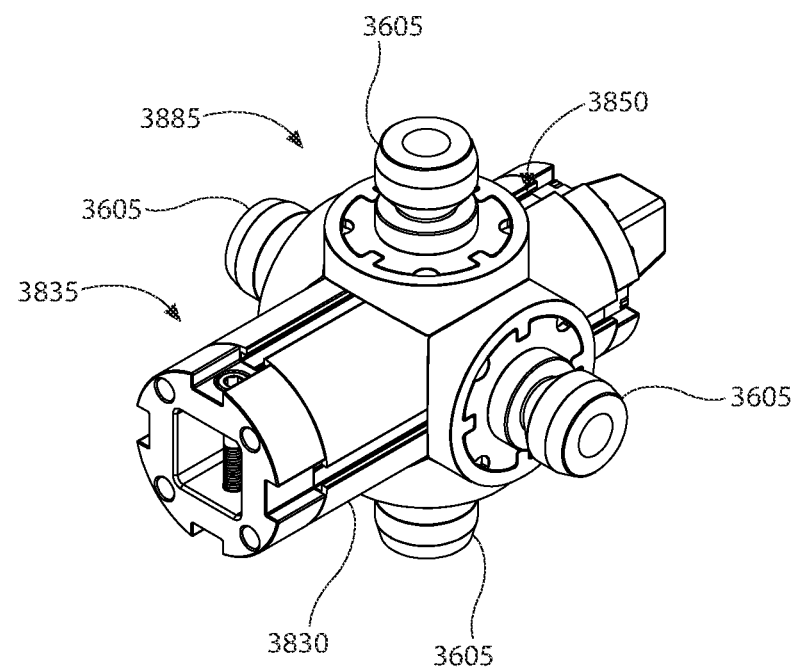

According to further embodiments, optionally a modular assembly may additionally comprise one or more male four-way male side mount collars which may be demountable engaged with the various types of cylindrical structural component as previously described by screws threadably engaged with nuts 1110 in the nut channels or with a threaded core component in a cylindrical structural component. As illustrated in FIG. 120, a four-way male side mount collar 3885 is shown demountably engaged with the cylindrical structural component 3830 of a shorter version of the fixed square socket/tapered square through-hole male end module 3835. The four-way male side mount collar 3885 may comprise a four-way collar component 3890 of which the inner contours of a hollow center 3895 are the same diameter as the cooperating cylindrical structural component 3830 on which it is slidably or demountably engaged by between one and four screws 3875 threadably engaged with nuts 1110 retained within the nut channels 3850, or according to further embodiments, a threaded core component 1125, 2905, 3780 in the cylindrical structural component. The four-way collar component 3890 may comprise four male side mount segments 3900 each with a recess 3905 wherein a locator plate 2795 and one of the various compatible male connector components 2790, 3070, 3095, 3115, 3160, 3205, 3280, 3330, 3400, 3425, 3455, 3605, such as the sloped neck connector components 3605 shown, may be engaged by a screw 3875 of which the threaded portion is passed through the connector component and locator plate and a hole 3910 through the center of the male side mount segment 3900 to be threadably engaged with the nut 1110 or threaded core component. According to further embodiments, the male side mount segment 3900 may additionally comprise a plurality of indexing teeth on the front face which encircles the locator plate 2795, as like the indexing teeth 3635 on the concave base indexing side mount component 3625 previously described in reference to FIGS. 112 to 115, where provided for demountable engagement of the side mount collar 3885 with the sloped clamp socket component 3610. According to further embodiments, a one-way male side mount collar 3885 may comprise, instead of the assembly of the connector component, locator plate 2795, and collar component 3890, a single component equally configured for demountable engagement with a female end of another component.

According to further embodiments, optionally a modular assembly may additionally comprise one or more of a male mount junction module whereby two or more of a locator plate 2795 each in combination with one of the various compatible male connector components may be demountably engaged where provided for conjoining two or more cylindrical structural component modules each comprising at least one female end for demountable engagement with a male connector component of a male mount junction module. An example of a two-way male mount junction module 3915 is shown in FIGS. 121A and 121B comprising a two-way junction component 3920 with two male side mount faces 3925 perpendicular to one another and each with a recess 3930 wherein a locator plate 2795 and one of the various compatible male connector components 2790, 3070, 3095, 3115, 3160, 3205, 3280, 3330, 3400, 3425, 3455, 3605, such as the tapered square through-hole connector components 3095 shown, may be engaged by a screw 3935 of which the threaded portion is passed through the connector component and locator plate and threadably engaged with a threaded hole or threaded insert 3940 in the center of the recess 3930. According to further embodiments, the male side mount faces 3900 may additionally comprise a plurality of indexing teeth which encircles the locator plate 2795 where provided for demountable engagement of the junction module 3915 with the sloped clamp socket component 3610, as like the indexing teeth 3635 on the concave base indexing side mount component 3625 previously described in reference to FIGS. 112 to 115 and as illustrated in FIGS. 121C and 121D on a three-way male mount indexing T-junction module 3945. The example of a three-way male mount indexing T-junction module 3945 is shown in FIGS. 121C and 121D comprising a three-way indexing T-junction component 3950 with three male side mount faces 3955 forming a T-juncture and each with a recess 3960 wherein a locator plate 2795 and one of the various compatible male connector components 2790, 3070, 3095, 3115, 3160, 3205, 3280, 3330, 3400, 3425, 3455, 3605, such as the tapered square through-hole connector components 3095 shown, may be engaged by a screw 3935 of which the threaded portion is passed through the connector component and locator plate and threadably engaged with a threaded hole or threaded insert 3965 in the center of the recess 3960. The male side mount faces 3955 additionally comprise a plurality of indexing teeth 3966 which encircles the locator plate 2795 where provided for demountable engagement of the junction module 3945 with the sloped clamp socket component 3610. According to further embodiments, a three-way male mount T-junction module 3968 may comprise male side mount faces without indexing teeth 3966, as described below in reference to FIG. 124, where engaging with the various components of the system without indexing grooves. According to further embodiments, a two-way male mount junction module 3915 and/or a three-way male mount indexing T-junction module 3945 may comprise, instead of the assembly of the connector component, locator plate 2795, and junction components

3920, 3950, a single component equally configured for demountable engagement with a female end of another component.

An example of a three-way male mount corner-junction module 3970 is shown in FIGS. 122A and 122B comprising a three-way corner-junction component 3975 with three male side mount faces 3980 forming a corner-juncture and each with a recess 3985 wherein a locator plate 2795 and one of the various compatible male connector components 2790, 3070, 3095, 3115, 3160, 3205, 3280, 3330, 3400, 3425, 3455, 3605, such as the tapered square through-hole connector components 3095 shown, may be engaged by a screw 3935 of which the threaded portion is passed through the connector component and locator plate and threadably engaged with a threaded hole or threaded insert 3990 in the center of the recess 3985. An example of a three-way male mount Y-junction module 3995 is shown in FIGS. 122C and 122D comprising a three-way Y-junction component 4000 with three male side mount faces 4005 forming a Y-shaped juncture and each with a recess 4010 wherein a locator plate 2795 and one of the various compatible male connector components, such as the tapered square through-hole connector components 3095 shown, may be engaged by a screw 3935 of which the threaded portion is passed through the connector component and locator plate and threadably engaged with a threaded hole or threaded insert 4015 in the center of the recess 4010. According to further embodiments, the male side mount faces 3980 of the junction module 3970 and/or the male side mount faces 4005 of the junction module 3995 may additionally comprise a plurality of indexing teeth which encircles the locator plate 2795 where provided for demountable engagement of the modules with the sloped clamp socket component 3610, as described previously in reference to FIGS. 112 to 115. According to further embodiments, a three-way male mount corner-junction module 3970 and/or a three-way male mount Y-junction module 3995 may comprise, instead of the assembly of the connector component, locator plate 2795, and junction components 3975, 4000, a single component equally configured for demountable engagement with a female end of another component.

An example of a four-way male mount pyramidal-junction module 4020 is shown in FIGS. 123A and 123B comprising a four-way pyramidal-junction component 4025 with four male side mount faces 4030 forming a four-sided pyramid-shaped juncture and each with a recess 4035 wherein a locator plate 2795 and one of the various compatible male connector components 2790, 3070, 3095, 3115, 3160, 3205, 3280, 3330, 3400, 3425, 3455, 3605, such as the tapered square through-hole connector components 3095 shown, may be engaged by a screw 3935 of which the threaded portion is passed through the connector component and locator plate and threadably engaged with a threaded hole or threaded insert 4040 in the center of the recess 4035. An example of a six-way male mount cubic-junction module 4045 is shown in FIGS. 123C and 123D comprising a six-way cubic-junction component 4050 with six male side mount faces 4055 forming a six-sided cube-shaped juncture and each with a recess 4060 wherein a locator plate 2795 and one of the various compatible male connector components, such as the tapered square through-hole connector components 3095 shown, may be engaged by a screw 3935 of which the threaded portion is passed through the connector component and locator plate and threadably engaged with a threaded hole or threaded insert 4065 in the center of the recess 4060. According to further embodiments, the male side mount faces 4030 of the junction module 4020 and/or the male side mount faces 4055 of the junction module 4045 may additionally comprise a plurality of indexing teeth which encircles the locator plate 2795 where provided for demountable engagement of the modules with the sloped clamp socket component 3610, as described previously win reference to FIGS. 112 to 115. According to further embodiments, a four-way male mount pyramidal-junction module 4020 and/or a six-way male mount cubic-junction module 4045 may comprise, instead of the assembly of the connector component, locator plate 2795, and junction components 4025, 4050, a single component equally configured for demountable engagement with a female end of another component.

According to further embodiments, optionally a modular assembly may additionally comprise one or more of a handle module which may assist the operator in controlling movement of the modular assembly. As illustrated in FIG. 124, a three-way male mount T-junction module 3968 may be demountably engaged with two handle modules 4070 and a socket module 4075 whereby the subassembly shown may be incorporated into a larger modular assembly. The three-way male mount T-junction module 3968 comprises a three-way T-junction component 4080 with three male side mount faces 4085 forming a T-juncture and each with a recess 4090. The middle side mount face is demountably engaged with the socket module 4075 whereby a locator plate 2795 and one of the various compatible male connector components 2790, 3070, 3095, 3115, 3160, 3205, 3280, 3330, 3400, 3425, 3455, 3605, such as the tapered square through-hole connector component 3095 shown, may be engaged by a screw of which the threaded portion is passed through the connector component and locator plate and threadably engaged with a threaded hole or threaded insert 4095 in the center of the recess 4090. The outer two side mount faces 4085 may be demountably engaged each with a handle module 4070 comprising a handle mount component 4100 of which one side is shaped for fitted engagement with a recess 4090 of the junction module 3968 or another of the junction modules or other component of the system comprising the same type of recess, such as the male mount end cap components 2800, 3818 and the concave base side mount component 2885. A threaded handle 4105 is demountably engaged in the handle mount component 4100 whereby a cylindrical end 4110 of the threaded handle is received within a cylindrical cavity 4115 in the handle mount component where a threaded post 4120 extending from the cylindrical end 4110 is passed through a hole 4125 in the center of the mount component to be threadably engaged with the threaded hole or threaded insert 4095 in the cooperating recess of the junction module or other component of the system, thereby securing the threaded handle 4105.

As illustrated in FIG. 125, a handle module 4070 may be demountably engaged with a concave base side mount component 2885 whereby the handle mount component 4100 fits within the recess 2900 of the concave base side mount component 2885 and the threaded post 4120 of the handle 4105 is passed through hole 4125 in handle mount component and the hole 2880 in the center of the side mount component to be threadably engaged with a nut 1110 in a nut channel 4127 along a cylindrical structural component or with a threaded core component through a side mount hole in a socket module 4128 or other module comprising a cylindrical structural component, or with another component comprising a round surface and threaded hole such as a carriage body component 1230.

According to further embodiments, a range of lengths of the various two-channel cylindrical structural component modules 1200, and/or four-channel cylindrical structural component modules 2765, and/or eight-channel cylindrical structural component modules 3794, and/or no-channel cylindrical structural component modules 3775, as well as square track components 1555 and/or octagonal track components 1825, may be optionally assembled with one another and the other structural and functional components of the system, such as device mount components, shelf and/or tray and/or table components, weight components, wheel and/or caster and/or foot components, rail-rolling modules and/or roller carriage assemblies, and/or track assemblies, to form the embodiments of structural support and utility apparatuses as have been described and further examples described below.

A second example of a dual vertical cylindrical rail dolly assembly 4130 is illustrated in FIGS. 126 and 127 configured for vertical movement by one or more devices demountably engaged with two three-sided roller carriage assemblies 2460, as previously described in reference to FIGS. 83 and 85, which may be rolled or secured along a vertically-oriented cylindrical structural component rail assembly. One or both roller carriage assemblies 2460 may comprise one or more adjustable clamping mechanisms 1295 or one or more channel-guide adjustable clamping mechanisms 1345 for slowing descent or stopping the assemblies along the vertical cylindrical structural components.

According to one embodiment, two vertical rails may comprise two or more cylindrical structural components 4135 conjoined end to end by channel braces 2775 as previously described in reference to FIG. 94, secured in the nut channels 4138 by set screws 2785 threadably engaged with the threaded holes 2788 in the channel braces and against the bottoms of the nut channels. As illustrated in FIGS. 126 and 127, two sets of two cylindrical structural components 4135 are conjoined by four channel braces 2775 in the nut channels 4138. According to further embodiments, the length of the rails may be altered by adding or removing cylindrical structural components from the series of conjoined components. Alternatively, each rail may comprise a single cylindrical structural component or module of various types previously described. As illustrated, the bottom ends of the two lower cylindrical structural components are retaining an end cap 2745 and the top ends are retaining a fixed square socket component 3020 whereby the two vertical rails may be secured to one another across the top by an example of a no-channel end cap/end cap module 4140 comprising a threaded core component 1125 and side mount holes 4145 located near the ends of the no-channel cylindrical structural component 4150 whereby two tapered square through-hole male side mounts 2940 are demountably engaged and whereon the two vertical rails are demountably engaged by the fixed square socket components. The no-channel end cap/end cap module 4140 may additionally comprise a further embodiment of an end cap 4155 without channel openings, secured at both ends of the cylindrical structural component 4150 by screws 2750 threadably engaged with the screw channels 4160.

One or more devices may be supported on the bowl/ball mount assembly 2125, or alternatively bowl/ball mount assembly 1395, engaged by screws 2137 directly with threaded holes 2624 in the component mount plate 2625, or as illustrated in FIGS. 126 and 127, atop one or more sets of threaded extension rods 2130, as described previously in reference to FIGS. 74 to 76, threadably engaged with the threaded holes 2624. As previously described in reference to FIG. 90, the component mount plate 2625 additionally comprises the row of holes 2638 whereby screws 2640 are threadably engaged with the threaded holes 2648 in the flat edge of the two plate corner braces 2645 of which the perpendicular concave edges are each demountably engaged with the round side of the cooperating carriage body components 1230 by screws 2650 threadably engaged with threaded holes 4165 in the carriage body components.

According to a preferred embodiment of the dual vertical cylindrical rail dolly assembly 4130, the dolly base of the assembly comprises a second component mount plate 2625 whereon the lower two cylindrical structural components 4135 of the vertical rails are demountably engaged by four plate corner braces 2645 of which the concave edges are secured by screws 2650 threadably engaged with nuts 1110 retained within the cooperating nut channels 4138. The flat edge of each plate corner brace is demountably engaged to the top of the component mount plate 2625 by two screws 2640 threadably engaged with two of the three threaded holes 2648. The third of the threaded holes which are aligned over the corners of the component mount plate 2625 are in this instance unavailable due to the holes 2638 in the corners of the plate being in use by a screw 4170 oriented in the opposite direction downward to be threadably engaged, through a concave base component 1041 as previously described, with a nut 1110 retained within the upward nut channel of a further embodiment of a fixed square socket/ end cap module 4175 extending out from each corner of the component mount plate 2625. The flat edge of the plate corner braces 2645 may additionally comprise recesses 4180 within which the threaded holes 2648 are located and whereby the protruding head of an overlapping screw 4170 as described used in the opposite direction from the corner brace may be located without interfering with the flat edge of the corner brace mounted there. The component mount plate 2625 may additionally comprise the inset cylindrical structural component mount holes 2675 whereby each outward fixed square socket/end cap module 4175 is engaged for structural reinforcement by a second screw 4170 inserted through a second concave base component 1041 threadably engaged with a nut 1110 in the upward nut channel.

The outer socket ends of the modules 4175 are demountably engaged each with a cylindrical mount component 2685 by a tapered square male side mount 2940 and wherein a caster 2600 with a threaded post 2595 is threadably engaged to the central threaded hole 2700 in the cylindrical mount components to allow for rolling movement of the dolly assembly 4130 on the ground and to be adjustably levelled on the threaded posts 2595 within the threaded cylindrical mount components 2685. According to further embodiments where rolling movement is not required, threaded foot components 2000 as previously described may be demountably engaged with the cylindrical mount components allowing a stand assembly to be levelled on the threaded feet. A stiffener plate 4185 may optionally be demountably engaged by screws 4190 threadably engaged with nuts 1110 in the sideward nut channels of the modules 4175, and a screw 4190 threadably engaged with a threaded hole 4195 in the circumferential surface of each cylindrical mount component 2685, there providing reinforcement of the connection between the components. For added stability of the dolly base, weight components 1335 may be demountably engaged by screws 1337 passed through holes in the weight components and threadably engaged with the threaded holes 2725 on the circumferential surface of the four cylindrical mount components 2685.

According to further embodiments, as illustrated in FIGS. 128 and 129, various modules and components of the systems disclosed herein may be assembled as shelving systems and utility carts configured for storing and/or transporting equipment, properties, materials, supplies, and the like around a worksite or other location. An example of a stackable tray assembly 3135 is shown in FIGS. 128A and 128B comprising a tray bottom 4200 which has a cut-out 4205 at each corner. It is to be noted that a tray bottom may be rectangular or square or trapezoidal or triangular or pentagonal or hexagonal or heptagonal or octagonal in shape. An example of a rectangular-shaped tray bottom 4200 is shown having four cut-outs 4205 at each corner for insertion and demountable engagement of varying lengths of any four-channel cylindrical structural component module 2765 or eight-channel cylindrical structural component module 3794 or no-channel cylindrical structural component module 3775 which when engaged embody the tray assembly's structural corner posts. Adjacent to each cut-out 4205, the tray bottom 4200 additionally comprises collar holes 4210 whereby a collar 4220 is demountably secured to the tray bottom 4200 by screws 4225 of which the threaded portion is passed through the collar holes into threaded holes 4230 in the top of the collar 4220.

In this example of a tray assembly 3135, four of a fixed square socket/tapered square through-hole male end module 4235 are provided where passed through a combined eight collars 4220 and tray bottom 4200. The modules 4235 may be demountably secured within the center of each collar by screws 4225 through sideward holes 4238 in the collar, and threadably engaged with nuts 1110 retained within the nut channels 4240, or according to further embodiments, with a threaded core component 1125, 2905, 3780 within the cooperating cylindrical structural component. One or more side panels 4245 may be demountably engaged with the tray bottom 4200 by screws 4225 through holes 4248 in the side panels to be threadably engaged with threaded holes 4250 in the side edges of the tray bottom. The side panels 4245 may be further secured near the top by screws 4225 through holes 4252 threadably engaged with sideward threaded holes 4255 in the collars 4220. Optionally, when side panels are not included in an alternative shelf assembly, the upper collars 4220 may also be excluded. In an assembly such as the example shown in FIG. 128 in which the collars 4220 are engaged by nuts 1110 within nut channels along the corner modules, the tray bottom 4200 and side panels 4245 may be raised or lowered by loosening the screws 4225, adjusting to a new position, and then retightening the screws.

The fixed square socket components 3020 and the tapered square through-hole male ends 2935 provided at the opposite ends of the corner post modules 4235 allow for two or more tray assemblies to be easily stacked and unstacked and demountably engaged to one another. A second example of a utility cart assembly 4260 is shown in FIG. 129 with three tray assemblies demountably engaged by the male ends within the female ends of the adjacent tray assembly. The utility cart assembly 4260 comprises at the top the tray assembly 3135 shown in FIG. 128 comprising four side panels 4245, and a second example of a stackable tray assembly 4265 in the middle comprising the same four corner modules 4235 with three side panels 4245, and a third example of a stackable tray assembly 4270 at the bottom comprising three side panels 4245 and where the corner modules are replaced by four fixed square socket/threaded-post end cap modules 4275. The downward ends of the fixed square socket/threaded-post end cap modules 4275 comprise a threaded-post end cap component 4280 secured by screws

2750 threadably engaged with the screw channels of the module's cylindrical structural component. The threaded-post end cap component 4280 comprises a central threaded hole 4285 whereby a caster 2600 with a threaded post 2595 may be threadably engaged with the central threaded hole to allow rolling movement of the utility cart assembly 4260 and allowing it to be adjustably levelled on the threaded posts 2595. According to further embodiments where only a standing shelf assembly is required, alternatively threaded foot components 2000 as previously described may be demountably engaged with the threaded-post end cap components 4280.

According to further embodiments, as illustrated in FIGS. 130 and 131, various modules and components of the systems disclosed herein may be assembled with various shapes and sizes of platform components to form a variety of staging platforms and table or desk assemblies. An example of a table assembly 4290 is shown in FIGS. 130 and 131 comprising a platform component 4295 supported by four of a further embodiment of double fixed square socket modules 4300 which form a horizontal square frame which stands on four of another embodiment of double fixed square socket modules 4305 embodying the table legs. It is to be noted that a platform component may be rectangular or square or trapezoidal or triangular or pentagonal or hexagonal or heptagonal or octagonal in shape. The frame and leg modules may comprise varying lengths of any of the four-channel cylindrical structural component modules 2765 or eight-channel cylindrical structural component modules 3794 or no-channel cylindrical structural component modules 3775 comprising female ends. The leg modules according to further embodiments may alternatively comprise an upward female end and a downward end with a terminal end cap 2745, or optionally a threaded-post end cap 4280 whereby threaded casters 2600 may be included for a moveable table assembly which may also be levelled on the threaded casters, or threaded foot components 2000 on which a standing table may be positioned and levelled.

According to one embodiment, the table assembly 4290 comprises the four square frame double fixed square socket modules 4300 demountably engaged at each corner with the adjacent same modules via a three-way male mount corner-junction module 3970, as previously described in reference to FIGS. 122A and 122B. Each of the four leg component double fixed square socket modules 4305 are demountably engaged with the downward male connector component 3095 of the junction modules 3970. The table assembly 4290 further comprises the square-shaped platform component 4295 with two holes 4310 near each corner through which the threaded portion of screws 4225 are inserted and threadably engaged with the threaded holes 4255 in the two collars 4220, as previously described in reference to FIG. 128, which are secured on the frame socket modules 4300 near their ends in alignment with the holes 4310 in the platform component 4295 whereby the platform component is secured by the screws 4225.

NUMBERING KEY

| | |
|---|---|
| 10 | closed-tube rotator module (FIG. 1, 2) |
| 11 | rotator receptacle |
| 15 | closed-tube housing |
| 18 | tube-end screw slot |
| 20 | rotator receptacle assembly (FIG. 5) |
| 21 | lock-spring rotator half-socket |
| 22 | lock-release rotator half-socket |
| 23 | screw |

-continued

NUMBERING KEY

| | |
|---|---|
| 24 | outer bushing channel |
| 26 | outer bushing |
| 28 | inner bushing channel |
| 30 | inner bushing |
| 32 | pivot-lock channel |
| 34 | square-nut slot |
| 36 | square nut |
| 38 | side-mount bore |
| 40 | retaining-lock set screw |
| 42 | retaining-lock screw bore |
| 44 | release button hole |
| 50 | retaining lock |
| 52 | retaining half-lock with spring receptacles |
| 54 | retaining half-lock with release button |
| 55 | retaining lock-release button |
| 56 | biasing spring |
| 58 | tension-adjustment screw knob |
| 60 | pivot lock |
| 62 | pivot-lock indexing peg |
| 64 | pivot-lock button |
| 65 | lock-hold tab |
| 70 | male component |
| 71 | male member closed-tube end assembly |
| 74 | pivot-lock sprocket |
| 78 | wide pivot segment |
| 79 | octagonal boss |
| 81 | octagonal recess |
| 82 | prongs |
| 84 | narrow pivot segment |
| 86 | retaining-lock chamfer |
| 87a | first collar (with leading chamfer 86) |
| 87b | second collar |
| 88 | neck |
| 89 | threaded bore |
| 90 | connector screw |
| 100 | closed-tube rotator hub assembly (FIG. 3A) |
| 101 | 6-way closed-tube rotator hub assembly (FIG. 3B) |
| 110 | male member side-mount assembly (FIG. 3A, B) |
| 112 | pivot-lock sprocket |
| 116 | wide pivot component |
| 118 | octagonal boss |
| 120 | bolt |
| 151 | double-receptacle extension-tube rotator module (FIG. 4) |
| 152 | 4-way double-receptacle extension-tube rotator hub assembly (FIG. 5) |
| 155 | extension-tube housing |
| 160 | side-mount bore |
| 162 | retaining-lock screw bore |
| 164 | release button hole |
| 168 | tube-end screw slot |
| 170 | longitudinal square-nut channel |
| 180 | middle square-nut holder |
| 182 | tube rail channels |
| 184 | positioning-rod threaded bore |
| 186 | positioning set screw |
| 201 | closed-tube joiner hub assembly (FIG. 6A) |
| 210 | 5-way closed-tube joiner hub assembly (FIG. 6B, 7) |
| 211 | joiner receptacle |
| 215 | joiner closed-tube housing |
| 216 | pivot-lock sprocket |
| 218 | tube-end screw slots |
| 220 | joiner receptacle assembly |
| 221 | lock-spring joiner half-socket |
| 222 | lock-release joiner half-socket |
| 223 | prong-retaining slot (FIG. 6, 7) |
| 224 | outer bushing channel |
| 228 | inner bushing channel |
| 234 | square-nut slot |
| 238 | side-mount bore |
| 244 | release button hole |
| 251 | male/receptacle side-opening joiner module (FIG. 8) |
| 252 | side-opening receptacle |
| 255 | extension-tube housing |
| 256 | longitudinal square-nut channel |
| 257 | tube-end screw slots |
| 258 | side-mount bore |
| 260 | side-opening receptacle component |

NUMBERING KEY

| | |
|---|---|
| 262 | prong-retaining slot |
| 265 | side connector screw |
| 268 | side-opening receptacle cover |
| 270 | male member extension-tube end assembly |
| 271 | male member tube-end plate |
| 272 | pivot-lock sprocket (FIG. 8B, 10) |
| 274 | wide pivot segment |
| 275 | octagonal boss |
| 278 | screw hole |
| 281 | double-male joiner module (FIG. 9) |
| 282 | double-male component |
| 284 | pivot-lock sprocket (FIG. 9) |
| 286 | wide pivot segment |
| 288 | octagonal boss |
| 291 | double-male extension-tube joiner module (FIG. 10) |
| 295 | extension-tube housing |
| 296 | square-nut channel |
| 297 | tube-end screw slot |
| 298 | side-mount bore |
| 301 | 6-way extension-tube joiner hub assembly (FIG. 11) |
| 311 | double-male adapter joiner module (FIG. 12) |
| 312 | adapter joiner component |
| 314 | alternative male member component |
| 316 | threaded screw slot |
| 320 | 2-way 30° side-mount bracket module (FIG. 13A) |
| 322 | 30° angle male member mount bracket |
| 323 | mount screw hole |
| 325 | mount screw |
| 326 | 60° angle between the 110s |
| 328 | clamp bracket |
| 329 | clamp bracket screw |
| 330 | 4-way multi-angle side-mount bracket module (FIG. 13B) |
| 331 | mount screw hole |
| 332 | mount screw |
| 334 | 30°/45°/60° angled bores |
| 335 | multi-angle male member mount bracket |
| 336 | bracket screw bore |
| 338 | bracket screw |
| 339 | washer |
| 340 | 2-way 90° offset side-mount bracket module (FIG. 13C) |
| 341 | 90° angle offset male member mount bracket |
| 342 | mount screw hole |
| 346 | screw-access opening |
| 350 | 1-way 45° offset side-mount bracket module (FIG. 13D) |
| 351 | cylindrical 45° offset male member mount bracket |
| 352 | mount screw hole |
| 353 | central bore |
| 354 | peg hole |
| 355 | elbow male member mounting block module |
| 356 | cube male member mounting block module |
| 357 | triangular male member mounting block module |
| 358 | pyramidal male member mounting block module |
| 359 | hexagonal male member mounting block module |
| 360 | octagonal male member mounting block module |
| 361 | male member flat-mount assembly |
| 362 | pivot-lock sprocket (FIG. 13) |
| 363 | central bore |
| 365 | peg |
| 366 | wide pivot component slot |
| 367 | wide pivot component |
| 368 | connector teeth |
| 369 | octagonal boss |
| 370 | 2-way elbow male member mounting block |
| 371 | central bore |
| 372 | peg holes |
| 373 | 6-way cube male member mounting block |
| 374 | central bore |
| 375 | peg hole |
| 376 | 5-way triangular mounting block |
| 377 | 4-way pyramidal mounting block |
| 378 | 8-way hexagonal mounting block |
| 379 | 10-way octagonal mounting block |
| 380 | 5° increment adjustable male member mount module (FIG. 15) |
| 381 | male-mount half housing |
| 382 | side-mount bore |
| 383 | adjustment screw through-hole |
| 384 | peg hole |

NUMBERING KEY

| | |
|---|---|
| 385 | adjustment screw |
| 386 | rotation-adjustment half housing |
| 387 | threaded bore |
| 388 | 5° increment teeth |
| 389 | bracket screw bore |
| 390a | bracket 1 |
| 390b | bracket 2 |
| 391 | bracket screw |
| 392 | bracket screw bore |
| 393 | central bore |
| 394 | peg hole |
| 395 | alternative male member side-mount assembly |
| 396 | pivot-lock sprocket |
| 397 | central bore |
| 399 | wide pivot component slot |
| 400 | baseplate assembly (FIG. 16) |
| 402 | baseplate body assembly |
| 402a | baseplate top plate |
| 402b | baseplate bottom plate |
| 404 | mounting screw |
| 405 | baseplate bore |
| 406 | baseplate screw |
| 408 | mounting bracket slot |
| 410 | mounting bracket |
| 412 | bracket arm |
| 413 | threaded bore |
| 415 | bracket side plate |
| 416 | side plate threaded bore |
| 417 | support plate |
| 418 | support pad |
| 419 | side plate screw |
| 420 | male member plate assembly |
| 422 | mounting plate |
| 423 | pivot-lock sprocket |
| 424 | wide pivot segment |
| 425 | octagonal boss |
| 426 | screw hole |
| 428 | screws |
| 430 | baseplate assembly (FIG. 17) |
| 435 | tool mount plate |
| 436 | mounting screw |
| 437 | tool-mounting slot |
| 440 | plate screw holes |
| 441 | access bores |
| 442 | screws |
| 445 | plate wedges |
| 446 | plate screw bores |
| 447 | bracket screw holes |
| 450 | male mount slider component |
| 452 | mounting holes |
| 453 | mount screws |
| 454 | central bore |
| 455 | peg holes |
| 456 | bracket screw bores |
| 460 | double-receptacle extension-tube joiner module (FIG. 17) |
| 465 | male/receptacle extension-tube joiner module (FIG. 17) |
| 466 | longitudinal channel |
| 470 | tray module assembly (FIG. 18) |
| 471 | tray bottom |
| 472 | orifice |
| 473 | collar bores |
| 474 | collar |
| 475 | double-receptacle extension-tube joiner module |
| 476 | collar screw |
| 477 | longitudinal square-nut channel |
| 478 | side panel |
| 479 | side panel screw |
| 480 | desk assembly (FIG. 19) |
| 481 | desk top |
| 482 | shelf |
| 483 | plate recess |
| 484 | mounting plate |
| 485 | threaded bore |
| 486 | screw bores (x5 per side) |
| 487 | plate screws (x5 per side) |
| 488 | double-receptacle side-opening joiner module |
| 489 | double-receptacle side-opening joiner module |

-continued

-continued

NUMBERING KEY

| | |
|---|---|
| 490 | lighting mount module (FIG. 20A, B) |
| 492 | extension-tube housing |
| 494 | spigot mount plate |
| 495 | tube-end screw bores |
| 496 | threaded bore |
| 497 | screw |
| 498 | demountable ⅝" spigot |
| 500 | lighting mount module (FIG. 20C, D) |
| 501 | spigot-adapter male member component |
| 502 | spigot |
| 503 | spigot receptacle |
| 504 | set screw |
| 505 | screw bore |
| 506 | pivot-lock sprocket |
| 507 | wide pivot segment |
| 510 | rail-rolling module (FIG. 21A, 22) |
| 512 | carriage plate |
| 514 | spring-suspension roller assembly |
| 516 | axle block |
| 518 | roller |
| 520 | axle bolt |
| 522 | spring block |
| 524 | suspension bolt |
| 526 | spring tension set-screw |
| 528 | spring tension plate |
| 530 | spring |
| 532 | spacer plate |
| 535 | fixed roller assembly |
| 536 | axle block |
| 537 | rail-surround rolling module assembly (FIG. 21B, 22) |
| 538 | side plate |
| 540 | friction-pad plate |
| 542 | friction pad |
| 544 | tension adjustment knob |
| 546 | pad plate spring |
| 548 | retaining ring |
| 550 | wheel module assembly (Fig. 23A, B) |
| 551 | wheel-axle tube-end component |
| 551a | central threaded bore |
| 551b | offset threaded bores |
| 552 | wheel |
| 554 | axle bolt |
| 555 | wheel-axle/receptacle side-opening joiner module |
| 560 | caster wheel module assembly (Fig. 23C, D) |
| 562 | mount component |
| 564 | threaded bore |
| 566 | peg hole |
| 568 | caster wheel |
| 580 | leveling foot module (FIG. 24A, B) |
| 581 | adjustable foot component |
| 582 | threaded leveling rod |
| 583 | foot end |
| 584 | nut |
| 585 | foot plate module (FIG. 24C) |
| 586 | foot plate |
| 587 | threaded bores |
| 590 | pivotable support module (FIG. 25) |
| 592 | pivot bracket |
| 593 | lock nut |
| 594 | pad component |
| 595 | threaded bores |
| 596 | suction-cup component |
| 598 | knob |
| 599 | washer |
| 600 | weight module assembly (FIG. 26) |
| 602 | weight component |
| 603a | outer bores |
| 603b | center bore |
| 604 | bolt |
| 605 | double-receptacle extension-tube rotator module (similar to FIG. 4) |
| 606 | extension-tube housing |
| 608 | longitudinal square-nut channel |
| 610 | telescoping extension module (Fig. 27) |
| 612 | extension-tube housing |
| 614 | rod-retaining component |
| 616 | rod-retaining plate |

NUMBERING KEY

| | |
|---|---|
| 618 | adjustment collar component |
| 619 | screws |
| 620 | threaded rod |
| 621 | second threaded portion |
| 622 | spacer plate |
| 624 | lock nut |
| 625 | grip end-cap module (FIG. 28) |
| 626 | handle grip component |
| 627 | semi-circular end-cap portion |
| 628 | hand grip portion |
| 629 | inner sleeve |
| 630 | prong-retaining slot |
| 631 | outer sleeve |
| 632 | retainer tab |
| 635 | shell end-cap module (FIG. 29) |
| 636 | half-shell cap |
| 637 | screw |
| 638 | bore |
| 640 | male/receptacle extension-tube rotator module (FIG. 29) |
| 641 | female dome pad end-cap module (FIG. 30A, B) |
| 642 | female dome pad |
| 643 | collapsible framework |
| 645 | central orifice |
| 646 | female dome mounting plate |
| 647 | bores |
| 648 | screw |
| 649 | mounting plate orifice |
| 650 | male dome pad end-cap module (FIG. 30C, D) |
| 652 | male dome pad |
| 653 | dome collapsible framework |
| 654 | male dome mounting plate |
| 656 | bore |
| 657 | peg holes |
| 658 | bores |
| 660 | seat module (FIG. 31) |
| 662 | seat pad |
| 670 | bumper end-cap module (FIG. 32) |
| 672 | bumper component |
| 674 | screw |
| 680 | soft end-cap component (Fig. 33A, B, C) |
| 681 | elongate leg component |
| 682 | mount plate |
| 683 | bores |
| 685 | screws |
| 686 | inserts |
| 688 | soft dome component |
| 689 | threaded bore |
| 690 | hard end-cap component |
| 691 | leg component |
| 692 | retaining-lock chamfer |
| 693 | flat surface |
| 695 | flat end-cap component |
| 696 | bore |
| 697 | extension-tube housing |
| 698 | threaded screw slot |
| 700 | crab-steering dolly system |
| 710 | 10-unit double-receptacle extension-tube rotator module |
| 720 | 3-unit male/receptacle extension-tube joiner module |
| 730 | 18-unit double-receptacle extension-tube joiner module |
| 740 | 36-unit double-receptacle extension-tube joiner module |
| 750 | 4-unit male/receptacle extension-tube joiner module |
| 754 | 12-unit male/receptacle extension-tube joiner module |
| 756 | 4-unit double-male extension-tube joiner module |
| 760 | vertical rail-tracking dolly system |
| 765 | 18-unit male/receptacle extension-tube joiner module |
| 770 | lateral mounted rail-tracking dolly system |
| 780 | rolling jib system |
| 790 | 10-unit double-receptacle extension-tube joiner module |
| 800 | 10-unit wheel-axle/receptacle side-opening joiner module |
| 810 | low-angle baseplate support system |
| 820 | 4-unit male/receptacle extension-tube rotator module |
| 830 | 18-unit double-receptacle extension-tube rotator module |
| 840 | 1-unit double-male extension-tube joiner module |
| 850 | lateral ground rail-backing dolly system |
| 860 | double-baseplate A-frame dolly system |
| 870 | four-caster baseplate dolly system |
| 880 | hand-held camera stabilizer assembly |

NUMBERING KEY

| | |
|---|---|
| 900 | vertical rail-tracking stand assembly |
| 910 | lighting support rack system |
| 920 | 36-unit double-receptacle extension-tube rotator module |
| 930 | A-frame spooling cart system |
| 940 | 6-unit male/receptacle side-opening joiner module |
| 950 | pull cart assembly |
| 955 | 3-unit double-male extension-tube joiner module |
| 960 | utility cart assembly |
| 980 | modular workstation assembly |
| 990 | table top |
| 995 | under-shelf |
| 1000 | male connector |
| 1001 | concave base male assembly |
| 1005 | flat base male assembly |
| 1008 | female end |
| 1010 | double side-opening socket module |
| 1015 | cylindrical structural component |
| 1020 | side-opening socket component |
| 1025 | receptacle |
| 1027 | screws |
| 1028 | holes |
| 1029 | screw channels |
| 1030 | pronged connector component |
| 1035 | prongs |
| 1040 | indented portion |
| 1041 | concave base component |
| 1042 | locator holes |
| 1043 | locator posts |
| 1044 | flat base component |
| 1045 | locator holes |
| 1046 | male connector channels |
| 1050 | prong-retaining slots |
| 1055 | screw/bolt |
| 1060 | hole |
| 1070 | socket through-hole |
| 1075 | connector through-hole |
| 1080 | side-opening receptacle cover |
| 1085 | threaded hole/insert |
| 1090 | prong-retaining slots |
| 1095 | narrow end |
| 1100 | connector indentations |
| 1102 | receptacle cover indentations |
| 1104 | channel openings |
| 1110 | nut |
| 1111 | nut channel |
| 1120 | screw/bolt |
| 1125 | threaded core component |
| 1127 | cylindrical structural component |
| 1130 | threaded insert |
| 1135 | side mount hole |
| 1140 | nut |
| 1142 | threaded insert |
| 1145 | side mount hole |
| 1150 | flat base locator posts |
| 1155 | flat end cap component |
| 1156 | locator holes |
| 1160 | screw/bolt |
| 1165 | threaded hole |
| 1170 | screws |
| 1175 | holes |
| 1180 | screw channels |
| 1183 | male end |
| 1185 | channel openings |
| 1190 | nut channel |
| 1200 | cylindrical structural component module |
| 1201 | side-opening socket/end cap module |
| 1203 | track assembly |
| 1205 | roller carriage assembly |
| 1215 | four-sided clamping roller carriage assembly |
| 1220 | vertical single track assembly |
| 1225 | end cap/end cap module |
| 1226 | cylindrical track component |
| 1227 | bumper component |
| 1228 | screw |
| 1230 | carriage body component |
| 1235 | roller mount |
| 1237 | corner brace mount |

| | |
|---|---|
| 1242 | screw |
| 1244 | threaded hole |
| 1246 | screw |
| 1247 | threaded hole |
| 1250 | roller |
| 1251 | shoulder screw |
| 1252 | threaded hole |
| 1255 | corner brace |
| 1257 | threaded hole |
| 1260 | screw/bolt |
| 1261 | threaded hole |
| 1262 | threaded hole |
| 1265 | screw |
| 1266 | side mount hole |
| 1268 | nut channel |
| 1270 | stud mount component |
| 1275 | dovetail plate mount assembly |
| 1280 | channel-guide component |
| 1282 | side channel |
| 1285 | slidable guide element |
| 1286 | screw |
| 1287 | guide mount element |
| 1288 | screw |
| 1289 | threaded hole |
| 1290 | double side-opening socket module |
| 1295 | adjustable clamping mechanism |
| 1297 | threaded knob |
| 1298 | threaded rod |
| 1299 | hole |
| 1300 | lock nut |
| 1302 | threaded carrier |
| 1303 | threaded hole |
| 1305 | concave friction pad |
| 1307 | threaded hole |
| 1308 | screws |
| 1310 | friction pad mount plate |
| 1311 | screws |
| 1314 | guide block |
| 1315 | angled slot |
| 1316 | angled protrusions |
| 1318 | threaded hole |
| 1319 | shoulder screws |
| 1320 | through-holes |
| 1325 | track base assembly |
| 1326 | vertical single track base assembly |
| 1330 | four-sided pyramidal male connector mount |
| 1335 | weight component |
| 1337 | screw |
| 1338 | weight through-holes |
| 1339 | nut channel |
| 1340 | single-sided roller carriage assembly |
| 1345 | channel-guide adjustable clamping mechanism |
| 1346 | threaded holes |
| 1347 | cylindrical track channel-guide friction pad |
| 1348 | pad protrusion |
| 1350 | sliding carriage assembly |
| 1355 | side channels |
| 1360 | cylindrical structural component |
| 1370 | track dolly assembly |
| 1375 | single-sided roller carriage assembly |
| 1380 | multidirectional component mount |
| 1385 | cylindrical structural component module |
| 1390 | device mount plate |
| 1395 | bowl/ball mount assembly |
| 1400 | steel-pipe track assembly |
| 1405 | roller mounts |
| 1410 | screw |
| 1420 | roller |
| 1425 | shoulder screw |
| 1430 | threaded hole |
| 1435 | screw |
| 1440 | threaded hole |
| 1450 | screw |
| 1455 | nut channel |
| 1460 | threaded side mount hole |
| 1465 | female mating component |
| 1470 | female segment |

| NUMBERING KEY | |
| --- | --- |
| 1475 | octagonal shaped receptacle |
| 1480 | male mating component |
| 1485 | male segment |
| 1490 | screw/bolt |
| 1495 | female segment through-holes |
| 1500 | male segment through-holes |
| 1505 | male segment threaded holes |
| 1508 | through-holes |
| 1510 | through-holes |
| 1515 | screw |
| 1520 | plate through-hole |
| 1525 | concave base through-hole |
| 1530 | bowl screw |
| 1532 | bowl mount |
| 1535 | threaded holes |
| 1540 | ball adapter |
| 1544 | screw/bolt |
| 1548 | locking handle |
| 1550 | four-sided clamping square track roller carriage assembly |
| 1555 | square track component |
| 1560 | square roller mount |
| 1570 | screw |
| 1580 | threaded hole |
| 1590 | roller |
| 1595 | shoulder screw |
| 1600 | threaded hole |
| 1605 | washer |
| 1610 | threaded hole |
| 1620 | square track adjustable clamping mechanism |
| 1625 | threaded knob |
| 1630 | threaded rod |
| 1635 | hole |
| 1640 | lock nut |
| 1645 | threaded carrier |
| 1650 | threaded hole |
| 1655 | flat friction pad |
| 1660 | threaded hole |
| 1665 | screws |
| 1670 | friction pad mount plate |
| 1675 | screws |
| 1680 | guide block |
| 1685 | angled slot |
| 1690 | angled protrusions |
| 1695 | through-holes |
| 1700 | single-sided square track roller carriage assembly |
| 1705 | square track channel-guide adjustable clamping mechanism |
| 1710 | square track channel-guide friction pad |
| 1715 | threaded holes |
| 1720 | pad protrusion |
| 1725 | side channel |
| 1730 | square track component |
| 1735 | three-sided square track roller carriage assembly |
| 1740 | rectangular track component |
| 1742 | side channels |
| 1745 | four-sided square track sliding carriage assembly |
| 1750 | four-sided square track roller carriage assembly |
| 1755 | square track component |
| 1760 | square roller mount |
| 1765 | screws |
| 1770 | holes |
| 1775 | rollers |
| 1780 | shoulder screw head retaining section |
| 1785 | central through-hole section |
| 1790 | threaded hole section |
| 1795 | washers |
| 1800 | shoulder screw |
| 1810 | threaded hole |
| 1820 | four-sided octagonal track clamping roller carriage assembly |
| 1825 | octagonal track component |
| 1830 | octagonal roller mount |
| 1835 | screw |
| 1840 | roller |
| 1845 | shoulder screw |
| 1850 | threaded hole |
| 1855 | octagonal track adjustable clamping mechanism |
| 1860 | screw |
| 1865 | threaded hole |

| NUMBERING KEY | |
| --- | --- |
| 1870 | octagonal track friction pad |
| 1872 | octagon contact faces |
| 1875 | threaded hole |
| 1890 | four-sided pivoting roller carriage assembly |
| 1895 | curvilinear track |
| 1900 | pivoting roller mount |
| 1902 | outer screws |
| 1904 | central screw |
| 1906 | outer threaded holes |
| 1908 | central threaded hole |
| 1910 | roller |
| 1915 | shoulder screw |
| 1920 | threaded hole |
| 1925 | pivoting axle component |
| 1928 | axle mount |
| 1930 | pivot pin |
| 1935 | axle pin hole |
| 1936 | mount pin hole |
| 1940 | central through-hole |
| 1945 | pin through-hole |
| 1950 | bushing |
| 1960 | 360-degree panning dolly assembly |
| 1970 | circular track assembly |
| 1980 | single-sided pivoting roller carriage assembly |
| 1985 | threaded hole |
| 1990 | screw/bolt |
| 1995 | ring component |
| 2000 | foot component |
| 2005 | curved foot mounts |
| 2010 | screw |
| 2015 | track dolly assembly |
| 2020 | adjustable-level track assembly |
| 2025 | single-sided roller carriage assembly |
| 2030 | cylindrical structural component |
| 2035 | rail joiner component |
| 2040 | midsection |
| 2042 | threaded hole |
| 2045 | fitted section |
| 2050 | screw |
| 2052 | holes |
| 2055 | threaded hole |
| 2060 | double side-opening socket module |
| 2065 | gooseneck assembly |
| 2070 | screw |
| 2075 | side mount hole |
| 2080 | gooseneck mount component |
| 2082 | narrow concave section |
| 2085 | narrow neck section |
| 2090 | plate mount face |
| 2095 | gooseneck mount plate |
| 2100 | threaded foot component |
| 2102 | threaded foot |
| 2105 | concave mount |
| 2108 | screw |
| 2110 | low-angle track dolly assembly |
| 2115 | adjustable-level closed track assembly |
| 2120 | two-sided roller carriage assembly |
| 2125 | bowl/ball mount assembly |
| 2130 | threaded extension rod |
| 2135 | threaded screw end |
| 2137 | screw |
| 2138 | bowl mount component |
| 2139 | threaded hole end |
| 2140 | ball adapter |
| 2142 | half-ball component |
| 2144 | threaded post component |
| 2146 | screw |
| 2150 | locking handle |
| 2155 | device mount screw |
| 2157 | rod plate |
| 2158 | rod plate hole |
| 2160 | height-adjustable dual rail track dolly assembly |
| 2162 | dual rail assembly |
| 2165 | rail |
| 2170 | three-sided roller carriage assembly |
| 2175 | side channel |
| 2180 | cylindrical structural component |

NUMBERING KEY

| | |
|---|---|
| 2185 | side mount bracket |
| 2190 | screw |
| 2195 | hole |
| 2200 | screw |
| 2205 | threaded hole |
| 2210 | perpendicular face |
| 2215 | hole |
| 2220 | rail support vertical post module |
| 2230 | nut channel |
| 2235 | cylindrical structural component |
| 2240 | nut channel |
| 2245 | cylindrical structural component |
| 2250 | vertical center post module |
| 2255 | dolly base assembly |
| 2260 | vertical cross-support assembly |
| 2265 | cylindrical mount component |
| 2270 | screw |
| 2275 | threaded hole |
| 2280 | double side-opening socket module |
| 2285 | screw |
| 2290 | threaded hole |
| 2295 | caster |
| 2300 | threaded post |
| 2305 | central threaded hole |
| 2310 | second caster |
| 2315 | caster mount plate |
| 2320 | double side-opening socket module |
| 2322 | 45-degree mount component |
| 2325 | nut channel |
| 2330 | threaded hole |
| 2335 | second height-adjustable dual rail track dolly assembly |
| 2340 | dual rail assembly |
| 2345 | parallel brace |
| 2350 | rail module |
| 2355 | screw |
| 2360 | through-hole |
| 2365 | nut channel |
| 2370 | three-sided roller carriage assembly |
| 2375 | bridge plate |
| 2380 | screw |
| 2385 | through-hole |
| 2390 | through-hole |
| 2395 | threaded hole |
| 2400 | three-sided clamping roller carriage assembly |
| 2405 | cylindrical structural component |
| 2410 | side-opening socket/end cap module |
| 2420 | stud |
| 2425 | stud brace |
| 2430 | screw |
| 2435 | screw |
| 2440 | through-hole |
| 2442 | nut channel |
| 2445 | light |
| 2450 | receiver |
| 2455 | dual vertical cylindrical rail dolly assembly |
| 2460 | three-sided clamping roller carriage assembly |
| 2462 | dual rail assembly |
| 2465 | dolly base assembly |
| 2470 | rail module |
| 2472 | end cap/end cap module |
| 2475 | narrow corner brace |
| 2480 | screw |
| 2482 | through-hole |
| 2485 | screw |
| 2488 | screw |
| 2490 | through-hole |
| 2491 | screw |
| 2493 | end cap/end cap module |
| 2494 | screw |
| 2495 | side-opening socket/end cap module |
| 2497 | side-opening socket/ end cap module |
| 2500 | dual vertical square rail dolly assembly |
| 2510 | dual square rail assembly |
| 2520 | dolly base assembly |
| 2530 | square rail component |
| 2540 | square structural component |
| 2545 | bracket |

| | |
|---|---|
| 2550 | square-to-round corner brace |
| 2555 | screw |
| 2558 | nut |
| 2560 | screw |
| 2565 | dual plate track dolly assembly |
| 2570 | adjustable-level hack assembly |
| 2572 | dolly base assembly |
| 2575 | double side-opening socket module |
| 2580 | rail end cap/end cap module |
| 2585 | terminal end cap/end cap module |
| 2590 | threaded caster component |
| 2595 | caster threaded post |
| 2600 | caster |
| 2605 | screw |
| 2610 | bumper component |
| 2615 | screw |
| 2618 | double side-opening socket module |
| 2621 | first component mount plate assembly |
| 2624 | threaded hole |
| 2625 | component mount plate |
| 2630 | threaded hole |
| 2635 | locator holes |
| 2638 | hole |
| 2640 | screw |
| 2645 | plate corner brace |
| 2648 | threaded hole |
| 2650 | screw |
| 2655 | cylindrical structural component |
| 2660 | second component mount plate assembly |
| 2665 | end cap/end cap module |
| 2670 | cylindrical mount component hole |
| 2675 | cylindrical structural component mount hole |
| 2680 | component mount plate dolly assembly |
| 2685 | second cylindrical mount component |
| 2690 | screw |
| 2695 | threaded hole |
| 2700 | central threaded hole |
| 2705 | custom device mount component |
| 2710 | screw |
| 2715 | threaded hole |
| 2720 | component mount plate dolly assembly |
| 2725 | threaded hole |
| 2730 | four-channel cylindrical structural component |
| 2735 | nut channel |
| 2740 | screw channel |
| 2745 | terminal end cap |
| 2755 | through-hole |
| 2760 | channel opening |
| 2765 | four-channel cylindrical structural component module |
| 2770 | four-channel end cap/end cap module |
| 2775 | channel brace |
| 2777 | four-channel cylindrical structural component |
| 2780 | straight square through-hole male end |
| 2782 | nut channel |
| 2785 | set screw |
| 2788 | threaded hole |
| 2790 | straight square through-hole connector component |
| 2795 | locator plate |
| 2800 | male mount end cap component |
| 2805 | fixed square socket female end |
| 2810 | screw/bolt |
| 2815 | through-hole |
| 2820 | through-hole |
| 2825 | screw channel |
| 2830 | channel opening |
| 2838 | recess |
| 2840 | screw |
| 2845 | through-hole |
| 2850 | threaded hole |
| 2855 | locator slot |
| 2860 | locator boss |
| 2865 | male side mount |
| 2870 | straight square through-hole male side mount |
| 2872 | straight square through-hole male end/male end module |
| 2875 | screw |
| 2880 | through-hole |
| 2885 | concave base side mount component |

NUMBERING KEY

| 2890 | nut channel |
| 2750 | screw |
| 2895 | four-channel cylindrical structural component |
| 2900 | recess |
| 2905 | threaded core component |
| 2910 | side mount hole |
| 2915 | screw |
| 2920 | threaded hole |
| 2925 | straight square threaded-hole male end |
| 2930 | straight square threaded-hole male side mount |
| 2935 | tapered square through-hole male end |
| 2940 | tapered square through-hole male side mount |
| 2945 | tapered square threaded-hole male end |
| 2950 | tapered square threaded-hole male side mount |
| 2955 | octagonal through-hole male end |
| 2960 | octagonal through-hole male side mount |
| 2965 | octagonal threaded-hole male end |
| 2970 | octagonal threaded-hole male side mount |
| 2975 | rounded square through-hole male end |
| 2980 | rounded square through-hole male side mount |
| 2985 | rounded square threaded-hole male end |
| 2990 | rounded square threaded-hole male side mount |
| 2995 | rounded square indexing male end |
| 3000 | rounded square indexing male side mount |
| 3005 | fixed square socket/straight square through-hole male end module |
| 3010 | cylindrical structural component |
| 3015 | screw channel |
| 3020 | fixed square socket component |
| 3025 | through-hole |
| 3030 | screw/bolt |
| 3035 | screw-head hole |
| 3040 | nut-insert through-hole |
| 3045 | nut-insert recess |
| 3050 | threaded nut |
| 3055 | channel openings |
| 3060 | fixed square socket/end cap module |
| 3062 | side mount hole |
| 3065 | double fixed square socket modules |
| 3068 | nut channel |
| 3070 | straight square threaded-hole connector component |
| 3075 | square boss |
| 3080 | through-hole |
| 3085 | threaded holes |
| 3090 | screw |
| 3095 | tapered square through-hole connector component |
| 3100 | square boss |
| 3105 | through-hole |
| 3110 | through-holes |
| 3115 | tapered square threaded-hole connector component |
| 3120 | square boss |
| 3125 | through-hole |
| 3130 | threaded holes |
| 3135 | stackable tray assembly |
| 3138 | double square side-opening socket module |
| 3140 | square side-opening socket component |
| 3145 | cylindrical structural component |
| 3150 | through-hole |
| 3155 | screw channel |
| 3158 | channel opening |
| 3160 | octagonal through-hole connector component |
| 3165 | square boss |
| 3170 | through-hole |
| 3175 | through-holes |
| 3180 | screw/bolt |
| 3185 | screw-head hole |
| 3190 | threaded nut/insert |
| 3195 | nut/insert recess |
| 3200 | square side-opening socket cap |
| 3205 | octagonal threaded-hole connector component |
| 3208 | square boss |
| 3210 | threaded holes |
| 3215 | screw/bolt |
| 3220 | rotatable female end |
| 3225 | double rotatable cylindrical socket module |
| 3230 | rotatable cylindrical socket component |
| 3235 | cylindrical structural component |

NUMBERING KEY

| 3240 | through-holes |
| 3245 | channel opening |
| 3250 | cylindrical through-hole male end |
| 3255 | cylindrical through-hole male side mount |
| 3260 | cylindrical threaded-hole male end |
| 3265 | cylindrical threaded-hole male side mount |
| 3270 | cylindrical sloped neck rotating male end |
| 3275 | cylindrical sloped neck rotating male side mount |
| 3280 | cylindrical through-hole connector component |
| 3285 | square boss |
| 3290 | through-hole |
| 3295 | through-holes |
| 3300 | cylindrical retainment neck |
| 3305 | screw/bolt |
| 3310 | screw-head hole |
| 3315 | threaded insert |
| 3320 | set screw |
| 3330 | cylindrical threaded-hole connector component |
| 3332 | square boss |
| 3333 | cylindrical retainment neck |
| 3335 | threaded holes |
| 3340 | screw |
| 3345 | double rounded side-opening socket module |
| 3350 | rounded side-opening socket component |
| 3355 | cylindrical structural component |
| 3360 | through-hole |
| 3365 | screw channel |
| 3370 | channel opening |
| 3375 | screw/bolt |
| 3380 | screw-head hole |
| 3385 | threaded nut |
| 3388 | nut/insert recess |
| 3390 | rounded side-opening socket cap |
| 3395 | screw |
| 3400 | rounded square through-hole connector component |
| 3405 | square boss |
| 3410 | through-hole |
| 3413 | rounded corner |
| 3415 | through-holes |
| 3420 | cylindrical retainment neck |
| 3422 | square side |
| 3423 | tapered end |
| 3425 | rounded square threaded-hole connector component |
| 3428 | square boss |
| 3430 | cylindrical retainment neck |
| 3435 | threaded holes |
| 3440 | rounded corner |
| 3445 | square side |
| 3450 | tapered end |
| 3455 | rounded square indexing connector component |
| 3460 | square boss |
| 3465 | through-hole |
| 3470 | rounded corner |
| 3475 | indentation |
| 3480 | indented retainment neck |
| 3485 | pointed-tip set screw |
| 3490 | square side |
| 3495 | tapered end |
| 3500 | second double fixed square socket module |
| 3503 | second fixed square socket component |
| 3505 | threaded insert |
| 3510 | threaded insert recess |
| 3515 | indexing clamp socket component |
| 3520 | cylindrical structural component |
| 3525 | through-hole |
| 3530 | screw channel |
| 3535 | channel opening |
| 3540 | indexing clamp |
| 3545 | clamp guide |
| 3550 | set screw |
| 3555 | threaded insert |
| 3558 | recess |
| 3560 | indexing clamp socket cap |
| 3565 | screw |
| 3570 | through-hole |
| 3575 | threaded hole |
| 3580 | springs |

NUMBERING KEY

| | |
|---|---|
| 3585 | spring holes |
| 3590 | recesses |
| 3595 | clamping teeth |
| 3600 | cylindrical sloped neck indexing male side mount |
| 3602 | cylindrical sloped neck indexing male end |
| 3605 | cylindrical sloped neck connector component |
| 3610 | sloped clamp socket component |
| 3620 | recess |
| 3625 | concave base indexing side mount component |
| 3627 | through-hole |
| 3628 | through-hole |
| 3630 | square boss |
| 3632 | sloped retainment neck |
| 3635 | indexing teeth |
| 3640 | indexing grooves |
| 3645 | recess |
| 3650 | indexing male mount end cap component |
| 3660 | threaded hole |
| 3665 | screw channel |
| 3670 | cylindrical structural component |
| 3672 | indexing teeth |
| 3674 | channel opening |
| 3675 | cylindrical structural component |
| 3680 | through-hole |
| 3685 | screw channel |
| 3690 | channel opening |
| 3695 | sloped clamp |
| 3700 | clamp guides |
| 3705 | set screw |
| 3710 | threaded insert |
| 3715 | recess |
| 3720 | sloped clamp socket cap |
| 3725 | screw |
| 3730 | through-hole |
| 3735 | threaded hole |
| 3740 | springs |
| 3745 | spring holes |
| 3750 | spring recesses |
| 3755 | sloped wedge midsection |
| 3760 | pointed-tip set screw |
| 3765 | no-channel cylindrical structural component |
| 3770 | screw channel |
| 3775 | no-channel cylindrical structural component module |
| 3777 | second sloped clamp socket component |
| 3778 | through-hole |
| 3780 | threaded core component |
| 3785 | threaded hole |
| 3788 | side mount hole |
| 3790 | eight-channel cylindrical structural component |
| 3792 | nut channel |
| 3794 | eight-channel cylindrical structural component module |
| 3795 | eight-channel rotatable cylindrical socket component |
| 3798 | screw |
| 3800 | through-hole |
| 3802 | threaded holes |
| 3805 | inserted segment |
| 3808 | channel opening |
| 3810 | eight-channel rounded square threaded-hole male end |
| 3812 | threaded holes |
| 3815 | inserted segment |
| 3818 | eight-channel male mount end cap component |
| 3820 | recess |
| 3821 | threaded hole |
| 3823 | channel opening |
| 3825 | one-way male side mount collar |
| 3830 | cylindrical structural component |
| 3835 | fixed square socket/straight square through-hole male end module |
| 3840 | one-way collar component |
| 3845 | hollow center |
| 3850 | nut channel |
| 3855 | raised through-hole |
| 3860 | screw |
| 3865 | male side mount segment |
| 3870 | recess |
| 3875 | screw |
| 3880 | through-hole |

NUMBERING KEY

| | |
|---|---|
| 3885 | four-way male side mount collar |
| 3890 | four-way collar component |
| 3895 | hollow center |
| 3900 | male side mount segment |
| 3905 | recess |
| 3910 | through-hole |
| 3915 | two-way male mount junction module |
| 3920 | two-way junction component |
| 3925 | male side mount face |
| 3930 | recess |
| 3935 | screw |
| 3940 | threaded hole |
| 3945 | three-way male mount indexing T-junction module |
| 3950 | three-way indexing T-junction component |
| 3955 | male side mount face |
| 3960 | recess |
| 3965 | threaded hole |
| 3966 | indexing teeth |
| 3968 | three-way male mount T-junction module |
| 3970 | three-way male mount corner-junction module |
| 3975 | three-way corner-junction component |
| 3980 | male side mount face |
| 3985 | recess |
| 3990 | threaded hole |
| 3995 | three-way male mount Y-junction module |
| 4000 | three-way Y-junction component |
| 4005 | male side mount face |
| 4010 | recess |
| 4015 | threaded hole |
| 4020 | four-way male mount pyramidal-junction module |
| 4025 | four-way pyramidal-junction component |
| 4030 | male side mount face |
| 4035 | recess |
| 4040 | threaded hole |
| 4045 | six-way male mount cubic-junction module |
| 4050 | six-way cubic-junction component |
| 4055 | male side mount face |
| 4060 | recess |
| 4065 | threaded hole |
| 4070 | handle module |
| 4075 | socket module |
| 4080 | three-way T-junction component |
| 4085 | side mount faces |
| 4090 | recess |
| 4095 | threaded hole |
| 4100 | handle mount component |
| 4105 | threaded handle |
| 4110 | cylindrical end |
| 4115 | cylindrical cavity |
| 4120 | threaded post |
| 4125 | through-hole |
| 4127 | nut channel |
| 4128 | socket module |
| 4130 | dual vertical cylindrical rail dolly assembly |
| 4135 | cylindrical structural component |
| 4138 | nut channel |
| 4140 | no-channel end cap/end cap module |
| 4145 | side mount hole |
| 4150 | no-channel cylindrical structural component |
| 4155 | no-channel terminal end cap |
| 4160 | screw channel |
| 4165 | threaded hole |
| 4170 | screw |
| 4175 | fixed square socket/end cap module |
| 4180 | recess |
| 4185 | stiffener plate |
| 4190 | screw |
| 4195 | threaded hole |
| 4200 | tray bottom |
| 4205 | cut-out |
| 4210 | collar hole |
| 4220 | collar |
| 4225 | screw |
| 4230 | threaded hole |
| 4235 | fixed square socket/tapered square through-hole male end module |
| 4238 | through-hole |

-continued

NUMBERING KEY

| | |
|---|---|
| 4240 | nut channel |
| 4245 | side panel |
| 4248 | through-hole |
| 4250 | threaded hole |
| 4252 | through-hole |
| 4255 | threaded hole |
| 4260 | utility cart assembly |
| 4265 | second stackable bay assembly |
| 4270 | third stackable tray assembly |
| 4275 | fixed square socket/threaded-post end cap modules |
| 4280 | threaded-post end cap component |
| 4285 | central threaded hole |
| 4290 | table assembly |
| 4295 | platform component |
| 4300 | double fixed square socket module |
| 4305 | double fixed square socket module |
| 4310 | hole |

The invention claimed is:

1. A carriage assembly configured for rolling engagement along a cylindrical rail assembly, the carriage assembly comprising:

a first body component having an outward-facing side, a rail-facing side, a front end, a rear end, a first side edge, and a second side edge; and wherein the outward-facing side has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein one or both of the front end and the rear end of the first body component has an axle element with two inclined axle ends where in each a threaded hole is provided for threadable engagement therewith a screw by which a roller is rotationally engaged.

2. A carriage assembly according to claim 1, additionally comprising:

a second body component having an outward-facing side, a rail-facing side, a front end, a rear end, a first side edge, and a second side edge; and whereby the first side edge of the second body component is demountably engaged with the first side edge of the first body component by a pair of screws passed through holes in the first body component and threadably engaged with threaded holes provided therefor in the second body component; and wherein the outward-facing side of the second body component has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component.

3. A carriage assembly according to claim 2, additionally comprising:

a third body component having an outward-facing side, a rail-facing side, a front end, a rear end, a first side edge, and a second side edge; and whereby the first side edge of the third body component is demountably engaged with the second side edge of the second body component by a pair of screws passed through holes in the second body component and threadably engaged with threaded holes provided therefor in the third body component; and wherein the outward-facing side of the third body component has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein optionally one or both of the front end and the rear end of the third body component has an axle element with two inclined axle ends where in each a threaded hole is provided for threadable engagement therewith a screw by which a roller is rotationally engaged.

4. A carriage assembly according to claim 3, additionally comprising:

a fourth body component having an outward-facing side, a rail-facing side, a front end, a rear end, a first side edge, and a second side edge; and whereby the first side edge of the fourth body component is demountably engaged with the second side edge of the third body component by a pair of screws passed through holes in the third body component and threadably engaged with threaded holes provided therefor in the fourth body component; and whereby the second side edge of the fourth body component is demountably engaged with the second side edge of the first body component by a pair of screws passed through holes in the fourth body component and threadably engaged with threaded holes provided therefor in the first body component; and wherein the outward-facing side of the fourth body component has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component.

5. A carriage assembly according to claim 1, wherein the rail-facing side of any of the first, second, third, and fourth body components is provided with a clamping mechanism, the clamping mechanism comprising:

a concave friction pad configured for pressed engagement against a surface of the cylindrical rail assembly; and a threaded rod passed through a hole in the body component and threadably engaged with a threaded carrier provided therefor by which, when said threaded rod is rotated, the concave friction pad is advanced or retracted toward or away from the surface of the cylindrical rail assembly.

6. A carriage assembly according to claim 1, wherein the rail-facing side of any of the first, second, third, and fourth body components is provided with a clamping mechanism, the clamping mechanism comprising:

a concave friction pad configured for pressed engagement against a surface of the cylindrical rail assembly, said concave friction pad comprising a protrusion which may be slidingly engaged within a channel along the cylindrical rail assembly to maintain the alignment of the carriage assembly on the cylindrical rail assembly; and a threaded rod passed through a hole in the body component and threadably engaged with a threaded carrier provided therefor by which, when said threaded rod is rotated, the concave friction pad is advanced or retracted toward or away from the surface of the cylindrical rail assembly.

7. A carriage assembly according to claim 1, wherein the rail-facing side of any of the first, second, third, or fourth body components is provided with a channel guide component, the channel guide component comprising:

a slidable guide element configured for sliding engagement within a channel along the cylindrical rail assembly, said slidable guide element provided therefor to maintain the alignment of the carriage assembly on the cylindrical rail assembly.

8. A carriage assembly configured for sliding engagement along a cylindrical rail assembly, the carriage assembly comprising:

between one and four of a body component having each an outward-facing side, a rail-facing side, a front end, a rear end, a first side edge, and a second side edge; and wherein when two, three, or four body components are provided, the body components positioned adjacently are demountably engaged at their first and/or second side edges by a pair of screws threadably engaged with threaded holes provided therefor; and wherein the outward-facing side(s) has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein any of the rail-facing side of the one or more body component is provided with a clamping mechanism, the clamping mechanism comprising a concave friction pad configured for pressed engagement against a surface of the cylindrical rail assembly, said concave friction pad comprising a protrusion which is slidingly engaged within a channel along the cylindrical rail assembly to maintain the alignment of the carriage assembly on the cylindrical rail assembly; and a threaded rod passed through a hole in the body component and threadably engaged with a threaded carrier provided therefor by which, when said threaded rod is rotated, the concave friction pad is advanced or retracted toward or away from the surface of the cylindrical rail assembly.

9. A carriage assembly configured for rolling engagement along a square rail assembly or a rectangular rail assembly, the carriage assembly comprising:

between one and four of a body component having each an outward-facing side, a rail-facing side, a front end, a rear end, a first side edge, and a second side edge; and wherein when two, three, or four body components are provided, the body components positioned adjacently are demountably engaged at their first and/or second side edges by a pair of screws threadably engaged with threaded holes provided therefor; and wherein the outward-facing side(s) has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein one or both of the front end and/or the rear end of the one, two, three, or four body component has an axle element with two inclined axle ends where in each a threaded hole is provided for threadable engagement therewith a screw by which a roller is rotationally engaged.

10. A carriage assembly according to claim 9, wherein the rail-facing side of any of the one, two, three, or four body components is provided with a clamping mechanism, the clamping mechanism comprising:

a flat friction pad configured for pressed engagement against a surface of the square rail assembly or the rectangular rail assembly; and a threaded rod passed through a hole in the body component and threadably engaged with a threaded carrier provided therefor by which, when said threaded rod is rotated, the flat friction pad is advanced or retracted toward or away from the surface of the rail assembly.

11. A carriage assembly according to claim 9, wherein the rail-facing side of any of the one, two, three, or four body components is provided with a clamping mechanism, the clamping mechanism comprising:

a flat friction pad configured for pressed engagement against a surface of the square rail assembly or the rectangular rail assembly, said flat friction pad comprising a protrusion which may be slidingly engaged within a channel along the rail assembly to maintain the alignment of the carriage assembly on the rail assembly; and a threaded rod passed through a hole in the body component and threadably engaged with a threaded carrier provided therefor by which, when said threaded rod is rotated, the flat friction pad is advanced or retracted toward or away from the surface of the rail assembly.

12. A carriage assembly configured for sliding engagement along a square rail assembly or a rectangular rail assembly, the carriage assembly comprising:

between one and four of a body component having each an outward-facing side, a rail-facing side, a front end, a rear end, a first side edge, and a second side edge; and wherein when two, three, or four body components are provided, the body components positioned adjacently are demountably engaged at their first and/or second side edges by a pair of screws threadably engaged with threaded holes provided therefor; and wherein the outward-facing side(s) has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein any of the rail-facing side of the one or more body component is provided with a clamping mechanism, the clamping mechanism comprising a flat friction pad configured for pressed engagement against a surface of the rail assembly, said flat friction pad comprising a protrusion which is slidingly engaged within a channel along the rail assembly to maintain the alignment of the carriage assembly on the rail assembly; and a threaded rod passed through a hole in the body component and threadably engaged with a threaded carrier provided therefor by which, when said threaded rod is rotated, the flat friction pad is advanced or retracted toward or away from the surface of the rail assembly.

13. A carriage assembly configured for rolling engagement along an octagonal rail assembly, the carriage assembly comprising:

between one and four of a body component having each an outward-facing side, a rail-facing side, a front end, a rear end, a first side edge, and a second side edge; and wherein when two, three, or four body components are provided, the body components positioned adjacently are demountably engaged at their first and/or second side edges by a pair of screws threadably engaged with threaded holes provided therefor; and wherein the outward-facing side(s) has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein one or both of the front end and/or the rear end of the one, two, three, or four body component has an axle element with two inclined axle ends where in each a threaded hole is provided for threadable engagement therewith a screw by which a roller is rotationally engaged.

14. A carriage assembly according to claim 13, wherein the rail-facing side of any of the one, two, three, or four body components is provided with a clamping mechanism, the clamping mechanism comprising:

a friction pad comprising three distal contact faces configured for pressed engagement against three sides of the octagonal rail assembly; and a threaded rod passed through a hole in the body component and threadably engaged with a threaded carrier provided therefor by which, when said threaded rod is rotated, the friction pad is advanced or retracted toward or away from the surface of the rail assembly.

15. A carriage assembly configured for rolling engagement along a curvilinear or circular track assembly, the carriage assembly comprising:

between one and four of a body component having each an outward-facing side, a rail-facing side, a front end, a rear end, a first side edge, and a second side edge; and wherein when two, three, or four body components are provided, the body components positioned adjacently are demountably engaged at their first and/or second side edges by a pair of screws threadably engaged with threaded holes provided therefor; and wherein the outward-facing side(s) has one or more threaded holes there provided for threadable engagement therewith one or more screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component; and wherein the front end and the rear end of one body component or two opposed body components have a pivotable axle element with two inclined axle ends where in each a threaded hole is provided for threadable engagement therewith a screw by which a roller is rotationally engaged.

16. A carriage assembly according to claim 15, wherein the rail-facing side of any of the one, two, three, or four body components is provided with a clamping mechanism, the clamping mechanism comprising:

a flat friction pad configured for pressed engagement against a surface of the curvilinear or circular track assembly; and a threaded rod passed through a hole in the body component and threadably engaged with a threaded carrier provided therefor by which, when said threaded rod is rotated, the flat friction pad is advanced or retracted toward or away from the surface of the track assembly.

17. A multidirectional component mount comprising:

a female mating component having an octagonal-shaped receptacle opposite a concave face configured for engagement with a rounded side of a carriage assembly or a circumferential surface of a cylindrical structural component; and a male mating component having an octagonal-shaped male segment opposite a concave face configured for engagement with the rounded side of the carriage assembly or the circumferential surface of the cylindrical structural component;

wherein said female mating component is secured to the carriage assembly by a pair of screws threadably engaged with two threaded holes in the carriage assembly, or secured to the cylindrical structural component by a pair of screws threadably engaged with two threaded holes in the circumferential surface or two nuts engaged within a nut channel therealong; and wherein said male mating component is secured to the carriage assembly by a pair of screws threadably engaged with two threaded holes in the carriage assembly, or secured to the cylindrical structural component by a pair of screws threadably engaged with two threaded holes in the circumferential surface or two nuts engaged within the nut channel therealong; and wherein the female mating component and the male mating component are demountably engaged optionally at any one of four angular orientations relative to one another, whereby the male segment is secured by two screws through holes in the female mating component and threadably engaged with one of four pairs of threaded holes in the male segment.

18. A mounting plate comprising:

a plurality of threaded holes positioned around a central orifice by which a device or component is demountably engaged by a plurality of screws through holes in the device or component and there threadably engaged with the threaded holes; and a plurality of threaded holes and/or through-holes near the middle and outer edges of the mounting plate there provided for reversable engagement therewith a plurality of screws by which may be demountably engaged one or more of a male connector configured for demountable engagement with a female end of another component, and/or one or more of a brace component configured for demountable engagement of another component, and/or one or more of a bracket component configured for demountable engagement of another component, and/or one or more of a plate component configured for demountable engagement of another component, and/or one or more of a mount component configured for demountable engagement of another component, and/or one or more of a cylindrical structural component.

19. A mounting plate according to claim 18, wherein the component demountably engaged at the central orifice comprises a bowl mount component having a concave surface wherein a ball adapter component with a convex surface may be levelled and demountably engaged by a locking handle component demountably engaged with the underside of the bowl mount component by a screw, bolt, or threaded rod extending down from the center of the ball adapter component and passed through a hole in the center of the bowl mount component to be threadably engaged with a threaded hole in the center of the locking handle component.

20. A mounting plate according to claim 19, wherein a set of threaded extension rods is interposed the bowl mount component and the mounting plate, said threaded extension rods comprising threaded screw ends opposite threaded hole ends, whereby the threaded screw ends said threaded extension rods may be threadably engaged with the mounting plate at one end and demountably engaged by screws or bolts through holes in the bowl mount component and threadably engaged with the threaded hole ends.

21. A mounting plate according to claim 20, wherein a series of two or more sets of the threaded extension rods are interposed the bowl mount component and the mounting plate, and wherein optionally a stiffener plate is inserted between the one or more sets of threaded extension rods.

22. A cylindrical mount component comprising a circumferential surface interposed a flat surface at both ends wherein one or more threaded bores is provided for demountable engagement of a threaded caster component or a threaded foot component or a gooseneck mount component or a mounting plate.

23. The cylindrical mount component according to claim 22, additionally comprising one or more threaded holes on the circumferential surface of the cylindrical mount component, said one or more threaded holes provided therefor demountable engagement of one or more of a male connector configured for demountable engagement with a female end of another component, and/or one or more of a brace component configured for demountable engagement of another component, and/or one or more of a plate component configured for demountable engagement of another component, and/or one or more of a weight component.

24. A kit of parts for configuring a track assembly for rolling engagement of one or more of a carriage assembly therealong, the track assembly comprising:

one or more sets of parallel cylindrical structural support components having one or more nut channels and/or one or more threaded holes provided therealong for demountable engagement of another component by screws threadably engaged with said threaded holes or threadably engageable nuts slidingly engaged within said nut channels;

wherein a plurality of threaded foot components or threaded caster components are demountably engaged with said threadably engageable nuts or said threaded holes provided along the underside of the one or more sets of parallel rails.

25. A rail joiner component comprising an outer profile configured for demountable engagement at each end within a matching inner profile of two of a cylindrical structural component provided therefor to assemble a track assembly provided for rolling engagement of one or more carriage assemblies therealong, said rail joiner demountably engaged by a plurality of screws passed through a plurality of holes in the cylindrical structural components to be threadably engaged with threaded holes in the sides of the rail joiner component.

26. The track assembly of claim 25, additionally comprising a plurality of gooseneck mount components demountably engaged by threabable screws with the cylindrical structural components by which one or more perpendicular cylindrical structural components may be demountably engaged for structural support of the track assembly, said gooseneck mount component comprising a narrow section at one end provided for clearance of a carriage assembly, and a male connector at the opposite end provided for engagement with a female end of the perpendicular cylindrical structural component.

27. A kit of parts for demountably configuring a structural assembly, the kit comprising:

two or more of a cylindrical structural component comprising one or more nut channels and/or one or more threaded holes therealong; and one or more of a concave connector component comprising a concave side opposite a flat side wherefrom the center a male element extends, said male element having a plurality of threaded holes or a plurality of through-holes perpendicular to the flat side of the connector component; and wherein a through-hole passes longitudinally through said connector component provided therefor the passage of a threaded portion of a first screw or bolt by which the connector component may be demountably engaged with one of the cylindrical structural component by a threaded nut or threaded hole, or demountably engaged with another component comprising a round surface wherein is provided a threaded nut, a threaded insert, and/or a threaded hole with which the screw or bolt may be threadably engaged to thereby demountably engage the connector component with the cooperating component, said connector component provided therefor the demountable engagement with a female end provided at an end of one of the cylindrical structural component;

wherein said female end comprises a receptacle within which the male element is inserted and two of the threaded holes or through-holes on opposite sides of the male element are aligned with a hole through the side of the female end through which a threaded portion of a second screw or bolt is passed into the female end to be threadably engaged with one or the aligned pair of threaded holes, or through the aligned pair of through-holes and threadably engaged with a threaded nut or threaded insert in the opposite side of the female end, thereby demountably engaging the female end with said connector component.

28. The kit of claim 27, wherein the male element of the connector component is a square shape configured for demountable engagement with one of the female end, said female end comprising a square-shaped receptacle.

29. The kit of claim 27, wherein the male element of the connector component is a square shape with tapered sides configured for ease of demountable engagement with one of the female end, said female end comprising a square-shaped receptacle.

30. The kit of claim 27, wherein the male element of the connector component is an octagonal shape configured for demountable engagement with one of the female end, said female end comprising a square-shaped receptacle.

31. The kit of claim 27, wherein the male element of the connector component is a cylindrical shape configured for demountable engagement with one of the female end, said female end comprising a cylindrical-shaped receptacle.

32. The kit of claim 27, wherein the male element of the connector component is a square shape with rounded corners configured for demountable engagement with one of the female end, said female end comprising a cylindrical-shaped receptacle.

33. The kit of claim 27, wherein one or more of a flat connector component comprising a first flat side which is fastened to an end of one of the cylindrical structural component, and a second flat side opposite the first flat side wherefrom the center the male element extends, said connector component provided therefor the demountable engagement of one of the female end at the end of another cylindrical structural component.

34. The kit according to claim 27, wherein said female end comprises a hatch opening for sideway insertion of the connector component and wherein a socket cap having a threaded insert or nut is demountably engaged by the threaded portion of the screw or bolt passed through the connector component to be threadably engaged with the threaded insert or nut to retain the socket cap and securely engage the connector component.

35. A kit of parts for demountably configuring a structural assembly, the kit comprising:

two or more of a first cylindrical structural component comprising one or more nut channels and/or one or more threaded holes therealong, and a first female end at one or both ends; and one or more of a concave connector component comprising a concave side opposite a flat side wherefrom the center a male element extends, said male element having a square shape with rounded corners and a sloped neck, or a neck having a plurality of indentations, or a neck having a plurality of threaded holes; and wherein a through-hole passes longitudinally through said connector component provided therefor the passage of a threaded portion of a first screw or bolt by which the connector component may be demountably engaged with one of the first cylindrical structural component by a threaded nut or threaded hole, or demountably engaged with another component comprising a round surface wherein is provided a threaded nut, a threaded insert, and/or a threaded hole with which the screw or bolt may be threadably engaged to thereby demountably engage the connector component with the cooperating component, said connector component provided therefor the demountable engagement with one of the first female end provided at an end of one of the first cylindrical structural component;

wherein said first female end comprises a cylindrical receptacle and a threaded hole into the receptacle through which a set screw is threadably engaged to protrude into the neck of the inserted male element of the connector component to where retaining the connector component within the receptacle while allowing continuous rotation, or advanced further to where applying pressure into the sloped neck or one of the indentations or wherein the neck comprises the threaded holes the screw threadably engaged with one or an aligned pair of the threaded holes to thereby fixedly engage the connector component within the first female end.

36. The kit of claim 35, wherein one or more of a flat connector component comprising a first flat side which is fastened to an end of one of the first cylindrical structural component, and a second flat side opposite the first flat side wherefrom the center the male element extends, provided therefor the demountable engagement of one of the first female end at an end of another cylindrical structural component.

37. The kit of claim 35, further comprising one or more of a second cylindrical structural component having a second female end at one or both ends, said second female end having a square-shaped receptacle and a threaded hole into the receptacle through which a set screw is threadably engaged to where applying pressure into the sloped neck or one of the indentations or wherein the neck comprises the threaded holes the screw threadably engaged with one or an aligned pair of the threaded holes to thereby fixedly engage the connector component within the first female end.

38. A kit of parts for demountably configuring a structural assembly, the kit comprising:

two or more of a first cylindrical structural component comprising one or more nut channels and/or one or more threaded holes therealong, and a female end at one or both ends; and one or more of a concave connector component comprising a concave side opposite a flat side wherefrom the center a male element extends, said male element having a cylindrical shape and a sloped neck, or a neck having a plurality of indentations, or a neck having a plurality of threaded holes; and wherein a through-hole passes longitudinally through said connector component provided therefor the passage of a threaded portion of a first screw or bolt by which the connector component may be demountably engaged with one of the cylindrical structural component by a threaded nut or threaded hole, or demountably engaged with another component comprising a round surface wherein is provided a threaded nut, a threaded insert, and/or a threaded hole with which the screw or bolt may be threadably engaged to thereby demountably engage the connector component with the cooperating component, said connector component provided therefor the demountable engagement with one of the female end provided at an end of one of the first cylindrical structural component;

wherein said female end comprises a cylindrical receptacle and a threaded hole into the receptacle through which a set screw is threadably engaged to protrude into the neck of the inserted male element of the connector component to where retaining the connector component within the receptacle while allowing continuous rotation, or advanced further to where applying pressure into the sloped neck or one of the indentations or wherein the neck comprises the threaded holes the screw threadably engaged with one or an aligned pair of the threaded holes to thereby fixedly engage the connector component within the first female end.

39. The kit of claim 38, wherein one or more of a flat connector component comprising a first flat side which is fastened to an end of one of the first cylindrical structural component, and a second flat side opposite the first flat side wherefrom the center the male element extends, provided therefor the demountable engagement of one of the first female end at an end of another cylindrical structural component.

40. A kit of parts for demountably configuring a structural assembly, the kit comprising:

two or more of a cylindrical structural component comprising one or more nut channels and/or one or more threaded holes therealong, and a female end at one or both ends; and one or more of a concave connector component comprising a concave side opposite a flat side wherefrom the center a male element extends, said male element having a cylindrical shape or a square shape with rounded corners, and a neck wherein is a plurality of indentations; and wherein a through-hole passes longitudinally through said connector component provided therefor the passage of a threaded portion of a first screw or bolt by which the connector component may be demountably engaged with one of the cylindrical structural component by a threaded nut or threaded hole, or demountably engaged with another component comprising a round surface wherein is provided a threaded nut, a threaded insert, and/or a threaded hole with which the screw or bolt may be threadably engaged to thereby demountably engage the connector component with the cooperating component, said connector component provided therefor the demountable engagement of the female end at an end of one of the cylindrical structural component;

wherein said female end comprises a clamp component with a plurality of teeth configured for engagement with the indentations of the male element of the connector component, whereby a set screw threadably engaged with a threaded hole in the side of the female end applies pressure against the clamp component with the teeth aligned and applying pressure into the indentations thereby demountably engaging the connector component within the female end at one of a plurality of relative angular orientations.

41. The kit of claim 40, wherein one or more of a flat connector component comprising a first flat side which is fastened to an end of one of the cylindrical structural component, and a second flat side opposite the first flat side wherefrom the center the male element extends, provided therefor the demountable engagement of one of the female end at the end of another cylindrical structural component.

42. A kit of parts for demountably configuring a structural assembly, the kit comprising:

two or more of a cylindrical structural component comprising one or more nut channels and/or one or more threaded holes therealong, and a female end at one or both ends; and one or more of a concave connector component comprising a concave side opposite a flat side having a circular arrangement of teeth around wherefrom the center a male element extends, said male element comprising a sloped neck and a cylindrical shape or a square shape with rounded corners; and wherein a through-hole passes longitudinally through said connector component provided therefor the passage of a threaded portion of a first screw or bolt by which the connector component may be demountably engaged with one of the cylindrical structural component by a threaded nut or threaded hole, or demountably engaged with another component comprising a round surface wherein is provided a threaded nut, a threaded insert, and/or a threaded hole with which the screw or bolt may be threadably engaged to thereby demountably engage the connector component with the cooperating component, said connector component provided therefor the demountable engagement of a female end at an end of one of the cylindrical structural component;

wherein said female end comprises a receptacle and a circular arrangement of grooves on the front face of the female end configured for mating engagement with the circular arrangement of teeth around the male element of the connector component which is demountably engaged within the receptacle;

wherein a clamp component with a sloped midsection configured for engagement with the sloped neck of the male element applies pressure against the sloped neck by which a set screw threadably engaged with a threaded hole in the side of the female end and into the receptacle applies pressure against the clamp component thereby holding the male element in place at a set alignment and mating engagement of the teeth and grooves at one of a plurality of relative angular orientations.

43. The kit of claim 42, wherein one or more of a flat connector component comprising a first flat side which is fastened to an end of one of the cylindrical structural component, and opposite the first flat side is a second flat side having a circular arrangement of teeth wherefrom the center a male element extends, provided therefor the demountable engagement of one of the female end at the end of another cylindrical structural component.

44. A kit of parts for demountably configuring a structural assembly, the kit comprising:

two or more of a cylindrical structural component comprising two or more nut channels therealong; and wherein at least two of the cylindrical structural components are conjoined end to end by two or more of a channel brace component, the channel brace component comprising a plate element configured for sliding and fitted engagement within adjacently positioned nut channels of the cylindrical structural components, whereby two or more screws threadably engaged with two or more threaded holes in the channel brace component and through to press against the center of the nut channel secures the channel brace within the nut channel and demountably engages the two cylindrical structural components.

45. A kit of parts for demountably configuring a structural assembly, the kit comprising:

two or more of a hollow cylindrical structural component comprising one or more holes therealong the circumferential surface of the component; and one or more of a threaded core component affixed within the hollow center of each of the two or more cylindrical structural components, said threaded core component comprising four, six, or eight of a threaded insert by which a brace or another component is demountably engaged with the circumferential surface by screws or bolts of which a threaded portion is passed through the holes on the circumferential surface to be threadably engaged with the threaded inserts.

<p align="center">* * * * *</p>